US007731091B2

(12) United States Patent
Knowles et al.

(10) Patent No.: US 7,731,091 B2
(45) Date of Patent: Jun. 8, 2010

(54) DIGITAL IMAGE CAPTURING AND PROCESSING SYSTEM EMPLOYING AUTOMATIC OBJECT DETECTION AND SPECTRAL-MIXING BASED ILLUMINATION TECHNIQUES

(75) Inventors: C. Harry Knowles, Hanover, NH (US); Xiaoxun Zhu, Marlton, NJ (US); Timothy Good, Clementon, NJ (US); Tao Xian, Bensalem, PA (US); Anatoly Kotlarsky, Churchville, PA (US); Michael Veksland, Marlton, NJ (US); Mark Hernandez, Bridgeton, NJ (US); John Gardner, Mullica Hill, NJ (US); Steven Essinger, Philadelphia, PA (US); Patrick Giordano, Blackwood, NJ (US); Sean Kearney, Hamilton, NJ (US); Mark Schmidt, Williamstown, NJ (US); John A. Furlong, Woodbury, NJ (US); Nicholas Ciarlante, Woolwich Township, NJ (US); Yong Liu, Suzhou (CN); Jie Ren, Suzhou (CN); Xi Tao, Suzhou (CN); JiBin Liu, Suzhou (CN); Ming Zhuo, Suzhou (CN); Duane Ellis, Medford, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 140 days.

(21) Appl. No.: 11/977,422

(22) Filed: Oct. 24, 2007

(65) Prior Publication Data

US 2009/0101718 A1 Apr. 23, 2009

Related U.S. Application Data

(63) Continuation of application No. 11/880,087, filed on (Continued)

(51) Int. Cl.
*G06K 7/10* (2006.01)

(52) U.S. Cl. ........................... 235/462.42; 235/462.01; 235/462.09

(58) Field of Classification Search ............ 235/462.42, 235/462.01, 462.09, 462.41
See application file for complete search history.

(56) References Cited

U.S. PATENT DOCUMENTS 4,053,233 A 10/1977 Biene et al.

(Continued)

OTHER PUBLICATIONS

Product brochure for the LMC555 CMOS Timer by National Semiconductor Corporation, Mar. 2002, pp. 1-10.

(Continued)

*Primary Examiner*—Ahshik Kim
(74) *Attorney, Agent, or Firm*—Thomas J. Perkowski, Esq. PC

(57) ABSTRACT

A digital image capturing and processing system for illuminating objects using automatic object detection and spectral-mixing illumination technique. The system comprises an area-type illumination and imaging module for projecting a coextensive area-type illumination and imaging field (i.e. zone) into a 3D imaging volume during object illumination and imaging operations. The area-type illumination and imaging module includes a spectral-mixing based illumination subsystem for producing a first field of visible illumination from an array of visible LEDs, and producing a second field of invisible illumination from an array of infrared (IR) LEDs, wherein the first and second fields of illumination spatially overlap and intermix with each other and produce a composite illumination field that is at least substantially coextensive with the FOV of the image sensing array. An automatic object detection subsystem automatically detects an object moving through the 3D imaging volume, while an illumination control subsystem controls the relative power ratio (VIS/IR) of visible illumination and invisible illumination during system operations so as to achieve sufficient image contrast in captured digital images to ensure satisfactory image processing.

8 Claims, 195 Drawing Sheets

Related U.S. Application Data

Jul. 19, 2007, which is a continuation-in-part of application No. 11/820,497, filed on Jun. 19, 2007, and a continuation-in-part of application No. 11/820,010, filed on Jun. 15, 2007, and a continuation-in-part of application No. 11/809,173, filed on May 31, 2007, and a continuation-in-part of application No. 11/809,174, filed on May 31, 2007, and a continuation-in-part of application No. 11/809,240, filed on May 31, 2007, and a continuation-in-part of application No. 11/809,238, filed on May 31, 2007, and a continuation-in-part of application No. 11/788,769, filed on Apr. 20, 2007, and a continuation-in-part of application No. PCT/US2007/009763, filed on Apr. 20, 2007, and a continuation-in-part of application No. 11/731,866, filed on Mar. 30, 2007, and a continuation-in-part of application No. 11/731,905, filed on Mar. 30, 2007, and a continuation-in-part of application No. 11/729,959, filed on Mar. 29, 2007, now Pat. No. 7,540,422, and a continuation-in-part of application No. 11/729,525, filed on Mar. 29, 2007, and a continuation-in-part of application No. 11/729,945, filed on Mar. 29, 2007, now Pat. No. 7,520,433, and a continuation-in-part of application No. 11/729,659, filed on Mar. 29, 2007, and a continuation-in-part of application No. 11/729,954, filed on Mar. 29, 2007, and a continuation-in-part of application No. 11/810,437, filed on Mar. 29, 2007, and a continuation-in-part of application No. 11/713,535, filed on Mar. 2, 2007, and a continuation-in-part of application No. 11/811,652, filed on Mar. 2, 2007, now Pat. No. 7,537,165, and a continuation-in-part of application No. 11/713,785, filed on Mar. 2, 2007, and a continuation-in-part of application No. 11/712,588, filed on Feb. 28, 2007, now abandoned, and a continuation-in-part of application No. 11/712,605, filed on Feb. 28, 2007, now Pat. No. 7,543,749, and a continuation-in-part of application No. 11/711,869, filed on Feb. 27, 2007, now Pat. No. 7,556,199, and a continuation-in-part of application No. 11/711,870, filed on Feb. 27, 2007, now Pat. No. 7,533,823, and a continuation-in-part of application No. 11/711,859, filed on Feb. 27, 2007, now Pat. No. 7,530,497, and a continuation-in-part of application No. 11/711,857, filed on Feb. 27, 2007, and a continuation-in-part of application No. 11/711,906, filed on Feb. 27, 2007, and a continuation-in-part of application No. 11/711,907, filed on Feb. 27, 2007, now Pat. No. 7,516,898, and a continuation-in-part of application No. 11/711,858, filed on Feb. 27, 2007, now Pat. No. 7,533,820, and a continuation-in-part of application No. 11/711,871, filed on Feb. 27, 2007, now Pat. No. 7,527,204, and a continuation-in-part of application No. 11/640,814, filed on Dec. 18, 2006, and a continuation-in-part of application No. PCT/US2006/048148, filed on Dec. 18, 2006, and a continuation-in-part of application No. 11/489,259, filed on Jul. 19, 2006, now Pat. No. 7,540,424, and a continuation-in-part of application No. 11/408,268, filed on Apr. 20, 2006, now Pat. No. 7,464,877, and a continuation-in-part of application No. 11/305,895, filed on Dec. 16, 2005, and a continuation-in-part of application No. 10/989,220, filed on Nov. 15, 2004, now Pat. No. 7,490,774, and a continuation-in-part of application No. 10/712,787, filed on Nov. 13, 2003, now Pat. No. 7,128,266, and a continuation-in-part of application No. 10/186,320, filed on Jun. 27, 2002, now Pat. No. 7,164,810, and a continuation-in-part of application No. 10/186,268, filed on Jun. 27, 2002, now Pat. No. 7,077,319, and a continuation-in-part of application No. PCT/US2004/089389, filed on Nov. 15, 2004, and a continuation-in-part of application No. 09/990,585, filed on Nov. 21, 2001, now Pat. No. 7,028,899, and a continuation-in-part of application No. 09/781,665, filed on Feb. 12, 2001, now Pat. No. 6,742,707, and a continuation-in-part of application No. 09/780,027, filed on Feb. 9, 2001, now Pat. No. 6,629,641, and a continuation-in-part of application No. 09/721,885, filed on Nov. 24, 2000, now Pat. No. 6,631,842.

(56) References Cited

U.S. PATENT DOCUMENTS

| | | | |
|---|---|---|---|
| 4,338,514 | A | 7/1982 | Bixby |
| 4,427,286 | A | 1/1984 | Bosse |
| 4,471,228 | A | 9/1984 | Nishizawa et al. |
| 4,528,444 | A | 7/1985 | Hara et al. |
| 4,538,060 | A | 8/1985 | Sakai et al. |
| 4,766,300 | A | 8/1988 | Chadima, Jr. et al. |
| 4,805,026 | A | 2/1989 | Oda |
| 4,816,916 | A | 3/1989 | Akiyama |
| 4,818,847 | A | 4/1989 | Hara et al. |
| 4,835,615 | A | 5/1989 | Taniguchi et al. |
| 4,894,523 | A | 1/1990 | Chadima, Jr. et al. |
| 4,952,966 | A | 8/1990 | Ishida et al. |
| 4,996,413 | A | 2/1991 | McDaniel et al. |
| 5,019,714 | A | 5/1991 | Knowles |
| 5,025,319 | A | 6/1991 | Mutoh et al. |
| 5,034,619 | A | 7/1991 | Hammond, Jr. |
| 5,063,460 | A | 11/1991 | Mutze et al. |
| 5,063,462 | A | 11/1991 | Nakagawa et al. |
| 5,109,153 | A | 4/1992 | Johnsen et al. |
| 5,111,263 | A | 5/1992 | Stevens |
| 5,124,537 | A | 6/1992 | Chandler et al. |
| 5,142,684 | A | 8/1992 | Perry et al. |
| 5,144,119 | A | 9/1992 | Chadima, Jr. et al. |
| 5,155,345 | A | 10/1992 | Ito |
| 5,231,293 | A | 7/1993 | Longacre, Jr. |
| 5,233,169 | A | 8/1993 | Longacre, Jr. |
| 5,235,198 | A | 8/1993 | Stevens et al. |
| 5,262,871 | A | 11/1993 | Wilder et al. |
| 5,272,538 | A | 12/1993 | Homma et al. |
| 5,281,800 | A | 1/1994 | Pelton et al. |
| 5,286,960 | A | 2/1994 | Longacre, Jr. et al. |
| 5,288,985 | A | 2/1994 | Chadima, Jr. et al. |
| 5,291,008 | A | 3/1994 | Havens et al. |
| 5,291,009 | A | 3/1994 | Roustaei |
| 5,294,783 | A | 3/1994 | Hammond, Jr. et al. |
| 5,296,689 | A | 3/1994 | Reddersen et al. |
| 5,304,786 | A | 4/1994 | Pavlidis et al. |
| 5,304,787 | A | 4/1994 | Wang |
| 5,308,962 | A | 5/1994 | Havens et al. |
| 5,309,243 | A | 5/1994 | Tsai |
| 5,319,181 | A | 6/1994 | Shellhammer et al. |
| 5,319,182 | A | 6/1994 | Havens et al. |
| 5,331,118 | A | 7/1994 | Jensen |
| 5,340,973 | A | 8/1994 | Knowles et al. |
| 5,349,172 | A | 9/1994 | Roustaei |
| 5,352,884 | A | 10/1994 | Petrick et al. |
| 5,354,977 | A | 10/1994 | Roustaei |
| 5,378,883 | A | 1/1995 | Batterman et al. |
| 5,396,054 | A | 3/1995 | Krichever et al. |
| 5,399,846 | A | 3/1995 | Pavlidis et al. |
| 5,410,141 | A | 4/1995 | Kkoenck et al. |
| 5,418,357 | A | 5/1995 | Inoue et al. |
| 5,420,409 | A | 5/1995 | Longacre, Jr. et al. |
| 5,430,285 | A | 7/1995 | Karpen et al. |

| | | | |
|---|---|---|---|
| 5,430,286 | A | 7/1995 | Hammond, Jr. et al. |
| 5,450,291 | A | 9/1995 | Kumagai |
| 5,457,309 | A | 10/1995 | Pelton |
| 5,463,214 | A | 10/1995 | Longacre, Jr. et al. |
| 5,468,951 | A | 11/1995 | Knowles et al. |
| 5,479,515 | A | 12/1995 | Longacre, Jr. |
| 5,484,994 | A | 1/1996 | Roustaei |
| 5,489,769 | A | 2/1996 | Kubo |
| 5,489,771 | A | 2/1996 | Beach et al. |
| 5,491,330 | A | 2/1996 | Sato et al. |
| 5,495,097 | A | 2/1996 | Katz et al. |
| 5,504,317 | A | 4/1996 | Takahashi |
| 5,519,496 | A | 5/1996 | Borgert et al. |
| 5,521,366 | A | 5/1996 | Wang et al. |
| 5,532,467 | A | 7/1996 | Rousatei |
| 5,541,419 | A | 7/1996 | Arakellian |
| 5,545,886 | A | 8/1996 | Metlitsky et al. |
| 5,550,366 | A | 8/1996 | Roustaei |
| 5,572,006 | A | 11/1996 | Wang et al. |
| 5,572,007 | A | 11/1996 | Aragon et al. |
| 5,591,952 | A | 1/1997 | Krichever et al. |
| 5,621,203 | A | 4/1997 | Swartz et al. |
| 5,623,137 | A | 4/1997 | Powers et al. |
| 5,635,697 | A | 6/1997 | Shellhammer et al. |
| 5,637,851 | A | 6/1997 | Swartz et al. |
| 5,646,390 | A | 7/1997 | Wang et al. |
| 5,659,167 | A | 8/1997 | Wang et al. |
| 5,659,761 | A | 8/1997 | DeArras et al. |
| 5,661,291 | A | 8/1997 | Ahearn et al. |
| 5,677,522 | A | 10/1997 | Rice et al. |
| 5,702,059 | A | 12/1997 | Chu et al. |
| 5,710,417 | A | 1/1998 | Joseph et al. |
| 5,717,195 | A | 2/1998 | Feng et al. |
| 5,717,221 | A | 2/1998 | Li et al. |
| 5,719,384 | A | 2/1998 | Ju et al. |
| 5,723,853 | A | 3/1998 | Longacre, Jr. et al. |
| 5,723,868 | A | 3/1998 | Hammond, Jr. et al. |
| 5,736,724 | A | 4/1998 | Ju et al. |
| 5,739,518 | A | 4/1998 | Wang |
| 5,747,796 | A | 5/1998 | Heard et al. |
| 5,754,670 | A | 5/1998 | Shin et al. |
| 5,756,981 | A | 5/1998 | Roustaei et al. |
| 5,773,806 | A | 6/1998 | Longacre, Jr. et al. |
| 5,773,810 | A | 6/1998 | Hussey et al. |
| 5,777,314 | A | 7/1998 | Roustaei |
| 5,780,834 | A | 7/1998 | Havens et al. |
| 5,783,811 | A | 7/1998 | Feng et al. |
| 5,784,102 | A | 7/1998 | Hussey et al. |
| 5,786,582 | A | 7/1998 | Roustaei et al. |
| 5,786,583 | A | 7/1998 | Maltsev |
| 5,786,586 | A | 7/1998 | Pidhirny et al. |
| 5,793,033 | A | 8/1998 | Feng et al. |
| 5,793,967 | A | 8/1998 | Simciak et al. |
| 5,808,286 | A | 9/1998 | Nukui et al. |
| 5,811,774 | A | 9/1998 | Ju et al. |
| 5,811,784 | A | 9/1998 | Tausch et al. |
| 5,815,200 | A | 9/1998 | Ju et al. |
| 5,821,518 | A | 10/1998 | Sussmeier et al. |
| 5,825,006 | A | 10/1998 | Longacre, Jr. et al. |
| 5,831,254 | A | 11/1998 | Karpen et al. |
| 5,831,674 | A | 11/1998 | Ju et al. |
| 5,834,754 | A | 11/1998 | Feng et al. |
| 5,837,985 | A | 11/1998 | Karpen |
| 5,838,495 | A | 11/1998 | Hennick |
| 5,841,121 | A | 11/1998 | Koenck |
| 5,867,594 | A | 2/1999 | Cymbalski |
| 5,883,375 | A | 3/1999 | Knowles et al. |
| 5,900,613 | A | 5/1999 | Koziol et al. |
| 5,912,700 | A | 6/1999 | Honey et al. |
| 5,914,476 | A | 6/1999 | Gerst, III et al. |
| 5,914,477 | A | 6/1999 | Wang |
| 5,920,061 | A | 7/1999 | Feng |
| 5,929,418 | A | 7/1999 | Ehrhart et al. |
| 5,932,862 | A | 8/1999 | Hussey et al. |
| 5,942,741 | A | 8/1999 | Longacre, Jr. et al. |
| 5,949,052 | A | 9/1999 | Longacre, Jr. et al. |
| 5,949,054 | A | 9/1999 | Karpen et al. |
| 5,949,057 | A | 9/1999 | Feng |
| 5,965,863 | A | 10/1999 | Parker et al. |
| 5,979,763 | A | 11/1999 | Wang et al. |
| 5,986,705 | A | 11/1999 | Shiboya et al. |
| 5,992,744 | A | 11/1999 | Smith et al. |
| 5,992,750 | A | 11/1999 | Chadima, Jr. et al. |
| 6,000,612 | A | 12/1999 | Xu |
| 6,006,995 | A | 12/1999 | Amundsen et al. |
| RE36,528 | E | 1/2000 | Roustaei |
| 6,015,088 | A | 1/2000 | Parker et al. |
| 6,016,612 | A | 1/2000 | Biss et al. |
| 6,018,597 | A | 1/2000 | Maltsev et al. |
| 6,019,286 | A | 2/2000 | Li et al. |
| 6,044,231 | A | 3/2000 | Soshi et al. |
| 6,045,047 | A | 4/2000 | Pidhirny et al. |
| 6,060,722 | A | 5/2000 | Havens et al. |
| 6,062,475 | A | 5/2000 | Feng |
| 6,064,763 | A | 5/2000 | Maltsev |
| 6,095,422 | A | 8/2000 | Ogami |
| 6,097,839 | A | 8/2000 | Liu |
| 6,097,856 | A | 8/2000 | Hammon, Jr. |
| 6,098,887 | A | 8/2000 | Figarella et al. |
| 6,109,528 | A | 8/2000 | Ohanian et al. |
| 6,119,941 | A | 9/2000 | Katsandres et al. |
| 6,123,261 | A | 9/2000 | Roustaei |
| 6,123,263 | A | 9/2000 | Feng |
| 6,128,414 | A | 10/2000 | Liu |
| 6,141,046 | A | 10/2000 | Roth et al. |
| 6,149,063 | A | 11/2000 | Reynolds et al. |
| 6,152,371 | A | 11/2000 | Schwartz et al. |
| 6,158,661 | A | 12/2000 | Chadima, Jr. et al. |
| 6,161,760 | A | 12/2000 | Marrs et al. |
| 6,164,544 | A | 12/2000 | Schwartz et al. |
| 6,173,893 | B1 | 1/2001 | Maltsev et al. |
| 6,177,926 | B1 | 1/2001 | Kunert |
| 6,179,208 | B1 | 1/2001 | Feng |
| 6,209,789 | B1 | 4/2001 | Amundsen et al. |
| 6,223,988 | B1 | 5/2001 | Batterman et al. |
| 6,233,986 | B1 | 5/2001 | Bobba et al. |
| 6,234,395 | B1 | 5/2001 | Chadima et al. |
| 6,244,512 | B1 | 6/2001 | Koenck et al. |
| 6,246,642 | B1 | 6/2001 | Gardner, Jr. et al. |
| 6,250,551 | B1 | 6/2001 | He et al. |
| 6,254,003 | B1 | 7/2001 | Pettinelli et al. |
| 6,264,105 | B1 | 7/2001 | Longacre, Jr. et al. |
| 6,266,685 | B1 | 7/2001 | Danielson et al. |
| 6,275,388 | B1 | 8/2001 | Hennick et al. |
| 6,298,175 | B1 | 10/2001 | Longacre, Jr. et al. |
| 6,298,176 | B2 | 10/2001 | Longacre, Jr. et al. |
| 6,328,214 | B1 | 12/2001 | Akel et al. |
| 6,330,974 | B1 | 12/2001 | Ackley |
| 6,336,587 | B1 | 1/2002 | He et al. |
| 6,340,114 | B1 | 1/2002 | Correa et al. |
| 6,345,765 | B1 | 2/2002 | Wiklof |
| 6,347,163 | B2 | 2/2002 | Roustaei |
| 6,357,659 | B1 | 3/2002 | Kelly et al. |
| 6,360,947 | B1 | 3/2002 | Knowles et al. |
| 6,363,366 | B1 | 3/2002 | Henty |
| 6,367,699 | B2 | 4/2002 | Ackley |
| 6,371,374 | B1 | 4/2002 | Schwartz et al. |
| 6,373,579 | B1 | 4/2002 | Ober et al. |
| 6,375,075 | B1 | 4/2002 | Ackley et al. |
| 6,385,352 | B1 | 5/2002 | Roustaei |
| 6,390,625 | B1 | 5/2002 | Slawson et al. |
| 6,398,112 | B1 | 6/2002 | Li et al. |
| 6,431,452 | B2 | 8/2002 | Feng |
| 6,435,411 | B1 | 8/2002 | Massieu et al. |
| 6,469,289 | B1 | 11/2002 | Scott-Thomas et al. |
| 6,489,798 | B1 | 12/2002 | Scott-Thomas et al. |

| | | | |
|---|---|---|---|
| 6,491,223 | B1 | 12/2002 | Longacre, Jr. et al. |
| 6,497,368 | B1 | 12/2002 | Friend et al. |
| 6,499,664 | B2 | 12/2002 | Knowles et al. |
| 6,527,182 | B1 | 3/2003 | Chiba et al. |
| 6,538,820 | B2 | 3/2003 | Fohl et al. |
| 6,547,139 | B1 | 4/2003 | Havens et al. |
| 6,550,679 | B2 | 4/2003 | Hennick et al. |
| 6,560,029 | B1 | 5/2003 | Dobbie et al. |
| 6,561,428 | B2 | 5/2003 | Meier et al. |
| 6,565,003 | B1 | 5/2003 | Ma et al. |
| 6,570,147 | B2 | 5/2003 | Smith |
| 6,575,367 | B1 | 6/2003 | Longacre et al. |
| 6,575,369 | B1 | 6/2003 | Knowles et al. |
| 6,578,766 | B1 | 6/2003 | Parker et al. |
| 6,585,159 | B1 | 7/2003 | Meier et al. |
| 6,601,768 | B2 | 8/2003 | McCall et al. |
| 6,603,507 | B1 | 8/2003 | Jiang et al. |
| 6,607,128 | B1 | 8/2003 | Schwartz et al. |
| 6,616,046 | B1 | 9/2003 | Barkan et al. |
| 6,619,547 | B2 | 9/2003 | Crowther et al. |
| 6,628,445 | B2 | 9/2003 | Chaleff et al. |
| 6,637,655 | B1 | 10/2003 | Hudrick et al. |
| 6,637,658 | B2 | 10/2003 | Barber et al. |
| 6,655,595 | B1 | 12/2003 | Longacre, Jr. et al. |
| 6,659,350 | B2 | 12/2003 | Schwartz et al. |
| 6,669,093 | B1 | 12/2003 | Meyerson et al. |
| 6,681,994 | B1 | 1/2004 | Koenck |
| 6,685,092 | B2 | 2/2004 | Patel et al. |
| 6,685,095 | B2 | 2/2004 | Roustaei et al. |
| 6,689,998 | B1 | 2/2004 | Bremer |
| 6,695,209 | B1 | 2/2004 | La |
| 6,698,656 | B2 | 3/2004 | Parker et al. |
| 6,708,883 | B2 | 3/2004 | Krichever |
| 6,708,885 | B2 | 3/2004 | Reiffel |
| 6,722,569 | B2 | 4/2004 | Ehrhart et al. |
| 6,736,320 | B1 | 5/2004 | Crowther et al. |
| 6,752,310 | B2 | 6/2004 | Ehrhart et al. |
| 6,758,402 | B1 | 7/2004 | Check et al. |
| 6,762,884 | B2 | 7/2004 | Beystrum et al. |
| 6,766,954 | B2 | 7/2004 | Barkan et al. |
| 6,814,290 | B2 | 11/2004 | Longacre |
| 6,814,292 | B2 | 11/2004 | Good |
| 6,831,690 | B1 | 12/2004 | John et al. |
| 6,832,725 | B2 | 12/2004 | Gardiner et al. |
| 6,833,822 | B2 | 12/2004 | Klocek et al. |
| 6,834,807 | B2 | 12/2004 | Ehrhart et al. |
| 6,837,431 | B2 | 1/2005 | Carlson et al. |
| 6,856,440 | B2 | 2/2005 | Chaleff et al. |
| 6,863,217 | B2 | 3/2005 | Hudrick et al. |
| 6,871,993 | B2 | 3/2005 | Hecht |
| D505,423 | S | 5/2005 | Ahearn et al. |
| 6,889,903 | B1 | 5/2005 | Koenck |
| 6,899,272 | B2 | 5/2005 | Krichever et al. |
| 6,899,273 | B2 | 5/2005 | Hussey et al. |
| 6,912,076 | B2 | 6/2005 | Chaleff et al. |
| 6,918,540 | B2 | 7/2005 | Good |
| 6,942,151 | B2 | 9/2005 | Ehrhart |
| 6,947,612 | B2 | 9/2005 | Helms et al. |
| 6,951,304 | B2 | 10/2005 | Good |
| 6,959,865 | B2 | 11/2005 | Walczyk et al. |
| 6,969,003 | B2 | 11/2005 | Havens et al. |
| 6,991,169 | B2 | 1/2006 | Bobba et al. |
| 7,021,542 | B2 | 4/2006 | Patel et al. |
| 7,036,735 | B2 | 5/2006 | Hepworth et al. |
| 7,044,377 | B2 | 5/2006 | Patel et al. |
| 7,055,747 | B2 | 6/2006 | Havens et al. |
| 7,059,525 | B2 | 6/2006 | Longacre, Jr. et al. |
| 7,070,099 | B2 | 7/2006 | Patel |
| 7,077,317 | B2 | 7/2006 | Longacre, Jr. et al. |
| 7,077,321 | B2 | 7/2006 | Longacre, Jr. et al. |
| 7,077,327 | B1 | 7/2006 | Knowles et al. |
| 7,080,786 | B2 | 7/2006 | Longacre, Jr. et al. |
| 7,083,098 | B2 | 8/2006 | Joseph et al. |
| 7,086,596 | B2 | 8/2006 | Meier et al. |
| 7,086,597 | B2 | 8/2006 | Good |
| 7,090,135 | B2 | 8/2006 | Patel |
| 7,097,101 | B2 | 8/2006 | Kogan et al. |
| 7,097,102 | B2 | 8/2006 | Patel et al. |
| 7,100,832 | B2 | 9/2006 | Good |
| 7,137,555 | B2 | 11/2006 | Bremer et al. |
| 7,148,923 | B2 | 12/2006 | Harper et al. |
| 7,191,947 | B2 | 3/2007 | Kahn et al. |
| 7,195,164 | B2 | 3/2007 | Patel |
| 7,198,195 | B2 | 4/2007 | Bobba et al. |
| 7,219,843 | B2 | 5/2007 | Havens et al. |
| 7,222,793 | B2 | 5/2007 | Patel |
| 7,261,238 | B1 | 8/2007 | Carlson et al. |
| 7,296,748 | B2 | 11/2007 | Good |
| 7,296,751 | B2 | 11/2007 | Barber et al. |
| 7,303,126 | B2 | 12/2007 | Patel et al. |
| 7,303,131 | B2 | 12/2007 | Carlson et al. |
| 7,419,098 | B2 | 9/2008 | Hyde et al. |
| 7,420,153 | B2 | 9/2008 | Palmer et al. |
| 2002/0008968 | A1 | 1/2002 | Hennick et al. |
| 2002/0096566 | A1 | 7/2002 | Schwartz et al. |
| 2002/0150309 | A1 | 10/2002 | Hepworth et al. |
| 2002/0170970 | A1 | 11/2002 | Ehrhart |
| 2002/0171745 | A1 | 11/2002 | Ehrhart |
| 2002/0179713 | A1 | 12/2002 | Pettinelli et al. |
| 2002/0191830 | A1 | 12/2002 | Pidhirny |
| 2003/0015662 | A1 | 1/2003 | Yang et al. |
| 2003/0062418 | A1 | 4/2003 | Barber et al. |
| 2003/0062419 | A1 | 4/2003 | Ehrhart et al. |
| 2003/0085282 | A1 | 5/2003 | Parker et al. |
| 2003/0197063 | A1 | 10/2003 | Longacre, Jr. |
| 2003/0209603 | A1 | 11/2003 | Schwartz et al. |
| 2003/0213847 | A1 | 11/2003 | McCall et al. |
| 2003/0218069 | A1 | 11/2003 | Meier et al. |
| 2004/0000592 | A1 | 1/2004 | Schwartz et al. |
| 2004/0004125 | A1 | 1/2004 | Havens et al. |
| 2004/0094627 | A1 | 5/2004 | Parker et al. |
| 2004/0195328 | A1 | 10/2004 | Barber et al. |
| 2006/0180670 | A1 | 8/2006 | Acosta et al. |

OTHER PUBLICATIONS

Powerpoint demonstration of the Code Reader 2.0 (CR2)— All Applications Reader, Code Corporation, www.codecorp.com., Apr. 6, 2004, pp. 1-10.

Press Release entitled "Code Corporation's New Imager Offers Revolutionary Performance and Bluetooth Radio", by Benjamin M. Miller, Codex Corporation, 11814 South Election Road, Suite 200, Draper UT 84020, Feb. 19, 2003, pp. 1-2.

Product brochure for the 4600r Retail 2D Imager by Handheld Products, www.handheld.com, Apr. 2007, pp. 1-2.

The Customer's Guide to SwiftDecoder™ for Fixed Station Scanners by Omniplanar, Inc., Princeton, New Jersey, Jul. 1, 2008, 282 pages.

Product manual for the CBOSII Programmer's Model Rev 1.0, Omniplanar, Inc., Feb. 25, 1994, 52 pages.

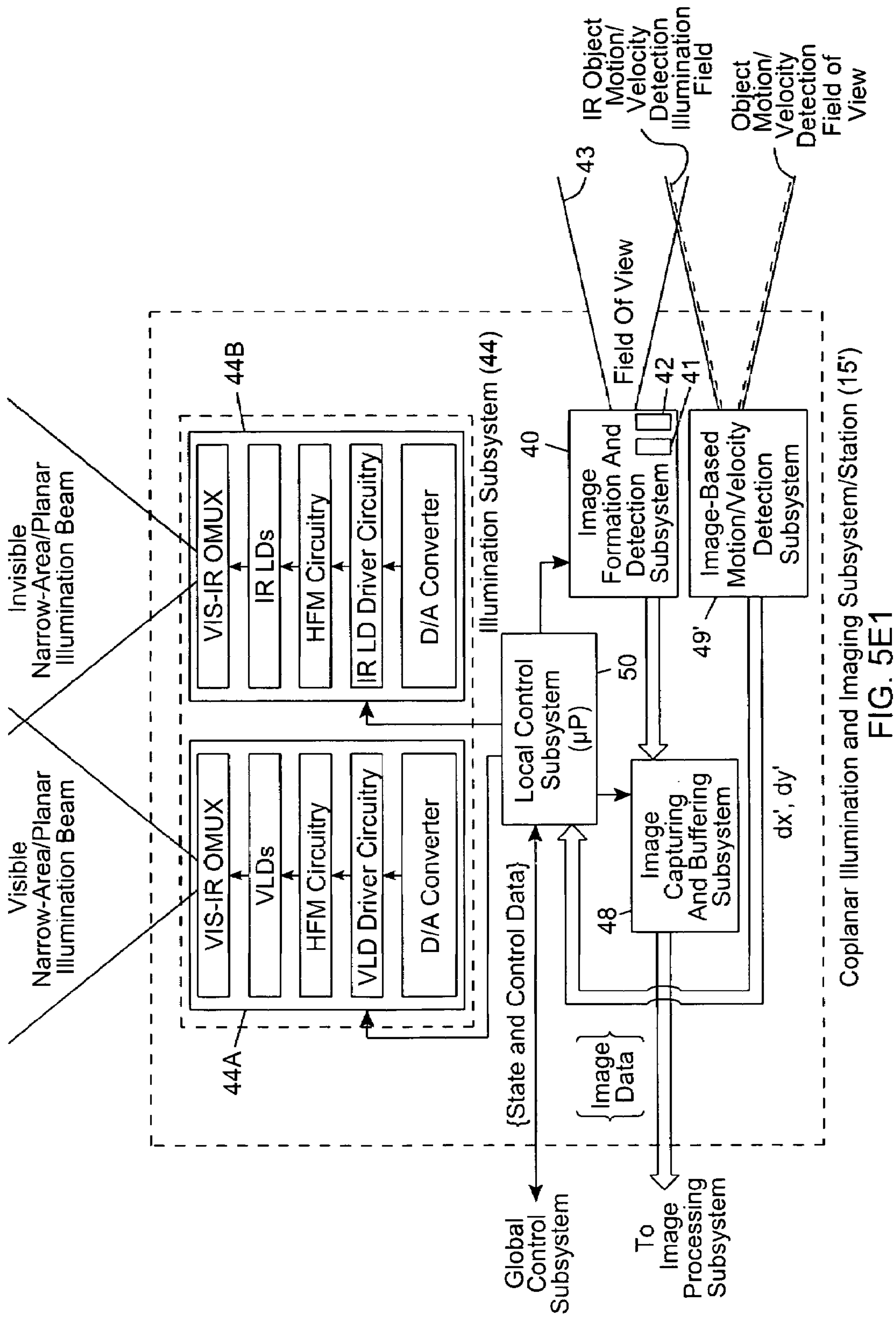
FIG. 5E1

Method of Adaptively Controlling Spectral Components of Illumination Beam
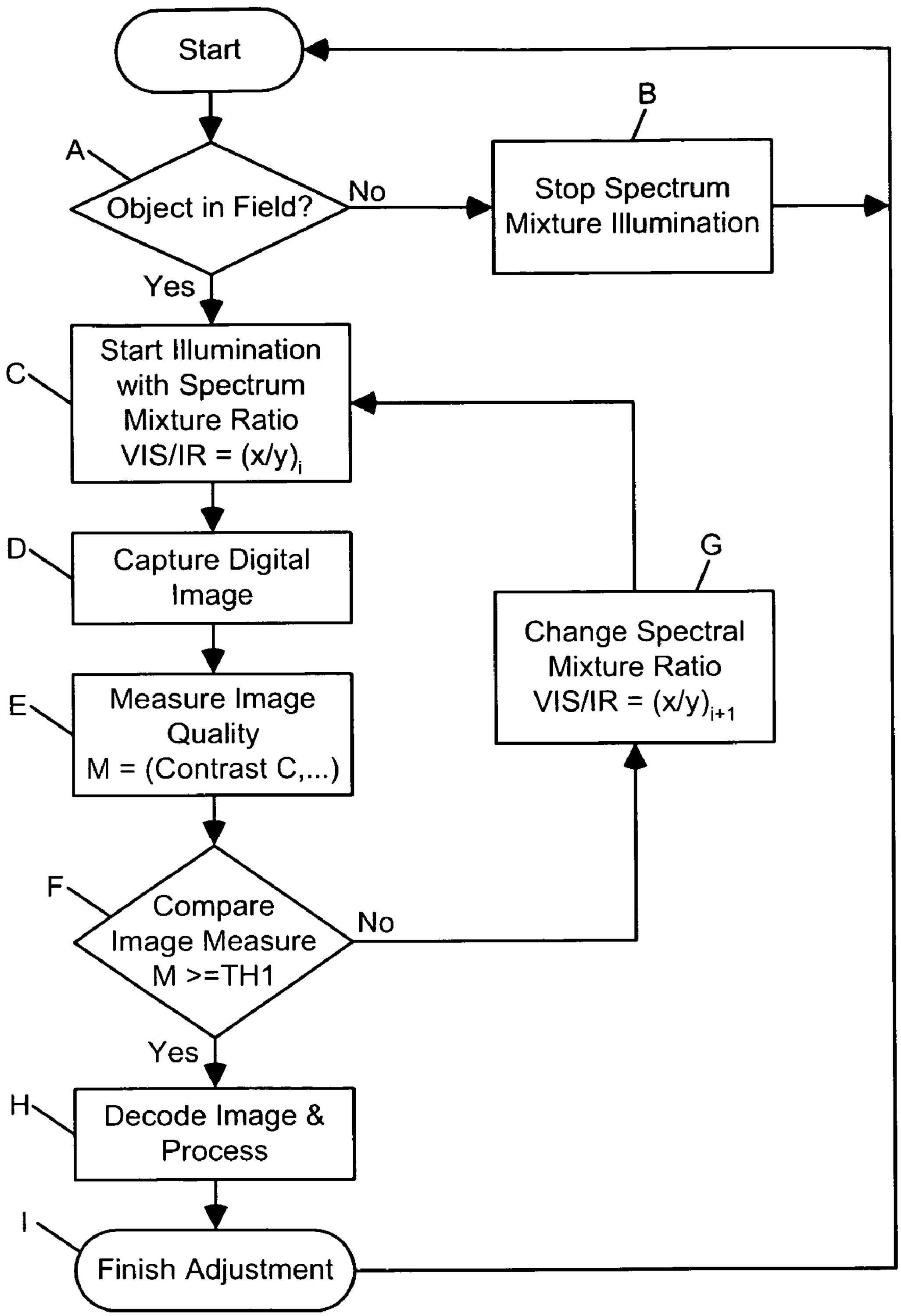
FIG. 5E2

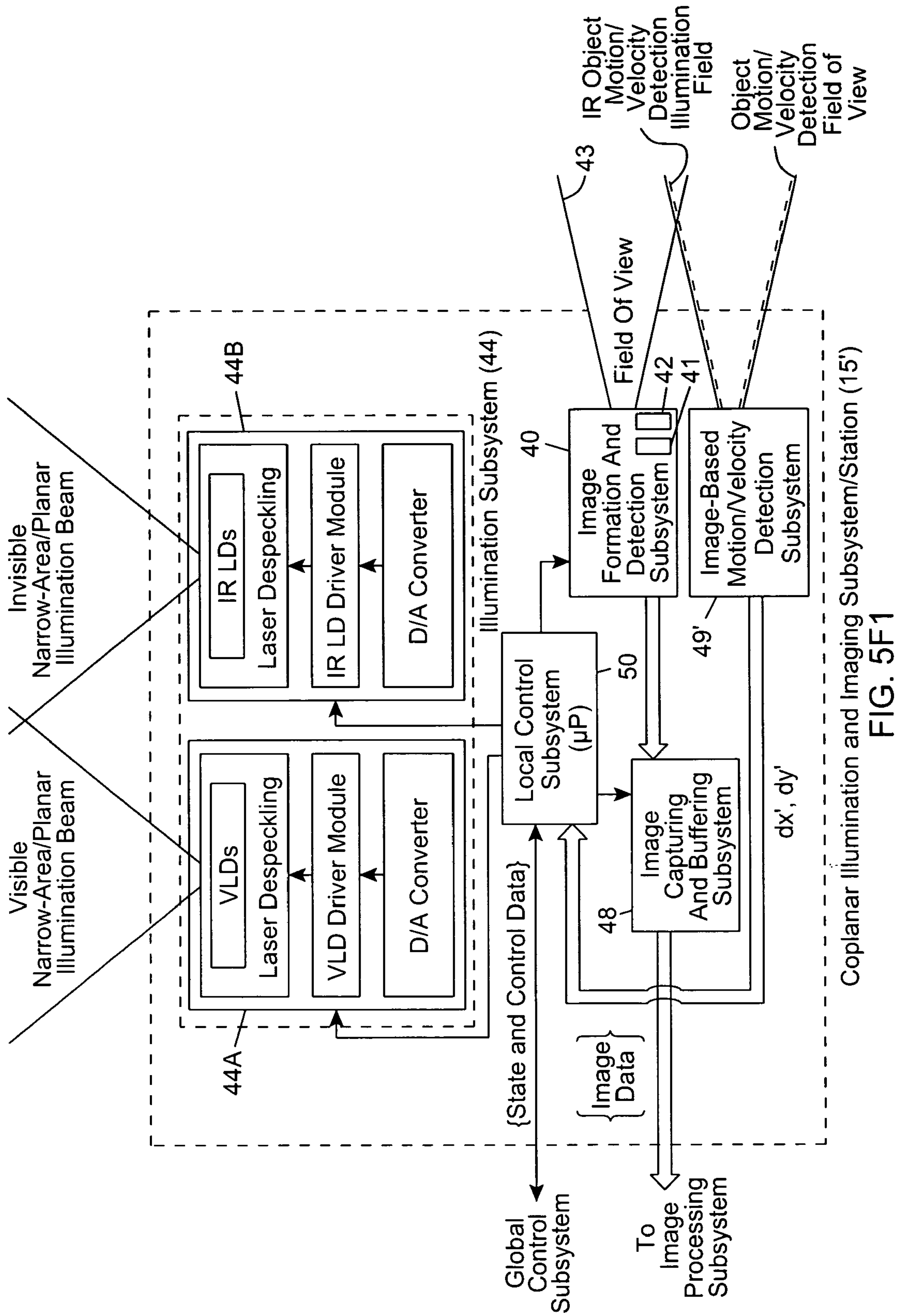
FIG. 5F1

Method of Adaptively Controlling Spectral Components of Illumination Beam
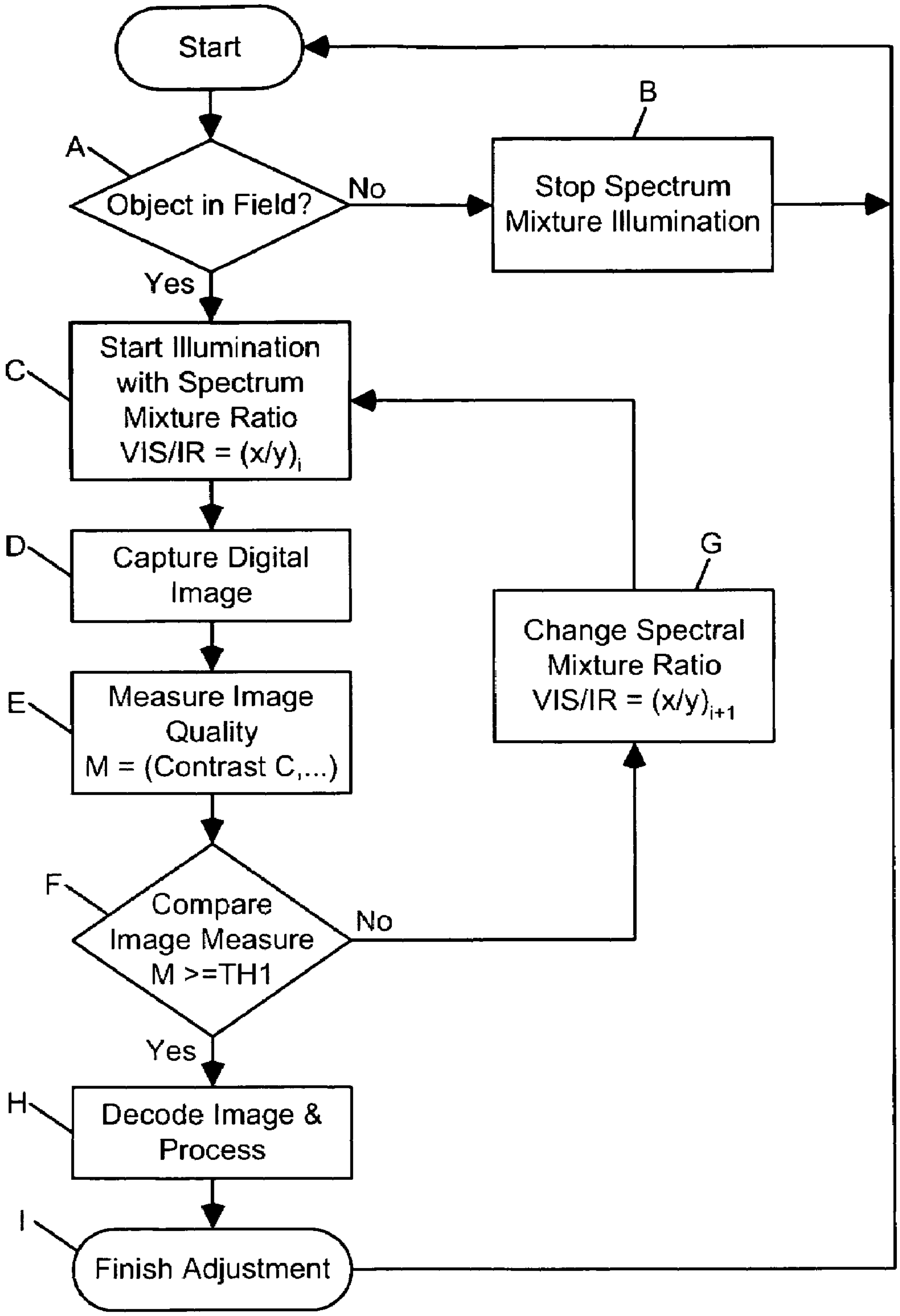
FIG. 5F2

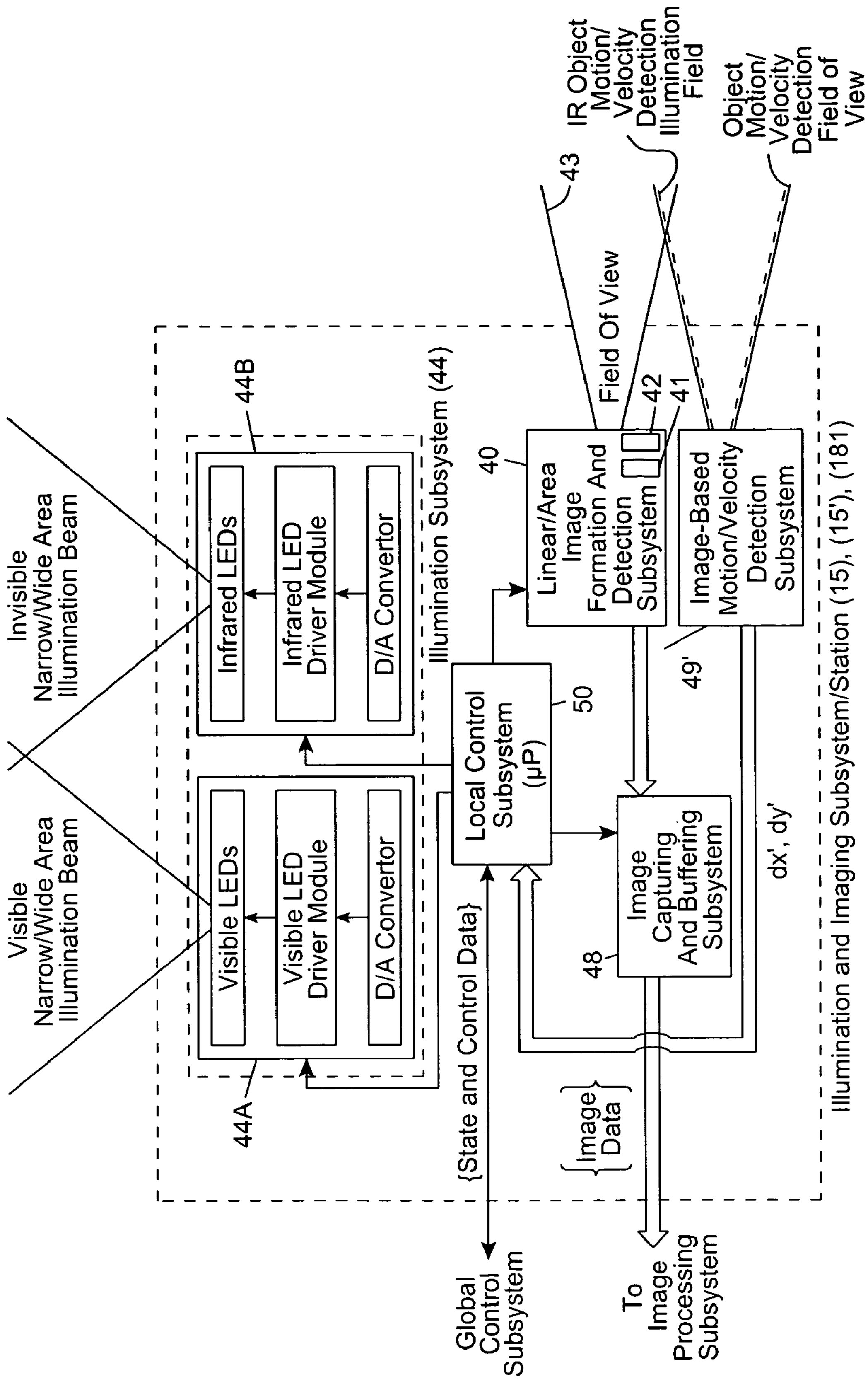
FIG. 5G1

Method of Adaptively Controlling Spectral Components of Illumination Beam
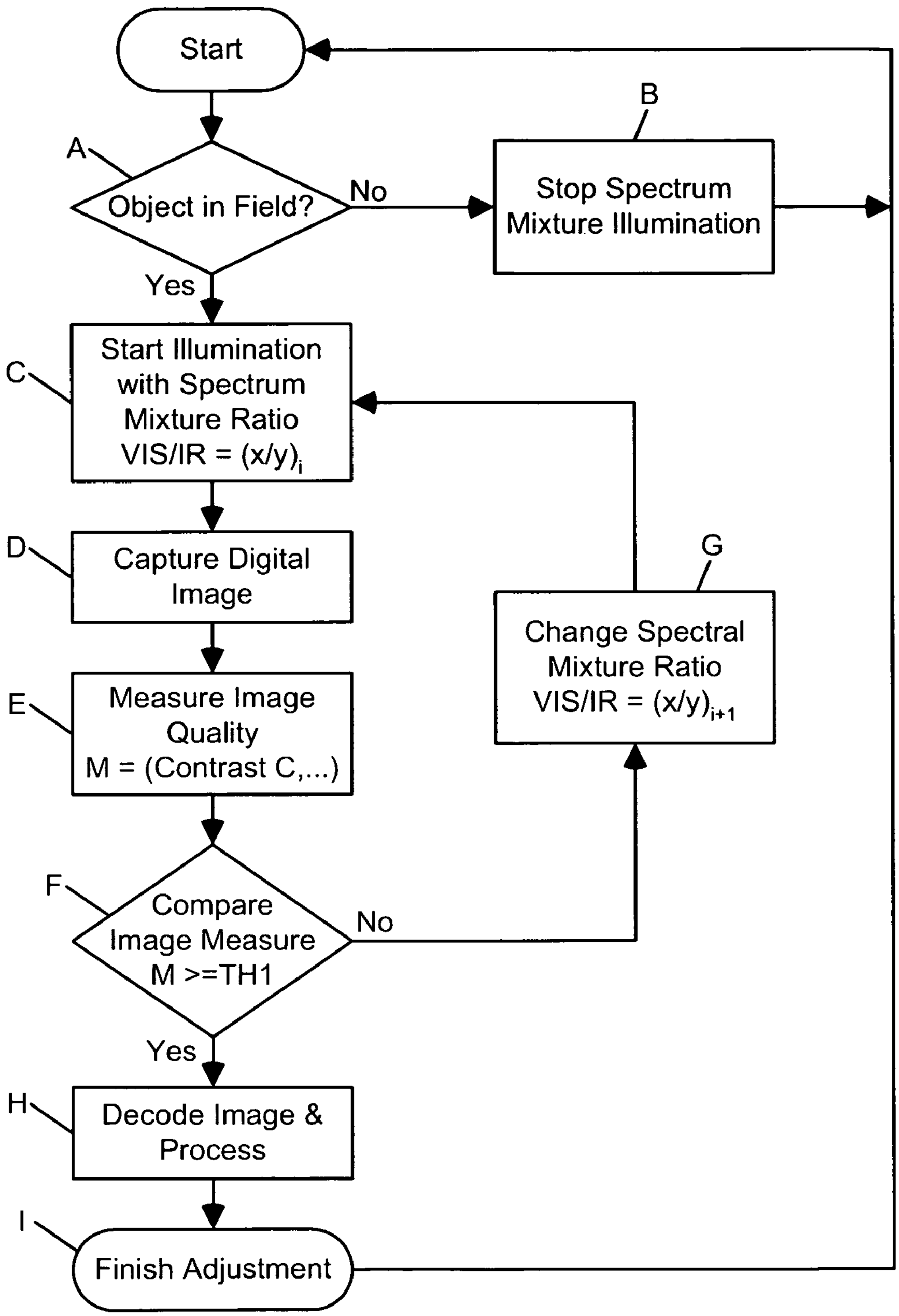
FIG. 5G2

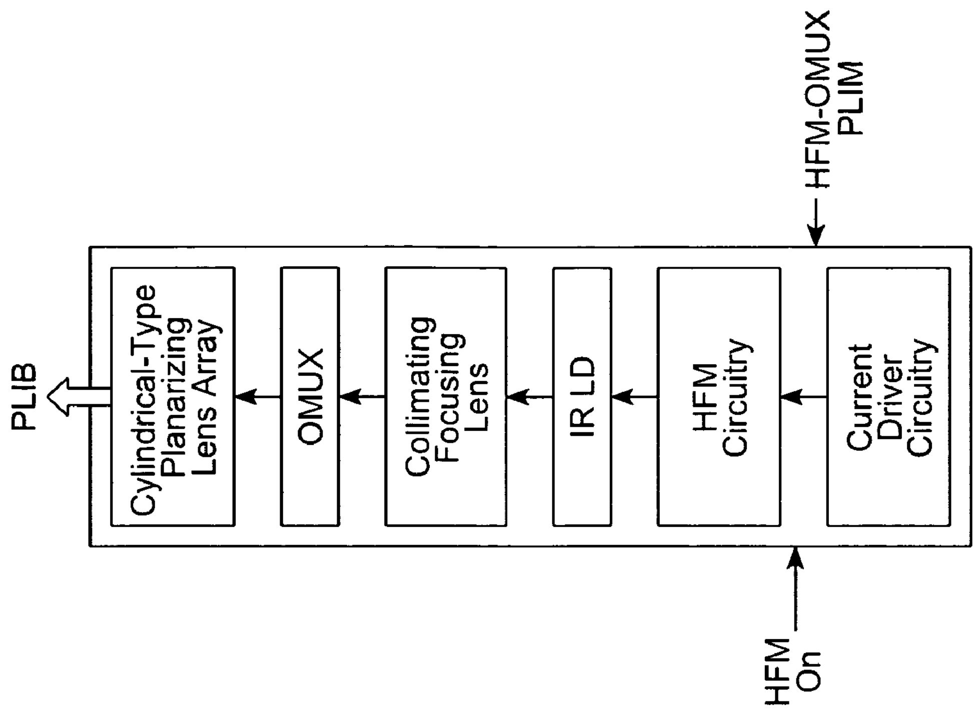
FIG. 5I2
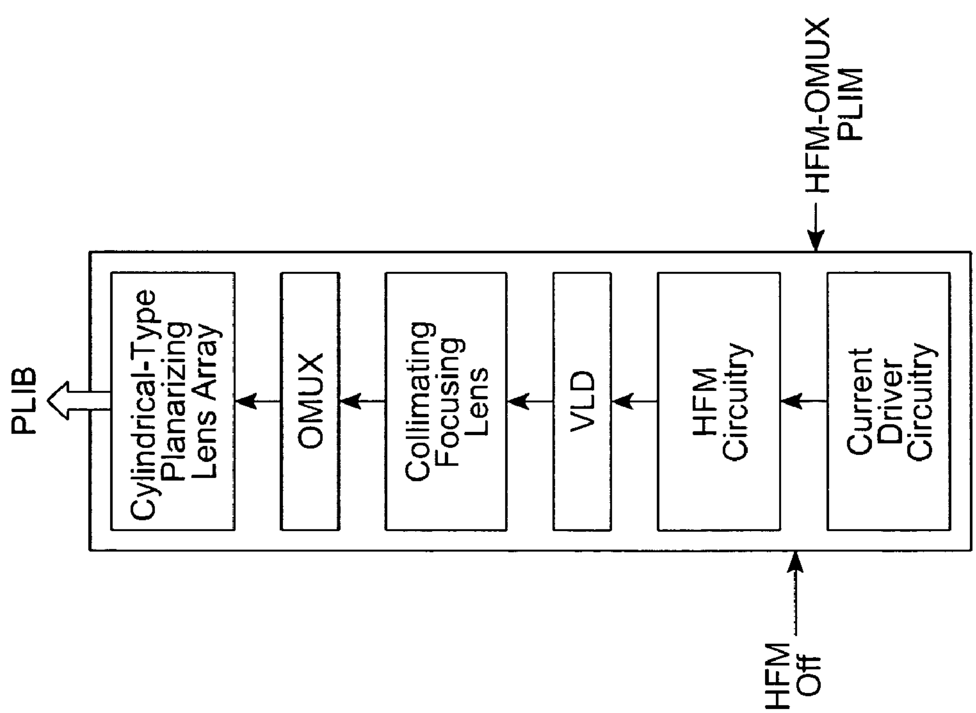
FIG. 5I1

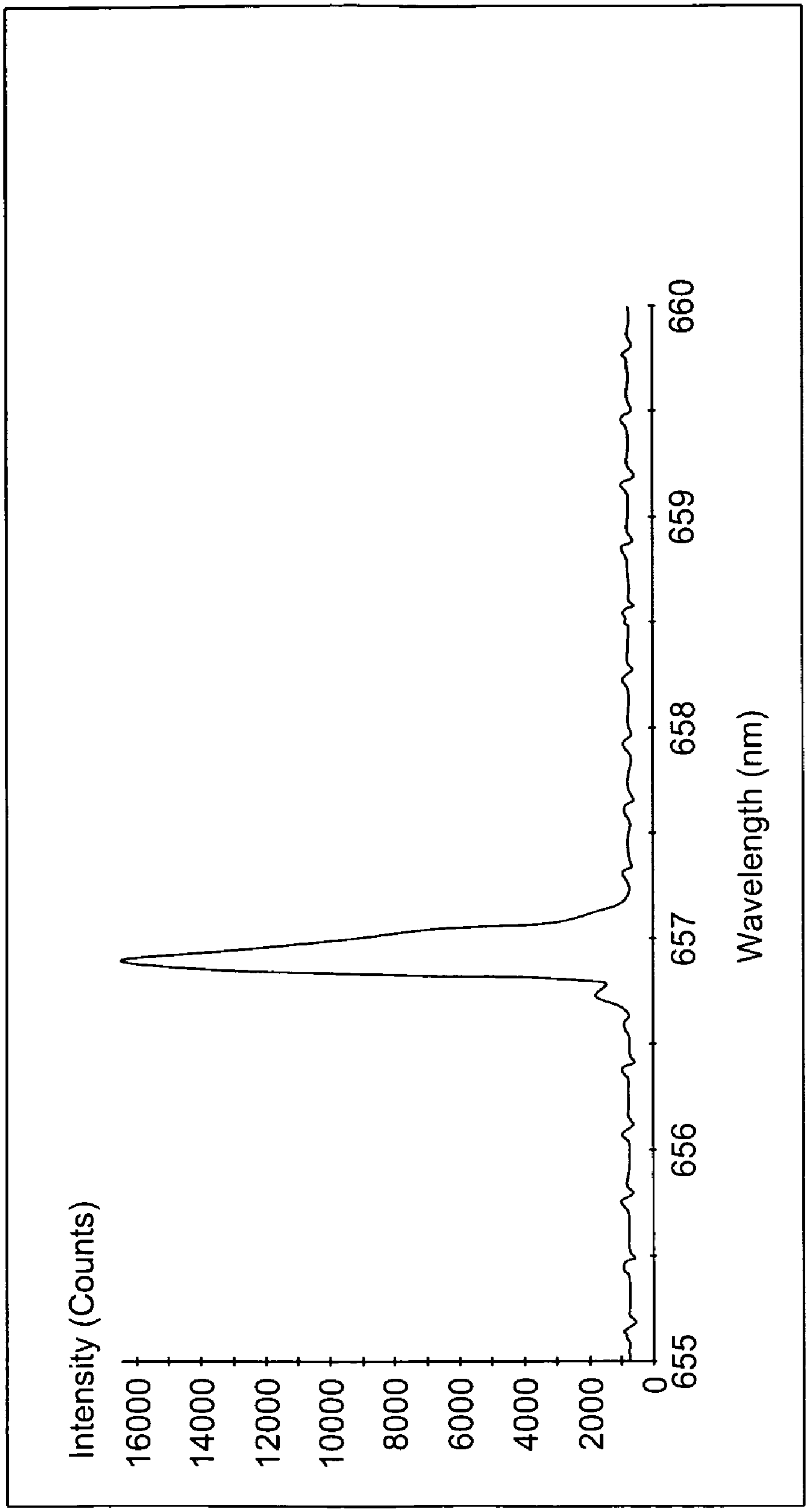
Spectrum emitted from VLD without application of HFM
FIG. 5J1

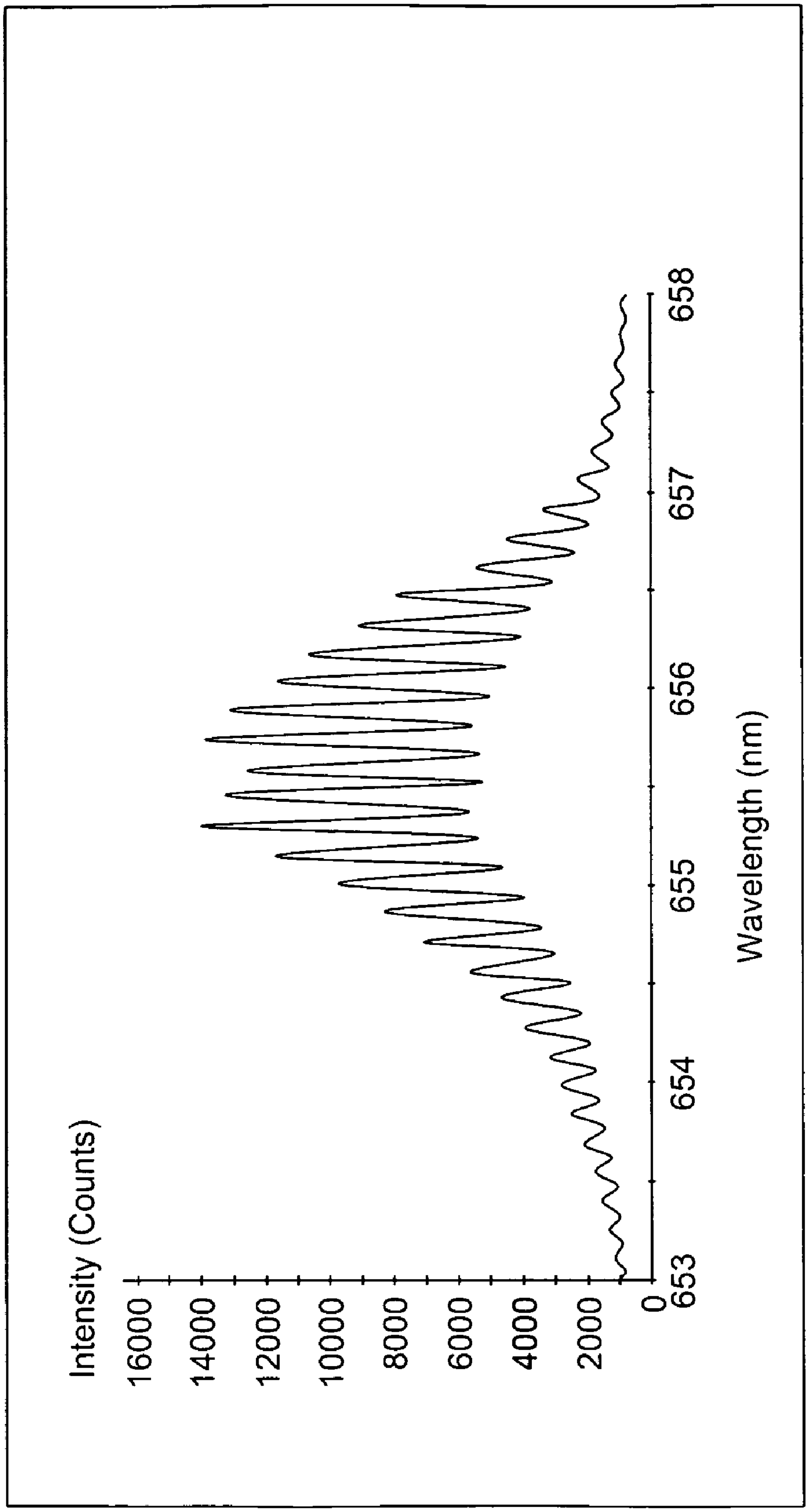
Spectrum emitted from VLD with application of HFM
FIG. 5J2

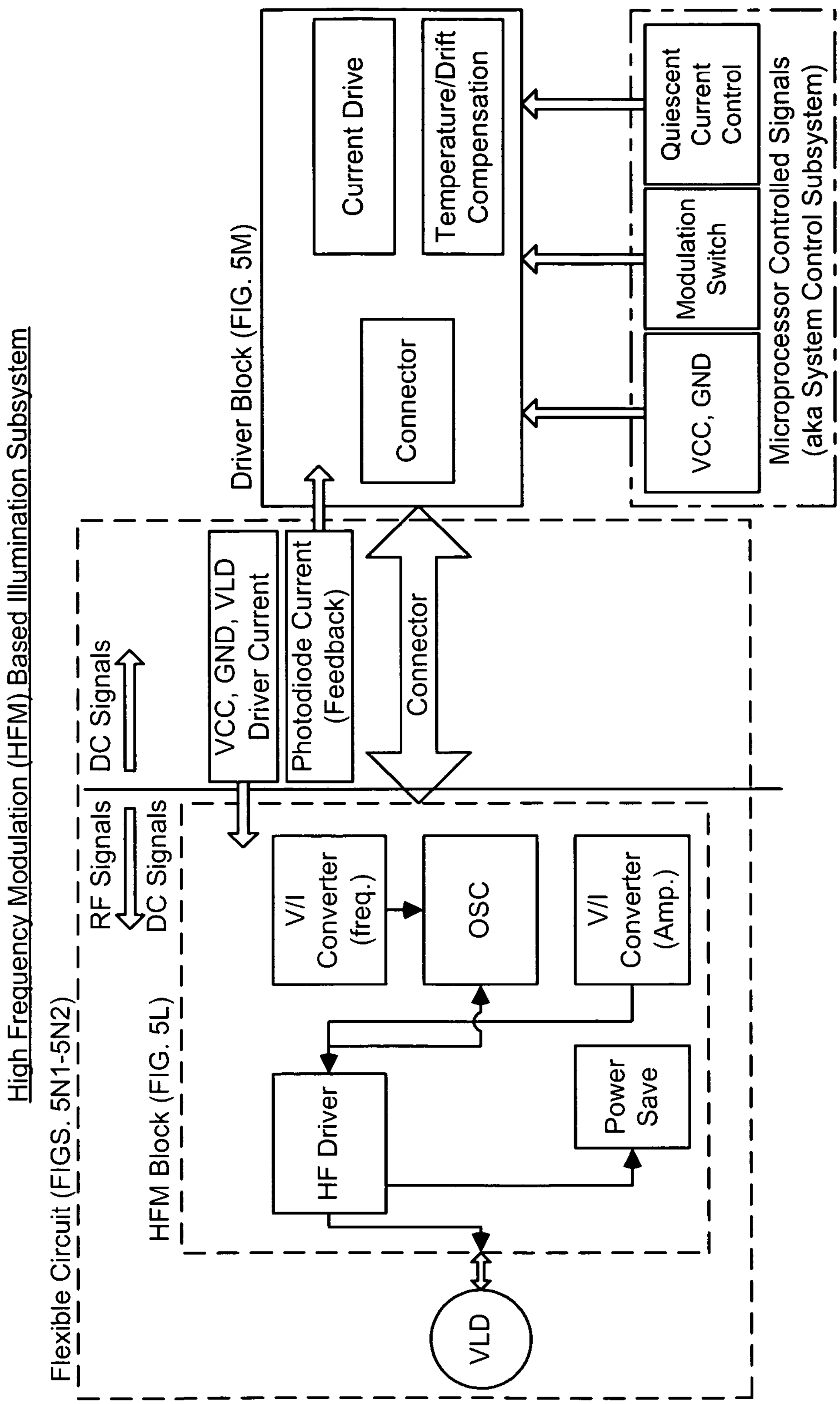
FIG. 5K1

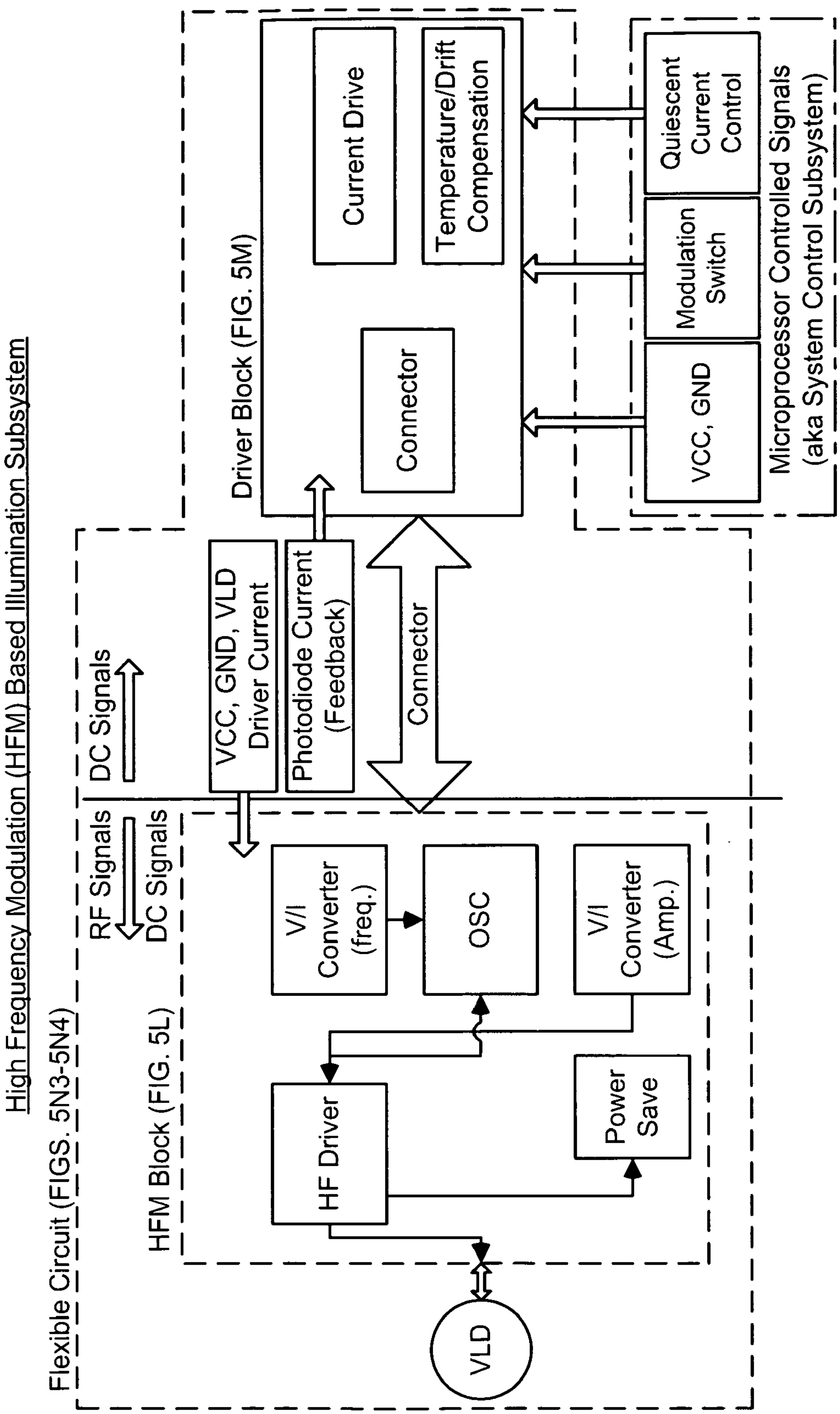
FIG. 5K2

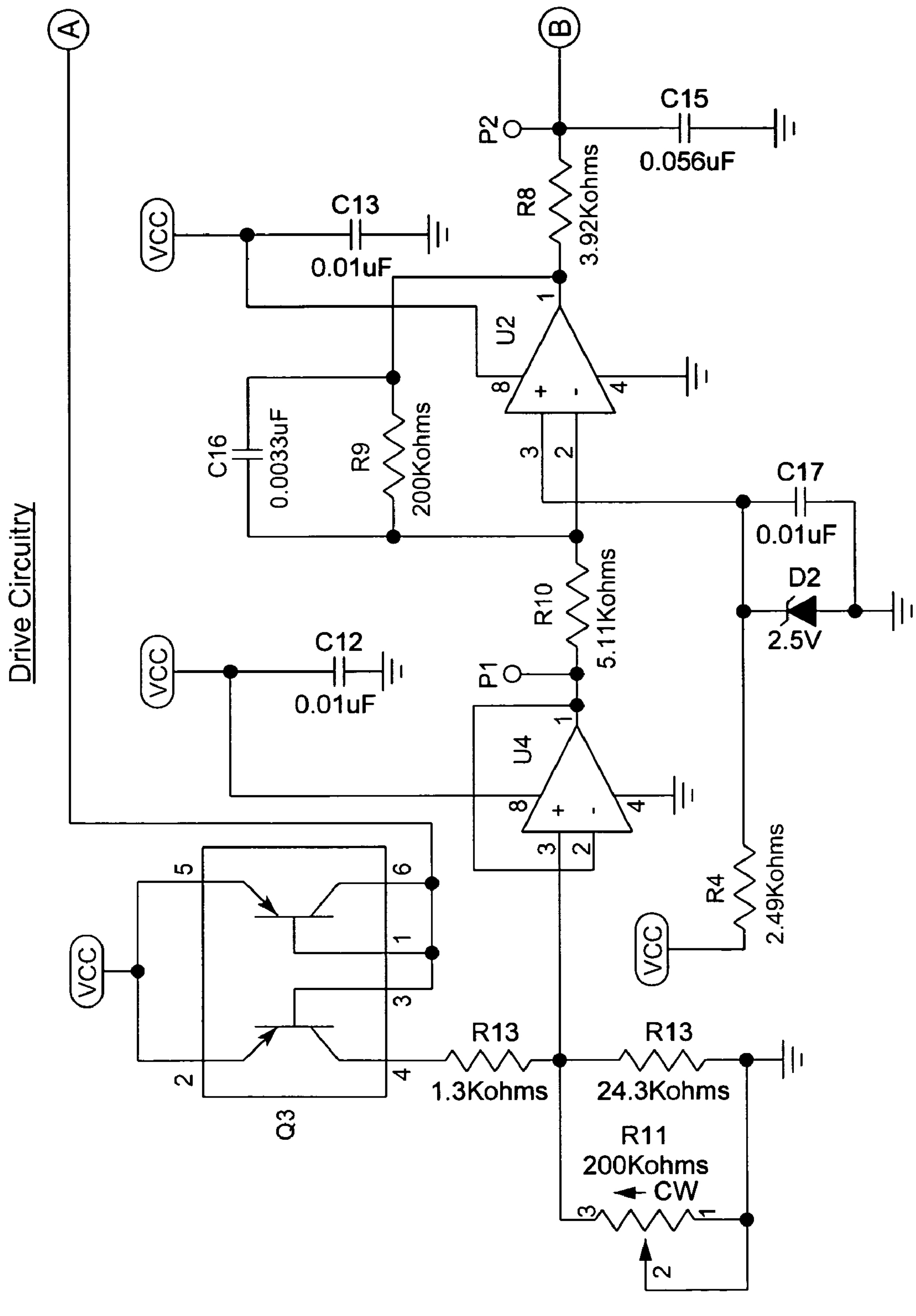
FIG. 5M1

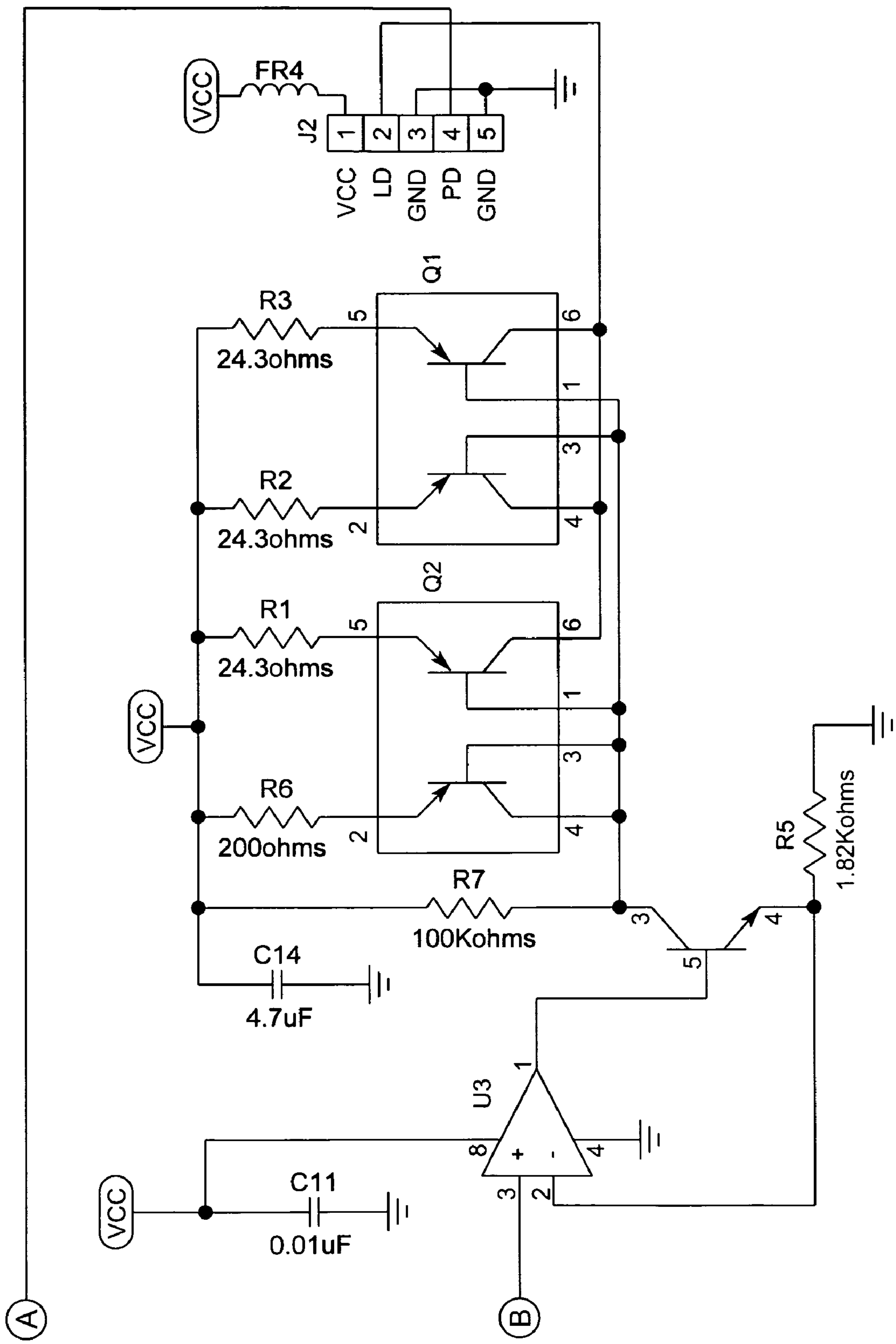
FIG. 5M2

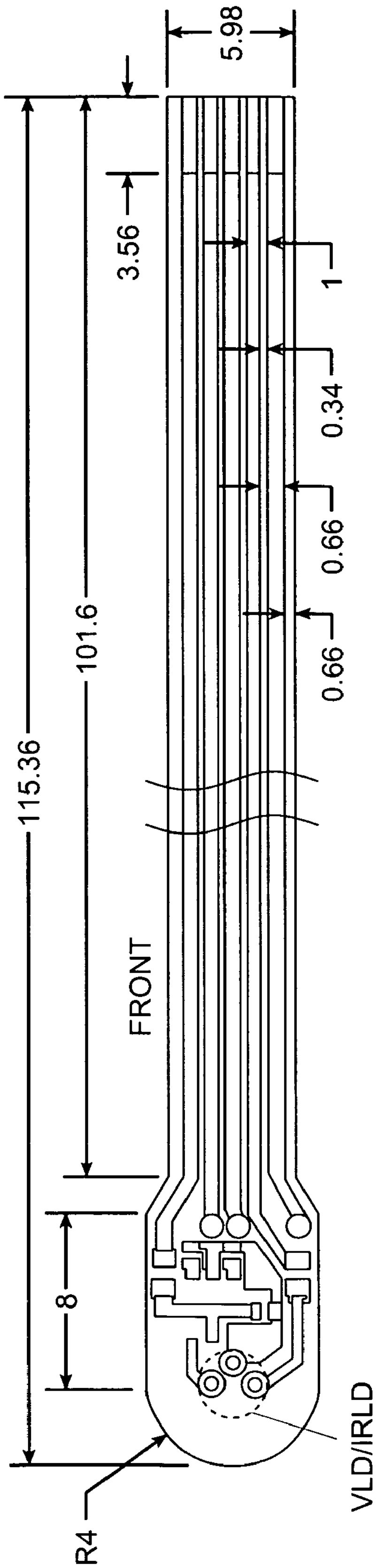
FIG. 5N1
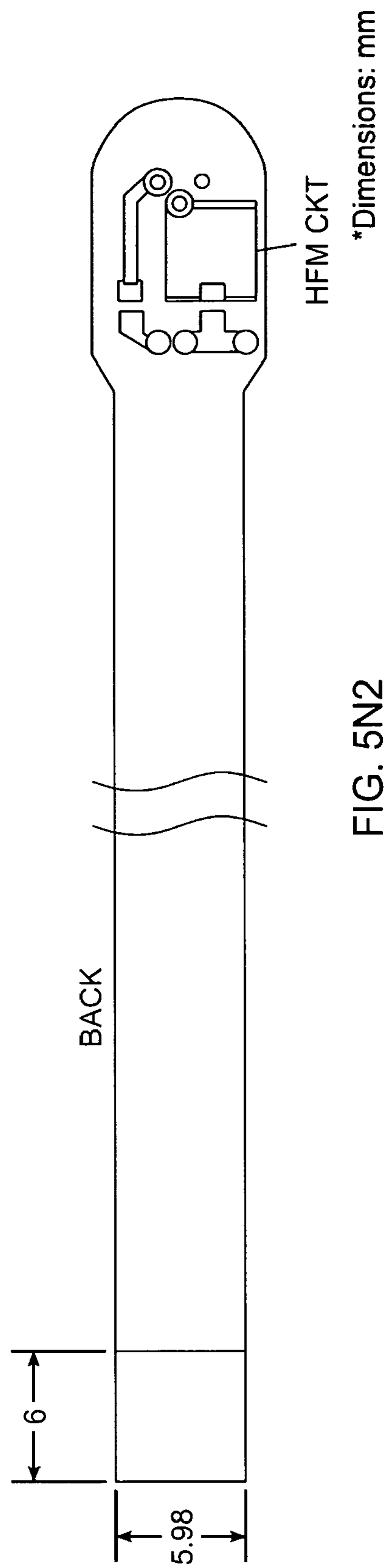
FIG. 5N2

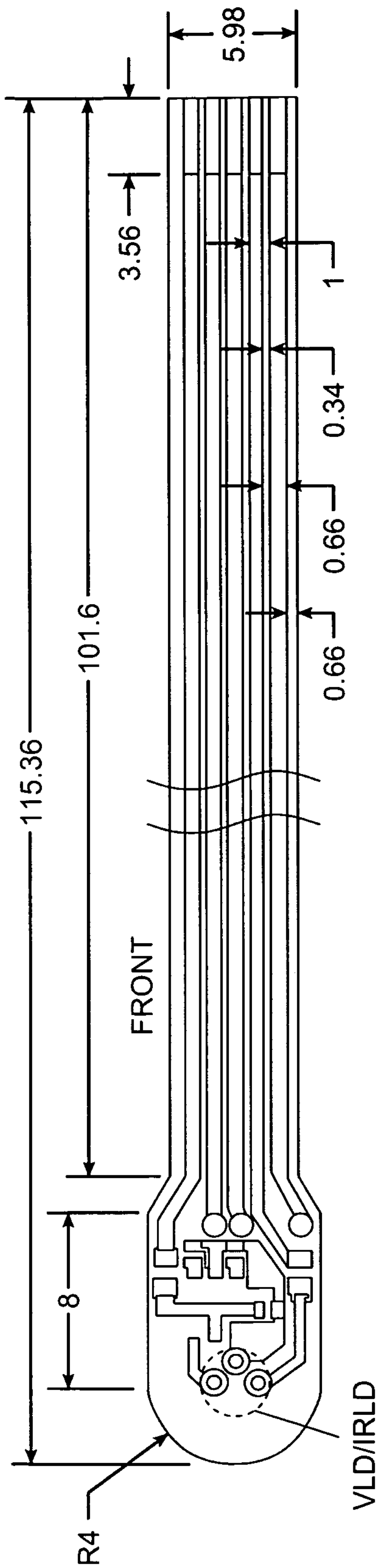
FIG. 5N3
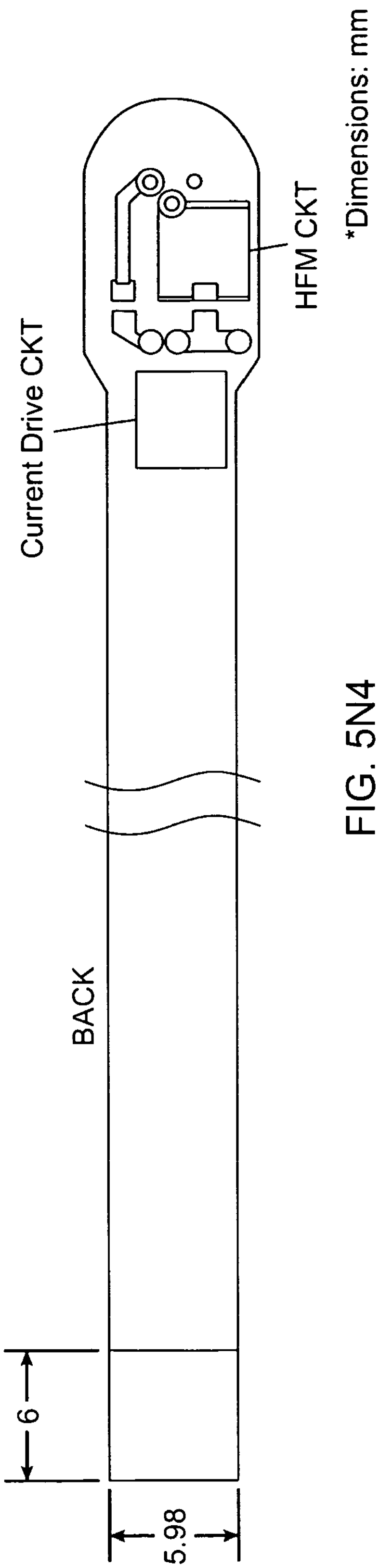
FIG. 5N4

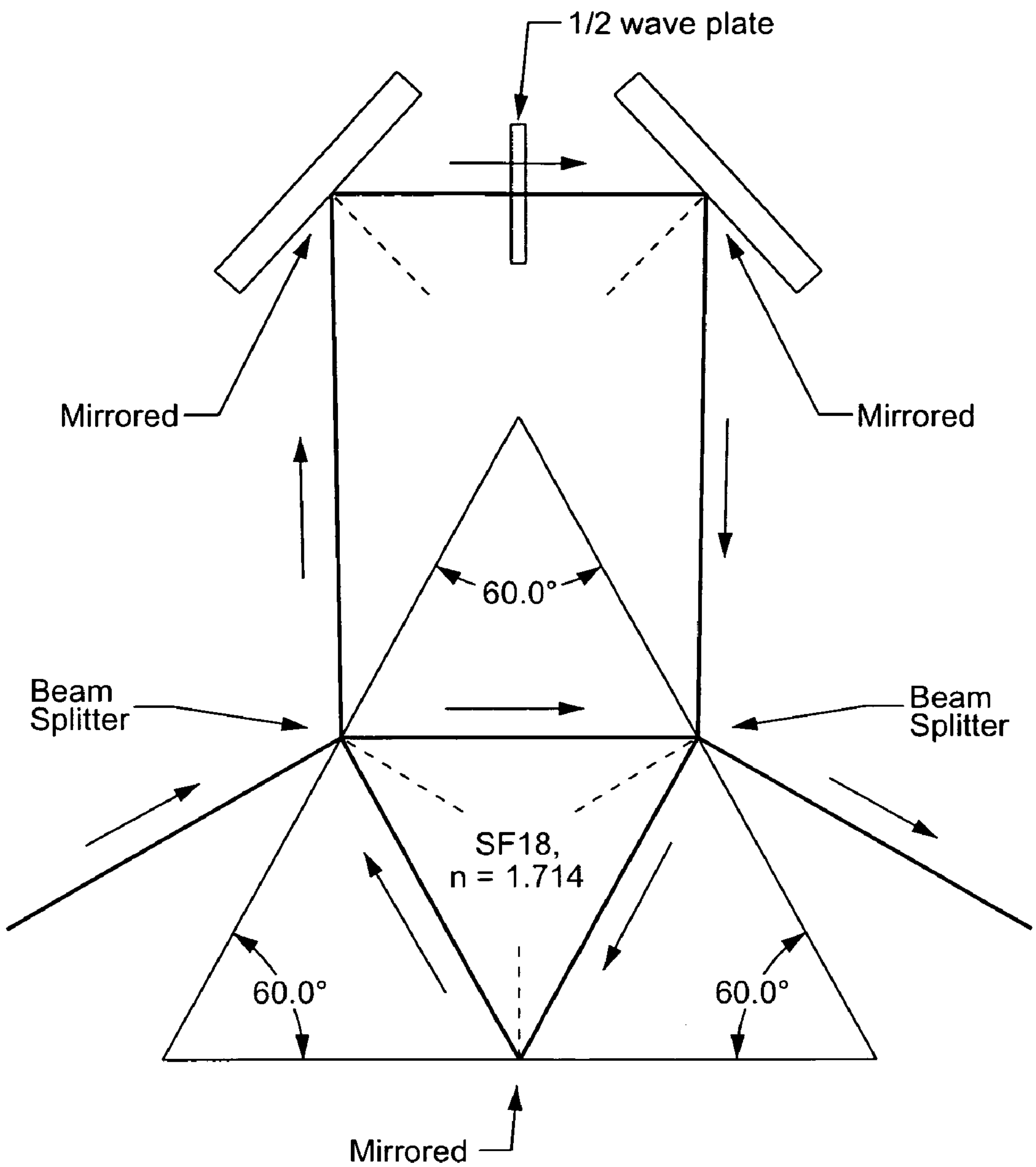
FIG. 5W1

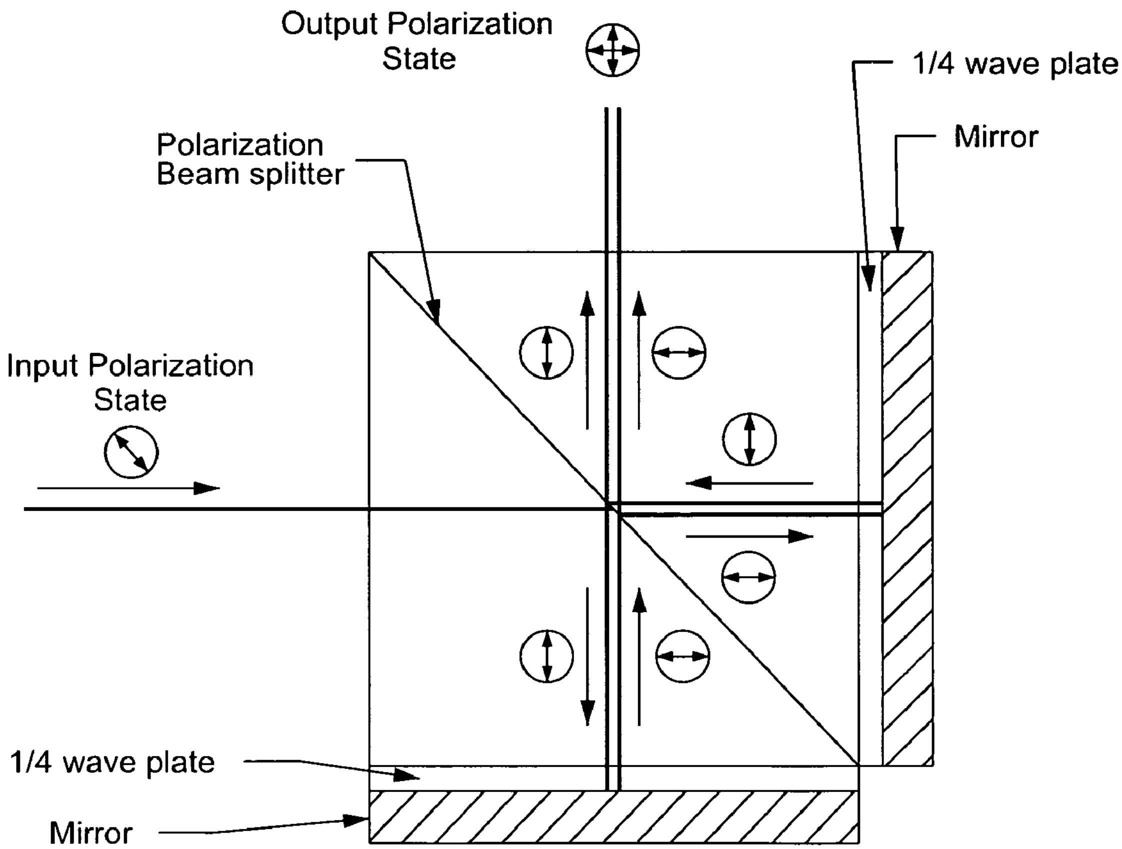
FIG. 5W2

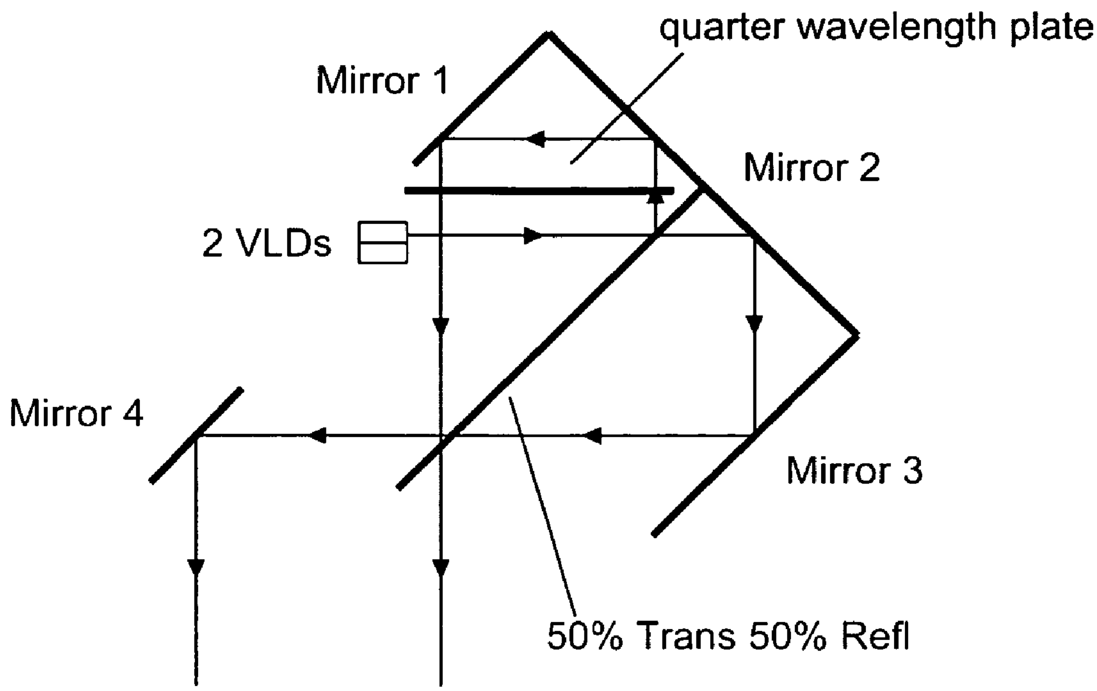
Polarization Implementation V.3
FIG. 5W3

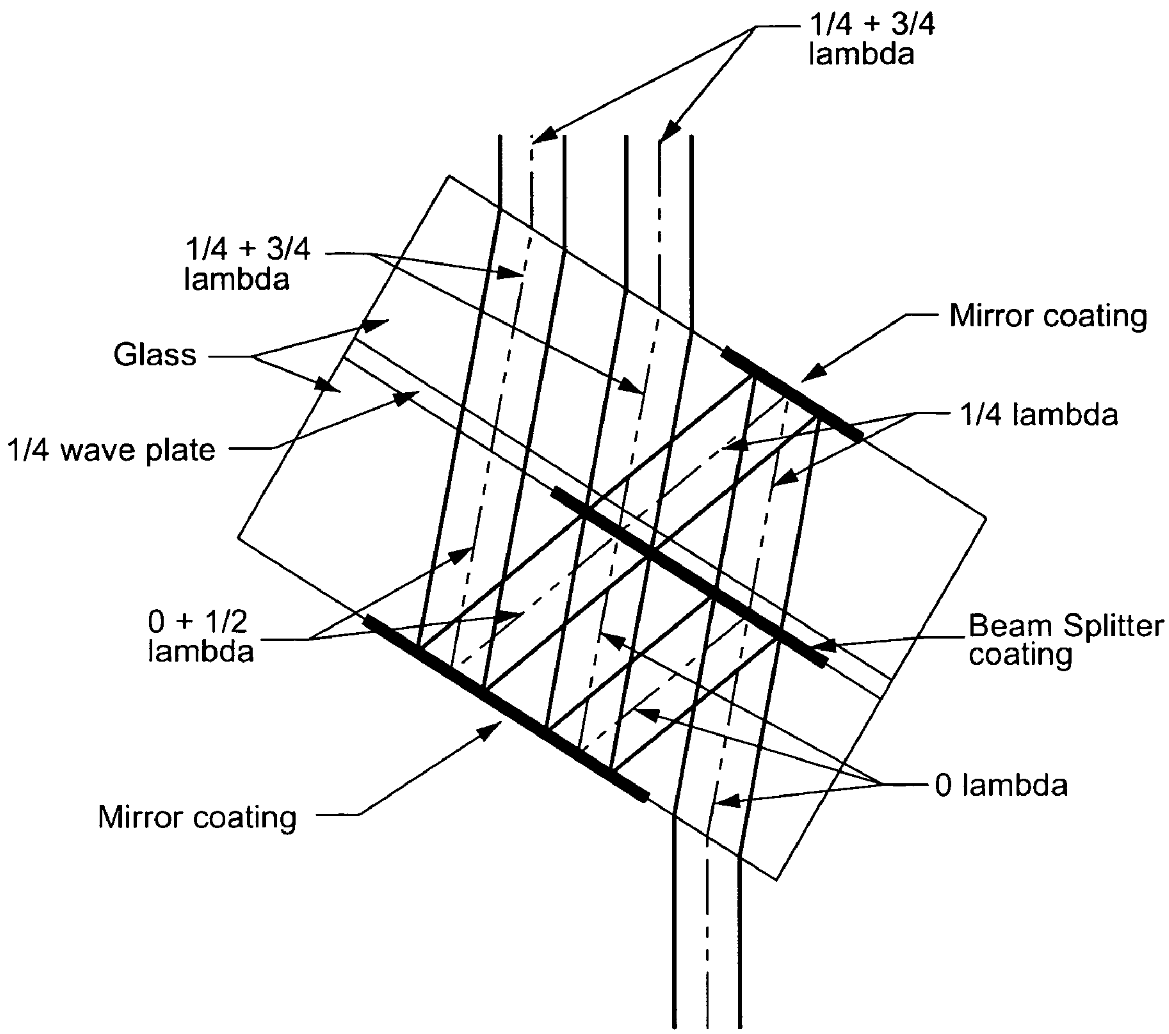
FIG. 5W4

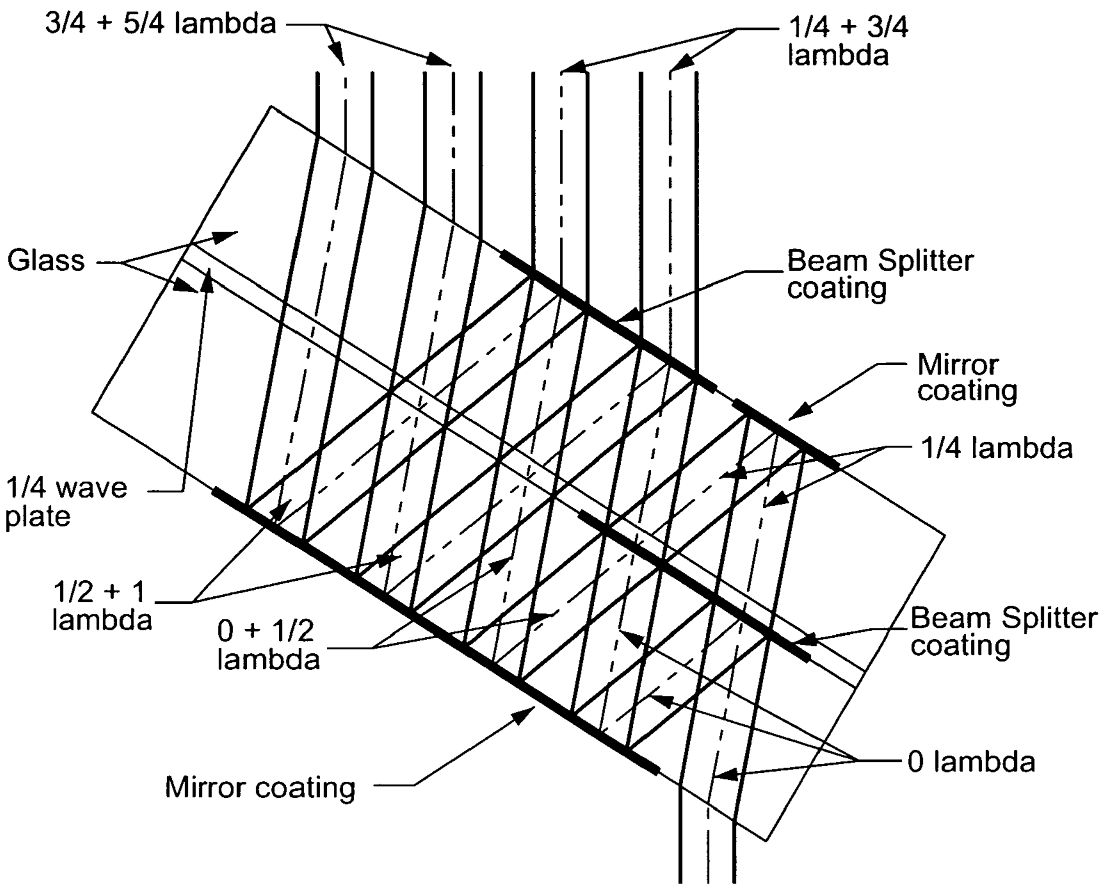
FIG. 5W5

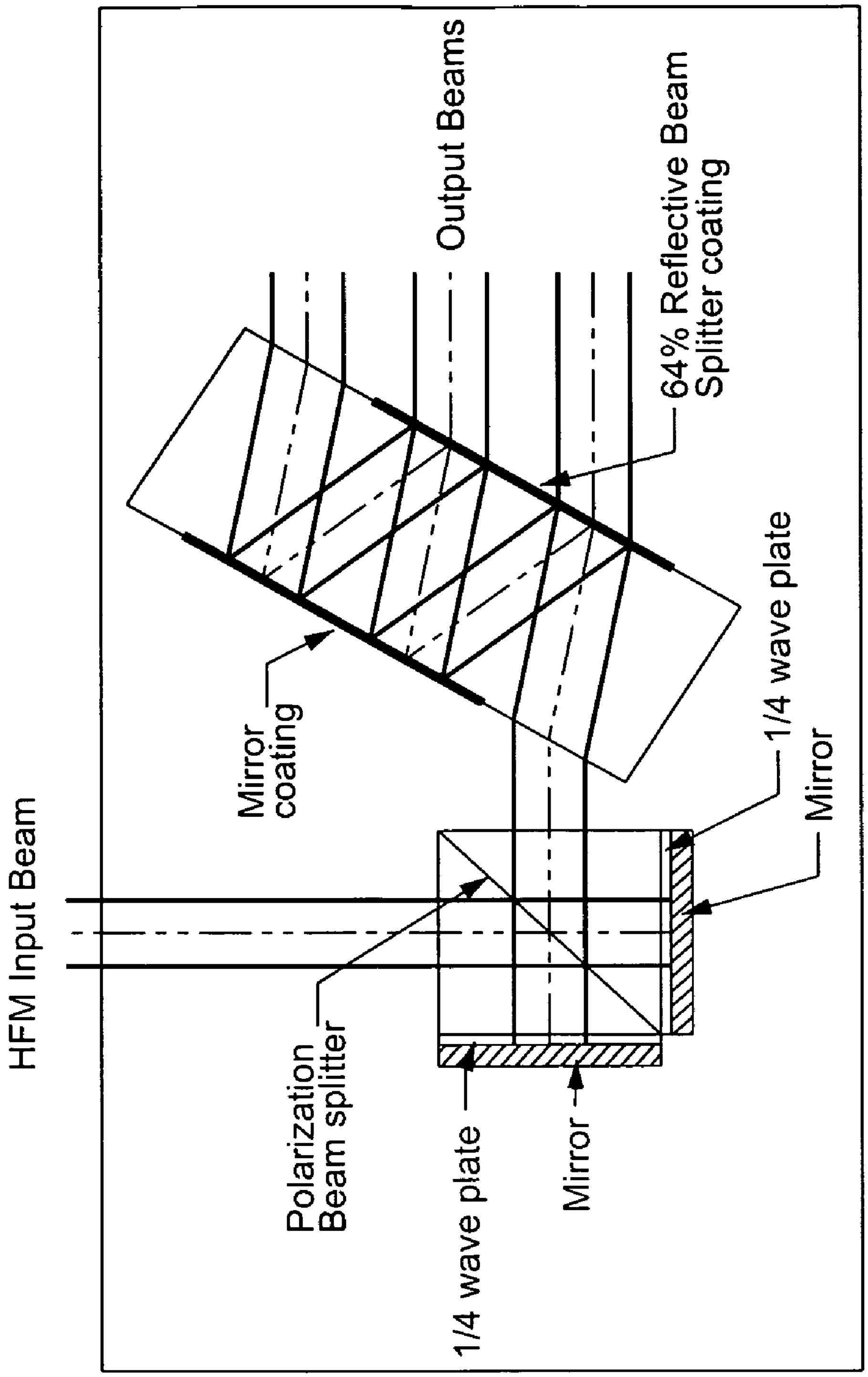
FIG. 5W6

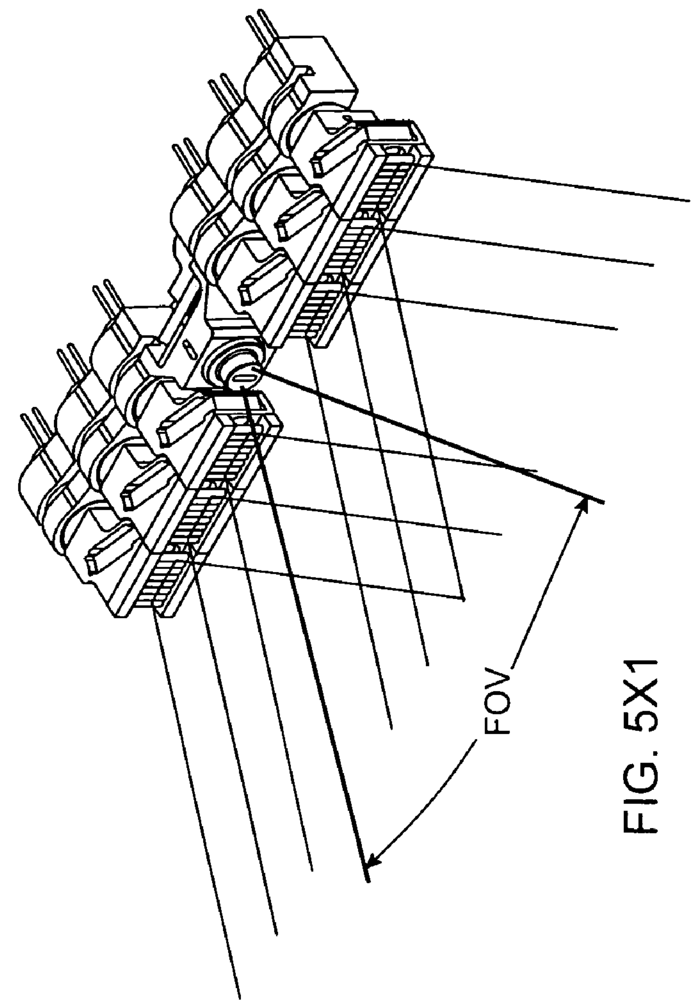
FIG. 5X1
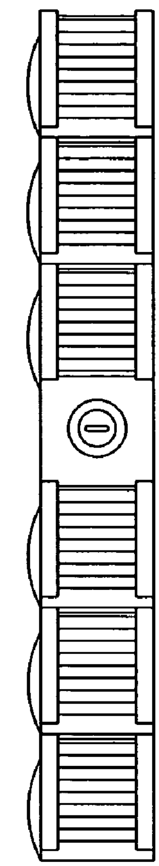
FIG. 5X2

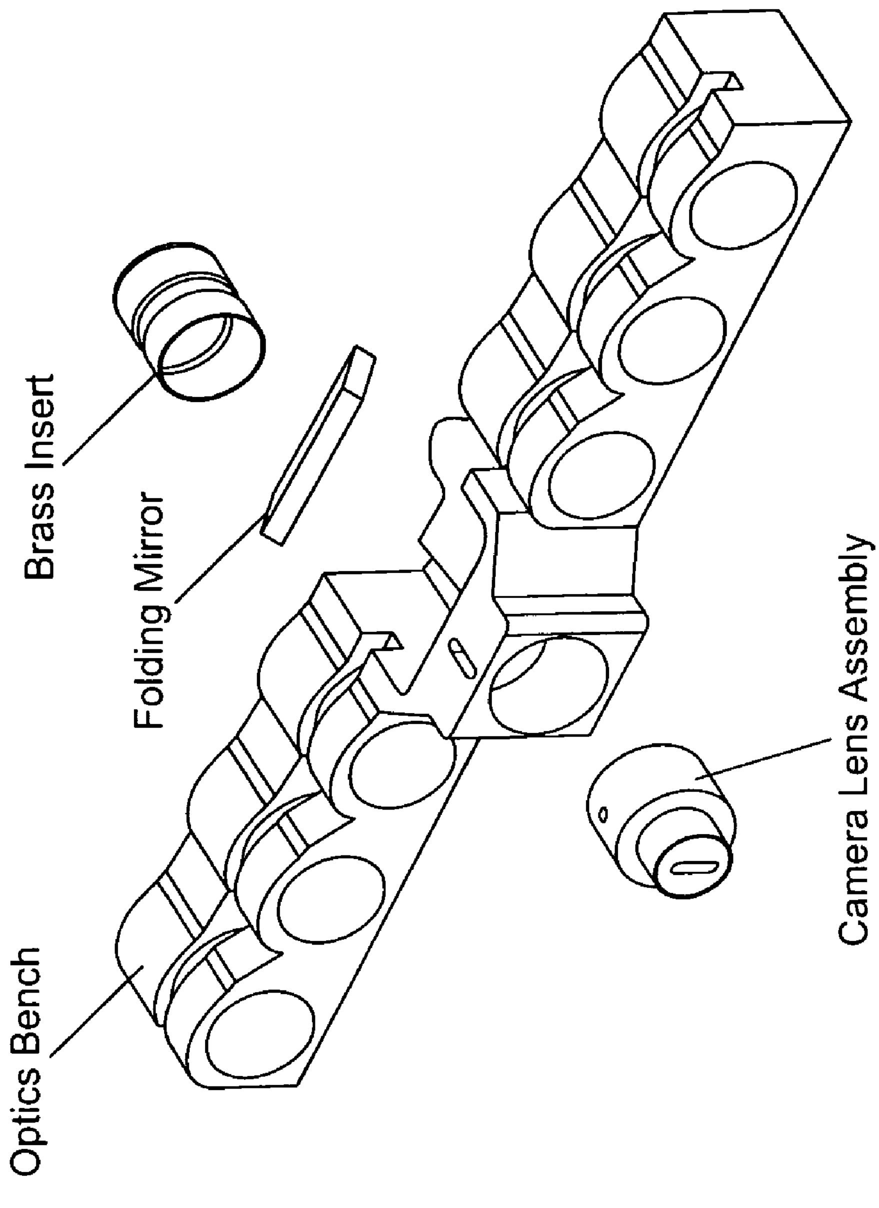
FIG. 5X3

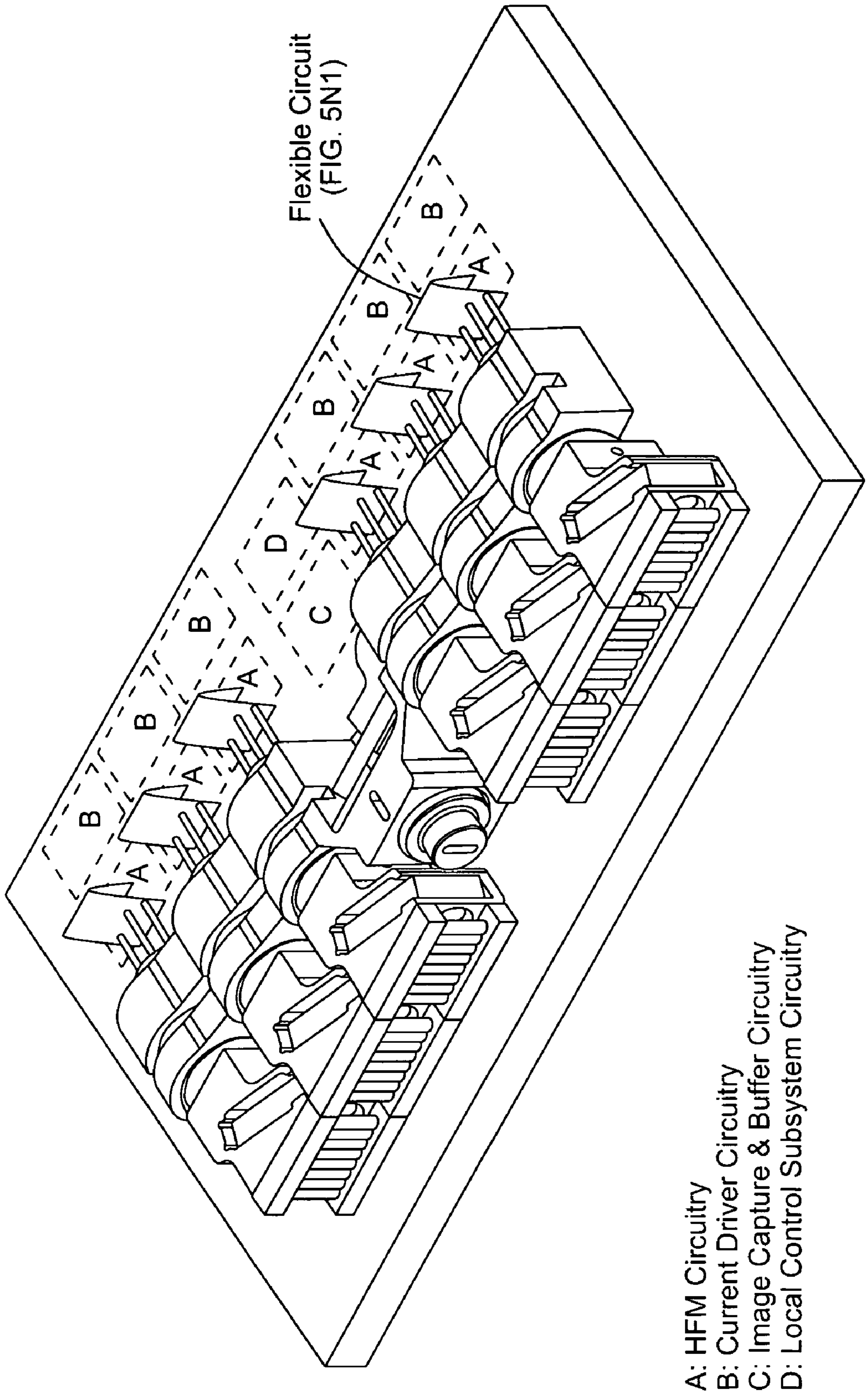
A: HFM Circuitry
B: Current Driver Circuitry
C: Image Capture & Buffer Circuitry
D: Local Control Subsystem Circuitry
FIG. 5X4

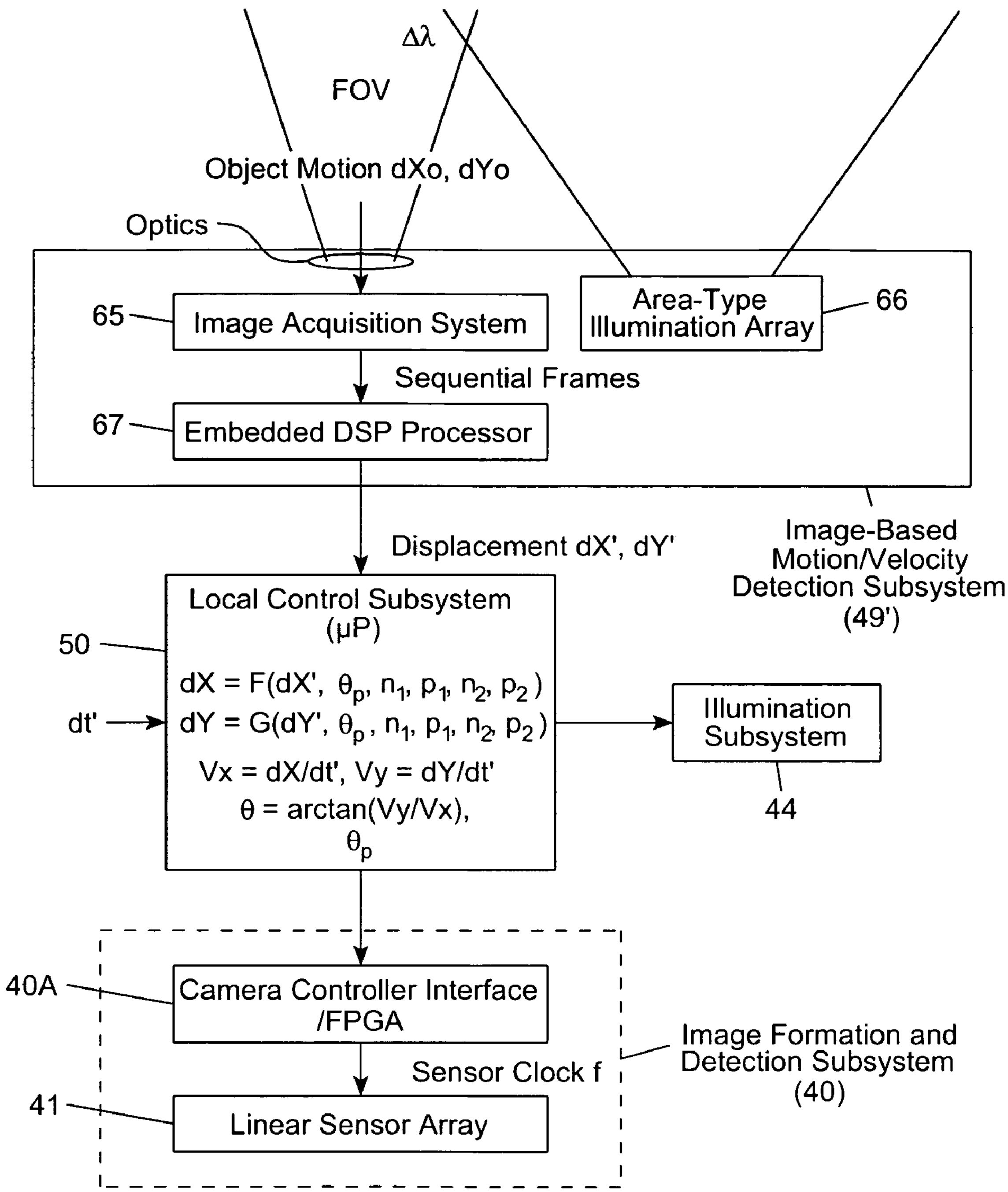
FIG. 6E1

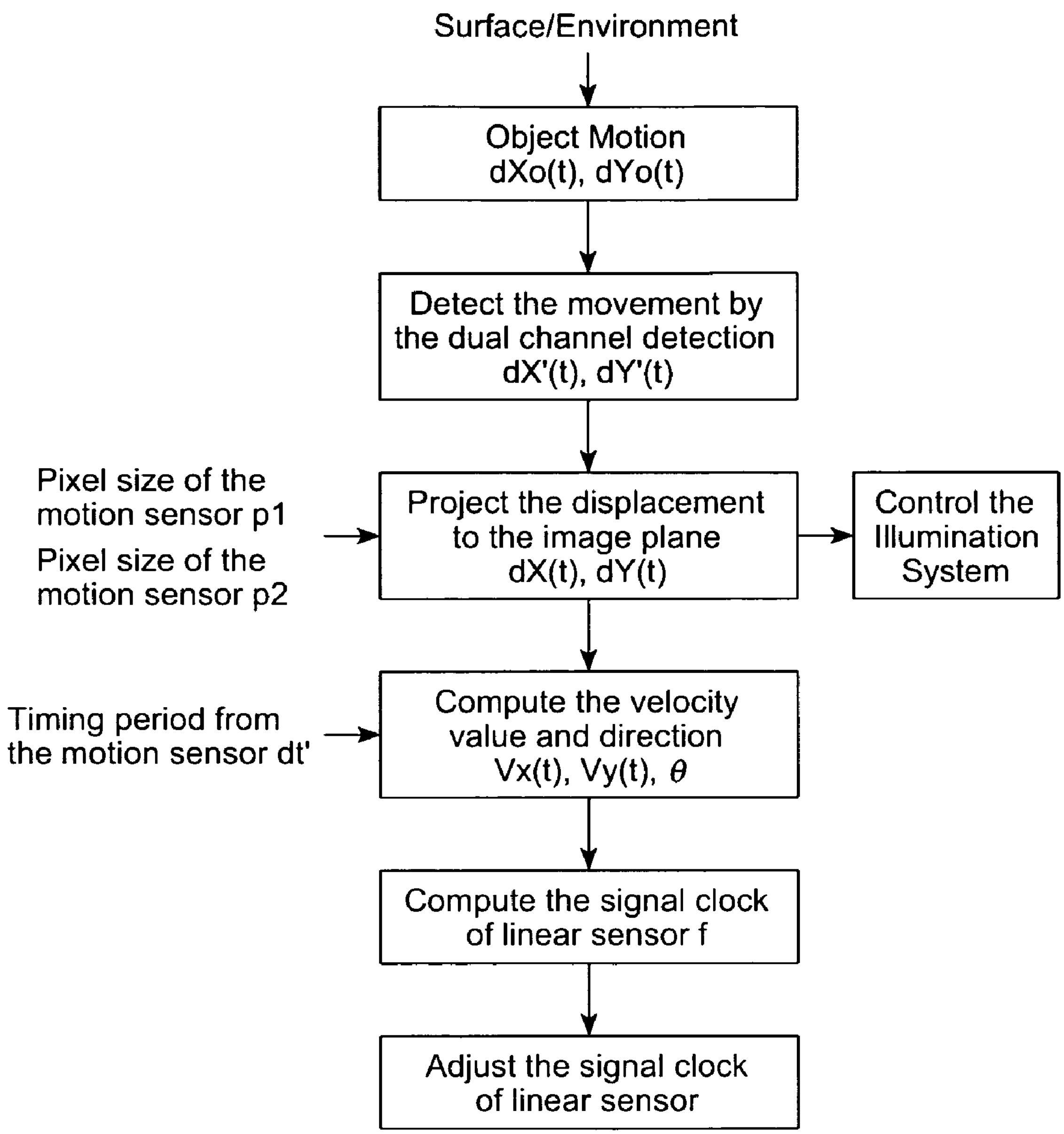
FIG. 6E2

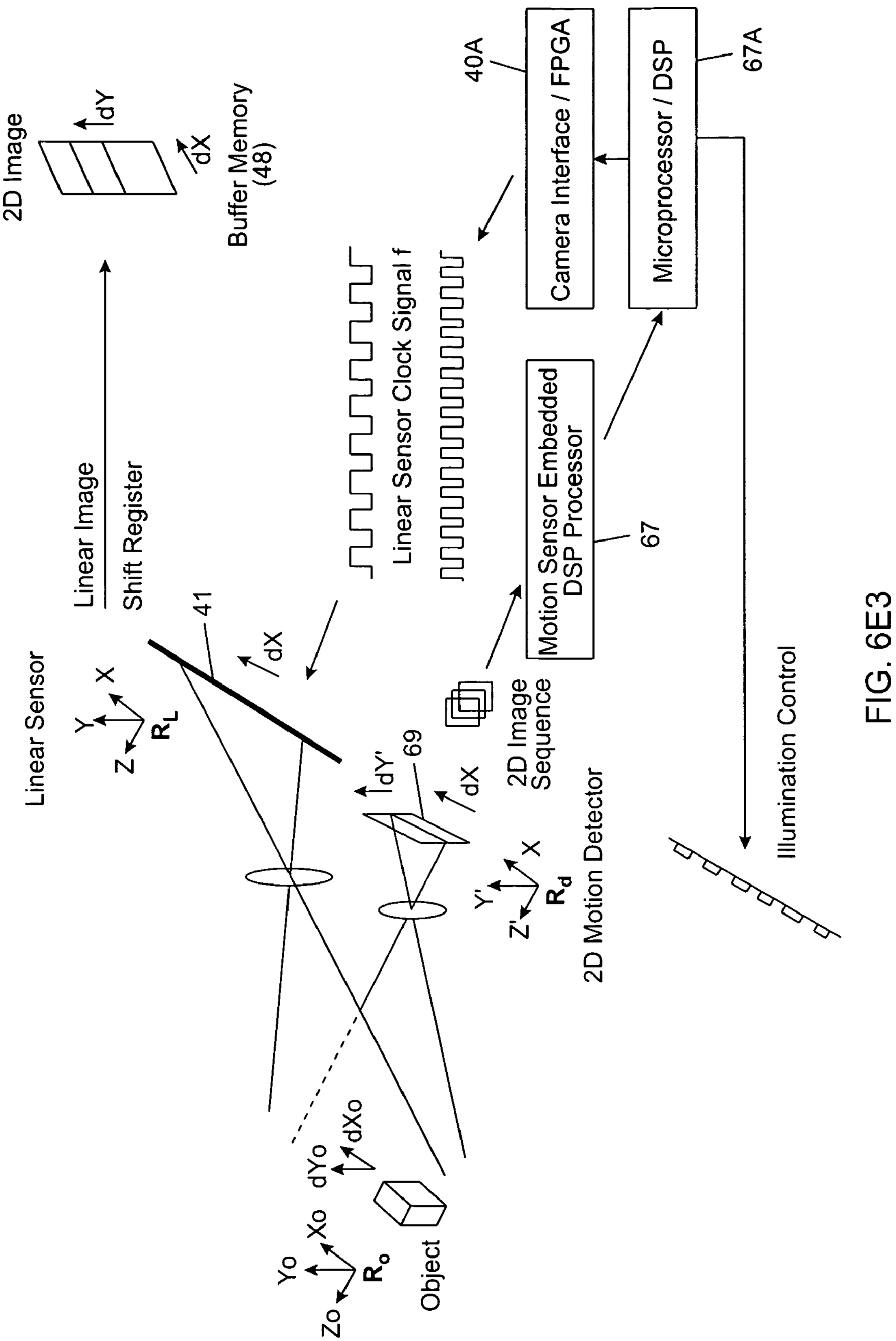
FIG. 6E3

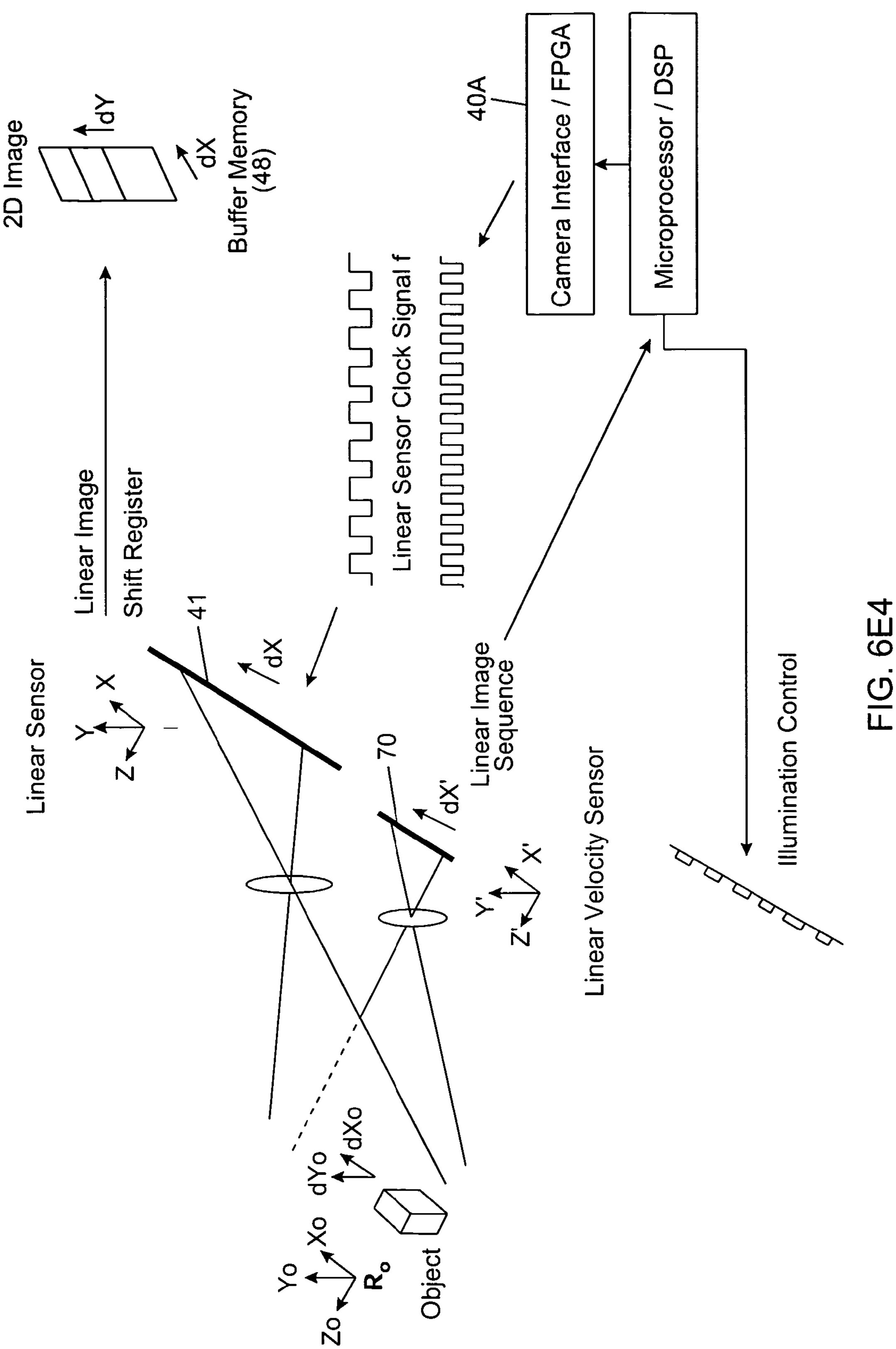
FIG. 6E4

State Transitions in the System of the Present Invention with Local Control
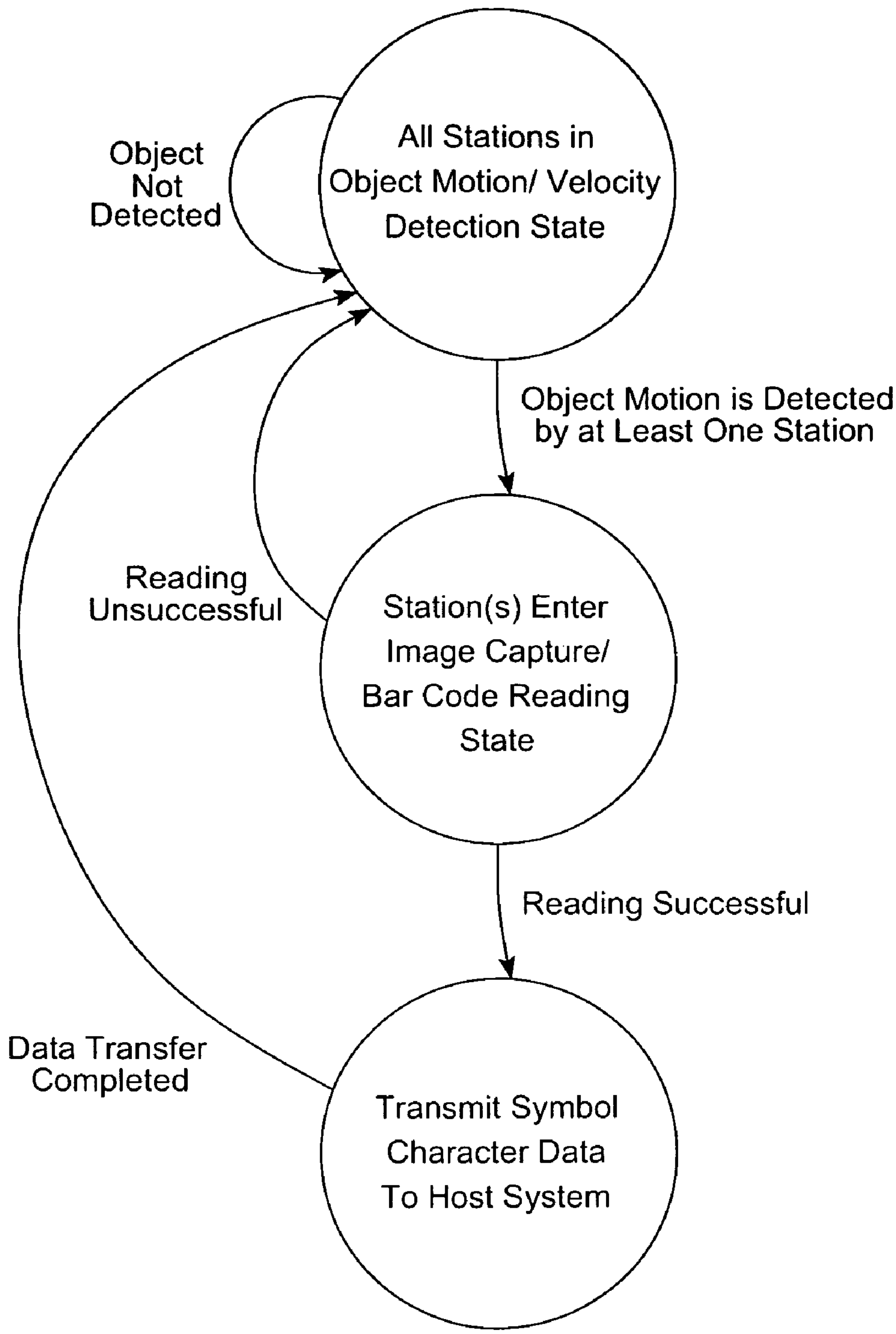
FIG. 6F1

State Transitions in the System of the Present Invention with Local Control with Global Over-Driving of Nearest Neighboring Stations
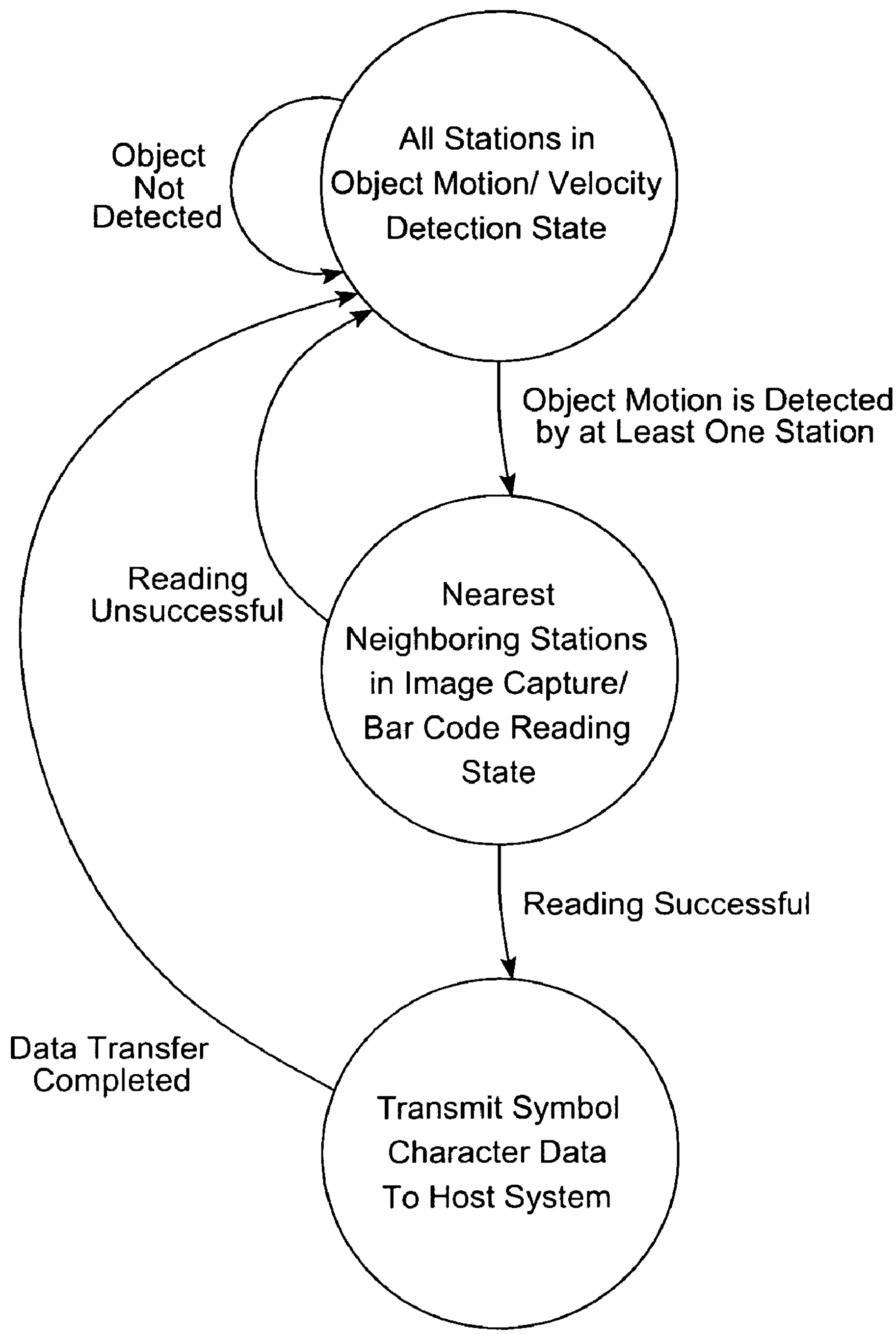
FIG. 6F2

State Transitions in the System of the Present Invention with Local Control with Global Over-Driving of All Neighboring Stations
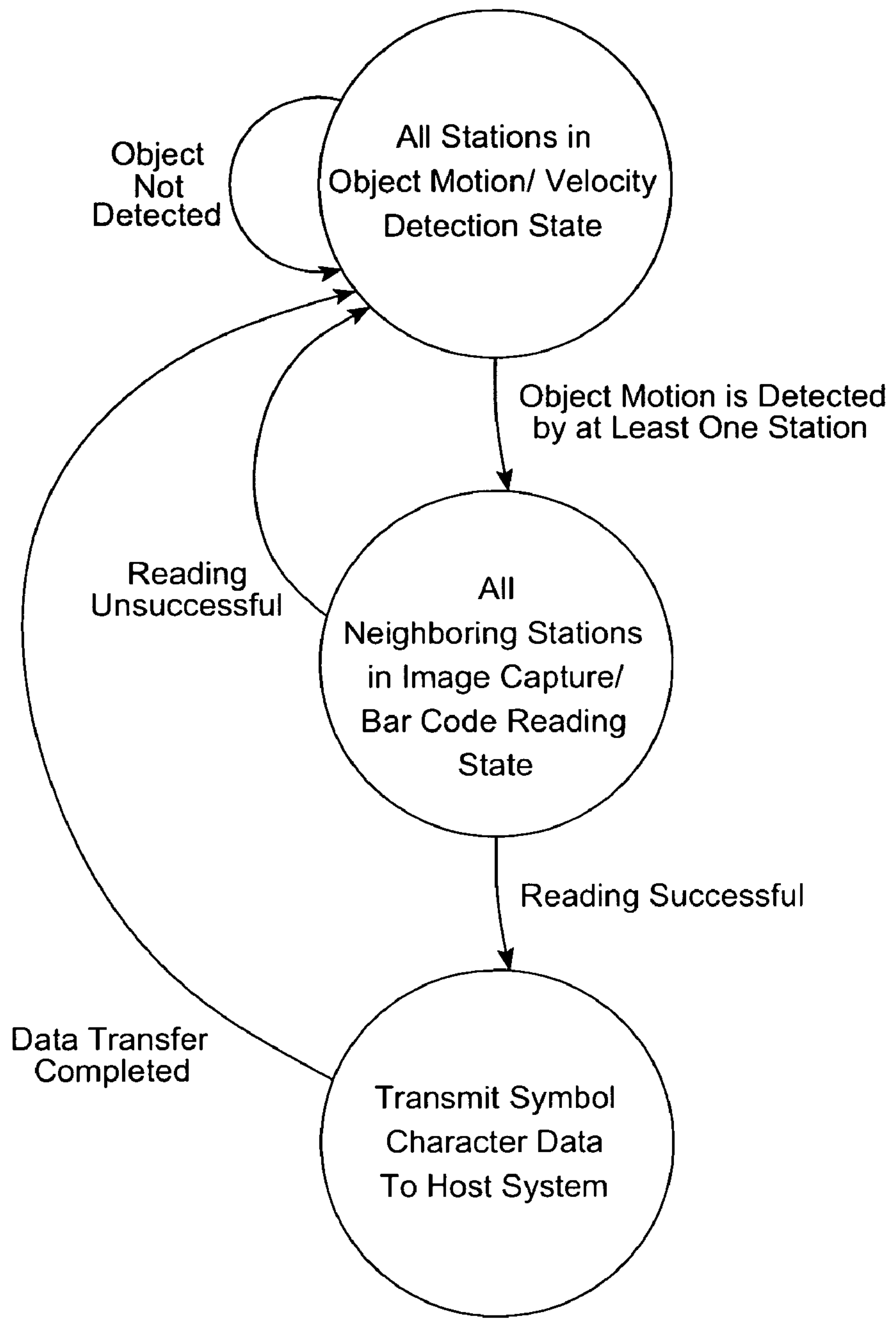
FIG. 6F3

STATE CONTROL PROCESS
WITHIN THE OMNI-DIRECTIONAL IMAGE-PROCESSING BAR CODE READING SYSTEM OF THE PRESENT INVENTION, EMPLOYING LOCAL OBJECT MOTION/VELOCITY DETECTION IN EACH COPLANAR ILLUMINATION AND IMAGING SUBSYSTEM
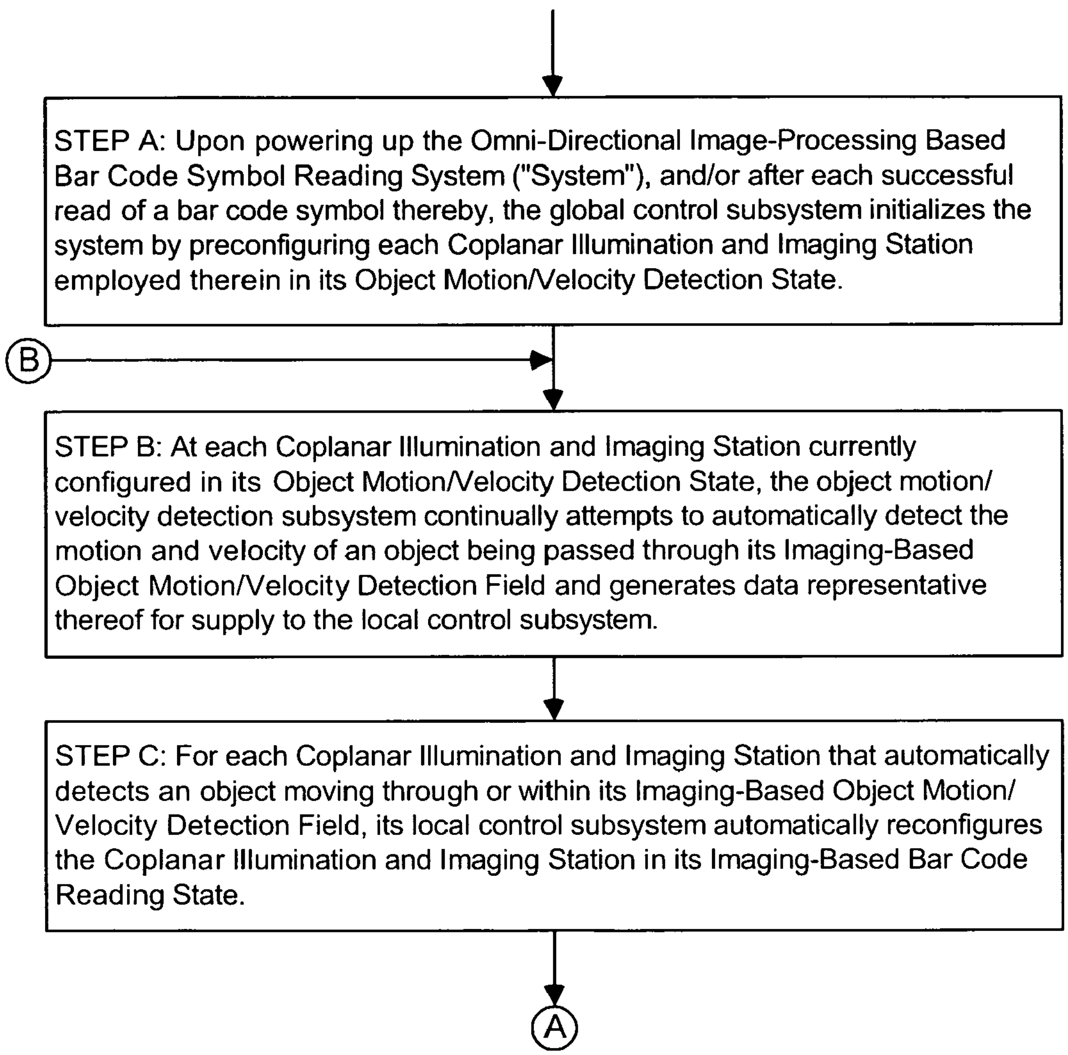
FIG. 6G1A

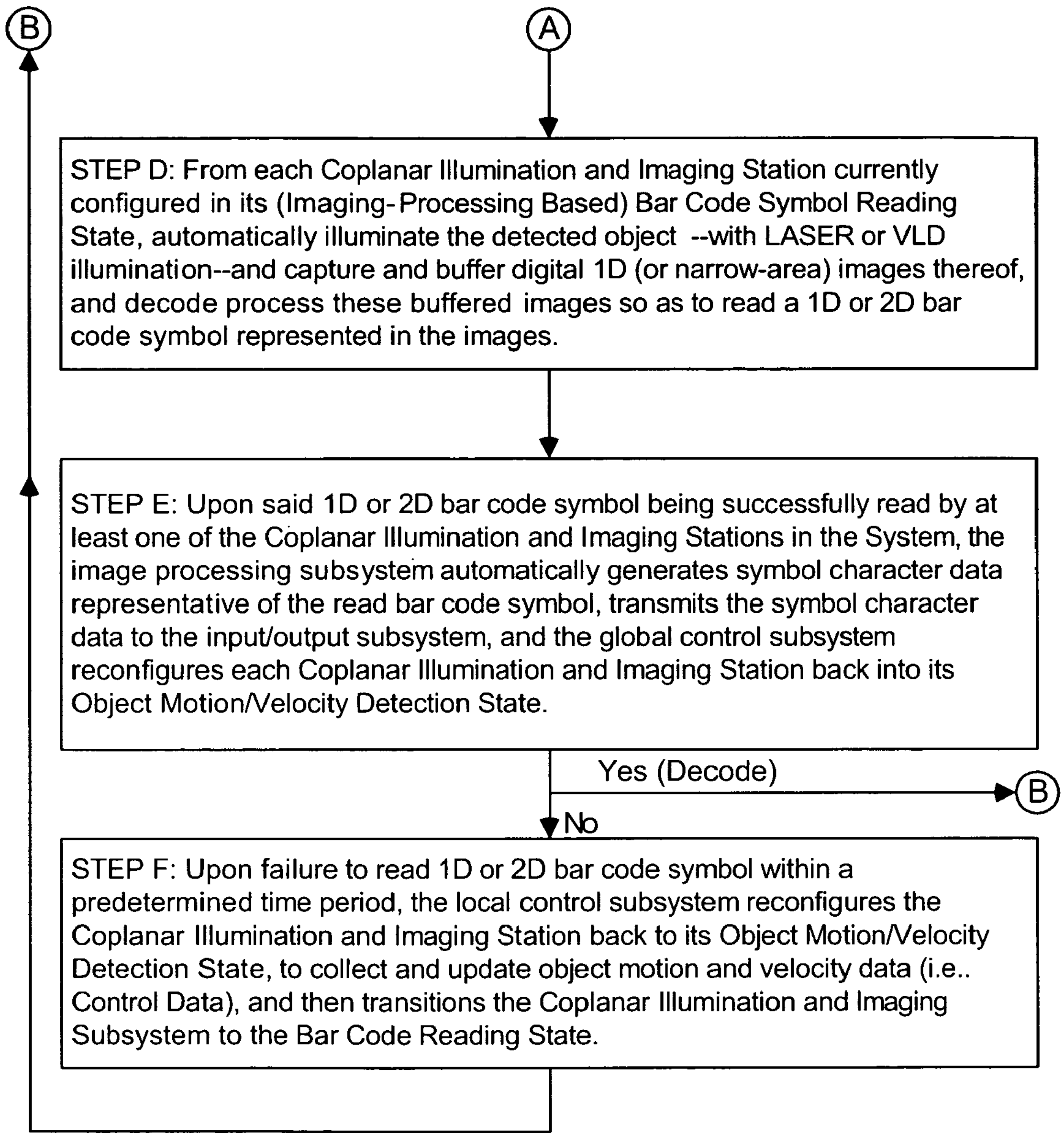
FIG. 6G1B

STATE CONTROL PROCESS
WITHIN THE OMNI-DIRECTIONAL IMAGE-PROCESSING BAR CODE READING SYSTEM OF THE PRESENT INVENTION, EMPLOYING LOCAL OBJECT MOTION/VELOCITY DETECTION IN EACH COPLANAR ILLUMINATION AND IMAGING SUBSYSTEM WITH GLOBALLY-CONTROLLED NEAREST- NEIGHBORING STATION OVER-DRIVE
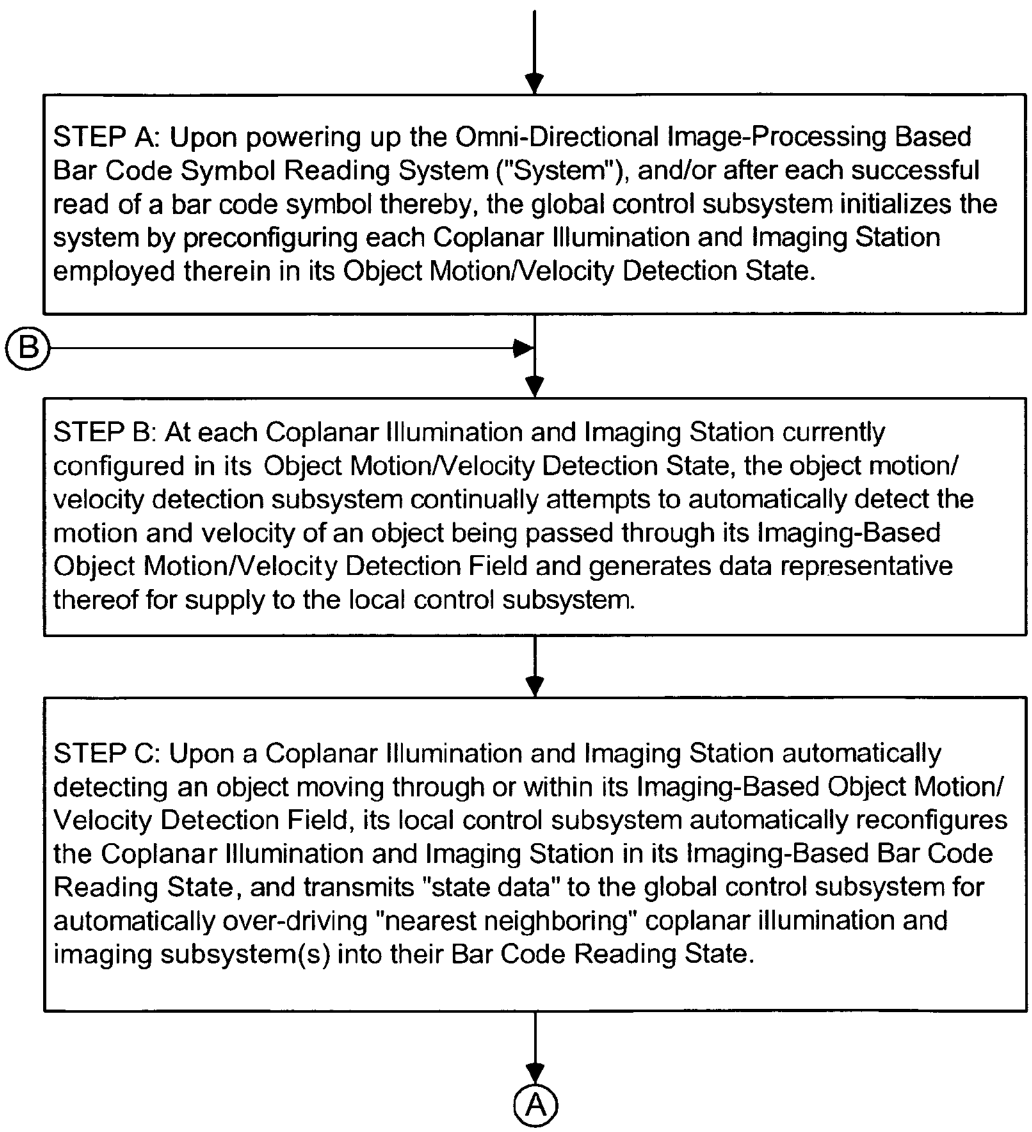
FIG. 6G2A

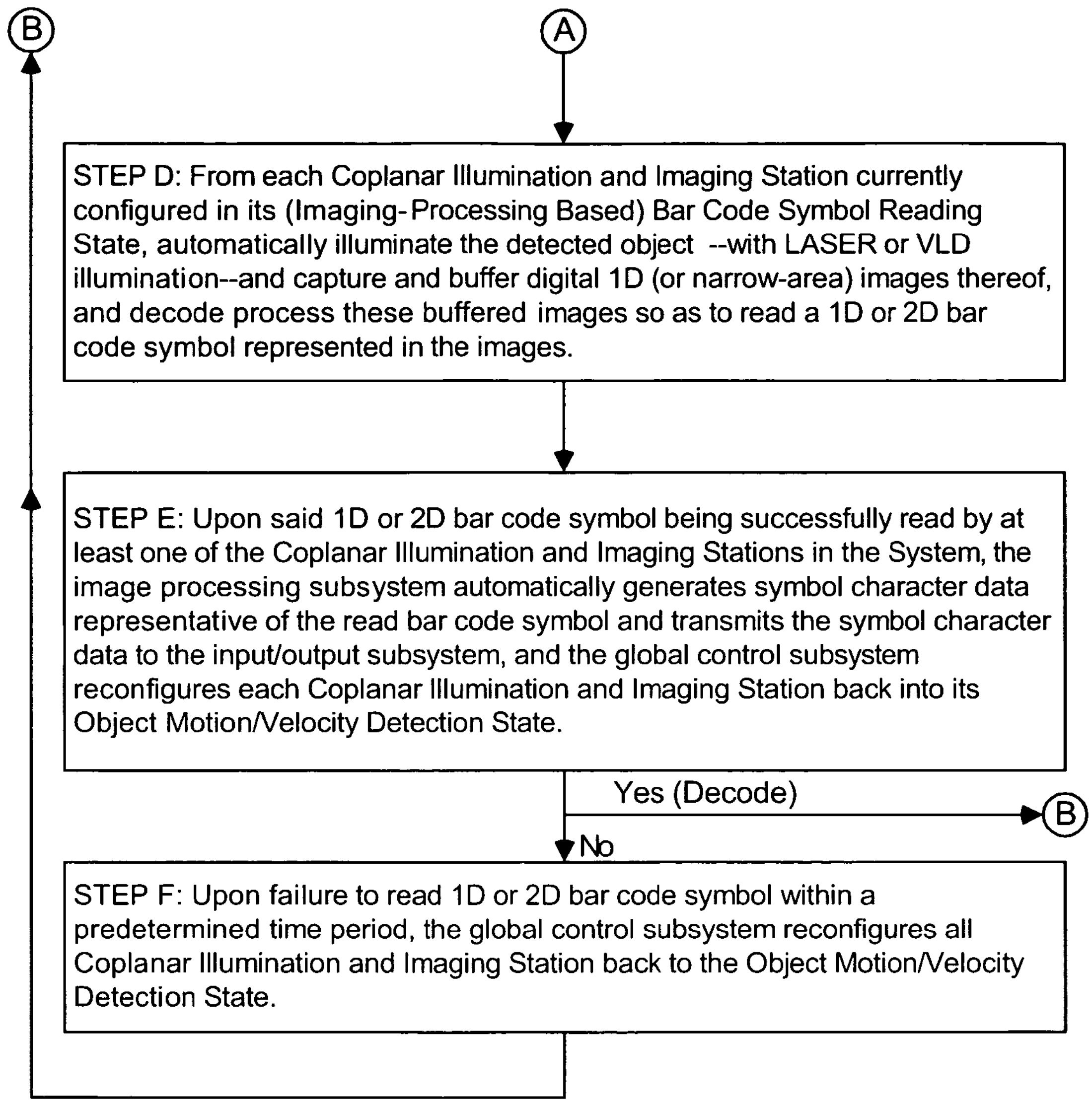
FIG. 6G2B

STATE CONTROL PROCESS
WITHIN THE OMNI-DIRECTIONAL IMAGE-PROCESSING BAR CODE READING SYSTEM OF THE PRESENT INVENTION, EMPLOYING LOCAL OBJECT MOTION/VELOCITY DETECTION IN EACH COPLANAR ILLUMINATION AND IMAGING SUBSYSTEM WITH GLOBALLY-CONTROLLED ALL-NEIGHBORING STATION OVER-DRIVE MODE

STEP A: Upon powering up the Omni-Directional Image-Processing Based Bar Code Symbol Reading System ("System"), and/or after each successful read of a bar code symbol thereby, the global control subsystem initializes the system by preconfiguring each Coplanar Illumination and Imaging Station employed therein in its Object Motion/Velocity Detection State.

B

STEP B: At each Coplanar Illumination and Imaging Station currently configured in its Object Motion/Velocity Detection State, the object motion/velocity detection subsystem continually attempts to automatically detect the motion and velocity of an object being passed through its Imaging-Based Object Motion/Velocity Detection Field and generates data representative thereof for supply to the local control subsystem.

STEP C: Upon a Coplanar Illumination and Imaging Station automatically detecting an object moving through or within its Imaging-Based Object Motion/Velocity Detection Field, its local control subsystem automatically reconfigures the Coplanar Illumination and Imaging Station in its Imaging-Based Bar Code Reading State, and transmits "state data" to the global control subsystem for automatically over-driving "all neighboring" coplanar illumination and imaging subsystem into its Bar Code Reading State.

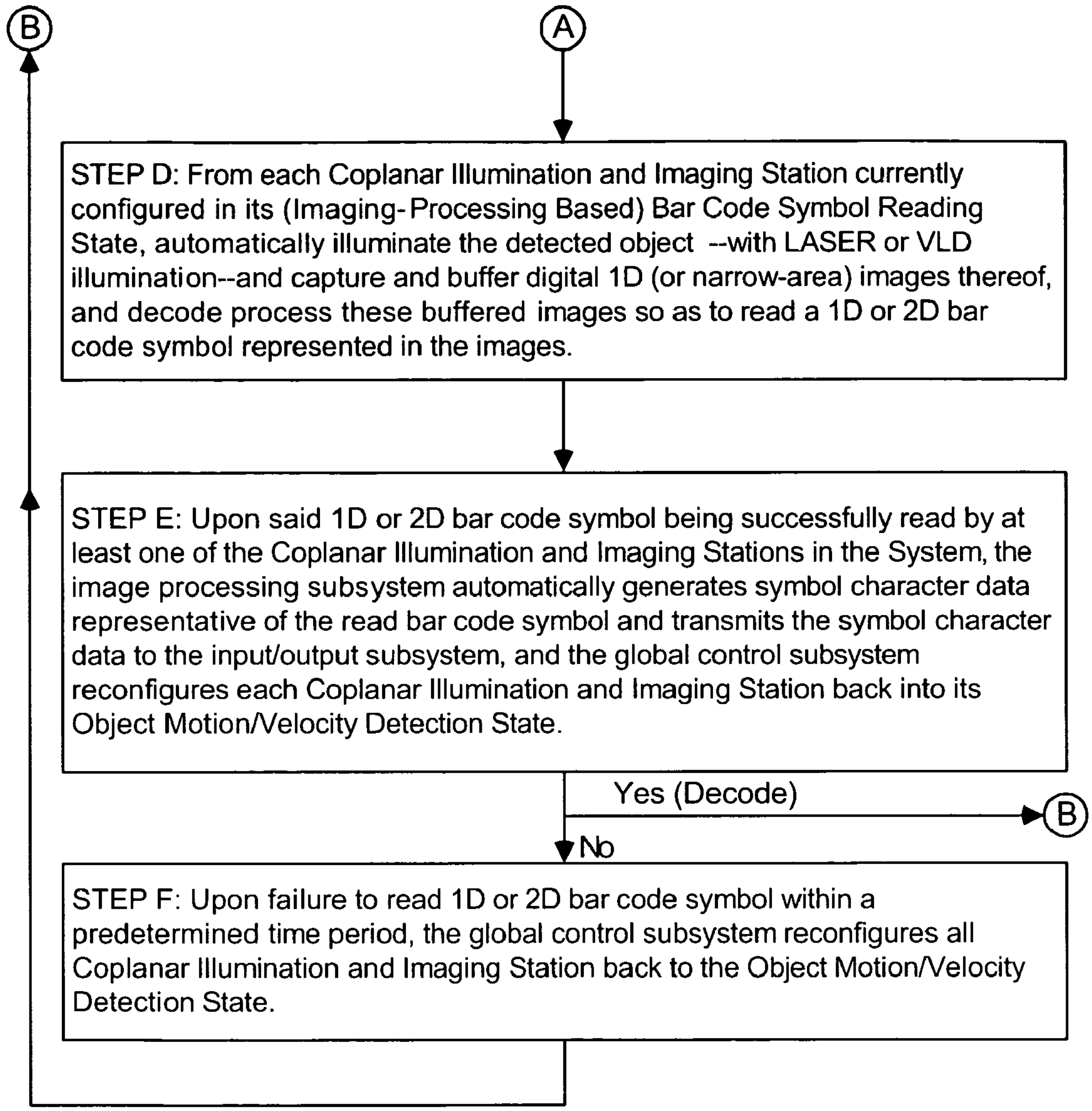
FIG. 6G3B

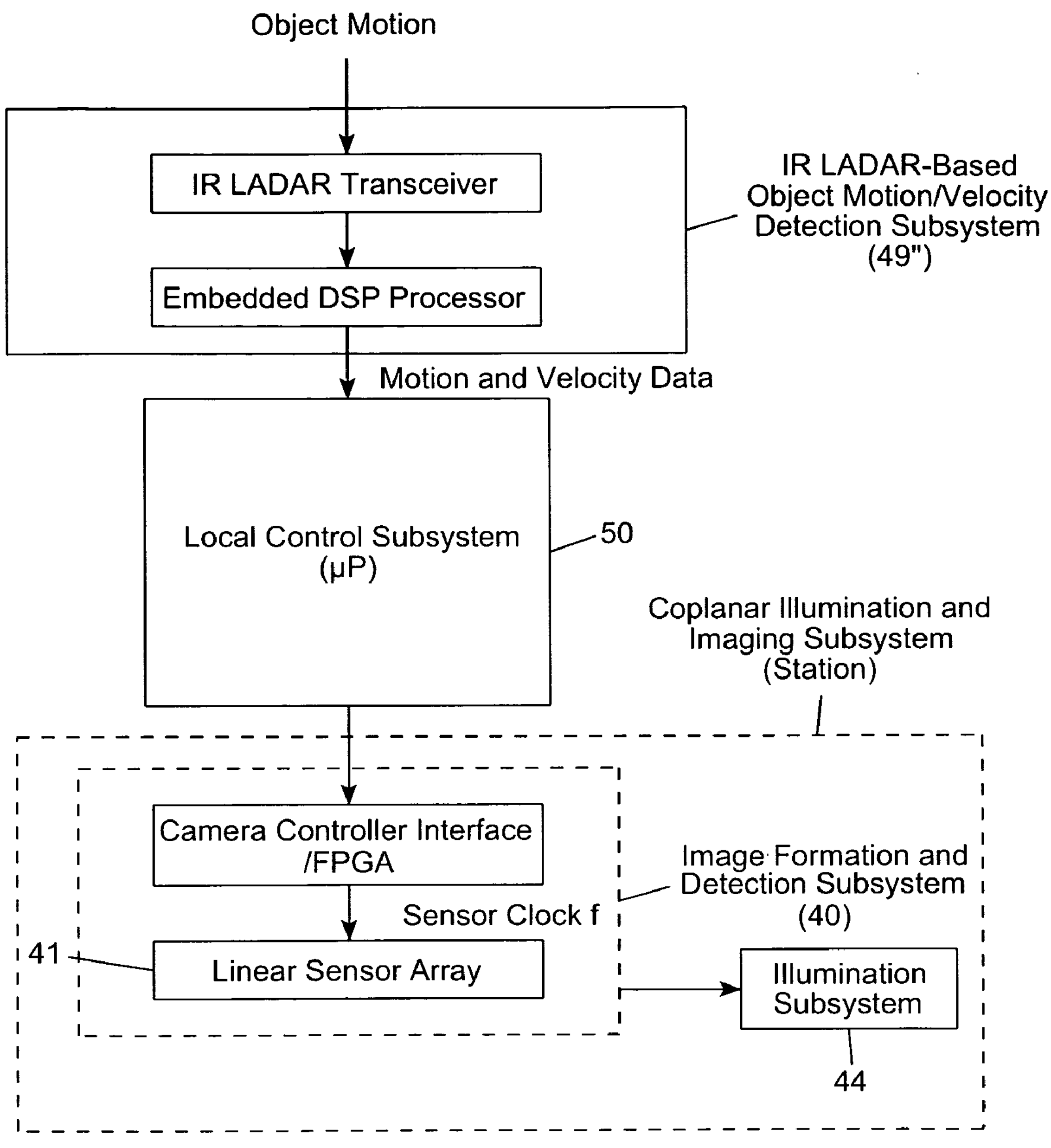
FIG. 6D1'

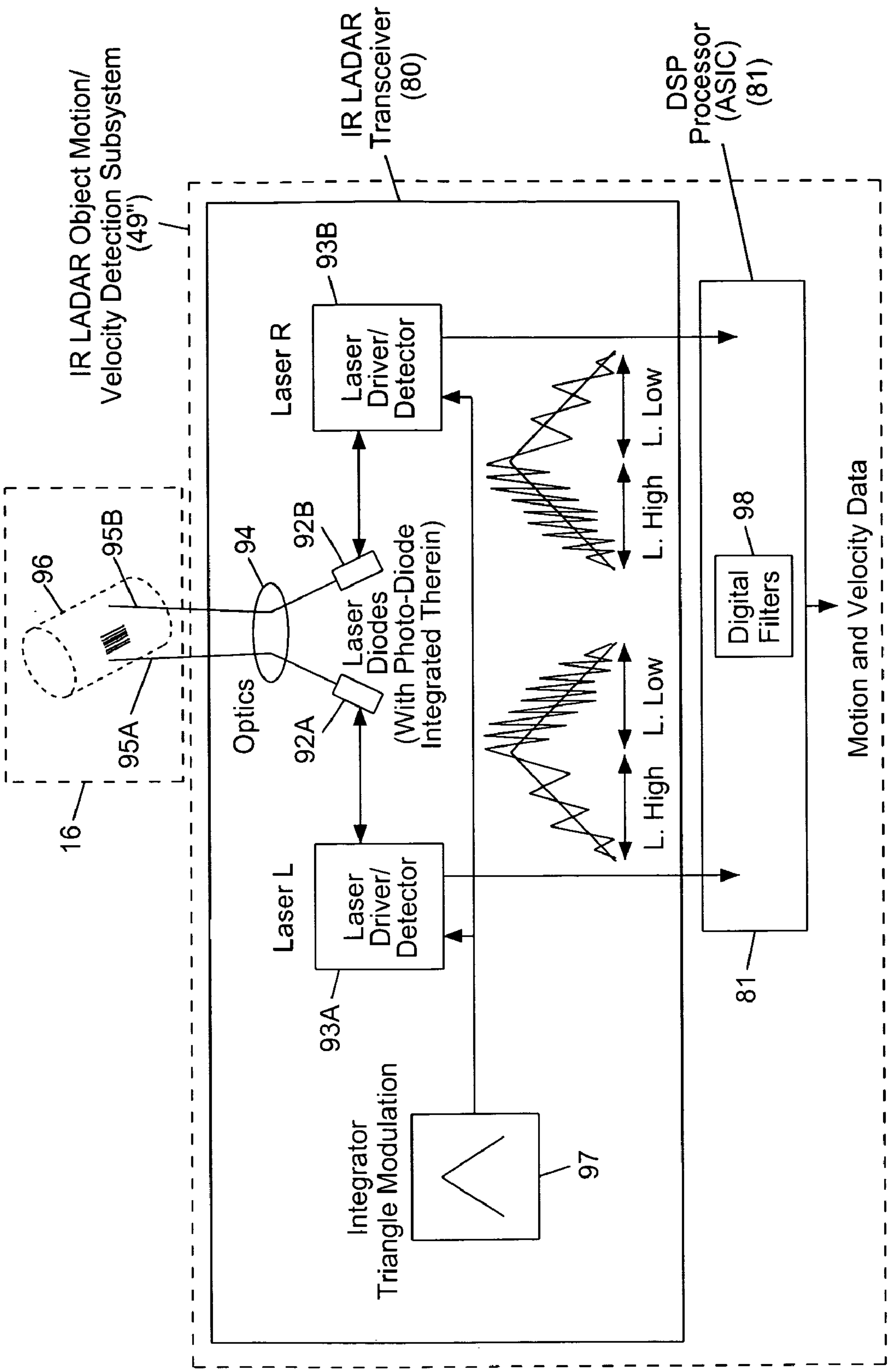
FIG. 6D2'

State Transitions in the System of the Present Invention with Local Control
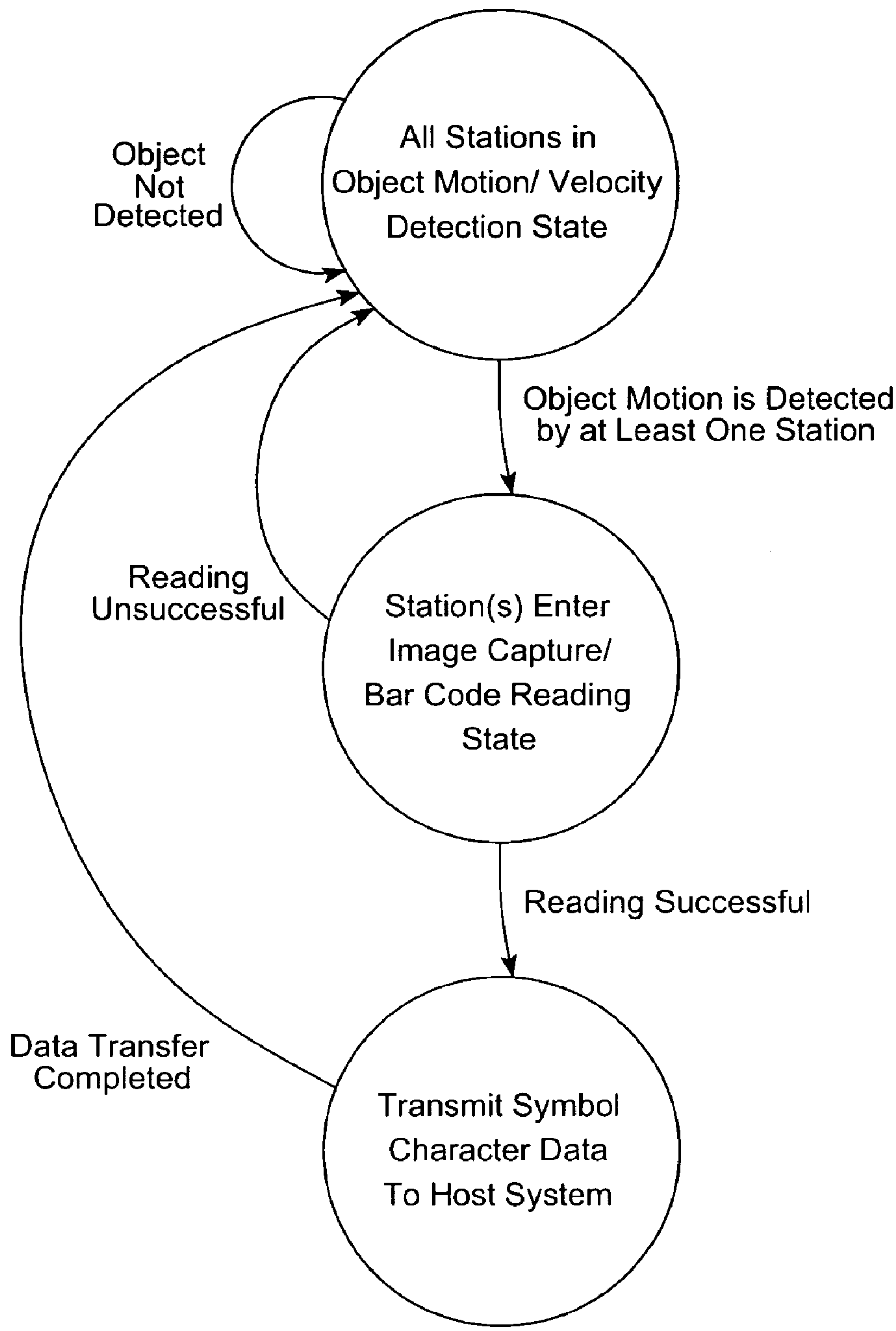
FIG. 6F1'

State Transitions in the System of the Present Invention with Local Control with Global Over-Driving of Nearest Neighboring Stations
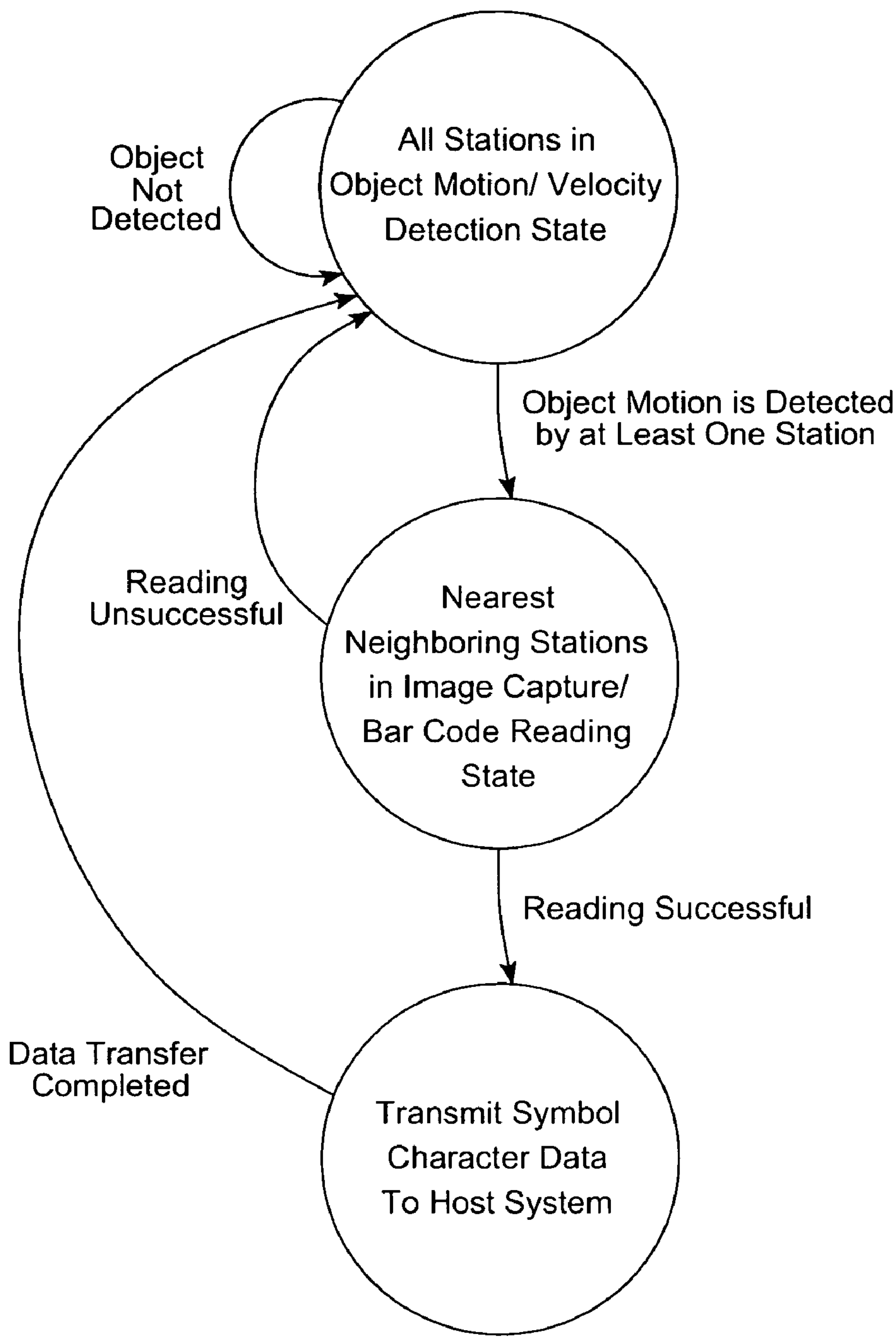
FIG. 6F2'

State Transitions in the System of the Present Invention with Local Control with Global Over-Driving of All Neighboring Stations
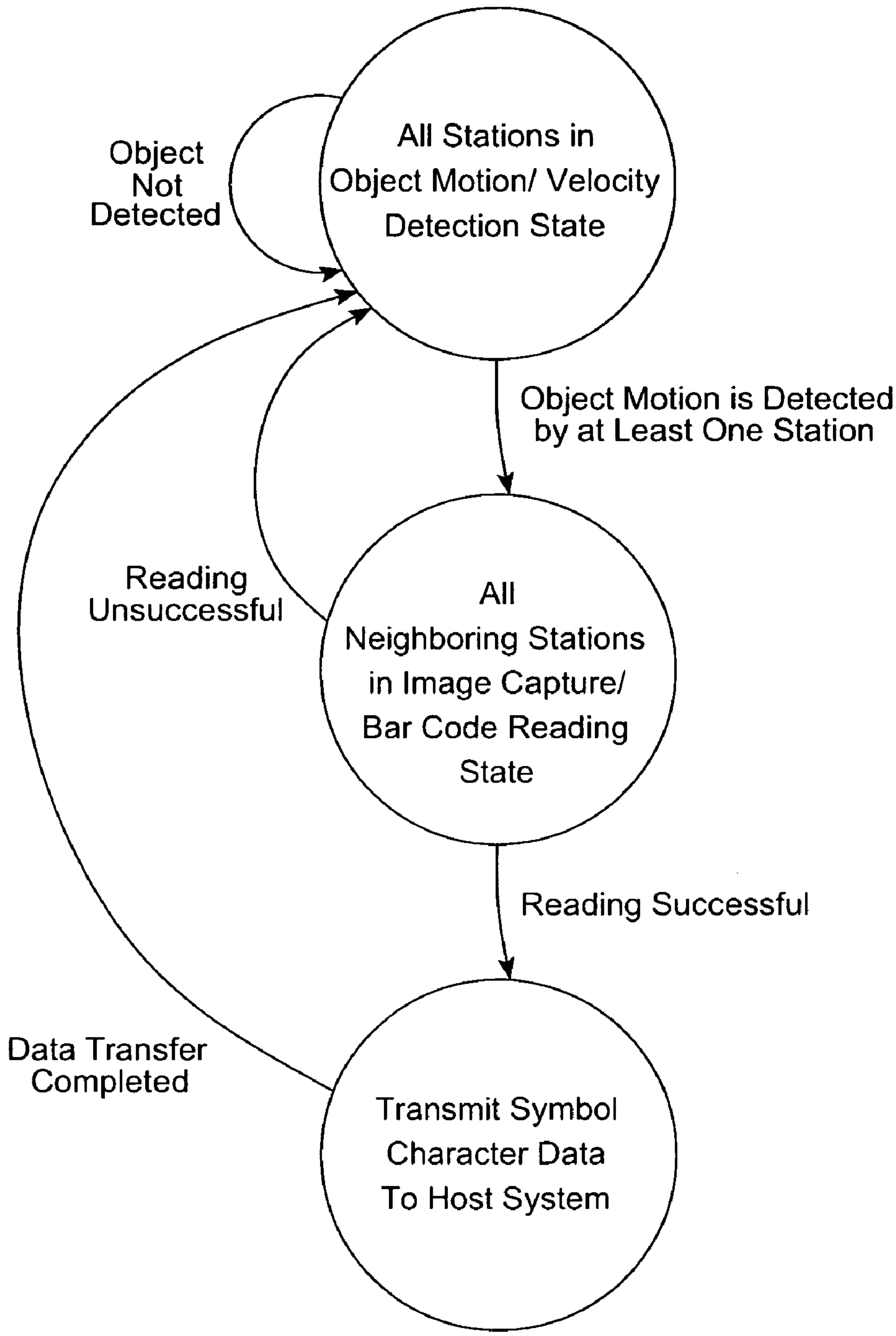
FIG. 6F3'

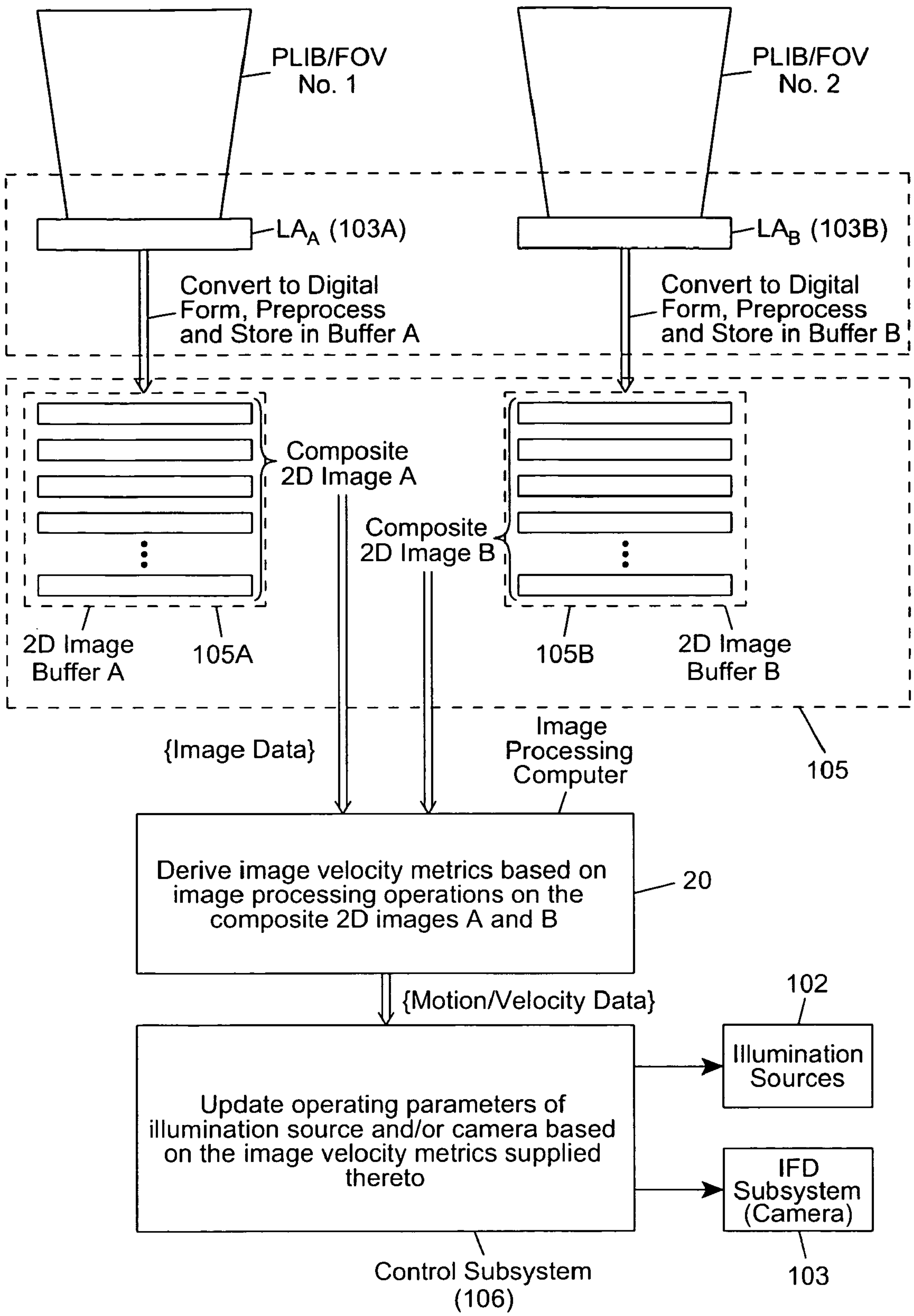
FIG. 7E1

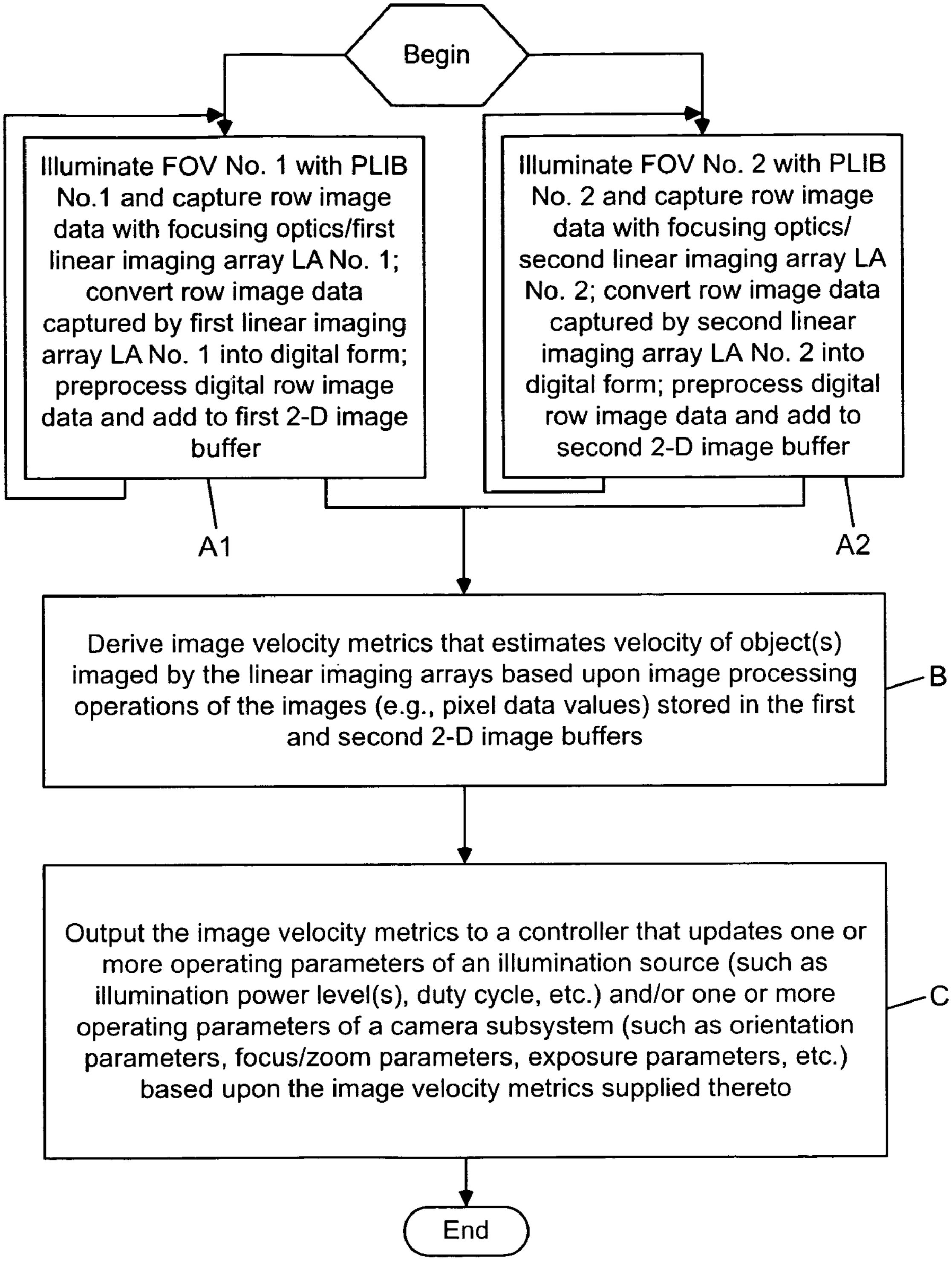
FIG. 7E2

State Transitions in the System of the Present Invention with Local Control
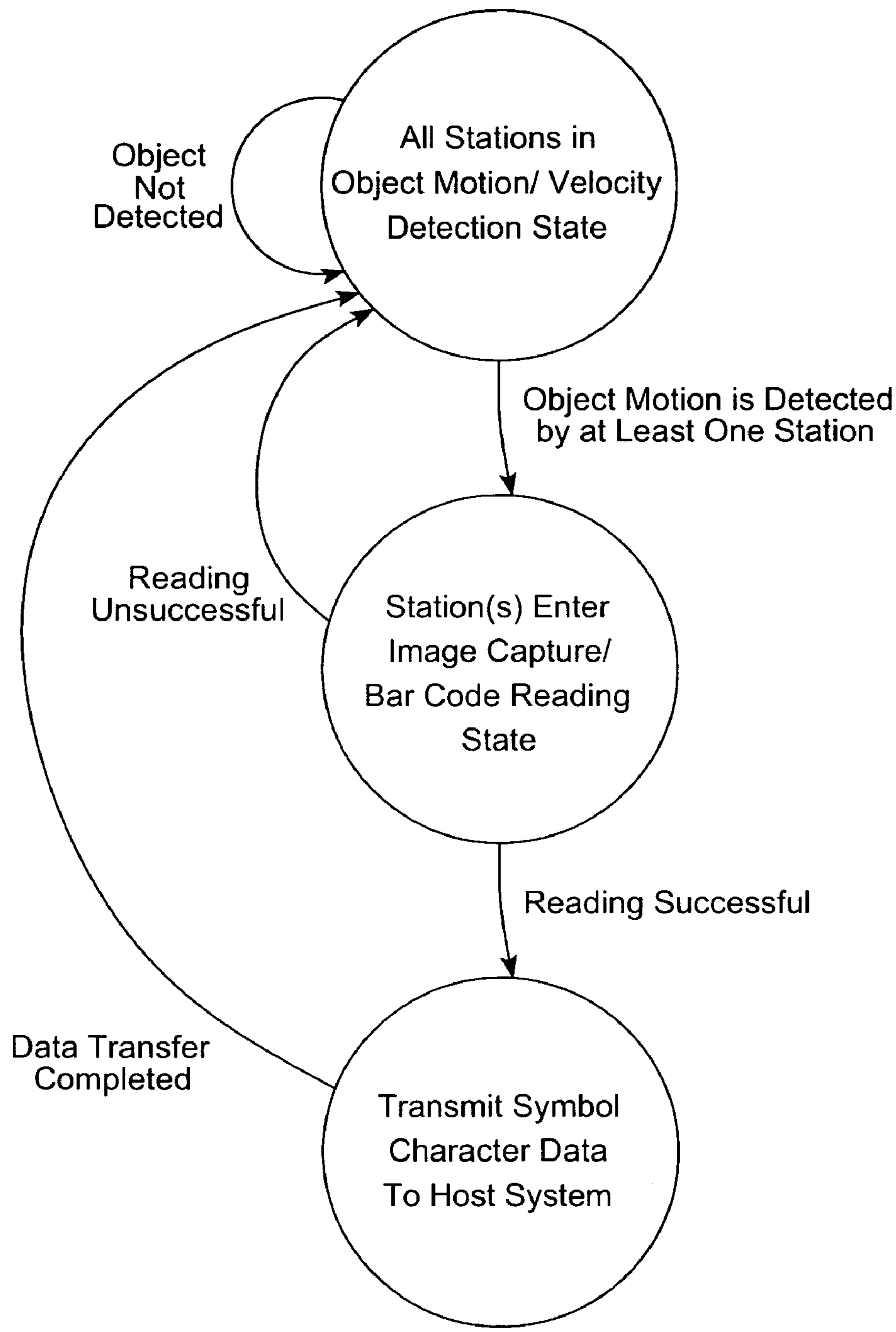
FIG. 7F1

State Transitions in the System of the Present Invention with Local Control with Global Over-Driving of Nearest Neighboring Stations
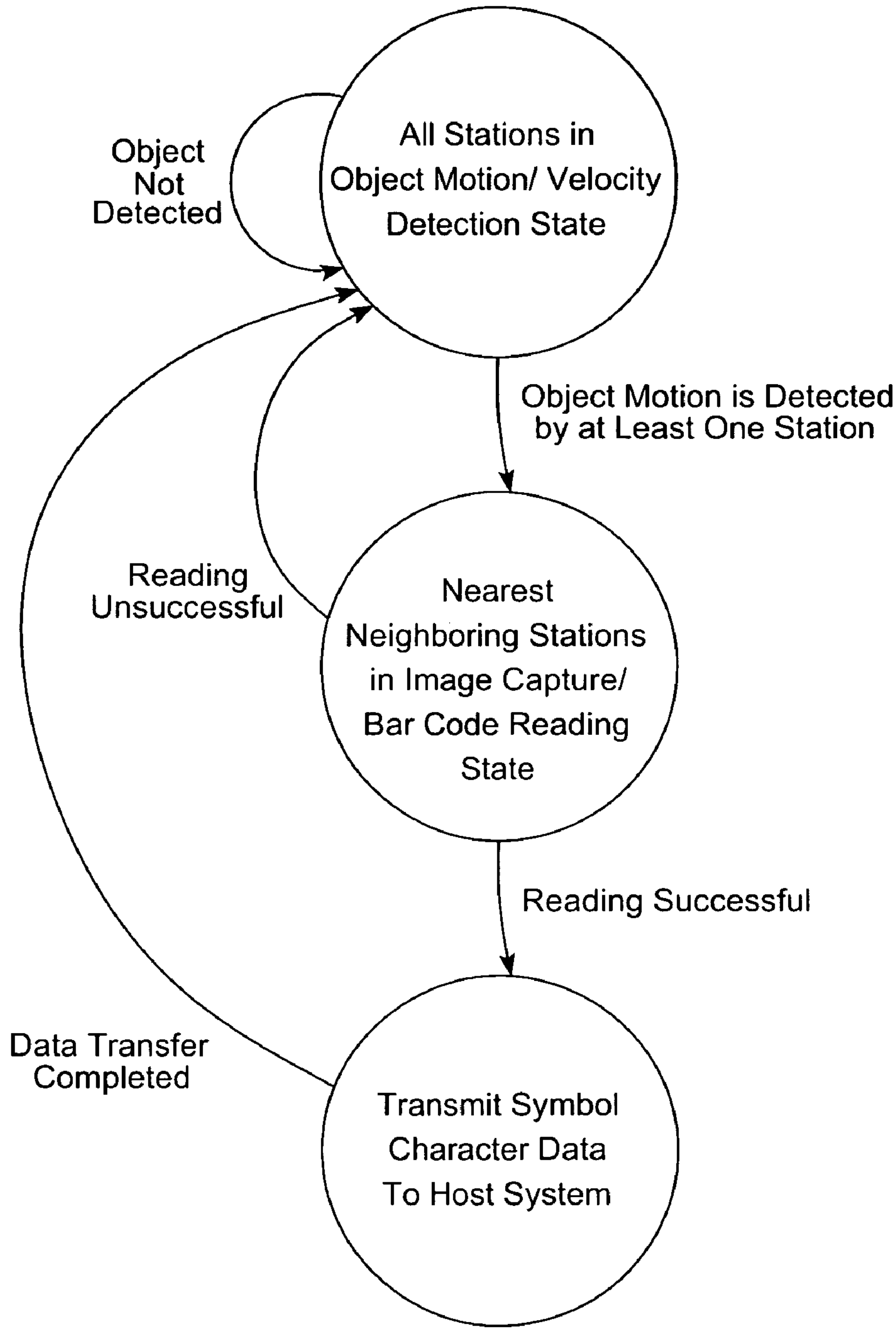
FIG. 7F2

State Transitions in the System of the Present Invention with Local Control with Global Over-Driving of All Neighboring Stations
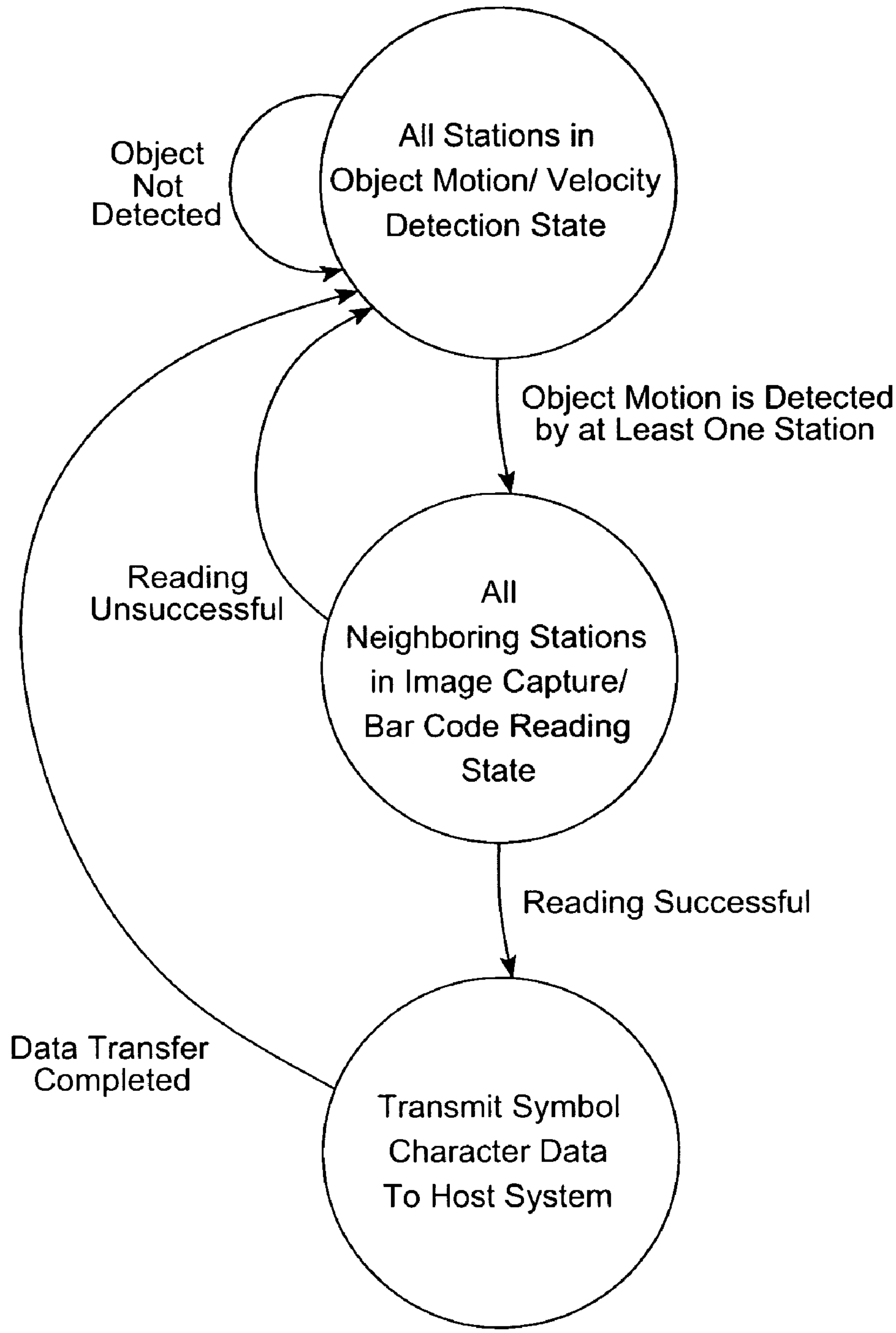
FIG. 7F3

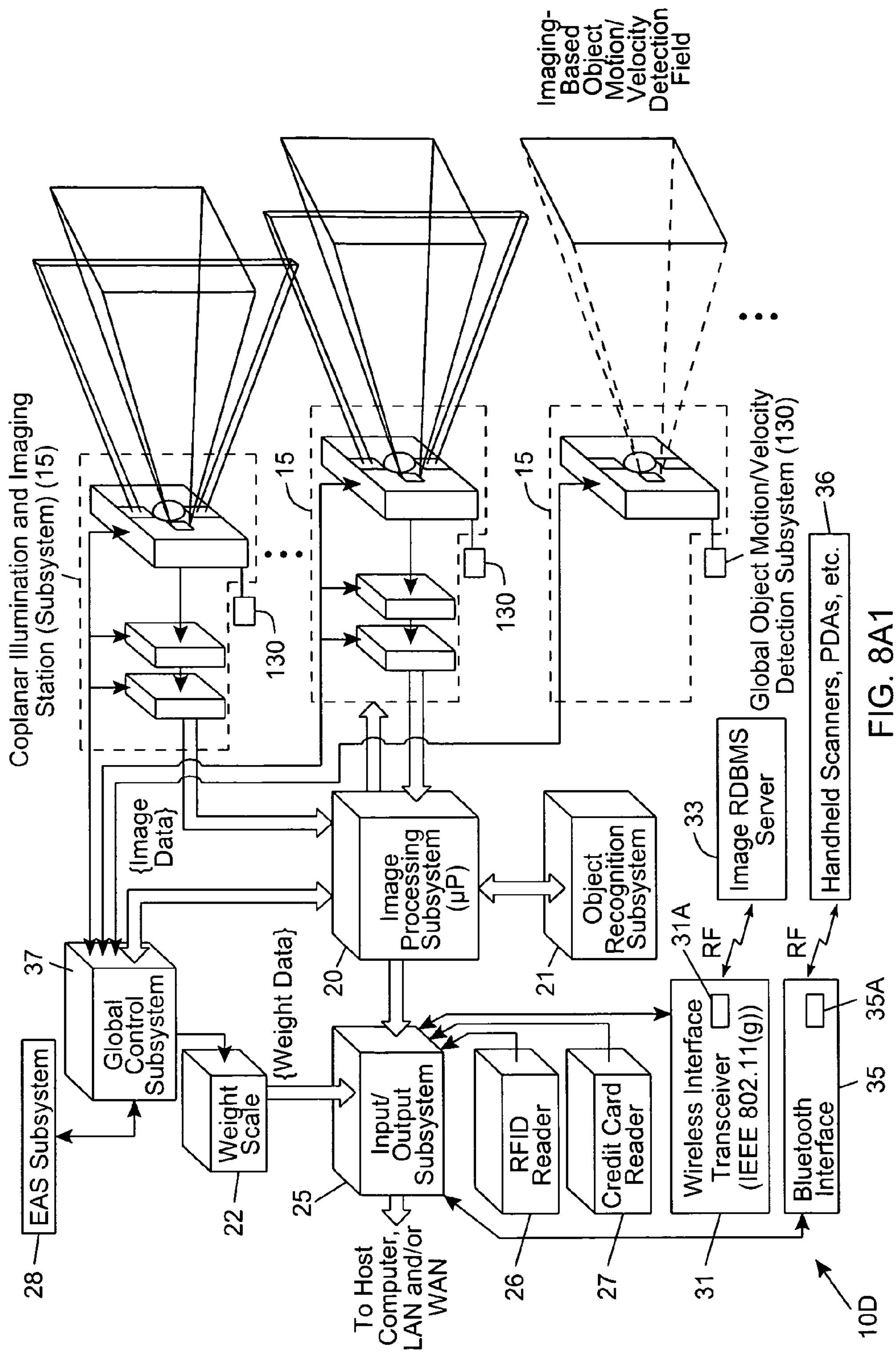
FIG. 8A1

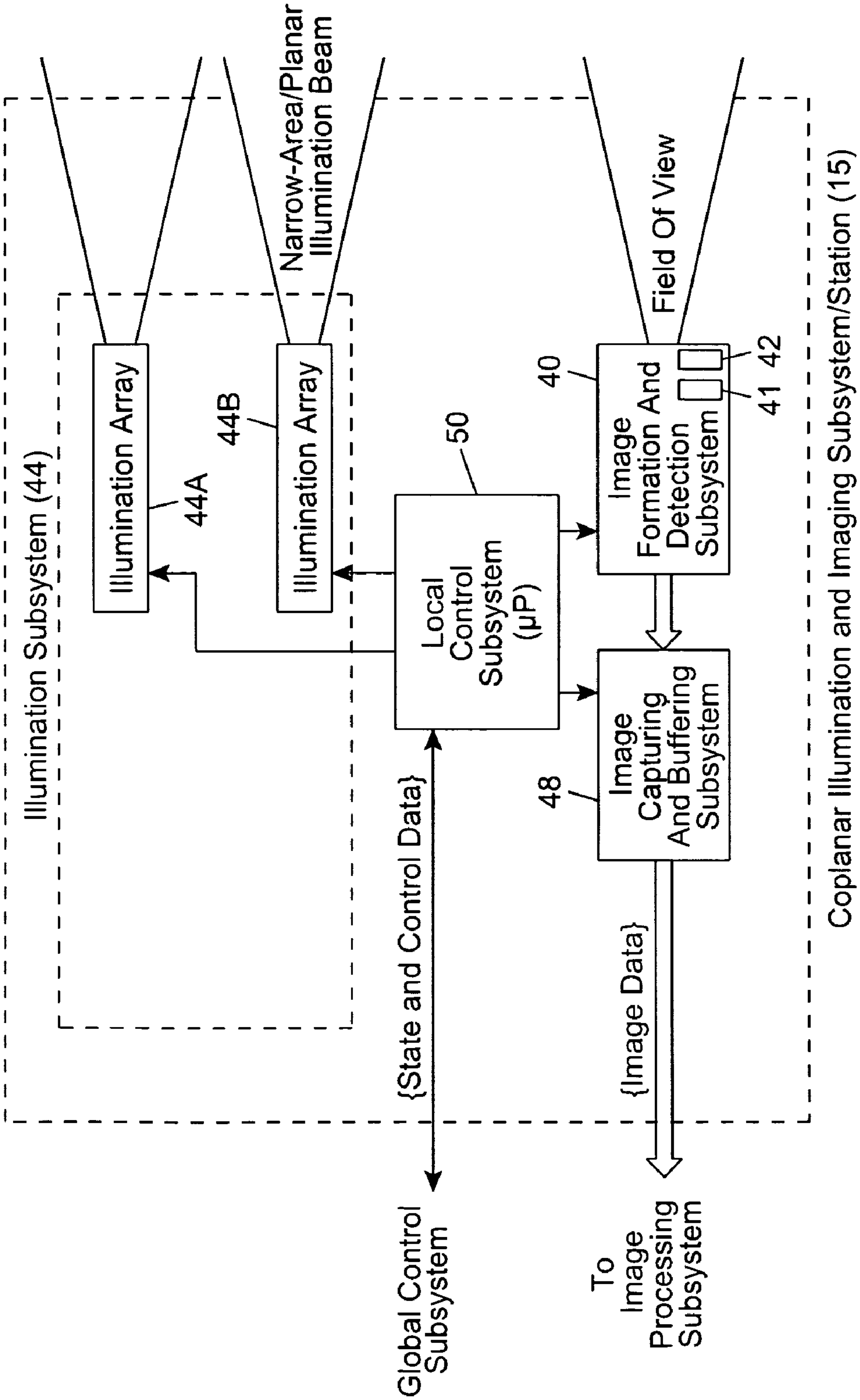
FIG. 8A2

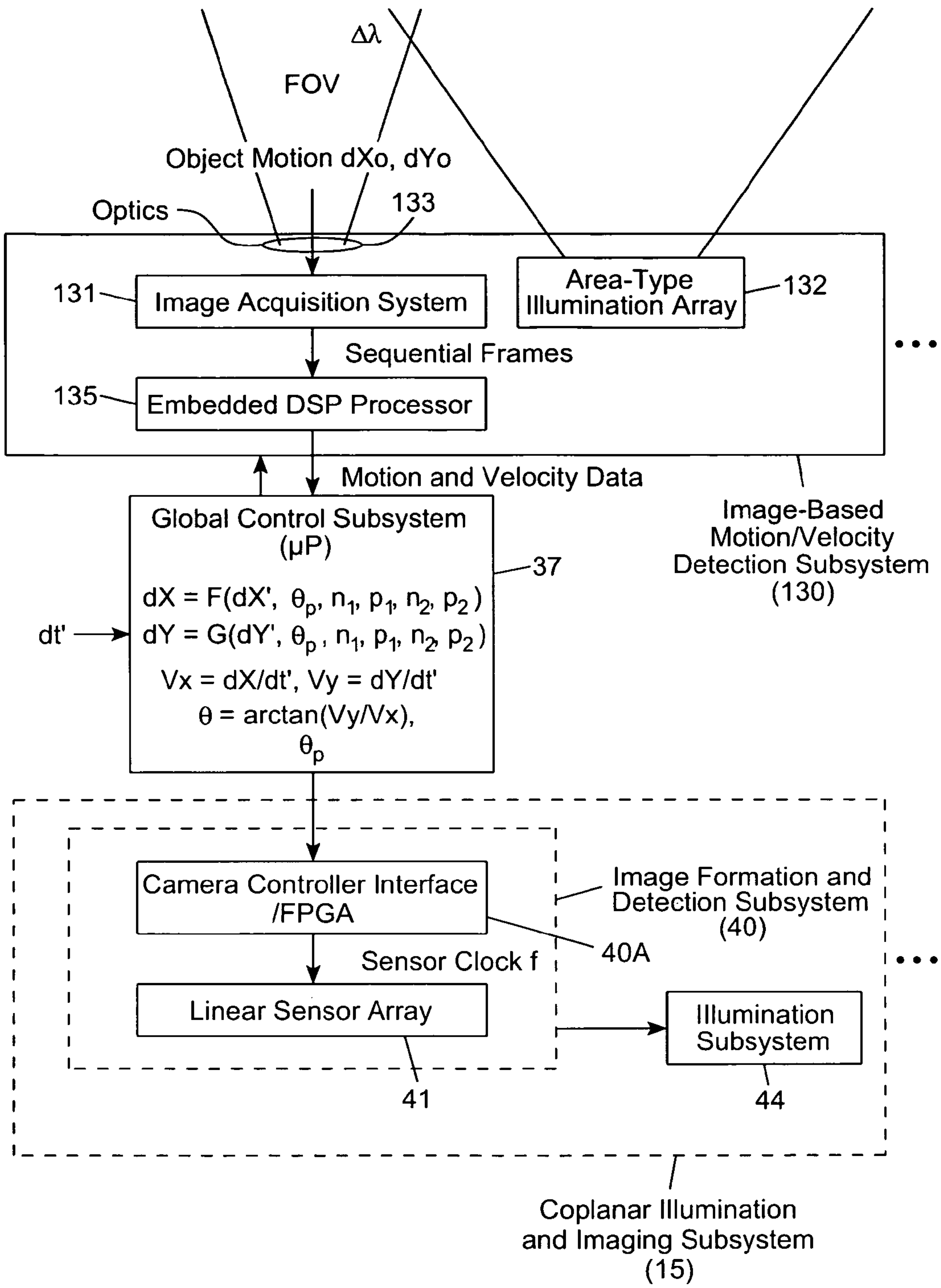
FIG. 8A3

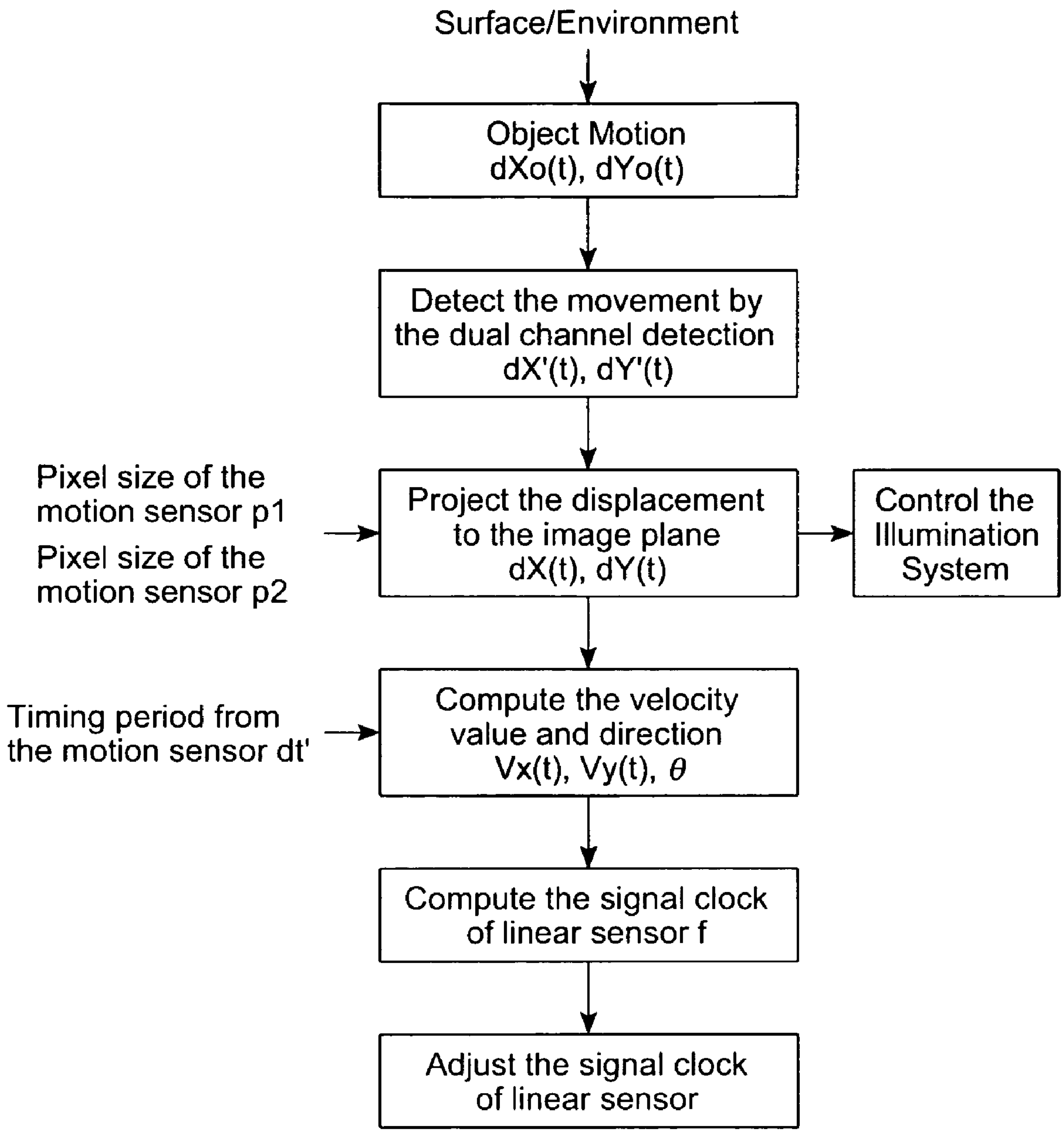
FIG. 8A4

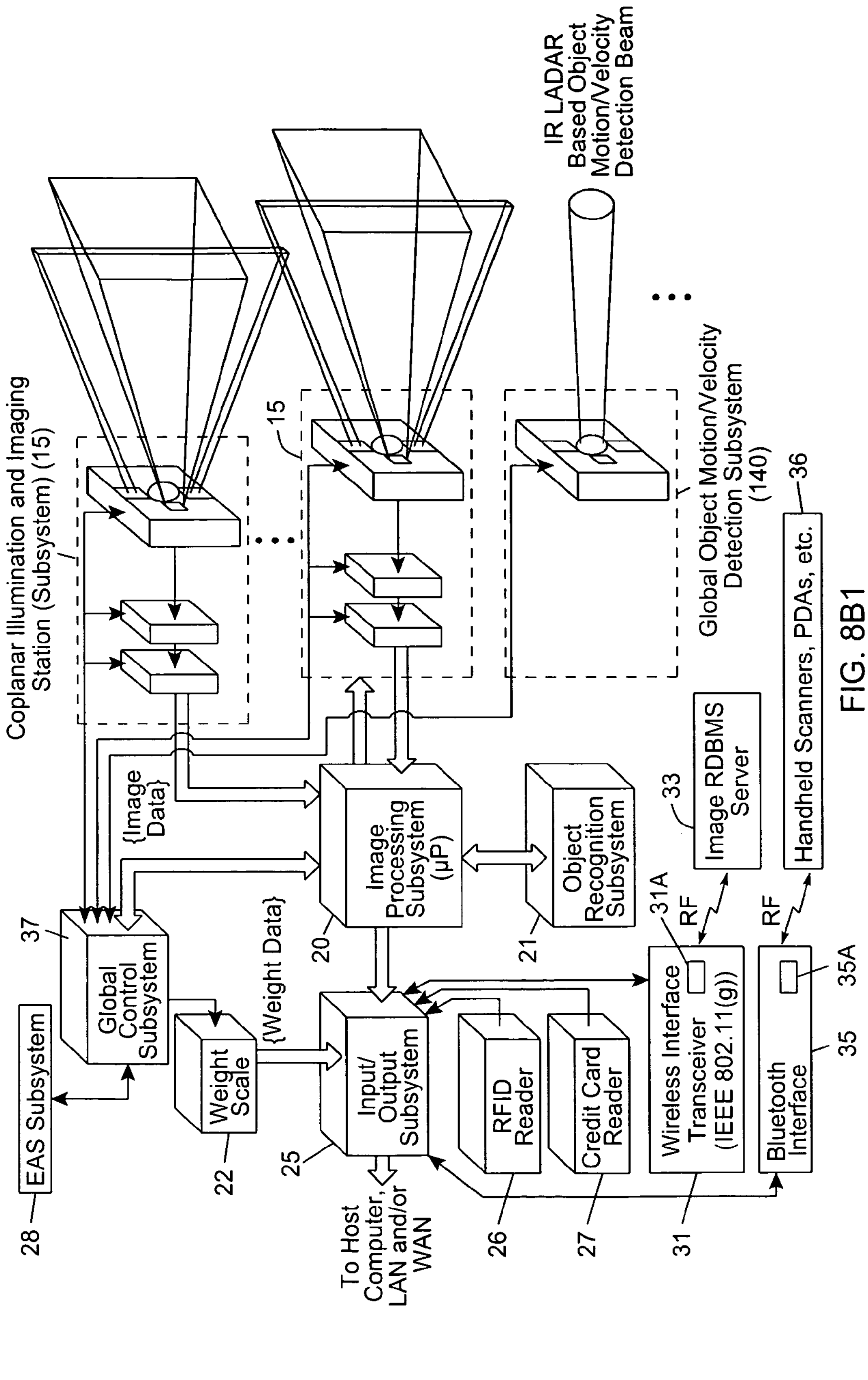
FIG. 8B1

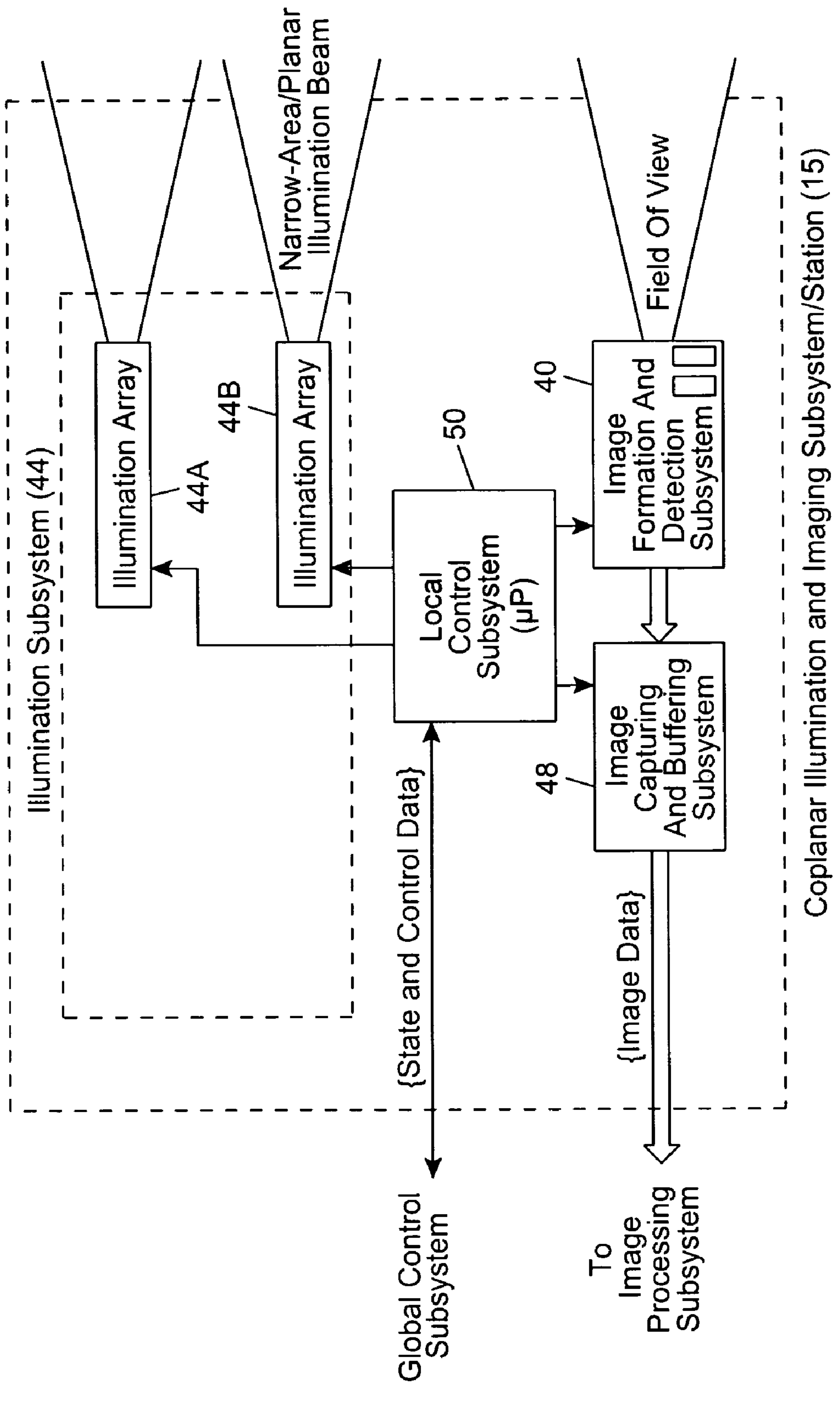
FIG. 8B2

State Transitions During Operation of the System of the Present Invention

STATE CONTROL PROCESS
WITHIN THE OMNI-DIRECTIONAL IMAGE-PROCESSING BAR CODE READING SYSTEM OF THE PRESENT INVENTION, EMPLOYING GLOBAL OBJECT MOTION/VELOCITY DETECTION

• Object Motion/Velocity Detection (OMVD) Task
• Bar Code Read (BCR) Task

State Transitions in the System of the Present Invention with Local Control
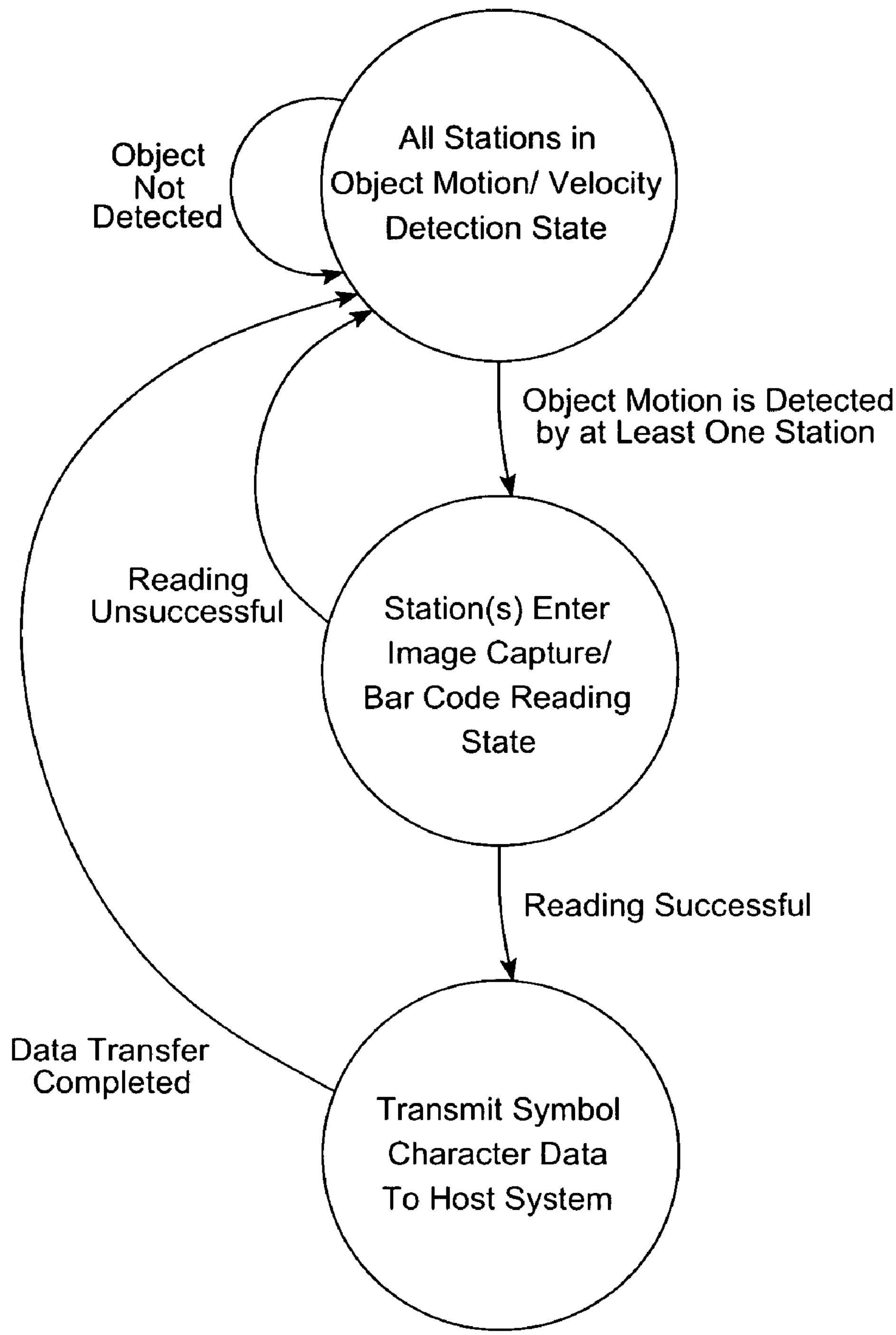
FIG. 9F1

State Transitions in the System of the Present Invention with Local Control with Global Over-Driving of Nearest Neighboring Stations
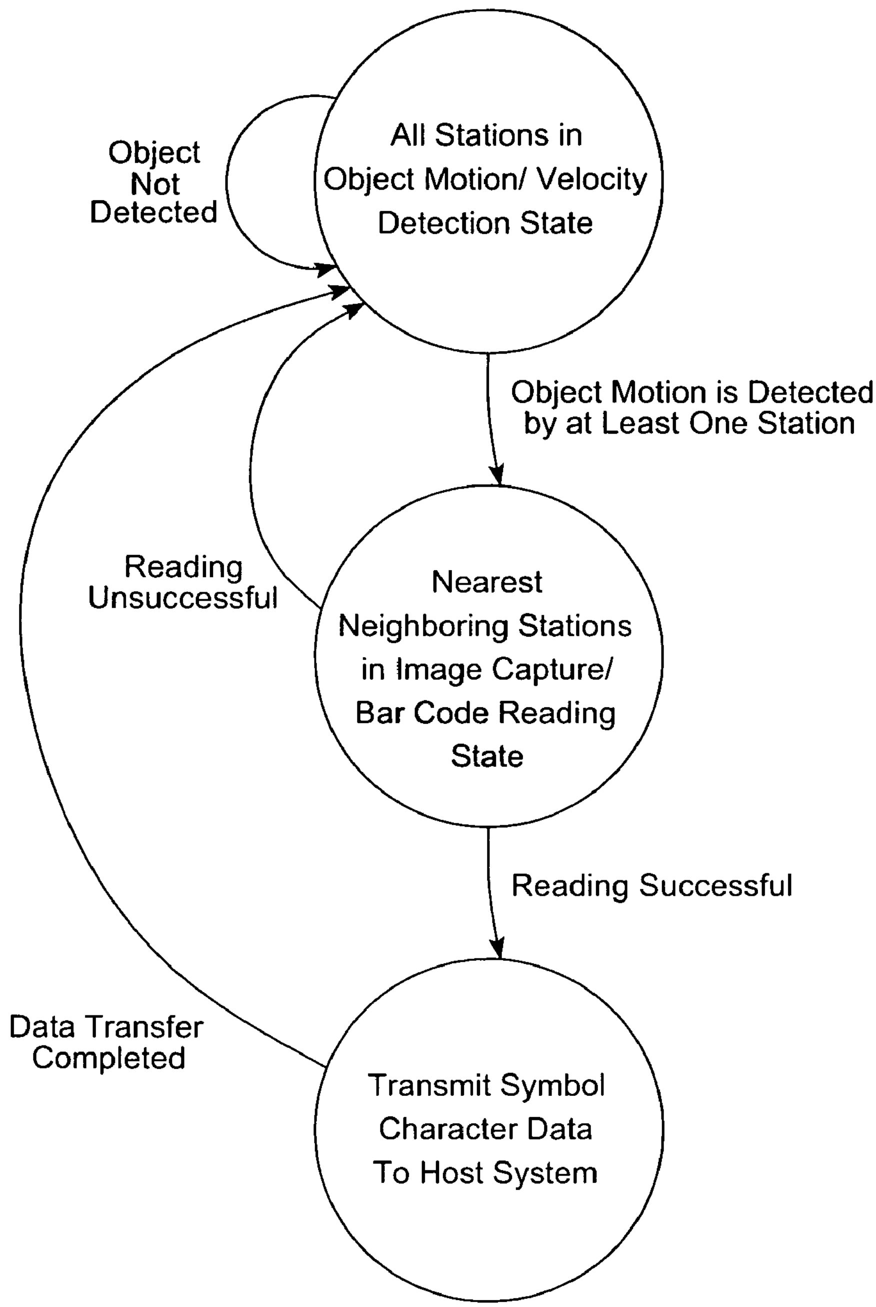
FIG. 9F2

State Transitions in the System of the Present Invention with Local Control with Global Over-Driving of All Neighboring Stations
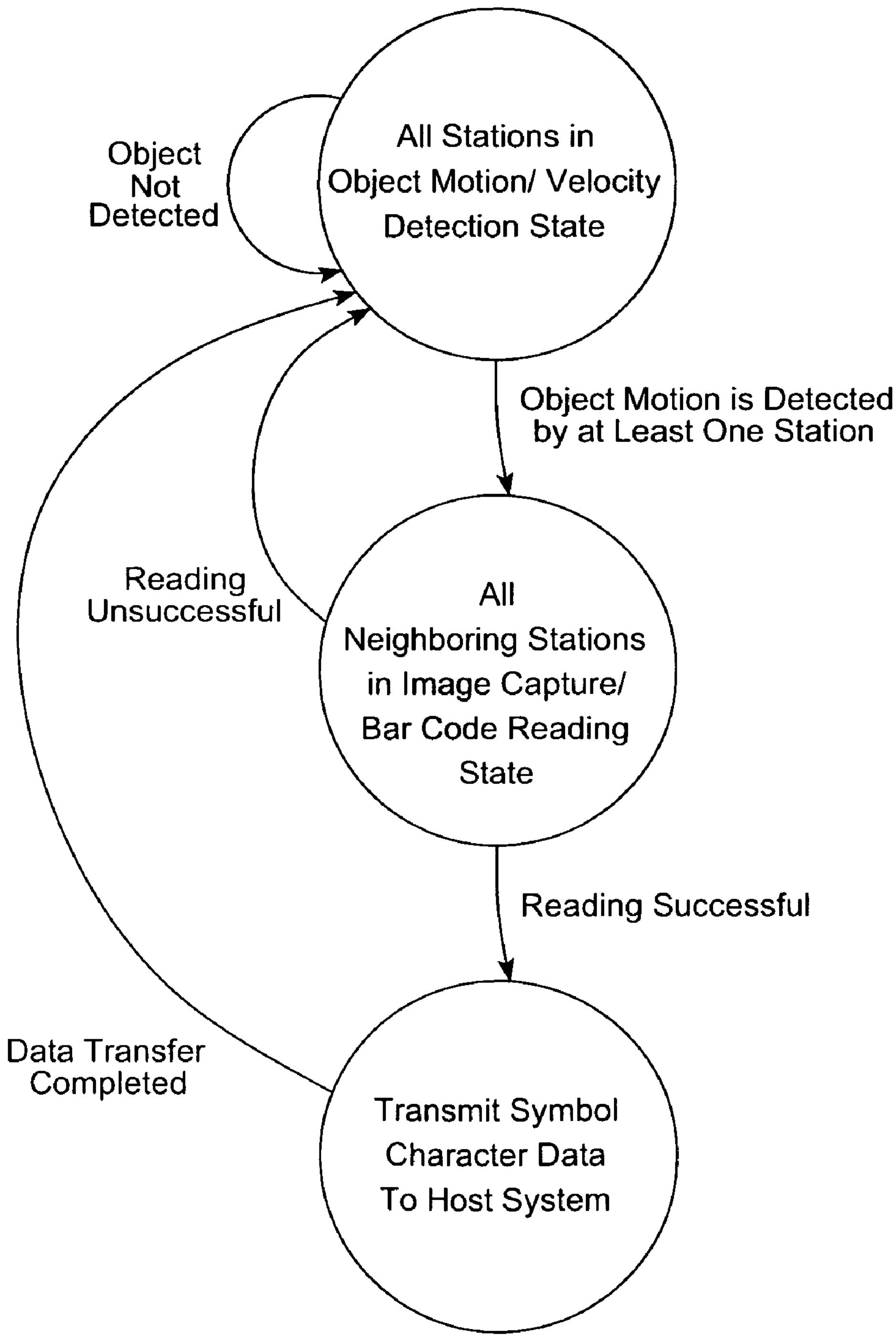
FIG. 9F3

State Transitions in the System of the Present Invention with Local Control
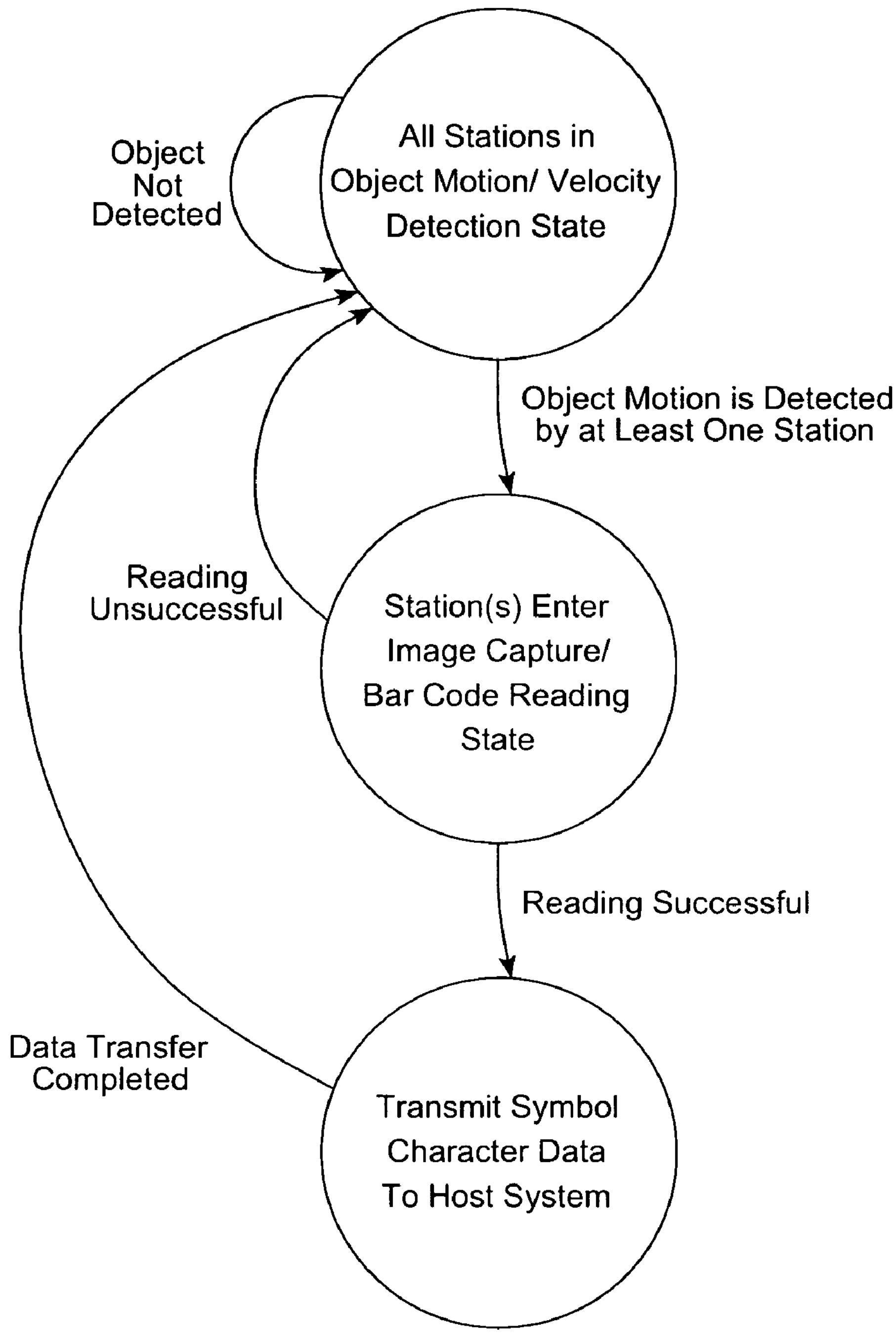
FIG. 10F1

State Transitions in the System of the Present Invention with Local Control with Global Over-Driving of Nearest Neighboring Stations
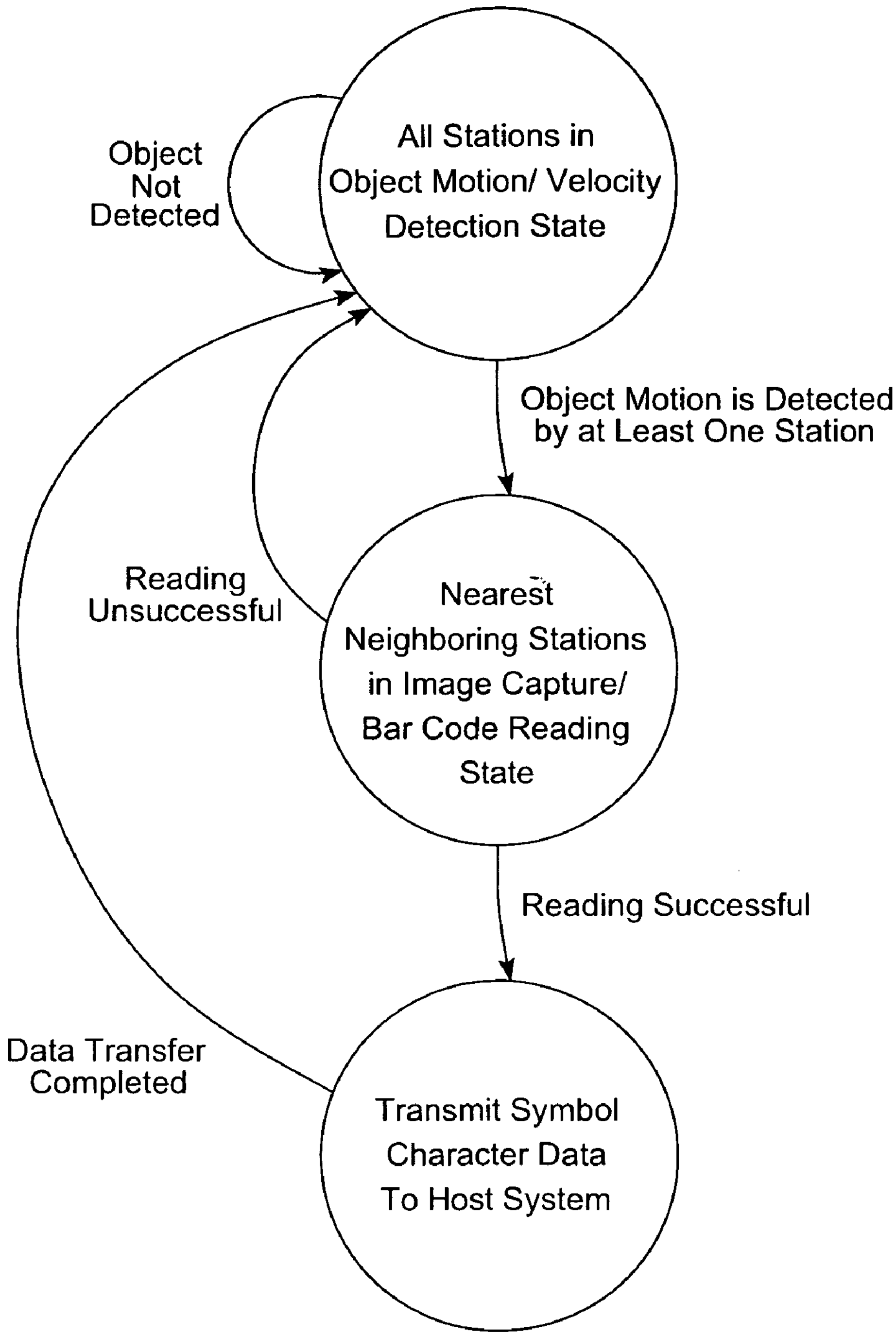
FIG. 10F2

State Transitions in the System of the Present Invention with Local Control with Global Over-Driving of All Neighboring Stations
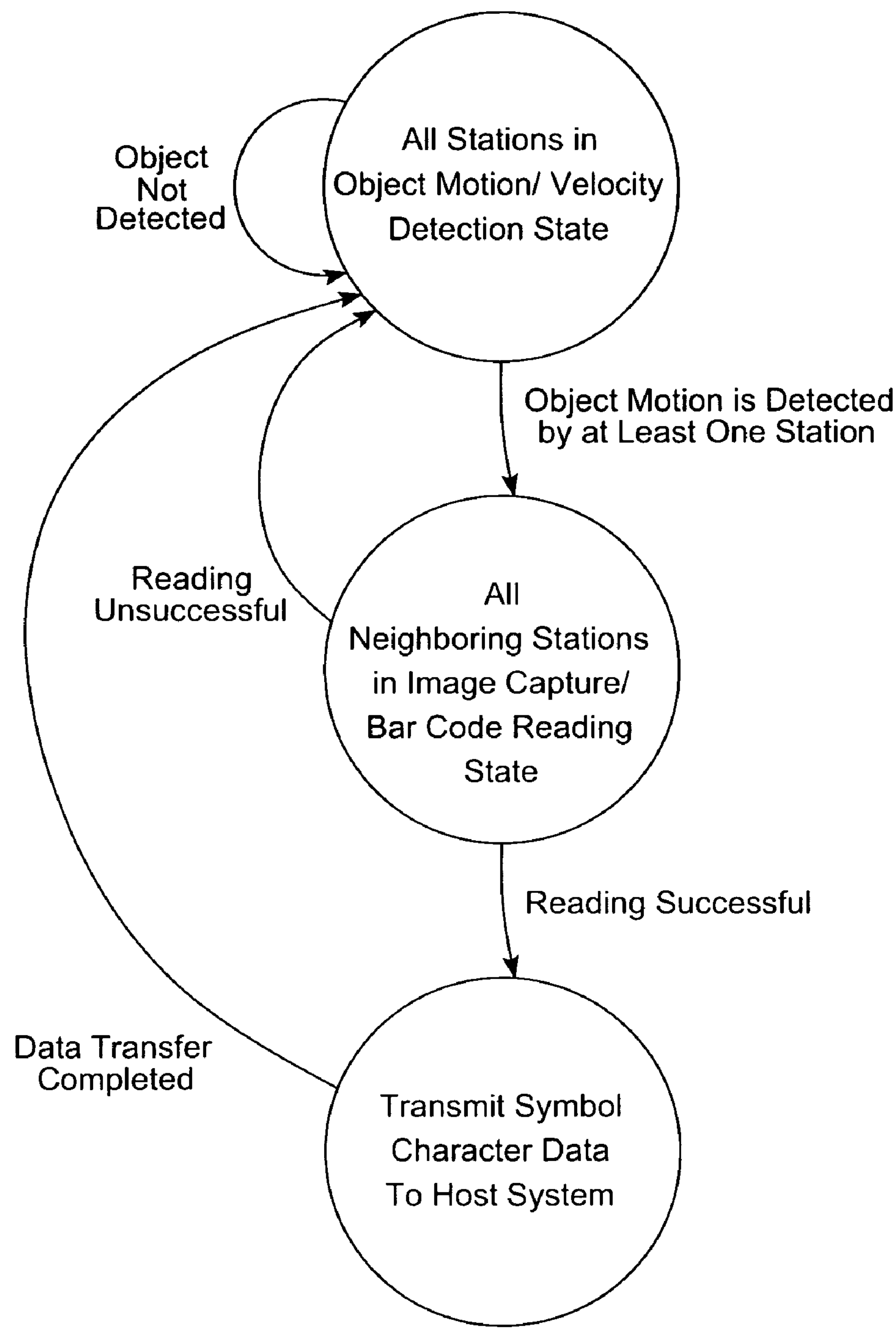
FIG. 10F3

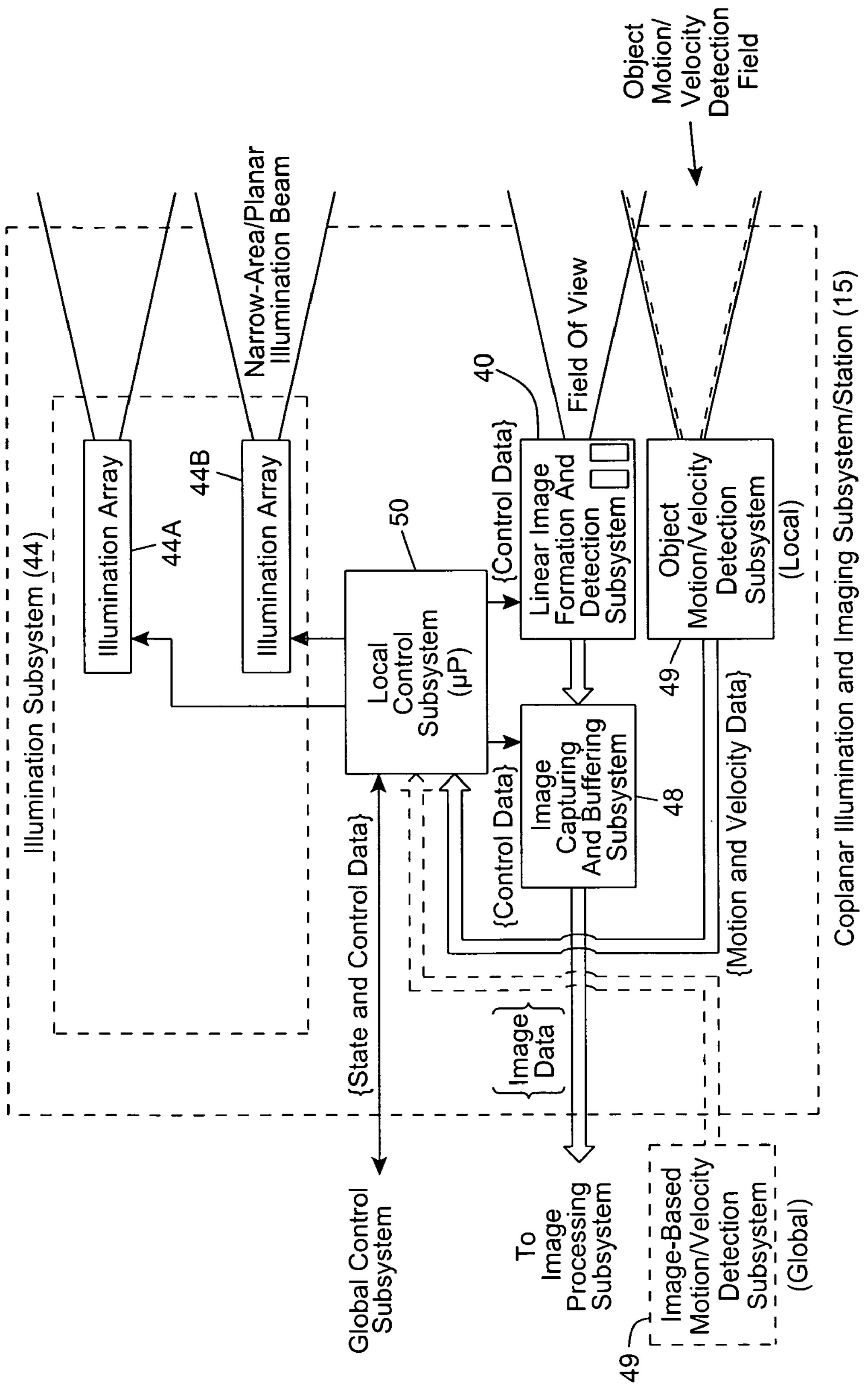
FIG. 11B1

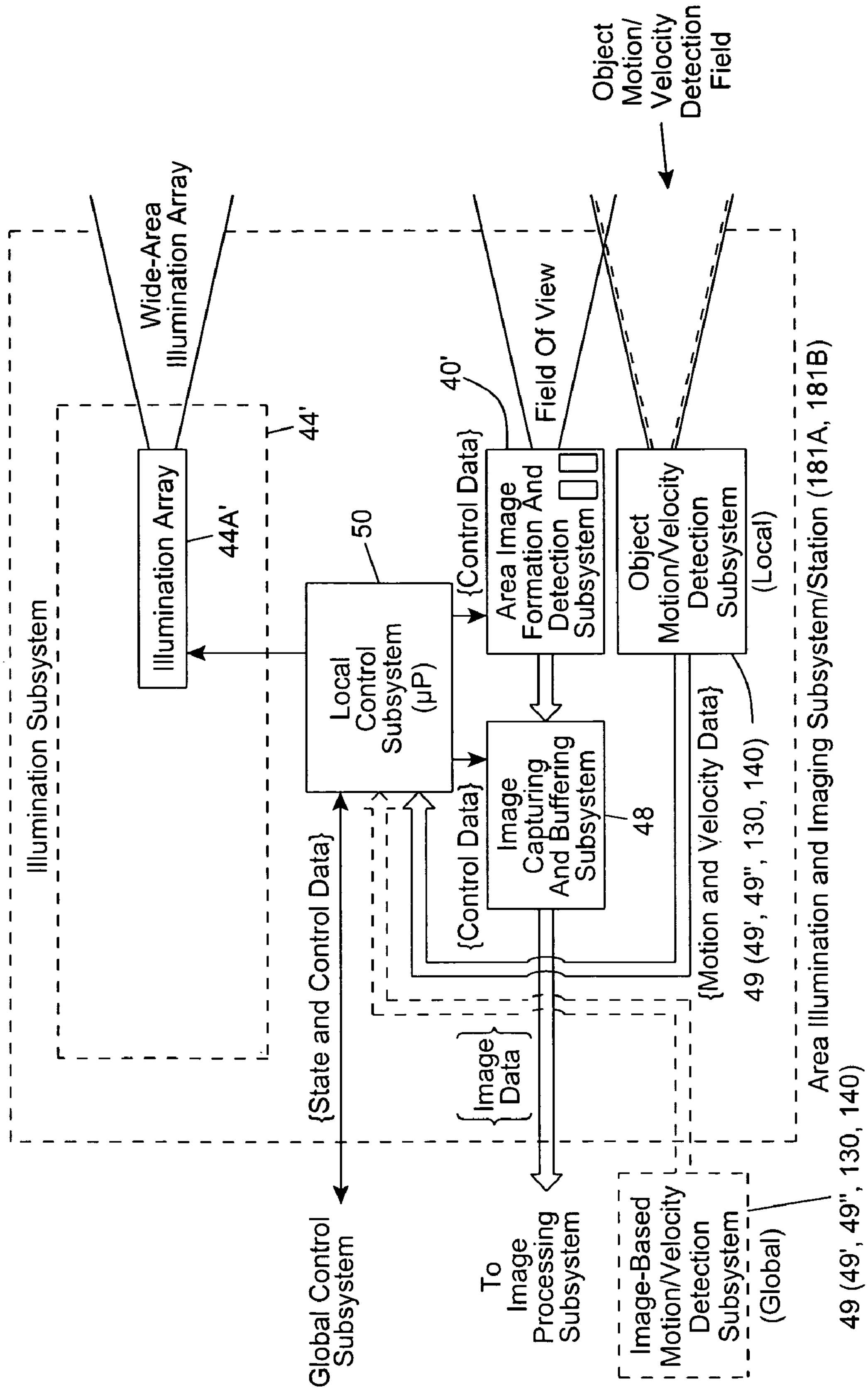
FIG. 11B2

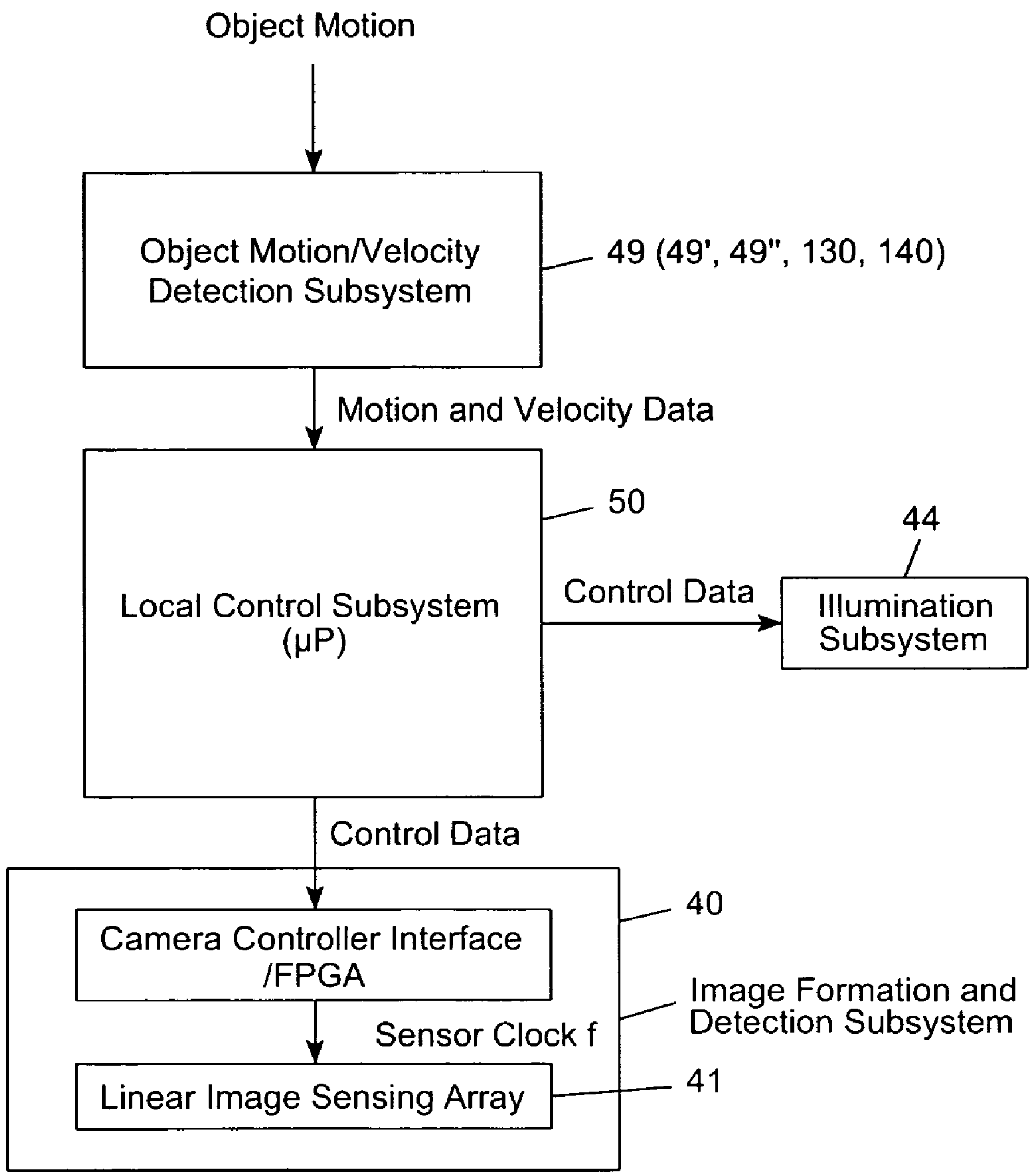
FIG. 11C1

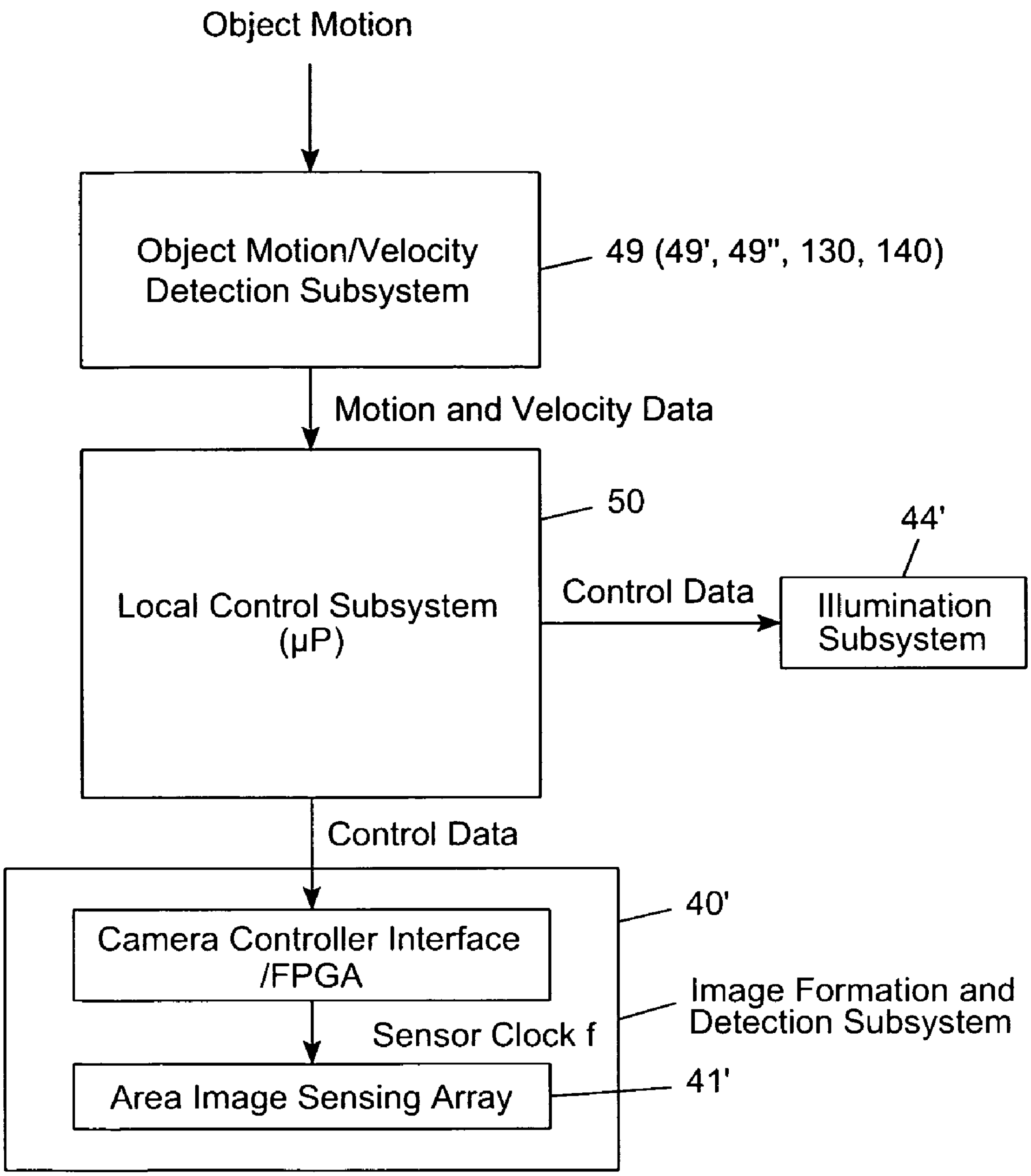
FIG. 11C2

State Transitions in the System of the Present Invention with Local Control
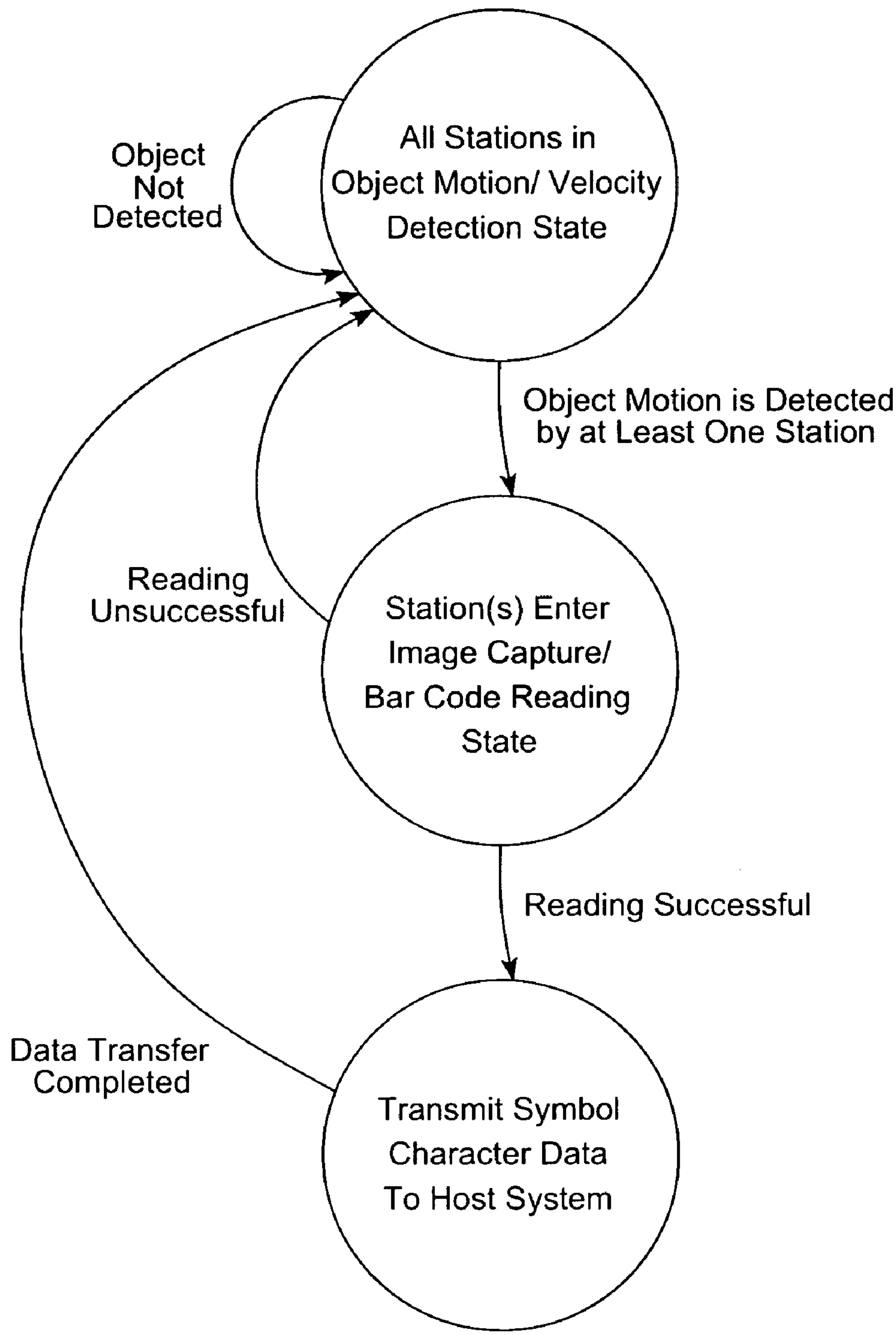
FIG. 11D1

State Transitions in the System of the Present Invention with Local Control with Global Over-Driving of Nearest Neighboring Stations
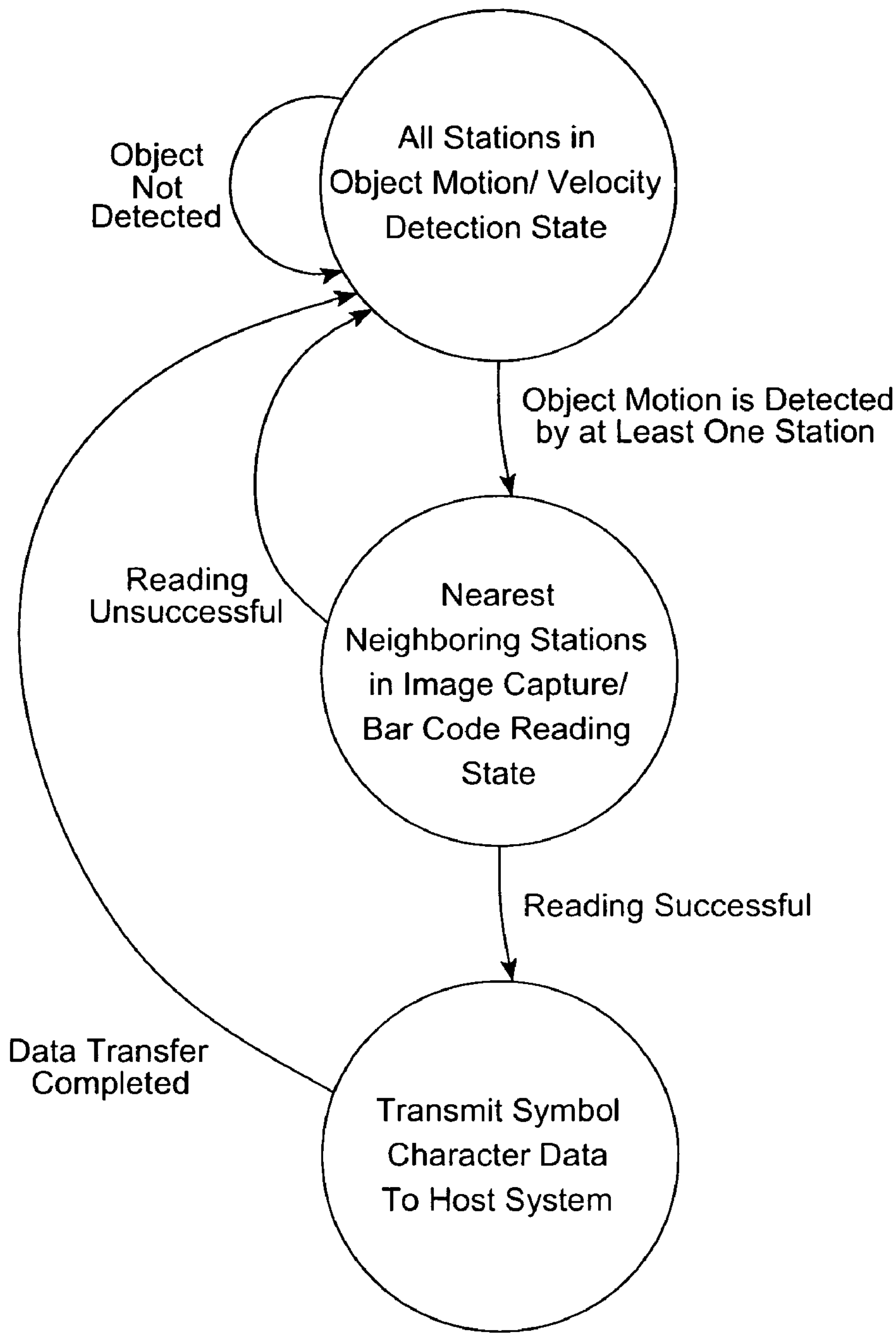
FIG. 11D2

State Transitions in the System of the Present Invention with Local Control with Global Over-Driving of All Neighboring Stations
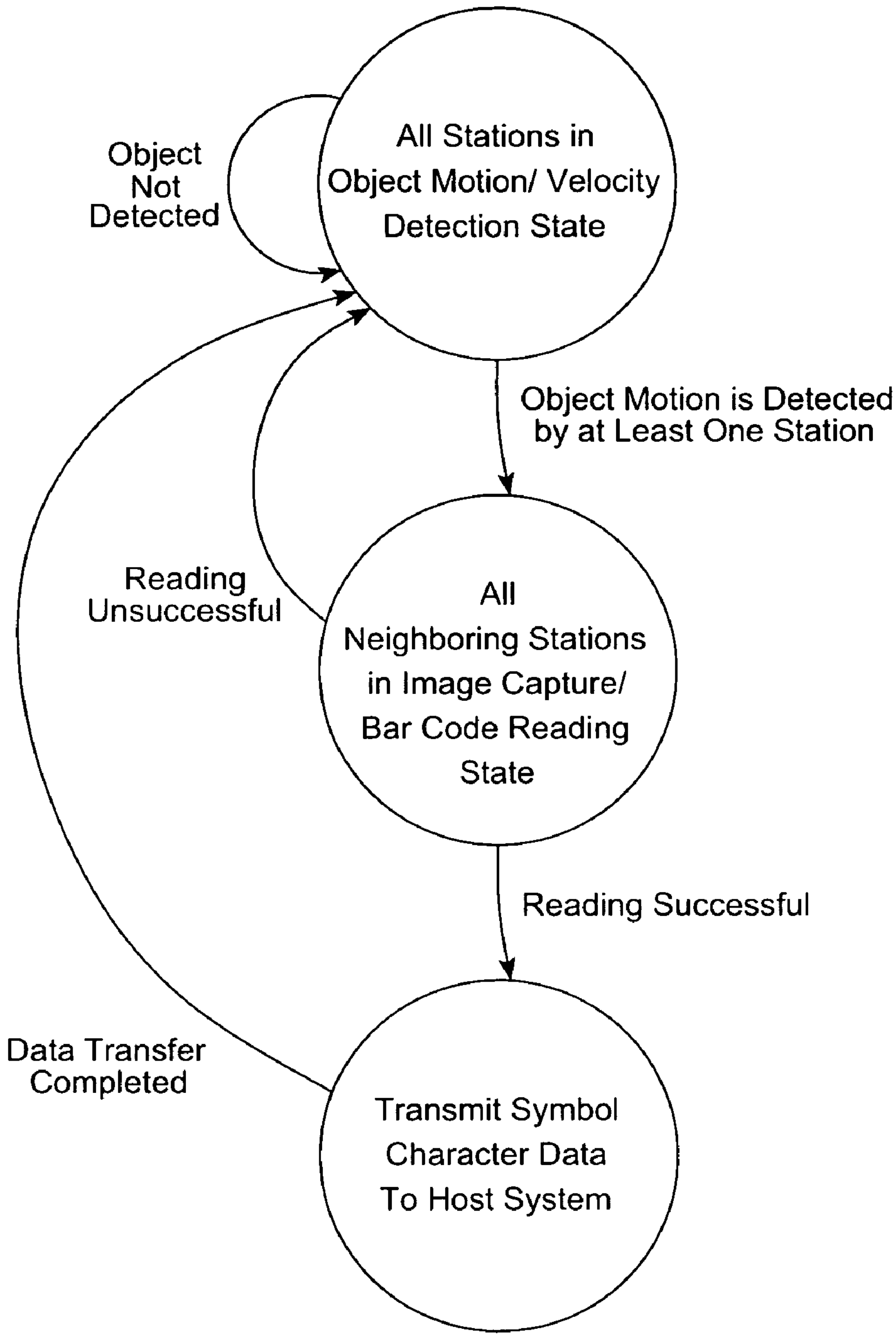
FIG. 11D3

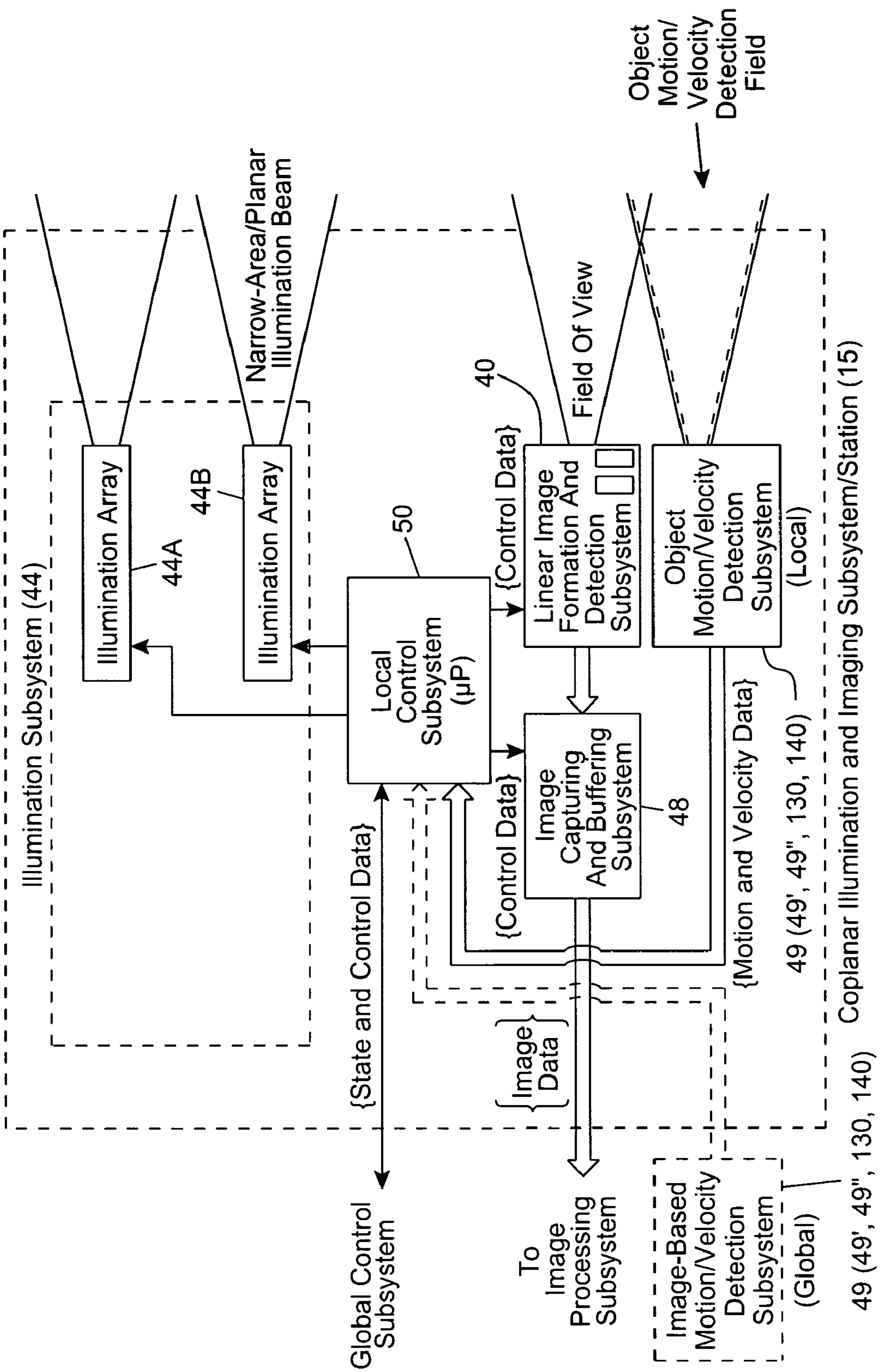
FIG. 12B1

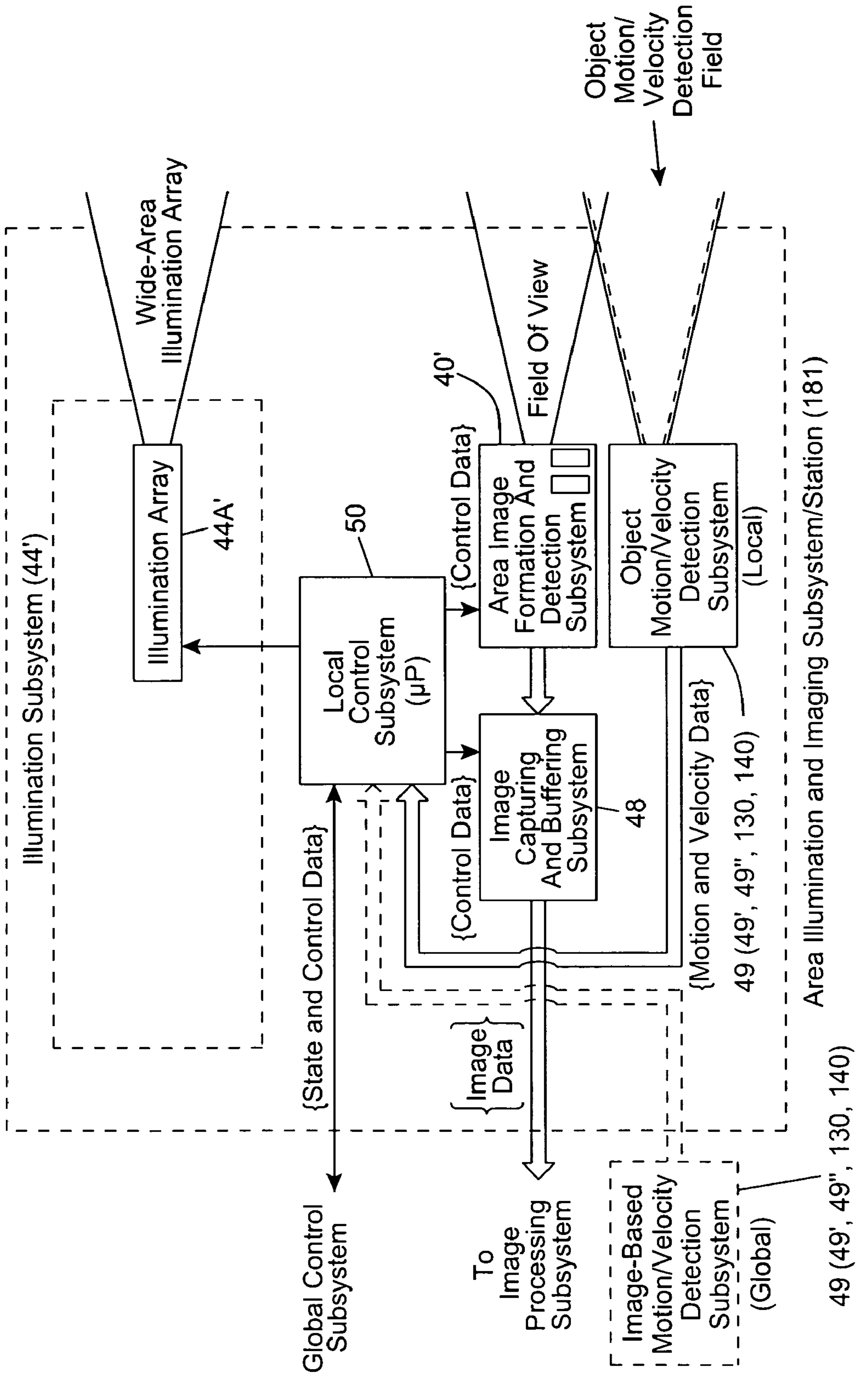
FIG. 12B2

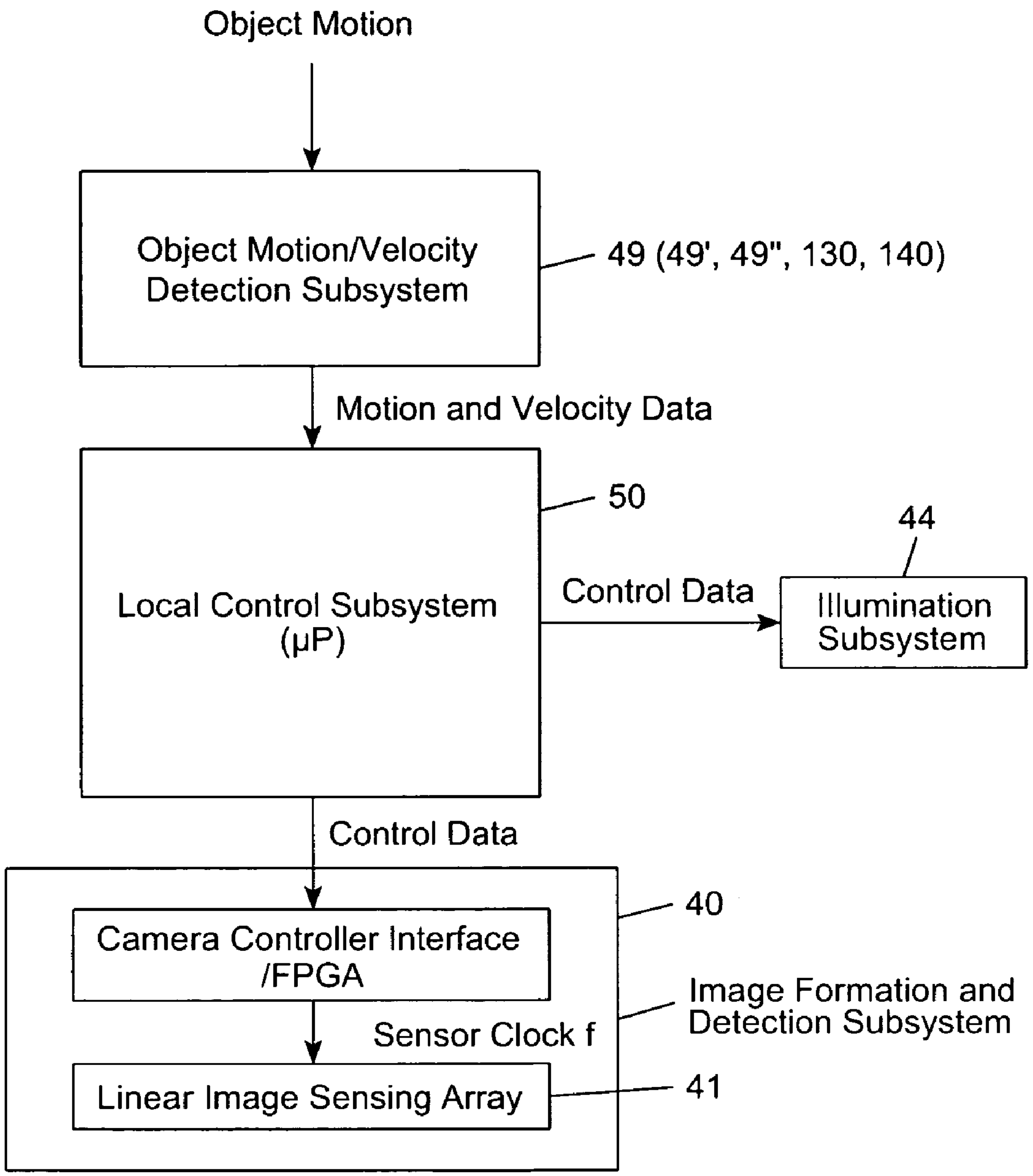
FIG. 12C1

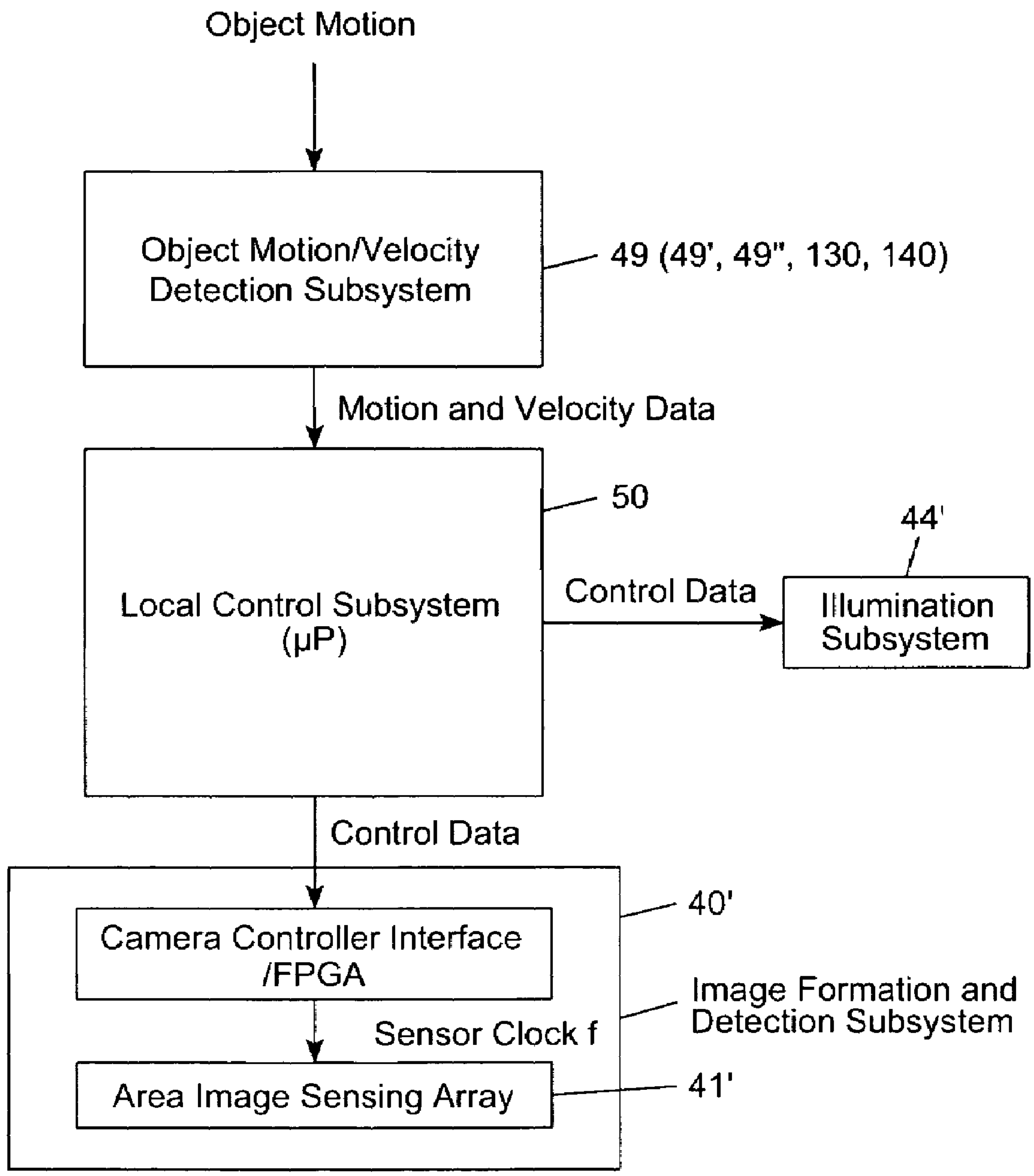
FIG. 12C2

State Transitions in the System of the Present Invention with Local Control
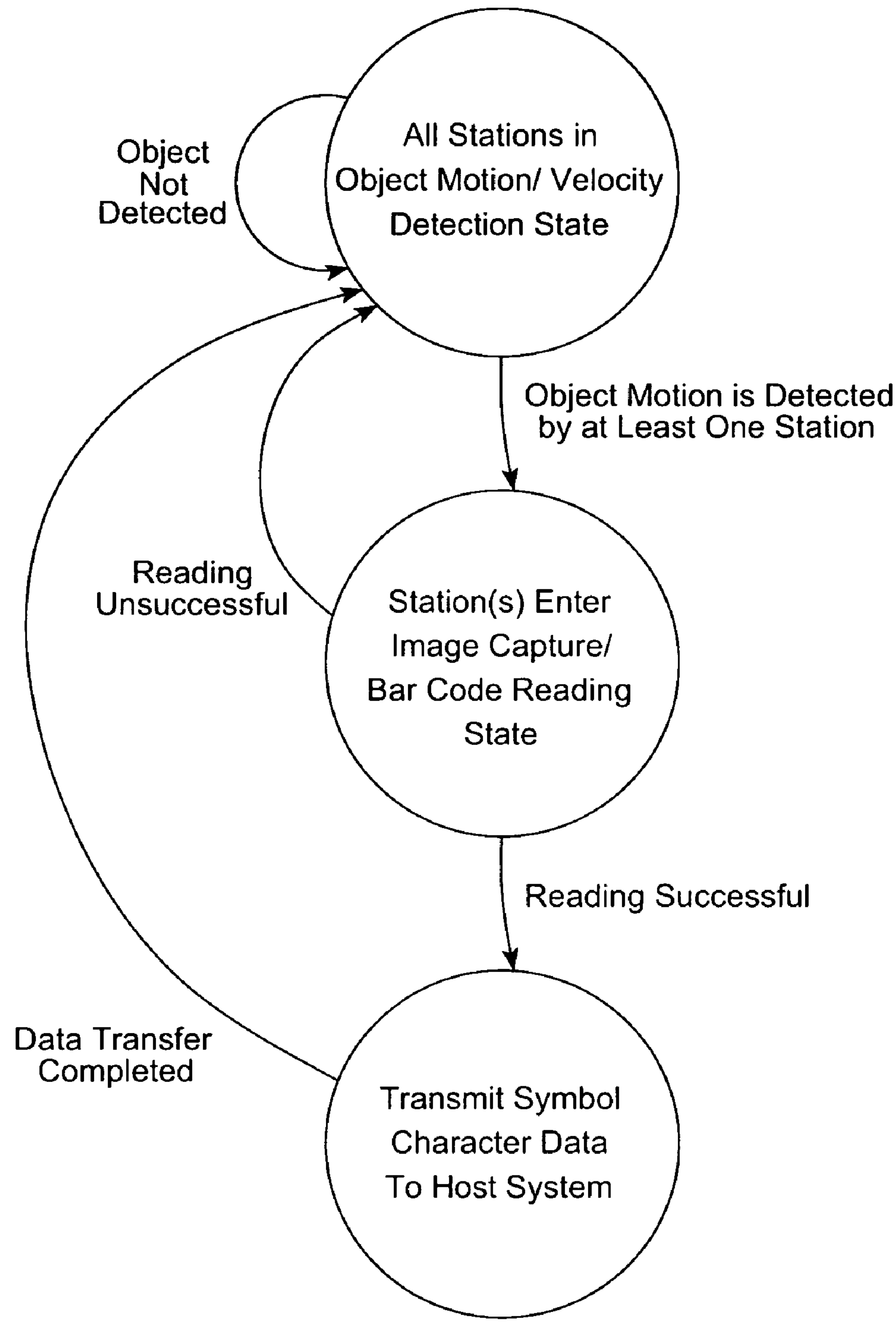
FIG. 12D1

State Transitions in the System of the Present Invention with Local Control with Global Over-Driving of Nearest Neighboring Stations
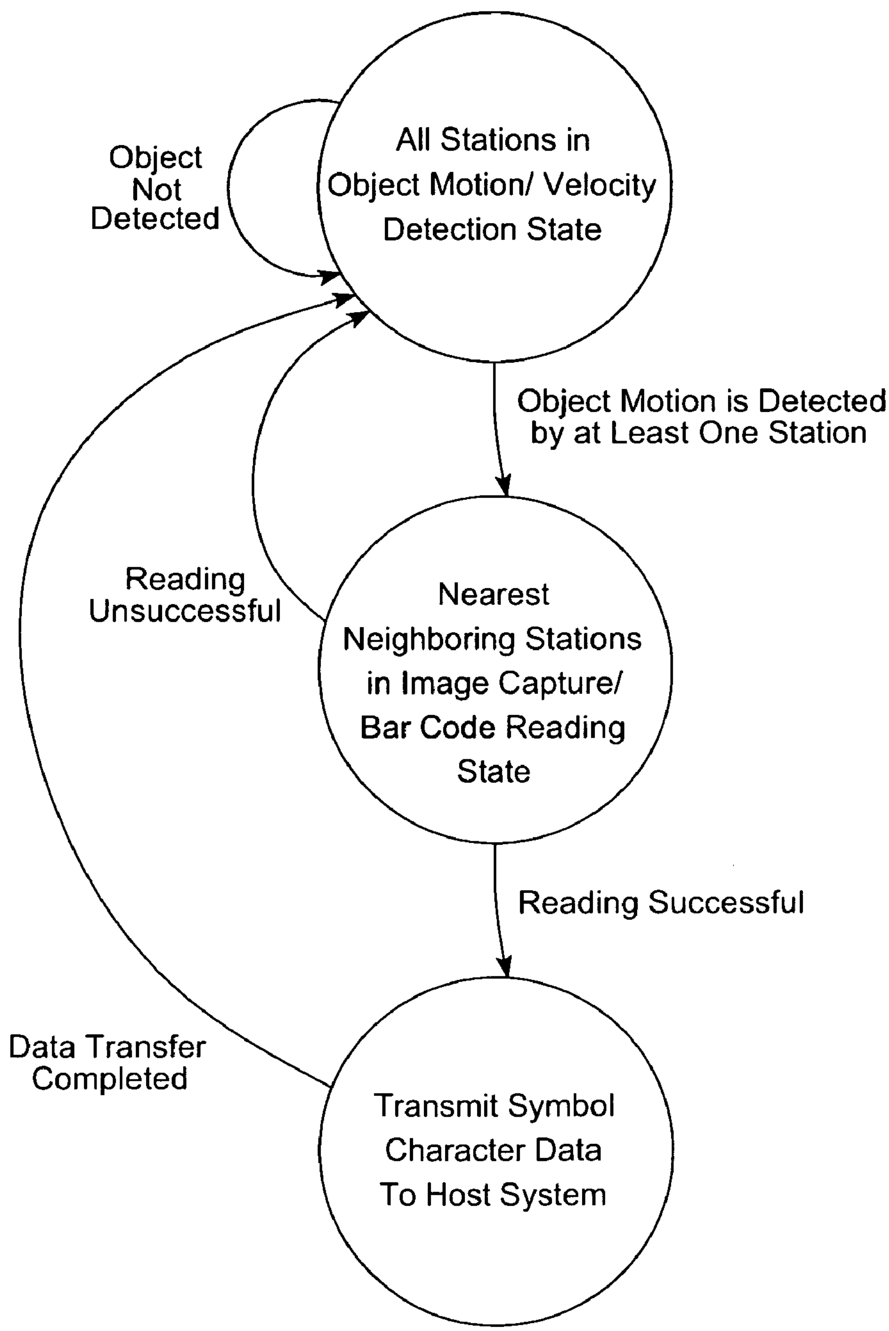
FIG. 12D2

State Transitions in the System of the Present Invention with Local Control with Global Over-Driving of All Neighboring Stations
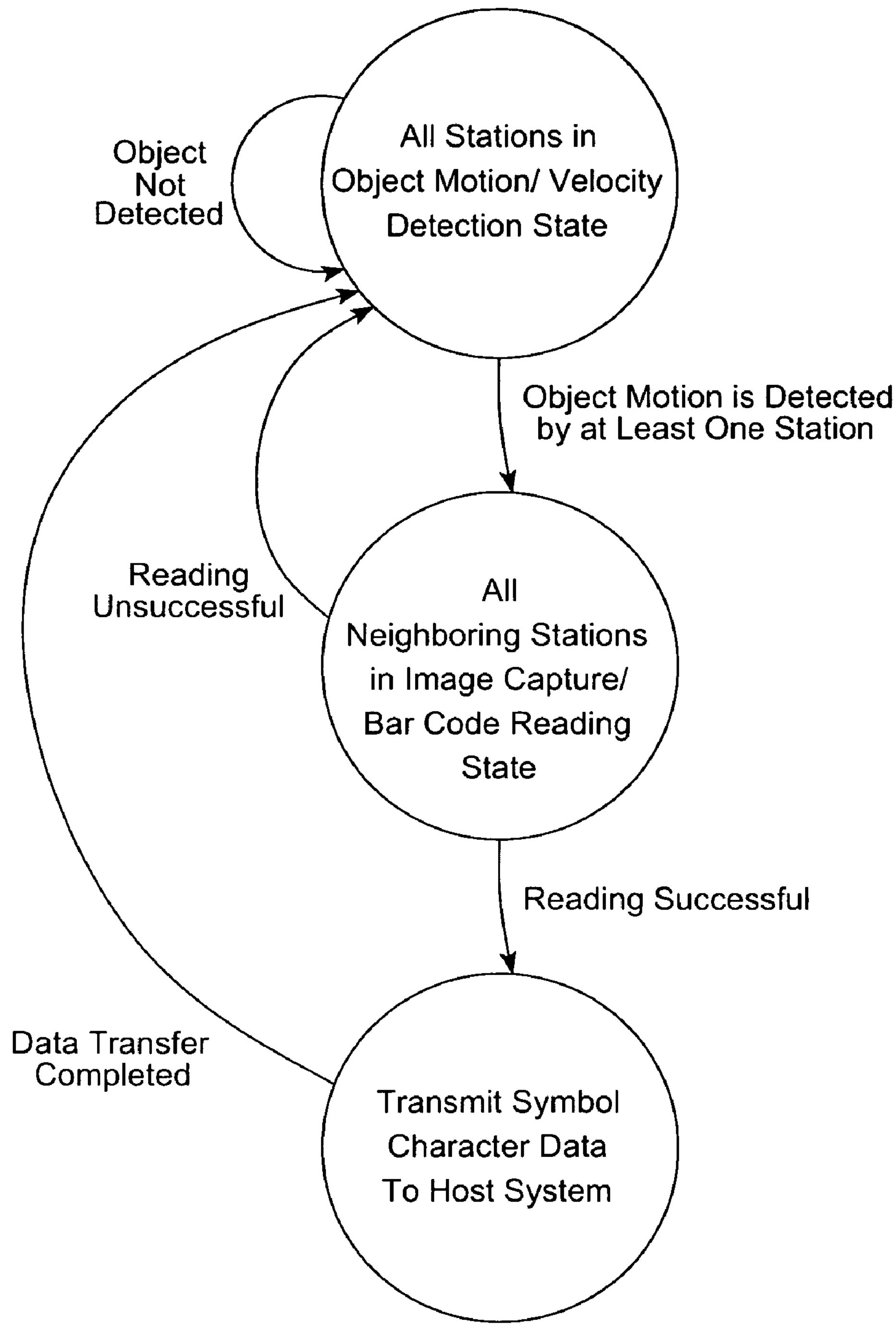
FIG. 12D3

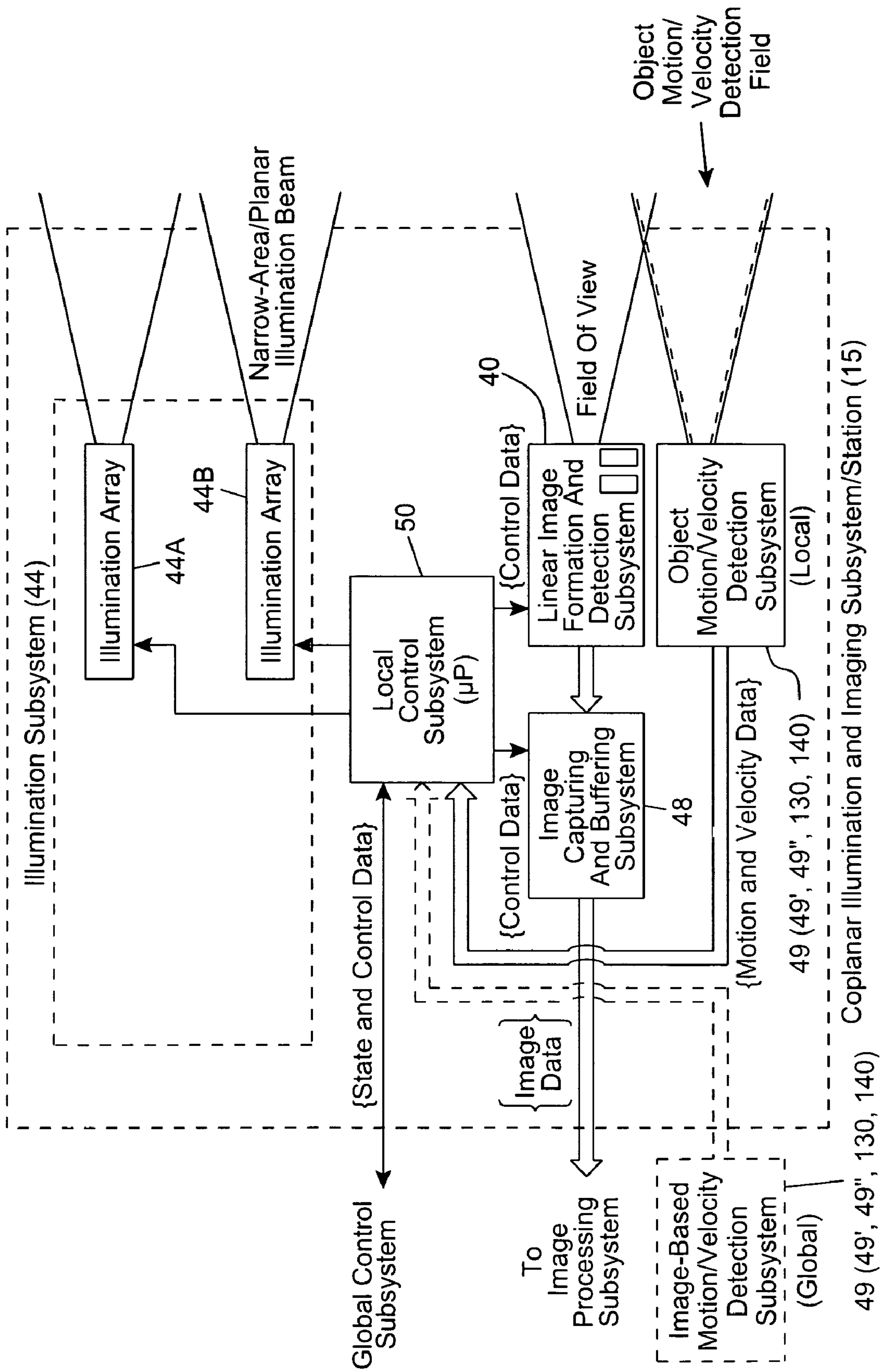
FIG. 13B1

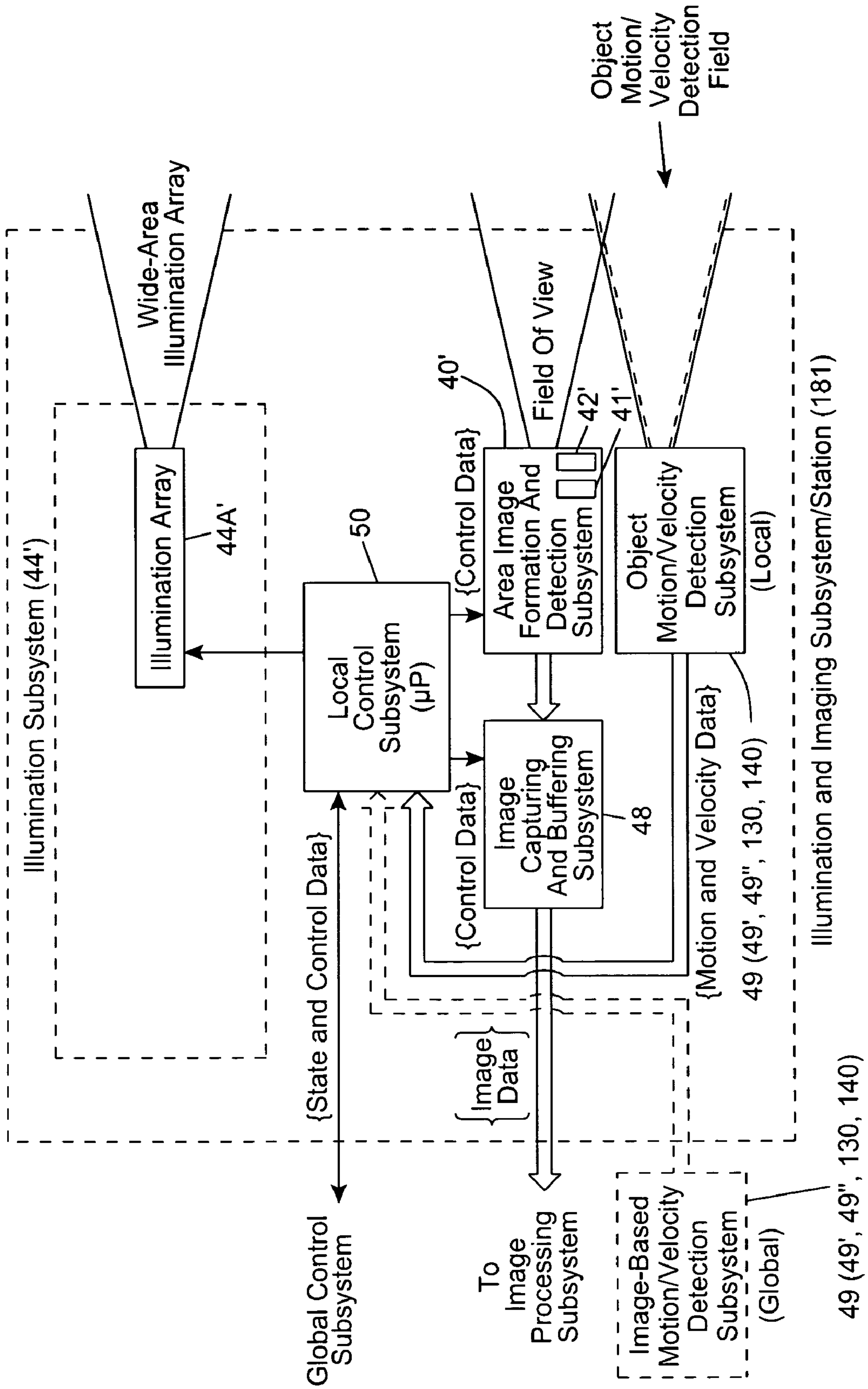
FIG. 13B2

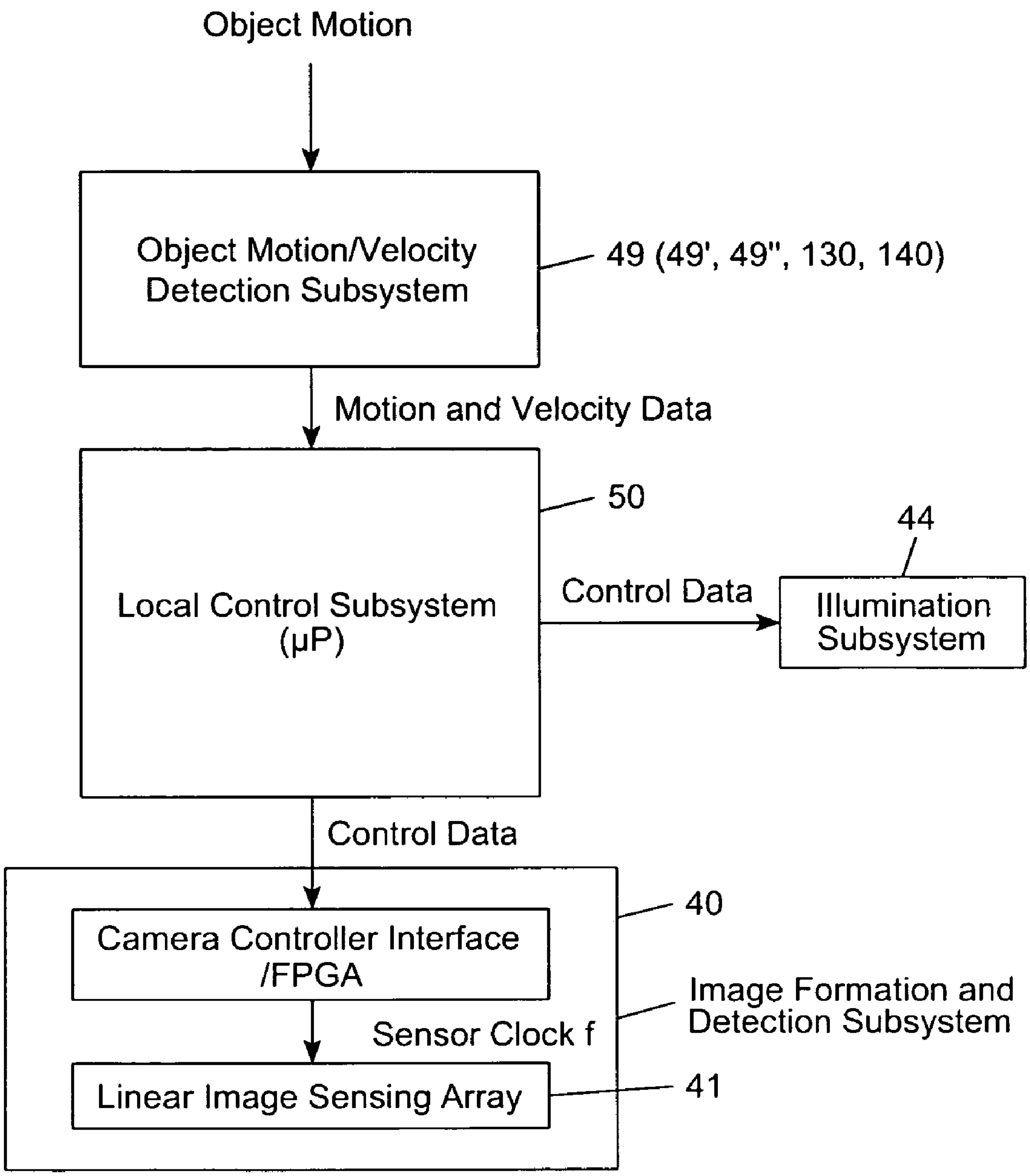
FIG. 13C1

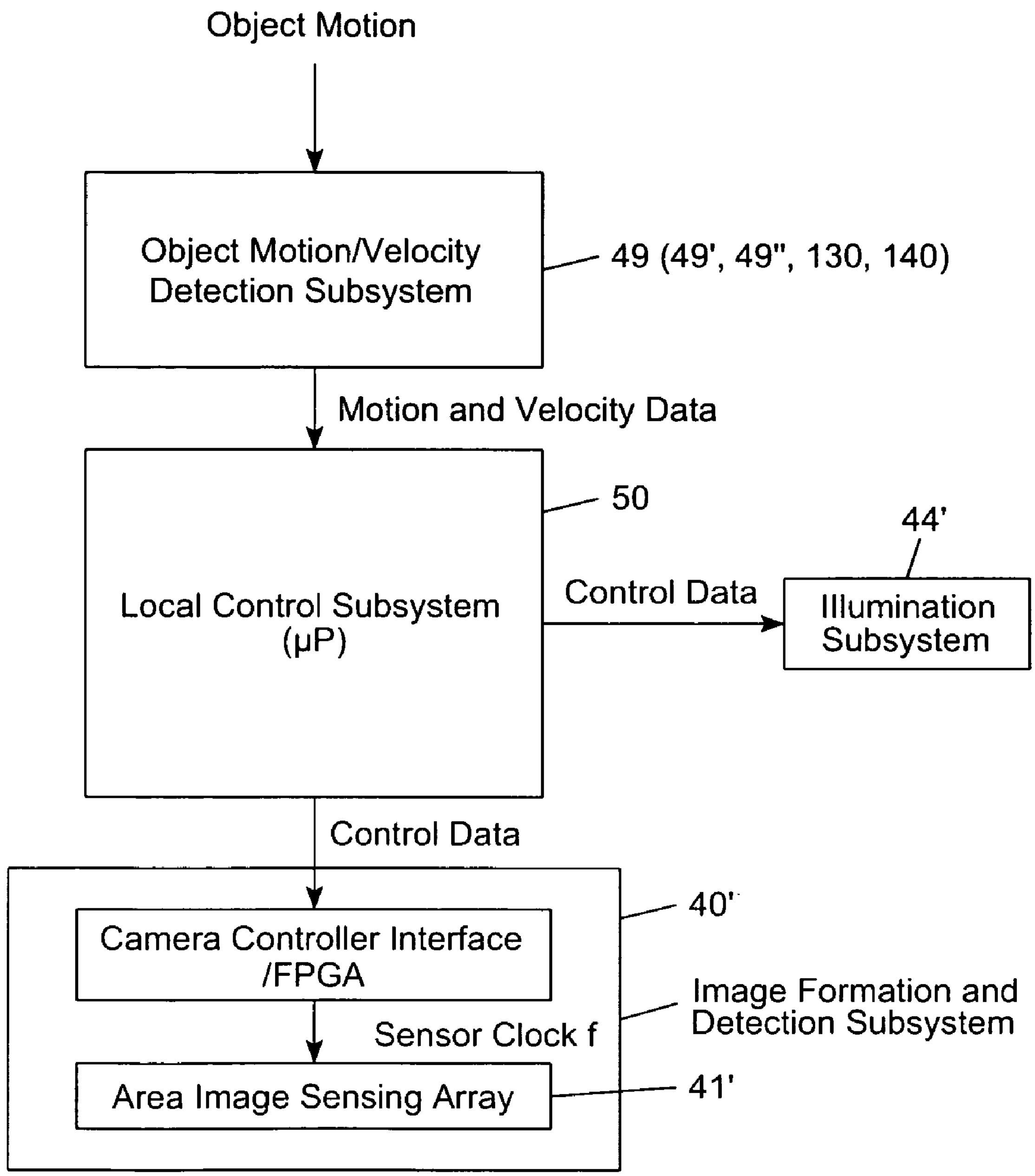
FIG. 13C2

State Transitions in the System of the Present Invention with Local Control
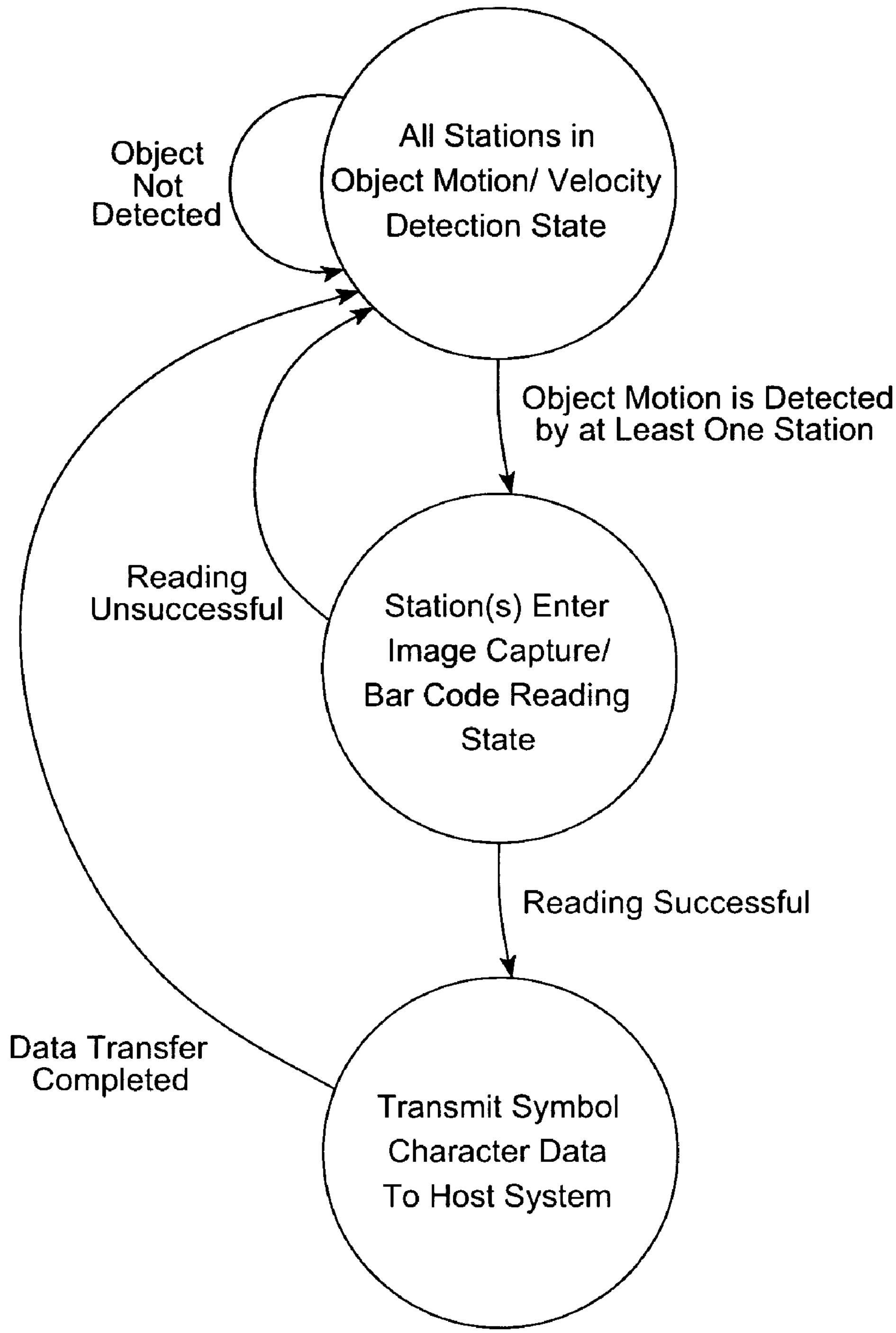
FIG. 13D1

State Transitions in the System of the Present Invention with Local Control with Global Over-Driving of Nearest Neighboring Stations
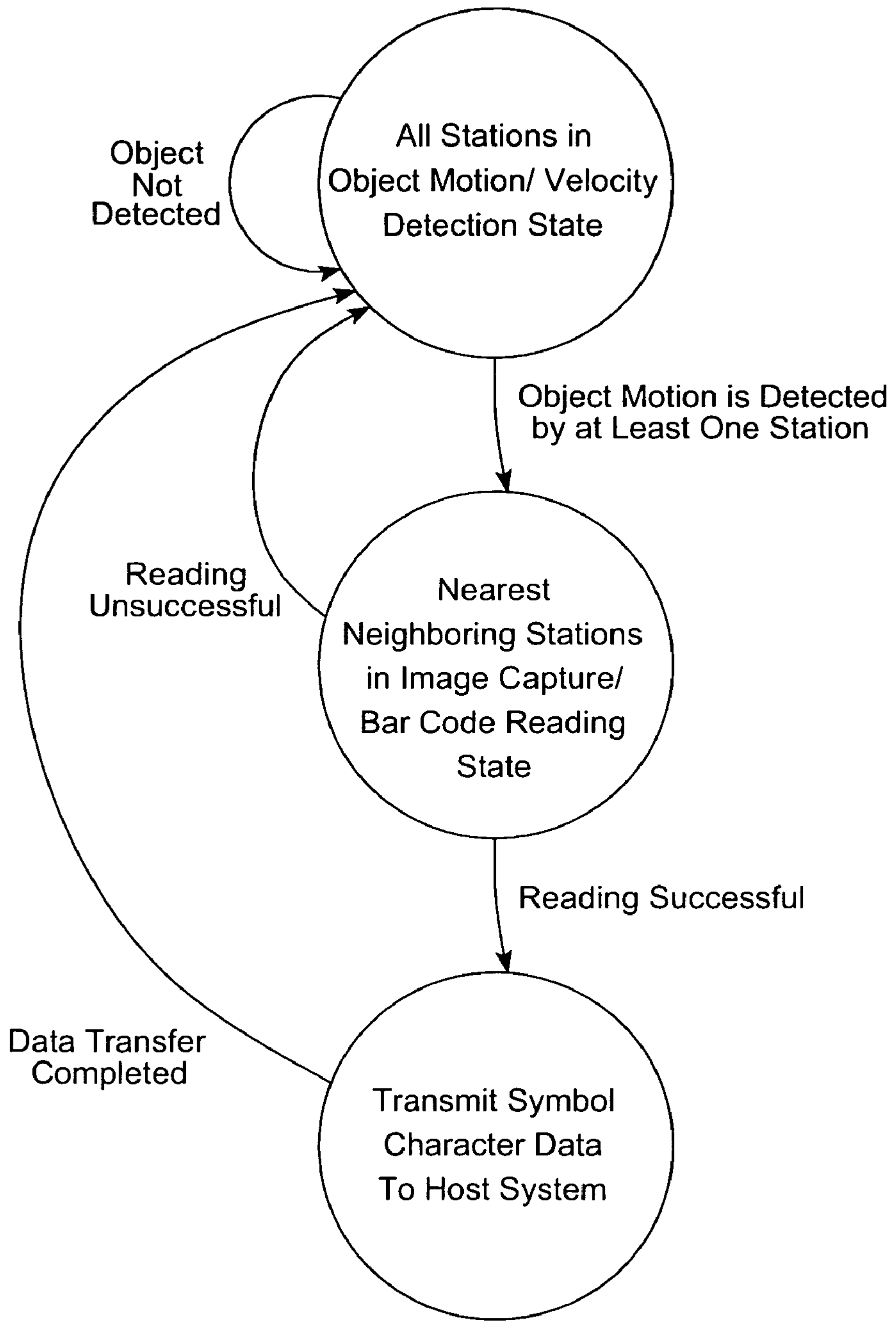
FIG. 13D2

State Transitions in the System of the Present Invention with Local Control with Global Over-Driving of All Neighboring Stations
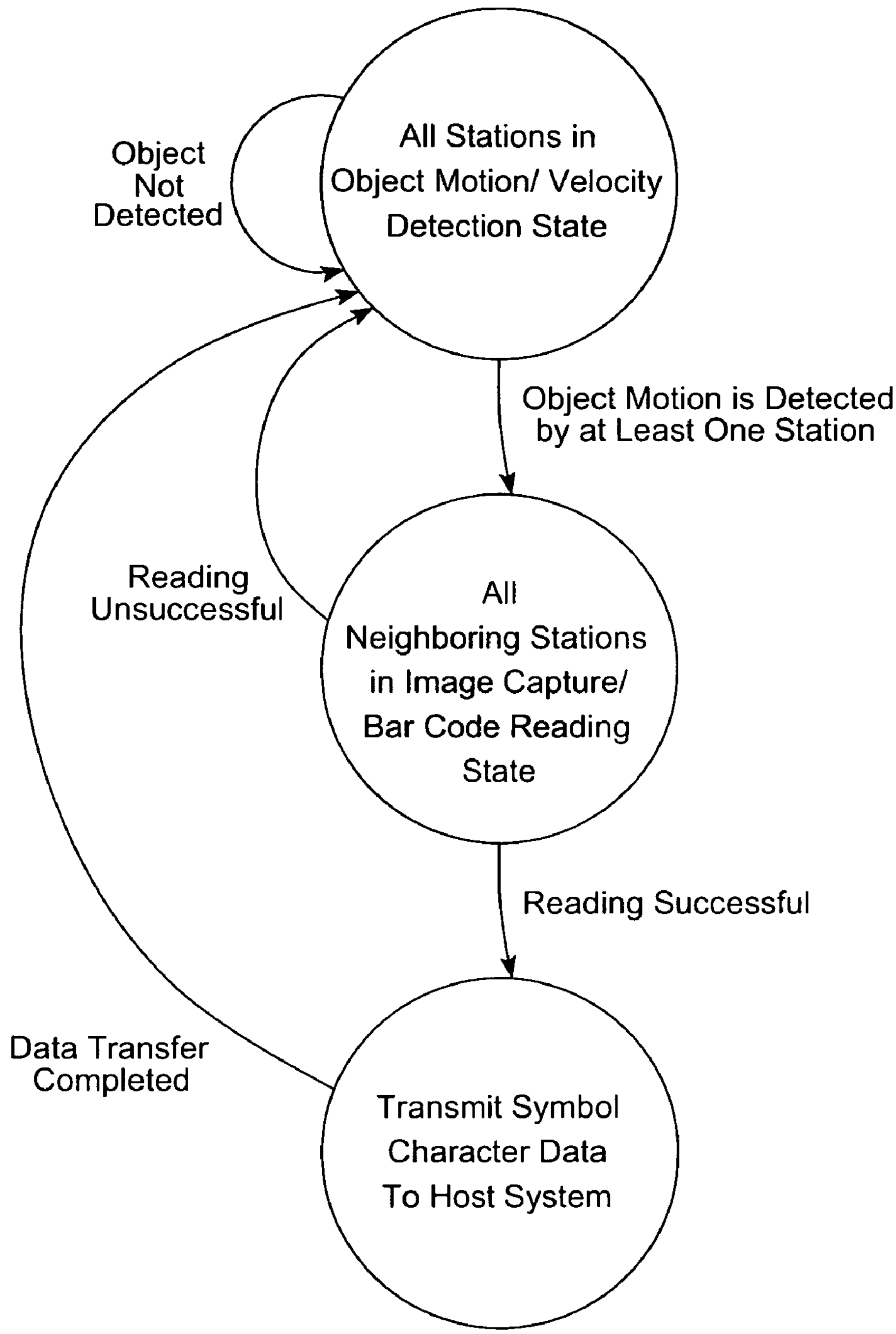
FIG. 13D3

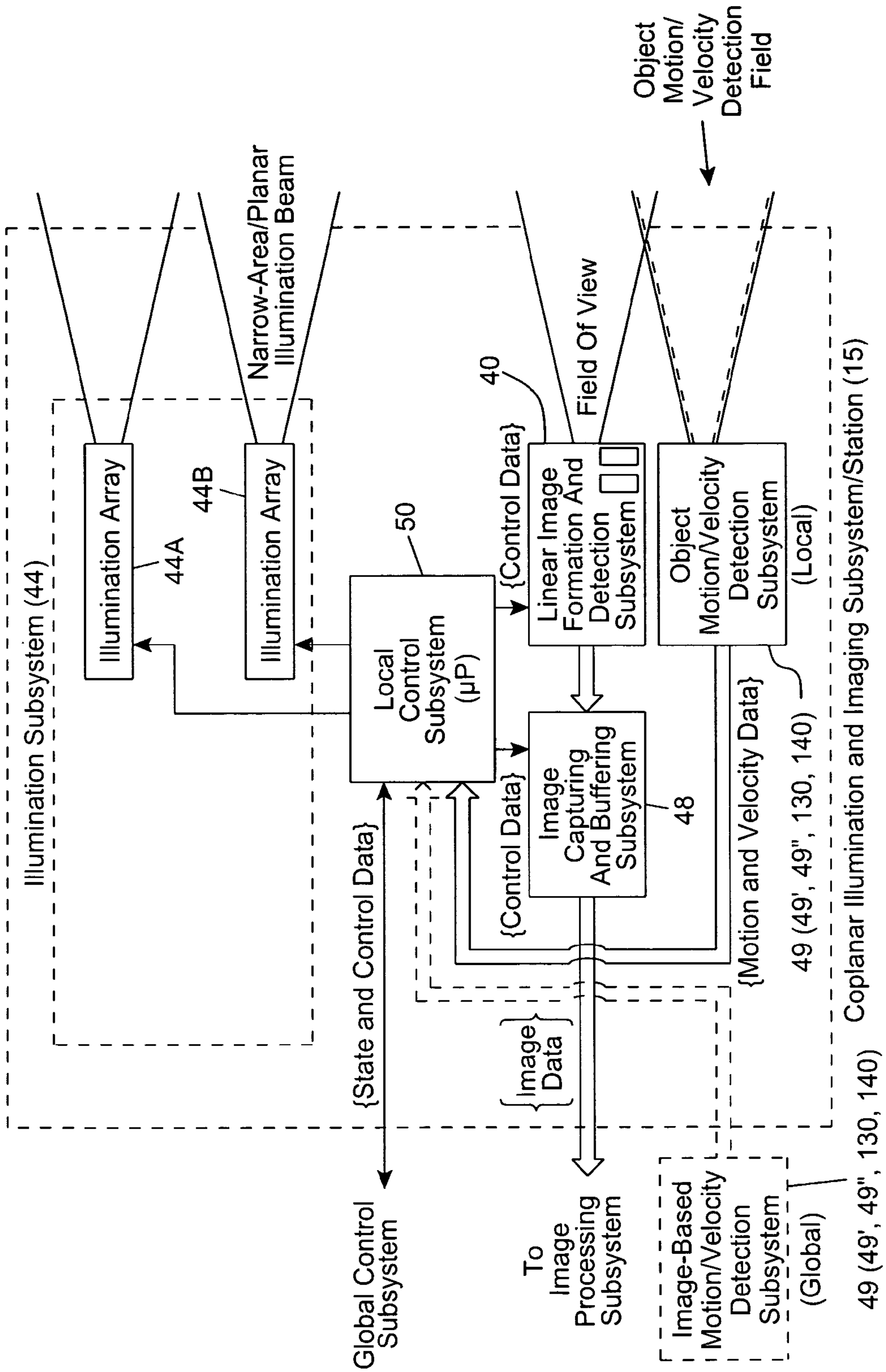
FIG. 14B1

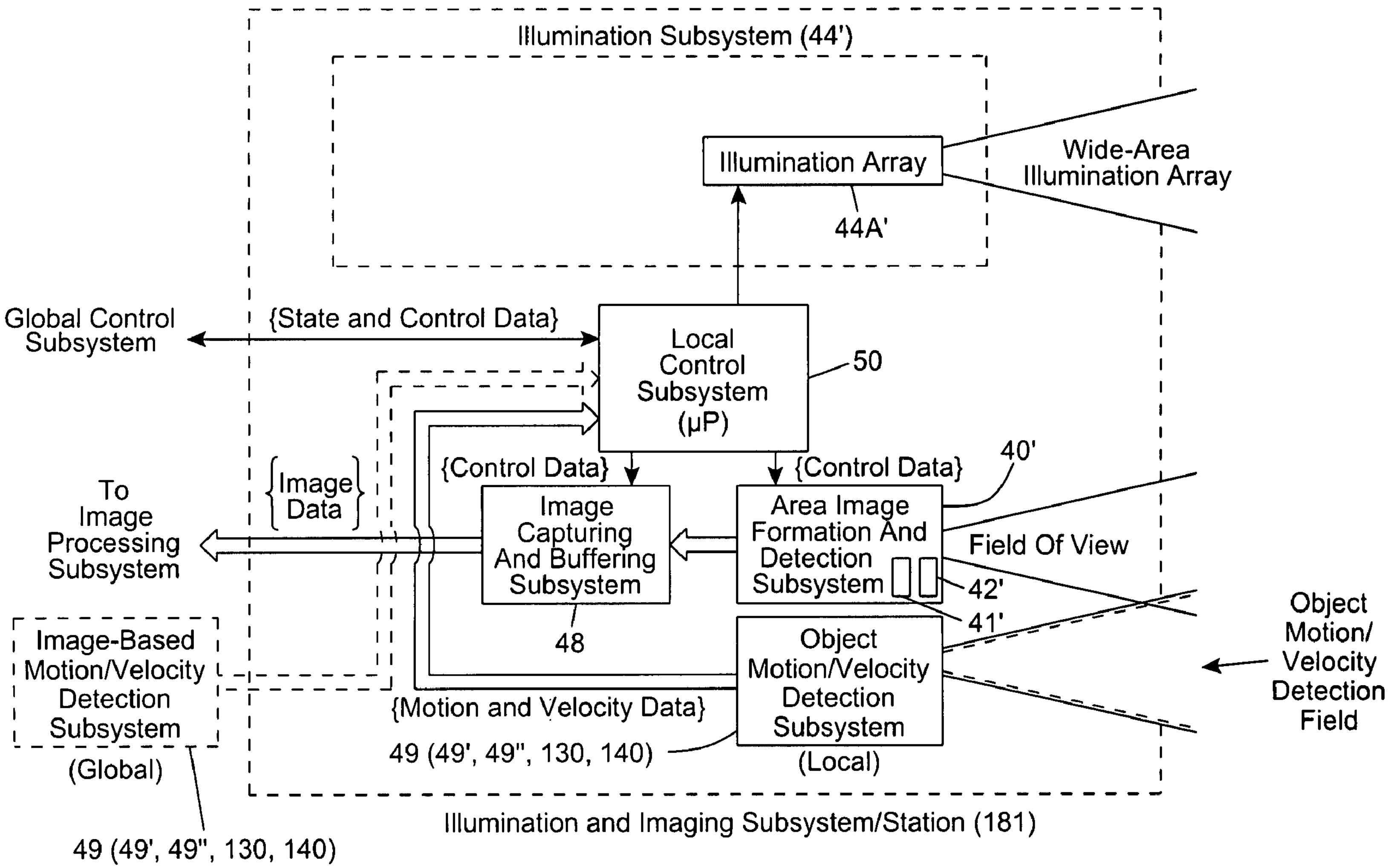
FIG. 14B2

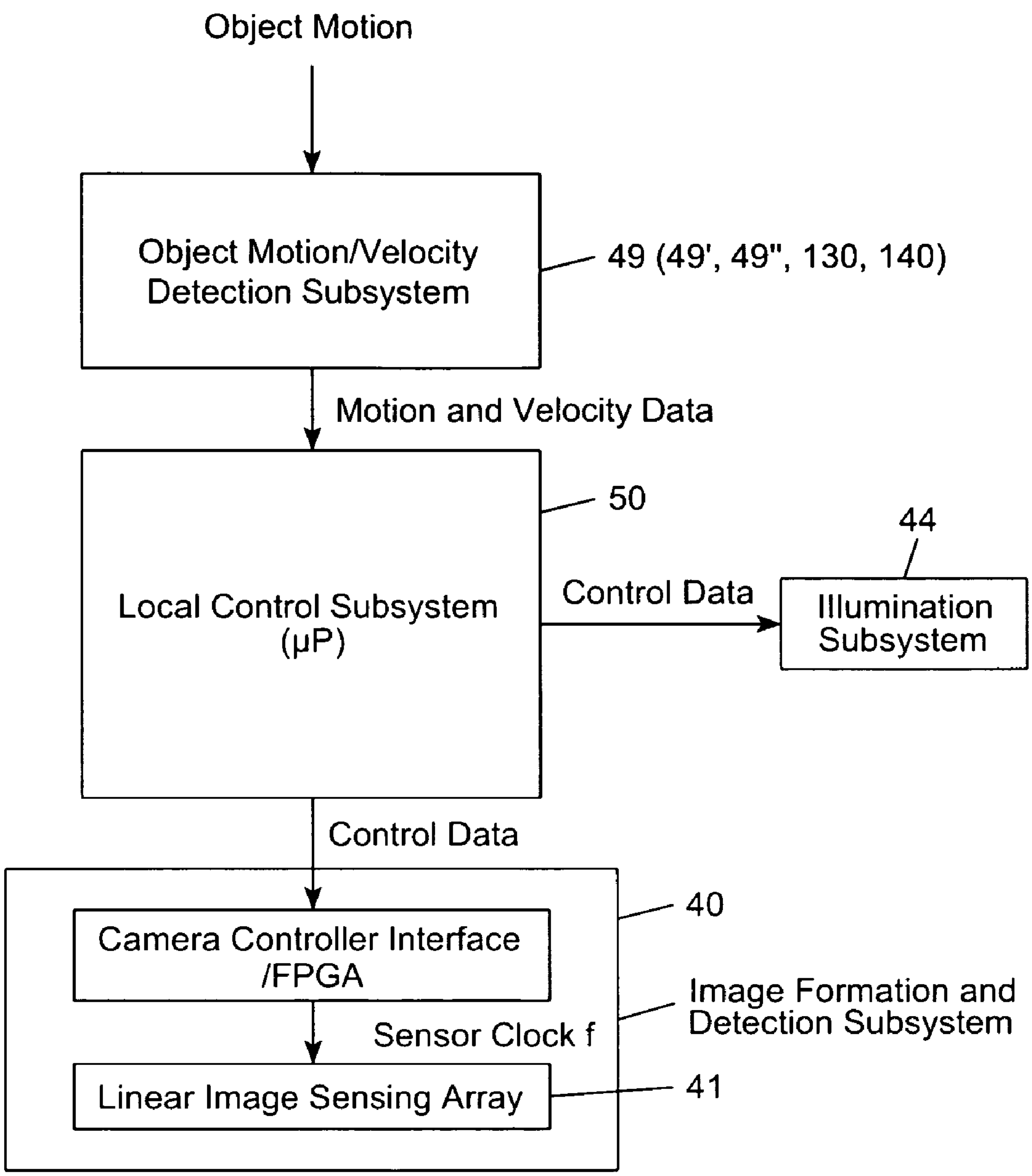
FIG. 14C1

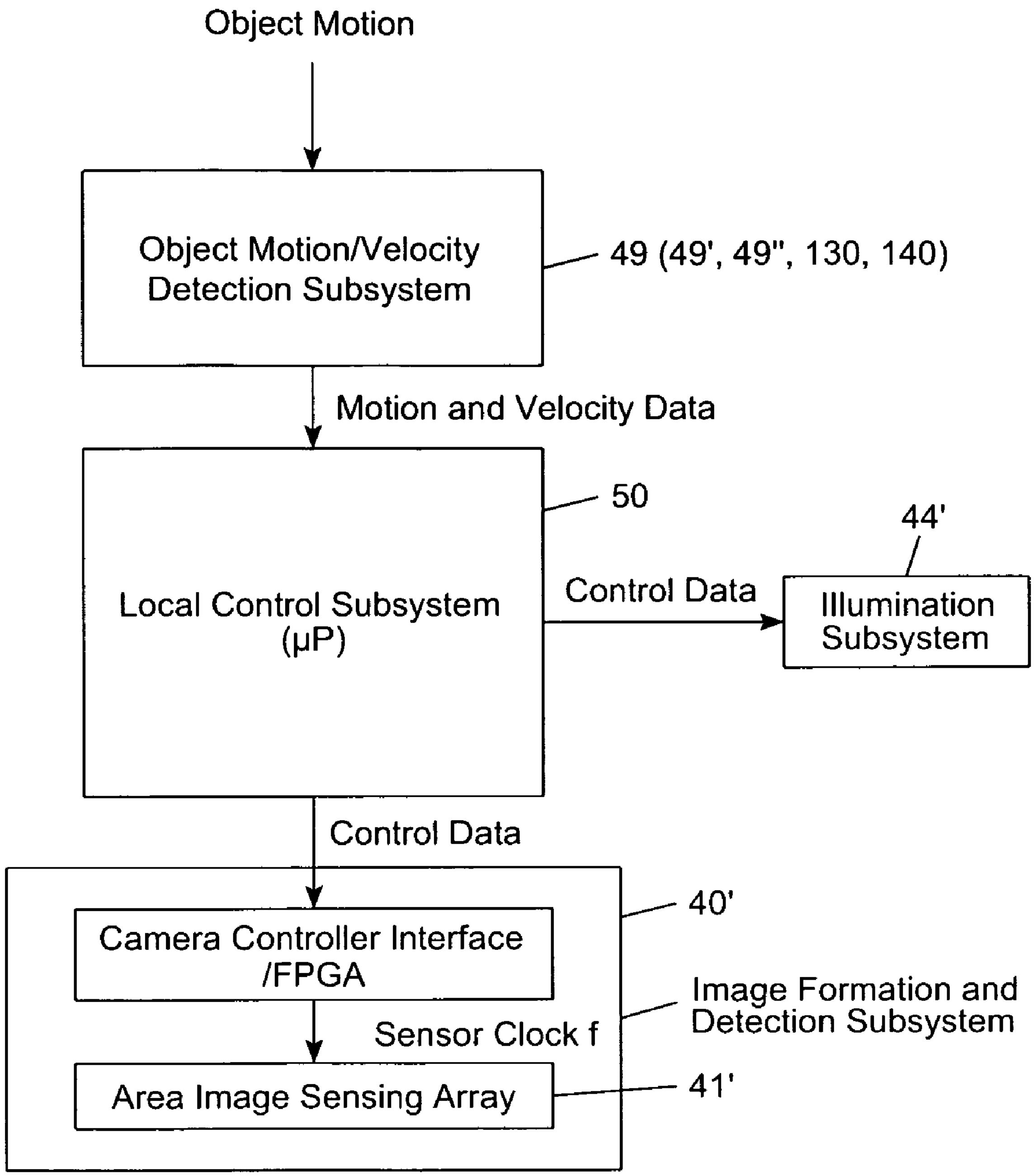
FIG. 14C2

State Transitions in the System of the Present Invention with Local Control
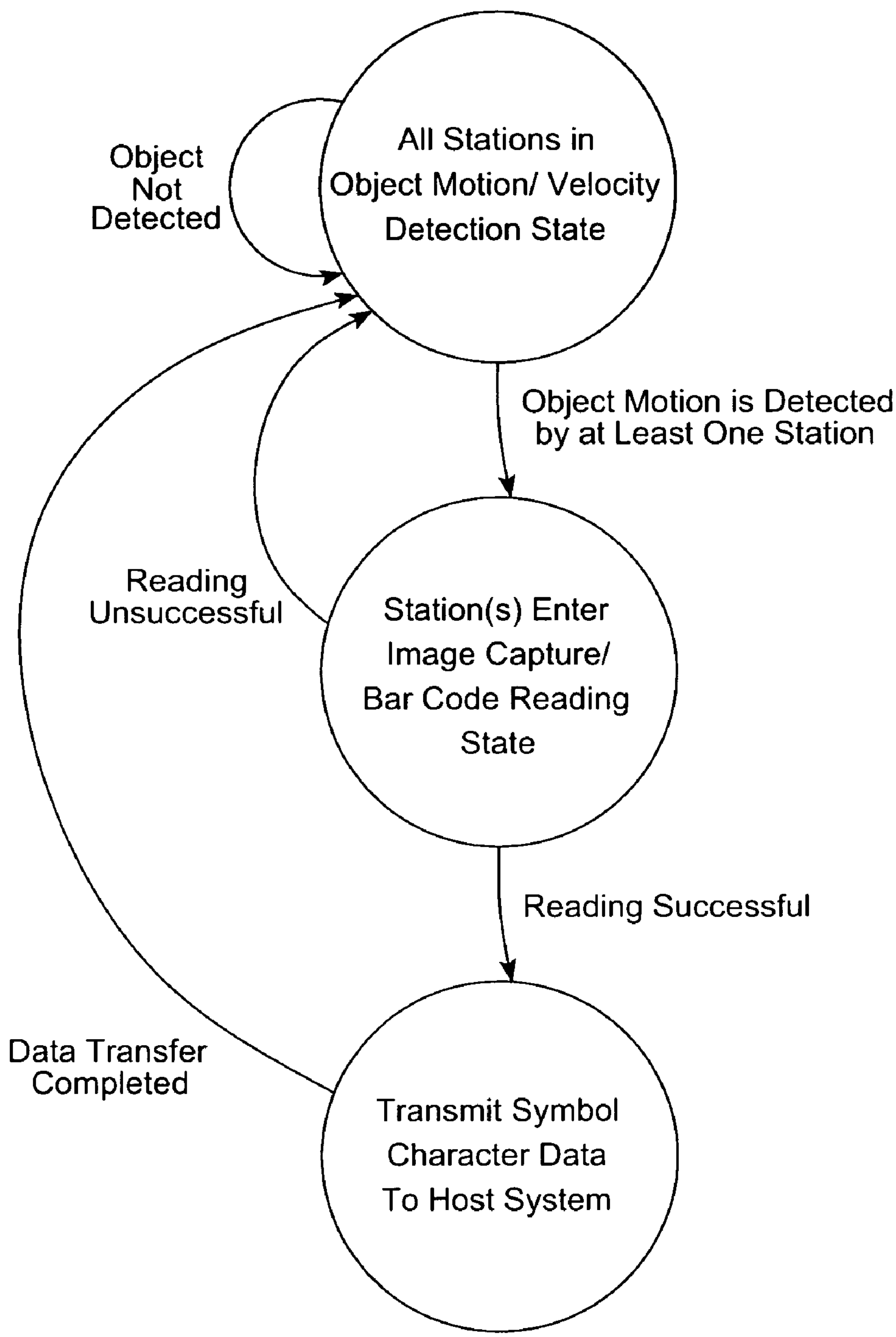
FIG. 14D1

State Transitions in the System of the Present Invention with Local Control with Global Over-Driving of Nearest Neighboring Stations
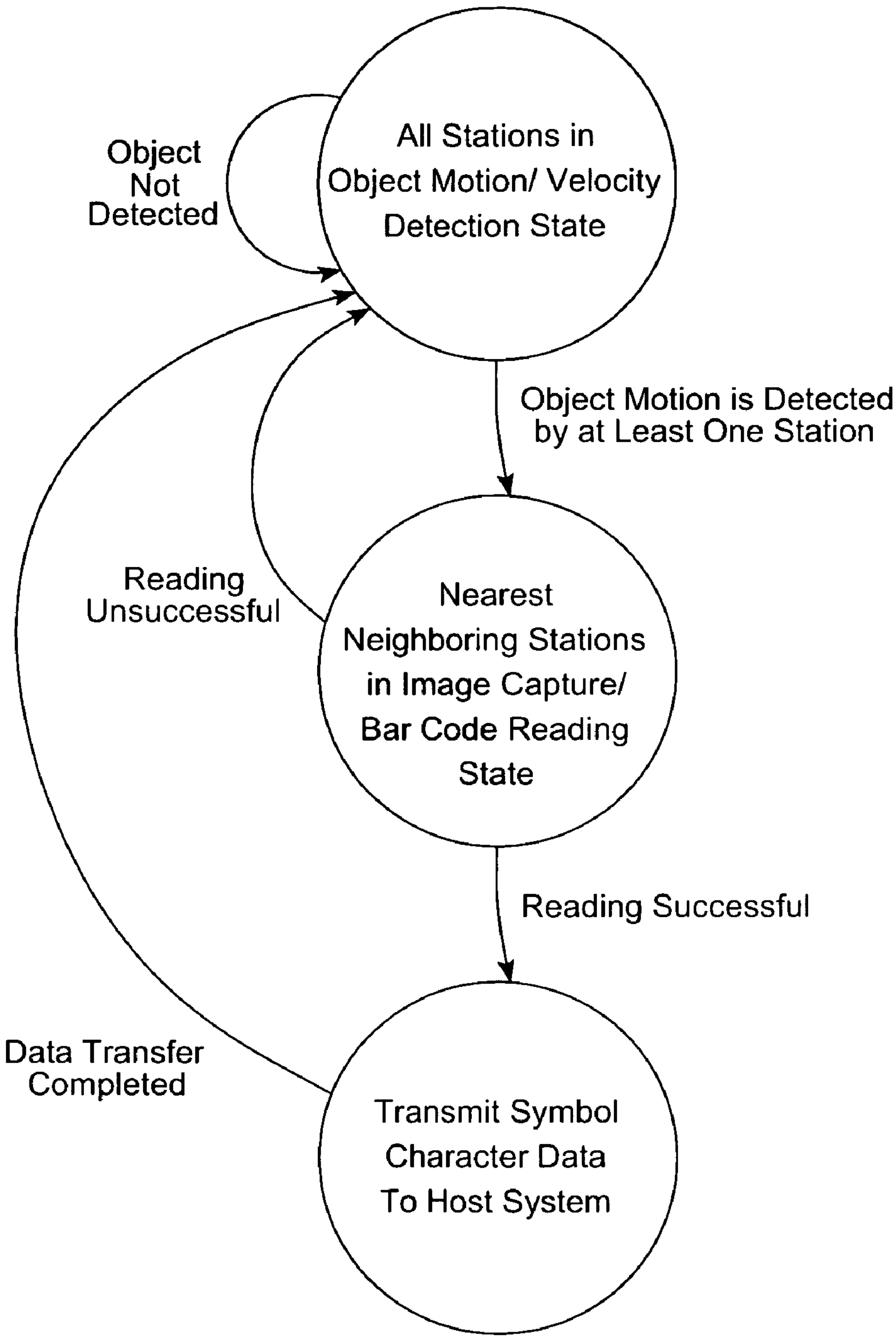
FIG. 14D2

State Transitions in the System of the Present Invention with Local Control with Global Over-Driving of All Neighboring Stations
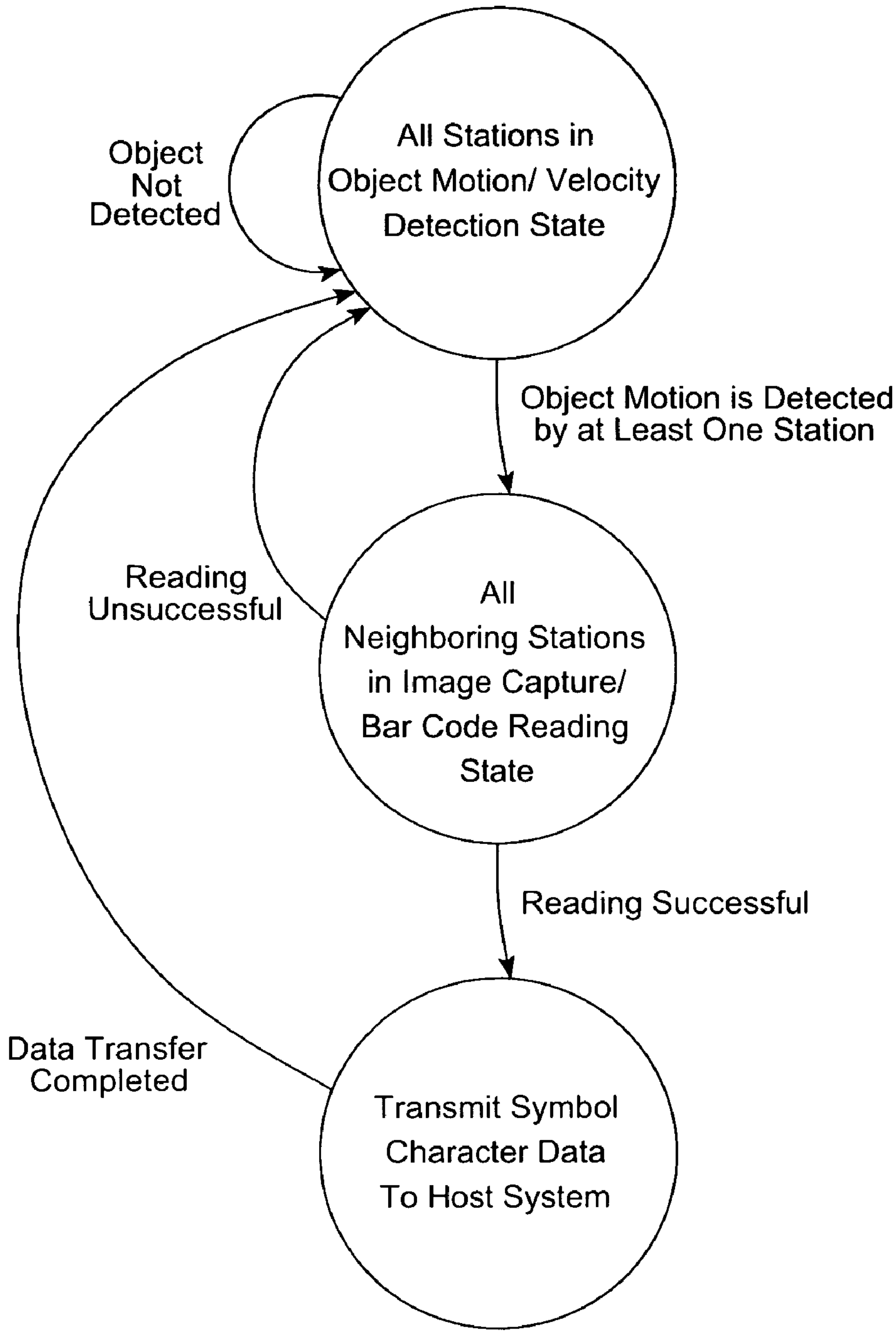
FIG. 14D3

State Transitions in the System of the Present Invention with Local Control
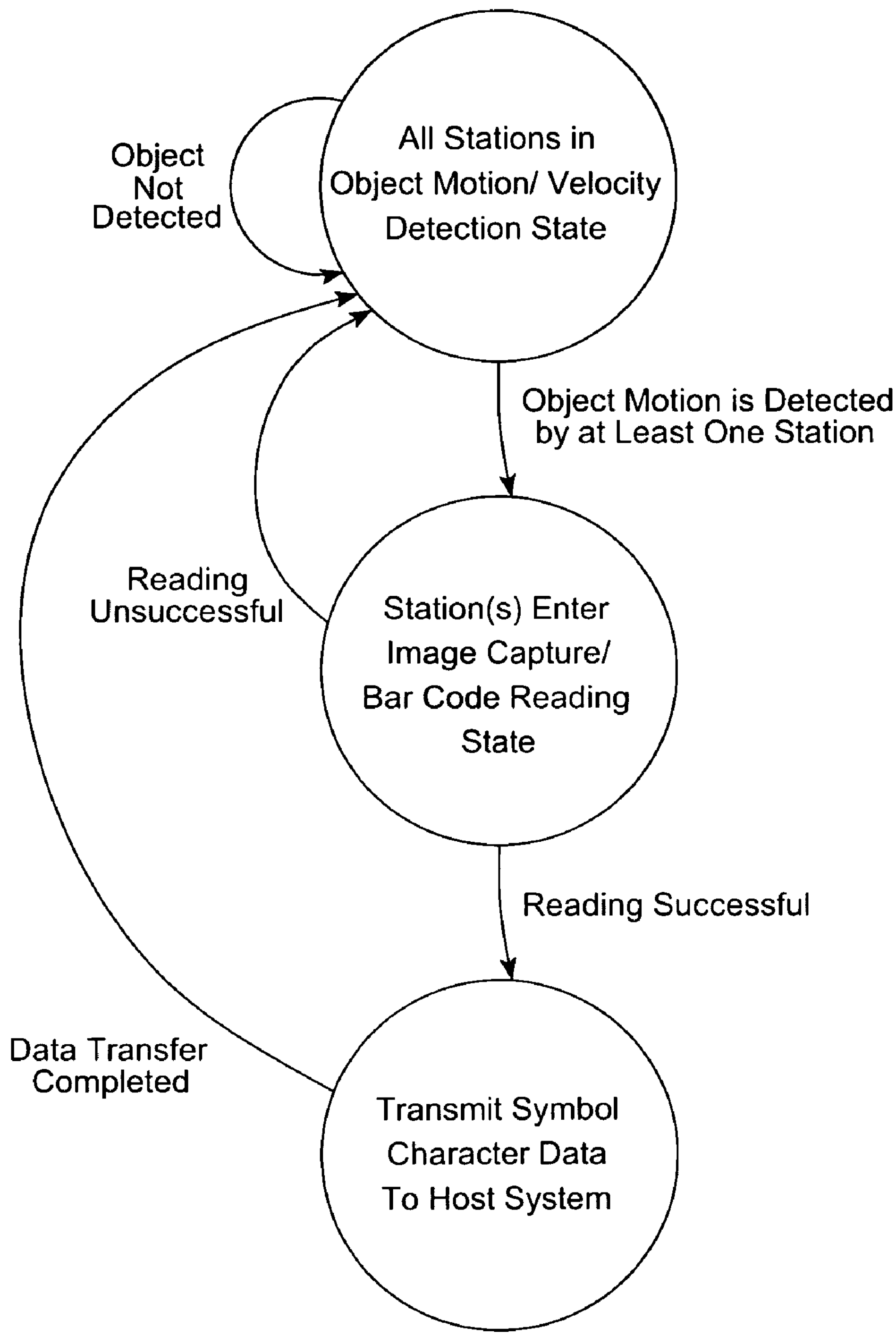
FIG. 15D1

State Transitions in the System of the Present Invention with Local Control with Global Over-Driving of Nearest Neighboring Stations
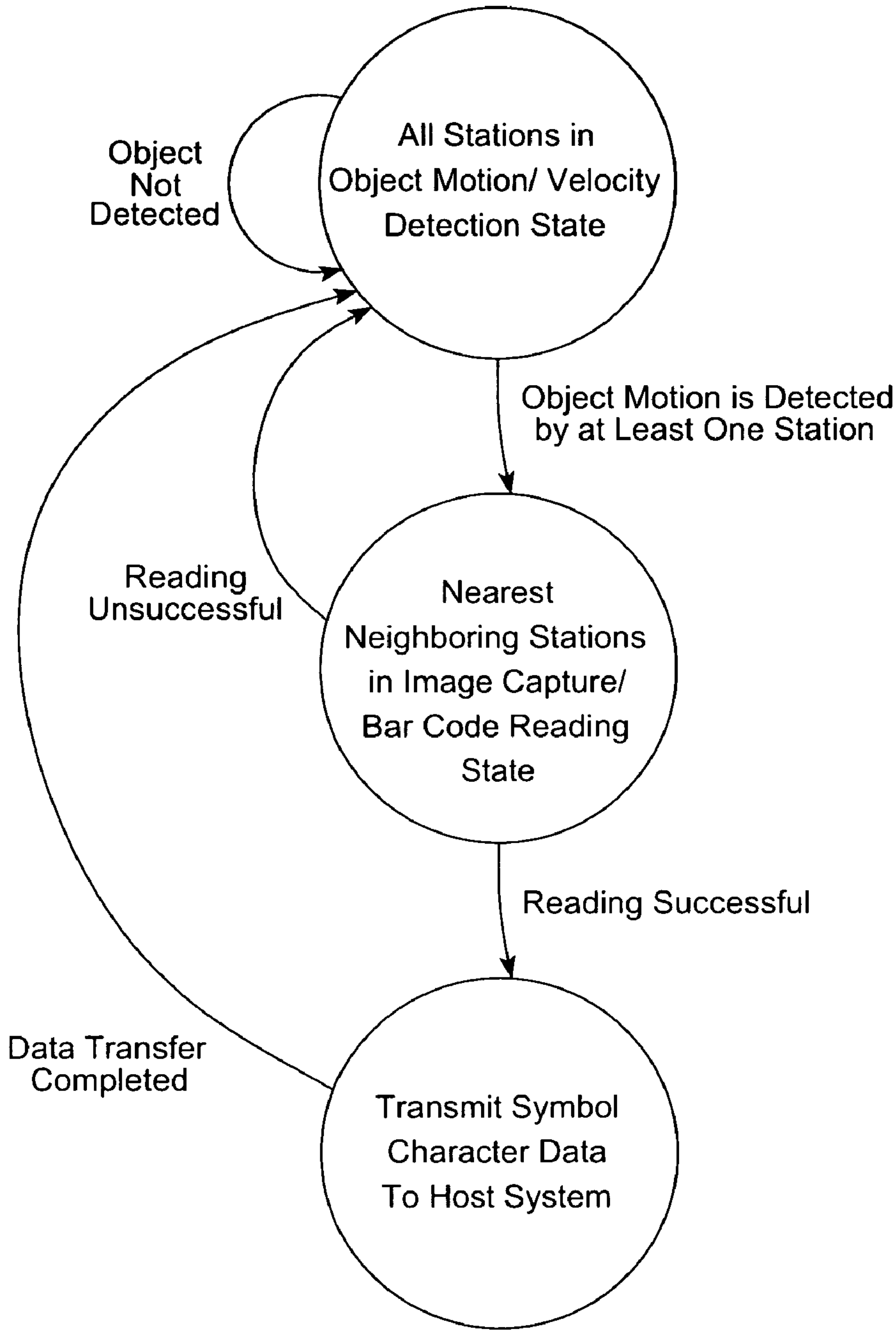
FIG. 15D2

State Transitions in the System of the Present Invention with Local Control with Global Over-Driving of All Neighboring Stations
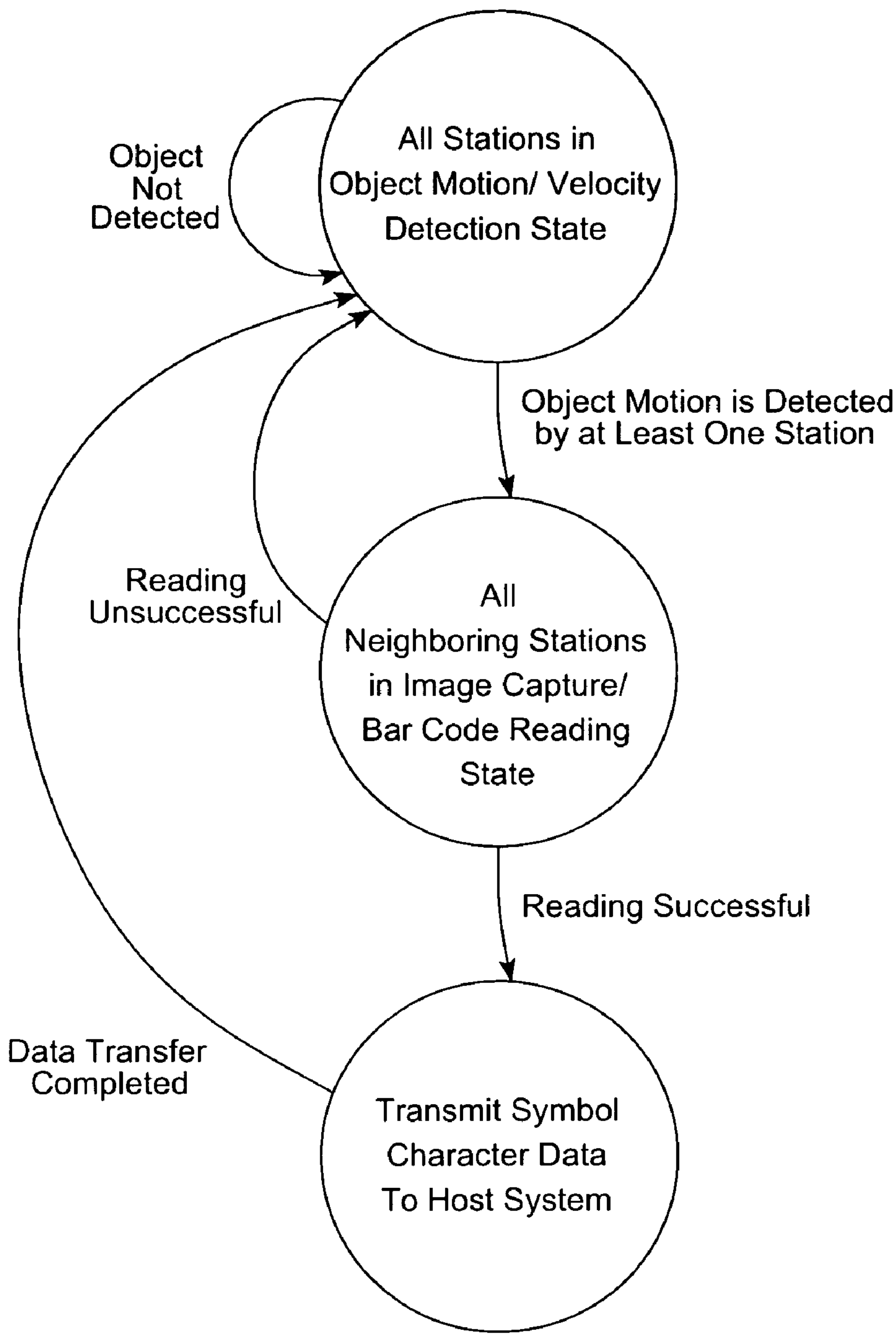
FIG. 15D3

DIGITAL IMAGE CAPTURING AND PROCESSING SYSTEM EMPLOYING AUTOMATIC OBJECT DETECTION AND SPECTRAL-MIXING BASED ILLUMINATION TECHNIQUES

CROSS-REFERENCE TO RELATED U.S. APPLICATIONS

This is a Continuation of U.S. application Ser. No. 11/880,087 filed Jul. 19, 2007; which is a Continuation-in-Part (CIP) of the following Applications: U.S. application Ser. No. 11/820,497 filed Jun. 19, 2007; U.S. application Ser. No. 11/820,010 filed Jun. 15, 2007; U.S. application Ser. No. 11/809,173 filed May 31, 2007; U.S. application Ser. No. 11/809,174 filed May 31, 2007; U.S. application Ser. No. 11/809,240 filed May 31, 2007; U.S. application Ser. No. 11/809,238 filed May 31, 2007; 11/788,769 filed Apr. 20, 2007; International Application No. PCT/US07/09763 filed Apr. 20, 2007; U.S. application Ser No. 11/731,866 filed Mar. 30, 2007; U.S. application Ser. No. 11/731,905 filed Mar. 30, 2007; U.S. application Ser. No. 11/729,959 filed Mar. 29, 2007 now U.S. Pat. No. 7,540,422; U.S. application Ser. No. 11/729,525 filed Mar. 29, 2007; U.S. application Ser. No. 11/729,945 filed Mar. 29, 2007 now U.S. Pat. No. 7,520,433; U.S. application Ser. No. 11/729,659 filed Mar. 29, 2007; U.S. application Ser. No. 11/729,954 filed Mar. 29, 2007; U.S. application Ser. No. 11/810,437 filed Mar. 29, 2007; U.S. application Ser. No. 11/713,535 filed Mar. 2, 2007; U.S. application Ser. No. 11/811,652 filed Mar. 2, 2007 now U.S. Pat. No. 7,537,165; U.S. application Ser. No. 11/713,785 filed Mar. 2, 2007; U.S. application Ser. No. 11/712,588 filed Feb. 28, 2007 now abandoned; U.S. application Ser. No. 11/712,605 filed Feb. 28, 2007 now U.S. Pat. No. 7,543,749; U.S. application Ser. No. 11/711,869 filed Feb. 27, 2007 now U.S. Pat. No. 7,556,199; U.S. application Ser. No. 11/711,870 filed Feb. 27, 2007 now U.S. Pat. No. 7,533,823; U.S. application Ser. No. 11/711,859 filed Feb. 27, 2007 now U.S. Pat No. 7,530,497; U.S. application Ser. No. 11/711,857 filed Feb. 27, 2007; U.S. application Ser. No. 11/711,906 filed Feb. 27, 2007; U.S. application Ser. No. 11/711,907 filed Feb. 27, 2007 now U.S. Pat. No. 7,516,898; U.S. application Ser. No. 11/711,858 filed Feb. 27, 2007 now U.S. Pat. No. 7,533,820; U.S. application Ser. No. 11/711,871 filed Feb. 27, 2007 now U.S. Pat. No. 7,527,204; U.S. application Ser. No. 11/640,814 filed Dec. 18, 2006; International Application No. PCT/US06/48148 filed Dec. 18, 2006; U.S. application Ser. No. 11/489,259 filed Jul. 19, 2006 now U.S. Pat. No. 7,540,424; U.S. application Ser. No. 11/408,268 filed Apr. 20, 2006 now U.S. Pat. No. 7,464,877; U.S. application Ser. No. 11/305,895 filed Dec. 16, 2005; U.S. application Ser. No. 10/989,220 filed Nov. 15, 2004 now U.S. Pat. No. 7,490,774; U.S. application Ser. No. 10/712,787 filed Nov. 13, 2003, now U.S. Pat. No. 7,128,266; U.S. application Ser. No. 10/186,320 filed Jun. 27, 2002, now U.S. Pat. No. 7,164,810; 10/186,268 filed Jun. 27, 2002, now U.S. Pat. No. 7,077,319; International Application No. PCT/US2004/9389 filed Nov. 15, 2004, and published as WIPO Publication No. WO 2005/050390; U.S. application Ser. No. 09/990,585 filed Nov. 21, 2001, now U.S. Pat. No. 7,028,899 B2; U.S. application Ser. No. 09/781,665 filed Feb. 12, 2001, now U.S. Pat. No. 6,742,707; U.S. application Ser. No. 09/780,027 filed Feb. 9, 2001, now U.S. Pat. No. 6,629,641 B2; and U.S. application Ser. No. 09/721,885 filed Nov. 24, 2000, now U.S. Pat. No. 6,631,842 B 1; wherein each said application is commonly owned by Assignee, Metrologic Instruments, Inc., of Blackwood, New Jersey, and is incorporated herein by reference as if fully set forth herein in its entirety.

BACKGROUND OF THE INVENTION

1. Field of Invention

The present invention relates generally to digital image capturing and processing scanners of ultra-compact design capable of reading bar code symbols in point-of-sale (POS) and other demanding scanning environments.

2. Brief Description of the State of Knowledge in the Art

The use of bar code symbols for product and article identification is well known in the art. Presently, various types of bar code symbol scanners have been developed for reading bar code symbols at retail points of sale (POS). In general, these bar code symbol readers can be classified into two (2) distinct classes.

The first class of bar code symbol reader uses a focused light beam, typically a focused laser beam, to sequentially scan the bars and spaces of a bar code symbol to be read. This type of bar code symbol scanner is commonly called a "flying spot" scanner as the focused laser beam appears as "a spot of light that flies" across the bar code symbol being read. In general, laser bar code symbol scanners are sub-classified further by the type of mechanism used to focus and scan the laser beam across bar code symbols.

The second class of bar code symbol readers simultaneously illuminate all of the bars and spaces of a bar code symbol with light of a specific wavelength(s) in order to capture an image thereof for recognition and decoding purposes.

The majority of laser scanners in the first class employ lenses and moving (i.e. rotating or oscillating) mirrors and/or other optical elements in order to focus and scan laser beams across bar code symbols during code symbol reading operations. Examples of hand-held laser scanning bar code readers are described in U.S. Pat. Nos. 7,007,849 and 7,028,904, incorporated herein by reference in its entirety. Examples of laser scanning presentation bar code readers are described in U.S. Pat. No. 5,557,093, incorporated herein by reference in its entirety. Other examples of bar code symbol readers using multiple laser scanning mechanisms are described in U.S. Pat. No. 5,019,714, incorporated herein by reference in its entirety.

In demanding retail environments, such as supermarkets and high-volume department stores, where high check-out throughput is critical to achieving store profitability and customer satisfaction, it is common for laser scanning bar code reading systems to have both bottom and side-scanning windows to enable highly aggressive scanner performance. In such systems, the cashier need only drag a bar coded product past these scanning windows for the bar code thereon to be automatically read with minimal assistance of the cashier or checkout personal. Such dual scanning window systems are typically referred to as "bioptical" laser scanning systems as such systems employ two sets of optics disposed behind the bottom and side-scanning windows thereof. Examples of polygon-based bioptical laser scanning systems are disclosed in U.S. Pat. Nos. 4,229,588; 4,652,732 and 6,814,292; each incorporated herein by reference in its entirety.

Commercial examples of bioptical laser scanners include: the PSC 8500-6-sided laser based scanning by PSC Inc.; PSC 8100/8200, 5-sided laser based scanning by PSC Inc.; the NCR 7876-6-sided laser based scanning by NCR; the NCR7872, 5-sided laser based scanning by NCR; and the MS232× Stratos®H, and MS2122 Stratos® E Stratos 6 sided laser based scanning systems by Metrologic Instruments, Inc., and the MS2200 Stratos® 5-sided laser based scanning system by Metrologic Instruments, Inc.

In general, prior art bioptical laser scanning systems are generally more aggressive that conventional single scanning window systems. However, while prior art bioptical scanning systems represent a technological advance over most single scanning window system, prior art bioptical scanning systems in general suffer from various shortcomings and drawbacks. In particular, the scanning coverage and performance of prior art bioptical laser scanning systems are not optimized. These system are generally expensive to manufacture by virtue of the large number of optical components presently required to construct such laser scanning systems. Also, they require heavy and expensive motors which consume significant amounts of electrical power and generate significant amounts of heat.

In the second class of bar code symbol readers, early forms of linear imaging scanners were commonly known as CCD scanners because they used CCD image detectors to detect images of the bar code symbols being read. Examples of such scanners are disclosed in U.S. Pat. Nos. 4,282,425, and 4,570,057.

In more recent times, hand-held imaging-based bar code readers employing area-type image sensing arrays based on CCD and CMOS sensor technologies have gained increasing popularity.

In Applicants' WIPO Publication No. WO 2005/050390, entitled "HAND-SUPPORTABLE IMAGING-BASED BAR CODE SYMBOL READER SUPPORTING NARROW-AREA AND WIDE-AREA MODES OF ILLUMINATION AND IMAGE CAPTURE", incorporated herein by reference, a detailed history of hand-hand imaging—based bar code symbol readers is provided, explaining that many problems that had to be overcome to make imaging-based scanners competitive against laser-scanning based bar code readers. Metrologic Instruments' Focus® Hand-Held Imager is representative of an advance in the art which has overcome such historical problems. An advantage of 2D imaging-based bar code symbol readers is that they are omni-directional by nature of image capturing and processing based decode processing software that is commercially available from various vendors.

U.S. Pat. No. 6,766,954 to Barkan et al proposes a combination of linear image sensing arrays in a hand-held unit to form an omni-directional imaging-based bar code symbol reader. However, this hand-held imager has limited application to 1D bar code symbols, and is extremely challenged in reading 2D bar code symbologies at POS applications.

WIPO Publication No. WO 2005/050390 (assigned to Metrologic Instruments Inc.) discloses POS-based digital imaging systems that are triggered to illuminate objects with fields of visible illumination from LED arrays upon the automatic detection of objects within the field of view of such systems using IR-based object detection techniques, and then capture and process digital images thereof so as to read bar code symbols graphically represented in the captured images.

US Patent Publication No. 2006/0180670 to PSC Scanning, Inc. also discloses digital imaging systems for use at the point of sale (POS), which are triggered to illuminate objects with visible illumination upon the detection thereof using IR-based object detection techniques.

U.S. Pat. No. 7,036,735 to Hepworth et al disclose an imaging-based bar code reader, in which both visible (i.e. red) and invisible (i.e. IR) light emitting diodes (LEDs) are driven at different illumination intensity levels during object illumination and image capture operations so as to achieve a desired brightness in captured images, while seeking to avoid discomfort to the user of the bar code reader.

Also, US Patent Publication No. 2006/0113386 to PSC Scanning, Inc. discloses methods of illuminating bar coded objects using pulses of LED-based illumination at a rate in excess of the human flicker fusion frequency, synchronized with the exposures of a digital imager, and even at different wavelengths during sequential frame exposures of the imager. Similarly, the purpose with this approach is to be able to read bar code symbols printed on substrates having different kinds of surface reflectivity characteristics, with the added benefit of being less visible to the human eye.

However, despite the increasing popularity in area-type hand-held and presentation type imaging-based bar code symbol reading systems, and even with such proposed techniques for improved LED-based illumination of objects at POS and like imaging environments, such prior art systems still cannot complete with the performance characteristics of conventional laser scanning bi-optical bar code symbol readers at POS environments. Also, the very nature of digital imaging presents other problems which makes the use of this technique very challenging in many applications.

For example, in high-speed imaging acquisition applications, as would be the case at a retail supermarket, a short exposure time would be desired to avoid motion blurring at the POS station. One know way of reducing the exposure time of the digital image detection array is by increasing the intensity level of the illumination beam used to illuminate the object during illumination and imaging operations. However, at POS environments, the use of high intensity laser illumination levels is not preferred from the point of view of customers, and cashiers alike, because high brightness levels typically cause discomfort and fatigue due to the nature of the human vision system and human perception processes.

And while it is known that IR illumination can be used to form and detect digital images of bar coded labels, the use of infrared illumination degrades the image contrast quality when bar codes are printed on the thermal printing paper. Consequently, low contrast images significantly slows down imaging-based barcode decoding operations, making such operations very challenging, if not impossible at times.

In WIPO Publication No. WO 2002/043195, entitled "PLANAR LASER ILLUMINATION AND IMAGING (PLIIM) SYSTEMS WITH INTEGRATED DESPECKLING MECHANISMS PROVIDED THEREIN", incorporated herein by reference, Applicants address the issues of using laser illumination in digital imaging barcode reading systems, namely, the inherent problem of optical noise generated by laser speckles in detected digital images. Such speckle pattern noise, as its often called, is caused by random interferences generated by a rough paper surface, ultimately producing signal variations on the order of size of the bars and spaces of the barcode, resulting in inaccurate imaging and poor decoding. Reduction of this noise is highly desirable.

While WIPO Publication No. WO/2002/043195 discloses and teaches many new ways to despeckle a laser illumination beam, there is still a great need for improved techniques for implementing such laser beam despeckling techniques which are reliable in operation, easy and inexpensive to mass produce.

Thus, there is a great need in the art for improved digital image capture and processing systems that are capable of competing with conventional laser scanning bar code readers employed in demanding POS environments, and providing the many advantages offered by imaging-based bar code symbol readers, while avoiding the shortcomings and drawbacks of such prior art systems and methodologies.

OBJECTS AND SUMMARY OF THE PRESENT INVENTION

Accordingly, a primary object of the present invention is to provide improved digital image capturing and processing apparatus for use in POS environments, which are free of the shortcomings and drawbacks of prior art laser scanning and digital imaging systems and methodologies.

Another object of the present invention is to provide such a digital image capturing and processing apparatus in the form of an omni-directional digital image capturing and processing based bar code symbol reading system that employs advanced coplanar illumination and imaging technologies.

Another object of the present invention is to provide an omni-directional image capturing and processing based bar code symbol reading system, comprising a plurality of coplanar illumination and imaging stations (i.e. subsystems), generating a plurality of coplanar light illumination beams and field of views (FOVs), that are projected through and intersect above an imaging window to generate a complex of linear-imaging planes within a 3D imaging volume for omni-directional imaging of objects passed therethrough.

Another object of the present invention is to provide such omni-directional image capturing and processing based bar code symbol reading system, wherein the plurality of coplanar light illumination beams can be generating by an array of coherent or incoherent light sources.

Another object of the present invention is to provide such omni-directional image capturing and processing based bar code symbol reading system, wherein the array of coherent light sources comprises an array of visible laser diodes (VLDs).

Another object of the present invention is to provide such omni-directional image capturing and processing based bar code symbol reading system, wherein the array of incoherent light sources comprises an array of light emitting diodes (LEDs).

Another object of the present invention is to provide an omni-directional image capturing and processing based bar code symbol reading system, wherein is capable of reading (i) bar code symbols having bar code elements (i.e., ladder type bar code symbols) that are oriented substantially horizontal with respect to the imaging window, as well as (ii) bar code symbols having bar code elements (i.e., picket-fence type bar code symbols) that are oriented substantially vertical with respect to the imaging window.

Another object of the present invention is to provide an omni-directional image capturing and processing based bar code symbol reading system, which comprises a plurality of coplanar illumination and imaging stations (i.e. subsystems), each of which produces a coplanar PLIB/FOV within predetermined regions of space contained within a 3-D imaging volume defined above the imaging window of the system.

Another object of the present invention is to provide an omni-directional image capturing and processing based bar code symbol reading system, wherein each coplanar illumination and imaging station comprises a planar light illumination module (PLIM) that generates a planar light illumination beam (PLIB) and a linear image sensing array and field of view (FOV) forming optics for generating a planar FOV which is coplanar with its respective PLIB.

Another object of the present invention is to provide an omni-directional image capturing and processing based bar code symbol reading system, comprising a plurality of coplanar illumination and imaging stations, each employing a linear array of laser light emitting devices configured together, with a linear imaging array with substantially planar FOV forming optics, producing a substantially planar beam of laser illumination which extends in substantially the same plane as the field of view of the linear array of the station, within the working distance of the 3D imaging volume.

Another object of the present invention is to provide an omni-directional image capturing and processing based bar code symbol reading system, having an electronic weigh scale integrated with the system housing.

Another object of the present invention is to provide an omni-directional image capturing and processing based bar code symbol reading system, comprising a plurality of coplanar illumination and imaging stations strategically arranged within an ultra-compact housing, so as to project out through an imaging window a plurality of coplanar illumination and imaging planes that capture omni-directional views of objects passing through a 3D imaging volume supported above the imaging window.

Another object of the present invention is to provide an omni-directional image capturing and processing based bar code symbol reading system comprising a plurality of coplanar illumination and imaging stations, each employing an array of planar laser illumination modules (PLIMs).

Another object of the present invention is to provide such an omni-directional image capturing and processing based bar code symbol reading system, wherein at each coplanar illumination and imaging station, an array of VLDs concentrate their output power into a thin illumination plane which spatially coincides exactly with the field of view of the imaging optics of the coplanar illumination and imaging station, so very little light energy is wasted.

Another object of the present invention is to provide such an omni-directional image capturing and processing based bar code symbol reading system, wherein each planar illumination beam is focused so that the minimum width thereof occurs at a point or plane which is the farthest object distance at which the system is designed to capture images within the 3D imaging volume of the system.

Another object of the present invention is to provide an omni-directional image capturing and processing based bar code symbol reading system, wherein at each coplanar illumination and imaging station, an object need only be illuminated along a single plane which is coplanar with a planar section of the field of view of the image formation and detection module being used in the system.

Another object of the present invention is to provide an omni-directional image capturing and processing based bar code symbol reading system, wherein low-power, light-weight, high-response, ultra-compact, high-efficiency solid-state illumination producing devices, such as visible laser diodes (VLDs), are used to selectively illuminate ultra-narrow sections of a target object during image formation and detection operations.

Another object of the present invention is to provide an omni-directional image capturing and processing based bar code symbol reading system, wherein the planar laser illumination technique enables modulation of the spatial and/or temporal intensity of the transmitted planar laser illumination beam, and use of simple (i.e. substantially monochromatic) lens designs for substantially monochromatic optical illumination and image formation and detection operations.

Another object of the present invention is to provide an omni-directional image capturing and processing based bar code symbol reading system, wherein intelligent object presence detection, motion and trajectory detection techniques are employed to automatically determined when and where an object is being moved through the 3D imaging volume of the system, and to selectively activate only those light emitting sources when an object is being moved within the spatial extent of its substantially planar laser beam so as to minimize the illumination of consumers who might be present along the lines of projected illumination/imaging during the operation of the system.

Another object of the present invention is to provide an omni-directional image capturing and processing based bar code symbol reading system, wherein such intelligent object presence detection, motion and trajectory detection includes the use of an imaging-based motion sensor, at each coplanar illumination and imaging subsystem, and having a field of view that is spatially aligned with at least a portion of the field of view of the linear image sensing array employed in the coplanar illumination and imaging subsystem.

Another object of the present invention is to provide such an omni-directional image capturing and processing based bar code symbol reading system, wherein the imaging-based motion sensor employed at each coplanar illumination and imaging subsystem therein employs the laser illumination array of the coplanar illumination and imaging subsystem, operated at a lower operating power, to illumination objects while the system is operating in its object motion/velocity detection mode.

Another object of the present invention is to provide such an omni-directional image capturing and processing based bar code symbol reading system, wherein the imaging-based motion sensor is used to determine the velocity of objects moving though the field of view (FOV) of a particular coplanar illumination and imaging station, and automatically control the frequency at which pixel data, associated of captured linear images, is transferred out of the linear image sensing array and into buffer memory.

Another object of the present invention is to provide an omni-directional image capturing and processing based bar code symbol reading system employing a plurality of coplanar illumination and imaging stations, wherein each such station includes a linear imaging module realized as an array of electronic image detection cells (e.g. CCD) having programmable integration time settings, responsive to the automatically detected velocity of an object being imaged, for enabling high-speed image capture operations.

Another object of the present invention is to provide an omni-directional image capturing and processing based bar code symbol reading system employing a plurality of coplanar illumination and imaging stations, wherein at each such station, a pair of planar laser illumination arrays are mounted about an image formation and detection module having a field of view, so as to produce a substantially planar laser illumination beam which is coplanar with the field of view during object illumination and imaging operations, and one or more beam/FOV folding mirrors are used to direct the resulting coplanar illumination and imaging plane through the imaging window of the system.

Another object of the present invention is to provide an omni-directional image capturing and processing based bar code symbol reading system employing a plurality of coplanar illumination and imaging stations, wherein each such station supports an independent image generation and processing channel that receives frames of linear (1D) images from the linear image sensing array and automatically buffers these linear images in video memory and automatically assembles these linear images to construct 2D images of the object taken along the field of view of the coplanar illumination and imaging plane associated with the station, and then processes these images using exposure quality analysis algorithms, bar code decoding algorithms, and the like.

Another object of the present invention is to provide an omni-directional image capturing and processing based bar code symbol reading system capable of reading PDF bar codes for age verification, credit card application and other productivity gains.

Another object of the present invention is to provide a omni-directional image capturing and processing based bar code symbol reading system capable of reading PDF and 2D bar codes on produce—eliminating keyboard entry and enjoying productivity gains.

Another object of the present invention is to provide a omni-directional image capturing and processing based bar code symbol reading system supporting image capture and processing for produce automatic produce recognition and price lookup support—eliminating keyboard entry and enjoying productivity gains.

Another object of the present invention is to provide a omni-directional image capturing and processing based bar code symbol reading system supporting image capture and processing for analyzing cashier scanning tendencies, and providing cashier training to help achieve productivity gains.

Another object of the present invention is to provide a omni-directional image capturing and processing based bar code symbol reading system supporting image capture and processing for automatic item look up when there is no bar code or price tag on an item, thereby achieving productivity gains.

Another object of the present invention is to provide a omni-directional image capturing and processing based bar code symbol reading system having a very fast wakeup from sleep mode-ready to scan first item—to achieve productivity gains.

Another object of the present invention is to provide a omni-directional image capturing and processing based bar code symbol reading system having a plurality of coplanar illumination and imaging subsystems (i.e. stations), each supporting an object motion/velocity sensing mode of operation.

Another object of the present invention is to provide such an omni-directional image capturing and processing based bar code symbol reading system, wherein each coplanar illumination and imaging subsystem (i.e. station) employs an illumination control method that may involve the control of parameters selected from the group consisting of: illumination source (e.g. ambient, LED, VLD); illumination intensity (e.g. low-power, half-power, full power); illumination beam width (e.g. narrow, wide); and illumination beam thickness (e.g. beam thickness).

Another object of the present invention is to provide such an omni-directional image capturing and processing based bar code symbol reading system, wherein the different illumination control methods that can be implemented at each illumination and imaging station in the system, include:

(1) Ambient Control Method, wherein ambient lighting is used to illuminate the FOV of the image sensing array in the object motion/velocity sensing subsystem during the object motion/velocity detection mode and bar code symbol reading mode of subsystem operation;

(2) Partial-Power Illumination Method, wherein illumination produced from the LED or VLD array is operated at half, fractional or otherwise partial power, and directed into the field of view (FOV) of the image sensing array employed in the object motion/velocity sensing subsystem;

(3) Full-Power Illumination Method, wherein illumination produced by the LED or VLD array is operated at half or fractional power, and directed in the field of view (FOV)

of the image sensing array employed in the object motion/velocity sensing subsystem.

Another object of the present invention is to provide such an omni-directional image capturing and processing based bar code symbol reading system, wherein each coplanar illumination and imaging station employs an illumination beam width method, such that the thickness of the planar illumination beam (PLIB) is increased so as to illuminate more pixels (e.g. 3 or more pixels) on the image sensing array of object motion when the station is operated in its object motion/velocity detection mode.

Another object of the present invention is to provide such an omni-directional image capturing and processing based bar code symbol reading system having a plurality of coplanar illumination and imaging subsystems (i.e. stations), wherein a method of Distributed Local Control is employed, such that at each illumination and imaging station, the local control subsystem controls the function and operation of the components of the illumination and imaging subsystem, and sends state data to the global control subsystem for state management at the level of system operation.

Another object of the present invention is to provide such an omni-directional image capturing and processing based bar code symbol reading system having a plurality of coplanar illumination and imaging subsystems (i.e. stations), wherein a method of Distributed Local Control, with Global Over-Ride Control, is employed, such that the local control subsystem controls the function and operation of the components of the illumination and imaging subsystem, and sends state data to the global control subsystem for state management at the level of system operation, as well as for overriding the control functions of nearest neighboring local control subsystems employed within other illumination and imaging stations in the system, thereby allowing the global control subsystem to drive one or more other stations in the system to the bar code reading state upon receiving state data from a local control subsystem that an object has been detected and its velocity computed/estimated.

Another object of the present invention is to provide such an omni-directional image capturing and processing based bar code symbol reading system having a plurality of coplanar illumination and imaging subsystems (i.e. stations), wherein a method of Distributed Local Control, with Global Over-Ride Control, is employed, such that the local control subsystem controls the function and operation of the components of the illumination and imaging subsystem, and sends state data to the global control subsystem for state management at the level of system operation, as well as for overriding the control functions of all neighboring local control subsystems employed within other illumination and imaging stations in the system, thereby allowing the global control subsystem to drive one or more other stations in the system to the bar code reading state upon receiving state data from a local control subsystem that an object has been detected and its velocity computed/estimated.

Another object of the present invention is to provide such an omni-directional image capturing and processing based bar code symbol reading system having a plurality of coplanar illumination and imaging subsystems (i.e. stations), wherein a method of Global Control is employed, such that the local control subsystem in each illumination and imaging station controls the operation of the subcomponents in the station, except for "state control" which is managed at the system level by the global control subsystem using "state data" generated by one or more object motion sensors (e.g. imaging based, IR Pulse-Doppler LIDAR-based, ultra-sonic energy based, etc.) provided at the system level within the 3D imaging volume of the system, in various possible locations.

Another object of the present invention is to provide such an omni-directional image capturing and processing based bar code symbol reading system having a plurality of coplanar illumination and imaging subsystems (i.e. stations), wherein one or more Pulse-Doppler LIDAR subsystems, or Pulse-Doppler SONAR subsystems, are employed in the system so that real-time object velocity sensing can be achieved within the 3D imaging volume, or across a major section or diagonal thereof, so that object velocity data can be captured and distributed (in real-time) to each illumination and imaging station (via the global control subsystem) for purposes of adjusting the illumination and/or exposure control parameters therein (e.g. the frequency of the clock signal used to read out image data from the linear image sensing array within the IFD subsystem in the station).

Another object of the present invention is to provide a digital image capturing and processing system having an integrated electronic weigh scale, wherein its image capturing and processing module electrically interfaces with its electronic weigh scale module by way of a pair of touch-fit electrical interconnectors that automatically establish all electrical interconnections between the two modules when the image capturing and processing module is placed onto the electronic weigh scale module, and its electronic load cell bears the weight of the image capturing and processing module.

Another object of the present invention is to provide a digital image capturing and processing bar code reading system, with an integrated electronic weigh scale subsystem, suitable for POS applications, wherein the load cell of the electronic weigh scale module is directly bears substantially all of the weight of the image capturing and processing module (and any produce articles placed thereon during weighing operations), while a touch-fit electrical interconnector arrangement automatically establishes all electrical interconnections between the two modules.

Another object of the present invention is to provide such an omni-directional image capturing and processing based bar code symbol reading system, wherein the 2D images produced from the multiple image generation and processing channels are managed by an image processing management processor programmed to optimize image processing flows.

Another object of the present invention is to provide such an omni-directional image capturing and processing based bar code symbol reading system which supports intelligent image-based object recognition processes that can be used to automate the recognition of objects such as produce and fruit in supermarket environments.

Another object of the present invention is to provide an omni-directional image capturing and processing based bar code symbol reading system having an integrated electronic weight scale, an RFID module, and modular support of wireless technology (e.g. BlueTooth and IEEE 802.11(g)).

Another object of the present invention is to provide an omni-directional image capturing and processing based bar code symbol reading system capable of reading bar code symbologies independent of bar code orientation.

Another object of the present invention is to provide an omni-directional image capturing and processing based bar code symbol reading system having a 5 mil read capability.

Another object of the present invention is to provide a omni-directional image capturing and processing based bar code symbol reading system having a below counter depth not to exceed 3.5" (89 mm).

Another object of the present invention is to provide an omni-directional image capturing and processing based bar code symbol reading system having direct connect power for PlusPower USB Ports.

Another object of the present invention is to provide an omni-directional image capturing and processing based bar code symbol reading system having an integrated scale with its load cell positioned substantially in the center of weighing platform.

Another object of the present invention is to provide an omni-directional image capturing and processing based bar code symbol reading system having an integrated Sensormatic® deactivation device, and an integrated Checkpoint® EAS antenna.

Another object of the present invention is to provide an omni-directional image capturing and processing based bar code symbol reading system employing cashier training software, and productivity measurement software showing how an operator actually oriented packages as they were scanned by the system.

Another object of the present invention is to provide an omni-directional image capturing and processing based bar code symbol reading system having flash ROM capability.

Another object of the present invention is to provide an omni-directional image capturing and processing based bar code symbol reading system that can power a hand held scanner.

Another object of the present invention is to provide an omni-directional image capturing and processing based bar code symbol reading system having a mechanism for weighing oversized produce.

Another object of the present invention is to provide an omni-directional image capturing and processing based bar code symbol reading system having excellent debris deflecting capabilities.

Another object of the present invention is to provide an omni-directional image capturing and processing based bar code symbol reading system that is capable of reading all types of poor quality codes—eliminating keyboard entry and enjoying productivity gains.

Another object of the present invention is to provide an image capturing and processing scanner based high throughput scanner that can address the needs of the supermarket/hypermarket and grocery store market segment.

Another object of the present invention is to provide an image capturing and processing scanner having a performance advantage that leads to quicker customer checkout times and productivity gain that cannot be matched by the conventional bioptic laser scanners.

Another object of the present invention is to provide a high throughput image capturing and processing scanner which can assist in lowering operational costs by exceptional First Pass Read Rate scanning and one product pass performance, enabling sales transactions to be executed with no manual keyboard entry required by the operator.

Another object of the present invention is to provide a high performance image capturing and processing checkout scanner that can meet the emerging needs of retailers to scan PDF and 2D bar codes for age verification and produce items.

Another object of the present invention is to provide high performance image capturing and processing scanner capable of capturing the images of produce and products for price lookup applications.

Another object of the present invention is to provide a digital image capturing and processing scanner that provides a measurable advancement in First Pass Read Rate scanning with the end result leading to noticeable gains in worker productivity and checkout speed.

Another object of the present invention is to provide a digital image capturing and processing scanner that employs no moving parts technology, has a light weight design and offers a low cost solution that translate easily into a lower cost of ownership.

Another object of the present invention is to provide a digital image capturing and processing based bar code symbol reading system, comprising a plurality of coextensive area-type illumination and imaging stations (i.e. subsystems), generating a plurality of area-type illumination beams and field of views (FOVs), which form coextensive illumination and imaging zones that are projected through and intersect above an imaging window, within a 3D imaging volume for digital imaging of objects passed therethrough or presented thereto.

Another object of the present invention is to provide such digital image capturing and processing based bar code symbol reading system, wherein automatic object motion detection and analysis is used to intelligently control the illumination fields during object illumination and imaging operations to as to minimize the amount of visible illumination that is required to capture and detect high contrast and quality images for diverse image processing applications (e.g. bar code reading, OCR, intelligent object recognition, etc) at retail POS environments.

Another object of the present invention is to provide such digital image capturing and processing based bar code symbol reading system, wherein both visible and invisible forms of illumination are dynamically produced from arrays of visible and invisible LEDs that are dynamically controlled in response to real-time image contrast analysis of captured digital images. Another object of the present invention is to provide a POS-based digital image capturing and processing system employing a plurality of area-type digital image detecting arrays and methods of intelligently illuminating objects with the 3D imaging volume thereof, using automatic object motion detection techniques and spectral-mixing illumination techniques to minimize the amount of visible illumination energy/power required to capture sufficiently high-contrast images and successfully process (i.e. decode process) the same.

Another object of the present invention is to provide novel methods of narrow area and/or wide-area illumination using dynamically/adaptively controlled mixing of spectral illumination energy (e.g. visible and IR illumination) to form and detect digital images of objects at POS environments with sufficiently high image contrast and quality.

Another object of the present invention is to provide such methods of narrow area and/or wide-area illumination using VLDs and IR laser diodes (LDs).

Another object of the present invention is to provide such methods of narrow area and/or wide-area illumination using visible and IR LEDs.

Another object of the present invention is to provide such methods of narrow area and wide-area illumination using statically set ratios of visible and IR illumination energy/power.

Another object of the present invention is to provide such methods of narrow area and wide-area illumination using dynamically programmed ratios of visible and IR illumination energy/power.

Another object of the present invention is to provide a method of driving a plurality of visible and invisible laser diodes so as to produce an illumination beam having a dynamically managed ratio of visible to invisible (IR) spectral energy/power during object illumination and imaging operations.

Another object of the present invention is to provide such a diode driving method comprising: (A) supplying a plurality of visible laser and invisible laser diodes with a predetermined/default values of diode drive currents to illuminate the object with a spectral mixture of illumination during object illumination and imaging operations; (B) capturing one or more digital images of the illuminated object and measuring (in real-time) image contrast quality so as to generate feedback or control data; and (C) using this feedback or control data to dynamically generate the necessary values for the adjusted diode drive currents that are used to drive said visible and invisible laser diodes and an illumination beam having a dynamically managed ratio of visible to invisible (IR) spectral energy/power required to produce images of sufficient image contrast to ensure satisfactory image processing, while minimizing visual brightness (to humans) at a POS station during object illumination and imaging operations.

Another object of the present invention is to provide such a method, wherein the illumination beam is an illumination beam selected from the group consisting of planar, narrow-area and wide-area illumination beams.

Another object of the present invention is to provide a method of driving a plurality of visible and invisible LEDs so as to produce an illumination beam having a dynamically managed ratio of visible to invisible (IR) spectral energy/power during object illumination and imaging operations.

Another object of the present invention is to provide such a LED driving method comprising the steps of: (A) supplying a plurality of visible and invisible LEDs with a predetermined/default values of diode drive currents to illuminate the object with a spectral mixture of illumination during object illumination and imaging operations; (B) capturing one or more digital images of the illuminated object and measuring (in real-time) image contrast quality so as to generate feedback or control data; and (C) using this feedback or control data to dynamically generate the necessary values for the adjusted diode drive currents that are used to drive said visible and invisible LEDs and an illumination beam having a dynamically managed ratio of visible to invisible (IR) spectral energy/power required to produce images of sufficient image contrast to ensure satisfactory image processing, while minimizing visual brightness (to humans) at a POS station during object illumination and imaging operations.

Another object of the present invention is to provide such a method, wherein the illumination beam is an illumination beam selected from the group consisting of planar, narrow-area and wide-area illumination beams.

Another object of the present invention is to provide a coplanar laser illumination and imaging subsystem (i.e. station) deployable in an omni-directional image capturing and processing system, and comprising (i) an image formation and detection (IFD) subsystem having an image sensing array and optics providing a field of view (FOV) on the image sensing array, (ii) an spectral-mixing based illumination subsystem producing a first field of visible illumination (produced from an array of VLDs) and a second field of invisible illumination (produced from an array of IR LDs) that spatially overlap and spatially/temporally intermix with each other while having a preset relative power ratio (VIS/IR), and are substantially coplanar or coextensive with the FOV of the image sensing array, (iii) an integrated laser despeckling mechanism associated the IFD subsystem, (iv) an image capturing and buffering subsystem for capturing and buffering images from the image sensing array, (v) an automatic object motion/velocity detection subsystem for automatically detecting the motion and velocity of an object moving through at least a portion of the FOV of the image sensing array, and (vi) a local control subsystem for controlling the operations of the subsystems within the illumination and imaging station.

Another object of the present invention is to provide a coplanar laser illumination and imaging subsystem (i.e. station) deployable in an omni-directional image capturing and processing system and comprising (i) an image formation and detection (IFD) subsystem having an image sensing array and optics providing a field of view (FOV) on the image sensing array, (ii) an spectral-mixing based illumination subsystem producing a first field of visible illumination (produced from an array of VLDs) and a second field of invisible illumination (produced from an array of IRLDs) that spatially overlap and spatially/temporally intermix with each other while having a preset relative power ratio (VIS/IR), and are substantially coplanar or coextensive with the FOV of the image sensing array, (iii) an integrated laser despeckling mechanism associated the IFD subsystem (using the high-frequency modulation HFM techniques, and optical multiplexing (OMUX) techniques, (iv) an image capturing and buffering subsystem for capturing and buffering images from the image sensing array, (v) an automatic object motion/velocity detection subsystem for automatically detecting the motion and velocity of an object moving through at least a portion of the FOV of the image sensing array, and (vi) a local control subsystem for controlling the operations of the subsystems within the illumination and imaging station.

Another object of the present invention is to provide a coplanar laser illumination and imaging subsystem (i.e. station) deployable in an omni-directional image capturing and processing system, and comprising (i) an image formation and detection (IFD) subsystem having an image sensing array and optics providing a field of view (FOV) on the image sensing array, (ii) an spectral-mixing based illumination subsystem producing a first field of visible illumination (produced from an array of VLDs) and a second field of invisible illumination (produced from an array of IRLDs) that spatially overlap and spatially/temporally intermix with each other while having an adaptively/dynamically set relative power ratio (VIS/IR), and are substantially coplanar or coextensive with the FOV of the image sensing array, (iii) an integrated laser de-speckling mechanism associated the IFD subsystem as disclosed in WIPO Publication No. WO/2002/043195 or in the present Specification, (iv) an image capturing and buffering subsystem for capturing and buffering images from the image sensing array, (v) an automatic object motion/velocity detection subsystem for automatically detecting the motion and velocity of an object moving through at least a portion of the FOV of the image sensing array, and (vi) a local control subsystem for controlling the operations of the subsystems within the illumination and imaging station.

Another object of the present invention is to provide a method of adaptively/dynamically controlling the spectral composition of the planar illumination beam produced from the illumination subsystem of the coplanar laser illumination and imaging subsystem (i.e. station).

Another object of the present invention is to provide a coplanar laser illumination and imaging subsystem (i.e. station) deployable in an omni-directional image capturing and processing system, and comprising (i) an image formation and detection (IFD) subsystem having an image sensing array and optics providing a field of view (FOV) on the image sensing array, (ii) an spectral-mixing based illumination subsystem producing a first field of visible illumination (produced from an array of VLDs) and a second field of invisible illumination (produced from an array of IRLDs) that spatially overlap and spatially/temporally intermix with each other while having a adaptively/dynamically set relative power ratio (VIS/IR), and are substantially coplanar or coextensive with the FOV of the image sensing array, (iii) an integrated laser de-speckling mechanism associated the IFD subsystem (using the high-frequency modulation HFM techniques, and optical multiplexing (OMUX) techniques of the present invention, (iv) an image capturing and buffering subsystem for capturing and buffering images from the image sensing array, (v) an automatic object motion/velocity detection subsystem for automatically detecting the motion and velocity of an object moving through at least a portion of the FOV of the image sensing array, and (vi) a local control subsystem for controlling the operations of the subsystems within the illumination and imaging station.

Another object of the present invention is to provide a flow chart illustrating the steps involved in the method of adaptively/dynamically controlling the spectral composition of the planar illumination beam produced from the illumination subsystem of the coplanar laser illumination and imaging subsystem (i.e. station).

Another object of the present invention is to provide a coplanar illumination and imaging subsystem (i.e. station) deployable in an omni-directional image capturing and processing system, and comprising (i) an image formation and detection (IFD) subsystem having an image sensing array and optics providing a field of view (FOV) on the image sensing array, (ii) an spectral-mixing based illumination subsystem producing a first field of incoherent visible illumination (produced from an array of visible LEDs) and a second field of incoherent invisible illumination (produced from an array of IR LEDs) that spatially overlap and spatially/temporally intermix with each other while having a adaptively/dynamically set relative power ratio (VIS/IR), and are substantially coplanar or coextensive with the FOV of the image sensing array, (iii) an image capturing and buffering subsystem for capturing and buffering images from the image sensing array, (iv) an automatic object motion/velocity detection subsystem for automatically detecting the motion and velocity of an object moving through at least a portion of the FOV of the image sensing array, and (v) a local control subsystem for controlling the operations of the subsystems within the illumination and imaging station.

Another object of the present invention is to provide a method of adaptively/dynamically controlling the spectral composition of a planar illumination beam produced from an illumination subsystem deployed in a coplanar illumination and imaging system.

Another object of the present invention is to provide a planar laser illumination array (PLIA) system capable of producing a dynamically/adaptively managed mixture of invisible and visible illumination energy generated by a linear array of dynamically/adaptively driven VLD-based planar laser illumination modules (PLIMs) and IRLD-based PLIMs, each being operated under the control of a local control subsystem, in response to control data produced by an image processing subsystem running a spectral-mixture control algorithm.

Another object of the present invention is to provide A laser beam despeckling device comprising: a laser diode for producing a laser beam having a central characteristic wavelength; diode current drive circuitry for producing a diode drive current to drive the laser diode and produce the laser beam; high frequency modulation (HFM) circuitry for modulating the diode drive current at a sufficiently high frequency to cause the laser diode to produce the laser beam having a spectral side-band components about the central characteristic wavelength, and reducing the coherence as well as coherence length of the laser beam; and an optical beam multiplexing (OMUX) module for receiving the laser beam as an input beam, a generating as output, a plurality of laser beam components that are recombined to produce a composite laser beam having substantially reduced coherence for use in illumination applications where a substantial reduction in speckle pattern noise is achieved.

Another object of the present invention is to provide such a laser beam despeckling device, wherein illumination applications include digital imaging, projection television, photolithographic illumination operations, etc).

Another object of the present invention is to provide such a laser-despeckling device, wherein the laser diode can be a visible laser diode (VLD) or an invisible laser diode such as an IR laser diode (IRLD).

Another object of the present invention is to provide a laser-despeckling PLIM comprising a cylindrical illumination lens array, an OMUX module, a VLD, a high frequency modulation (HFM) circuitry and a diode current drive circuitry, wherein when the HFM circuitry is enabled (i.e. HFM ON), the HFM drive current supplied to the VLD produces a spectral side-band components about the central characteristic wavelength of the VLD, reducing the coherence of the laser illumination beam as well as its coherence length.

Another object of the present invention is to provide a laser-despeckling PLIM which further comprises a flexible circuit supporting (i) a VLD or IR laser diode (IRLD) and (ii) a HFM circuitry mounted in close proximity to the VLD or IRLD, and wherein the flexible circuit in turn is connected to a microprocessor-controlled current driver circuitry (e.g. controlled by a local control subsystem) realized on a PC board.

Another object of the present invention is to provide a laser-despeckling PLIM which further comprises a flexible circuit supporting (i) a VLD or IR laser diode (IRLD), (ii) a HFM circuitry mounted in close proximity to the VLD or IRLD, and (iii) a microprocessor-controlled diode current driver circuitry which is connected to the HFM circuitry and interfaced with a local control subsystem.

Another object of the present invention is to provide an optical beam multiplexor (OMUX) device, based on mirror and semi-transparent reflective coatings, deployable in a laser-despeckling PLIM so as to reduce (i) the coherence of the resulting planar/narrow-area illumination beam generated therefrom, and (ii) thus the amount of speckle pattern noise observed at the image detection array of an image formation and detection (IFD) subsystem employed in the digital image capturing and processing system in which the PLIM and IFD subsystem are integrated.

Another object of the present invention is to provide a planar laser illumination array (PLIA) comprising a plurality of planar laser illumination modules (PLIMs), wherein each PLIM includes (i) a laser source (e.g. VLD, IRLD, etc) driven preferably by HFM current drive circuitry, (ii) a collimating lens (i.e. optics) disposed beyond the laser source, (ii) an optical or laser beam multiplexor (OMUX) device disposed beyond the collimating lens, and (iv) a cylindrical-type planarizing-type illumination lens array disposed beyond the OMUX, and arranged as an integrated assembly so as to generate a plurality of substantially planar coherence-reduced laser illumination beams (PLIBs) that form a composite substantially planar laser illumination beam (PLIB) having substantially reduced spatial/temporal coherence, which substantially reduces the amount of speckle pattern noise observed at the image detection array of the image formation and detection (IFD) subsystem while the composite PLIB illuminates an object during object illumination and imaging operations within the digital image capturing and processing system in which subsystems cooperate.

Another object of the present invention is to provide a coplanar illumination and imaging subsystem employing such a PLIA design.

Another object of the present invention is to provide a coplanar illumination and imaging subsystem comprising a first plurality of VLDs and a second plurality of IRVDs mounted in a PLIA support block, to which flexible HFM circuits are connected on one end, and to a PC board on the other, forming an electrical interface with the corresponding laser diode current drive circuits realized thereon.

Another object of the present invention is to provide a coplanar illumination and imaging subsystem comprising a first plurality of VLDs and a second plurality of IRVDs mounted in a PLIA support block, to which flexible HFM and diode current drive circuits are connected.

Another object of the present invention is to provide a laser beam OMUX device comprising a single glass plate bearing reflective and semi-reflective coatings to optically multiplex an input laser beam into multiple spatial-coherence reduced output laser beams, which are then planarized into a composite substantially planar laser illumination beam (PLIB) by a multi-cylinder planarizing-type illumination lens array disposed in close proximity therewith.

Another object of the present invention is to provide a planar laser illumination array (PLIA) comprising an HFM diode current drive method, in combination with an optical despeckling method selected from the group consisting of the use of an optical beam multiplexor (OMUX) devices, and the use of a polarization despeckler device, so as to form a PLIA having an ultra-compact despeckler mechanism.

Another object of the present invention is to provide a laser beam despeckling device comprising a three-sided prism and a ½ wave retarder plate disposed between a pair of mirrors arranged as shown, to optically multiplex an input laser beam into a single temporal-coherence reduced output laser beam, for subsequent planarization a multi-cylinder planarizing-type illumination lens array disposed in close proximity therewith.

Another object of the present invention is to provide a laser beam despeckling device comprising a polarization beam splitter arranged between a pair of prisms that forms an optical cube, and which supports orthogonally-arranged mirrors each bearing a ¼ wave retarder, to optically multiplex an input laser beam into a single temporal/spatial-coherence reduced output laser beam, for subsequent planarization a multi-cylinder planarizing-type illumination lens array disposed in close proximity therewith.

Another object of the present invention is to provide a laser beam despeckling device comprising four mirrors, a ¼ wave retarder plate, a beam splitter arranged as shown, to optically multiplex and polarization-encoded an input laser beam into two temporal/spatial-coherence reduced output laser beams, for subsequent planarization a multi-cylinder planarizing-type illumination lens array disposed in close proximity therewith;

Another object of the present invention is to provide a polarization-encoding based laser beam despeckling device comprising a ¼ wave retarder plate disposed between a pair of glass plates bearing mirror and beam-splitter coatings as shown, to optically multiplex an input laser beam into two spatial and temporal coherence reduced output laser beams, wherein the output beam is then subsequently planarized by a multi-cylinder planarizing-type illumination lens array disposed in close proximity therewith.

Another object of the present invention is to provide a laser beam despeckling device of the present invention comprising a ¼ wave retarder plate disposed between a pair of glass plates (multiplexors) bearing mirror and beam-splitter coatings as shown, to optically multiplex an input laser beam into four spatial-coherence reduced output laser beams, for subsequent planarization by a multi-cylinder planarizing-type illumination lens array disposed in close proximity therewith.

Another object of the present invention is to provide a multi-stage laser beam despeckling device comprising a first laser beam despeckling module for optically multiplexing an input laser beam into a temporal/spatial coherence-reduced output laser beam, which is then transmitted as an input laser beam to a second despeckling module for producing an output spatial/temporal-coherence reduced laser beam, for subsequent planarization by a multi-cylinder planarizing-type illumination lens array disposed in close proximity therewith.

Another object of the present invention is to provide a planar laser illumination and imaging (PLIIM) module supporting arrays of VLDs and IR laser diodes, and a field of view (FOV) forming optics and FOV folding mirror for use with a digital linear image detecting array mounted on a PC board.

Another object of the present invention is to provide a planar laser illumination and imaging (PLIIM) module for producing a coplanar PLIB/FOV, comprising a PC board supporting a digital linear image detection chip (i.e. linear or narrow-area image sensor), HFM and diode current drive circuitry, image capture and buffer circuitry, and subsystem control circuitry.

Another object of the present invention is to provide such a planar laser illumination and imaging (PLIIM) module further comprising a pair of PLIB/FOV folding mirrors arranged so as to direct the coplanar PLIB/FOV in a direction required by the system in which the PLIIM module is employed. Another object of the present invention is to provide a POS-based digital image capturing and processing system embodying an improved speckle-reduction mechanism integrated with a plurality of VLDs and/or IRLDs (or other coherent illumination sources) that are dynamically managed to reduce illumination brightness to humans, while maintaining sufficient image contrast, during object illumination and imaging operations at the POS station.

Another object of the present invention is to provide such POS-based digital image capturing and processing system employing one or more OMUX-based laser-despeckling modules that create a plurality of virtual spatially and/or temporally incoherent illumination sources from at least one VLD or IRLD source.

Another object of the present invention is to provide such POS-based digital image capturing and processing system employing a planar illumination module (PLIM) that combines optical-based laser-despeckling techniques with HFM diode current driving techniques so as to produce improved apparatus for producing a composite coherence-reduced laser illumination beam for use in digital image formation and detection operations.

Another object of the present invention is to provide a linear-type digital imaging system employing a wide-area illumination beam having a dynamically controlled mixture of visible and IR spectral energy, so as to reduce illumination brightness at POS environments during system operation while achieving sufficiently high image contrast in captured digital images of illuminated objects.

Another object of the present invention is to provide such linear-type digital imaging system having a bioptical form factor with horizontal and vertical housing systems.

Another object of the present invention is to provide an area-type digital imaging system employing a wide-area illumination beam having a dynamically controlled mixture of visible and IR spectral energy, so as to reduce illumination brightness at POS environments during system operation while achieving sufficiently high image contrast in captured digital images of illuminated objects.

Another object of the present invention is to provide such area-type digital imaging system having a bioptical form factor with horizontal and vertical housing systems.

Another object of the present invention is to provide a hybrid linear-type and area-type digital imaging system employing a wide-area illumination beam having a dynamically controlled mixture of visible and IR spectral energy, so as to reduce illumination brightness at POS environments during system operation while achieving sufficiently high image contrast in captured digital images of illuminated objects.

Another object of the present invention is to provide such hybrid-type digital imaging system having a bioptical form factor with horizontal and vertical housing systems.

Another object of the present invention is to provide an omni-directional digital image capturing and processing based bar code symbol reading system comprising both a horizontal housing section with a first pair of laterally-spaced area-type illumination and imaging stations, and a vertical housing station with a second pair of laterally-spaced area-type illumination and imaging stations, for supporting both "pass-through" as well as "presentation" modes of bar code image capture.

Another object of the present invention is to provide such an omni-directional image capturing and processing based bar code symbol reading system, wherein the first pair of area-type illuminating and imaging stations are mounted within the horizontal section for projecting a first pair of coextensive area-type illumination and imaging fields (i.e. zones) from its horizontal imaging window into the 3D imaging volume of the system using both a dynamically/adaptively controlled mixture of visible/IR illumination, and wherein the second pair of area-type illumination and imaging stations are mounted in the vertical section for projecting a second pair of laterally-spaced area-type illumination and imaging fields (i.e. zones) into the 3D imaging volume of the system, also using both a dynamically/adaptively controlled mixture of visible/IR illumination.

Another object of the present invention is to provide such an omni-directional image capturing and processing based bar code symbol reading system, wherein each coextensive area-type illumination and imaging station comprises a VLD/IRVD-based area illumination array, an area-type image formation and detection subsystem, an image capturing and buffering subsystem, an automatic object motion/velocity sensing subsystem, and a local control subsystem supporting a method of dynamically/adaptively controlling visible/IR illumination.

Another object of the present invention is to provide such an omni-directional image capturing and processing based bar code symbol reading system, wherein each object motion/velocity detection subsystem comprising an area-type image acquisition subsystem and an embedded digital signal processing (DSP) chip to support high-speed digital image capture and (local) processing operations required for real-time object motion/velocity detection.

Another object of the present invention is to provide such an omni-directional image capturing and processing based bar code symbol reading system, wherein locally-controlled object motion/velocity detection is employed to control operations within the system.

Another object of the present invention is to provide such an omni-directional image capturing and processing based bar code symbol reading system, wherein a computing and memory architecture platform is provided for implementing the functionalities of the omni-directional image capturing and processing based bar code symbol reading system.

Another object of the present invention is to provide a retail point of sale (POS) station having a countertop surface, in which a POS-centric digital imaging system is mounted, and embodying (i) the omni-directional digital image capturing and processing subsystem within its horizontal housing section, and (ii) a cashier/customer terminal integrated within the vertical section of the system housing, to simultaneously support cashier product scanning/imaging and checkout operations on the cashier side of the system, and customer payment, advertising and other services on the customer side of the system.

Another object of the present invention is to provide such a POS-centric digital imaging system, which further comprises a plurality of area-type illumination and imaging stations, an image processing subsystem, a control subsystem, an I/O subsystem, object recognition subsystem, cashier's sales terminal and customer transaction terminal.

A retail point of sale (POS) station having a countertop surface, in which a POS-centric digital imaging system is mounted, and embodying (i) the omni-directional digital image capturing and processing subsystem within its horizontal and vertical housing sections, and (ii) a cashier/customer terminal is integrated within the vertical section of the system housing, to simultaneously support cashier product scanning/imaging and checkout operations on the cashier side of the system, and customer payment, advertising and other services on the customer side of the system.

Another object of the present invention is to provide such a POS-centric digital imaging system, which further comprises a plurality of area-type illumination and imaging stations, an image processing subsystem, a control subsystem, an I/O subsystem, object recognition subsystem, cashier's sales terminal and customer transaction terminal.

Another object of the present invention is to provide retail point of sale (POS) station having a countertop surface, in which a POS-centric digital imaging system is mounted, and embodying (i) the omni-directional digital image capturing and processing subsystem within its horizontal and vertical housing sections, and (ii) a cashier/customer terminal is integrated within the vertical section of the system housing, to simultaneously support cashier product scanning/imaging and checkout operations on the cashier side of the system, and customer payment, advertising and other services on the customer side of the system.

Another object of the present invention is to provide such a POS-centric digital imaging system, which further comprises a plurality of area-type illumination and imaging stations, an image processing subsystem, a global control subsystem, an I/O subsystem, object recognition subsystem, cashier's sales terminal and customer transaction terminal.

These and other objects of the present invention will become apparent hereinafter and in the claims to Invention.

BRIEF DESCRIPTION OF THE DRAWINGS

In order to more fully understand the Objects of the Present Invention, the following Detailed Description of the Illustrative Embodiments should be read in conjunction with the accompanying figure Drawings in which:

FIG. 5E1 is a block schematic representation of a coplanar laser illumination and imaging subsystem (i.e. station) which can be employed any digital image capturing and processing system of the present invention and comprises: an image formation and detection (IFD) subsystem having a linear (1D) image sensing array (or 2D image sensing array with a narrow-area region activated for photo-integration) and optics providing a field of view (FOV) on the image sensing array; an spectral-mixing based illumination subsystem producing a first field of visible illumination (produced from an array of VLDs) and a second field of invisible illumination (produced from an array of IR LDs) that spatially overlap and spatially/temporally intermix with each other while having a adaptively/dynamically set relative power ratio (VIS/IR), and are substantially coplanar or coextensive with the FOV of the image sensing array; an integrated laser de-speckling mechanism associated the IFD subsystem as disclosed in WIPO Publication No. WO/2002/043195 or in the present Specification; an image capturing and buffering subsystem for capturing and buffering images from the image sensing array; an automatic object motion/velocity detection subsystem for automatically detecting the motion and velocity of an object moving through at least a portion of the FOV of the image sensing array; and a local control subsystem for controlling the operations of the subsystems within the illumination and imaging station;

FIG. 5E2 is a flow chart illustrating the steps involved in the method of adaptively/dynamically controlling the spectral composition of the planar illumination beam produced from the illumination subsystem of the coplanar laser illumination and imaging subsystem (i.e. station) illustrated in FIG. 5E1;

FIG. 5F1 is a block schematic representation of a coplanar laser illumination and imaging subsystem (i.e. station) which can be employed any digital image capturing and processing system of the present invention and comprises: an image formation and detection (IFD) subsystem having a linear (1D) image sensing array (or 2D image sensing array with a narrow-area region activated for photo-integration) and optics providing a field of view (FOV) on the image sensing array; an spectral-mixing based illumination subsystem producing a first field of visible illumination (produced from an array of VLDs) and a second field of invisible illumination (produced from an array of IR LDs) that spatially overlap and spatially/temporally intermix with each other while having a adaptively/dynamically set relative power ratio (VIS/IR), and are substantially coplanar or coextensive with the FOV of the image sensing array; an integrated laser de-speckling mechanism associated the IFD subsystem using the high-frequency modulation HFM techniques of the present invention disclosed in FIGS. 5H through 5N, and optical multiplexing (OMUX) techniques of the present invention disclosed in FIGS. 5O through 5Y; an image capturing and buffering subsystem for capturing and buffering images from the image sensing array; an automatic object motion/velocity detection subsystem for automatically detecting the motion and velocity of an object moving through at least a portion of the FOV of the image sensing array; and a local control subsystem for controlling the operations of the subsystems within the illumination and imaging station;

FIG. 5F2 is a flow chart illustrating the steps involved in the method of adaptively/dynamically controlling the spectral composition of the planar illumination beam produced from the illumination subsystem of the coplanar laser illumination and imaging subsystem (i.e. station) illustrated in FIG. 5F1;

FIG. 5G1 is a block schematic representation of a coextensive area-type illumination and imaging subsystem (i.e. station) which can be employed any digital image capturing and processing system of the present invention and comprises: an image formation and detection (IFD) subsystem having an area-type (2D) image sensing array and optics providing a field of view (FOV) on the image sensing array; an spectral-mixing based illumination subsystem producing a first field of incoherent visible illumination (produced from an array of visible LEDs) and a second field of incoherent invisible illumination (produced from an array of IR LEDs) that spatially overlap and spatially/temporally intermix with each other while having an adaptively/dynamically set relative power ratio (VIS/IR), and are substantially coplanar or coextensive with the FOV of the image sensing array; an image capturing and buffering subsystem for capturing and buffering 2D images from the image sensing array; an automatic object motion/velocity detection subsystem for automatically detecting the motion and velocity of an object moving through at least a portion of the FOV of the image sensing array; and a local control subsystem for controlling the operations of the subsystems within the illumination and imaging station;

FIG. 5G2 is a flow chart illustrating the steps involved in the method of adaptively/dynamically controlling the spectral composition of the planar illumination beam produced from the illumination subsystem of the coplanar illumination and imaging subsystem (i.e. station) illustrated in FIG. 5G1;

FIG. 5I1 is a schematic block diagram illustrating a single HFM-OMUX based PLIM of the present invention depicted in FIG. 5H, showing its VLD, HFM circuitry and its current drive circuitry, with the HFM control signal OFF to disable high frequency modulation of the drive current supplied to the VLD;

FIG. 5I2 is a schematic block diagram illustrating a single HFM-OMUX based PLIM of the present invention depicted in FIG. 5H, showing its VLD, HFM circuitry and its current drive circuitry, with the HFM control signal ON to enable high frequency modulation of the drive current supplied to the VLD;

FIG. 5J1 is a graphical representation of a screen shot of the optical spectrum emitted from a HFM-OMUX based PLIM of the present invention employed in the Illumination Subsystem of FIG. 5H, wherein the high frequency modulation (HFM) circuitry is disabled (i.e. HFM OFF) so that the drive current supplied to the VLD (i.e. HFM OFF) produces a single narrow-band peak about the characteristic wavelength of the VLD;

FIG. 5J2 is a graphical representation of a screen shot of the optical spectrum emitted from a HFM-OMUX based PLIM of the present invention employed in the illumination subsystem of FIG. 5H, wherein the high frequency modulation (HFM) circuitry is enabled (i.e. HFM ON) so that the HFM drive current supplied to the VLD (i.e. HFM OFF) produces a spectral sideband components about the central characteristic wavelength of the VLD, reducing the coherence of the laser illumination beam as well as its coherence length;

FIG. 5K1 is a schematic representation of a first illustrative embodiment of a single HFM-OMUX based PLIM of the present invention that can be employed in the HFM-OMUX based illumination subsystem of FIG. 5H, and shown comprising a flexible circuit as shown in FIGS. 5N1 and 5N2, and supporting (i) a VLD or IR laser diode (IRLD) and (ii) a HFM circuitry mounted in close proximity to the VLD or IRLD, and wherein the flexible circuit in turn is connected to a microprocessor-controlled current driver circuitry (e.g. controlled by the local control subsystem) realized on a PC board;

FIG. 5K2 is a schematic representation of a second illustrative embodiment of a single HFM-OMUX based PLIM of the present invention that can be employed in the HFM-OMUX based illumination subsystem of FIG. 5H, and shown comprising a flexible circuit as shown in FIGS. 5N1 and 5N2, and supporting (i) a VLD or IR laser diode (IRLD), (ii) a HFM circuitry mounted in close proximity to the VLD or IRLD, and (iii) a microprocessor-controlled current driver circuitry which is connected to the HFM circuitry and interfaced with the local control subsystem;

FIGS. 5M1 and 5M2, taken together, set forth a schematic diagram of the current driver circuitry of the present invention, employed in each PLIM of the HFM based illumination subsystem of FIG. 5H;

FIG. 5N1 is a schematic representation on the front side of the flexible circuit schematically illustrated in FIG. 5K1, and employed in each PLIM of the HFM-OMUX Based Illumination Subsystem of FIG. 5H;

FIG. 5N2 is a schematic representation on the back side of the flexible circuit schematically illustrated in FIG. 5K1, and employed in each PLIM of the HFM-OMUX based illumination subsystem of FIG. 5H;

FIG. 5N3 is a schematic representation on the front side of the flexible circuit schematically illustrated in FIG. 5K2, and employed in each PLIM of the HFM-OMUX Based Illumination Subsystem of FIG. 5H;

FIG. 5N4 is a schematic representation on the back side of the flexible circuit schematically illustrated in FIG. 5K2, and employed in each PLIM of the HFM-OMUX based illumination subsystem of FIG. 5H;

FIG. 5W1 shows a third illustrative embodiment of the laser beam despeckling device of the present invention, constructed as a polarization-encoding OMUX device comprising a three-sided prism and a ½ wave retarder plate disposed between a pair of mirrors arranged as shown, to optically multiplex an input laser beam into a single temporal-coherence reduced output laser beam, for subsequent planarization a multi-cylinder planarizing-type illumination lens array disposed in close proximity therewith;

FIG. 5W2 shows a fourth illustrative embodiment of the laser beam despeckling device of the present invention, constructed as polarization-encoding OMUX device comprising a polarization beam splitter arranged between a pair of prisms that forms and optical cube, and which supports orthogonally-arranged mirrors each bearing a ¼ wave retarder as shown, to optically multiplex an input laser beam into a single temporal/spatial-coherence reduced output laser beam, for subsequent planarization a multi-cylinder planarizing-type illumination lens array disposed in close proximity therewith;

FIG. 5W3 is a schematic diagram of a fifth illustrative embodiment of the laser beam despeckling device of the present invention, constructed as a polarization-encoding OMUX device comprising four mirrors, a ¼ wave retarder plate, a beam splitter arranged as shown, to optically multiplex and polarization-encoded an input laser beam into two temporal/spatial-coherence reduced output laser beams, for subsequent planarization a multi-cylinder planarizing-type illumination lens array disposed in close proximity therewith;

FIG. 5W4 shows an embodiment of a polarization-encoding based laser beam despeckling device, constructed as a polarization encoding OMUX device comprising a ¼ wave retarder plate disposed between a pair of glass plates bearing mirror and beam-splitter coatings as shown, to optically multiplex an input laser beam into two spatial and temporal coherence reduced output laser beams, and wherein the output beam is then subsequently planarized by a multi-cylinder planarizing-type illumination lens array disposed in close proximity therewith;

FIG. 5W5 is a schematic diagram of a seventh illustrative embodiment of the laser beam despeckling device of the present invention, similar to the device of FIG. 5W4, and shown constructed as a polarization-encoding OMUX device comprising a ¼ wave retarder plate disposed between a pair of glass plates (multiplexors) bearing mirror and beam-splitter coatings as shown, to optically multiplex an input laser beam into four spatial-coherence reduced output laser beams, for subsequent planarization a multi-cylinder planarizing-type illumination lens array disposed in close proximity therewith, and wherein the optical multiplexor can extended with the addition of another beam splitting coating to further double the number of laser beams internally produced for ultimate recombination;

FIG. 5W6 is a schematic diagram of a eighth illustrative embodiment of a multi-stage laser beam despeckling device of the present invention, shown constructed as an OMUX-based optical subsystem comprising (i) a first laser beam despeckling module as shown in FIG. 5W2 to optically multiplex an input laser beam into a temporal/spatial coherence reduced output laser beam, and (ii) a second laser beam despeckling module as shown in FIG. 5O for receiving the output laser beam from the first laser beam despeckling device, and producing, as output, a spatial/temporal-coherence reduced laser beam, for subsequent planarization a multi-cylinder planarizing-type illumination lens array disposed in close proximity therewith;

FIG. 5X1 is a first perspective view of the HFM-OMUX based planar laser illumination and imaging (PLIIM) module of the present invention, shown removed from the PC board supporting the digital image detection array sensor chip as illustrated in FIG. 5Y, and supporting both VLDs and IR laser diodes, a field of view (FOV) forming optics and a FOV folding mirror for use with the digital image detecting array mounted on the PC board;

FIG. 5X2 is an elevated side view of the planar laser illumination and imaging (PLIIM) module of the present invention depicted in FIG. 5X1, and showing it composite planar illumination beam (PLIB) arranged in a coplanar relationship with the central plane of the FOV of its image formation optics assembly;

FIG. 5X3 is a perspective, partially-exploded view of the planar laser illumination and imaging (PLIIM) module of the present invention depicted in FIG. 5X1, shown with its housing structure removed from its PC board, and its adjustable PLIMs removed from the mounting apertures formed in its housing structure, supporting the FOV mirror and FOV forming optics assembly;

FIG. 5X4 is a perspective view of the planar laser illumination and imaging (PLIIM) module of the present invention depicted in FIG. 5X1, shown mounted on its PC board shown supporting the digital linear image detection chip (i.e. linear or narrow-area image sensor), HFM and current drive circuitry, image capture and buffer circuitry, subsystem control circuitry (e.g. programmed micro-controller etc);

FIG. 6 is a perspective view of the first illustrative embodiment of the omni-directional image capturing and processing based bar code symbol reading system of the present invention, shown removed from its POS environment, and with one coplanar illumination and imaging plane being projected through an aperture in its imaging window protection plate, along with a plurality of object motion/velocity detection field of views (FOVs) that are spatially co-incident with portions of the field of view (FOV) of the linear imaging array employed in the coplanar illumination and imaging station generating the projected coplanar illumination and imaging plane;

FIG. 6E1 is a block schematic representation of the high-speed imaging-based object motion/velocity detection subsystem employed at each coplanar illumination and imaging station supported by the system, shown comprising an area-type image acquisition subsystem and an embedded digital signal processing (DSP) chip to support high-speed locally digital image capture and (local) processing operations required for real-time object motion/velocity detection;

FIG. 6E2 is a high-level flow chart describing the steps involved in the object motion/velocity detection process carried out at each coplanar illumination and imaging station supported by the system of the present invention;

FIG. 6E3 is a schematic representation illustrating the automatic detection of object motion and velocity at each coplanar illumination and imaging station in the system of the present invention, employing an imaging-based object motion/velocity sensing subsystem having a 2D image sensing array;

FIG. 6E4 is a schematic representation illustrating the automatic detection of object motion and velocity at each coplanar illumination and imaging station in the system of the present invention depicted in FIG. 2, employing an imaging-based object motion/velocity sensing subsystem having a 1D image sensing array;

FIG. 6F1 is a state transition diagram for the omni-directional image capturing and processing based bar code symbol reading system described in FIGS. 2 and 6C, running the system control program described in FIGS. 6G1A and 6G1B;

FIG. 6F2 is a state transition diagram for the omni-directional image capturing and processing based bar code symbol reading system described in FIGS. 2 and 6C, running the system control program described in FIGS. 6G2A and 6G2B;

FIG. 6F3 is a state transition diagram for the omni-directional image capturing and processing based bar code symbol reading system described in FIGS. 2 and 6C, running the system control program described in FIGS. 6G2A and 6G2B;

FIGS. 6G1A and 6G1B, taken together, set forth a high-level flow chart describing the operations (i.e. tasks) that are automatically performed during the state control process of FIG. 6F1 carried out within the omni-directional image capturing and processing based bar code symbol reading system described in FIGS. 2 and 6E4, employing locally-controlled object motion/velocity detection in each coplanar illumination and imaging subsystem of the system;

FIGS. 6G2A and 6G2B, taken together, set forth a high-level flow chart describing the operations (i.e. tasks) that are automatically performed during the state control process of FIG. 6F2 carried out within the omni-directional image capturing and processing based bar code symbol reading system described in FIGS. 2 and 6E4, employing locally-controlled object motion/velocity detection in each coplanar illumination and imaging subsystem of the system, with globally-controlled over-driving of nearest-neighboring stations;

FIGS. 6G3A and 6G3B, taken together, set forth a high-level flow chart describing the operations (i.e. tasks) that are automatically performed during the state control process of FIG. 6F3 carried out within the omni-directional image capturing and processing based bar code symbol reading system described in FIGS. 2 and 6E4, employing locally-controlled object motion/velocity detection in each coplanar illumination and imaging subsystem of the system, with globally-controlled over-driving of all-neighboring stations upon the detection of an object by one of the coplanar illumination and imaging stations;

FIG. 6' is a perspective view of second illustrative embodiment of the omni-directional image capturing and processing based bar code symbol reading system of the present invention, shown removed from its POS environment, and with one coplanar illumination and imaging plane being projected through an aperture in its imaging window protection plate, along with a plurality of IR Pulse-Doppler LIDAR based object motion/velocity sensing beams that are spatially coincident with portions of the field of view (FOV) of the linear imaging array employed in the coplanar illumination and imaging station generating the projected coplanar illumination and imaging plane;

FIG. 6A' is a perspective view of a design for each coplanar illumination and imaging station that can be employed in the omni-directional image capturing and processing based bar code symbol reading system of FIG. 6', wherein a linear array of VLDs or LEDs are used to generate a substantially planar illumination beam (PLIB) from the station that is coplanar with the field of view of the linear (1D) image sensing array employed in the station, and wherein three (3) high-speed IR Pulse-Doppler LIDAR based motion/velocity sensors are deployed at the station for the purpose of (i) detecting whether or not an object is present within the FOV at any instant in time, and (ii) detecting the motion and velocity of objects passing through the FOV of the linear image sensing array and controlling camera parameters in real-time, including the clock frequency of the linear image sensing array;

FIG. 6B' is a block schematic representation of the omni-directional image capturing and processing based bar code symbol reading system of FIG. 6', wherein a complex of coplanar illuminating and linear imaging stations are constructed using (i) VLD-based or LED-based illumination arrays and (ii) linear (CMOS-based) image sensing arrays as shown in FIG. 6A' for automatic image formation and capture along each coplanar illumination and imaging plane therewithin, and (ii) IR Pulse-Doppler LIDAR based object motion/velocity sensing subsystems for intelligent automatic detection of object motion and velocity within the 3D imaging volume of the system;

FIG. 6C' is a block schematic representation of one of the coplanar illumination and imaging stations employed in the system embodiment of FIG. 6B', showing its planar illumination array (PLIA), its linear image formation and detection subsystem, its image capturing and buffering subsystem, its high-speed IR Pulse-Doppler LIDAR based object motion/velocity detecting (i.e. sensing) subsystem, and its local control subsystem;

FIG. 6D1' is a block schematic representation of one of the coplanar illumination and imaging stations employed in the system embodiment of FIG. 6B', showing in greater detail its IR Pulse-Doppler LIDAR based object motion/velocity detection subsystem and how it cooperates with the local control subsystem, the planar illumination array (PLIA), and the linear image formation and detection subsystem; FIG. 6D2' is a schematic representation of the IR Pulse-Doppler LIDAR based object motion/velocity detecting (i.e. sensing) subsystem of the coplanar illumination and imaging station of FIG. 6A';

FIG. 6E' is a high-level flow chart describing the steps involved in the object motion/velocity detection process carried out at each coplanar illumination and imaging station supported by the system of FIG. 6';

FIG. 6F1' is a state transition diagram for the omni-directional image capturing and processing based bar code symbol reading system described in FIG. 6', running the system control program generally described in FIGS. 6G1A and 6G1B;

FIG. 6F2' is a state transition diagram for the omni-directional image capturing and processing based bar code symbol reading system described in FIG. 6', running the system control program generally described in FIGS. 6G2A and 6G2B;

FIG. 6F3' is a state transition diagram for the omni-directional image capturing and processing based bar code symbol reading system described in FIG. 6', running the system control program generally described in FIGS. 6G2A and 6G2B;

FIG. 6G' is a schematic diagram describing an exemplary embodiment of a computing and memory architecture platform for implementing the omni-directional image capturing and processing based bar code symbol reading system described in FIG. 6';

FIG. 6H' is a schematic representation of a three-tier software architecture that can run upon the computing and memory architecture platform of FIG. 6G', so as to implement the functionalities of the omni-directional image capturing and processing based bar code symbol reading system described FIG. 6';

FIG. 7E1 is a schematic representation of the architecture of the object motion/velocity detection subsystem of the present invention provided at each coplanar illumination and imaging station in the system embodiment of FIG. 7, wherein a pair of linear image sensing arrays, a pair of 2D image memory buffers and an image processor are configured, from local subsystems (i.e. local to the station), so as to implement a real-time imaging based object motion/velocity sensing process at the station during its object motion/velocity detection mode of operation; FIG. 7E2 is a schematic representation of the object motion/velocity detection process carried out at each coplanar illumination and imaging station employed in the system embodiment of FIG. 7, using the object motion/velocity detection subsystem schematically illustrated in FIG. 7E1;

FIG. 7F1 is a state transition diagram for the omni-directional image capturing and processing based bar code symbol reading system described in FIG. 7, running the system control program generally described in FIGS. 6G1A and 6G1B;

FIG. 7F2 is a state transition diagram for the omni-directional image capturing and processing based bar code symbol reading system described in FIG. 7, running the system control program described in FIGS. 6G2A and 6G2B;

FIG. 7F3 is a state transition diagram for the omni-directional image capturing and processing based bar code symbol reading system described in FIG. 7, running the system control program generally described in FIGS. 6G3A and 6G3B;

FIG. 8A1 is a schematic representation of the omni-directional image capturing and processing based bar code symbol reading system of FIG. 8A, wherein each coplanar illumination and imaging subsystem employs a linear array of VLDs or LEDs for generating a substantially planar illumination beam (PLIB) that is coplanar with the field of view of its linear (1D) image sensing array, and wherein a plurality of globally-controlled high-speed imaging-based motion/velocity subsystems are deployed in the system for the purpose of (i) detecting whether or not an object is present within the 3-D imaging volume of the system at any instant in time, and (ii) detecting the motion and velocity of objects passing therethrough and controlling camera parameters at each station in real-time, including the clock frequency of the linear image sensing arrays;

FIG. 8A2 is a block schematic representation of one of the coplanar illumination and imaging stations employed in the system embodiment of FIG. 8A1, showing its planar illumination array (PLIA), its linear image formation and detection subsystem, its image capturing and buffering subsystem, and its local control subsystem;

FIG. 8A3 is a block schematic representation of the high-speed imaging-based object motion/velocity detection subsystem employed in the system of FIG. 8A1, shown comprising an area-type image acquisition subsystem and an embedded digital signal processing (DSP) chip to support high-speed digital image capture and (global) processing operations required for real-time object motion/velocity detection through the 3D imaging volume of the system;

FIG. 8A4 is a high-level flow chart describing the steps associated with the object motion and velocity detection process carried out in the object motion/velocity detection subsystems globally implemented in the system of FIGS. 8A and 8A1;

FIG. 8B1 is a schematic representation of the omni-directional image capturing and processing based bar code symbol reading system of FIG. 8B, wherein each coplanar illumination and imaging subsystem employs a linear array of VLDs or LEDs for generating a substantially planar illumination beam (PLIB) that is coplanar with the field of view of its linear (1D) image sensing array, and wherein a plurality of globally-controlled high-speed IR Pulse-Doppler LIDAR-based motion/velocity subsystems are deployed in the system for the purpose of (i) detecting whether or not an object is present within the 3-D imaging volume of the system at any instant in time, and (ii) detecting the motion and velocity of objects passing therethrough and controlling camera parameters at each station in real-time, including the clock frequency of the linear image sensing arrays;

FIG. 8B2 is a block schematic representation of one of the coplanar illumination and imaging stations employed in the system embodiment of FIG. 8B1, showing its planar illumination array (PLIA), its linear image formation and detection subsystem, its image capturing and buffering subsystem, and its local control subsystem;

FIG. 8I is a schematic representation of a three-tier software architecture that can run upon the computing and memory architecture platform of FIG. 8H, so as to implement the functionalities of the omni-directional image capturing and processing based bar code symbol reading system described FIG. 8B;

Figure 1:
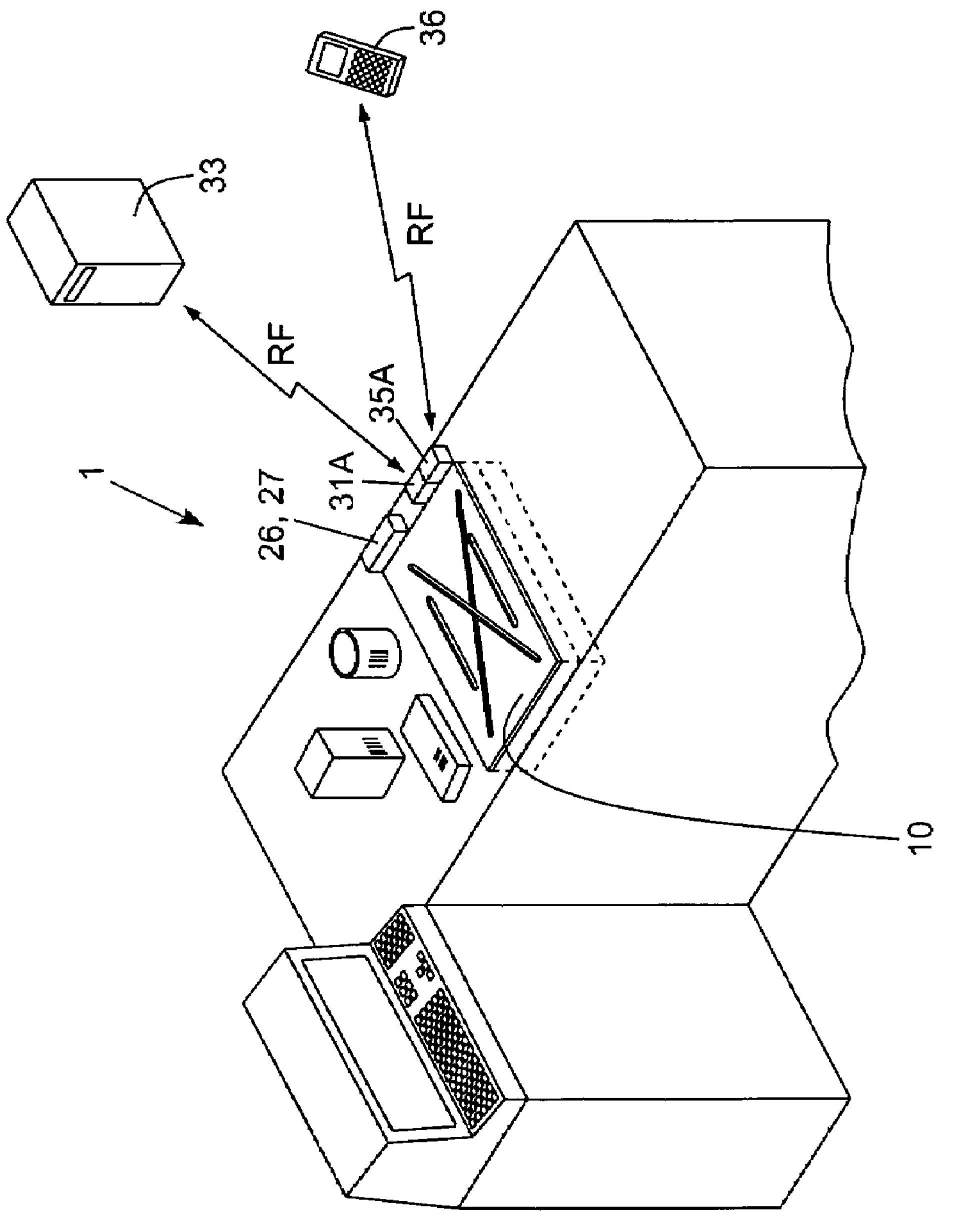
FIG. 1 is a perspective view of a retail point of sale (POS) station of the present invention employing an illustrative embodiment of the omni-directional image capturing and processing based bar code symbol reading system of the present invention, shown integrated with an electronic weight scale, an RFID reader and magnet-stripe card reader, and having thin, tablet-like form factor for compact mounting in the countertop surface of the POS station.
Figure 2:
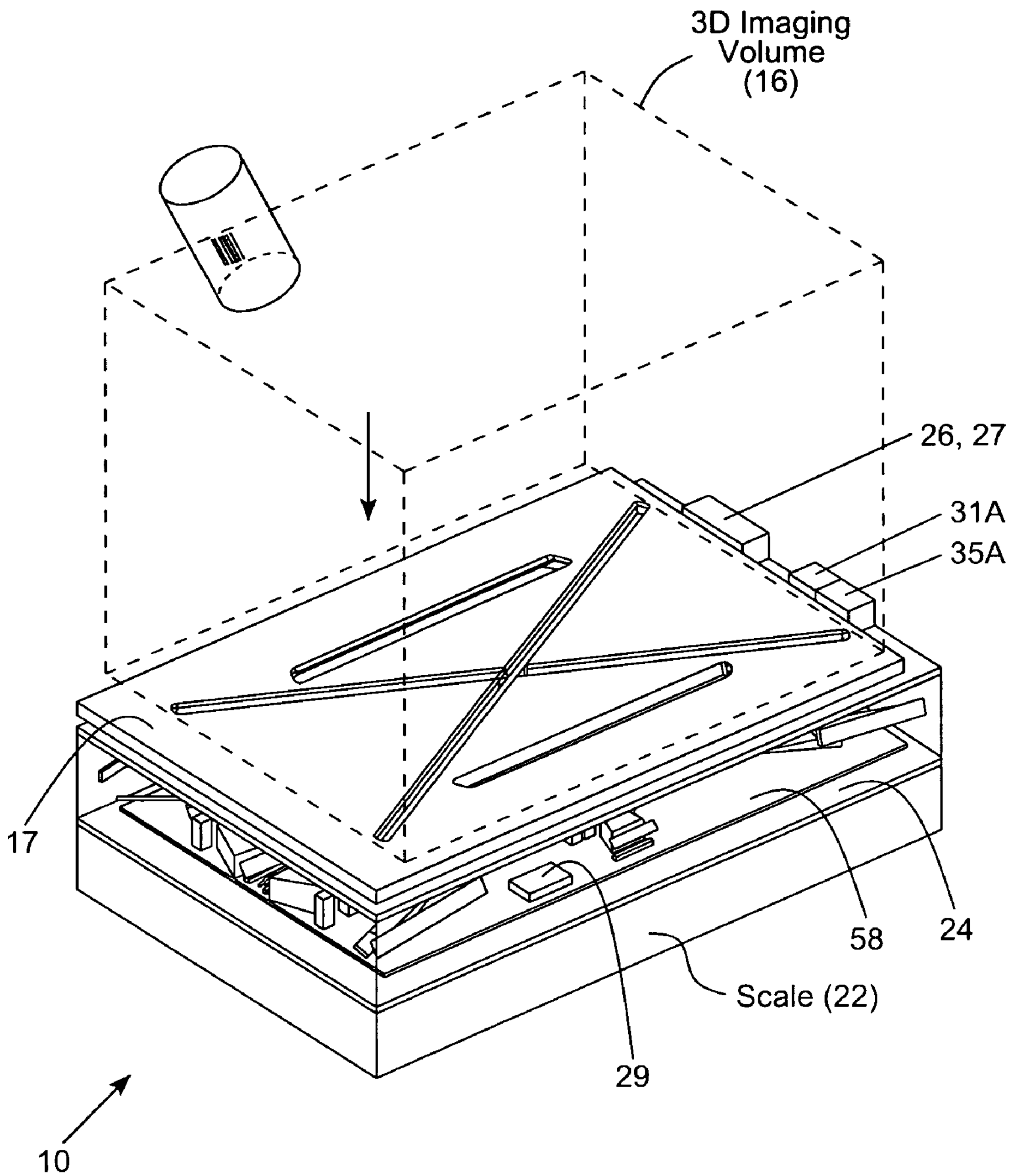
FIG. 2 is a first perspective view of the omni-directional image capturing and processing based bar code symbol reading system of the present invention shown removed from its POS environment in FIG. 1, and provided with an imaging window protection plate (mounted over a glass light transmission window) and having a central X aperture pattern and a pair of parallel apertures aligned parallel to the sides of the system, for the projection of coplanar illumination and imaging planes from a complex of coplanar illumination and imaging stations mounted beneath the imaging window of the system.
Figure 2A:
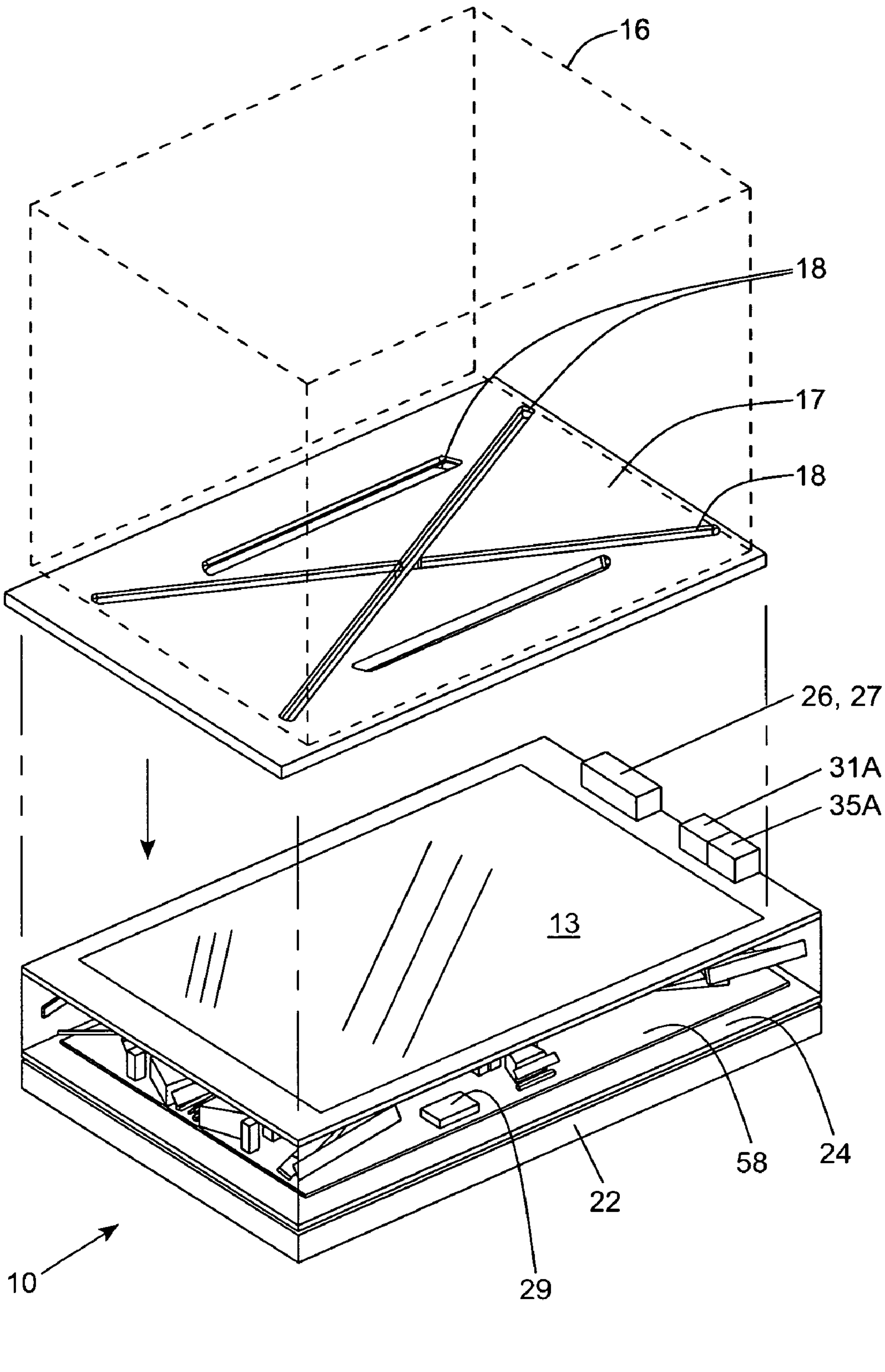
FIG. 2A is a perspective view of the omni-directional image capturing and processing based bar code symbol reading system shown in FIG. 2, wherein the apertured imaging window protection plate is simply removed from its glass imaging window for cleaning the glass imaging window, during routine maintenance operations at POS station environments.
Figure 2B:
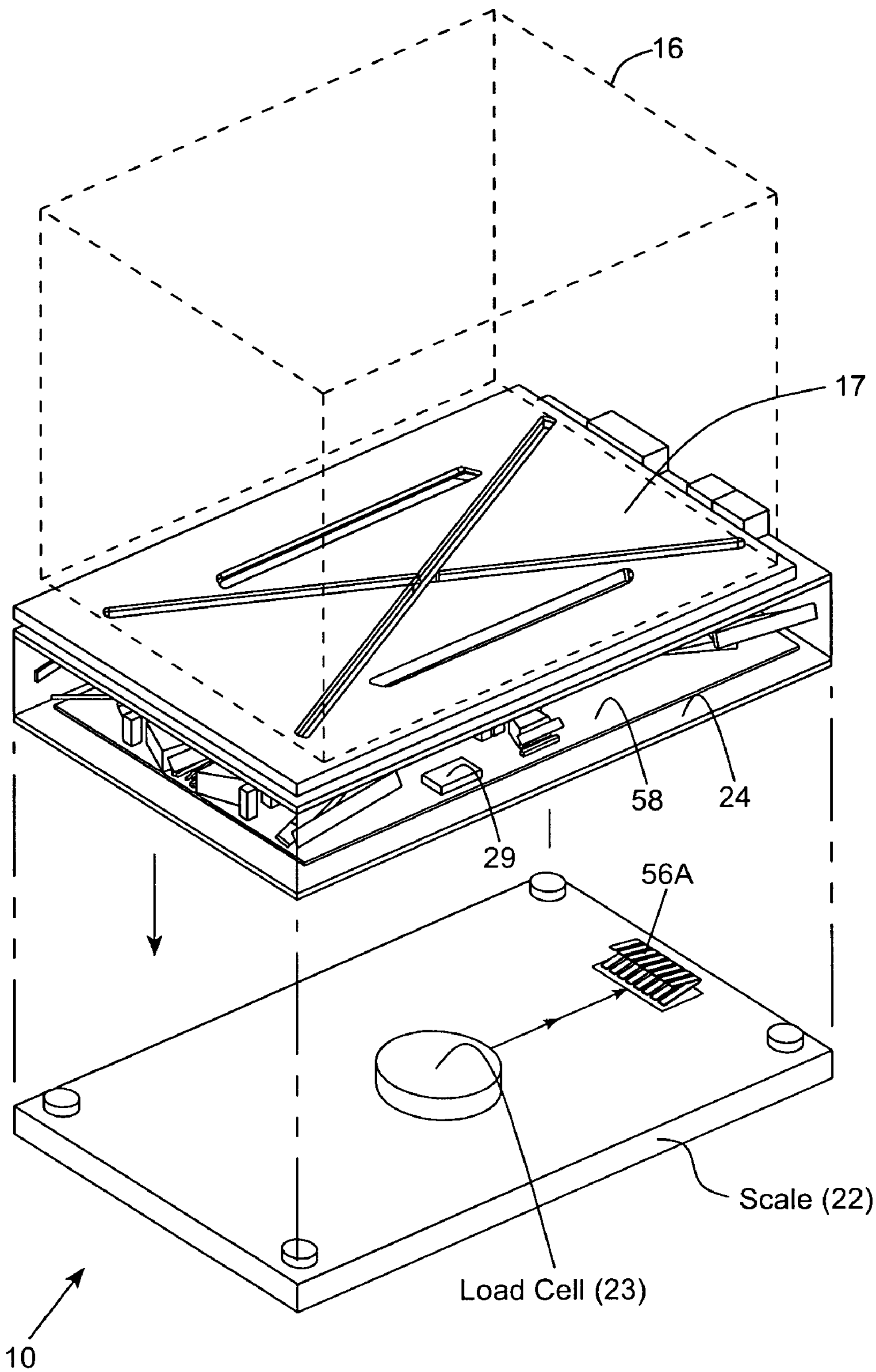
FIG. 2B is a perspective view of the omni-directional image capturing and processing based bar code symbol reading system shown in FIG. 2, wherein the image capturing and processing module (having a thin tablet form factor) is removed from the electronic weigh scale module during maintenance operations, revealing the centrally located load cell, and the touch-fit electrical interconnector arrangement of the present invention that automatically establishes all electrical interconnections between the two modules when the image capturing and processing module is placed onto the electronic weigh scale module, and its electronic load cell bears the weight of the image capturing and processing module.
Figure 3A:
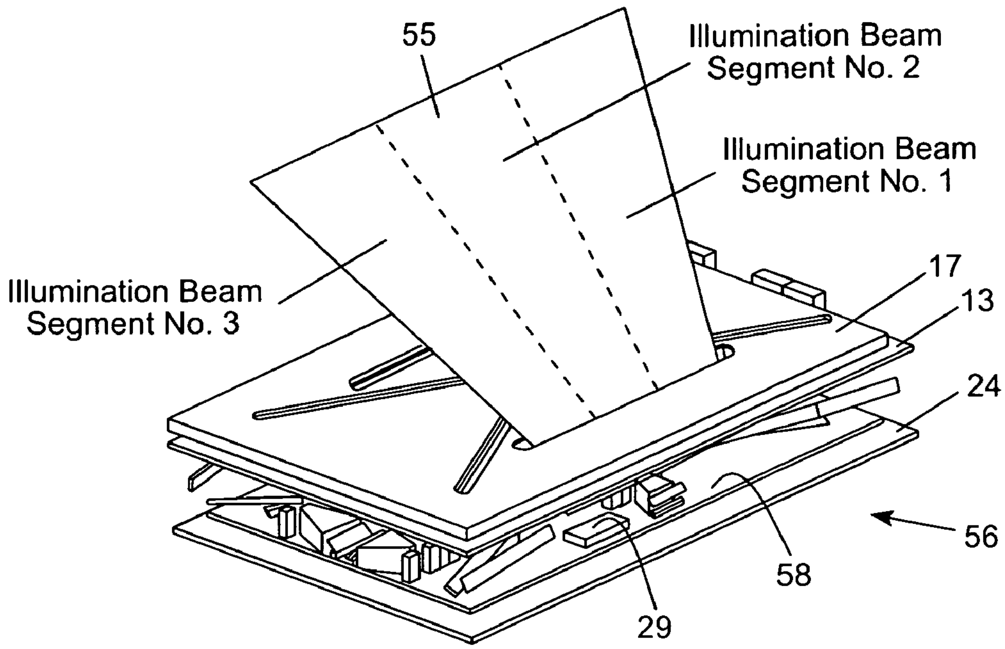
FIG. 3A is a perspective view of the omni-directional image capturing and processing based bar code symbol reading system of FIG. 2, showing a first coplanar illumination and imaging plane being generated from a first coplanar illumination and imaging station, and projected through a first side aperture formed in the imaging window protection plate of the system, and wherein the coplanar illumination and imaging plane of the station is composed of several segments which can be independently and electronically controlled under the local control subsystem of the station.
Figure 3B:
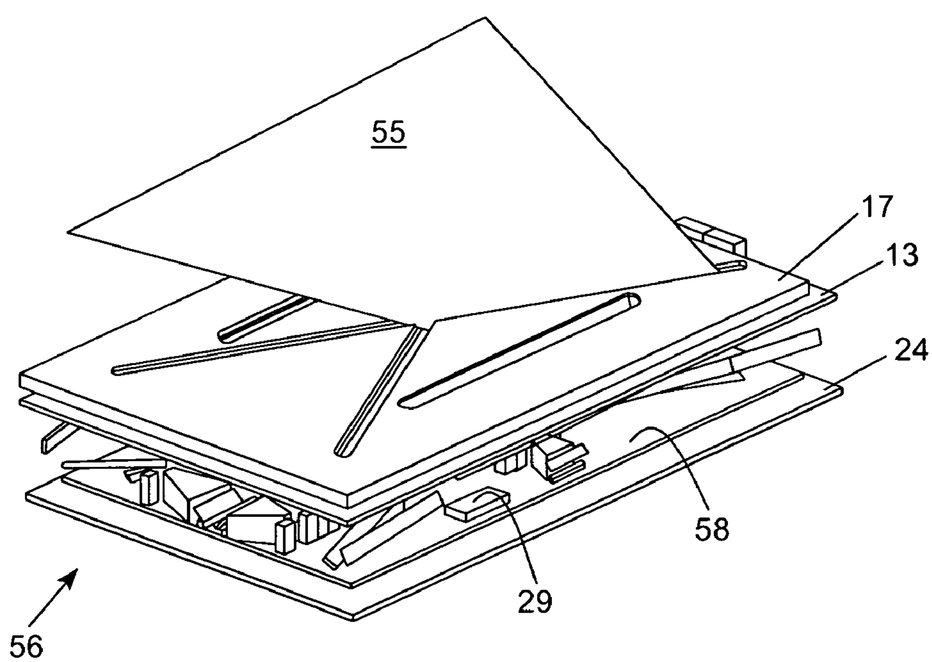
FIG. 3B is a perspective view of the omni-directional image capturing and processing based bar code symbol reading system of FIG. 2, showing a second coplanar illumination and imaging plane being generated from a second coplanar illumination and imaging station, and projected through a first part of the central X aperture pattern formed in the imaging window protection plate of the system.
Figure 3C:
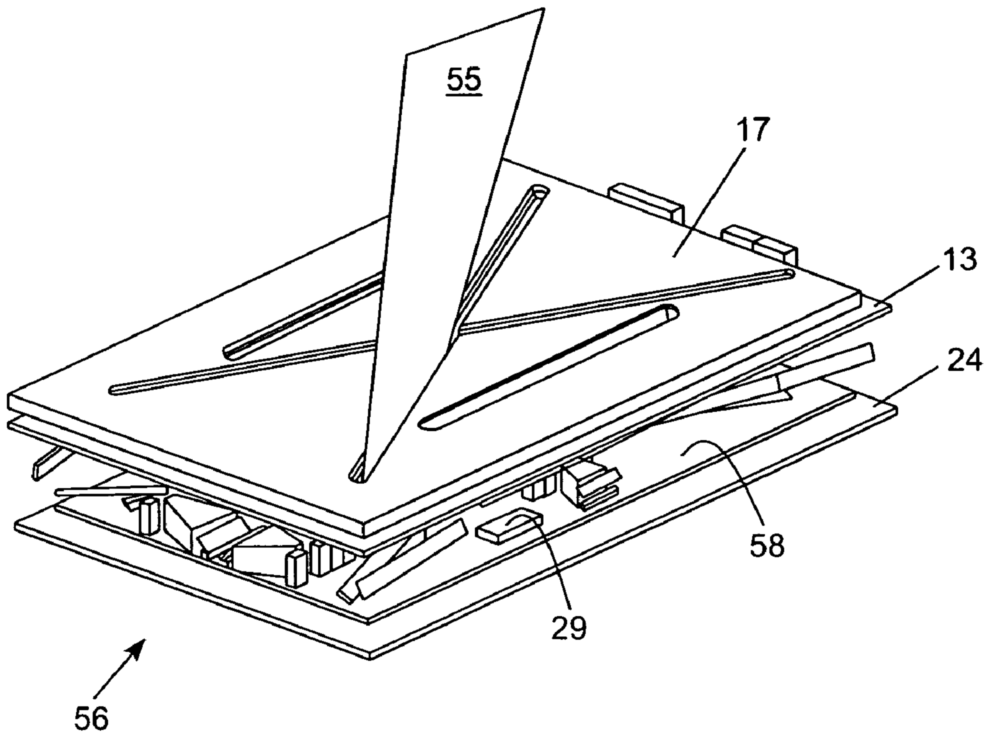
FIG. 3C is a perspective view of the omni-directional image capturing and processing based bar code symbol reading system of FIG. 2, showing a third coplanar illumination and imaging plane being generated from a third coplanar illumination and imaging station, and projected through a second part of the central X aperture pattern formed in the imaging window protection plate of the system.
Figure 3D:
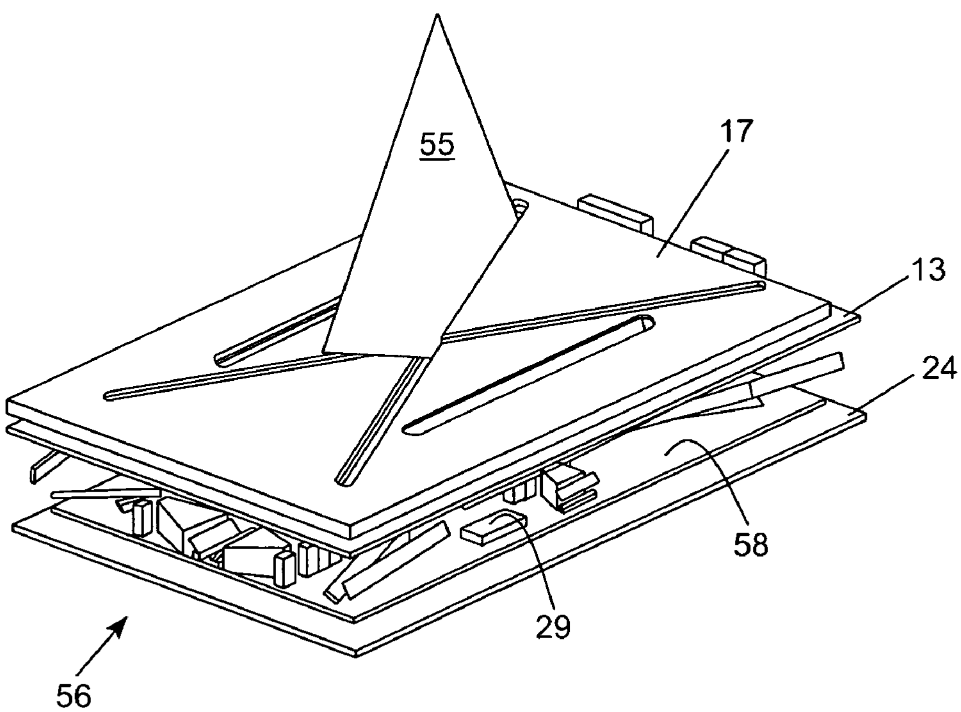
FIG. 3D is a perspective view of the omni-directional image capturing and processing based bar code symbol reading system of FIG. 2, showing a fourth coplanar illumination and imaging plane being generated from a fourth coplanar illumination and imaging station, and projected through a third part of the central X aperture pattern formed in the imaging window protection plate of the system.
Figure 3E:
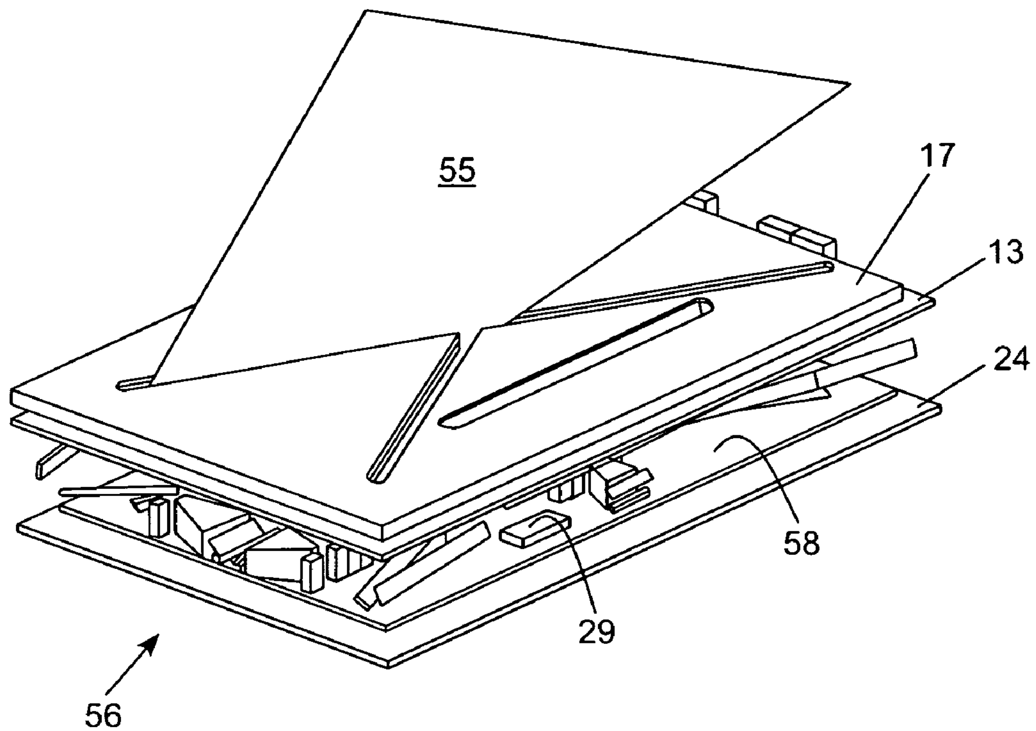
FIG. 3E is a perspective view of the omni-directional image capturing and processing based bar code symbol reading system of FIG. 2, showing a fifth coplanar illumination and imaging plane being generated from a fifth coplanar illumination and imaging station, and projected through a fourth part of the central X aperture pattern formed in the imaging window protection plate of the system.
Figure 3F:
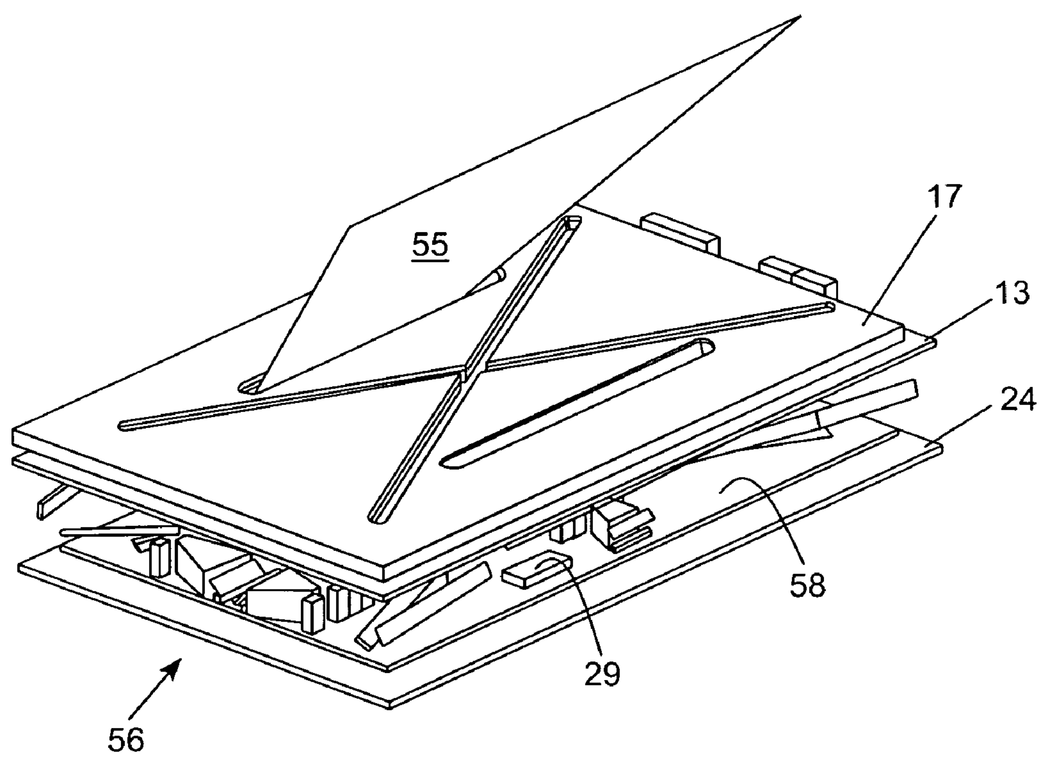
FIG. 3F is a perspective view of the omni-directional image capturing and processing based bar code symbol reading system of FIG. 2, showing a sixth coplanar illumination and imaging plane being generated from a sixth coplanar illumination and imaging station, and projected through a second side aperture formed in the imaging window protection plate of the system.
Figure 3G:
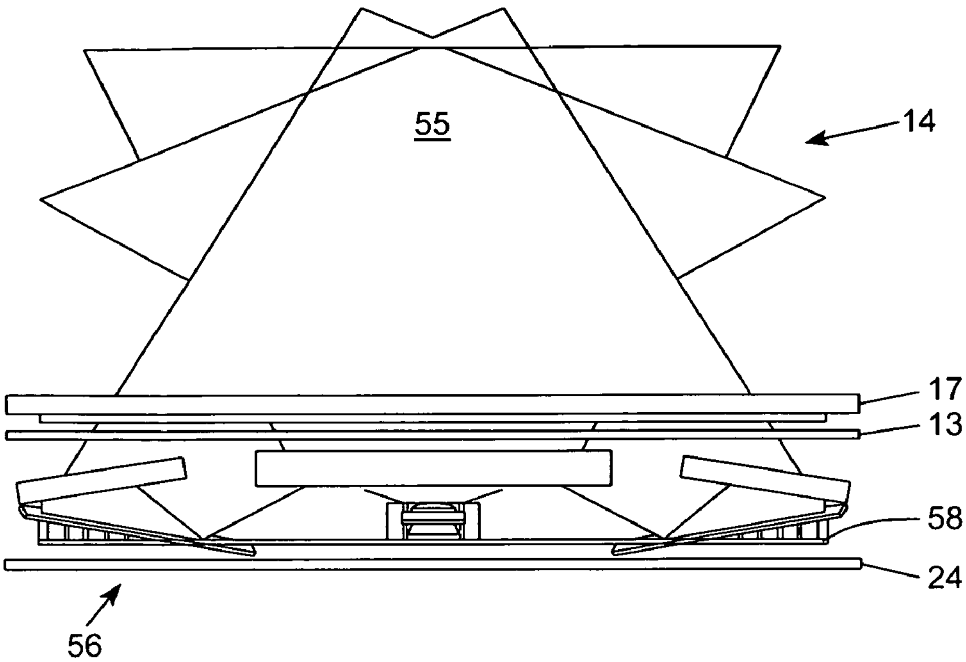
FIG. 3G is a first elevated side view of the omni-directional image capturing and processing based bar code symbol reading system of FIG. 2, showing all of its six coplanar illumination and imaging planes being substantially simultaneously generated from the complex of coplanar illumination and imaging stations, and projected through the imaging window of the system, via the apertures in its imaging window protection plate, and intersecting within a 3-D imaging volume supported above the imaging window.
Figure 3H:
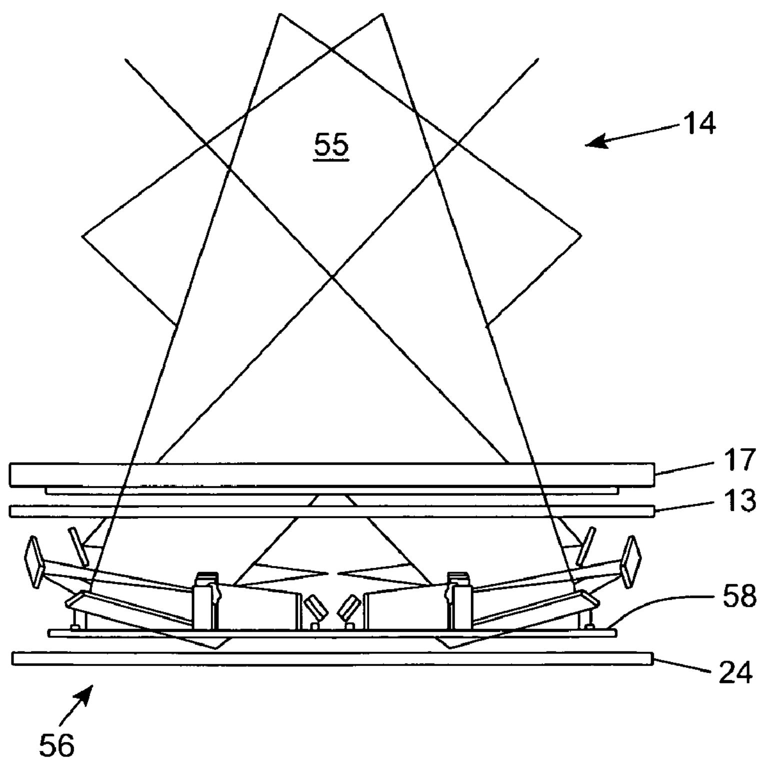
FIG. 3H is a second elevated side view of the omni-directional image capturing and processing based bar code symbol reading system of FIG. 2, showing all of its six coplanar illumination and imaging planes being substantially simultaneously projected through the imaging window of the system, via the apertures in its imaging window protection plate.
Figure 4A:
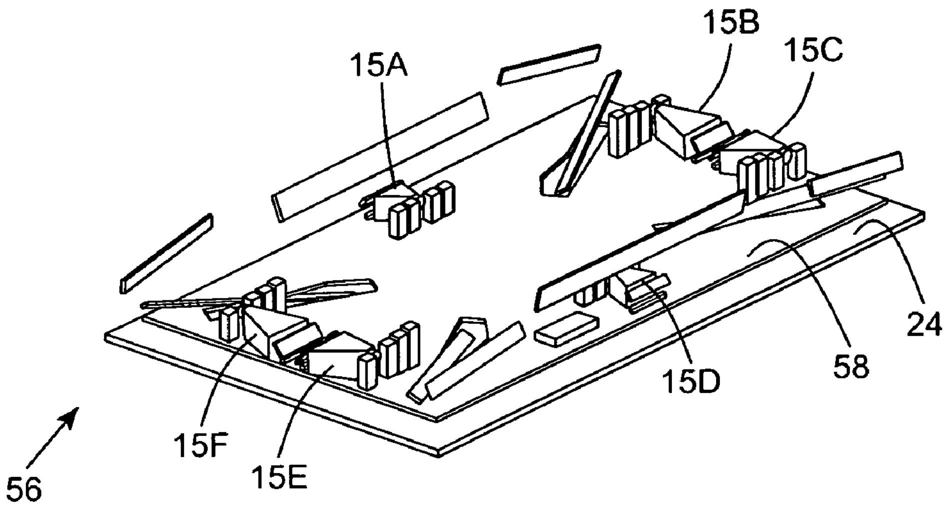
FIG. 4A is a perspective view of the printed-circuit(PC)-board/optical-bench associated with the omni-directional image capturing and processing based bar code symbol reading system of FIG. 2, shown with the top portion of its housing, including its imaging window and window protection plate, removed for purposes of revealing the coplanar illumination and imaging stations mounted on the optical bench of the system and without these stations generating their respective coplanar illumination and imaging planes.
Figure 4B:
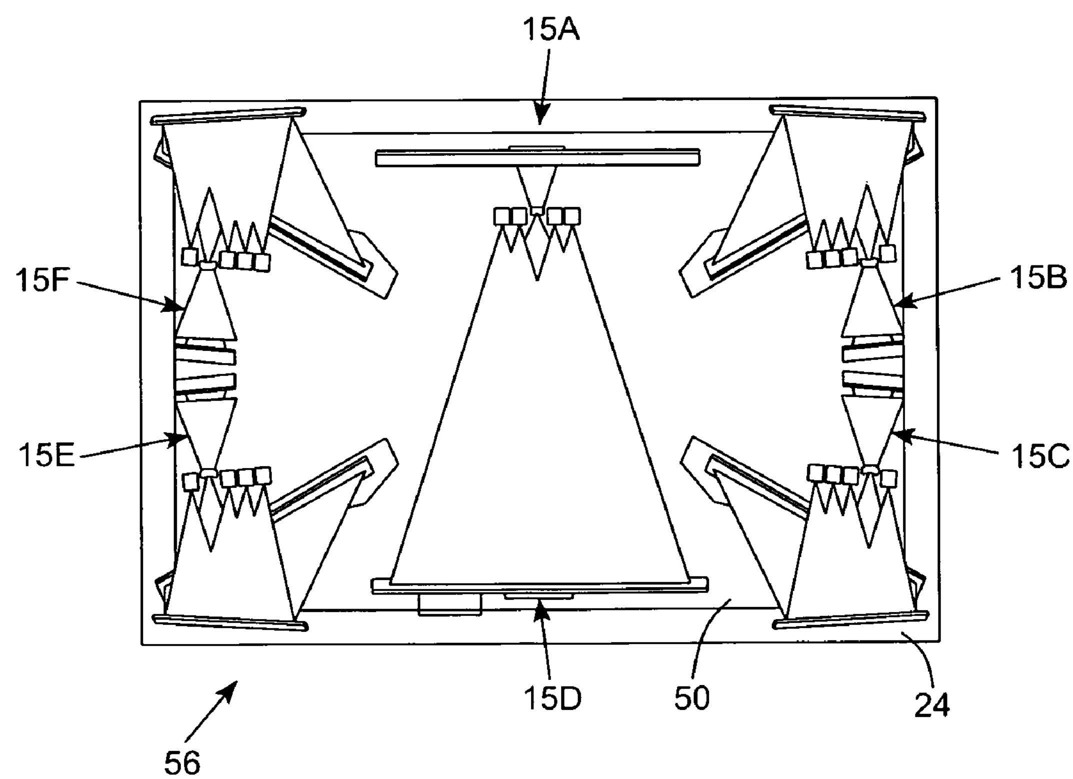
FIG. 4B is a plane view of the optical bench associated with the omni-directional image capturing and processing based bar code symbol reading system of FIG. 2, shown with the top portion of its housing, including its imaging window and window protection plate, removed for purposes of revealing the coplanar illumination and imaging stations mounted on the optical bench of the system while these stations are generating their respective coplanar illumination and imaging planes.
Figure 4C:
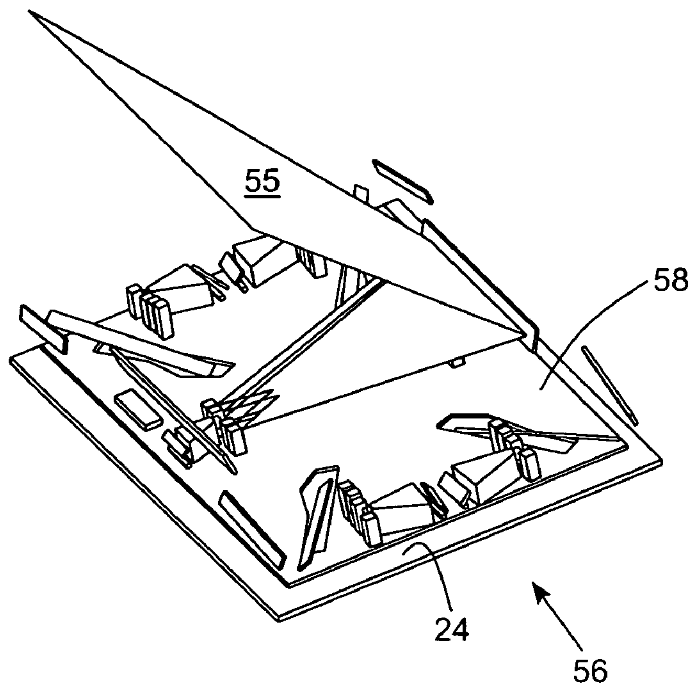
FIG. 4C is a perspective view of the omni-directional image capturing and processing based bar code symbol reading system of FIG. 2, shown with the top portion of its housing, including its imaging window and window protection plate removed, wherein the first coplanar illumination and imaging plane is shown generated from the first coplanar illumination and imaging station and projected through the first side aperture formed in the imaging window protection plate of the system.
Figure 4D:
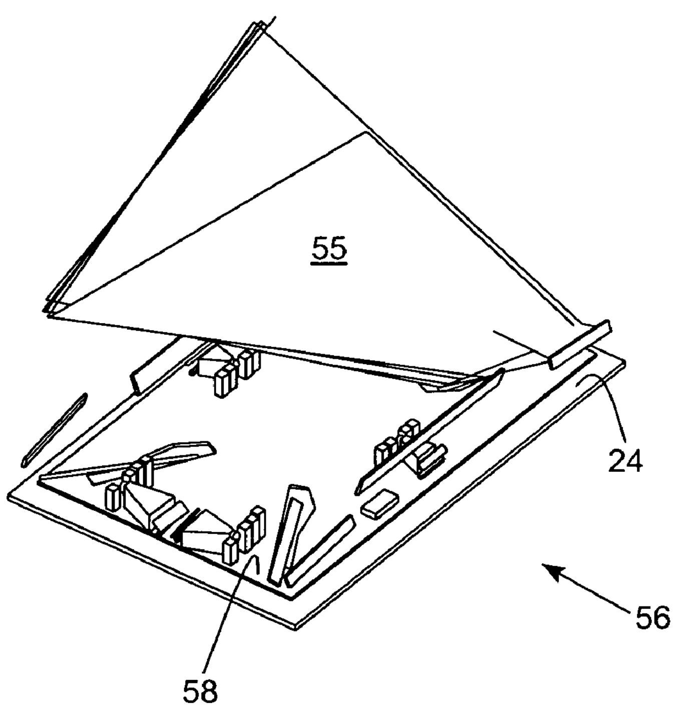
FIG. 4D is a perspective view of the omni-directional image capturing and processing based bar code symbol reading system of FIG. 2, shown with the top portion of its housing, including its imaging window and window protection plate removed, wherein the second coplanar illumination and imaging plane is shown generated the second coplanar illumination and imaging station and projected through the first part of the central X aperture pattern formed in the imaging window protection plate of the system.
Figure 4E:
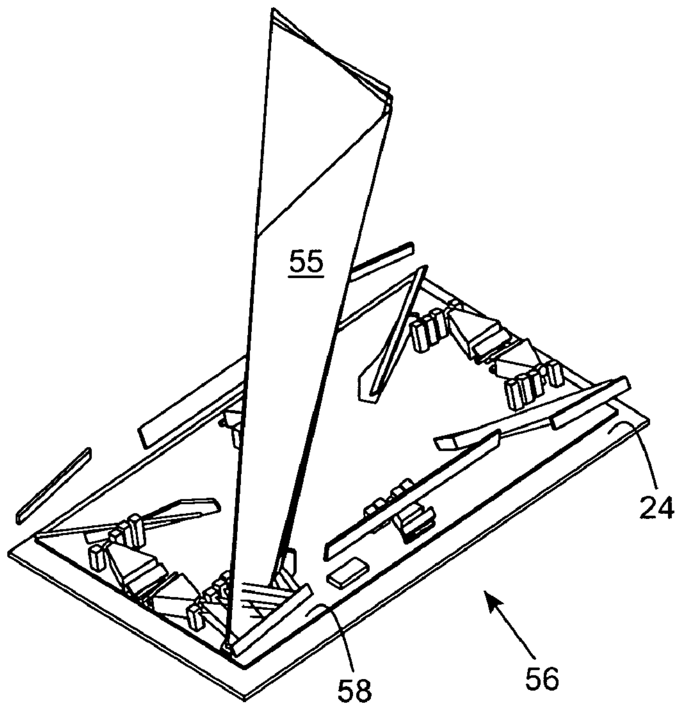
FIG. 4E is a perspective view of the omni-directional image capturing and processing based bar code symbol reading system of FIG. 2, shown with the top portion of its housing, including its imaging window and window protection plate removed, wherein the third coplanar illumination and imaging plane is shown generated from the third coplanar illumination and imaging station and projected through the second part of the central X aperture pattern formed in the imaging window protection plate of the system.
Figure 4F:
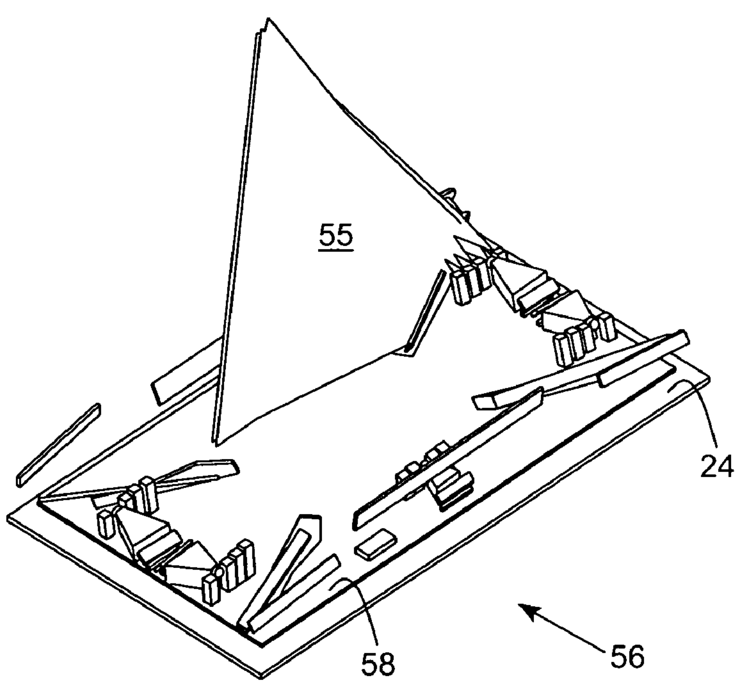
FIG. 4F is a perspective view of the omni-directional image capturing and processing based bar code symbol reading system of FIG. 2, shown with the top portion of its housing, including its imaging window and window protection plate removed, wherein the fourth coplanar illumination and imaging plane is shown generated from the fourth coplanar illumination and imaging station, and projected through the third part of the central X aperture pattern formed in the imaging window protection plate of the system.
Figure 4G:
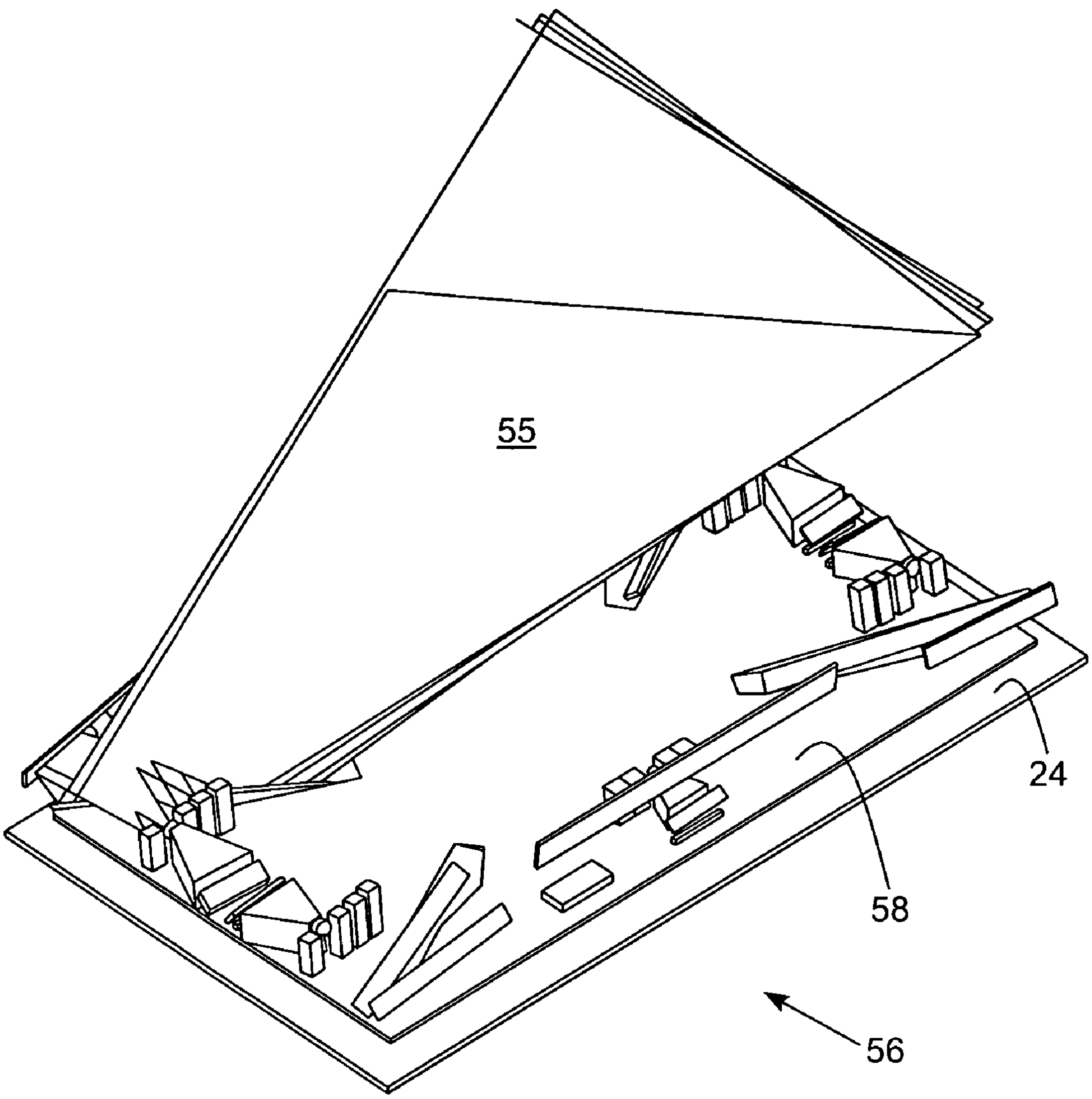
FIG. 4G is a perspective view of the omni-directional image capturing and processing based bar code symbol reading system of FIG. 2, shown with the top portion of its housing, including its imaging window and window protection plate removed, wherein the fifth coplanar illumination and imaging plane is shown generated from the fifth coplanar illumination and imaging station, and projected through the fourth part of the central X aperture pattern formed in the imaging window protection plate of the system.
Figure 4H:
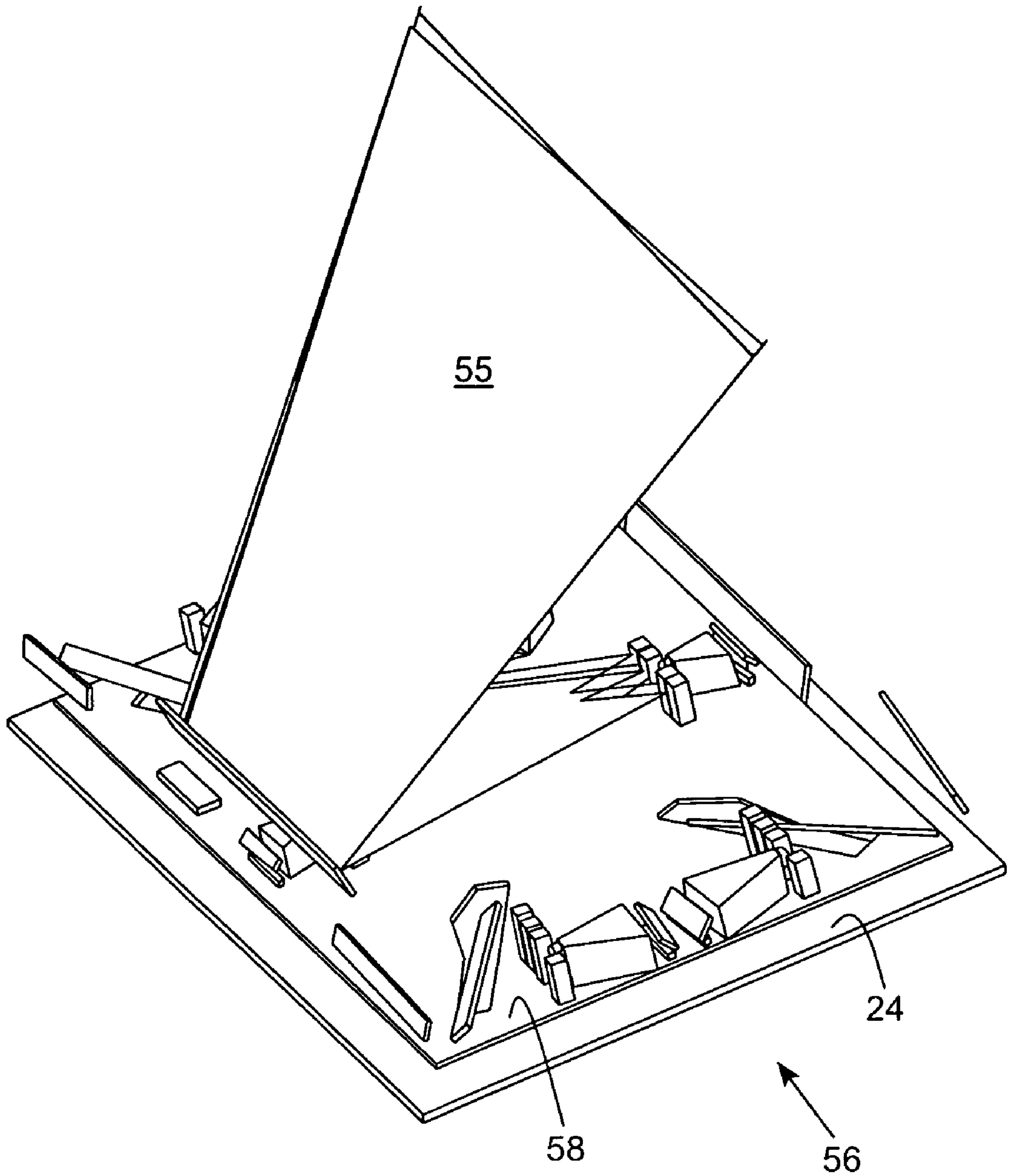
FIG. 4H is a perspective view of the omni-directional image capturing and processing based bar code symbol reading system of FIG. 2, shown with the top portion of its housing, including its imaging window and window protection plate removed, wherein the sixth coplanar illumination and imaging plane is shown generated from the sixth coplanar illumination and imaging station, and projected through the second side aperture formed in the imaging window protection plate of the system.
Figure 6:
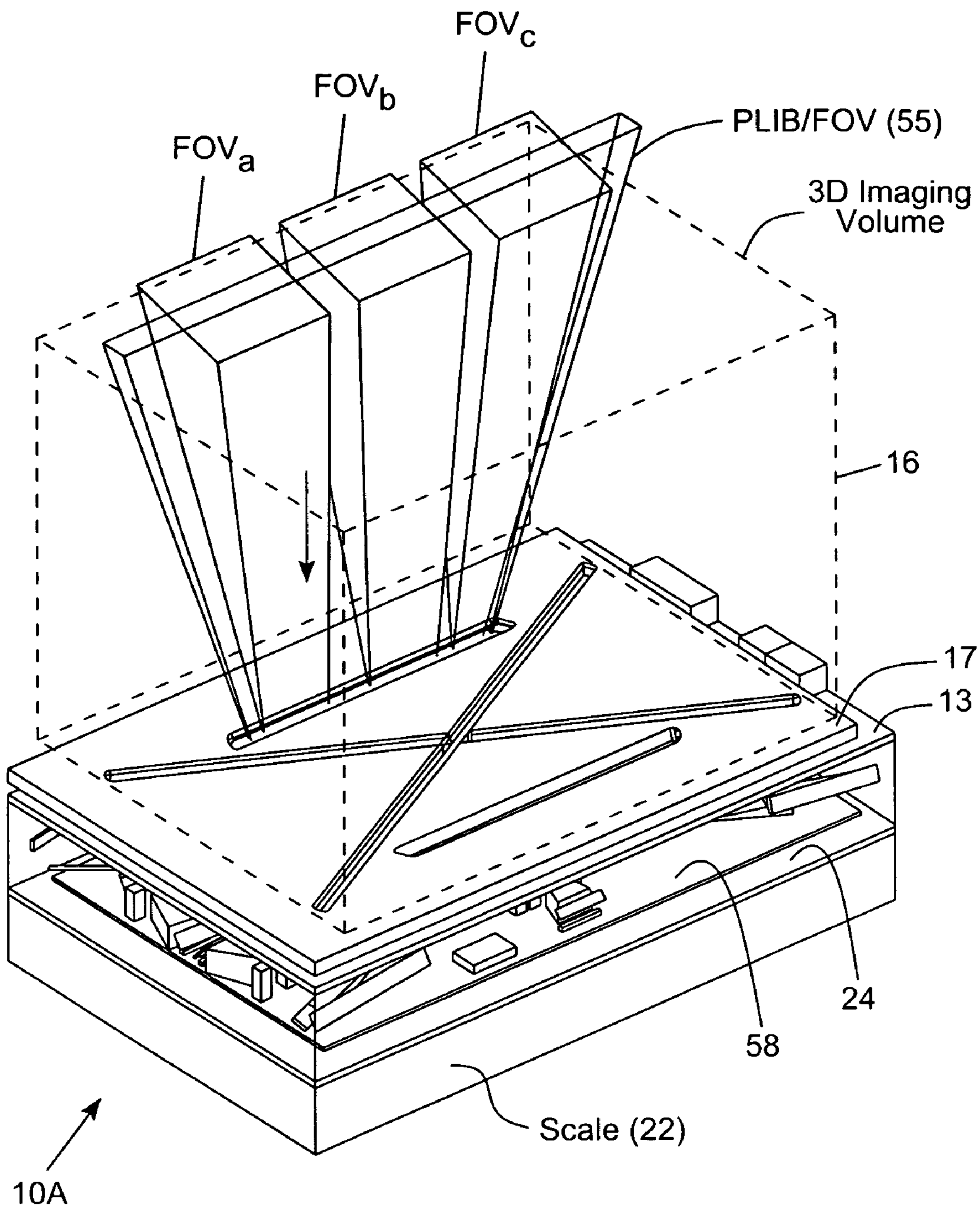
Figure 6A:
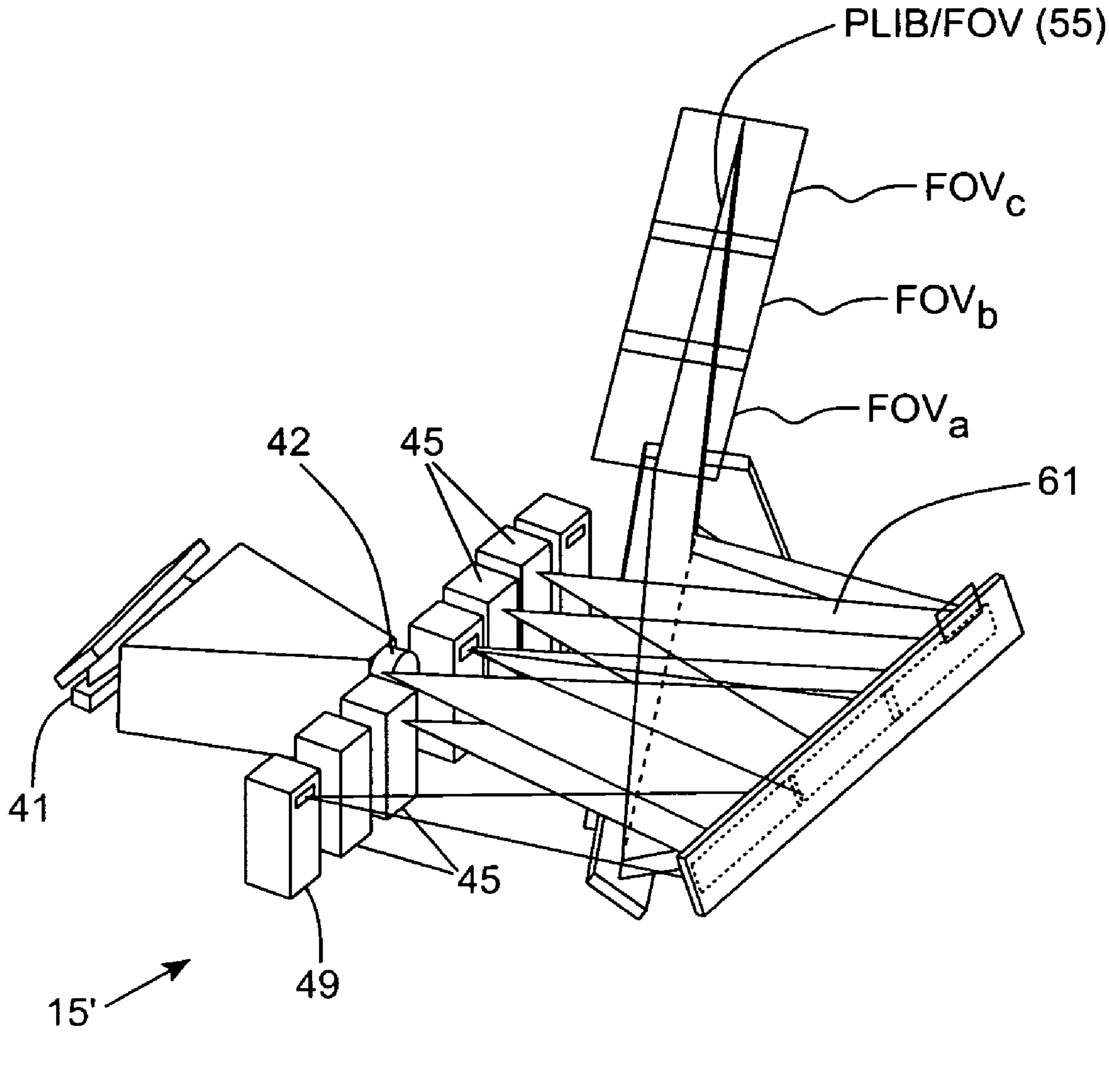
FIG. 6A is a perspective view of a first design for each coplanar illumination and imaging station that can be employed in the omni-directional image capturing and processing based bar code symbol reading system of FIG. 6, wherein a linear array of VLDs or LEDs are used to generate a substantially planar illumination beam (PLIB) from the station that is coplanar with the field of view of the linear (1D) image sensing array employed in the station, and wherein three (3) high-speed imaging-based motion/velocity sensors (i.e. detectors) are deployed at the station for the purpose of (i) detecting whether or not an object is present within the FOV at any instant in time, and (ii) detecting the motion and velocity of objects passing through the FOV of the linear image sensing array and controlling camera parameters in real-time, including the clock frequency of the linear image sensing array.
Figure 6B:
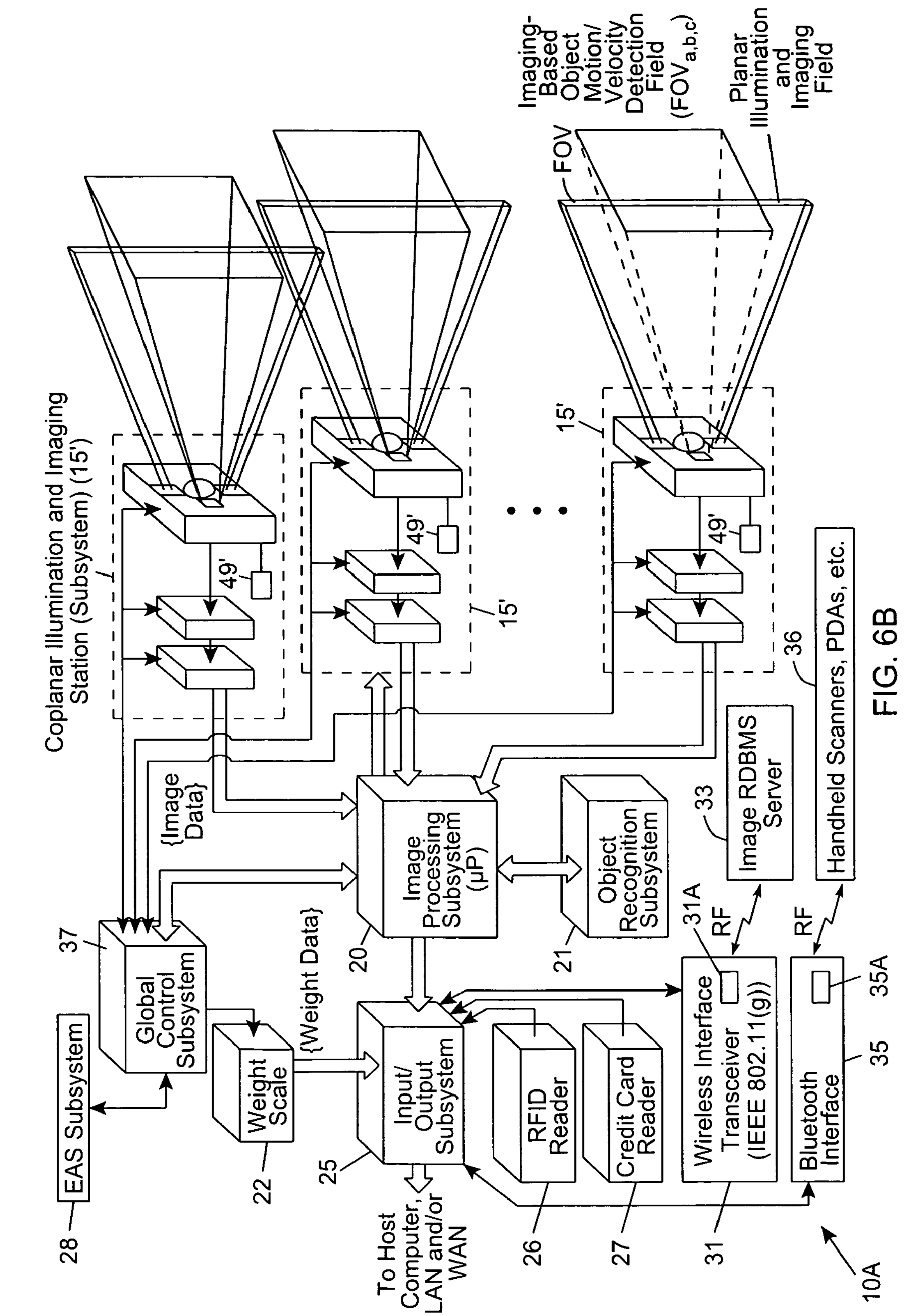
FIG. 6B is a block schematic representation of the omni-directional image capturing and processing based bar code symbol reading system of FIG. 6, wherein a complex of coplanar illuminating and linear imaging stations, constructed using VLD-based or LED-based illumination arrays and linear (CMOS-based) image sensing arrays, as shown in FIG. 6A, and imaging-based object motion/velocity sensing and intelligent automatic illumination control within the 3D imaging volume, and automatic image formation and capture along each coplanar illumination and imaging plane therewithin.
Figure 6C:
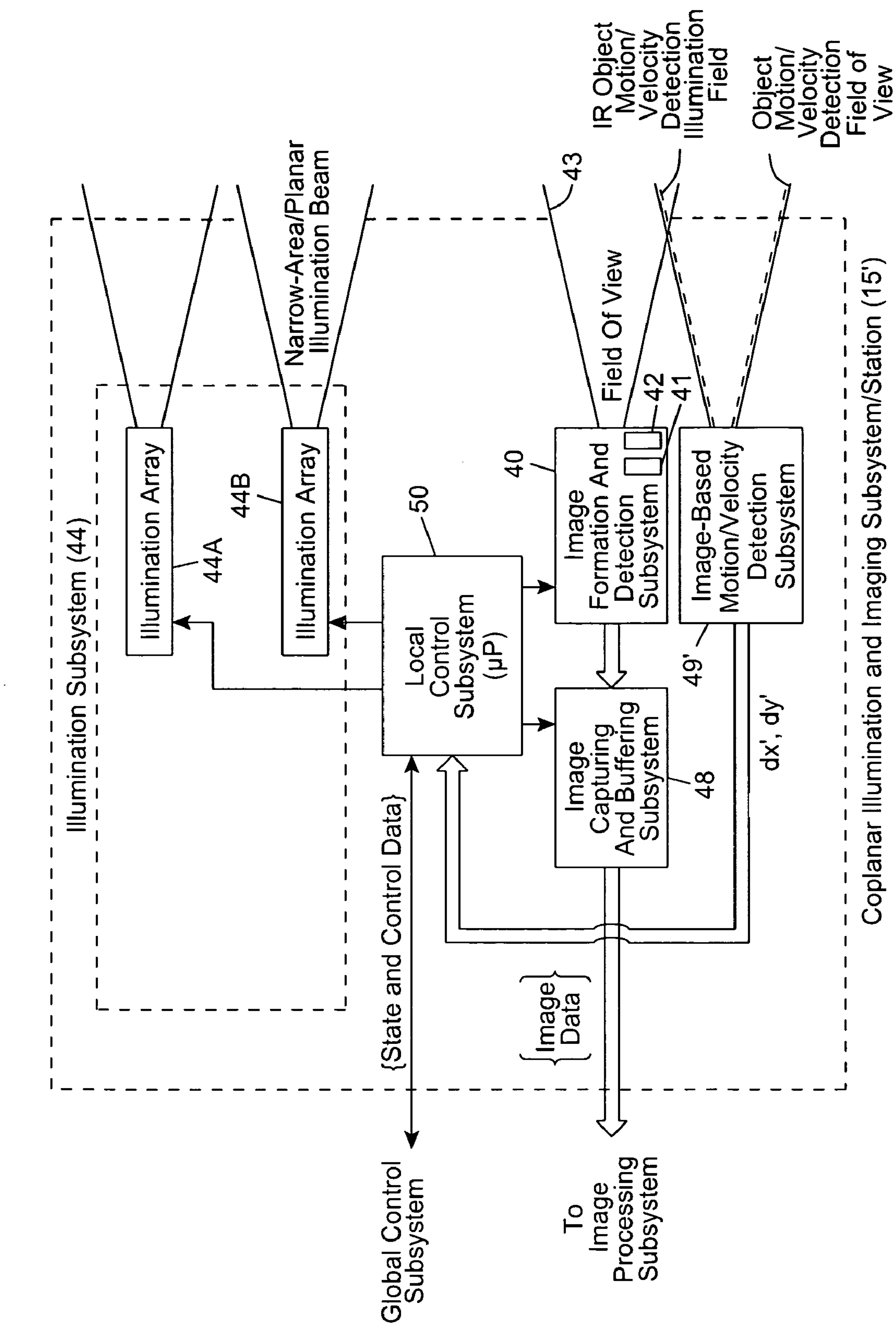
FIG. 6C is a block schematic representation of one of the coplanar illumination and imaging stations employed in the system embodiment of FIG. 6B, showing its planar illumination array (PLIA), its linear image formation and detection subsystem, its image capturing and buffering subsystem, its high-speed imaging based object motion/velocity detecting (i.e. sensing) subsystem, and its local control subsystem.
Figure 6D:
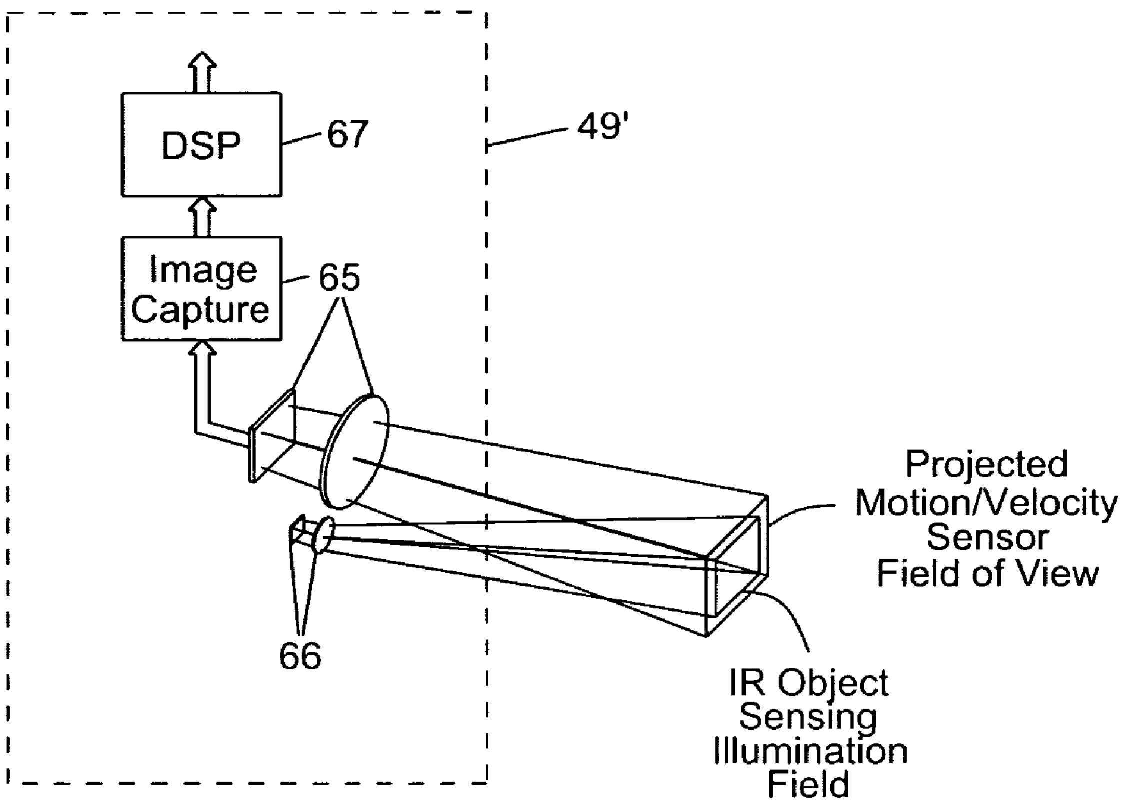
FIG. 6D is a schematic representation of an exemplary high-speed imaging-based motion/velocity sensor employed in the high-speed imaging based object motion/velocity detecting (i.e. sensing) subsystem of the coplanar illumination and imaging station of FIG. 6A.
Figure 6H:
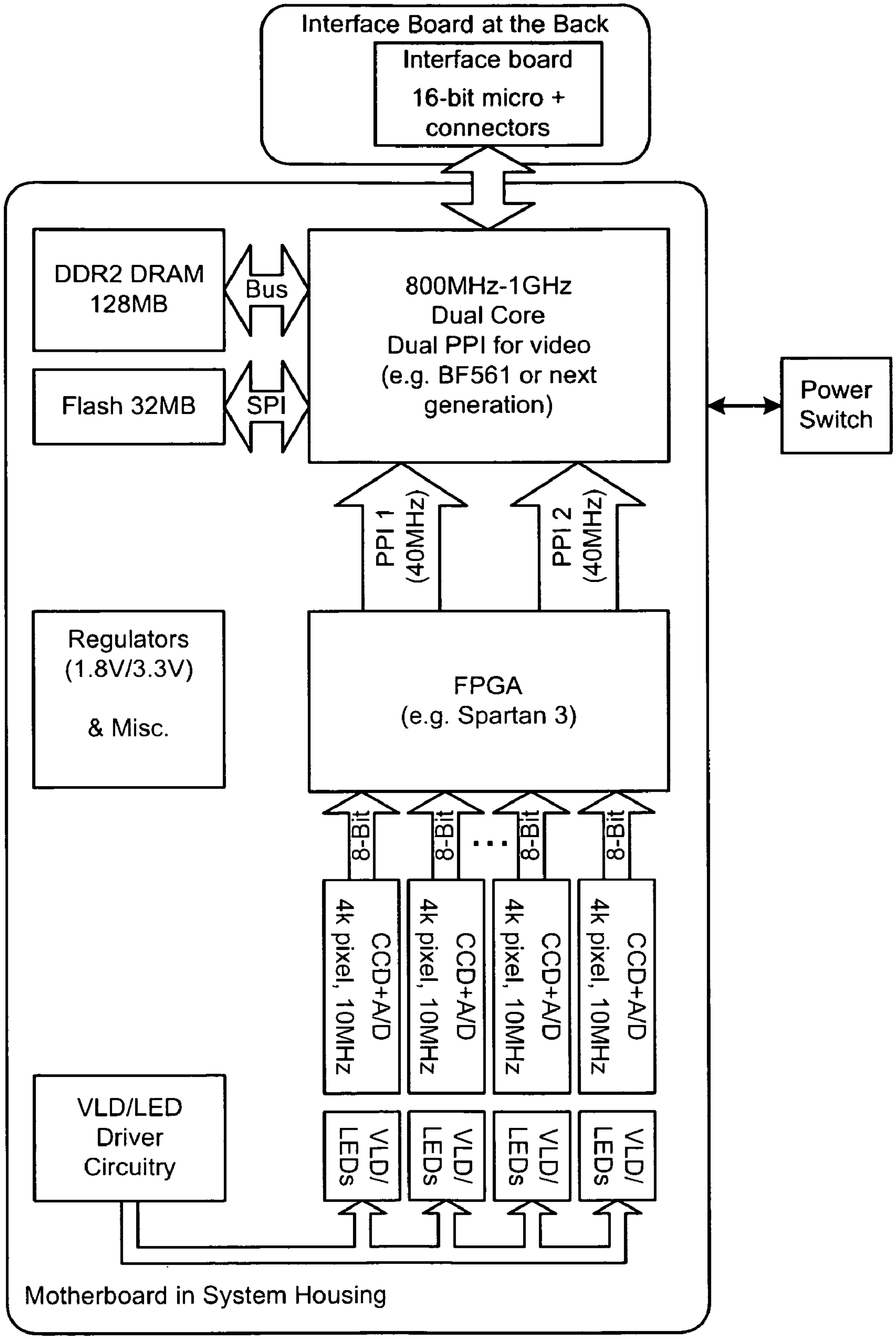
FIG. 6H is a schematic diagram describing an exemplary embodiment of a computing and memory architecture platform for implementing the omni-directional image capturing and processing based bar code symbol reading system described in FIGS. 2 and 6C.
Figure 6I:
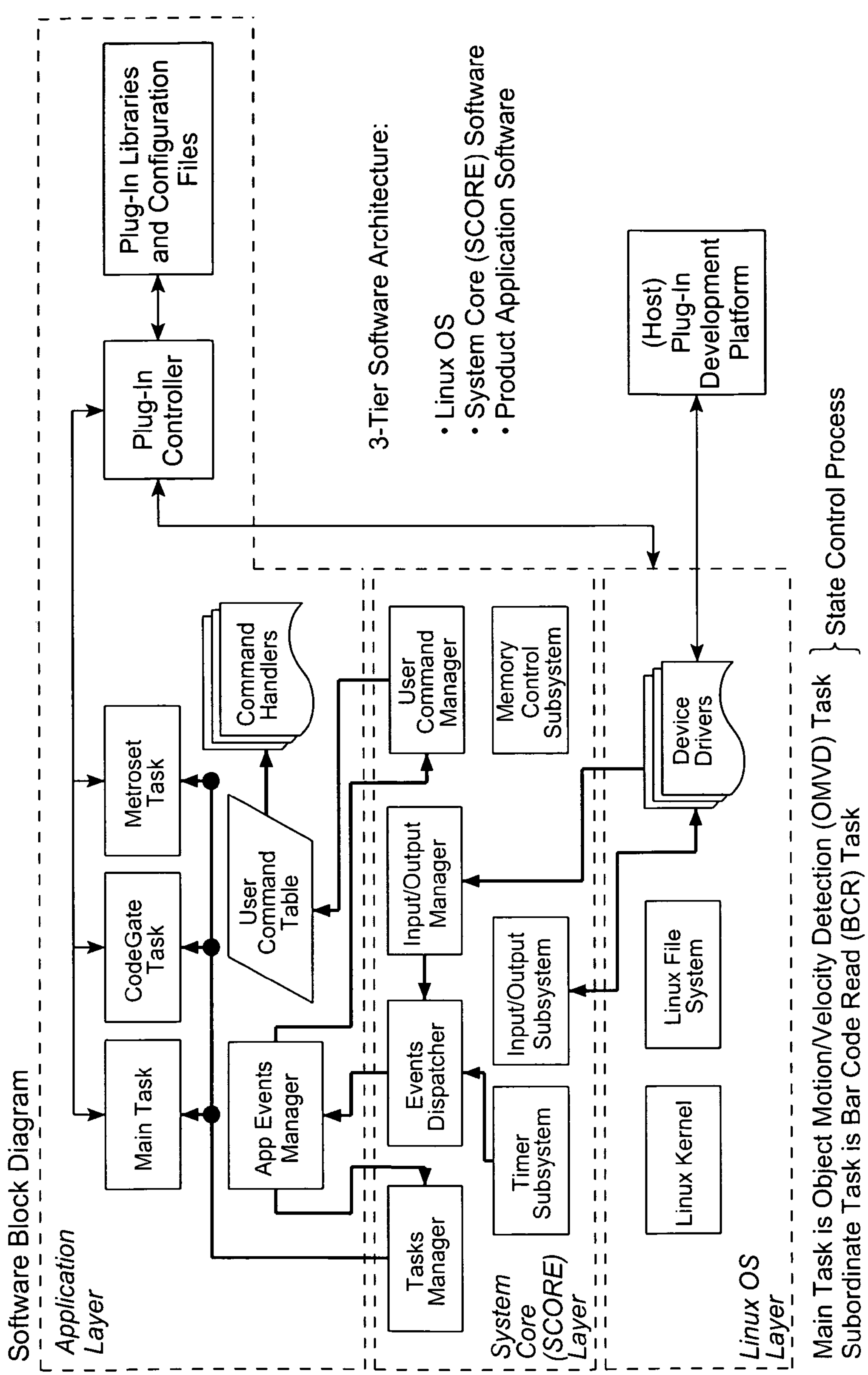
FIG. 6I is a schematic representation of a three-tier software architecture that can run upon the computing and memory architecture platform of FIG. 6H, so as to implement the functionalities of the omni-directional image capturing and processing based bar code symbol reading system described FIGS. 2 and 6C.
Figure 6:
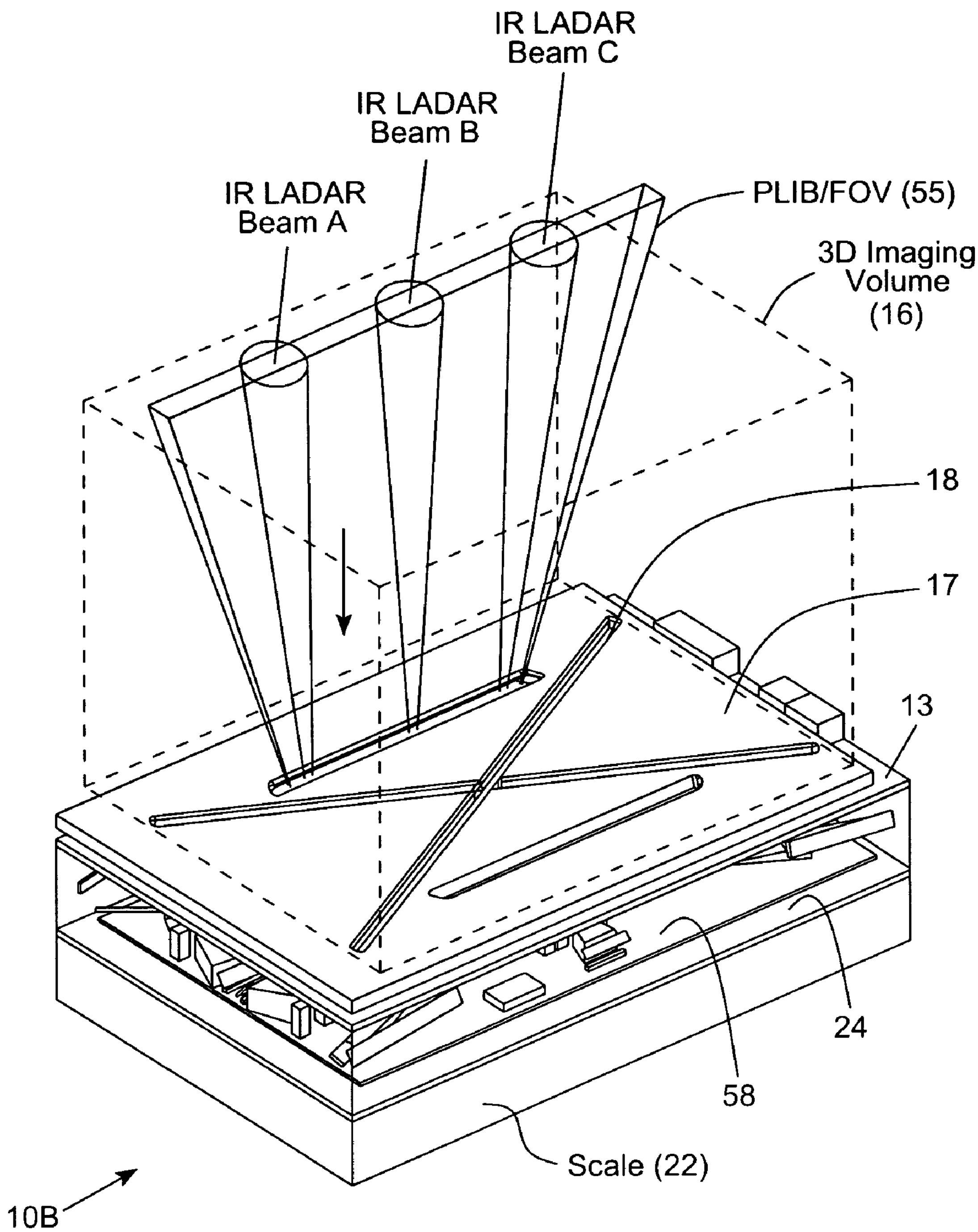
Figure 6A:
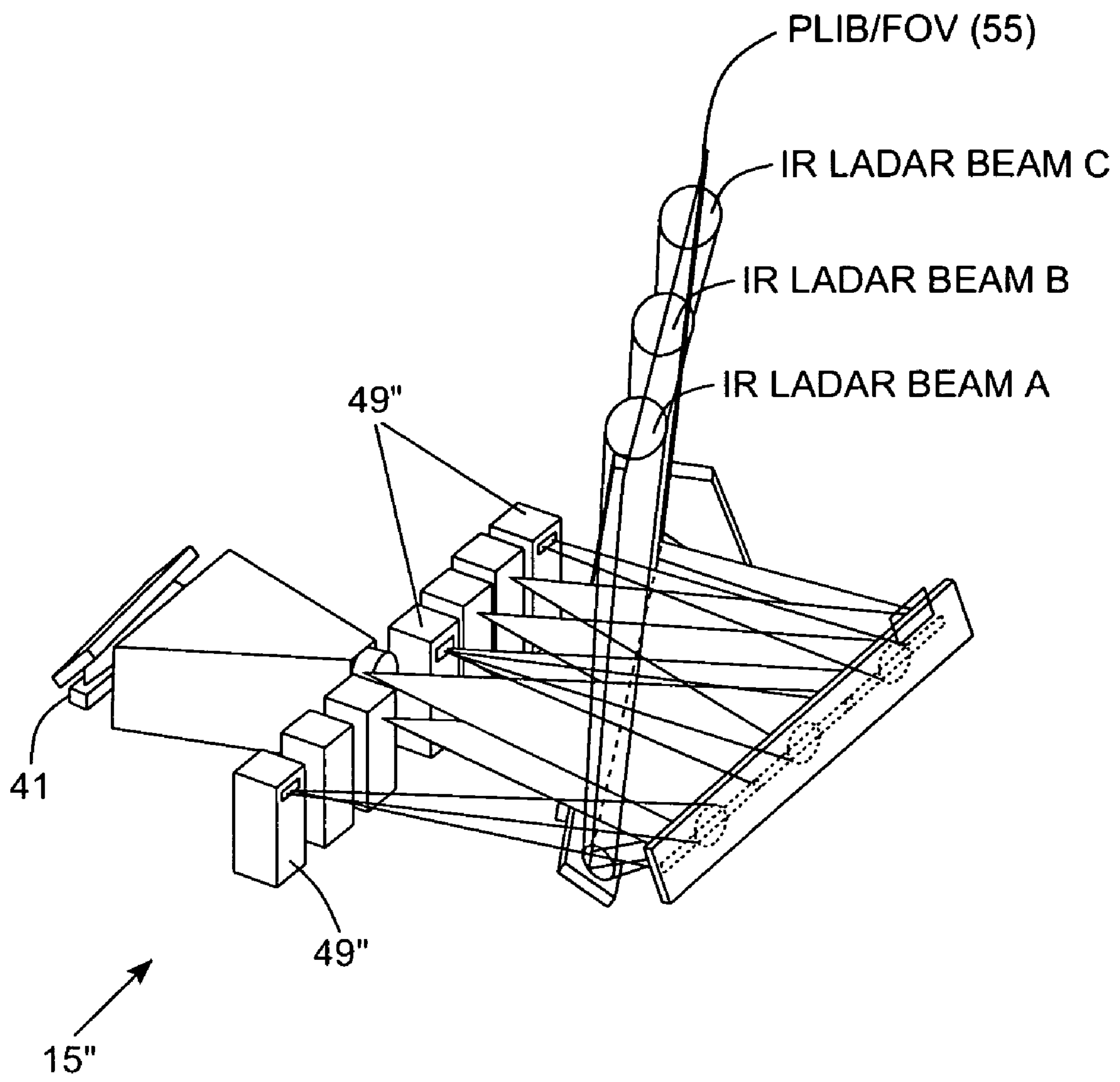
Figure 6B:
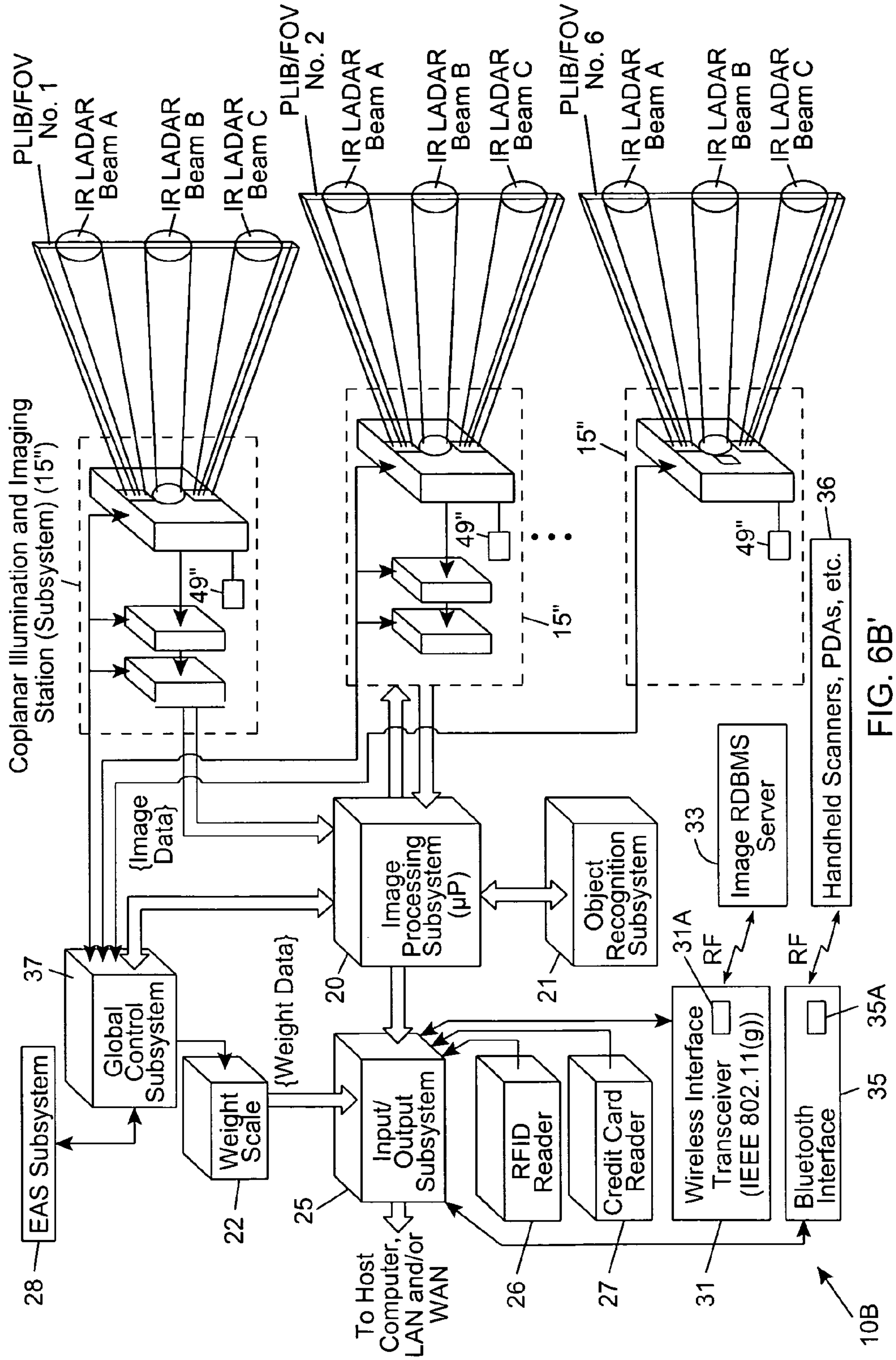
Figure 6C:
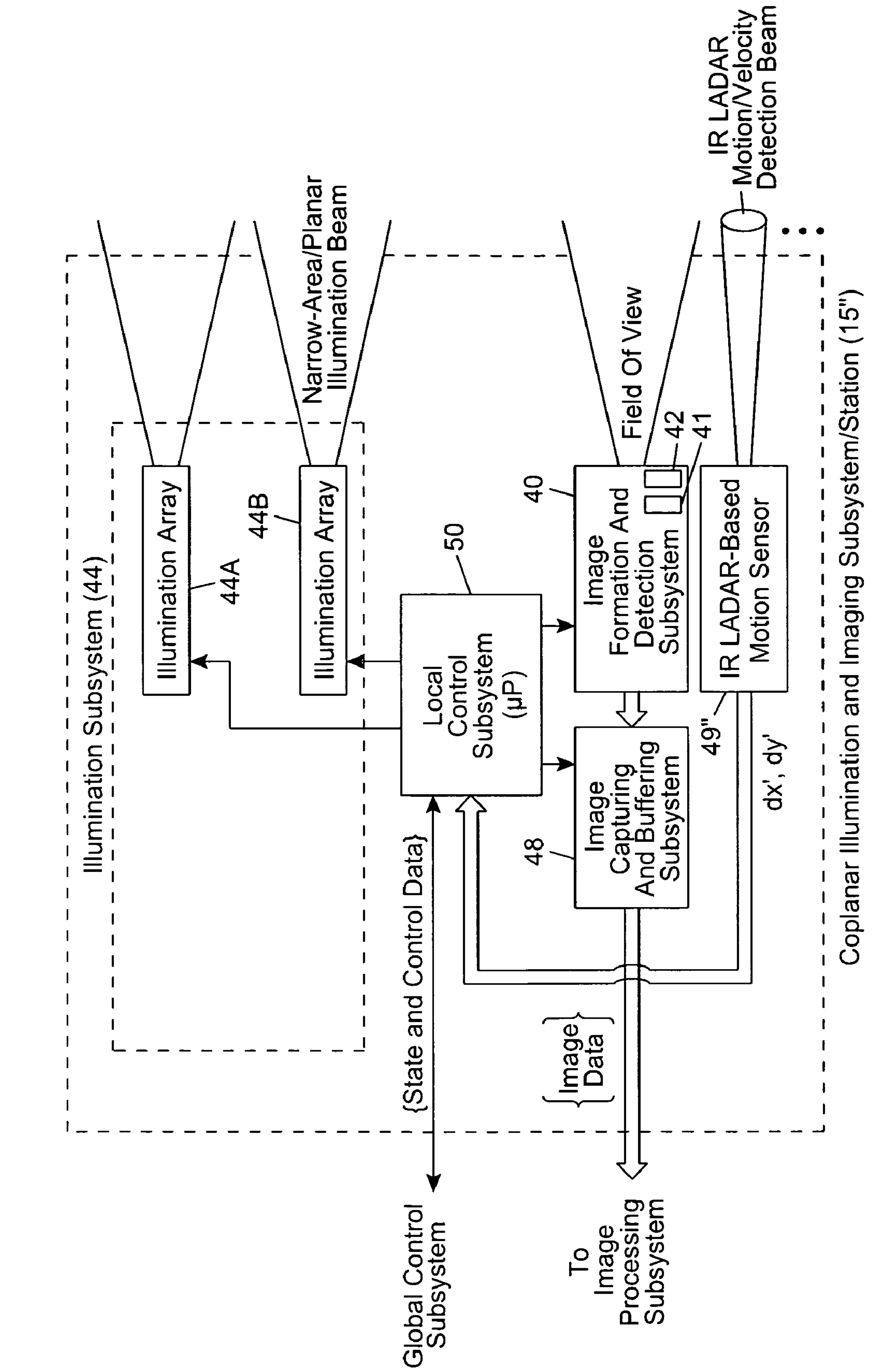
Figure 6E:
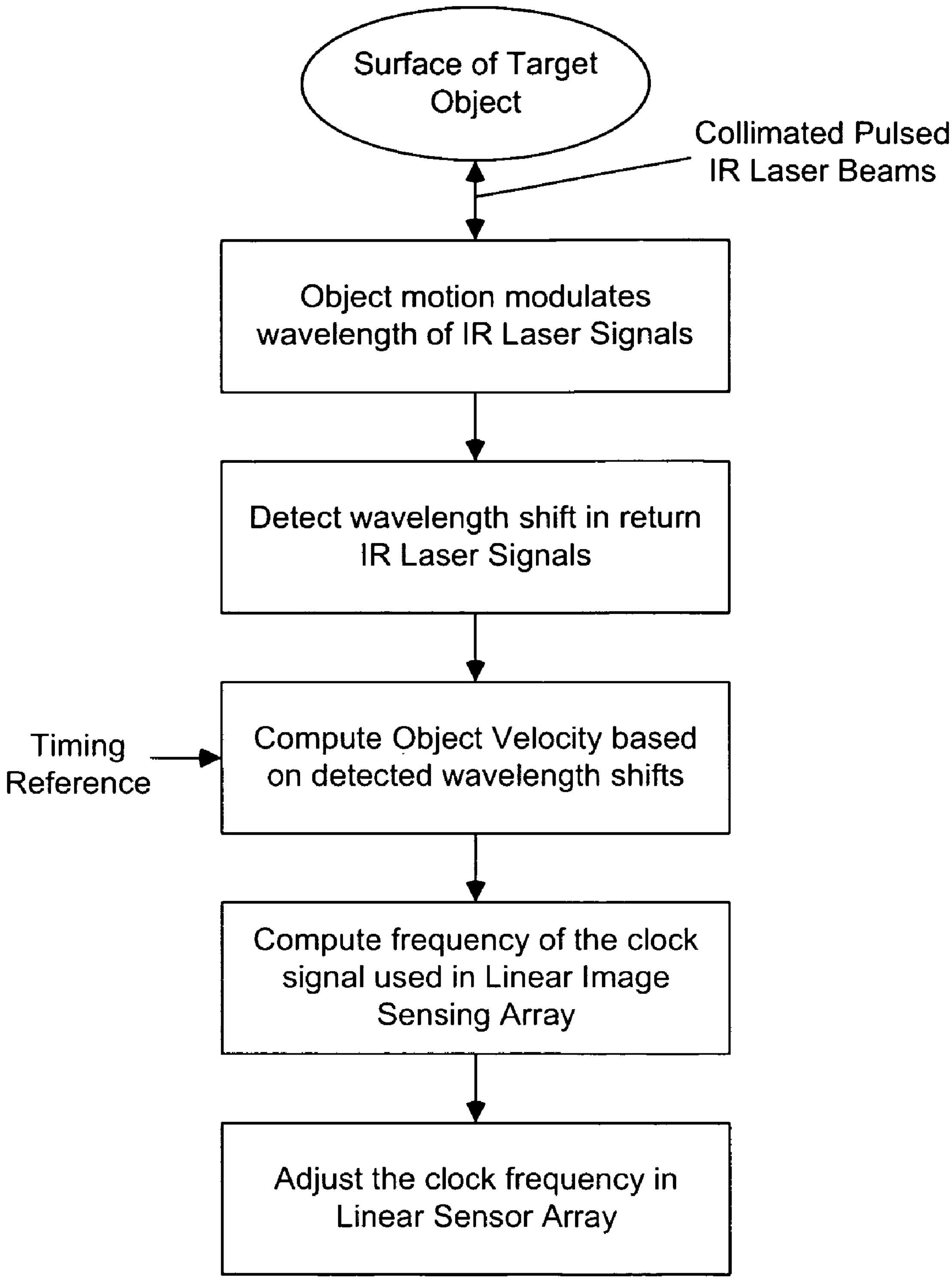
Figure 6G:
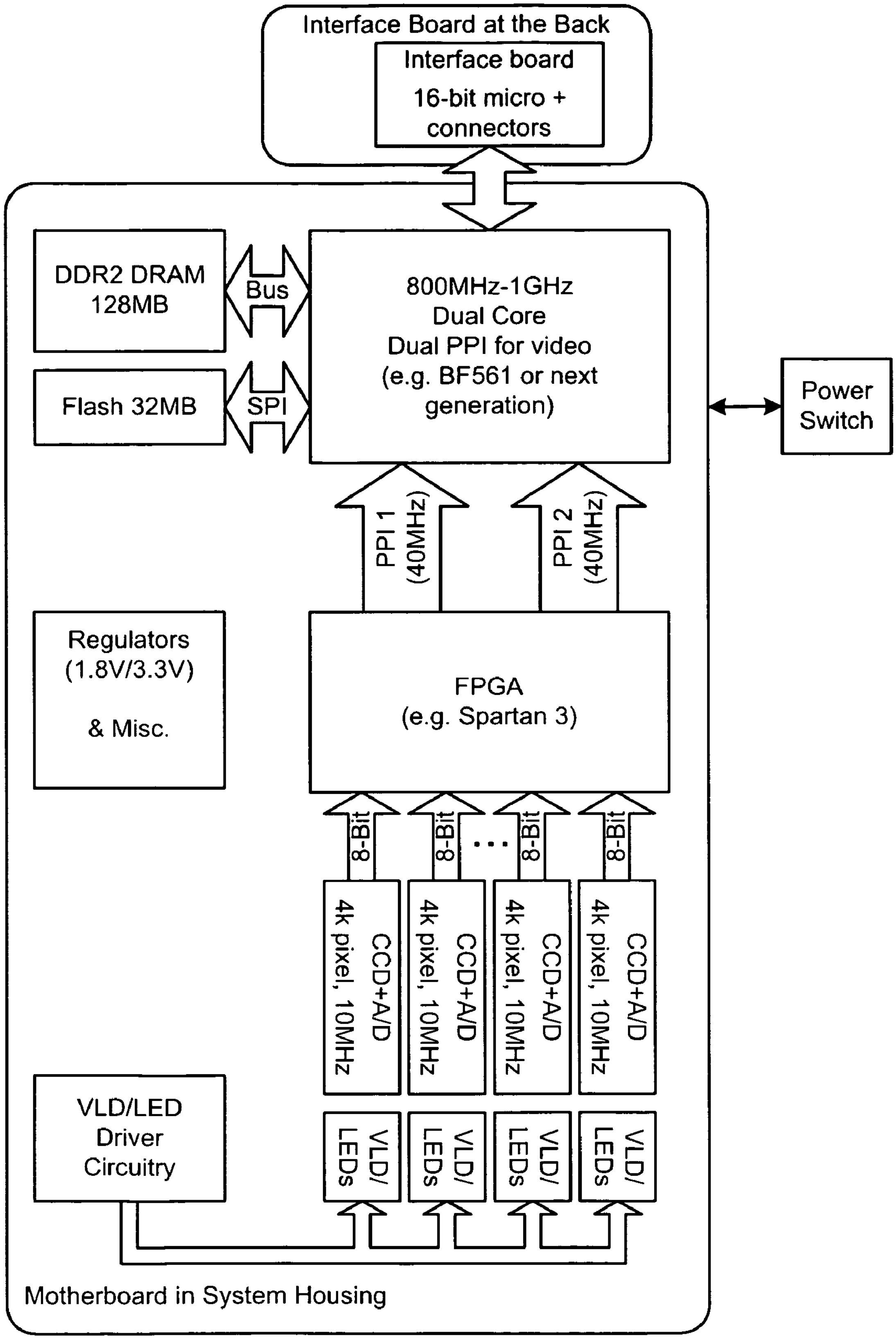
Figure 6H:
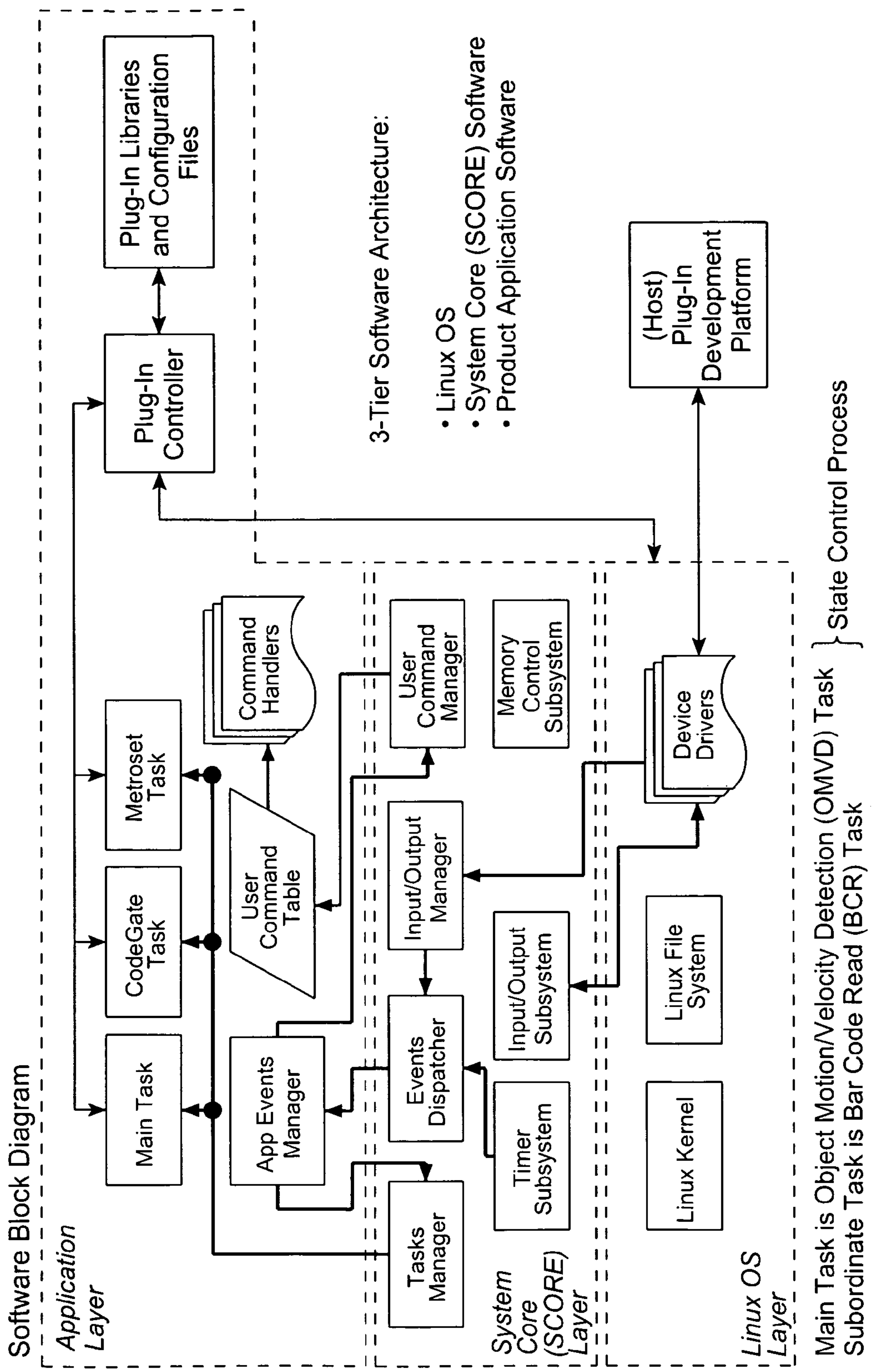
Figure 7:
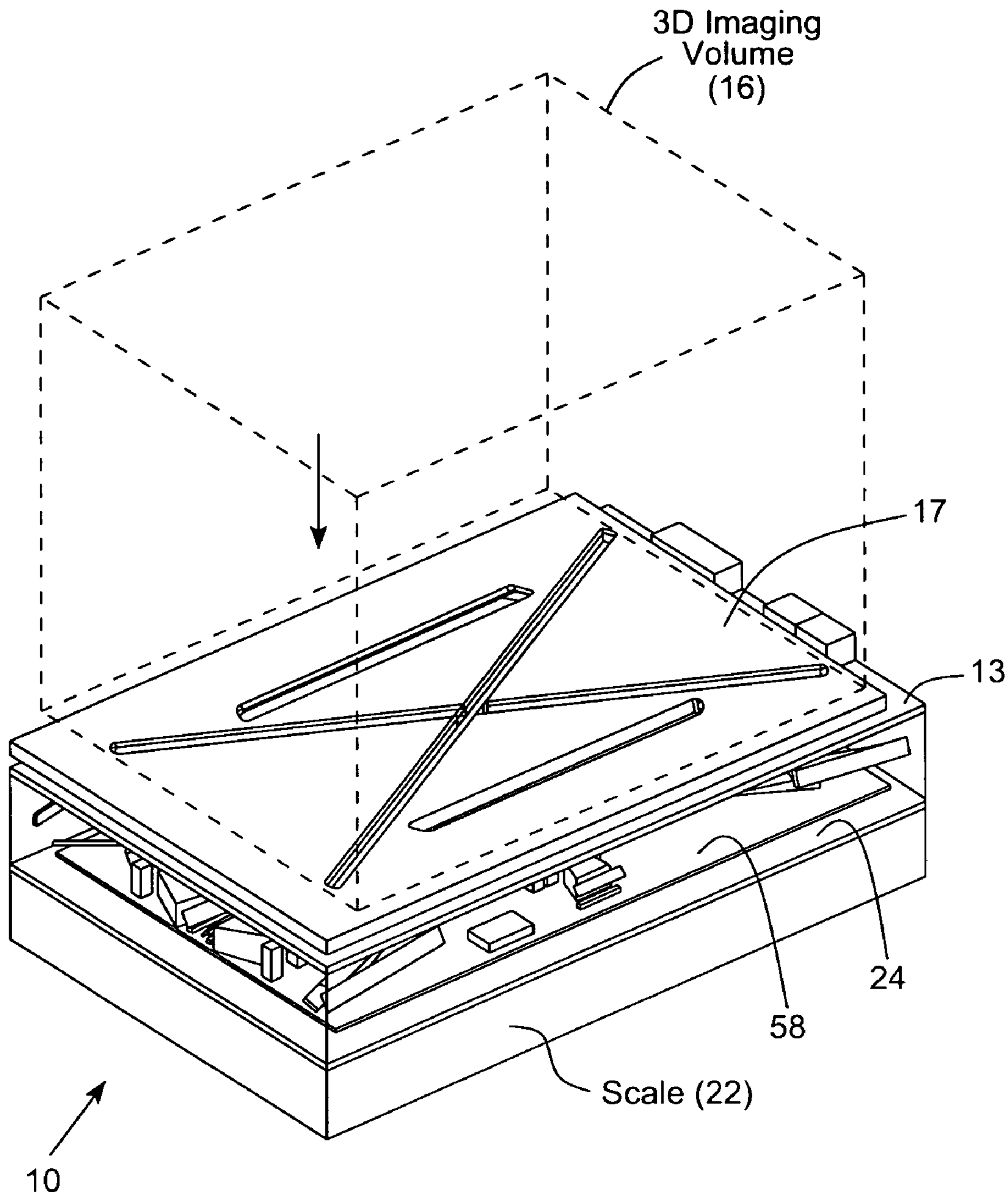
FIG. 7 is a perspective view of the third illustrative embodiment of the omni-directional image capturing and processing based bar code symbol reading system of the present invention shown provided with an imaging window protection plate (mounted over its glass light transmission window) and having a central X aperture pattern and a pair of parallel apertures aligned parallel to the sides of the system, for the projection of coplanar illumination and imaging planes from a complex of coplanar illumination and imaging stations mounted beneath the imaging window of the system, in substantially the same manner as shown in FIGS. 3A through 5F.
Figure 7A:
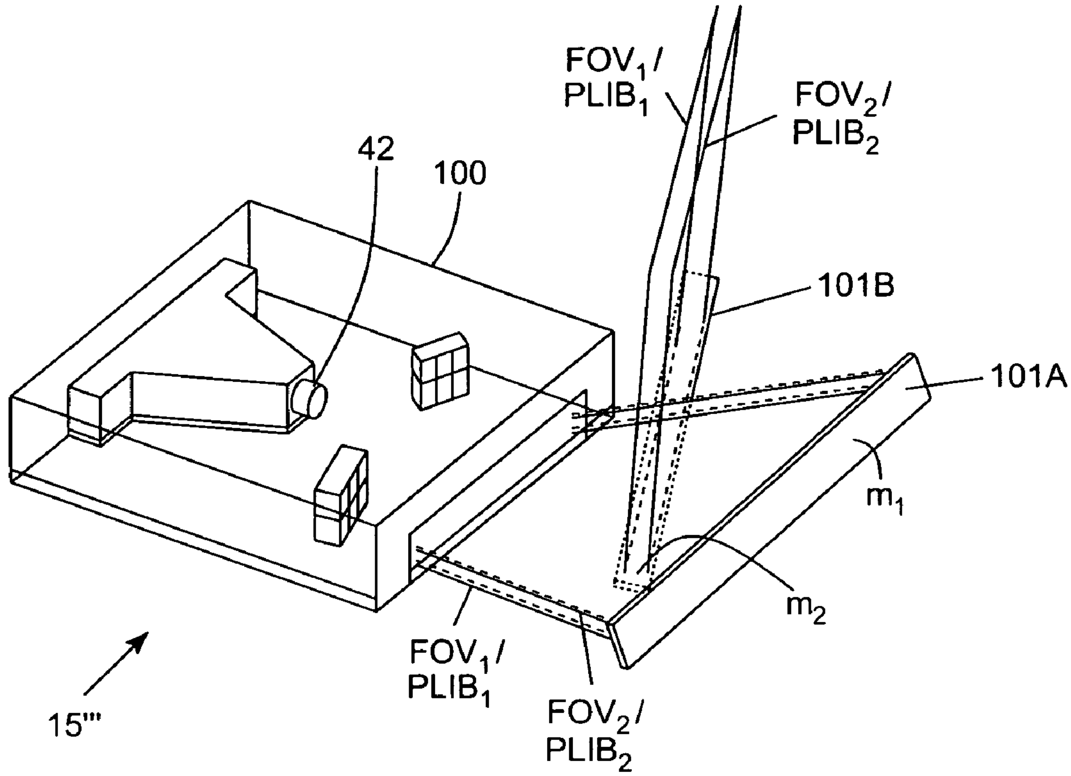
FIG. 7A is a perspective view of an alternative design for each coplanar illumination and imaging station employed in the omni-directional image capturing and processing based bar code symbol reading system described in FIG. 7, which includes a dual-type coplanar linear illumination and imaging engine for producing a pair of planar light illumination beams (PLIBs) that are coplanar with the FOVs of a pair of linear image sensing arrays; and a pair of beam/FOV folding mirrors for folding the pair of coplanar PLIB/FOVs towards the objects to be illuminated and imaged, so as to capture image pairs of the object for purposes of implementing imaging-based motion and velocity detection processes within the system.
Figure 8A:
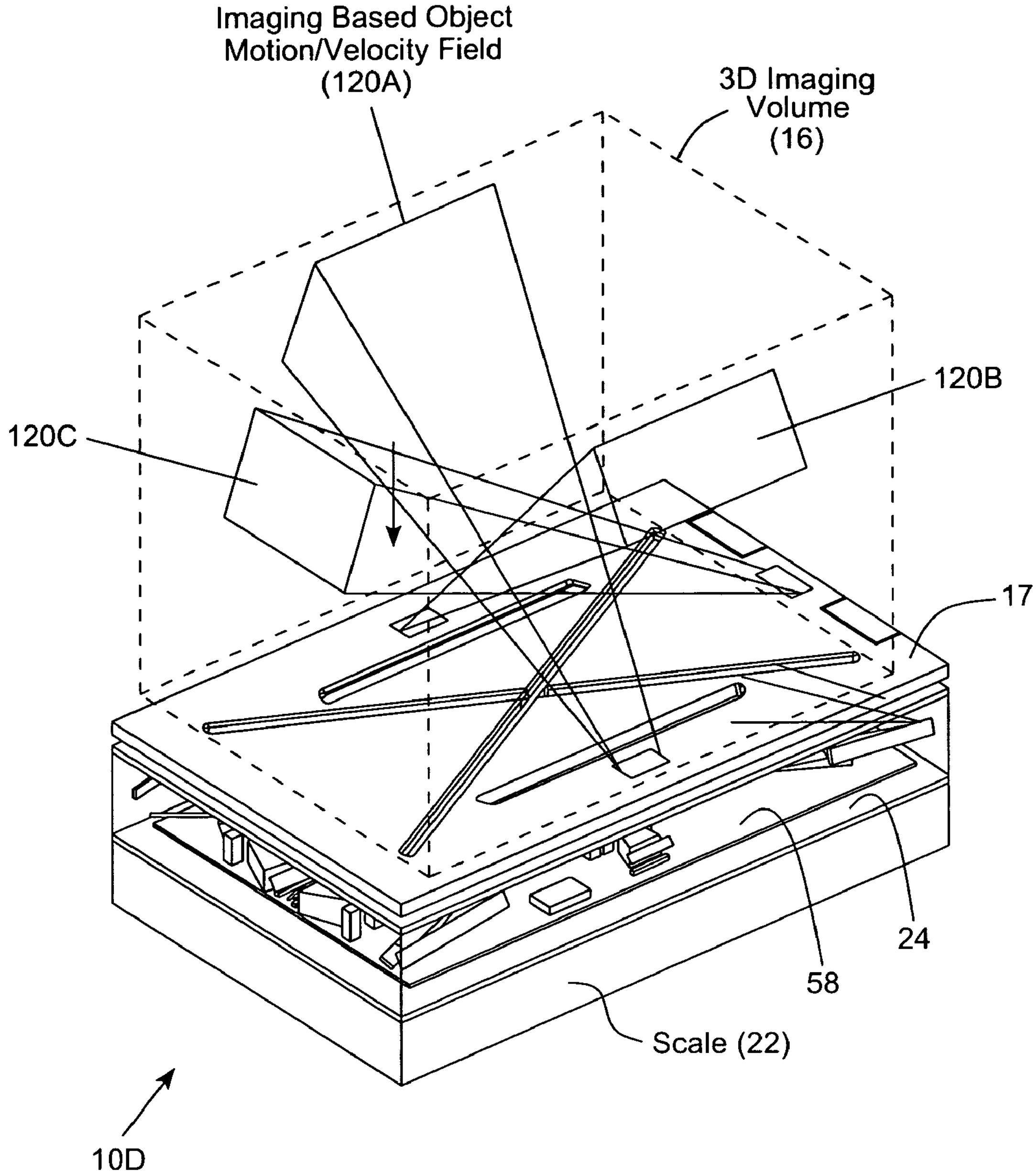
FIG. 8A is a perspective view of a fourth illustrative embodiment of the omni-directional image capturing and processing based bar code symbol reading system of the present invention installed in the countertop surface of a retail POS station, shown comprising a complex of coplanar illumination and imaging stations projecting a plurality of coplanar illumination and imaging planes through the 3D imaging volume of the system, and plurality of globally-implemented imaging-based object motion and velocity detection subsystems continually sensing the presence, motion and velocity of objects within the 3-D imaging volume.
Figure 8B:
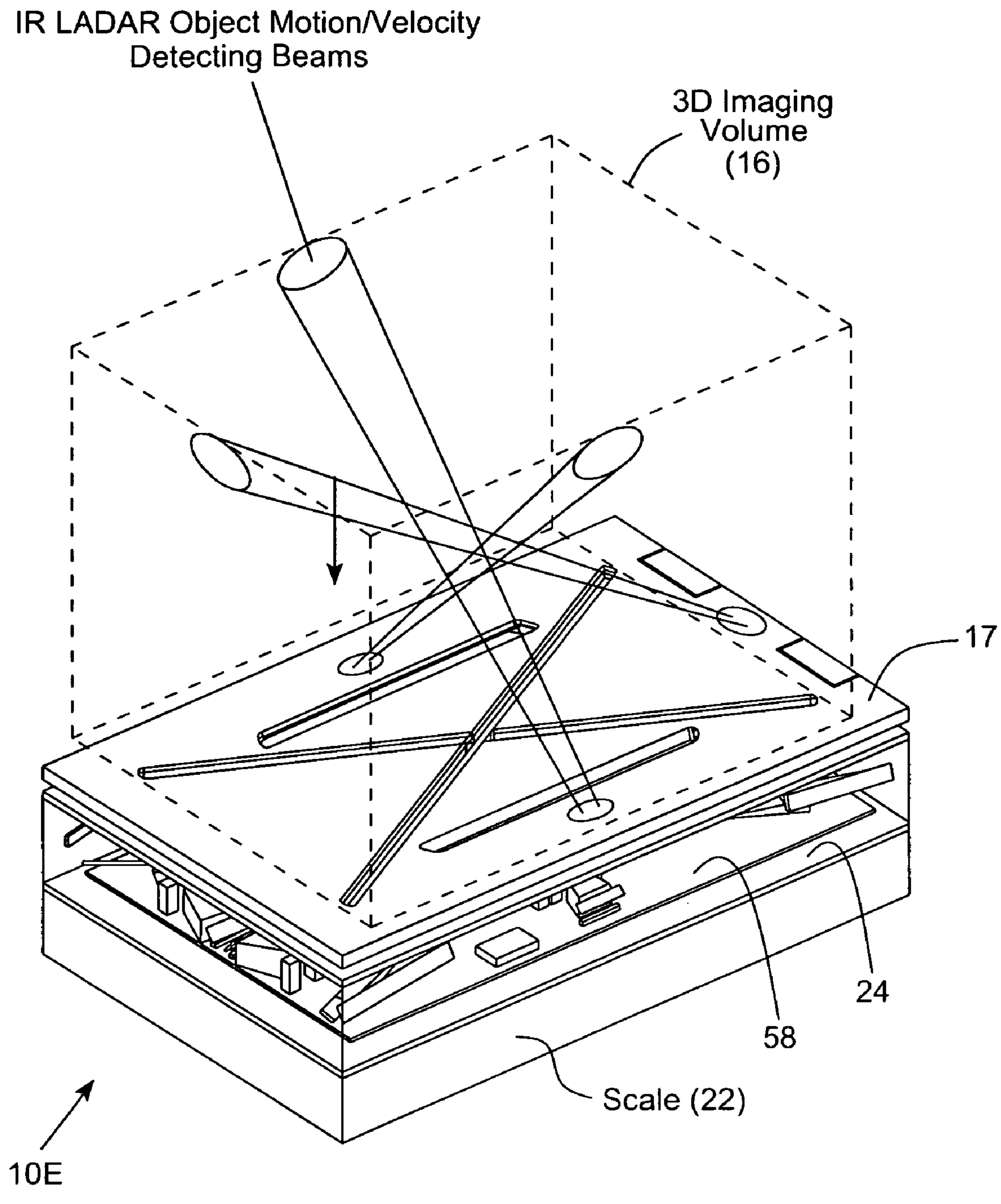
FIG. 8B is a perspective view of a fifth illustrative embodiment of the omni-directional image capturing and processing based bar code symbol reading system of the present invention installed in the countertop surface of a retail POS station, shown comprising a complex of coplanar illumination and imaging stations projecting a plurality of coplanar illumination and imaging planes through the 3D imaging volume of the system, and plurality of globally-implemented IR Pulse-Doppler LIDAR based object motion and velocity detection subsystems continually sensing the presence, motion and velocity of objects within the 3-D imaging volume.
Figure 8C:
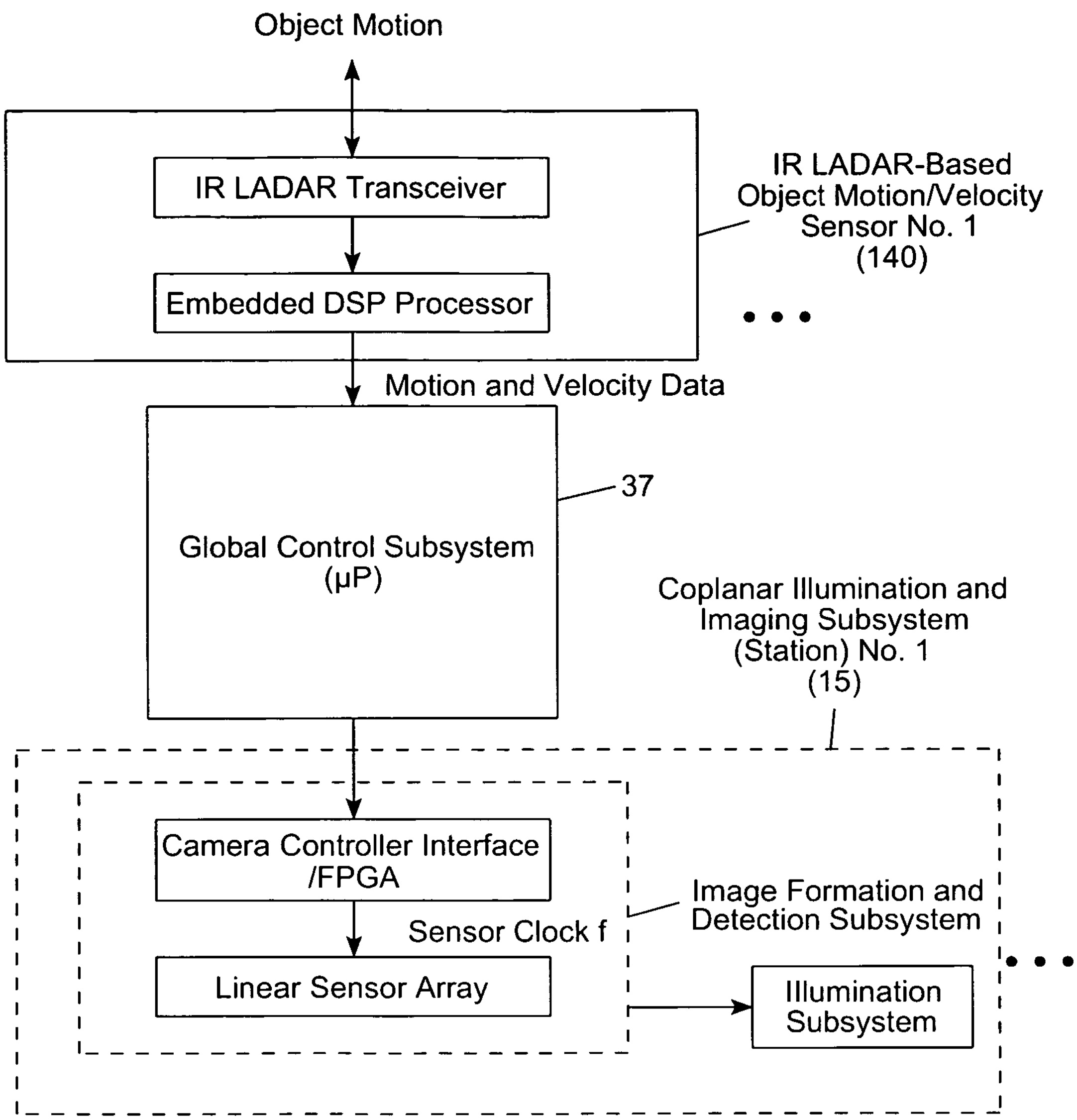
Fig. 8C is a block schematic representation of the high-speed IR Pulse-Doppler LIDAR-based object motion/velocity detection subsystem employed in the system of FIG. 8B1, shown comprising an area-type image acquisition subsystem and an embedded digital signal processing (DSP) ASIC chip to support high-speed digital signal processing operations required for real-time object motion/velocity detection through the 3D imaging volume of the system.
Figure 9A:
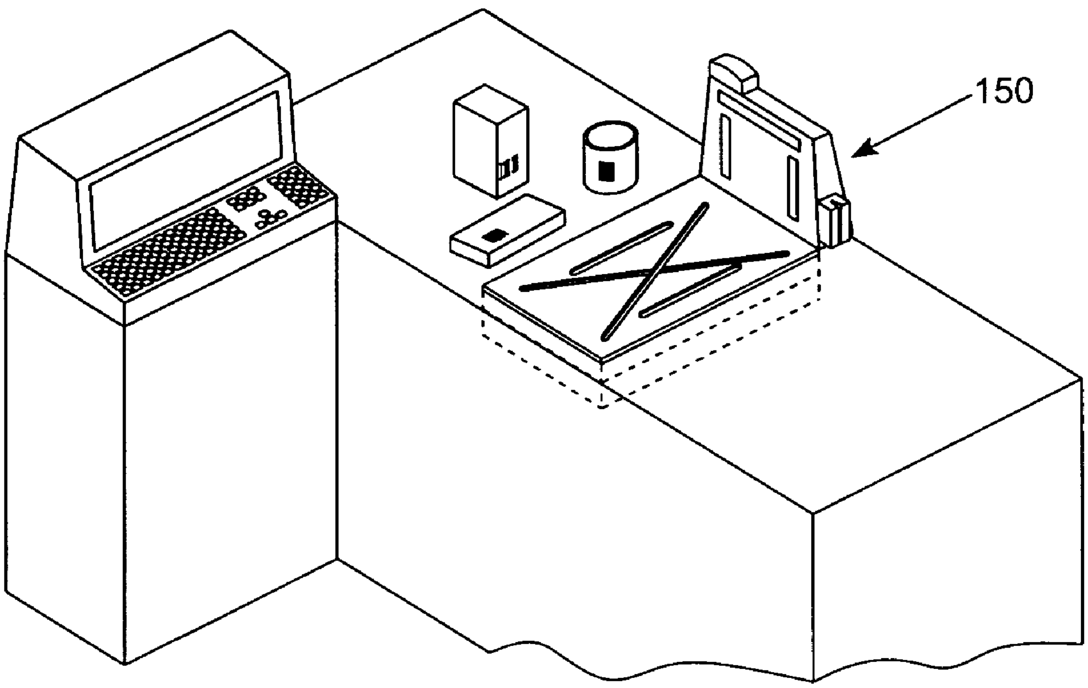
Figure 9B:
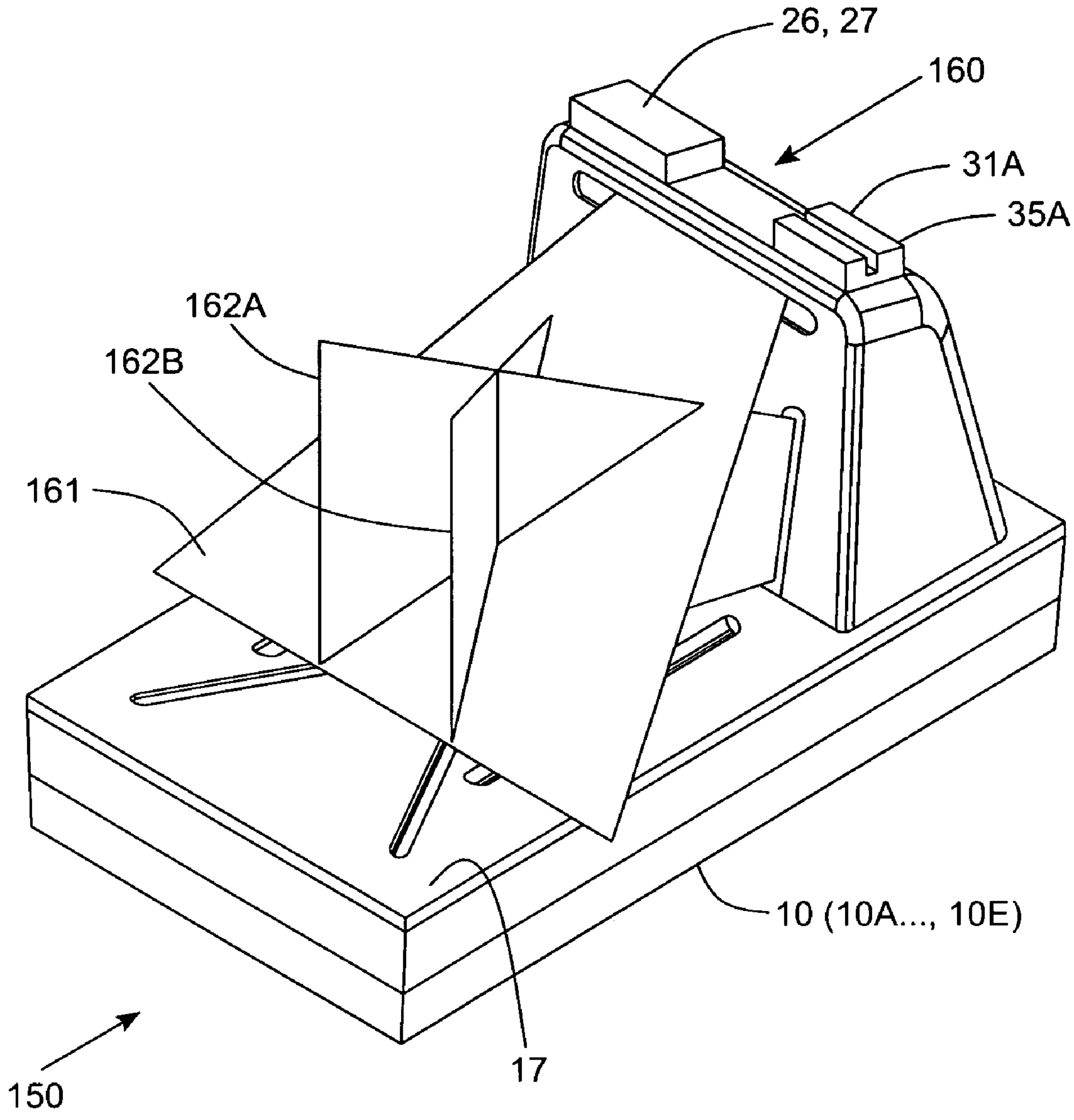
Figure 9C:
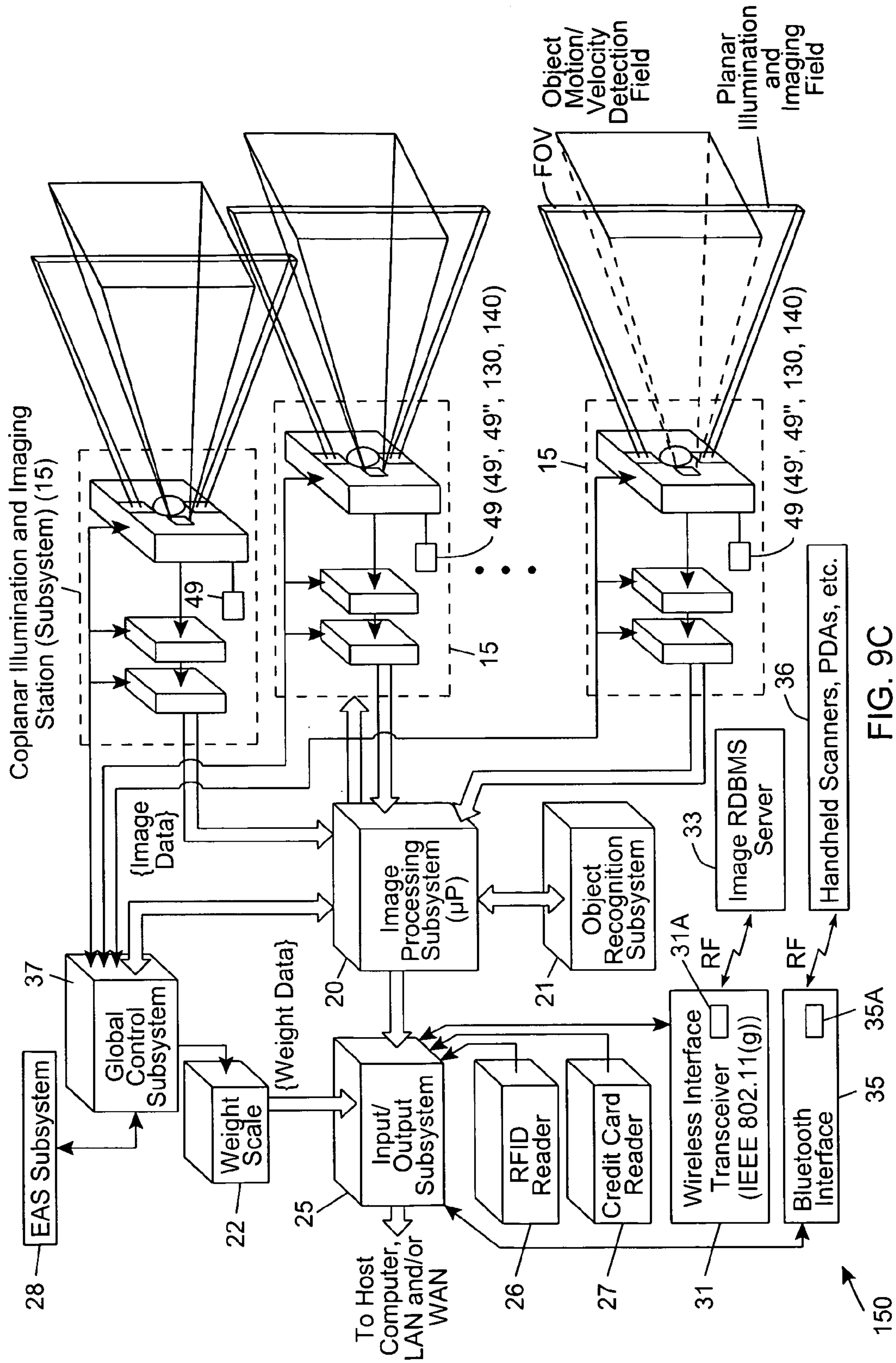
Figure 9D:
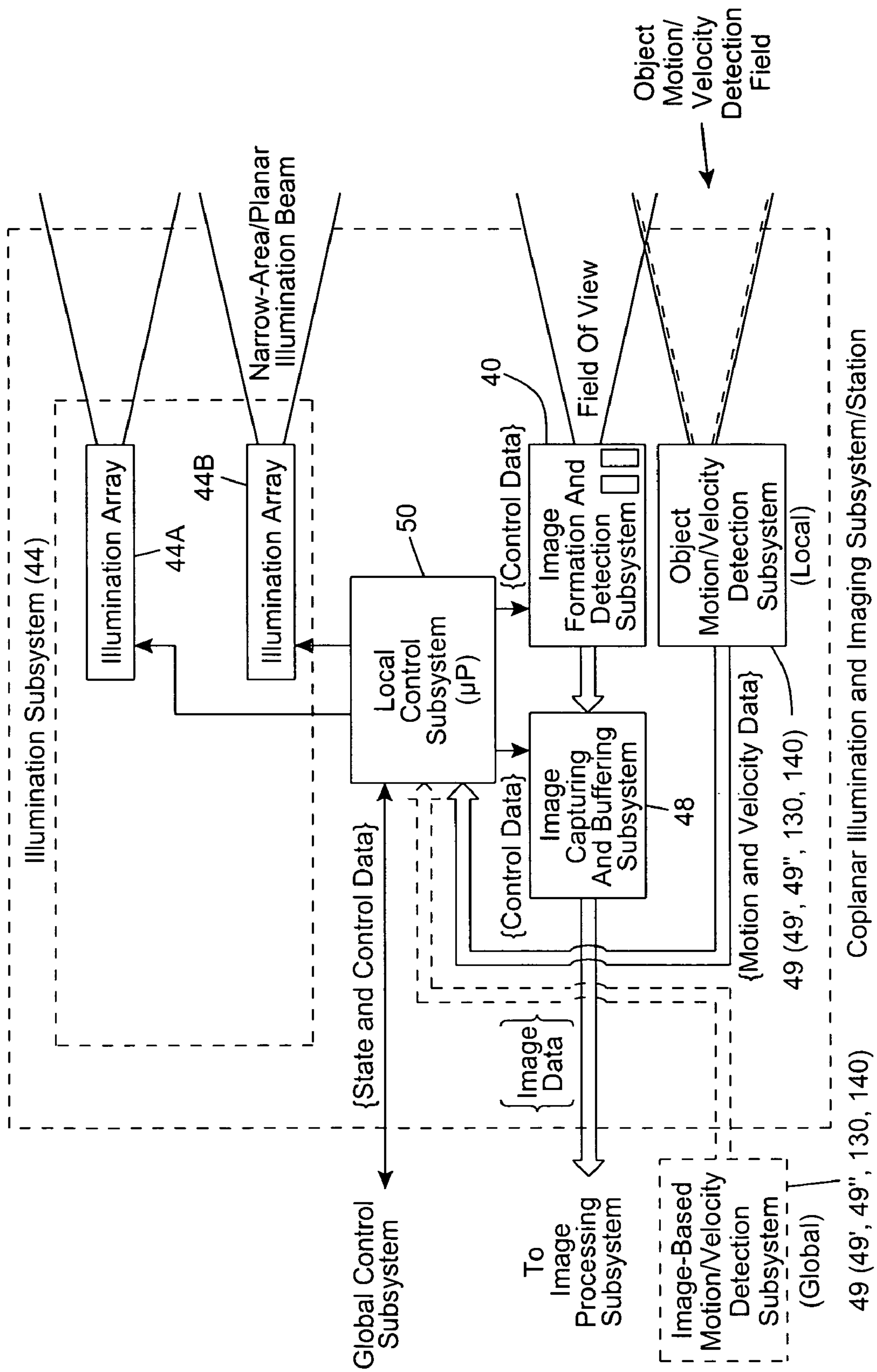
Figure 9E:
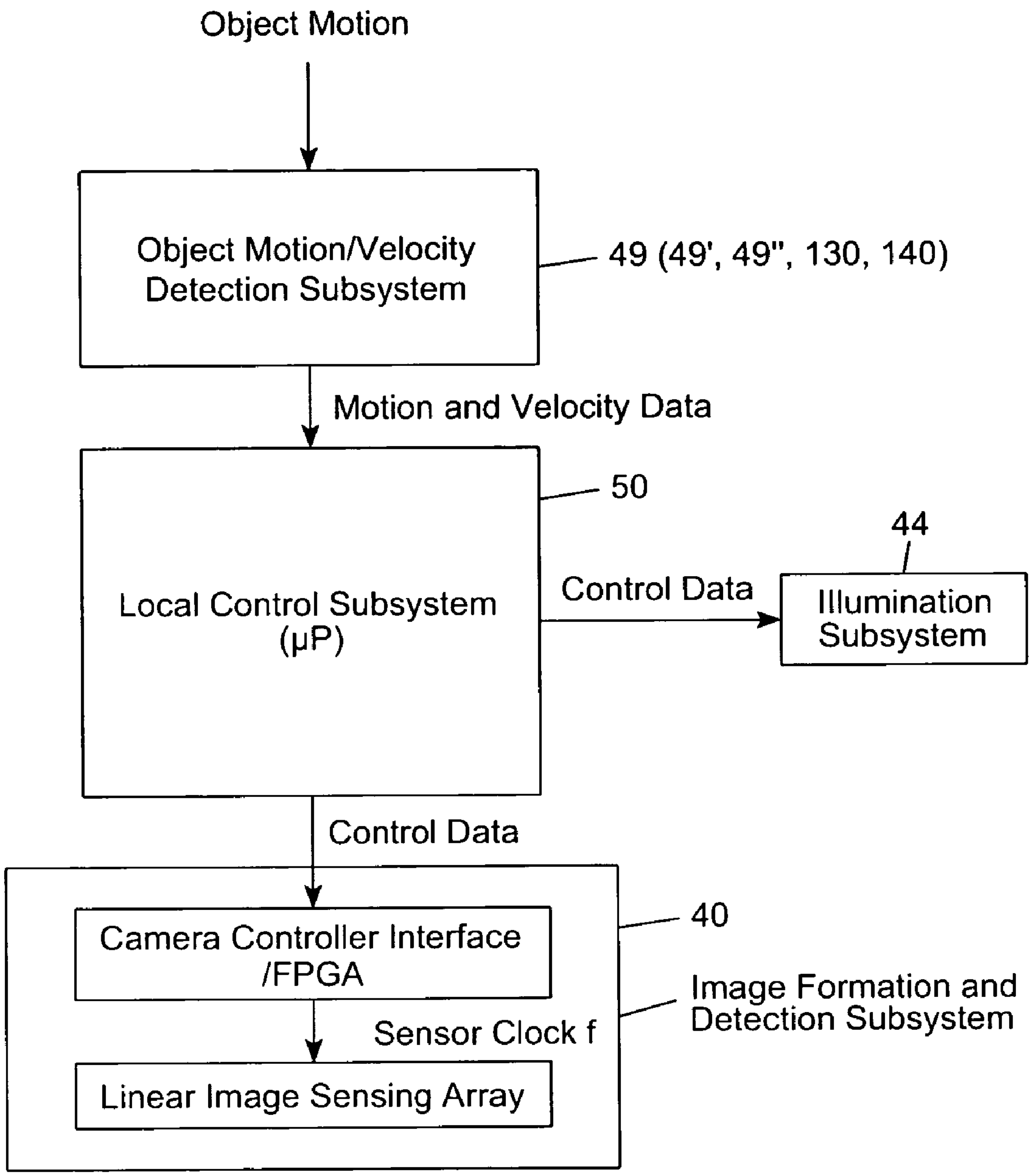
Figure 9G:
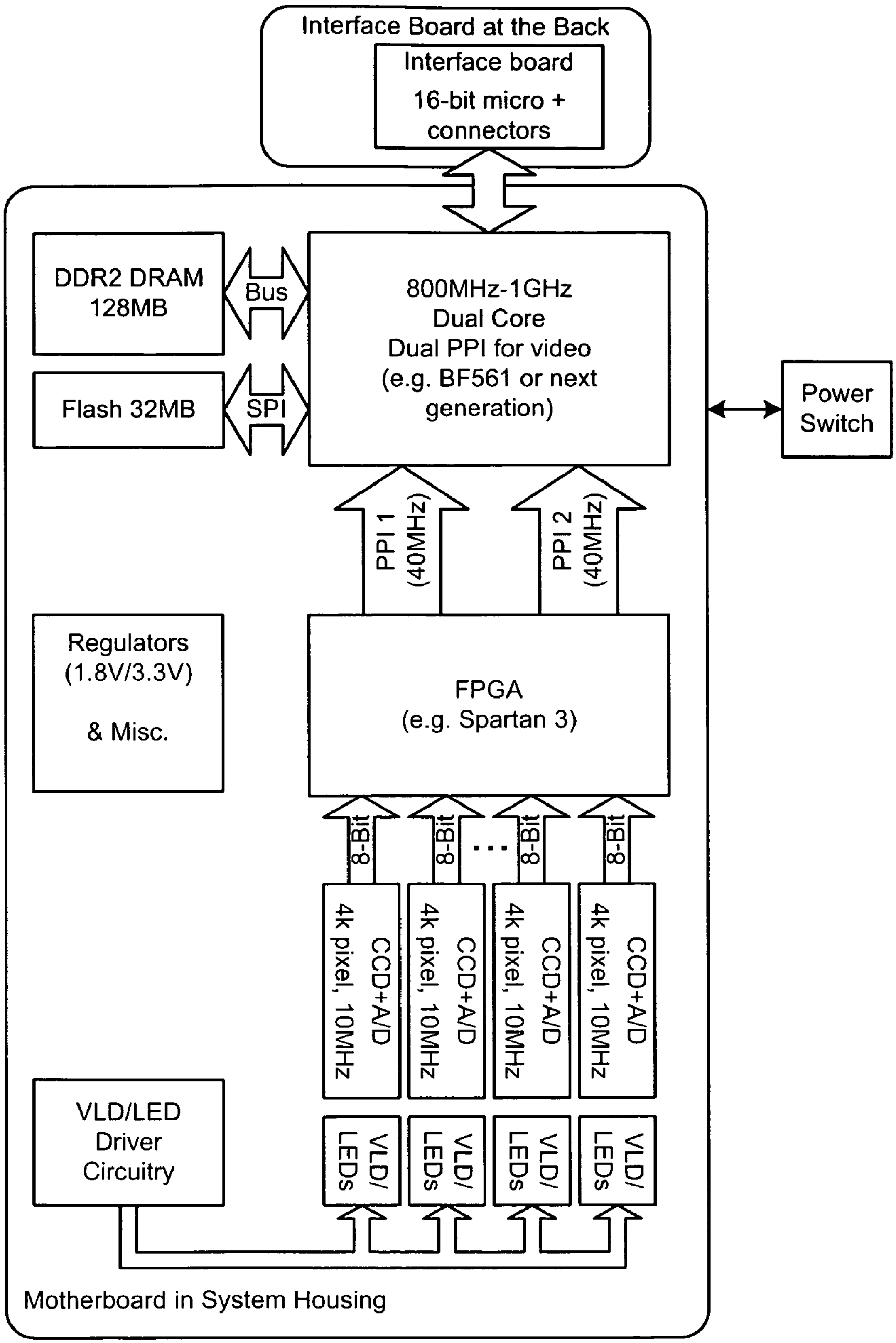
Figure 9H:
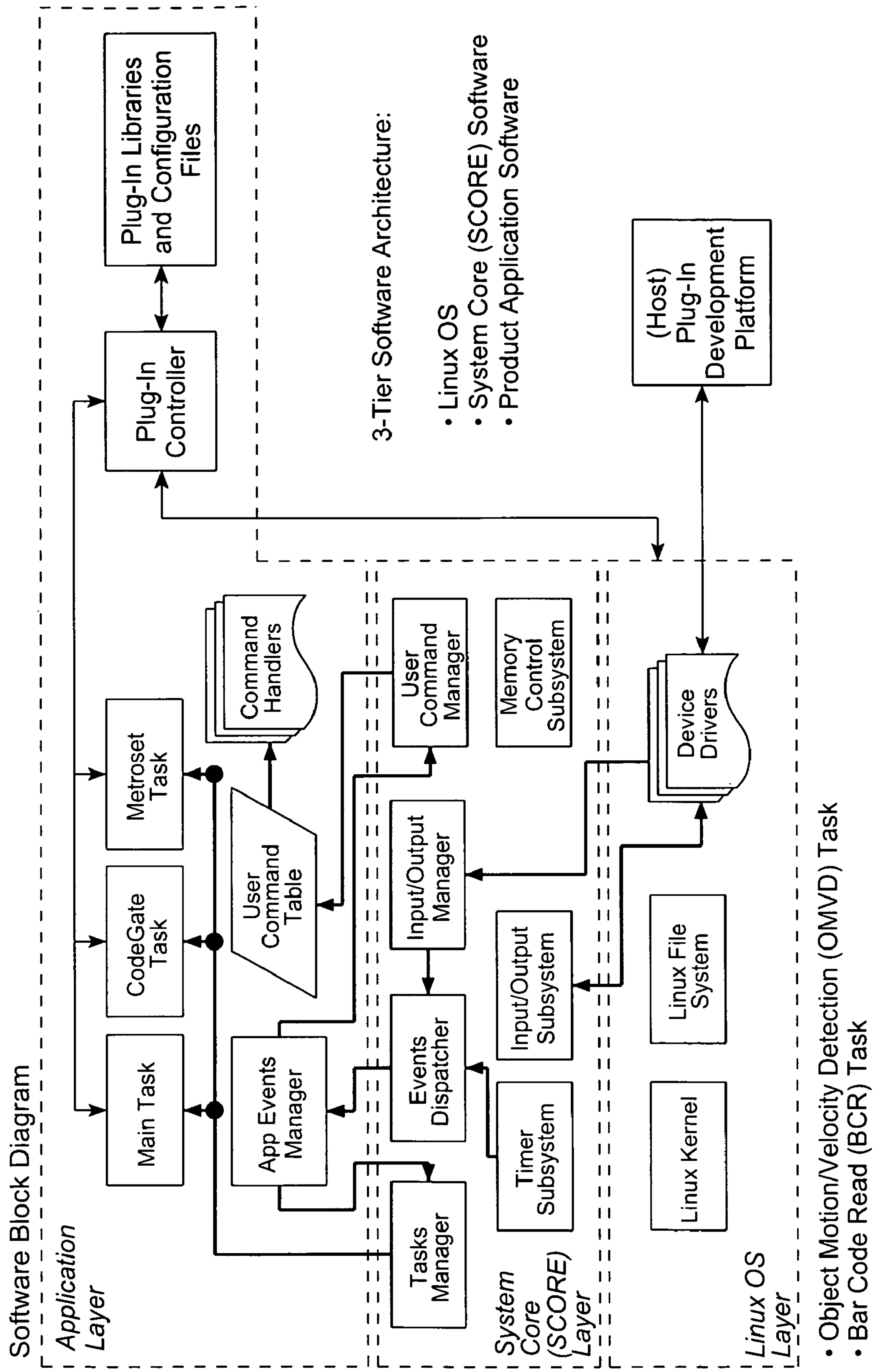
Figure 10A:
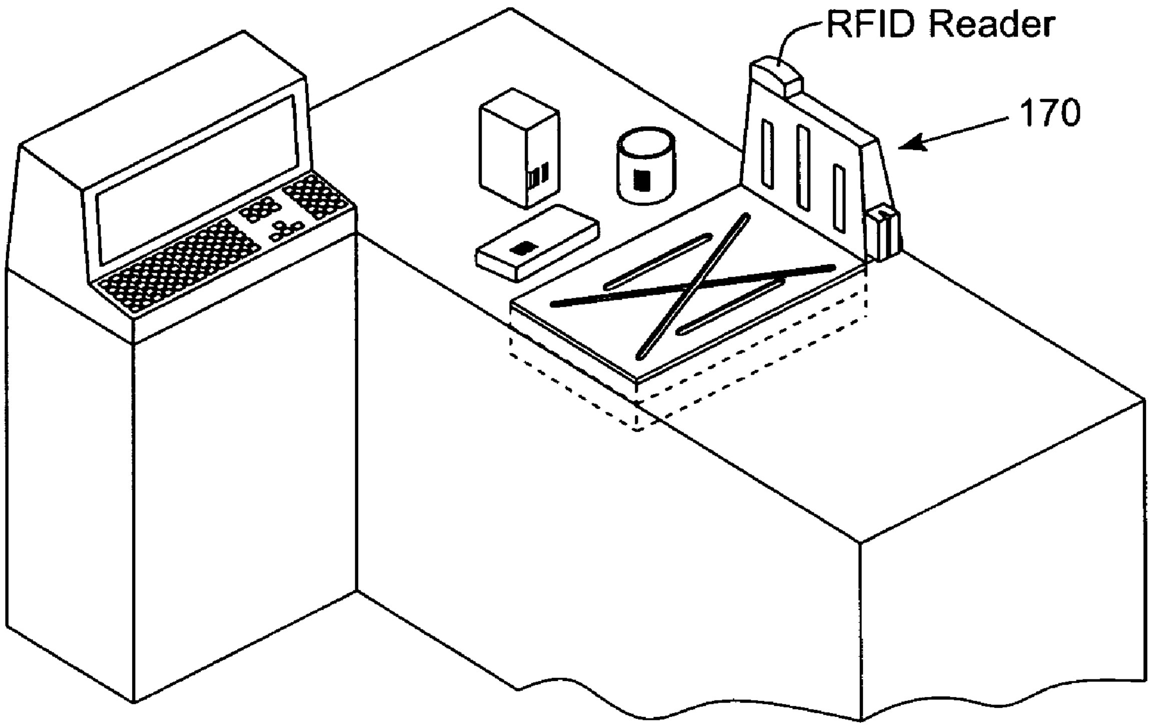
Figure 10B:
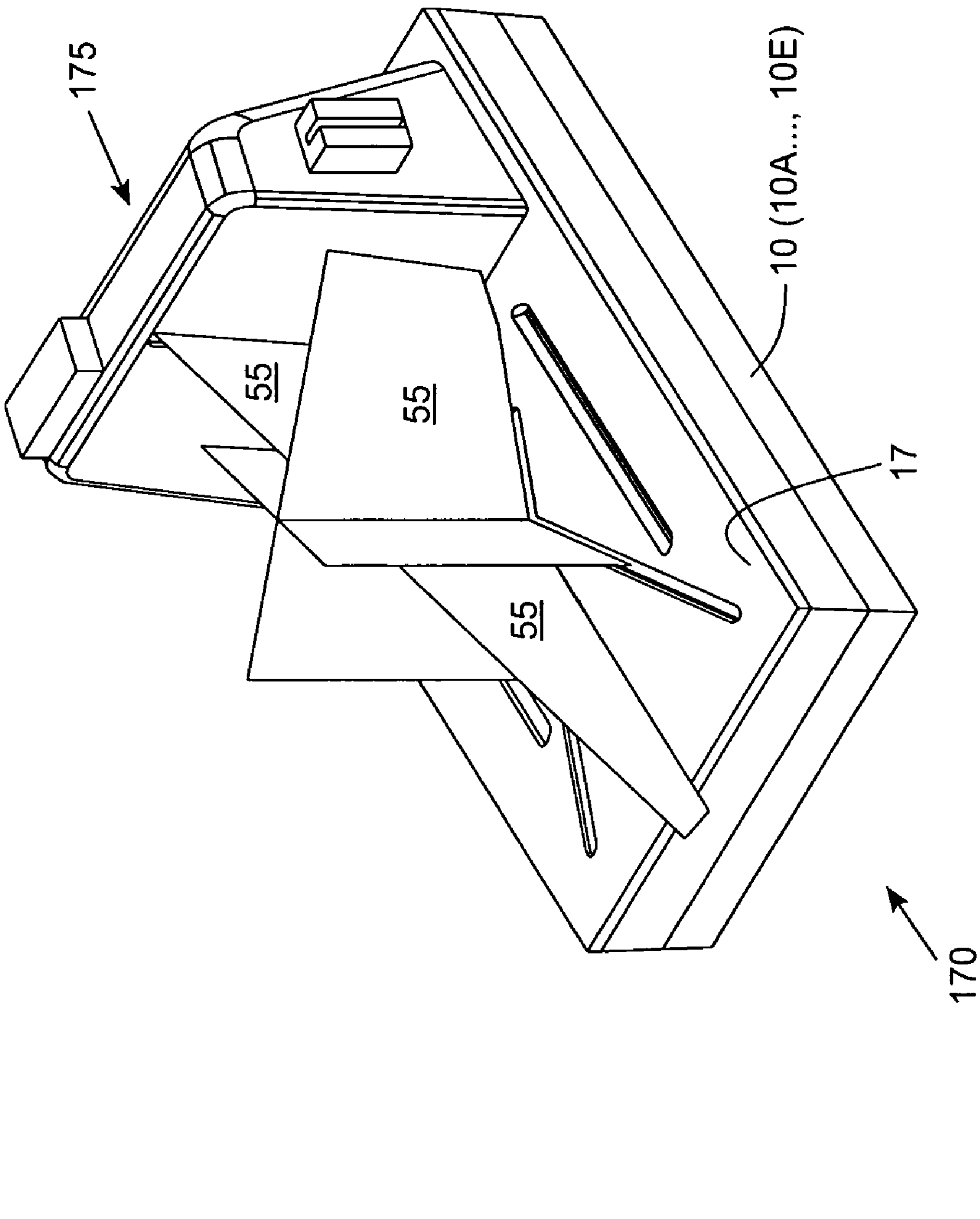
Figure 10C:
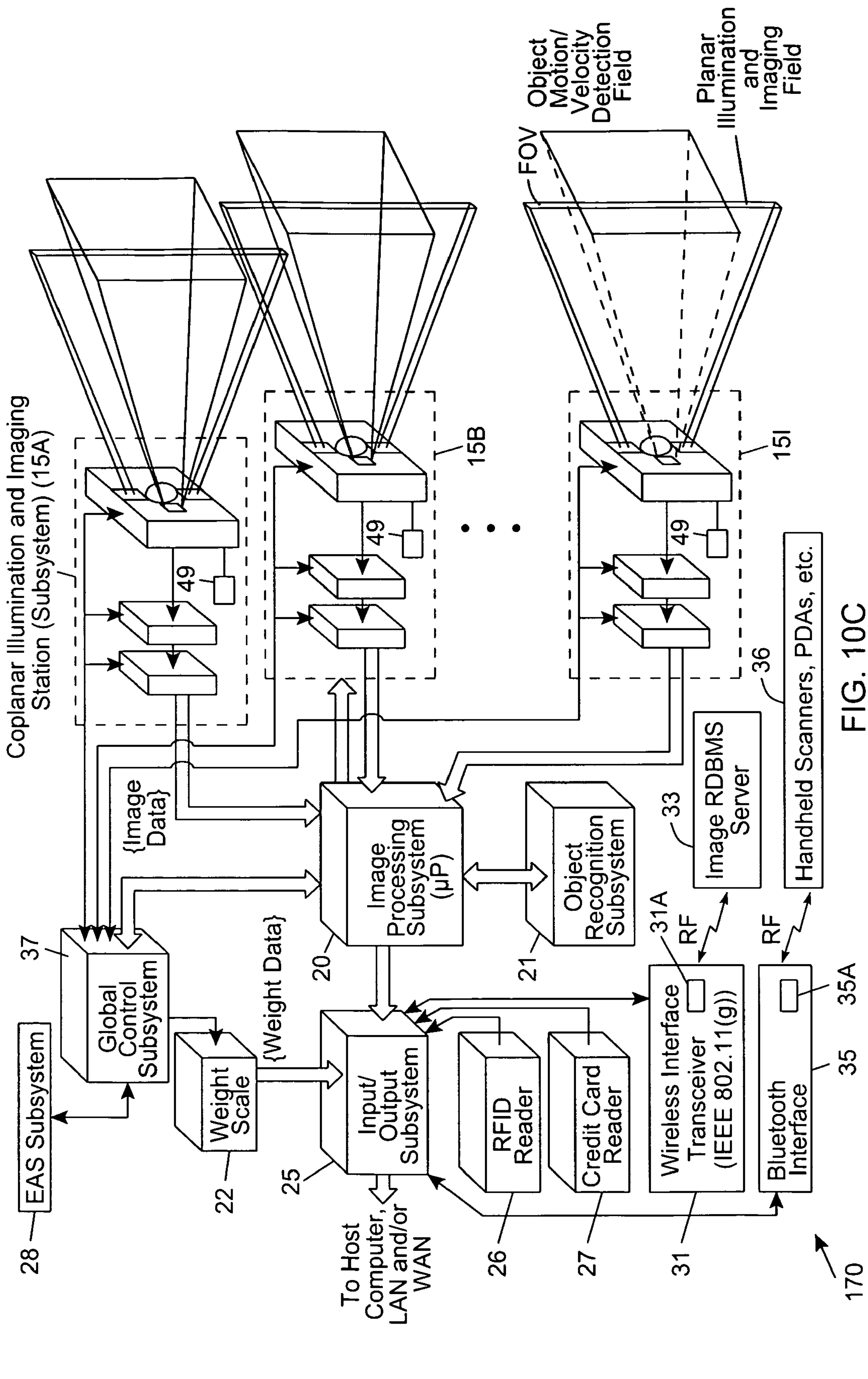
Figure 10D:
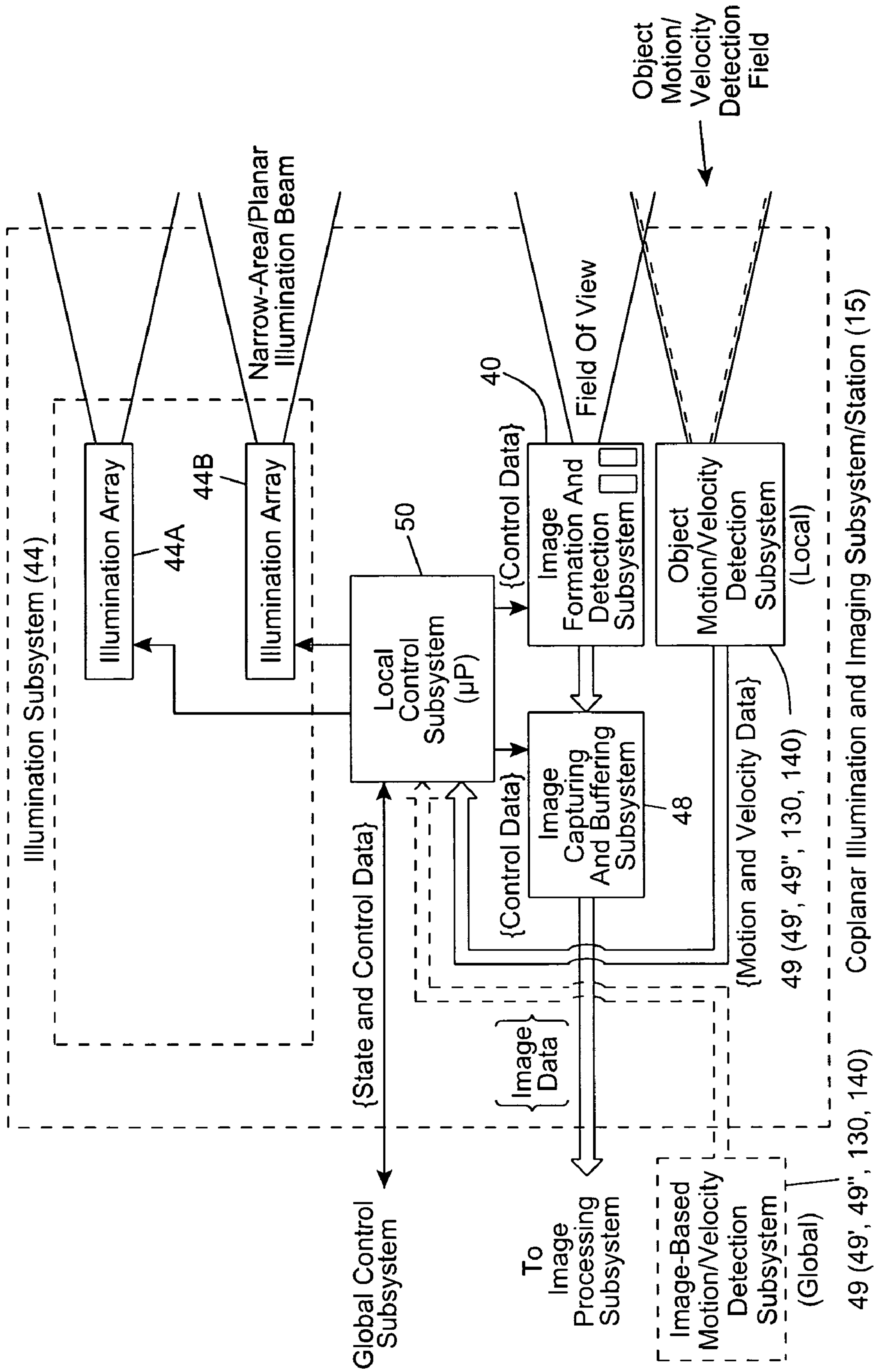
Figure 10E:
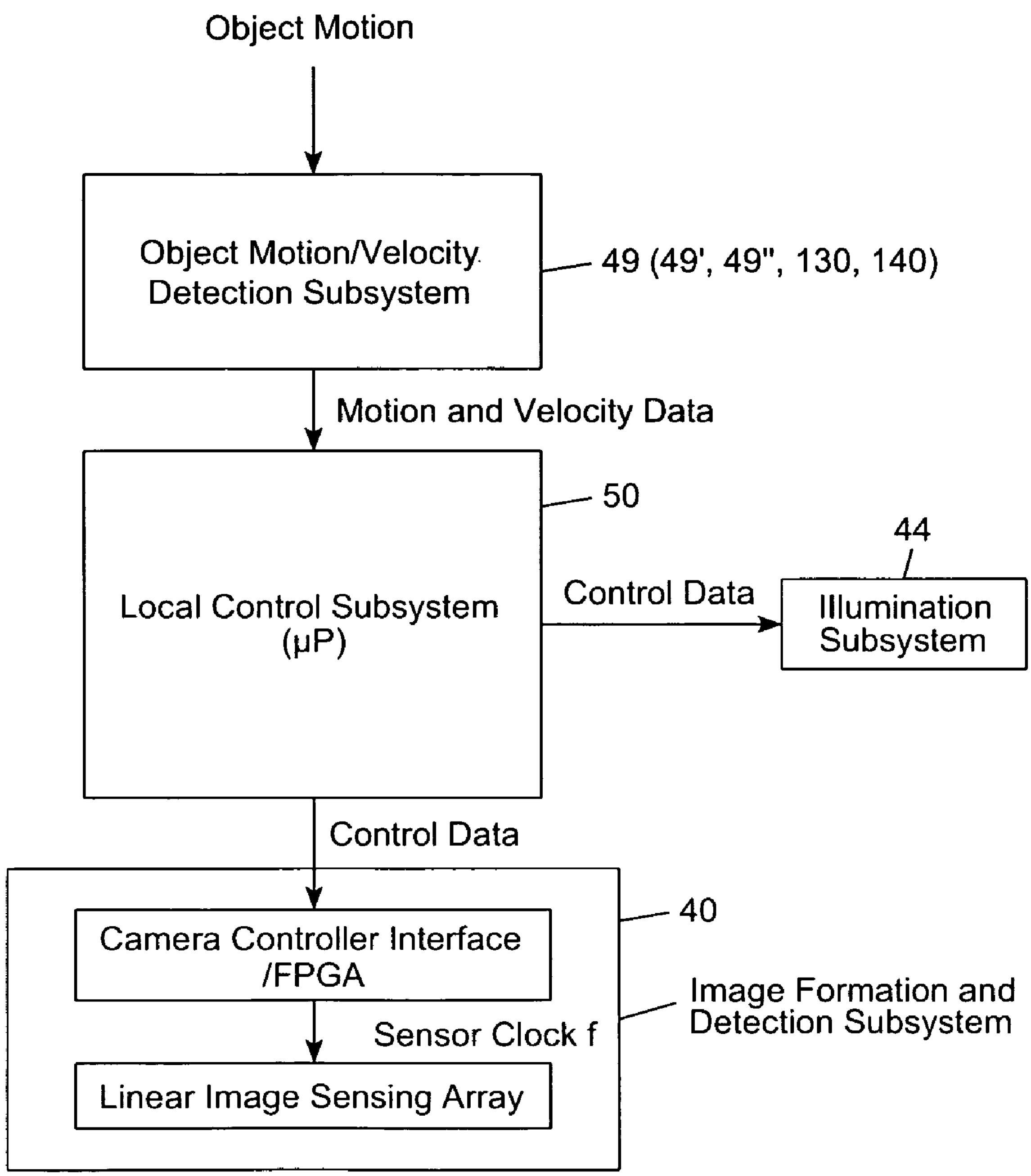
Figure 10G:
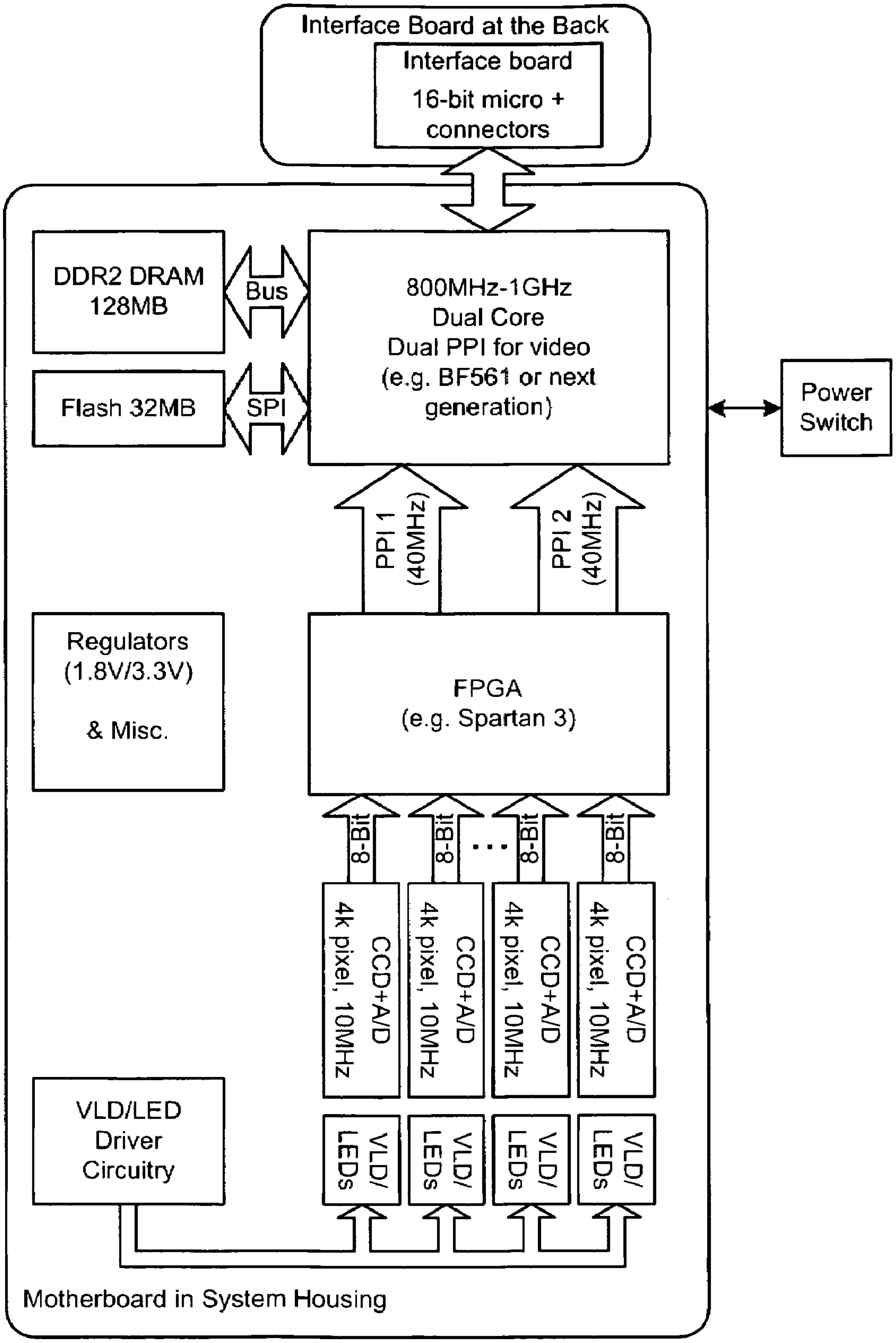
Figure 10H:
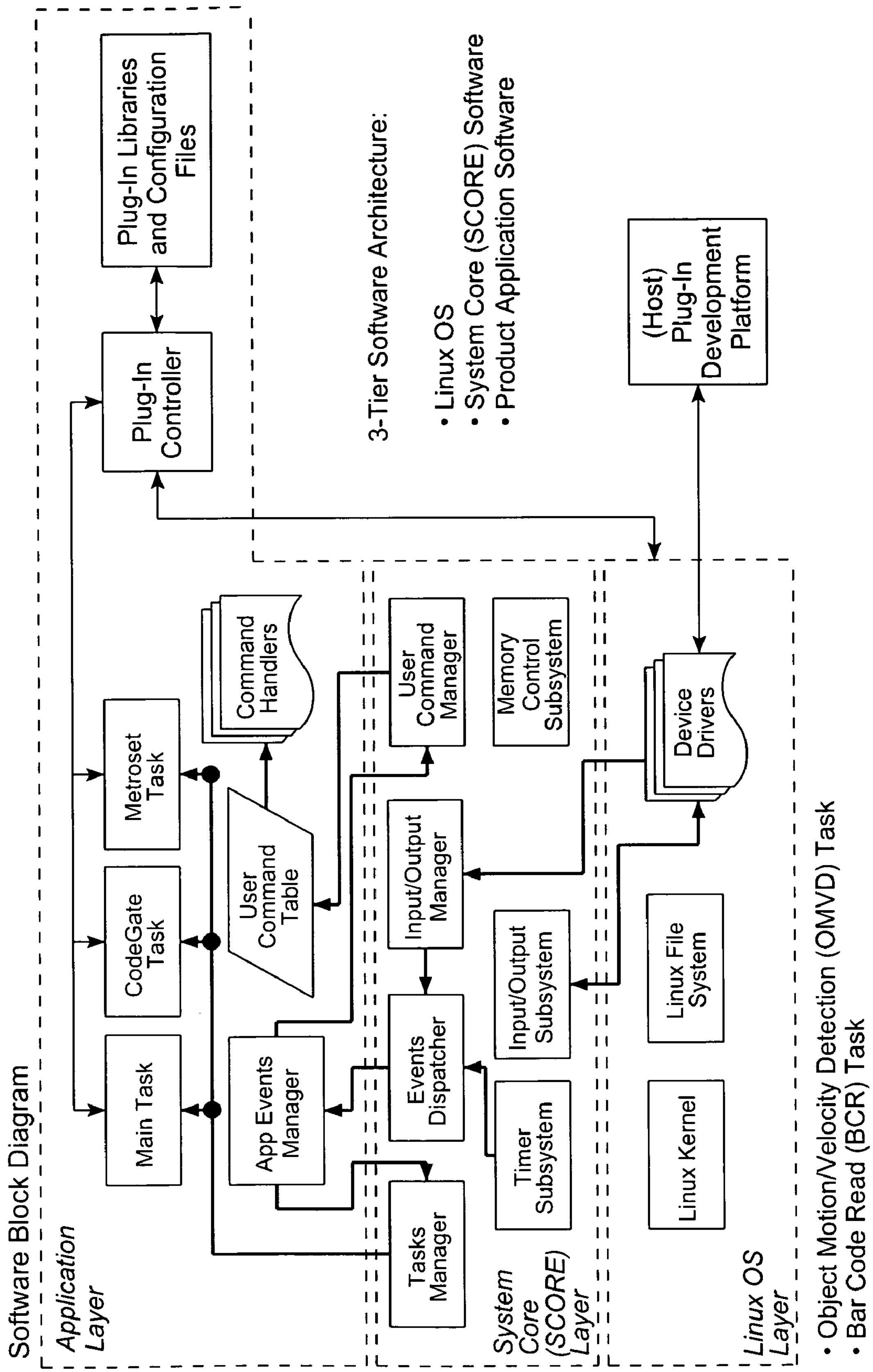
Figure 11:
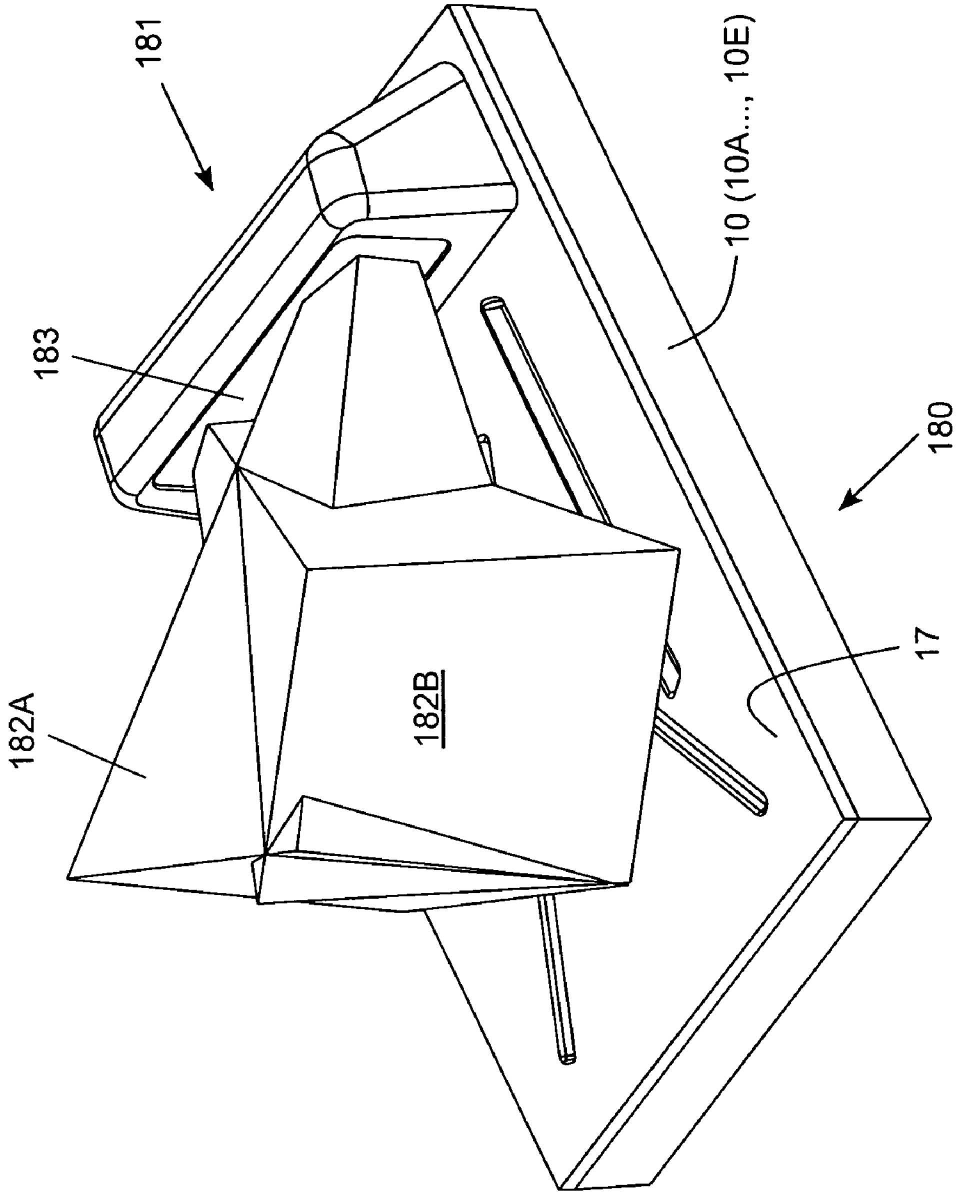
Figure 11A:
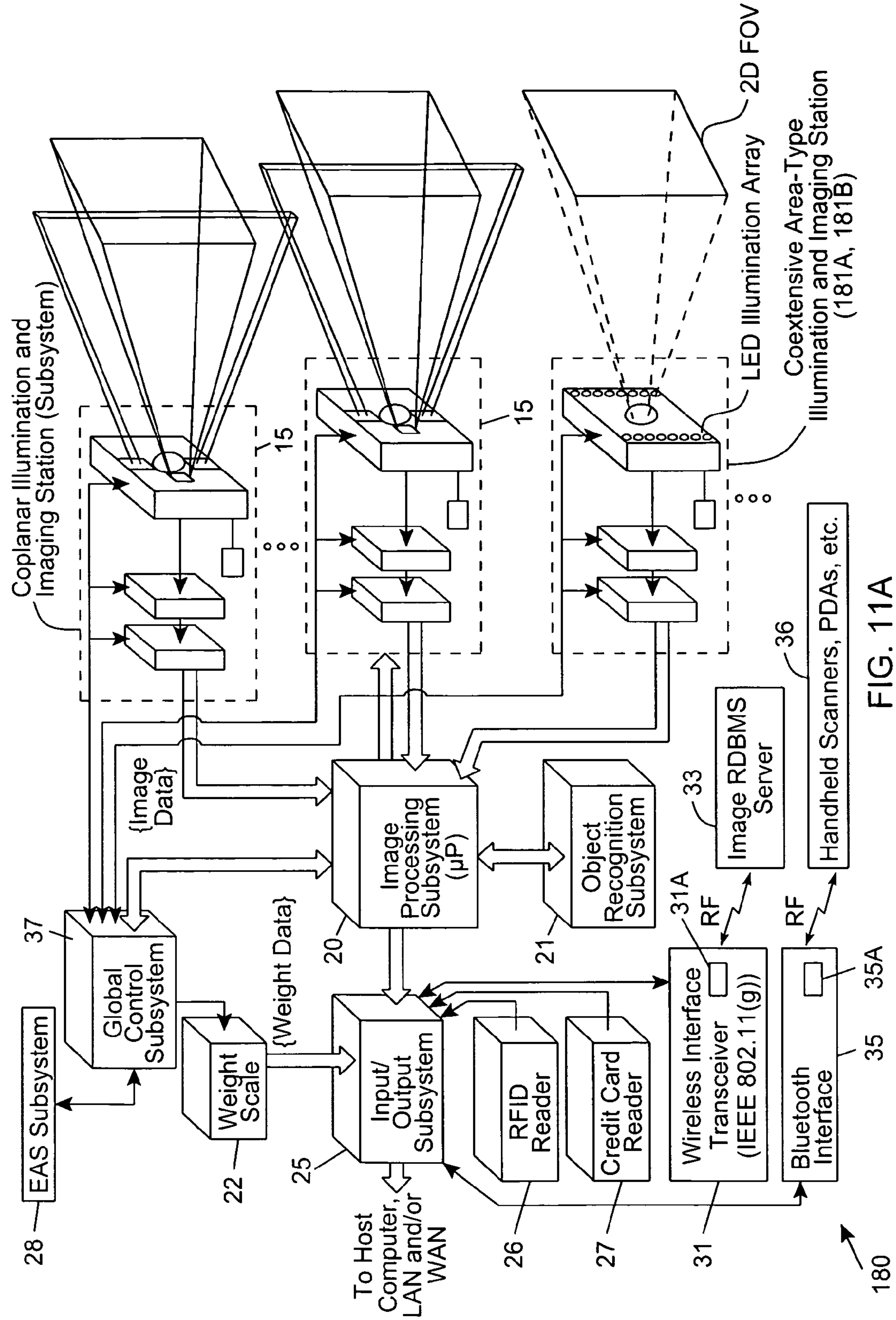
Figure 11E:
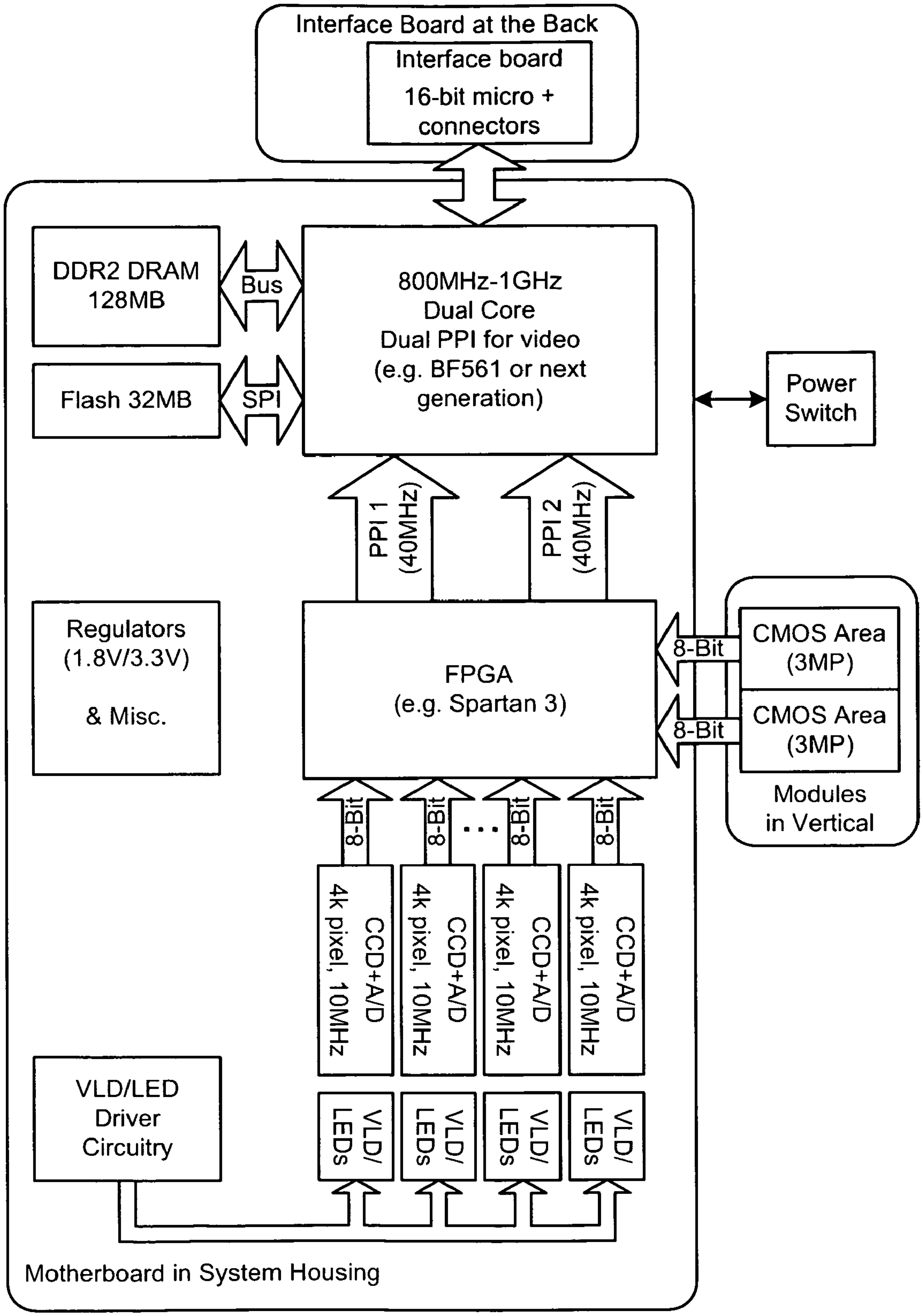
Figure 11F:
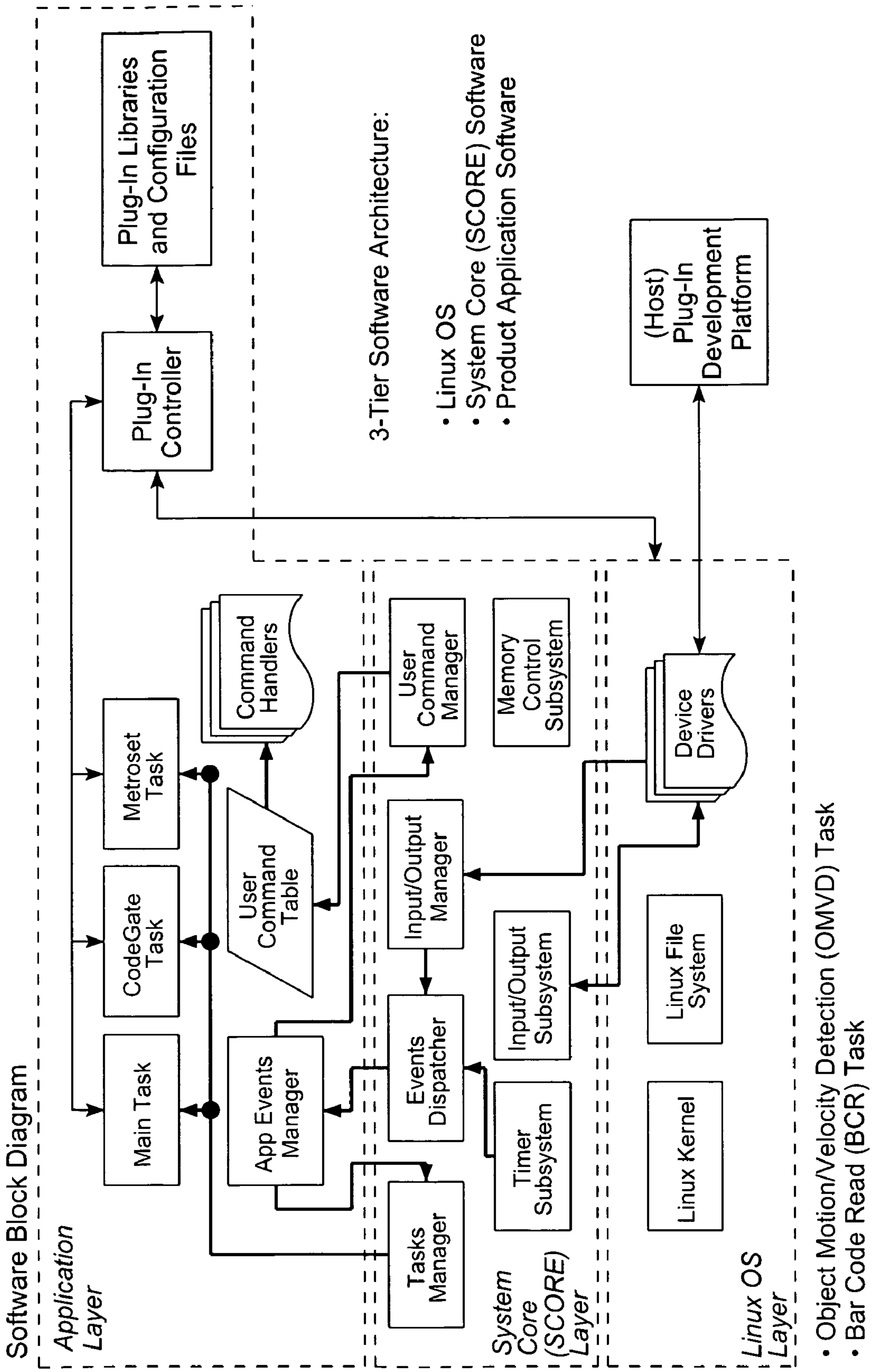
Figure 12:
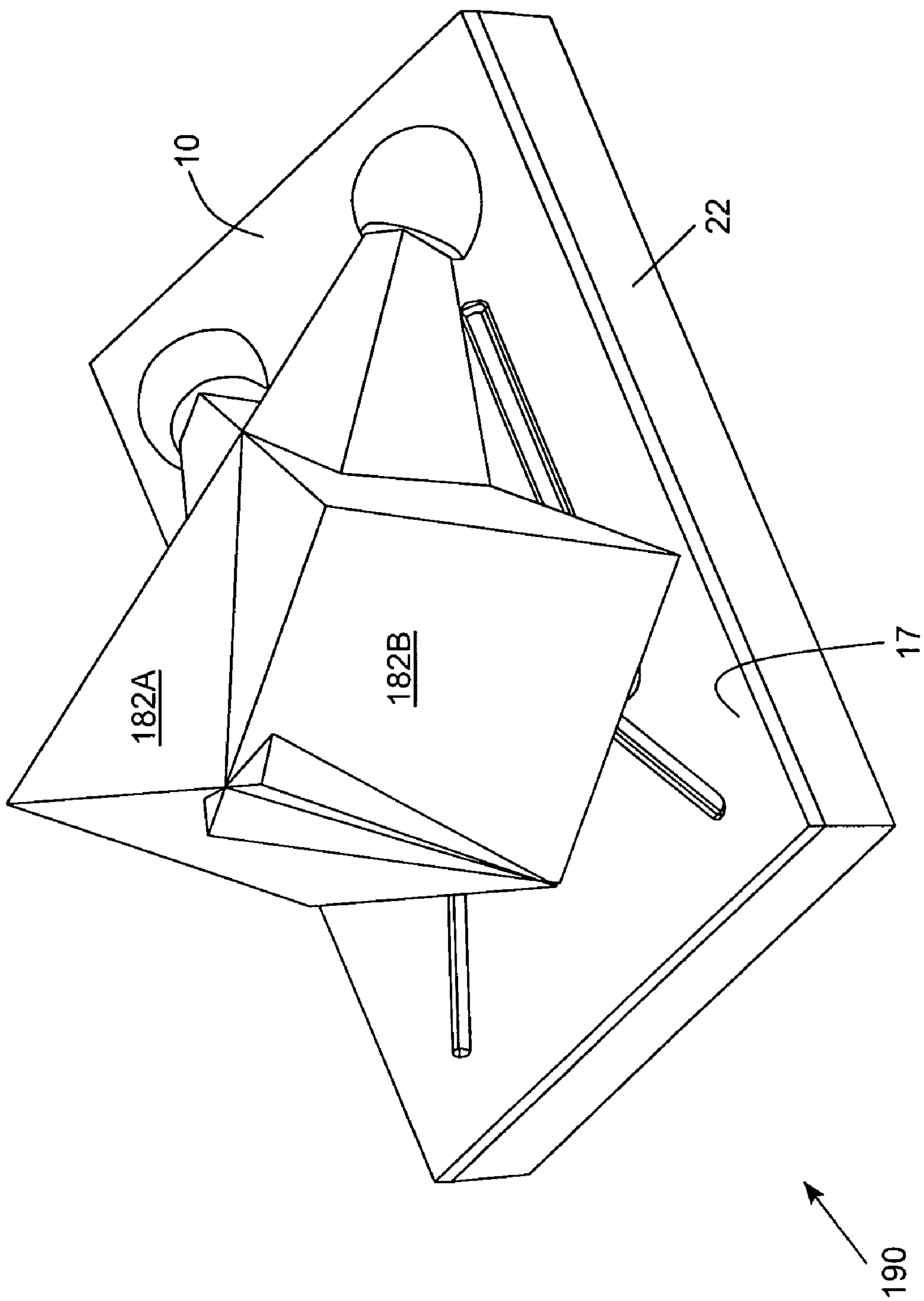
Figure 12A:
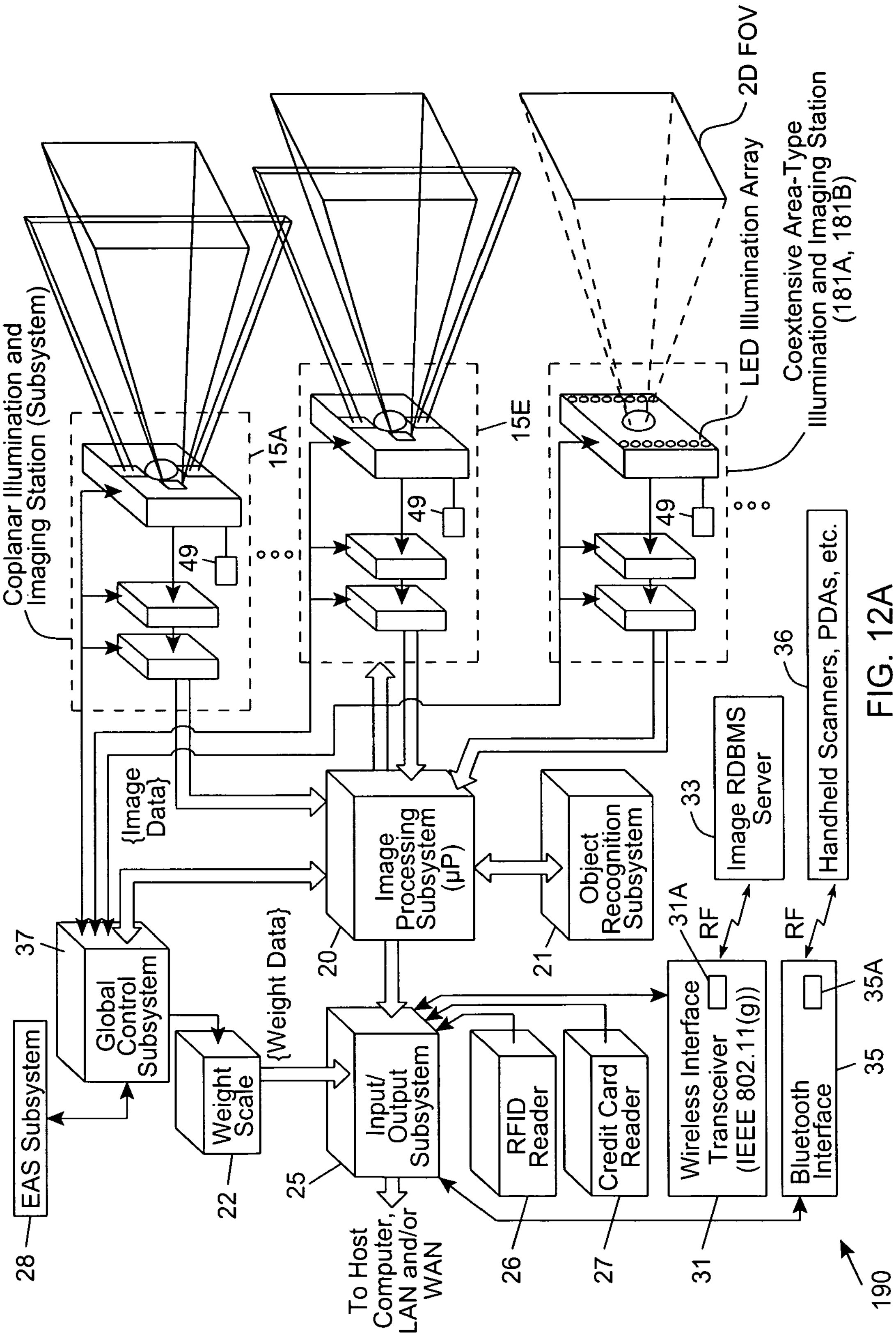

FIG. 9A is a perspective view of a sixth illustrative embodiment of the omni-directional image capturing and processing based bar code symbol reading system of the present invention installed in the countertop surface of a retail POS station, shown comprising both vertical and horizontal housing sections with coplanar illumination and imaging stations for aggressively supporting both "pass-through" as well as "presentation" modes of bar code image capture;

FIG. 9B is perspective view of the sixth embodiment of the omni-directional image capturing and processing based bar code symbol reading system of the present invention shown removed from its POS environment in FIG. 9A, and comprising a horizontal section as substantially shown in FIGS. 2, 6, 7 and 8A for projecting a first complex of coplanar illumination and imaging planes from its horizontal imaging window, and a vertical section that projects one horizontally-extending and two vertically-extending spaced-apart coplanar illumination and imaging planes from its vertical imaging window, into the 3D imaging volume of the system;

FIG. 9C is a block schematic representation of the omni-directional image capturing and processing based bar code symbol reading system of FIG. 9B, wherein the complex of coplanar laser illuminating and linear imaging stations, constructed using either VLD or LED based illumination arrays and linear (CMOS-based) image sensing arrays as shown in FIGS. 6A and 7A, support automatic image formation and capture along each coplanar illumination and imaging plane therewithin, as well as automatic imaging-processing based object motion/velocity detection and intelligent automatic laser illumination control within the 3D imaging volume of the system;

FIG. 9D is a block schematic representation of one of the coplanar illumination and imaging stations that can be employed in the system of FIG. 8C, showing its planar light illumination array (PLIA), its linear image formation and detection subsystem, its image capturing and buffering subsystem, its imaging-based object motion and velocity detection subsystem, and its local control subsystem (i.e. microcontroller);

FIG. 9E is a block schematic representation of the imaging-based object motion/velocity detection subsystem employed at each coplanar illumination and imaging station supported by the system, shown comprising an area-type image acquisition subsystem and an embedded digital signal processing (DSP) chip to support high-speed digital image capture and (local) processing operations required for real-time object motion and velocity detection;

FIG. 9F1 is a state transition diagram for the omni-directional image capturing and processing based bar code symbol reading system described in FIG. 9B, running the system control program described in FIGS. 6G1A and 6G1B;

FIG. 9F2 is a state transition diagram for the omni-directional image capturing and processing based bar code symbol reading system described in FIG. 9B, running the system control program described in FIGS. 6G2A and 6G2B;

FIG. 9F3 is a state transition diagram for the omni-directional image capturing and processing based bar code symbol reading system described in FIG. 9B, running the system control program generally described in FIGS. 6G3A and 6G3B;

FIG. 9G is a schematic diagram describing an exemplary embodiment of a computing and memory architecture platform for implementing the omni-directional image capturing and processing based bar code symbol reading system described FIG. 9B;

FIG. 9H is a schematic representation of a three-tier software architecture that can run upon the computing and memory architecture platform of FIG. 9H, so as to implement the functionalities of the omni-directional image capturing and processing based bar code symbol reading system described FIG. 9B;

FIG. 10A is a perspective view of a seventh illustrative embodiment of the omni-directional image capturing and processing based bar code symbol reading system of the present invention installed in the countertop surface of a retail POS station, shown comprising both vertical and horizontal housing sections with coplanar illumination and imaging stations for aggressively supporting both "pass-through" as well as "presentation" modes of bar code image capture;

FIG. 10B is perspective view of the seventh embodiment of the omni-directional image capturing and processing based bar code symbol reading system of the present invention shown removed from its POS environment in FIG. 10A, and comprising a horizontal section as substantially shown in FIG. 2 for projecting a first complex of coplanar illumination and imaging planes from its horizontal imaging window, and a vertical section that projects three vertically-extending coplanar illumination and imaging planes into the 3D imaging volume of the system;

FIG. 10C is a block schematic representation of the omni-directional image capturing and processing based bar code symbol reading system of FIG. 10B, wherein the complex of coplanar laser illuminating and linear imaging stations, constructed using either VLD or LED based illumination arrays and linear (CMOS-based) image sensing array as shown in FIGS. 6A, 6A' and 7A, support automatic image formation and capture along each coplanar illumination and imaging plane within the 3D imaging volume of the system, as well as automatic imaging-processing based object motion and velocity detection and intelligent automatic laser illumination control therewithin;

FIG. 10D is a block schematic representation of one of the coplanar illumination and imaging stations employed in the system embodiment of FIGS. 10B and 10C, showing its planar illumination array (PLIA), its linear image formation and detection subsystem, its image capturing and buffering subsystem, its high-speed imaging-based object motion and velocity sensing subsystem, and its local control subsystem;

FIG. 10E is a block schematic representation of the high-speed imaging-based object motion/velocity detection subsystem employed at each coplanar illumination and imaging station supported by the system of FIGS. 10B and 10C, shown comprising an area-type image acquisition subsystem and an embedded digital signal processing (DSP) chip to support high-speed digital image capture and (local) processing operations required for real-time object presence, motion and velocity detection;

FIG. 10F1 is a state transition diagram for the omni-directional image capturing and processing based bar code symbol reading system described in FIG. 10B, running the system control program generally described in FIGS. 6G1A and 6G1B;

FIG. 10F2 is a state transition diagram for the omni-directional image capturing and processing based bar code symbol reading system described in FIG. 10B, running the system control program generally described in FIGS. 6G2A and 6G2B;

FIG. 10F3 is a state transition diagram for the omni-directional image capturing and processing based bar code symbol reading system described in FIG. 10B, running the system control program generally described in FIGS. 6G3A and 6G3B;

FIG. 10G is a schematic diagram describing an exemplary embodiment of a computing and memory architecture platform for implementing the omni-directional image capturing and processing based bar code symbol reading system shown FIG. 10B;

FIG. 10H is a schematic representation of a three-tier software architecture that can run upon the computing and memory architecture platform of FIG. 10H, so as to implement the functionalities of the omni-directional image capturing and processing based bar code symbol reading system shown FIG. 10B;

FIG. 11 is a perspective view of an eighth illustrative embodiment of the omni-directional image capturing and processing based bar code symbol reading system of the present invention, shown comprising both a vertical housing section with coplanar linear illumination and imaging stations, and a vertical housing station with a pair of laterally-spaced area-type illumination and imaging stations, for aggressively supporting both "pass-through" as well as "presentation" modes of bar code image capture;

FIG. 11A is a block schematic representation of the omni-directional image capturing and processing based bar code symbol reading system of FIG. 11, wherein the complex of coplanar laser illuminating and linear imaging stations as substantially shown in FIGS. 5, 6A, 6A', 7, 8A or 8B are mounted within the horizontal section for projecting a first complex of coplanar illumination and imaging planes from its horizontal imaging window within a 3D imaging volume, and wherein the pair of area-type illumination and imaging stations are mounted in the vertical section for projecting a pair of laterally-spaced apart area-type co-extensive illumination and imaging fields (i.e. zones) into the 3D imaging volume of the system;

FIG. 11B1 is a block schematic representation of one of the coplanar illumination and imaging stations employed in the system embodiment of FIG. 11A, showing its planar illumination array (PLIA), its linear image formation and detection subsystem, its image capturing and buffering subsystem, its high-speed imaging based object motion/velocity sensing subsystem, and its local control subsystem;

FIG. 11B2 is a block schematic representation of one of the area-type illumination and imaging stations employed in the system embodiment of FIG. 11A, showing its area illumination array, its area-type image formation and detection subsystem, its image capturing and buffering subsystem, its high-speed imaging based object motion/velocity sensing subsystem, and its local control subsystem;

FIG. 11C1 is a block schematic representation of the high-speed imaging-based object motion/velocity detection subsystem employed at each coplanar linear-based illumination and imaging station supported by the system of FIG. 11A, shown comprising a linear-type image acquisition subsystem and an embedded digital signal processing (DSP) chip to support high-speed digital image capture and (local) processing operations required for real-time object motion/velocity detection;

FIG. 11C2 is a block schematic representation of the high-speed imaging-based object motion/velocity detection subsystem employed at each area-based illumination and imaging station supported by the system of FIG. 11A, shown comprising an area-type image acquisition subsystem and an embedded digital signal processing (DSP) chip to support high-speed digital image capture and (local) processing operations required for real-time object motion/velocity detection;

FIG. 11D1 is a state transition diagram for the omni-directional image capturing and processing based bar code symbol reading system described in FIG. 11B, running the system control program generally described in FIG. 6E1;

FIG. 11D2 is a state transition diagram for the omni-directional image capturing and processing based bar code symbol reading system described in FIG. 11B, running the system control program generally described in FIG. 6E2;

FIG. 11D3 is a state transition diagram for the omni-directional image capturing and processing based bar code symbol reading system described in FIG. 11B, running the system control program generally described in FIG. 6E3;

FIG. 11E is a schematic diagram describing an exemplary embodiment of a computing and memory architecture platform for implementing the omni-directional image capturing and processing based bar code symbol reading system described FIG. 11;

FIG. 11F is a schematic representation of a three-tier software architecture that can run upon the computing and memory architecture platform of FIG. 11E, so as to implement the functionalities of the omni-directional image capturing and processing based bar code symbol reading system described FIG. 11;

FIG. 12 is a perspective view of a seventh illustrative embodiment of the omni-directional image capturing and processing based bar code symbol reading system of the present invention, shown comprising both a horizontal housing section with a complex of coplanar linear illumination and imaging stations and a pair of laterally-spaced area-type illumination and imaging stations mounted within the system housing, for aggressively supporting both "pass-through" as well as "presentation" modes of bar code image capture;

FIG. 12A is a block schematic representation of the omni-directional image capturing and processing based bar code symbol reading system of FIG. 12, wherein the complex of coplanar laser illuminating and linear imaging stations as substantially shown in FIGS. 5, 6A. 6A', 7, 8A or 8B are mounted within the horizontal section for projecting a first complex of coplanar illumination and imaging planes from its horizontal imaging window, and wherein the pair of area-type illumination and imaging stations are also mounted in the horizontal section for projecting a pair of laterally-spaced area-type illumination and imaging fields (i.e. zones) into the 3D imaging volume of the system;

FIG. 12B1 is a block schematic representation of one of the coplanar illumination and imaging stations employed in the system embodiment of FIG. 12A, showing its planar illumination array (PLIA), its linear image formation and detection subsystem, its image capturing and buffering subsystem, its high-speed imaging based object motion/velocity sensing subsystem, and its local control subsystem;

FIG. 12B2 is a block schematic representation of one of the area-type illumination and imaging stations employed in the system embodiment of FIG. 12A, showing its area illumination array, its area-type image formation and detection subsystem, its image capturing and buffering subsystem, its high-speed imaging based object motion/velocity sensing subsystem, and its local control subsystem;

FIG. 12C1 is a block schematic representation of the high-speed imaging-based object motion/velocity detection subsystem employed at each coplanar linear-based illumination and imaging station supported by the system of FIG. 12A, shown comprising an area-type image acquisition subsystem and an embedded digital signal processing (DSP) chip to support high-speed digital image capture and (local) processing operations required for real-time object motion/velocity detection;

FIG. 12C2 is a block schematic representation of the high-speed imaging-based object motion/velocity detection subsystem employed at each co-extensive area-based illumination and imaging station supported by the system of FIG.

Figure 12E:
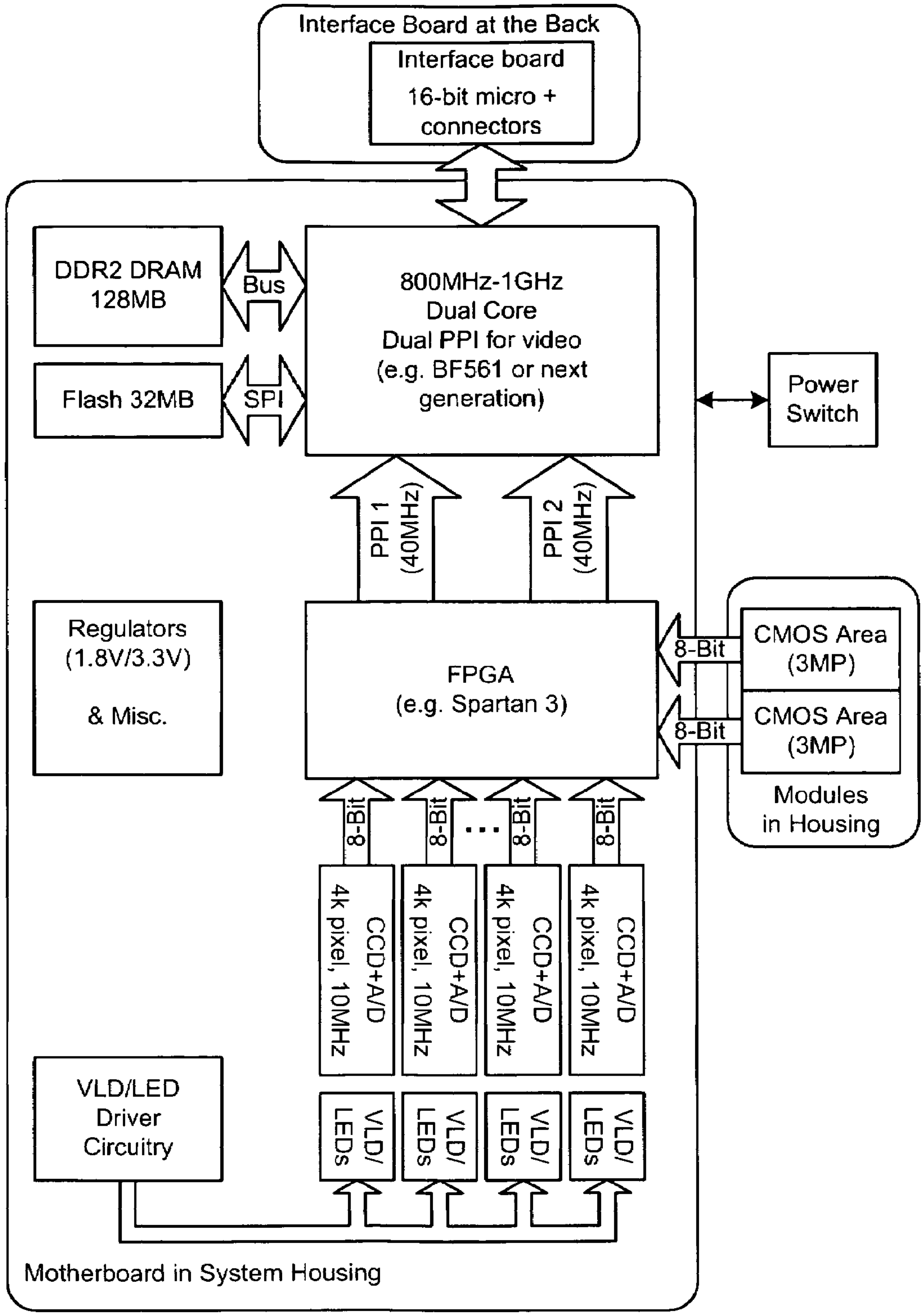
Figure 12F:
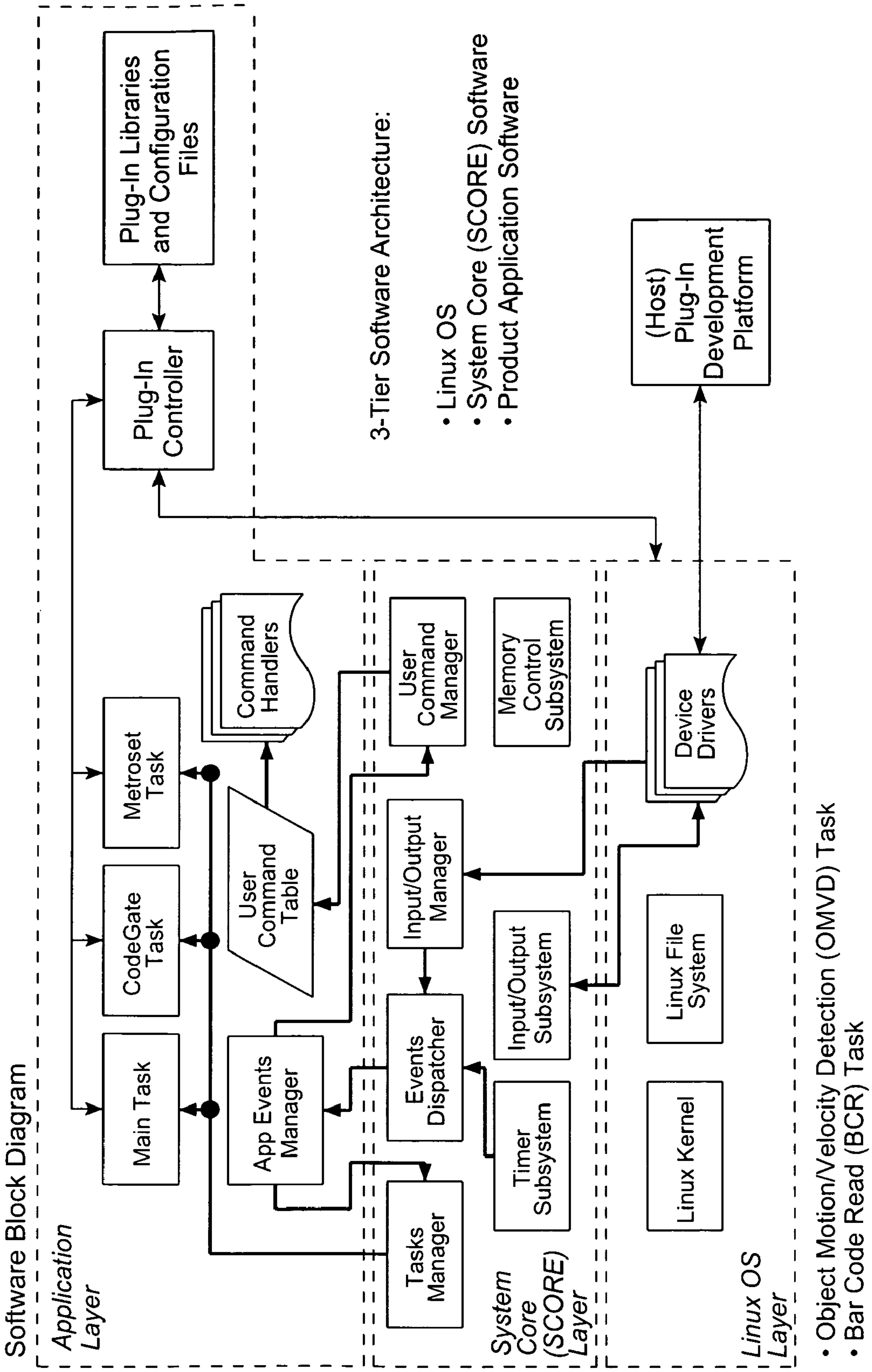
Figure 13:
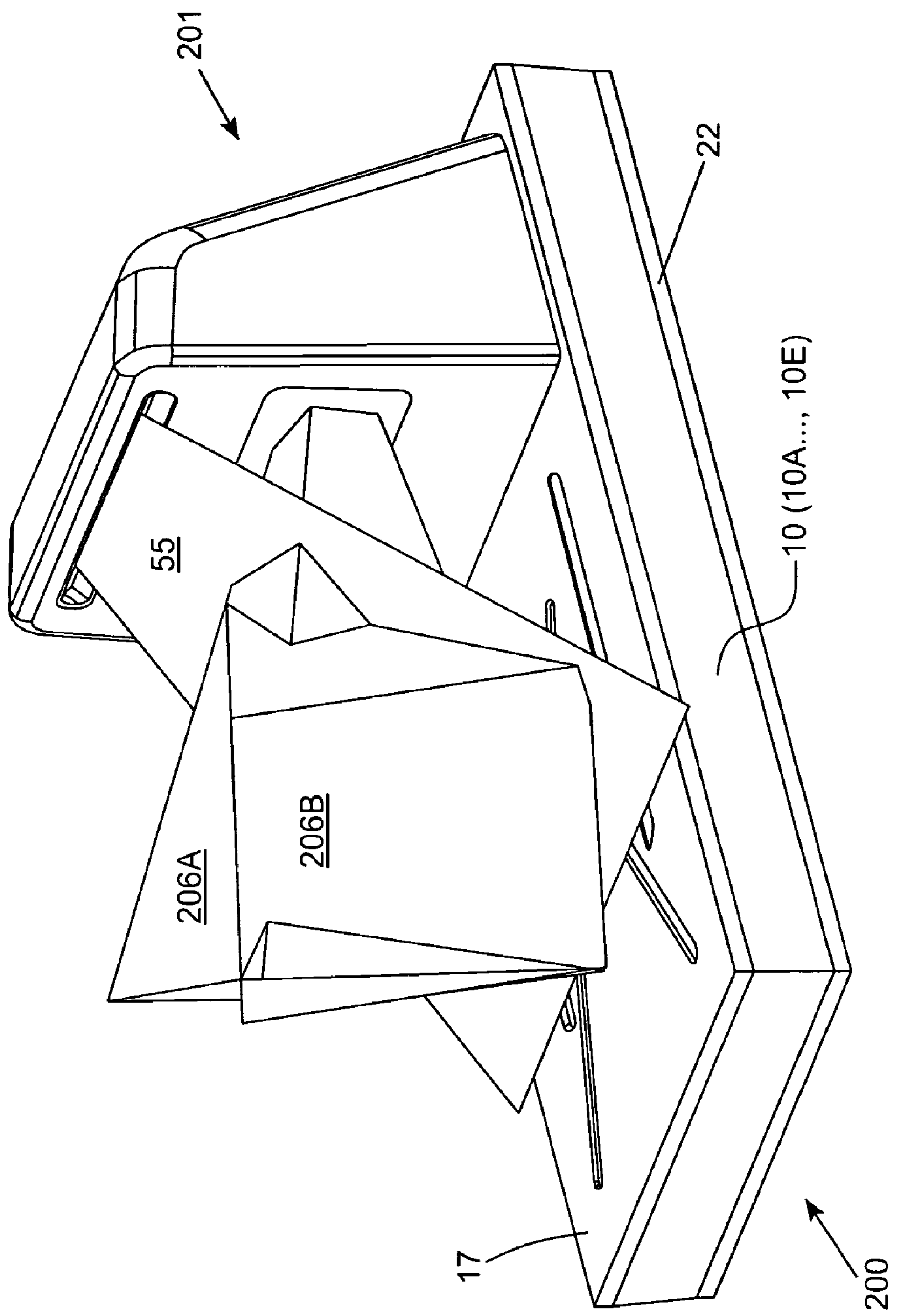
Figure 13A:
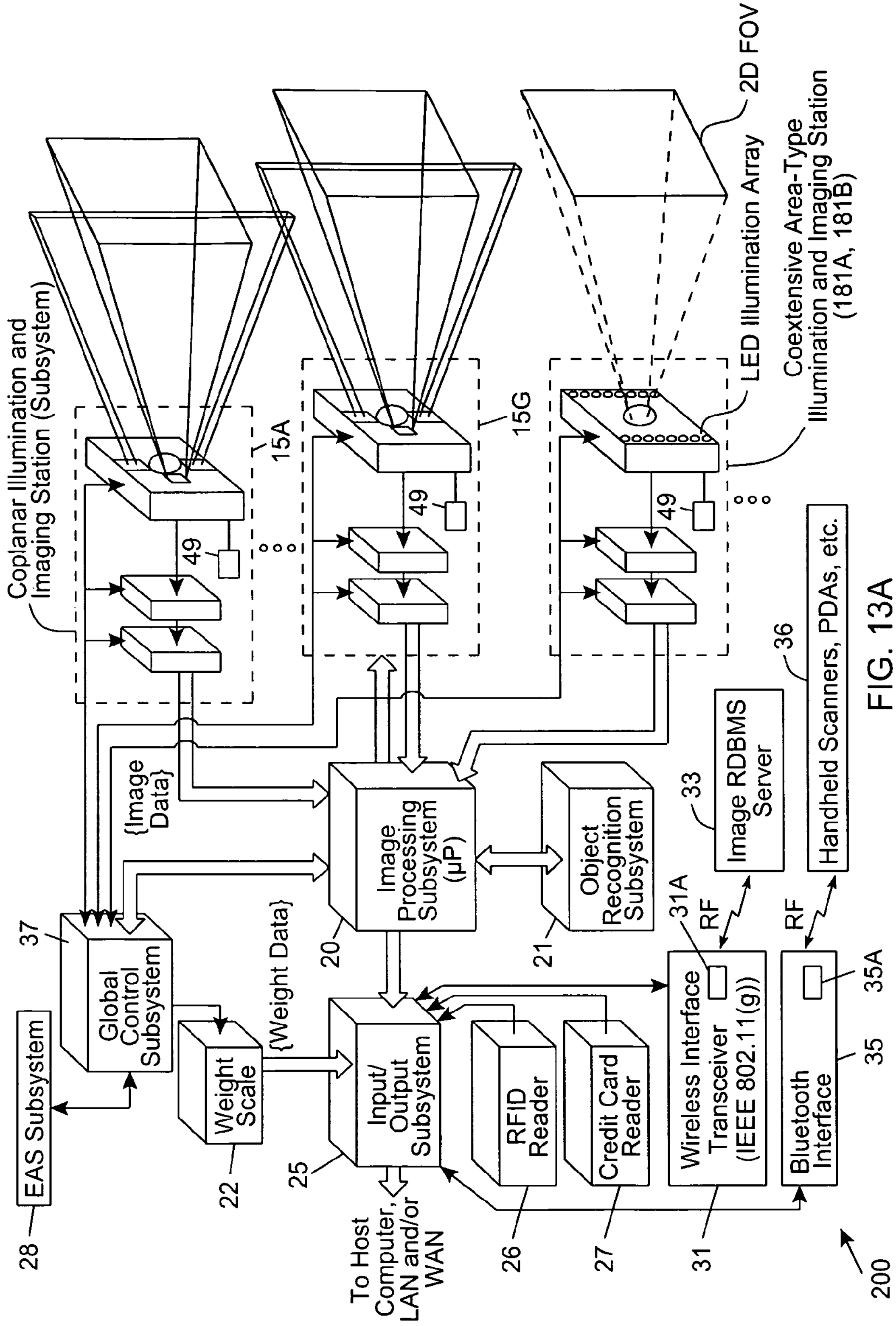
Figure 13E:
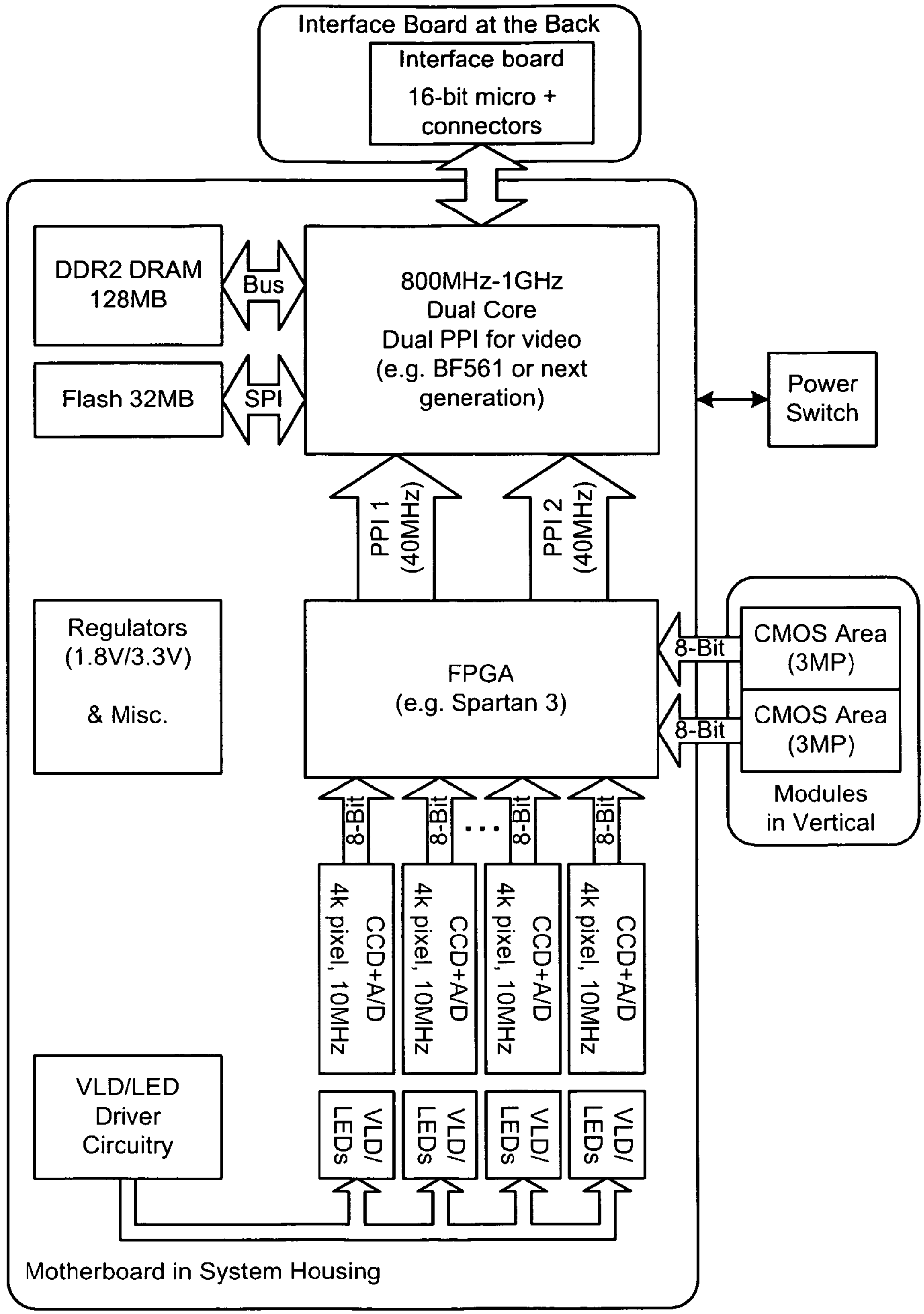
Figure 13F:
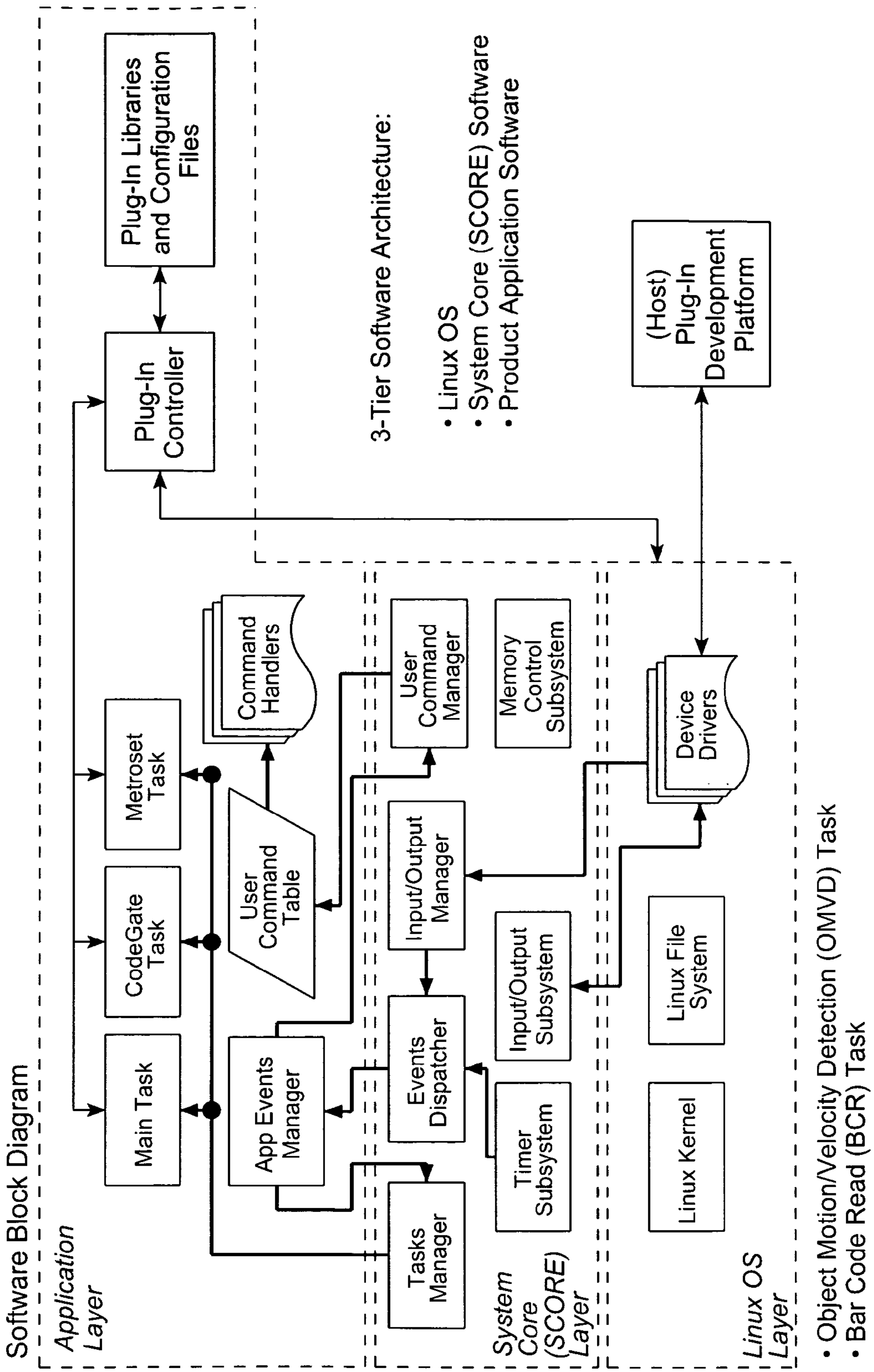
Figure 14:
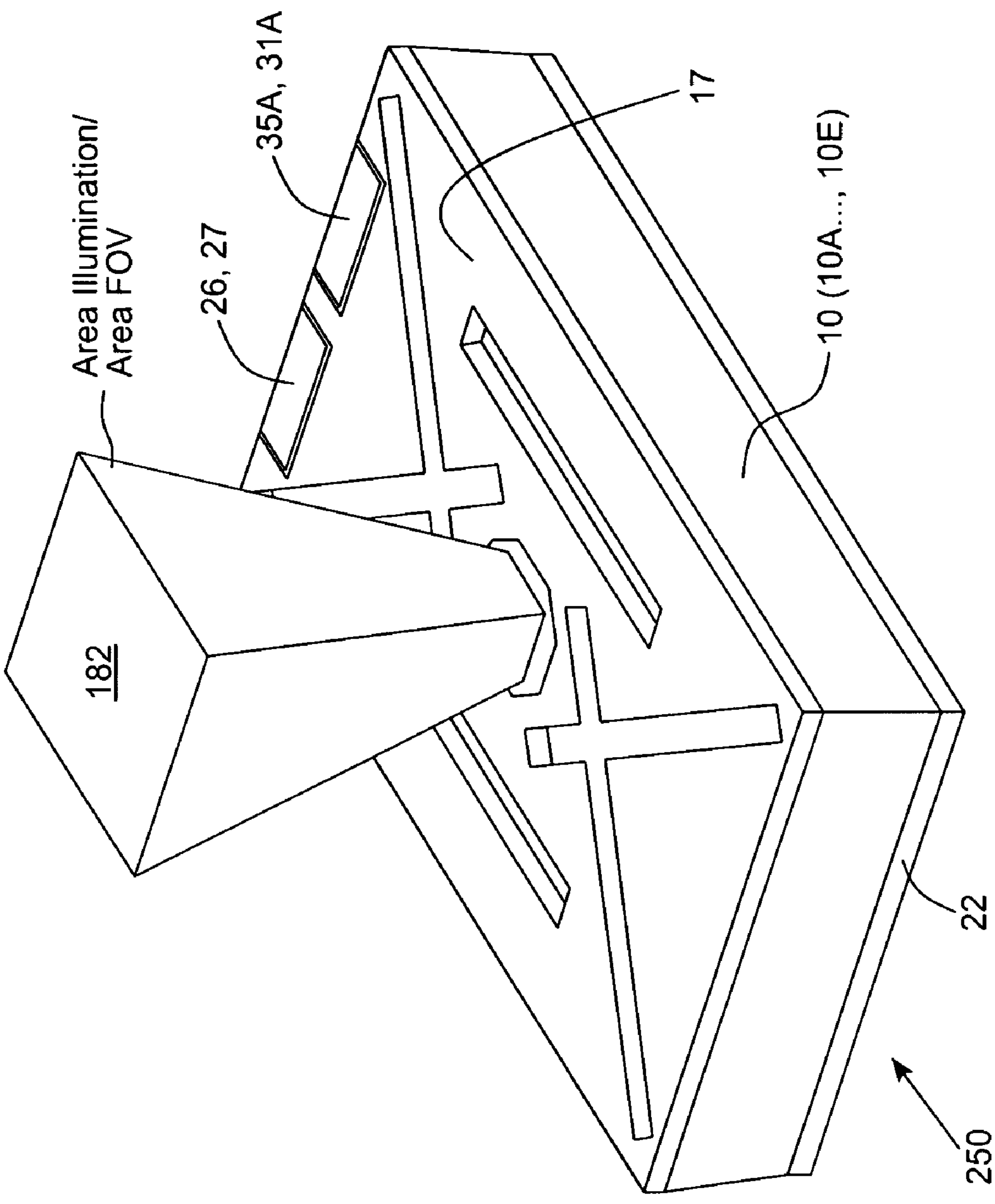
Figure 14A:
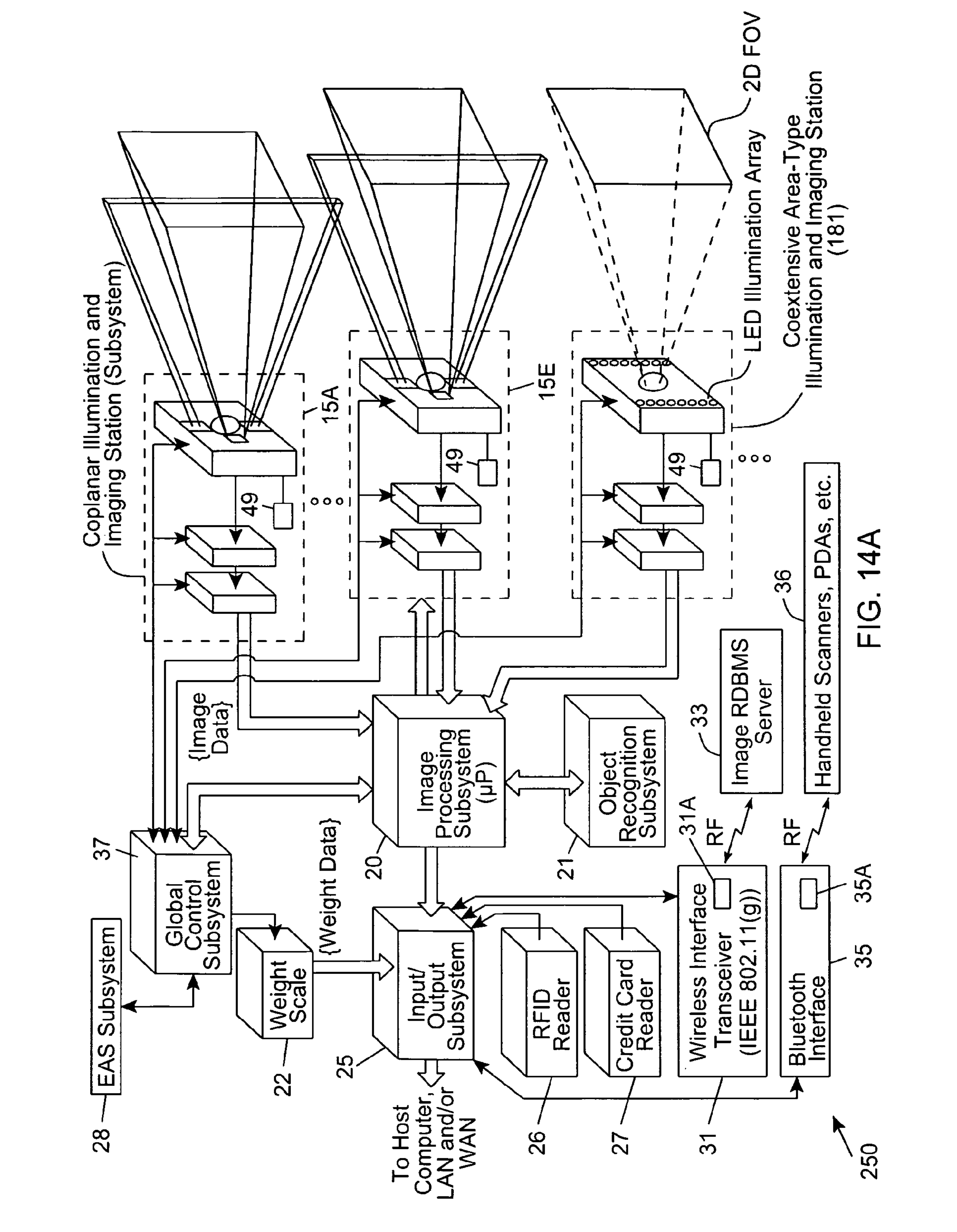
Figure 14E:
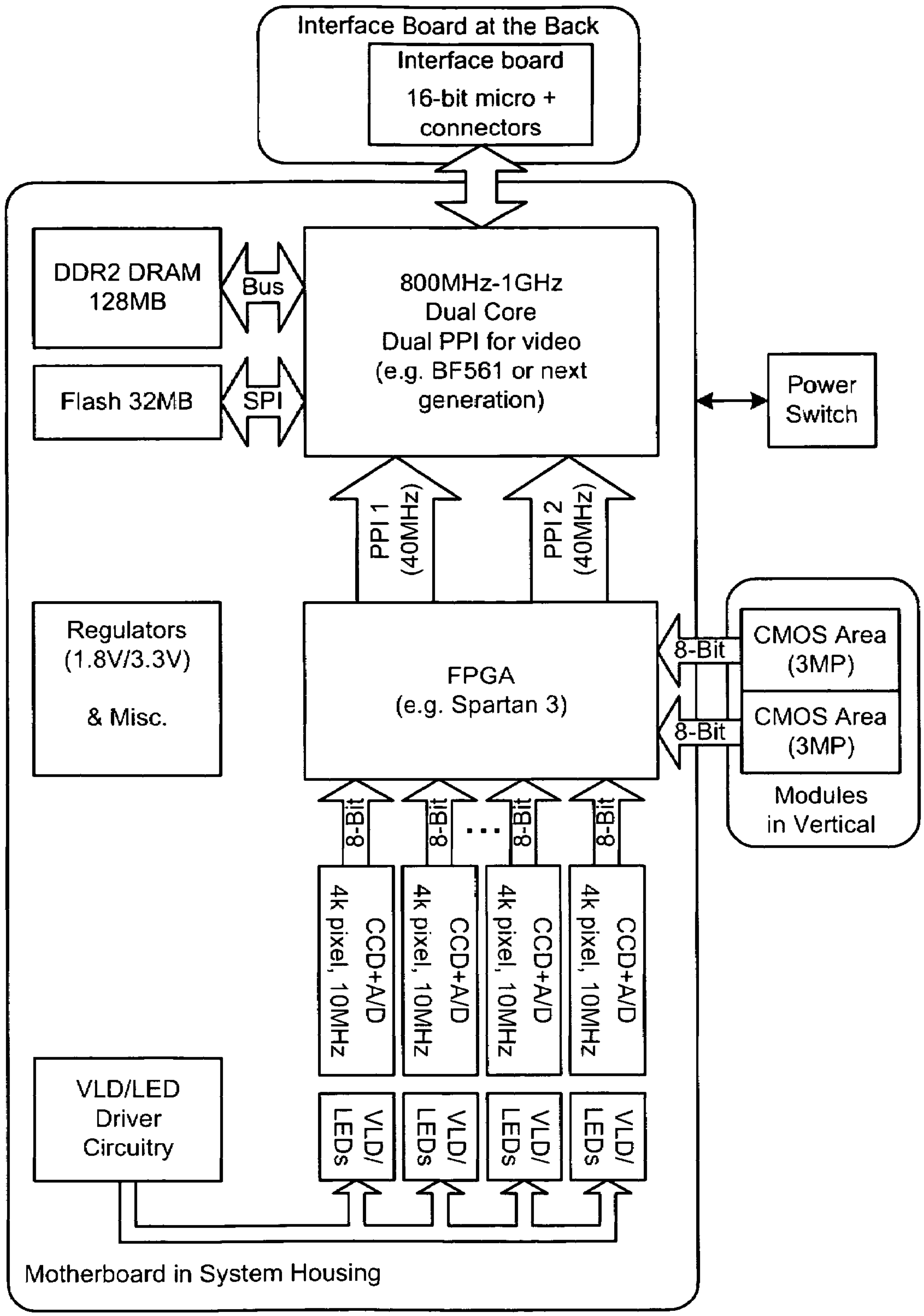
Figure 14F:
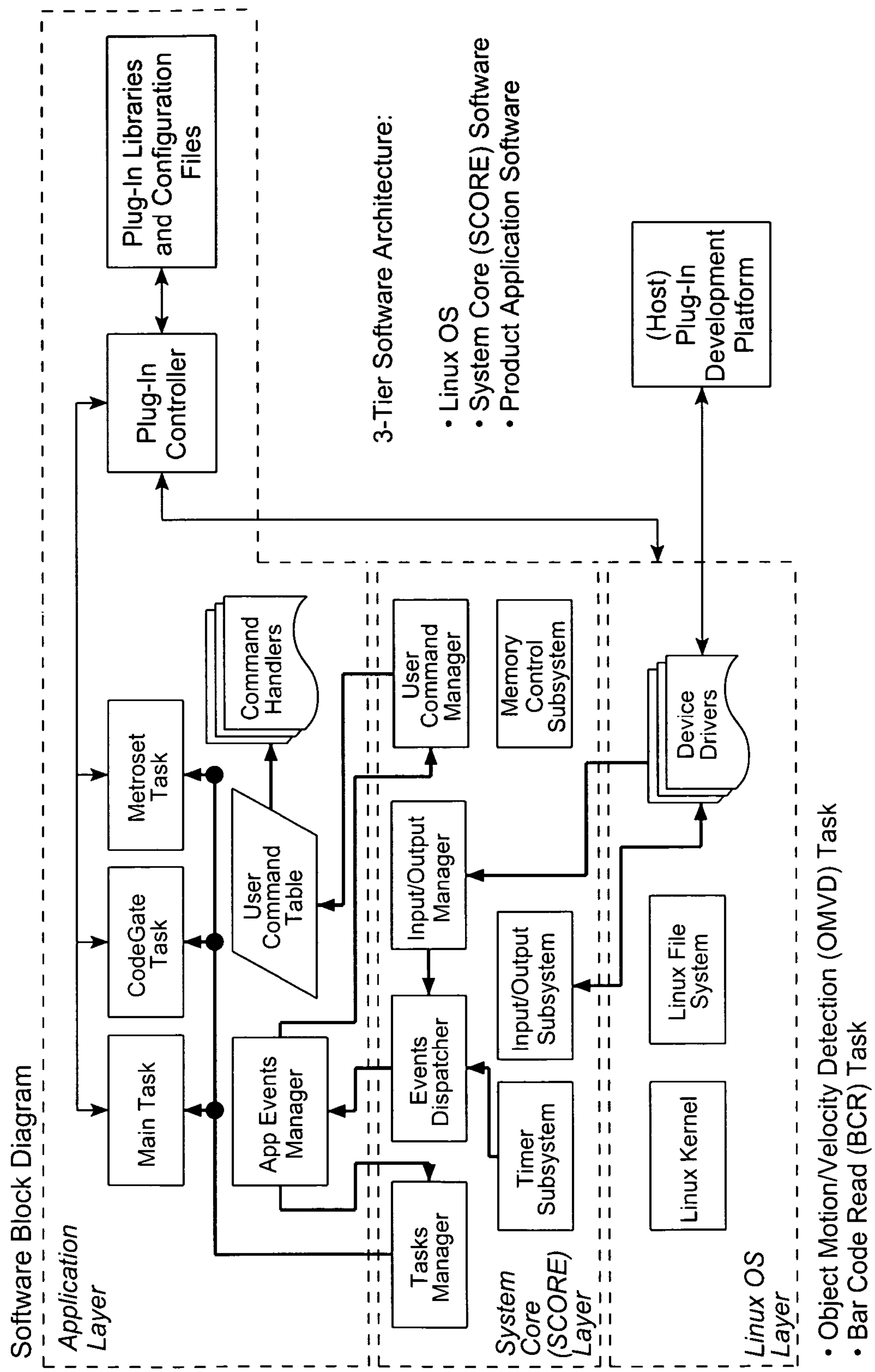
Figure 15:
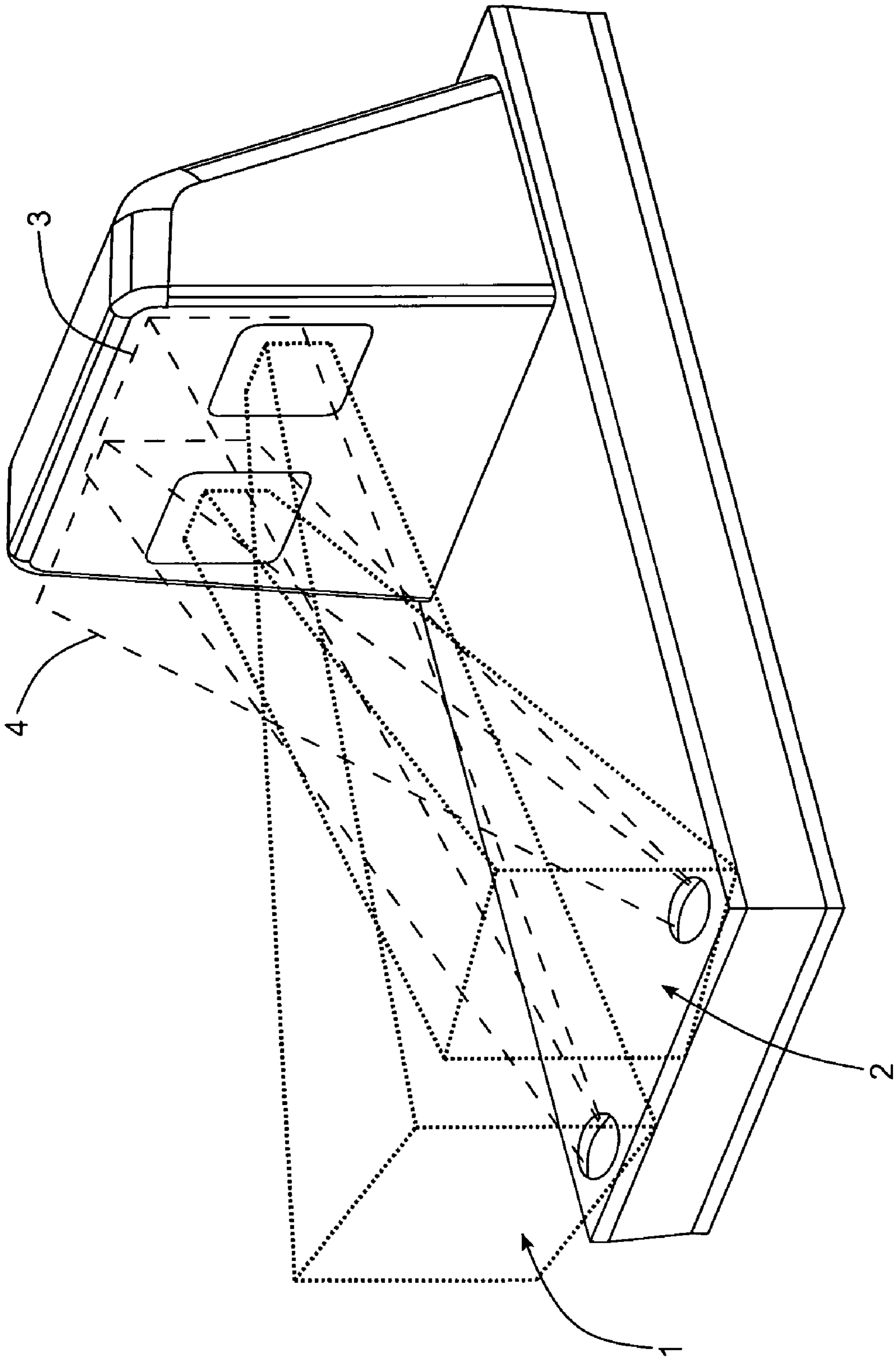
Figure 15A:
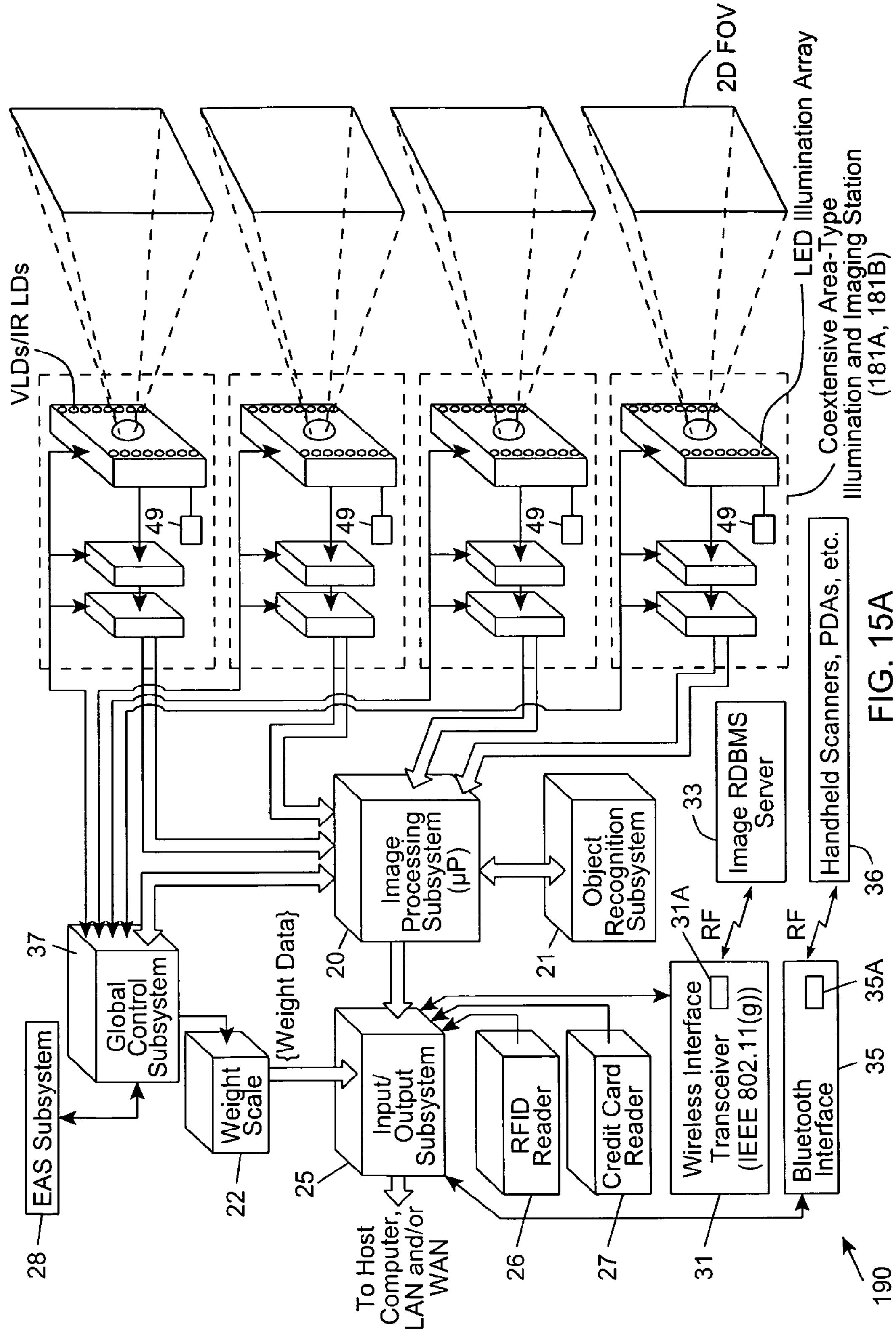
Figure 15B:
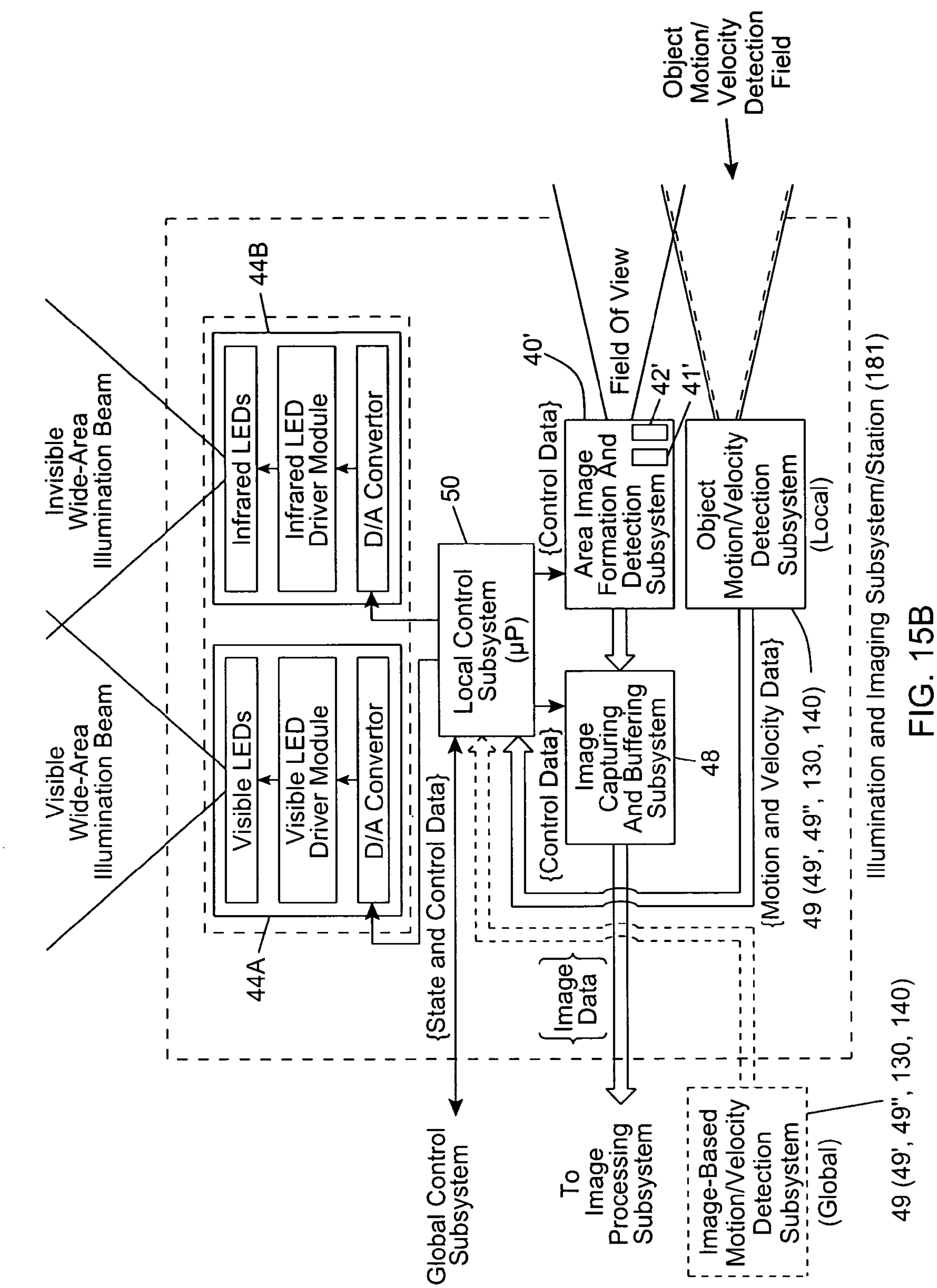
Figure 15C:
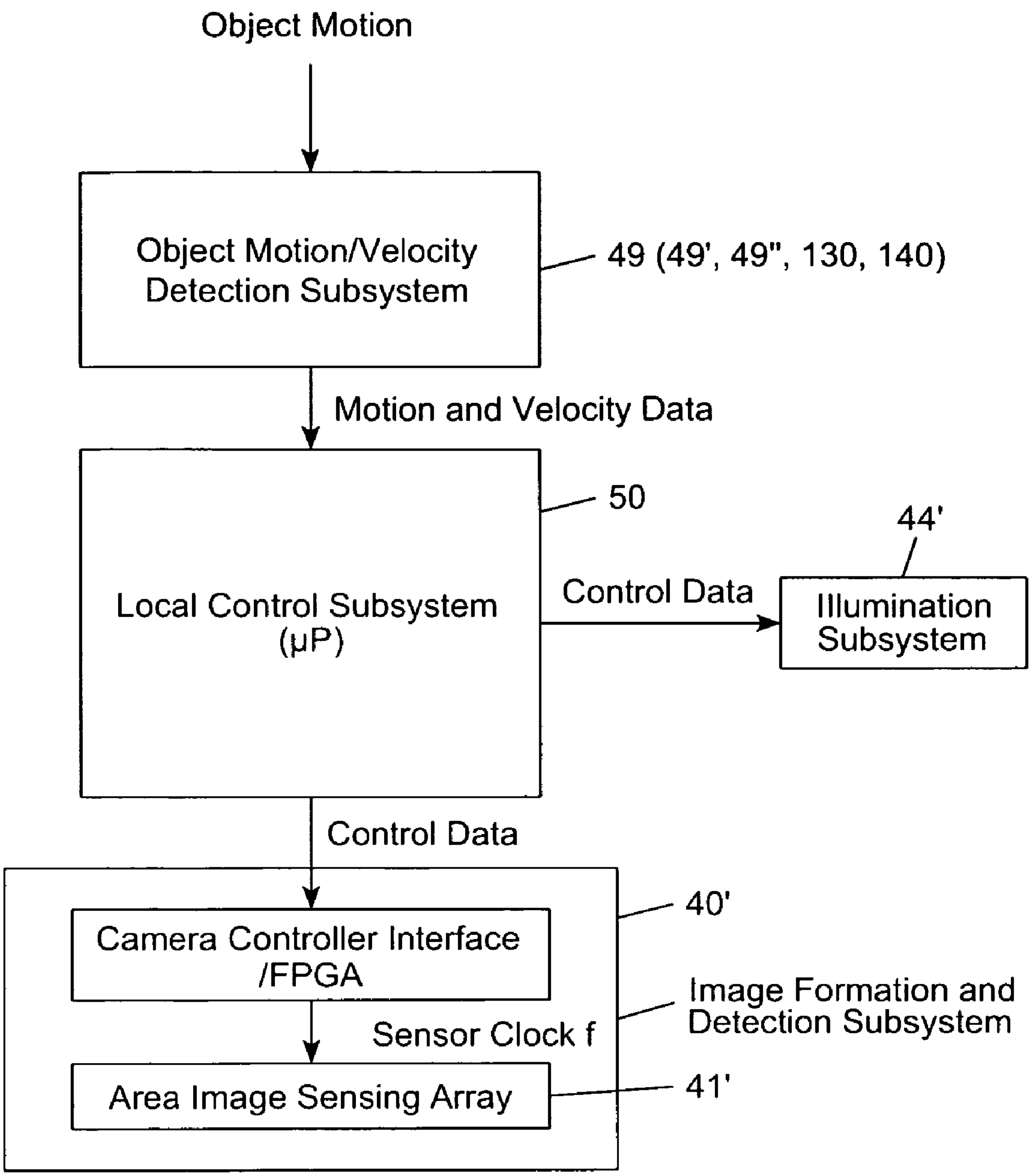
Figure 15E:
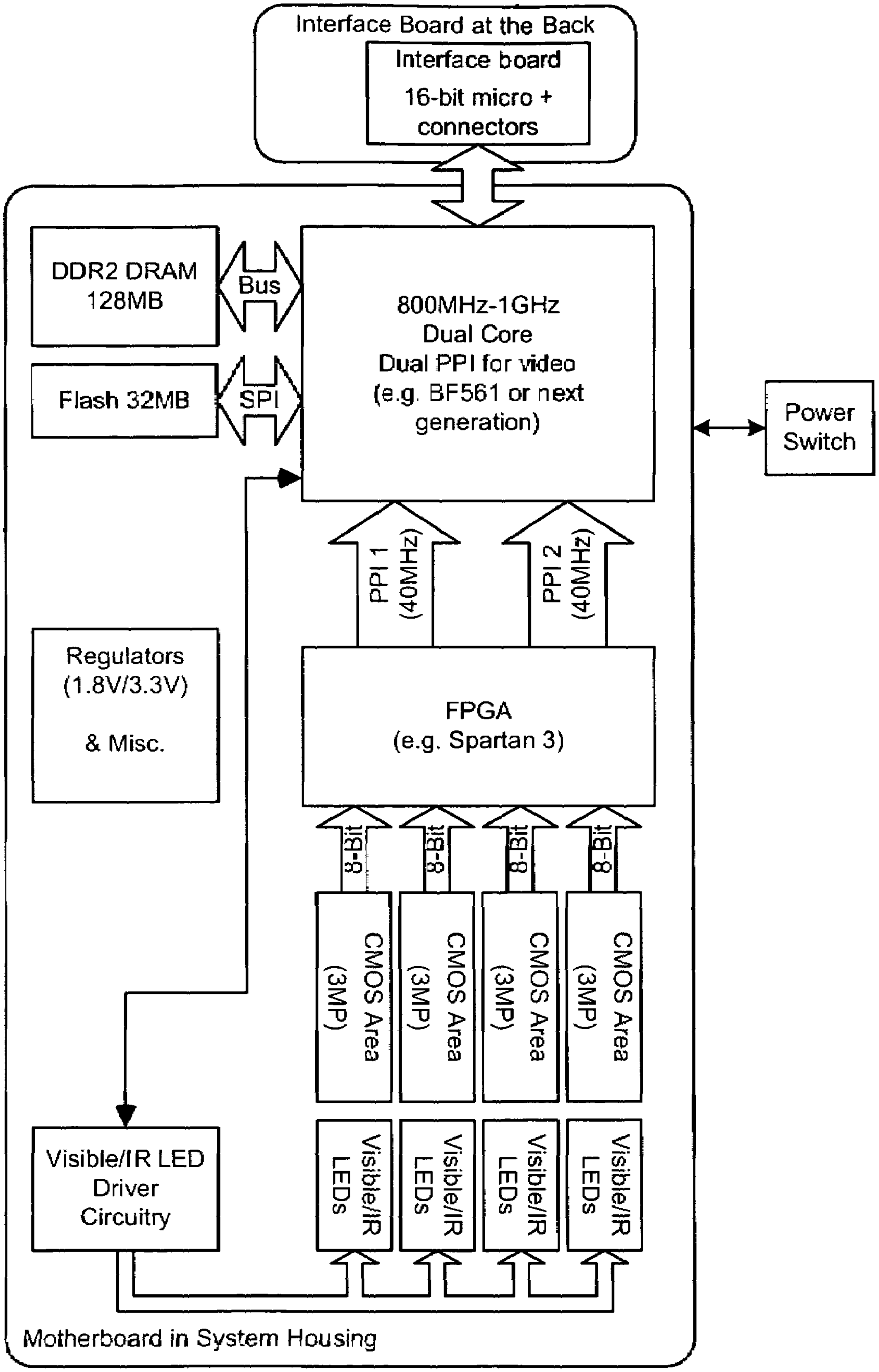
Figure 15F:
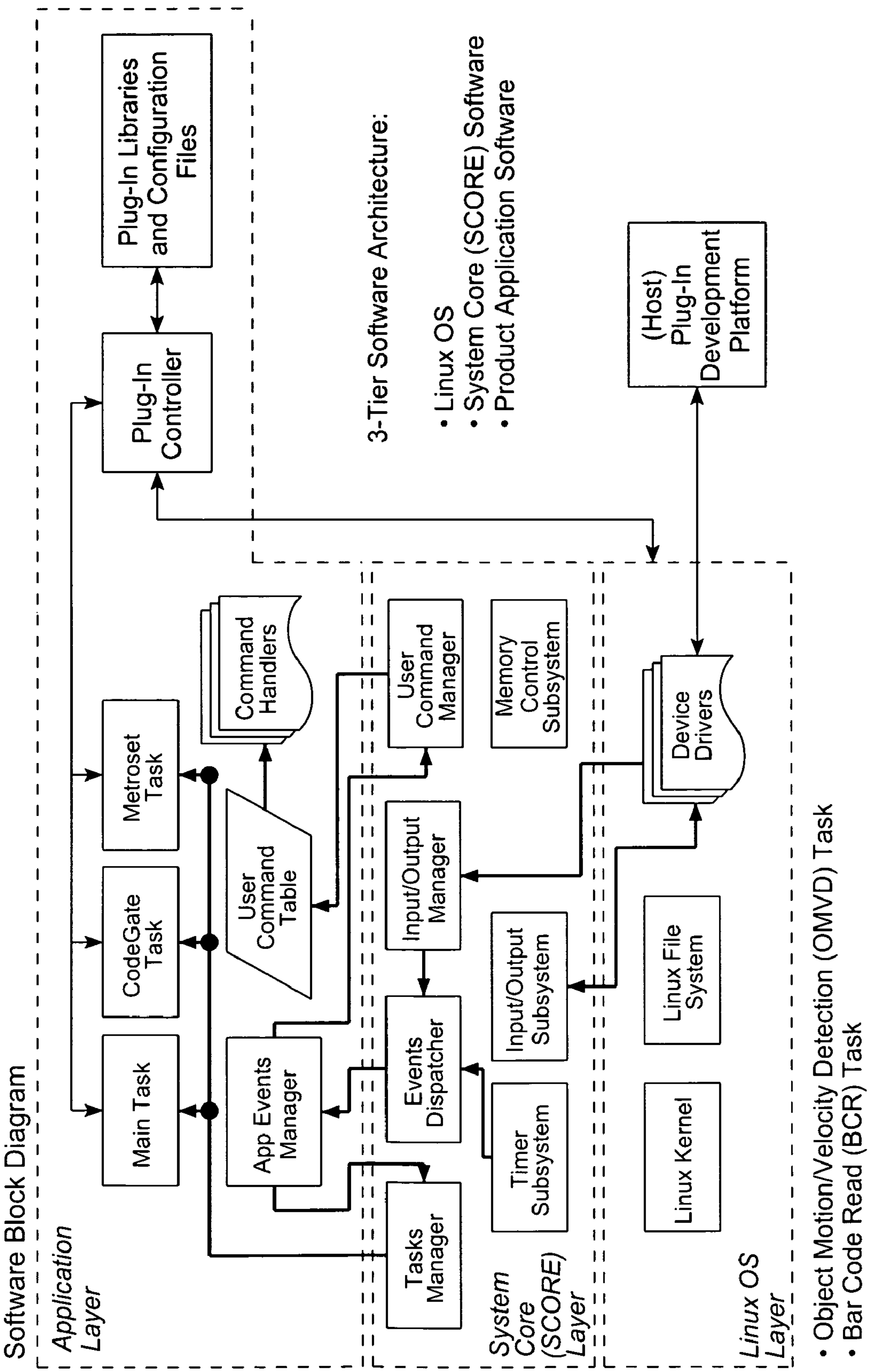
Figure 16A:
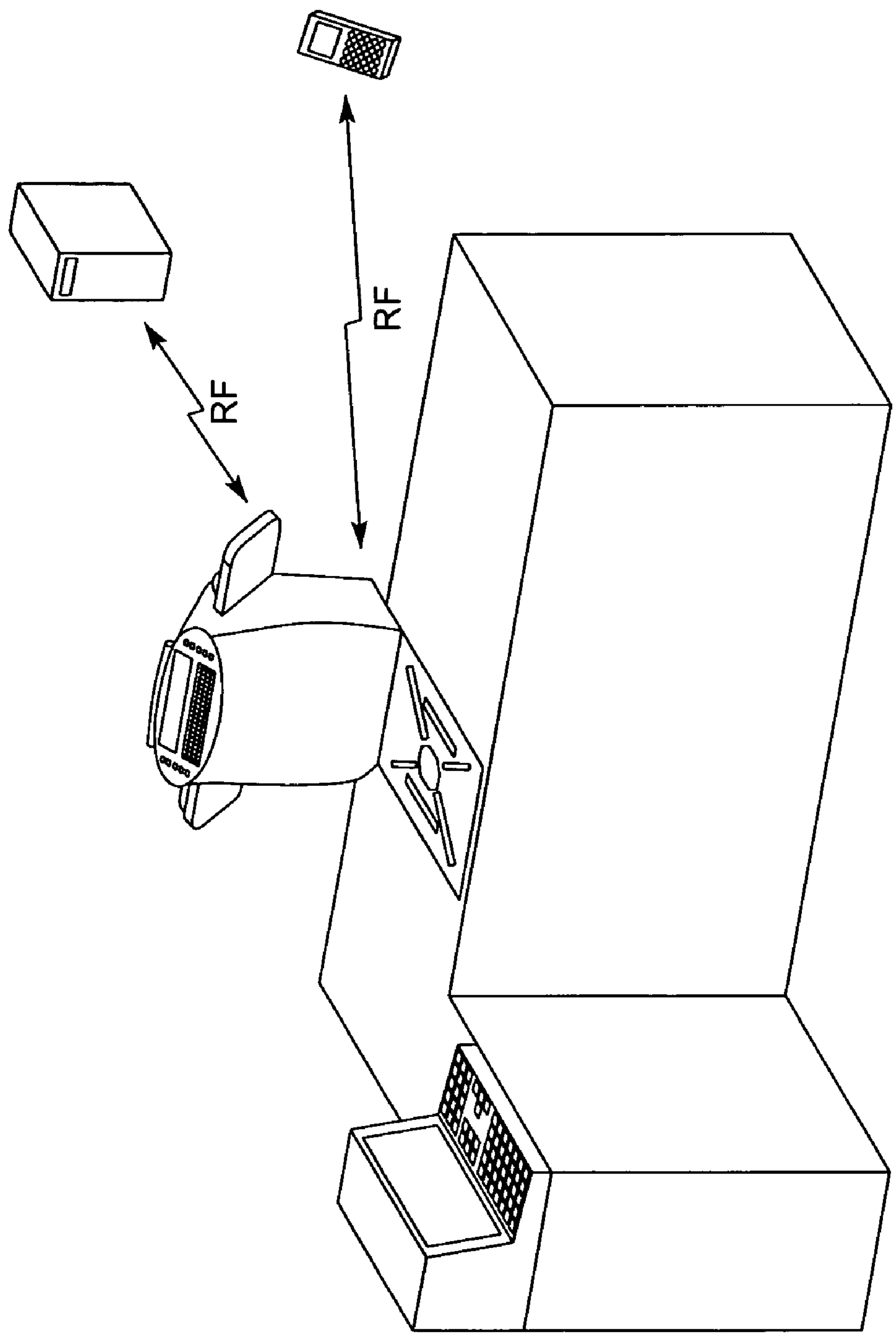
Figure 16B:
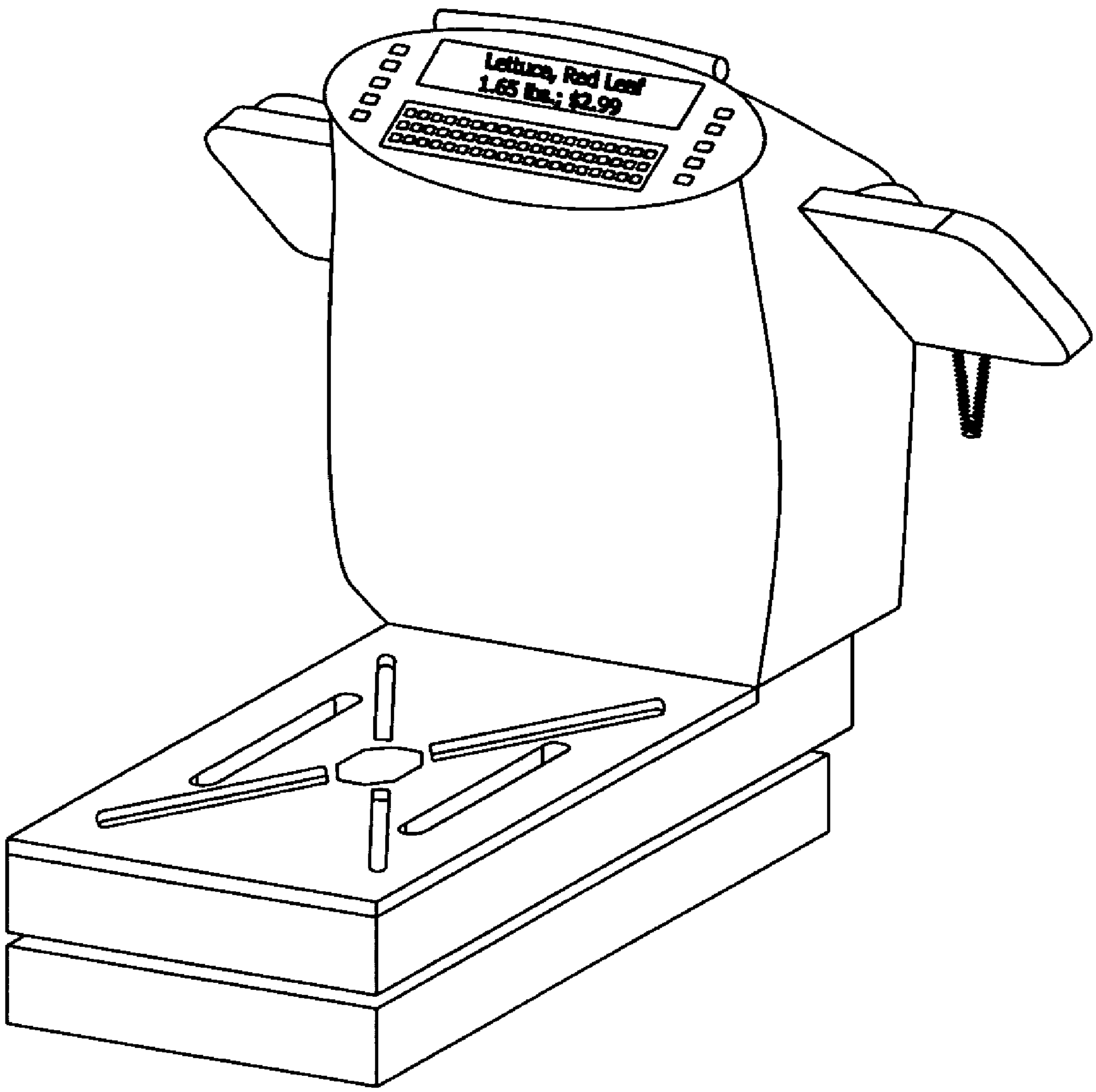
Figure 16C:
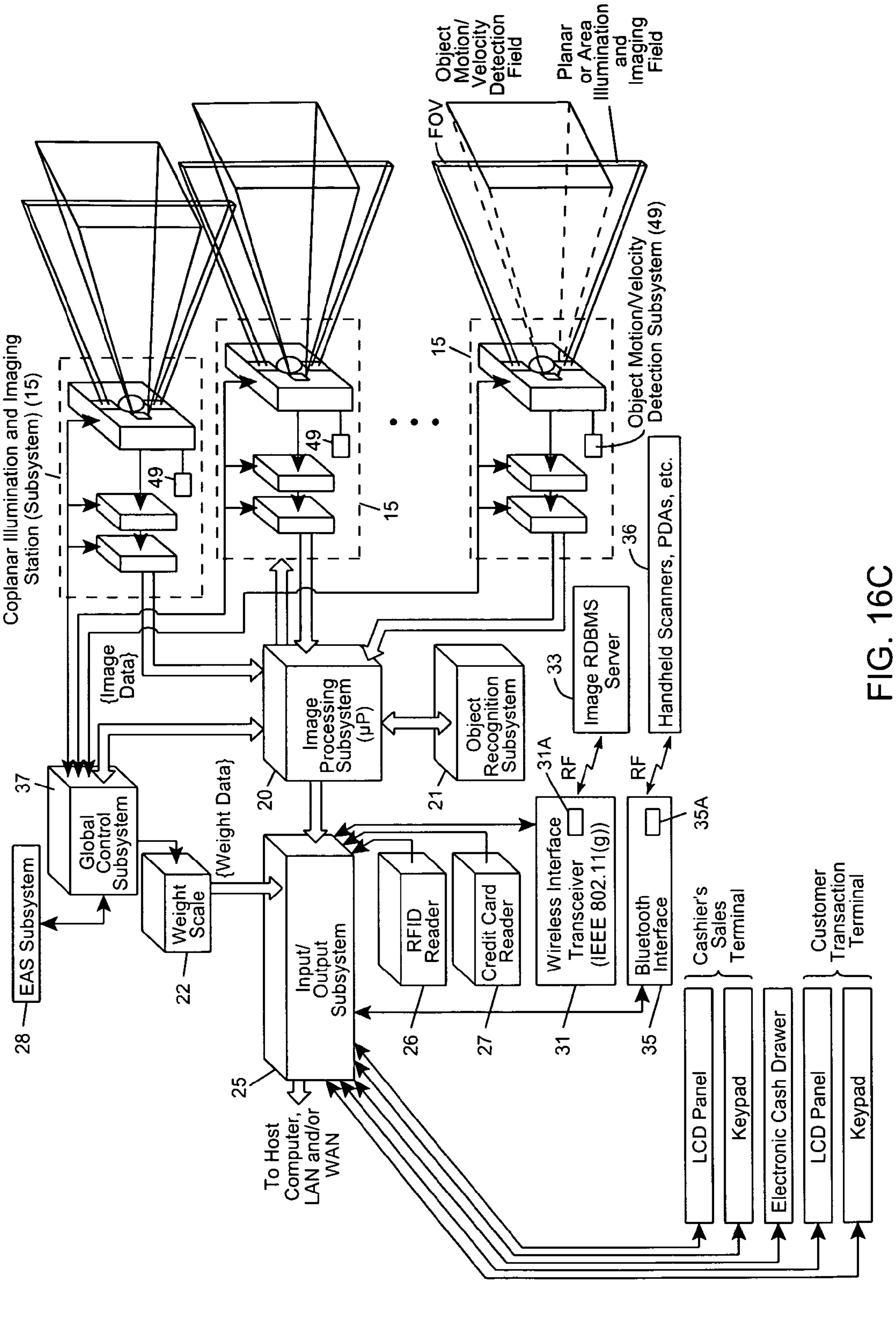
Figure 17A:
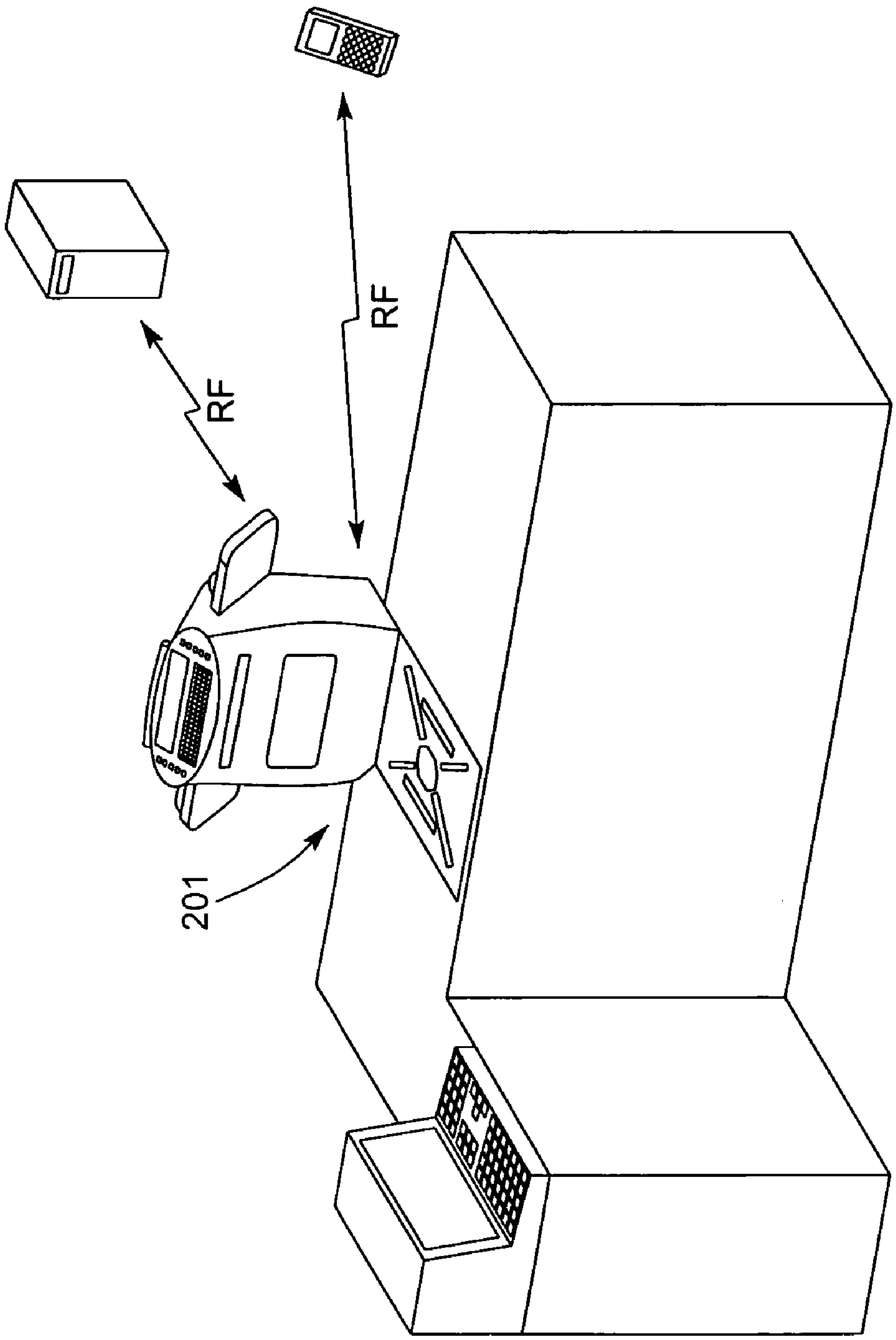
Figure 17B:
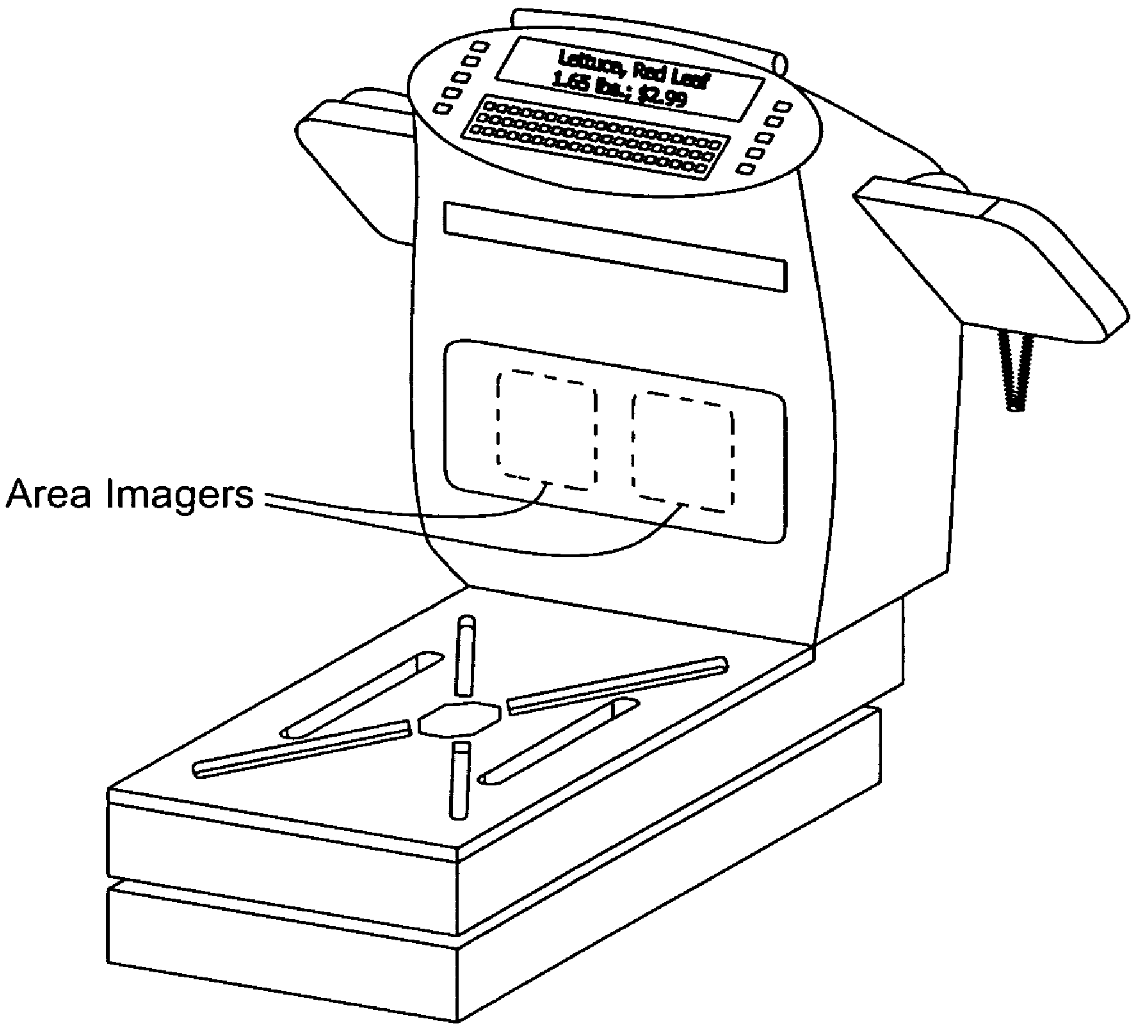
Figure 17C:
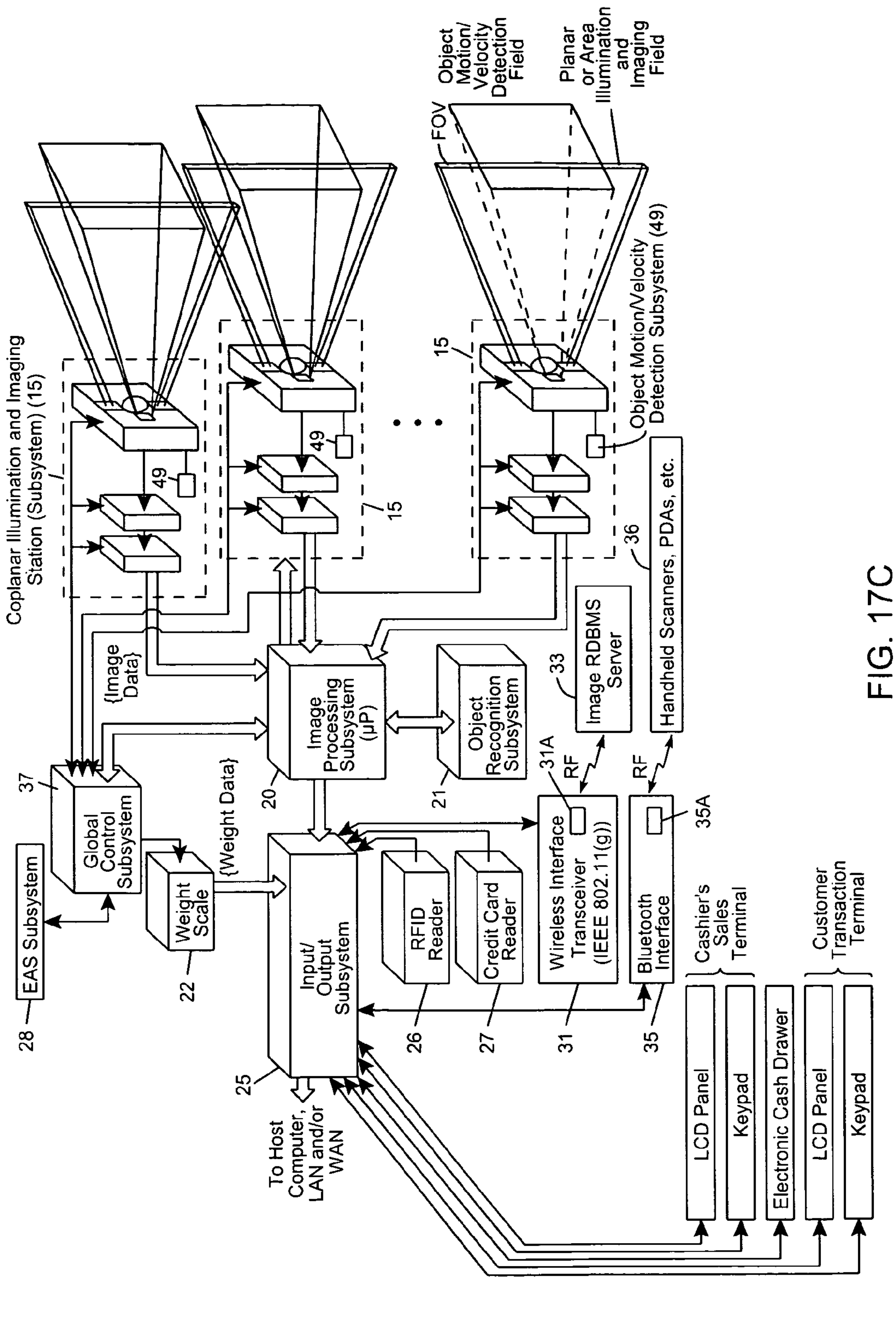
Figure 18A:
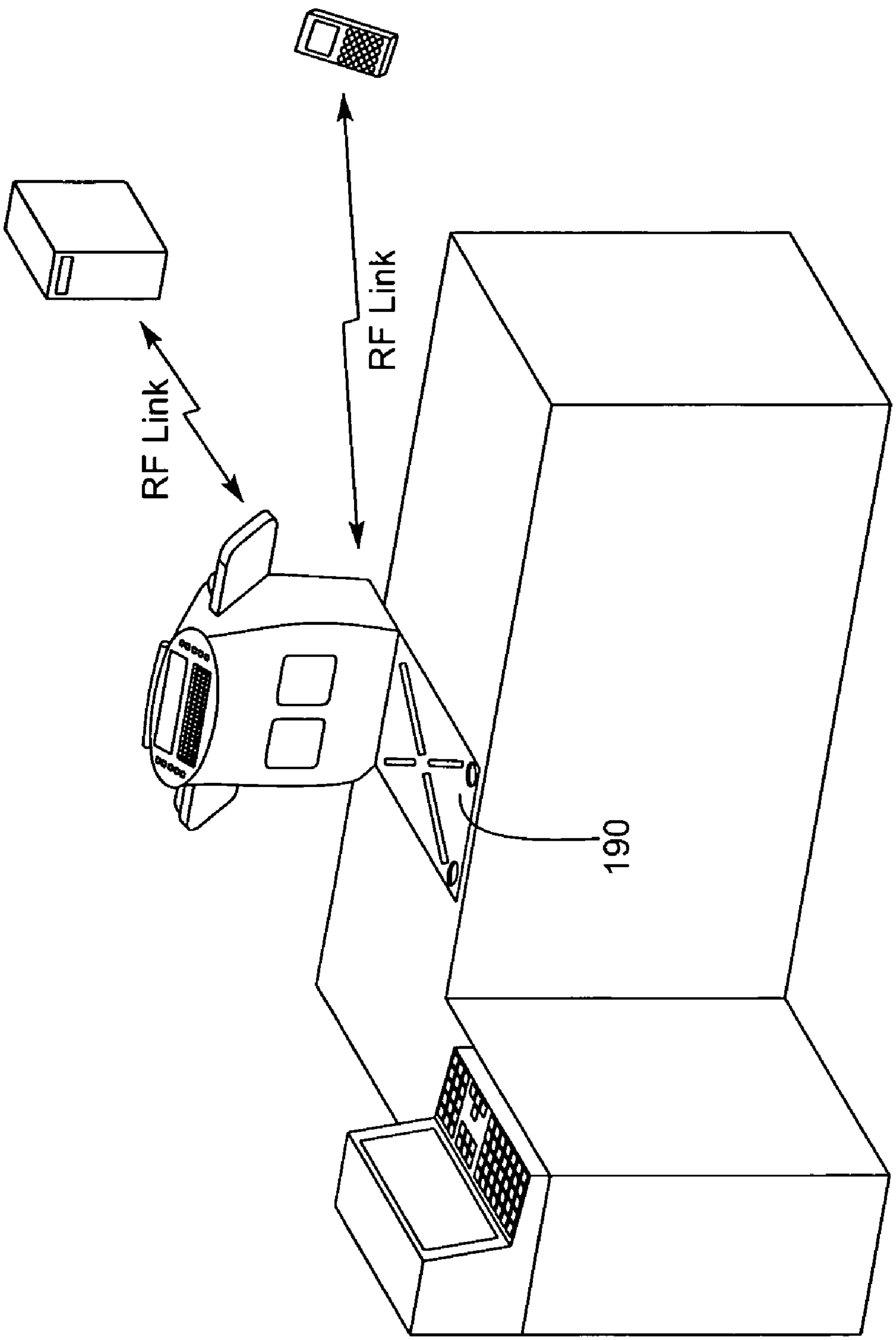
Figure 18B:
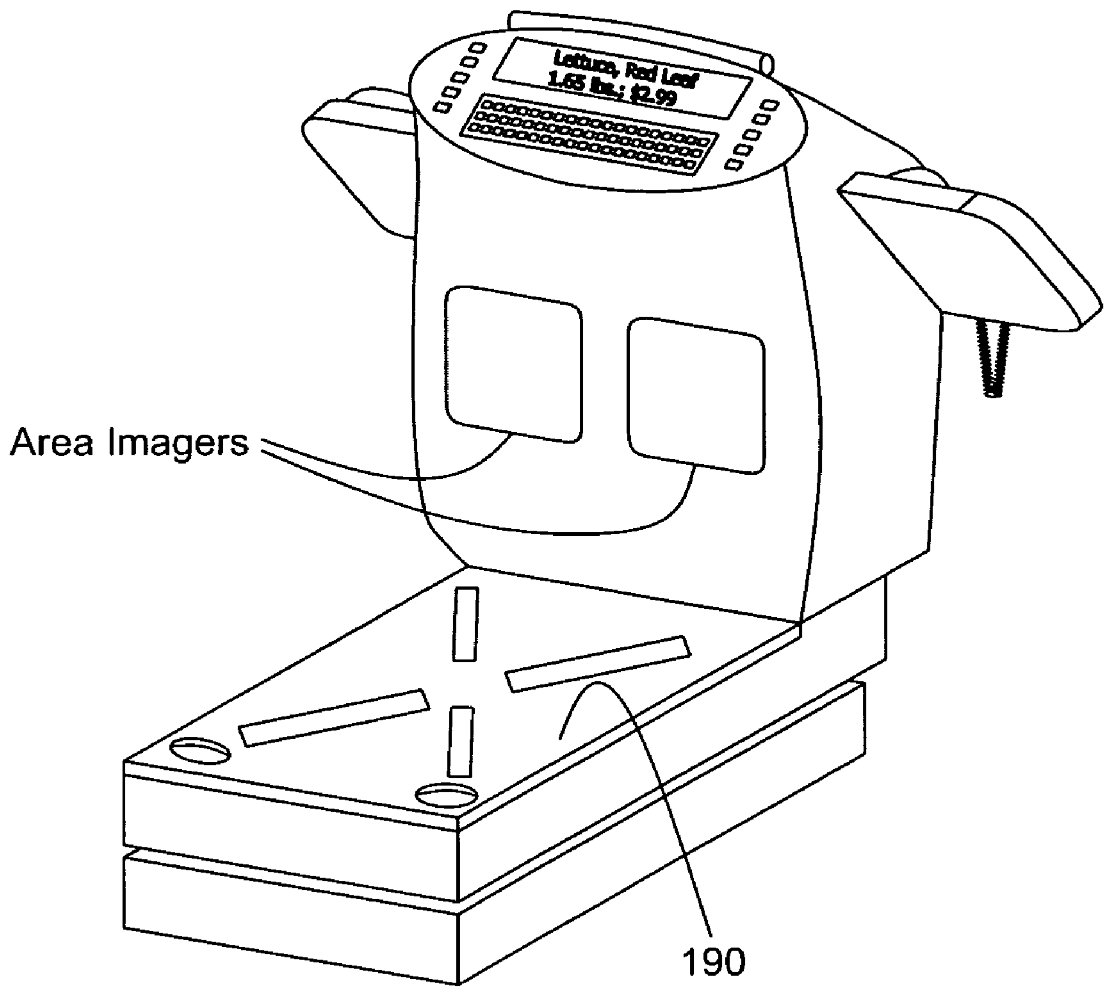
Figure 18C:
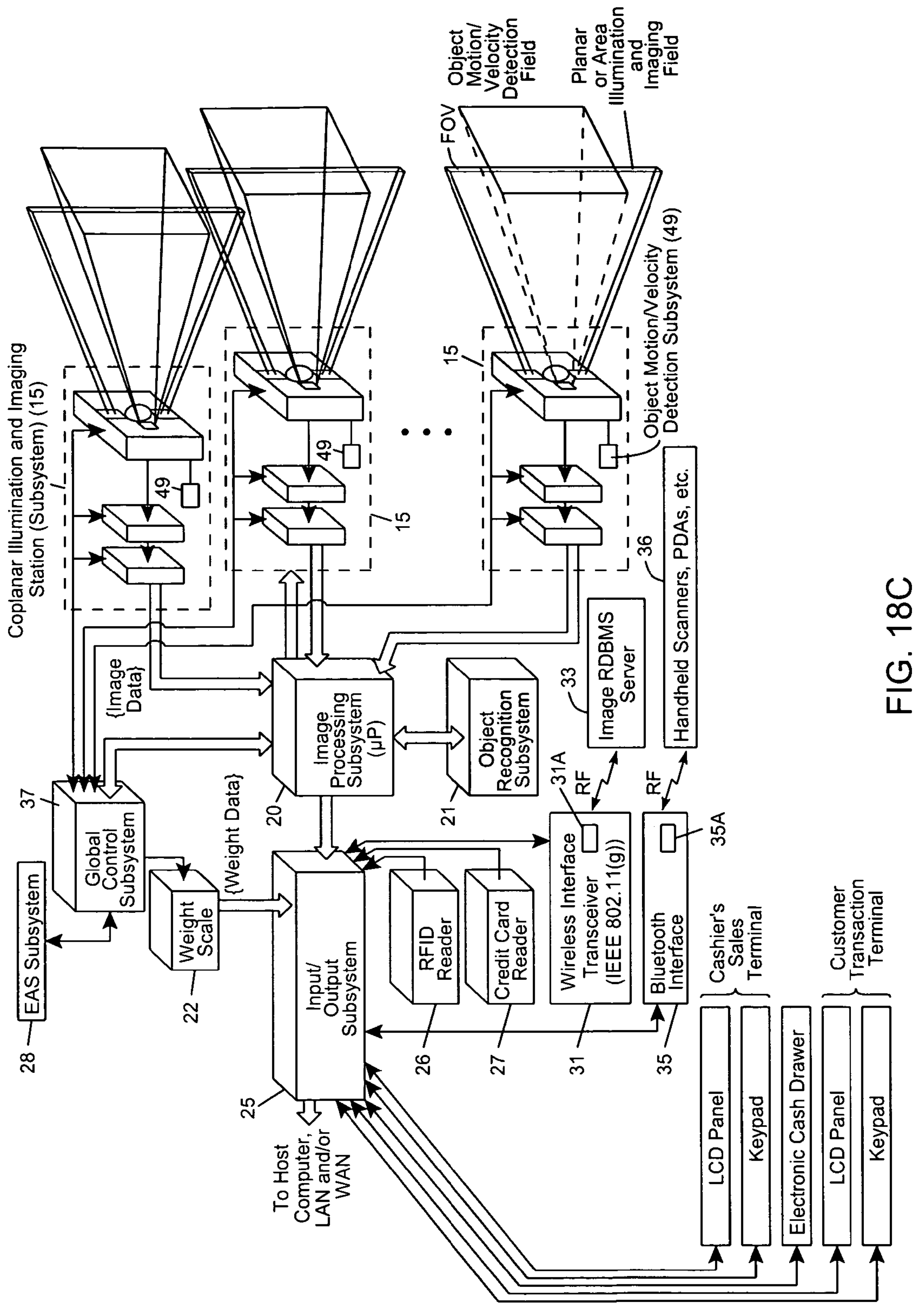

12A, shown comprising an area-type image acquisition subsystem and an embedded digital signal processing (DSP) chip to support high-speed digital image capture and (local) processing operations required for real-time object motion/velocity detection;

FIG. 12D1 is a state transition diagram for the omni-directional image capturing and processing based bar code symbol reading system described in FIG. 12B, running the system control program generally described in FIG. 6E1;

FIG. 12D2 is a state transition diagram for the omni-directional image capturing and processing based bar code symbol reading system described in FIG. 12B, running the system control program generally described in FIG. 6E2;

FIG. 12D3 is a state transition diagram for the omni-directional image capturing and processing based bar code symbol reading system described in FIG. 12B, running the system control program generally described in FIG. 6E3;

FIG. 12E is a schematic diagram describing an exemplary embodiment of a computing and memory architecture platform for implementing the omni-directional image capturing and processing based bar code symbol reading system described FIG. 12;

FIG. 12F is a schematic representation of a three-tier software architecture that can run upon the computing and memory architecture platform of FIG. 12E, so as to implement the functionalities of the omni-directional image capturing and processing based bar code symbol reading system described FIG. 12;

FIG. 13 is a perspective view of an tenth illustrative embodiment of the omni-directional image capturing and processing based bar code symbol reading system of the present invention, shown comprising both a horizontal housing section with a complex of coplanar linear illumination and imaging stations, and a vertical housing station with a pair of laterally-spaced area-type illumination and imaging stations and a coplanar linear illumination and imaging station, for aggressively supporting both “pass-through” as well as “presentation” modes of bar code image capture;

FIG. 13A is a block schematic representation of the omni-directional image capturing and processing based bar code symbol reading system of FIG. 13, wherein the complex of coplanar illuminating and linear imaging stations as substantially shown in FIGS. 5, 6A, 6A', 7, 8A or 8B are mounted within the horizontal section for projecting a first complex of coplanar illumination and imaging planes from its horizontal imaging window, and wherein the pair of area-type illumination and imaging stations are mounted in the vertical section for projecting a pair of laterally-spaced area-type illumination and imaging fields (i.e. zones) into the 3D imaging volume of the system, in combination with the horizontally-extending coplanar illumination and imaging plane projected from the coplanar illumination and imaging station mounted in the vertical housing section;

FIG. 13B1 is a block schematic representation of one of the area-type illumination and imaging stations employed in the system embodiment of FIG. 13A, showing its linear (planar) illumination array, its linear-type image formation and detection subsystem, its image capturing and buffering subsystem, its high-speed imaging based object motion/velocity sensing subsystem, and its local control subsystem;

FIG. 13B2 is a block schematic representation of one of the area-type illumination and imaging stations employed in the system embodiment of FIG. 13A, showing its area illumination array, its area-type image formation and detection subsystem, its image capturing and buffering subsystem, its high-speed imaging based object motion/velocity sensing subsystem, and its local control subsystem;

FIG. 13C1 is a block schematic representation of the high-speed imaging-based object motion/velocity detection subsystem employed at each coplanar linear-based illumination and imaging station supported by the system of FIG. 13A, shown comprising a linear-type image acquisition subsystem and an embedded digital signal processing (DSP) chip to support high-speed digital image capture and (local) processing operations required for real-time object motion/velocity detection;

FIG. 13C2 is a block schematic representation of the high-speed imaging-based object motion/velocity detection subsystem employed at each area-based illumination and imaging station supported by the system of FIG. 13A, shown comprising an area-type image acquisition subsystem and an embedded digital signal processing (DSP) chip to support high-speed digital image capture and (local) processing operations required for real-time object motion/velocity detection;

FIG. 13D1 is a state transition diagram for the omni-directional image capturing and processing based bar code symbol reading system described in FIG. 13B, running the system control program generally described in FIG. 6E1;

FIG. 13D2 is a state transition diagram for the omni-directional image capturing and processing based bar code symbol reading system described in FIG. 13B, running the system control program generally described in FIG. 6E2;

FIG. 13D3 is a state transition diagram for the omni-directional image capturing and processing based bar code symbol reading system described in FIG. 13B, running the system control program generally described in FIG. 6E3;

FIG. 13E is a schematic diagram describing an exemplary embodiment of a computing and memory architecture platform for implementing the omni-directional image capturing and processing based bar code symbol reading system described FIG. 13;

FIG. 13F is a schematic representation of a three-tier software architecture that can run upon the computing and memory architecture platform of FIG. 13E, so as to implement the functionalities of the omni-directional image capturing and processing based bar code symbol reading system described FIG. 13;

FIG. 14 is a perspective view of a eleventh illustrative embodiment of the omni-directional image capturing and processing based bar code symbol reading system of the present invention, shown comprising a horizontal housing section with a complex of coplanar linear illumination and imaging stations, and a single area-type illumination and imaging station, for aggressively supporting both “pass-through” as well as “presentation” modes of bar code image capture;

FIG. 14A is a block schematic representation of the omni-directional image capturing and processing based bar code symbol reading system of FIG. 14, wherein the complex of coplanar laser illuminating and linear imaging stations as substantially shown in FIGS. 5, 6A, 6A', 7, 8A or 8B are mounted within the horizontal section for projecting a first complex of coplanar illumination and imaging planes from its horizontal imaging window, and wherein the area-type illumination and imaging station is centrally-mounted in the horizontal section for projecting an area-type illumination and imaging field (i.e. zone) into the 3D imaging volume of the system;

FIG. 14B1 is a block schematic representation of one of the area-type illumination and imaging stations employed in the system embodiment of FIG. 14A, showing its planar illumination array, its linear-type image formation and detection subsystem, its image capturing and buffering subsystem, its high-speed imaging based object motion/velocity sensing subsystem, and its local control subsystem;

FIG. 14B2 is a block schematic representation of one of the area-type illumination and imaging stations employed in the system embodiment of FIG. 14A, showing its area illumination array, its area-type image formation and detection subsystem, its image capturing and buffering subsystem, its high-speed imaging based object motion/velocity sensing subsystem, and its local control subsystem;

FIG. 14C1 is a block schematic representation of the high-speed imaging-based object motion/velocity detection subsystem employed at each coplanar linear-based illumination and imaging station supported by the system of FIG. 14A, shown comprising an area-type image acquisition subsystem and an embedded digital signal processing (DSP) chip to support high-speed digital image capture and (local) processing operations required for real-time object motion/velocity detection;

FIG. 14C2 is a block schematic representation of the high-speed imaging-based object motion/velocity detection subsystem employed at each area-based illumination and imaging station supported by the system of FIG. 14A, shown comprising an area-type image acquisition subsystem and an embedded digital signal processing (DSP) chip to support high-speed digital image capture and (local) processing operations required for real-time object motion/velocity detection;

FIG. 14D1 is a state transition diagram for the omni-directional image capturing and processing based bar code symbol reading system described in FIG. 14B, running the system control program generally described in FIG. 6E1;

FIG. 14D2 is a state transition diagram for the omni-directional image capturing and processing based bar code symbol reading system described in FIG. 13B, running the system control program described in FIG. 6E2;

FIG. 14D3 is a state transition diagram for the omni-directional image capturing and processing based bar code symbol reading system described in FIG. 14B, running the system control program generally described in FIG. 6E3;

FIG. 14E is a schematic diagram describing an exemplary embodiment of a computing and memory architecture platform for implementing the omni-directional image capturing and processing based bar code symbol reading system described FIG. 14;

FIG. 14F is a schematic representation of a three-tier software architecture that can run upon the computing and memory architecture platform of FIG. 14E, so as to implement the functionalities of the omni-directional image capturing and processing based bar code symbol reading system described FIG. 14;

FIG. 15 is a perspective view of a twelfth illustrative embodiment of the omni-directional digital image capturing and processing based bar code symbol reading system of the present invention, shown comprising both a horizontal housing section with a first pair of laterally-spaced area-type illumination and imaging stations, and a vertical housing station with a second pair of laterally-spaced area-type illumination and imaging stations, for supporting both "pass-through" as well as "presentation" modes of bar code image capture;

FIG. 15A is a block schematic representation of the omni-directional image capturing and processing based bar code symbol reading system of FIG. 15, wherein the first pair of area-type illuminating and imaging stations are mounted within the horizontal section for projecting a first pair of coextensive area-type illumination and imaging fields (i.e. zones) from its horizontal imaging window into the 3D imaging volume of the system using both a dynamically/adaptively controlled mixture of visible/IR illumination, and wherein the second pair of area-type illumination and imaging stations are mounted in the vertical section for projecting a second pair of laterally-spaced area-type illumination and imaging fields (i.e. zones) into the 3D imaging volume of the system, also using both a dynamically/adaptively controlled mixture of visible/IR illumination as well as automatic object motion detection for intelligent illumination control at POS environments;

FIG. 15B is a block schematic representation of one of the coextensive area-type illumination and imaging stations employed in the system embodiment of FIG. 15A, showing its VLD/IR-VD-based area illumination array, its area-type image formation and detection subsystem, its image capturing and buffering subsystem, its high-speed imaging based object motion/velocity sensing subsystem, and its local control subsystem supporting, among other things, the method of dynamically/adaptively controlling visible/IR illumination illustrated in FIGS. 5E2, 5F2 and 5G2, as well as the method of intelligently controlling illumination using automatic object motion/velocity detection illustrated in FIGS. 6G1A through 6G3B;

FIG. 15C is a block schematic representation of the high-speed imaging-based object motion/velocity detection subsystem employed at each area-based illumination and imaging station supported by the system of FIG. 15A, shown comprising an area-type image acquisition subsystem and an embedded digital signal processing (DSP) chip to support high-speed digital image capture and (local) processing operations required for real-time object motion/velocity detection;

FIG. 15D1 is a state transition diagram for the omni-directional image capturing and processing based bar code symbol reading system described in FIG. 15B, running the system control program generally described in FIG. 6E1;

FIG. 15D2 is a state transition diagram for the omni-directional image capturing and processing based bar code symbol reading system described in FIG. 15B, running the system control program generally described in FIG. 6E2;

FIG. 15D3 is a state transition diagram for the omni-directional digital image capturing and processing based bar code symbol reading system described in FIG. 15B, running the system control program generally described in FIG. 6E3;

FIG. 15E is a schematic diagram describing an exemplary embodiment of a computing and memory architecture platform for implementing the omni-directional image capturing and processing based bar code symbol reading system described FIG. 15;

FIG. 15F is a schematic representation of a three-tier software architecture that can run upon the computing and memory architecture platform of FIG. 15E, so as to implement the functionalities of the omni-directional image capturing and processing based bar code symbol reading system described FIG. 15;

FIG. 16A is a perspective view of a first illustrative embodiment of the retail point of sale (POS) station of the present invention having a countertop surface, in which a POS-centric digital imaging system of the present invention is mounted, and embodying (i) the omni-directional digital image capturing and processing subsystem of FIG. 14 within its horizontal housing section, and (ii) a cashier/customer terminal integrated within the vertical section of the system housing, to simultaneously support cashier product scanning/imaging and checkout operations on the cashier side of the system, and customer payment, advertising and other services on the customer side of the system;

FIG. 16B is a perspective view of the POS-centric digital imaging system of the present invention shown in FIG. 16A, removed from the countertop surface of the POS station;

FIG. 16C is a block schematic representation of the POS-centric digital image capturing and processing system of FIG. 16A, shown comprising its area-type illumination and imaging stations, an image processing subsystem, a global control subsystem, an I/O subsystem, object recognition subsystem, cashier's sales terminal and customer transaction terminal;

FIG. 17A is a perspective view of a second illustrative embodiment of the retail point of sale (POS) station of the present invention having a countertop surface, in which a POS-centric digital imaging system of the present invention is mounted, and embodying (i) the omni-directional digital image capturing and processing subsystem of FIG. 13 within its horizontal and vertical housing sections, and (ii) a cashier/customer terminal is integrated within the vertical section of the system housing, to simultaneously support cashier product scanning/imaging and checkout operations on the cashier side of the system, and customer payment, advertising and other services on the customer side of the system;

FIG. 17B is a perspective view of the POS-centric digital imaging system of the present invention shown in FIG. 17A, removed from the countertop surface of the POS station;

FIG. 17C is a block schematic representation of the POS-centric digital image capturing and processing system of FIG. 17A, shown comprising its area-type illumination and imaging stations, an image processing subsystem, a global control subsystem, an I/O subsystem, object recognition subsystem, cashier's sales terminal and customer transaction terminal;

FIG. 18A is a perspective view of a second illustrative embodiment of the retail point of sale (POS) station of the present invention having a countertop surface, in which a POS-centric digital imaging system of the present invention is mounted, and embodying (i) the omni-directional digital image capturing and processing subsystem of FIG. 15 within its horizontal and vertical housing sections, and (ii) a cashier/customer terminal is integrated within the vertical section of the system housing, to simultaneously support cashier product scanning/imaging and checkout operations on the cashier side of the system, and customer payment, advertising and other services on the customer side of the system;

FIG. 18B is a perspective view of the POS-centric digital imaging system of the present invention shown in FIG. 18A, removed from the countertop surface of the POS station; and FIG. 18C is a block schematic representation of the POS-centric digital image capturing and processing system of FIG. 18A, shown comprising its area-type illumination and imaging stations, an image processing subsystem, a global control subsystem, an I/O subsystem, object recognition subsystem, cashier's sales terminal and customer transaction terminal.

DETAILED DESCRIPTION OF THE ILLUSTRATIVE EMBODIMENTS OF THE PRESENT INVENTION

Referring to the figures in the accompanying Drawings, the various illustrative embodiments of the illumination and imaging apparatus and methodologies of the present invention will be described in great detail, wherein like elements will be indicated using like reference numerals.

Overview Of Coplanar Illumination and Imaging System And Methodologies Of The Present Invention In the illustrative embodiments, the illumination and imaging apparatus of the present invention is realized in the form of an advanced, omni-directional image capturing and processing based bar code symbol reading system 10 that can be deployed in various application environments, including but not limited to retail point of sale (POS) stations 1, as shown in FIGS. 1 through 5F. As will be described in greater detail below, in some embodiments of the present invention, the system will include only a horizontally-mounted housing, as shown in FIGS. 1 through 7H; in other embodiments, the system will include only a vertically-mounted housing; and yet in other embodiments, the system of the present invention will include both horizontal and vertically mounted housing sections, connected together in an L-shaped manner, as shown in FIGS. 8A through 14I. All such embodiments of the present invention, the system will include at least one imaging window 13, from which a complex of coplanar illumination and imaging planes 14 (shown in FIGS. 3G through 3H) are automatically generated from a complex of coplanar illumination and imaging stations 15A through 15F mounted beneath the imaging window of the system, and projected within a 3D imaging volume 16 defined relative to the imaging window 17.

As shown in FIG. 2, the system 10 includes a system housing having an optically transparent (glass) imaging window 13, preferably, covered by an imaging window protection plate 17 which is provided with a pattern of apertures 18. These apertures permit the projection of a plurality of coplanar illumination and imaging planes from the complex of coplanar illumination and imaging stations 15A through 15F. In the illustrative embodiments disclosed herein, the system housing has a below counter depth not to exceed 3.5" (89 mm) so as to fit within demanding POS countertop environments.

The primary function of each coplanar illumination and imaging station in the system, indicated by reference numeral 15 and variants thereof in the figure drawings, is to capture digital linear (1D) or narrow-area images along the field of view (FOV) of its coplanar illumination and imaging planes using laser or LED-based illumination, depending on the system design. These captured digital images are then buffered and decode-processed using linear (1D) type image capturing and processing based bar code reading algorithms, or can be assembled together to reconstruct 2D images for decode-processing using 1D/2D image processing based bar code reading techniques, as taught in Applicants' U.S. Pat. No. 7,028,899 B2, incorporated herein by reference.

In general, the omni-directional image capturing and processing system of the present invention 10 comprises a complex of coplanar and/or coextensive illuminating and imaging stations, constructed using (i) VLD-based and/or LED-based illumination arrays and linear and/area type image sensing arrays, and (ii) real-time object motion/velocity detection technology embedded within the system architecture so as to enable: (1) intelligent automatic illumination control within the 3D imaging volume of the system; (2) automatic image formation and capture along each coplanar illumination and imaging plane therewithin; and (3) advanced automatic image processing operations supporting diverse kinds of value-added information-based services delivered in diverse end-user environments, including retail POS environments as well as industrial environments.

Figure 5A:
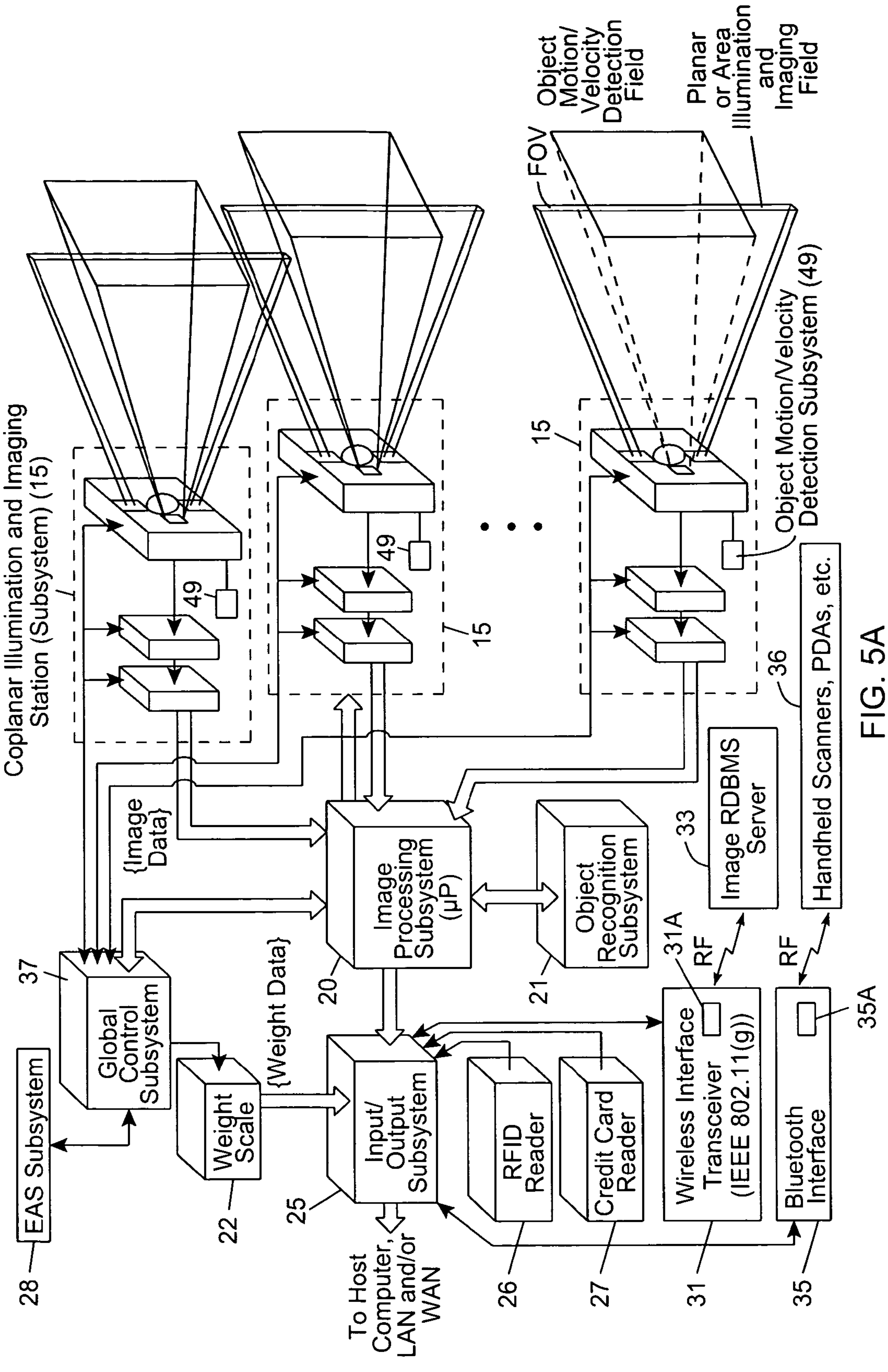
FIG. 5A is a block schematic representation of a generalized embodiment of the omni-directional image capturing and processing system of the present invention, comprising a complex of coplanar illuminating and linear imaging stations, constructed using VLD-based or LED-based illumination arrays and linear and/area type image sensing arrays, and real-time object motion/velocity detection techniques for enabling intelligent automatic illumination control within its 3D imaging volume, as well as automatic image formation and capture along each coplanar illumination and imaging plane therewithin.

As shown in the system diagram of FIG. 5A, the omni-directional image capturing and processing system of the present invention 10 generally comprises: a complex of coplanar illuminating and linear imaging stations 15, constructed using the illumination arrays and linear image sensing array technology; an multi-processor multi-channel image processing subsystem 20 for supporting automatic image processing based bar code symbol reading and optical character recognition (OCR) along each coplanar illumination and imaging plane, and corresponding data channel within the system; a software-based object recognition subsystem 21, for use in cooperation with the image processing subsystem 20, and automatically recognizing objects (such as vegetables and fruit) at the retail POS while being imaged by the system; an electronic weight scale module 22 employing one or more load cells 23 positioned centrally below the system's structurally rigid platform 24, for bearing and measuring substantially all of the weight of objects positioned on the window 13 or window protection plate 17, and generating electronic data representative of measured weight of such objects; an input/output subsystem 25 for interfacing with the image processing subsystem 20, the electronic weight scale 22, RFID reader 26, credit-card reader 27 and Electronic Article Surveillance (EAS) Subsystem 28 (including a Sensormatic® EAS tag deactivation block 29 integrated in system housing 30, and a Checkpoint® EAS antenna installed within the retail or work environment); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 35A for connecting to Bluetooth® enabled hand-held scanners, imagers, PDAs, portable computers and the like 36, for control, management, application and diagnostic purposes; and a global control subsystem 37 for controlling (i.e. orchestrating and managing) the operation of the coplanar illumination and imaging stations (i.e. subsystems) 15, electronic weight scale 22, and other subsystems. As shown, each illumination and imaging subsystem 15A through 15F transmits frames of digital image data to the image processing subsystem 20, for state-dependent image processing and the results of the image processing operations are transmitted to the host system via the input/output subsystem 25.

Figure 5B:
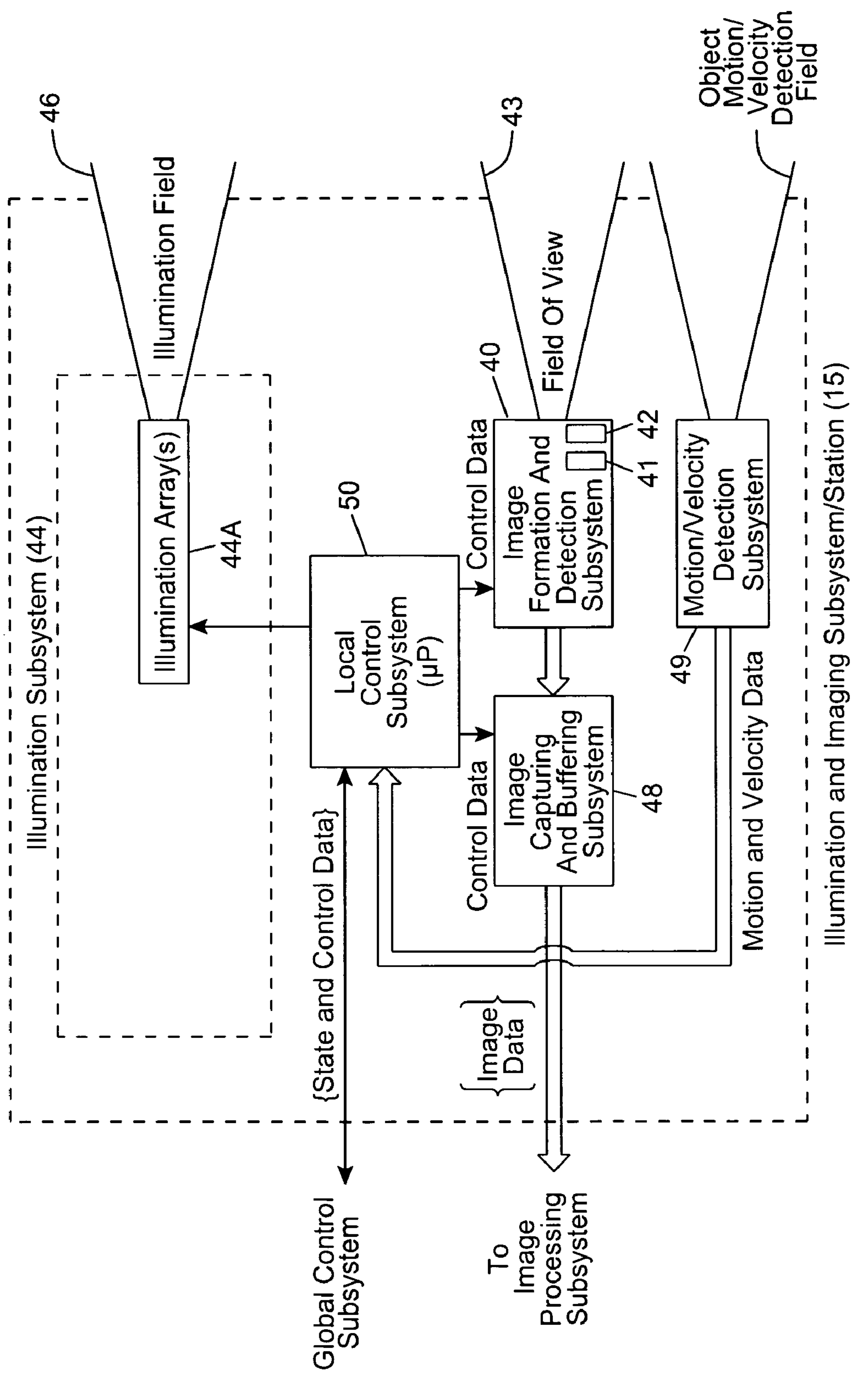
FIG. 5B is a block schematic representation of a coplanar or coextensive illumination and imaging subsystem (i.e. station) employed in the generalized embodiment of the omni-directional image capturing and processing system of FIG. 5A, comprising an image formation and detection subsystem having an image sensing array and optics providing a field of view (FOV) on the image sensing array, an illumination subsystem producing a field of illumination that is substantially coplanar or coextensive with the FOV of the image sensing array, an image capturing and buffering subsystem for capturing and buffering images from the image sensing array, an automatic object motion/velocity detection subsystem for automatically detecting the motion and velocity of an object moving through at least a portion of the FOV of the image sensing array, and a local control subsystem for controlling the operations of the subsystems within the illumination and imaging station.

As shown in FIG. 5B, the coplanar or coextensive illumination and imaging subsystem (i.e. station 15), employed in the system of FIG. 5A, comprises: an image formation and detection subsystem 41 having a linear or area type of image sensing array 41 and optics 42 providing a field of view (FOV) 43 on the image sensing array; an illumination subsystem 44 having one or more LED and/or VLD based illumination arrays 45 for producing a field of illumination 46 that is substantially coplanar or coextensive with the FOV 43 of the image sensing array 41; an image capturing and buffering subsystem 48 for capturing and buffering images from the image sensing array 41; an automatic object motion/velocity detection subsystem 49, either locally or globally deployed with respect to the local control subsystem of the station, for (i) automatically detecting the motion and/or velocity of objects moving through at least a portion of the FOV of the image sensing array 41, and (ii) producing motion and/or velocity data representative of the measured motion and velocity of the object; and a local control subsystem 50 for controlling the operations of the subsystems within the illumination and imaging stations.

In the illustrative embodiments of the present invention disclosed herein and to be described in greater detail hereinbelow, each coplanar illumination and imaging station 15 has an (i) Object Motion and Velocity Detection Mode (State) of operation which supports real-time automatic object motion and velocity detection, and also (ii) a Bar Code Reading Mode (State) of operation which supports real-time automatic image capturing and processing based bar code symbol reading. In some illustrative embodiments of the present invention, the Object Motion/Velocity Detection State of operation is supported at the respective coplanar illumination and imaging stations using its local control subsystem and locally provided DSP-based image and/or signal processors (i.e. subsystem 49) to compute object motion and velocity data which is used to produce control data for controlling the linear and/area image sensing arrays employed at the image formation and detection subsystems.

Forming and Detecting High-Contrast Digital Images of Objects at POS Environments using a Mixture of Visible and Invisible Illumination According the Principles of the Present Invention In order to eliminate or otherwise reduce the obnoxious effects that high levels of visible illumination (i.e. brightness, glare etc.) cause most humans at retail pos environments, it is an object of the present invention to use a mixture of visible and invisible illumination to form and detect high-contrast digital images of objects at POS environments, with little sacrifice on the image quality under specific situations. The possible embodiments of this illumination control method include, but are not limited to, fixed ratio spectrum mixture, and adaptive spectrum component control scheme.

General Types of Illumination System Designs Employing Methods of Controlling The Ratio of Visible/Invisible Spectral Energy In The Illumination Beam for Reducing Brightness to Human Operators/Viewers and Providing Sufficient Image Contrast in Captured Digital Images of Objects at the POS Environment In principle, there are two general methods of managing the ratio of visible/invisible spectral energy in the illumination beam during object illumination and imaging operations; (1) statically controlling the ratio of visible/invisible spectral energy in the illumination beam during object illumination and imaging operations; and (2) adaptively/dynamically controlling the ratio of visible/invisible spectral energy in the illumination beam during object illumination and imaging operations. These two approaches will be described in great technical detail below.

Figure 5C:
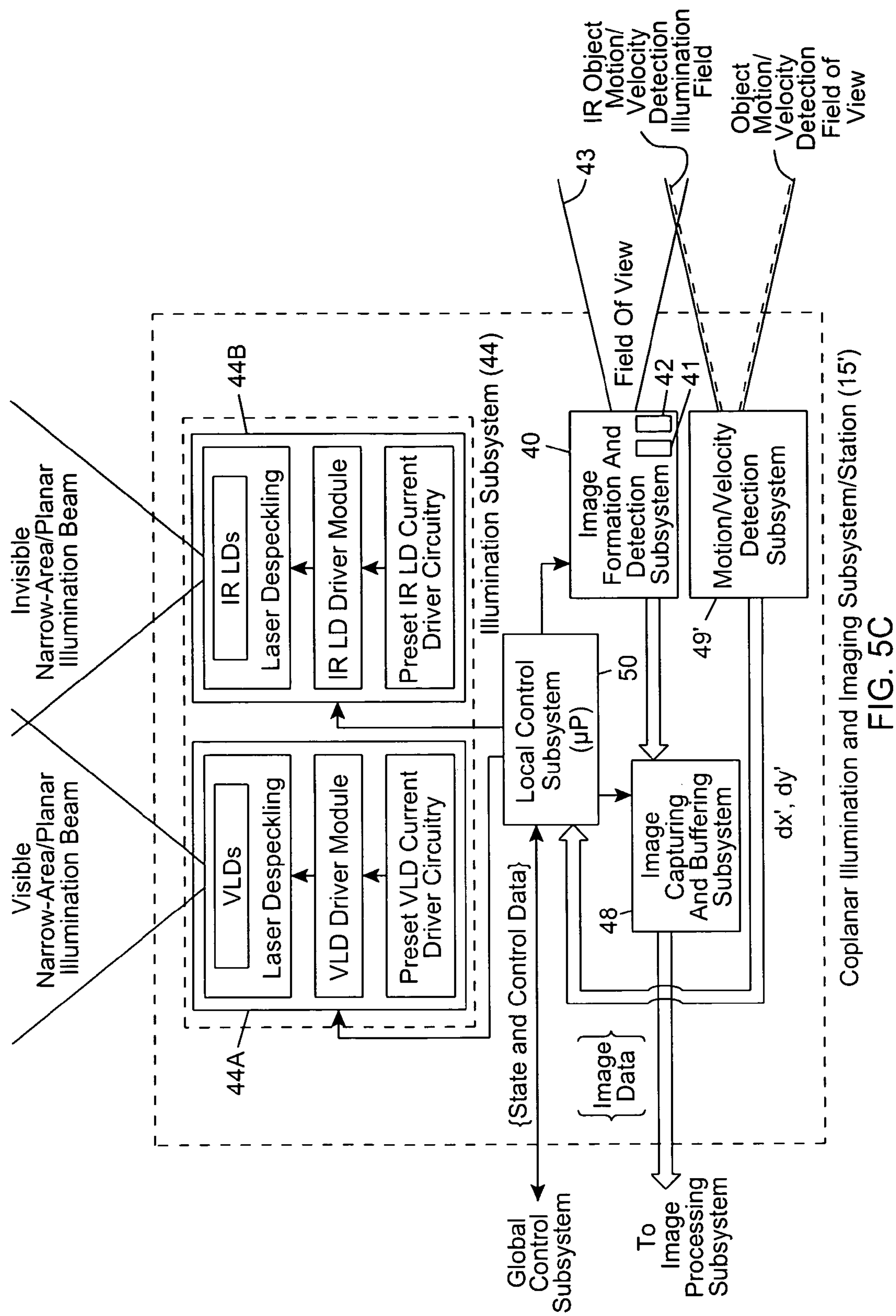
FIG. 5C is a block schematic representation of a coplanar laser illumination and imaging subsystem (i.e. station) employed in the generalized embodiment of the omni-directional image capturing and processing system of FIG. 5A, comprising (i) an image formation and detection (IFD) subsystem having a linear (1D) image sensing array (or 2D image sensing array with a narrow-area region activated for photo-integration) and optics providing a field of view (FOV) on the image sensing array, an spectral-mixing based illumination subsystem producing a first field of visible illumination (produced from an array of VLDs) and a second field of invisible illumination (produced from an array of IR LDs) that spatially overlap and spatially/temporally intermix with each other while having a preset relative power ratio (VIS/IR), and are substantially coplanar or coextensive with the FOV of the image sensing array, an integrated laser despeckling mechanism associated the IFD subsystem, (ii) an image capturing and buffering subsystem for capturing and buffering images from the image sensing array, (iii) an automatic object motion/velocity detection subsystem for automatically detecting the motion and velocity of an object moving through at least a portion of the FOV of the image sensing array, and (iv) a local control subsystem for controlling the operations of the subsystems within the illumination and imaging station.

Method of Statically Controlling the Ratio of Visible/Invisible Spectral Energy in the Illumination Beam During Object Illumination and Imaging Operations According to this first method, the ratio of visible to invisible (IR) spectral energy/power in the (planar, narrow-area or wide-area) illumination beam is maintained substantially static or fixed by controlling the current supplied to the visible laser and infrared laser diodes during object illumination and imaging operations. The static or fixed mixture ratio can be realized by setting one or several different preset values of current supplied to drive the Visible Laser Diodes (VLDs) and Infrared Laser Diodes (IRLDs), or visible LEDs and IR LEDs, or a combination thereof, in the Illumination Subsystem, as shown in FIG. 5C. Through experimentation, the visible/invisible photonic energy mixture ratio [i.e. VIS/IR] can be optimized under different operating situations, in effort to (i) satisfy the reduction of visual brightness at the POS station to ensure humans are not disturbed by the illumination field, as well as (ii) achieve sufficient image contrast in captured digital images to ensure satisfactory image processing.

Method of Adaptively/Dynamically Controlling the Ratio of Visible/Invisible Spectral Energy in the Illumination Beam During Object Illumination and Imaging Operations According to the second method, the ratio of visible to invisible (IR) spectral energy/power in the (planar, narrow-area or wide-area) illumination beam is dynamically maintained/managed by adaptively controlling the electrical current supplied to the visible and infrared diodes during object illumination and imaging operations. The ratio between visible and infrared wavelength components can be controlled by supplying different driving currents to the visible and invisible diodes (e.g. VLDs and IRLDs or visible LEDs and IR LEDs), as required to minimize visual brightness (to humans) at the POS station during object illumination and imaging operations, while achieving sufficient image contrast quality to ensure satisfactory image processing. The diode drive currents can be controlled by the following process: (i) driving the diodes with a predetermined/default values of drive currents to illuminate the object with a spectral mixture of illumination; (ii) capturing one or more digital images of the illuminated object and measuring (in real-time) image contrast quality (e.g. within the digital image processing subsystem or other programmed imaged processor) so as to generate feedback or control data; and (iii) using this feedback or control data to dynamically generate the necessary values for the adjusted diode current control signals that are used to drive the diodes and produce an optimal mixture of illumination during object illumination and imaging operations. This control process is illustrated in FIG. E2, F2 and G2 for various illustrative embodiments of the present invention.

A Coplanar Laser Illumination and Imaging Subsystem Producing Planar Illumination Beam Having a Fixed Ratio of Visible and IR Spectral Energy FIG. 5C shows illustrative embodiment of a coplanar laser illumination and imaging subsystem (i.e. station) that can be deployed in any digital image capturing and processing system of the present invention disclosed and/or taught herein. As shown, this subsystem (i.e. station) comprises: (a) an image formation and detection (IFD) subsystem having (i) an image sensing array and (ii) optics providing a field of view (FOV) on the image sensing array; (b) an spectral-mixing based illumination subsystem producing a first field of visible illumination (produced from an array of VLDs) and a second field of invisible illumination (produced from an array of IR LDs) that spatially overlap and spatially/temporally intermix with each other while having a preset relative power ratio (VIS/IR), and are substantially coplanar or coextensive with the FOV of the image sensing array; (c) an integrated laser beam despeckling mechanism associated with the IFD subsystem (as disclosed in WIPO Publication No. WO/2002/043195 or in the present Specification; (d) an image capturing and buffering subsystem for capturing and buffering images from the image sensing array; (e) an automatic object motion/velocity detection subsystem for automatically detecting the motion and velocity of an object moving through at least a portion of the FOV of the image sensing array; and (f) a local control subsystem for controlling the operations of the subsystems within the illumination and imaging station.

Figure 5D:
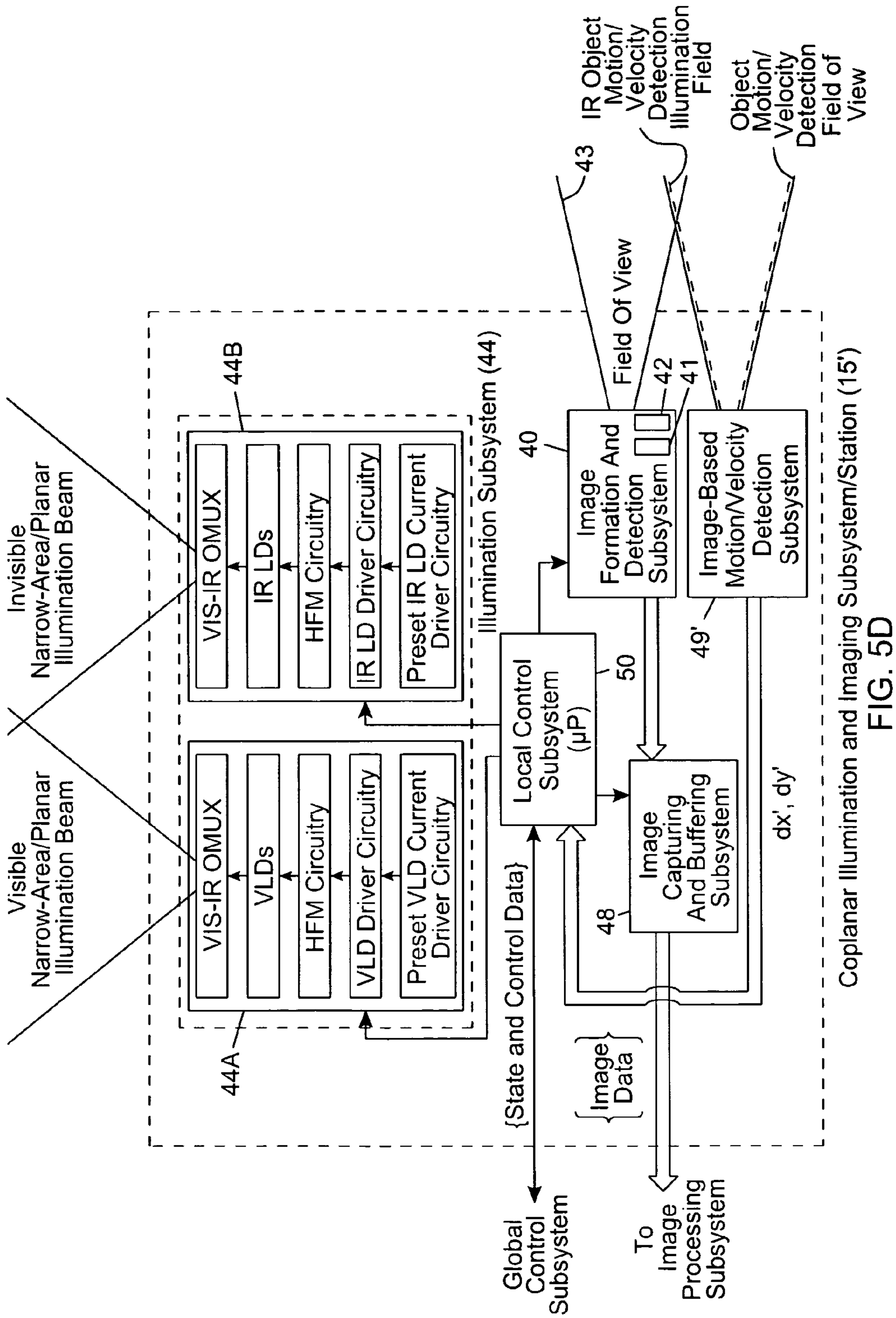
FIG. 5D is a block schematic representation of a coplanar laser illumination and imaging subsystem (i.e. station) which can be employed any digital image capturing and processing system of the present invention and comprises: an image formation and detection (IFD) subsystem having a linear (1D) image sensing array (or 2D image sensing array with a narrow-area region activated for photo-integration) and optics providing a field of view (FOV) on the image sensing array; an spectral-mixing based illumination subsystem producing a first field of visible illumination (produced from an array of VLDs) and a second field of invisible illumination (produced from an array of IR LDs) that spatially overlap and spatially/temporally intermix with each other while having a preset relative power ratio (VIS/IR), and are substantially coplanar or coextensive with the FOV of the image sensing array; an integrated laser despeckling mechanism associated the IFD subsystem using the high-frequency modulation HFM techniques of the present invention disclosed in FIGS. 5H through 5N, and optical multiplexing (OMUX) techniques of the present invention disclosed in FIGS. 5O through 5Y; an image capturing and buffering subsystem for capturing and buffering images from the image sensing array; an automatic object motion/velocity detection subsystem for automatically detecting the motion and velocity of an object moving through at least a portion of the FOV of the image sensing array; and a local control subsystem for controlling the operations of the subsystems within the illumination and imaging station.

A Coplanar Laser Illumination and Imaging Subsystem Producing Planar Illumination Beam Having a Fixed Ratio of Visible and IR Spectral Energy and Employing Integrated HFM/OMUX Despeckling Techniques for Speckle Pattern Noise Reduction FIG. 5D shows another embodiment of a coplanar laser illumination and imaging subsystem (i.e. station) that can be deployed in any digital image capturing and processing system of the present invention disclosed and/or taught herein. As shown, the subsystem (i.e. station) comprises: (a) an image formation and detection (IFD) subsystem having (i) an image sensing array and (ii) optics providing a field of view (FOV) on the image sensing array; (b) an spectral-mixing based illumination subsystem producing a first field of visible illumination (produced from an array of VLDs) and a second field of invisible illumination (produced from an array of IR LDs) that spatially overlap and spatially/temporally intermix with each other while having a preset relative power ratio (VIS/IR), and are substantially coplanar or coextensive with the FOV of the image sensing array; (c) an integrated HFM-OMUX laser despeckling mechanism associated with the IFD subsystem and employing the high-frequency modulation HFM techniques of the present invention disclosed in FIGS. 5H through 5N, and optical multiplexing (OMUX) techniques of the present invention disclosed in FIGS. 5O through 5Y; (d) an image capturing and buffering subsystem for capturing and buffering images from the image sensing array; (e) an automatic object motion/velocity detection subsystem for automatically detecting the motion and velocity of an object moving through at least a portion of the FOV of the image sensing array; and (f) a local control subsystem for controlling the operations of the subsystems within the illumination and imaging station.

A Coplanar Laser Illumination and Imaging Subsystem (I.E. Station) Producing Planar Illumination Beam Having a Fixed Ratio of Visible and IR Spectral Energy, and Employing Alternative Despeckling Techniques for Speckle Pattern Noise Reduction FIG. 5E1 shows another illustrative embodiment of a coplanar laser illumination and imaging subsystem (i.e. station) that can be deployed in any digital image capturing and processing system of the present invention disclosed and/or taught herein. As shown, the subsystem comprises: (a) an image formation and detection (IFD) subsystem having (i) an image sensing array and (ii) optics providing a field of view (FOV) on the image sensing array; (b) an spectral-mixing based illumination subsystem producing a first field of visible illumination (produced from an array of VLDs) and a second field of invisible illumination (produced from an array of IR LDs) that spatially overlap and spatially/temporally intermix with each other while having a adaptively/dynamically set relative power ratio (VIS/IR), and are substantially coplanar or coextensive with the FOV of the image sensing array; (c) an generalized integrated laser de-speckling mechanism associated with the IFD subsystem (as disclosed in WIPO Publication No. WO/2002/043195 or in the present Specification); (d) an image capturing and buffering subsystem for capturing and buffering images from the image sensing array; (e) an automatic object motion/velocity detection subsystem for automatically detecting the motion and velocity of an object moving through at least a portion of the FOV of the image sensing array; and (f) a local control subsystem for controlling the operations of the subsystems within the illumination and imaging station.

The flow chart of FIG. 5E2 describes the primary steps involved in the method of adaptively controlling the spectral composition of the planar illumination beam produced from the illumination subsystem of the coplanar laser illumination and imaging subsystem (i.e. station) illustrated in FIG. 5E1.

Coplanar Laser Illumination and Imaging Subsystem of the Present Invention Producing a Substantially Planar Illumination Beam (PLIB) Having a Dynamically/Adaptively Controlled Ratio of Visible and IR Spectral Energy, and Employing Integrated HFM/OMUX Despeckling Techniques for Speckle Pattern Noise Reduction FIG. 5D shows another embodiment of a coplanar laser illumination and imaging subsystem (i.e. station) that can be deployed in any digital image capturing and processing system of the present invention disclosed and/or taught herein. As shown, the subsystem (i.e. station comprises: (a) an image formation and detection (IFD) subsystem having (i) an image sensing array and (ii) optics providing a field of view (FOV) on the image sensing array; (b) an spectral-mixing based illumination subsystem producing a first field of visible illumination (produced from an array of VLDs) and a second field of invisible illumination (produced from an array of IR LDs) that spatially overlap and spatially/temporally intermix with each other while having a preset relative power ratio (VIS/IR), and are substantially coplanar or coextensive with the FOV of the image sensing array; (c) an integrated HFM-OMUX laser despeckling mechanism associated with the IFD subsystem and employing the high-frequency modulation HFM techniques of the present invention disclosed in FIGS. 5H through 5N and optical multiplexing (OMUX) techniques of the present invention disclosed in FIGS. 5O through 5Y); (d) an image capturing and buffering subsystem for capturing and buffering images from the image sensing array; (e) an automatic object motion/velocity detection subsystem for automatically detecting the motion and velocity of an object moving through at least a portion of the FOV of the image sensing array; and (f) a local control subsystem for controlling the operations of the subsystems within the illumination and imaging station.

The flow chart in FIG. 5F2 describes the primary steps involved in the method of adaptively controlling the spectral composition of the planar illumination beam produced from the illumination subsystem of the coplanar laser illumination and imaging subsystem (i.e. station) illustrated in FIG. 5F1.

Coextensive Area-Type Illumination and Imaging Subsystem of the Present Invention Producing Area-Type Illumination Beam Having an Adaptively/Dynamically Controlled Ratio of Visible and IR Spectral Energy Generated by LED-Based Illumination Sources FIG. 5G1 shows an illustrative embodiment of a coextensive area-type illumination and imaging subsystem (i.e. station) that can be deployed in any digital image capturing and processing system of the present invention disclosed and/or taught herein. As shown, the subsystem comprises: (a) an image formation and detection (IFD) subsystem having (i) an image sensing array and (ii) optics providing a field of view (FOV) on the image sensing array; (b) an spectral-mixing based illumination subsystem producing a first field of visible illumination (produced from an array of visible LEDs), and a second field of invisible illumination (produced from an array of IR LEDs) that spatially overlap and spatially/temporally intermix with each other while having an adaptively/dynamically set relative power ratio (VIS/IR), and are substantially coextensive with the FOV of the image sensing array; (c) an image capturing and buffering subsystem for capturing and buffering images from the image sensing array; (d) an automatic object motion/velocity detection subsystem for automatically detecting the motion and velocity of an object moving through at least a portion of the FOV of the image sensing array; and (f) a local control subsystem for controlling the operations of the subsystems within the illumination and imaging station.

The flow chart of FIG. 5G2 describes the steps involved in the method of adaptively/dynamically controlling the spectral composition of the area-type illumination beam produced from the illumination subsystem of the coextensive area-type illumination and imaging subsystem (i.e. station) illustrated in FIG. 5G1.

Figure 5H:
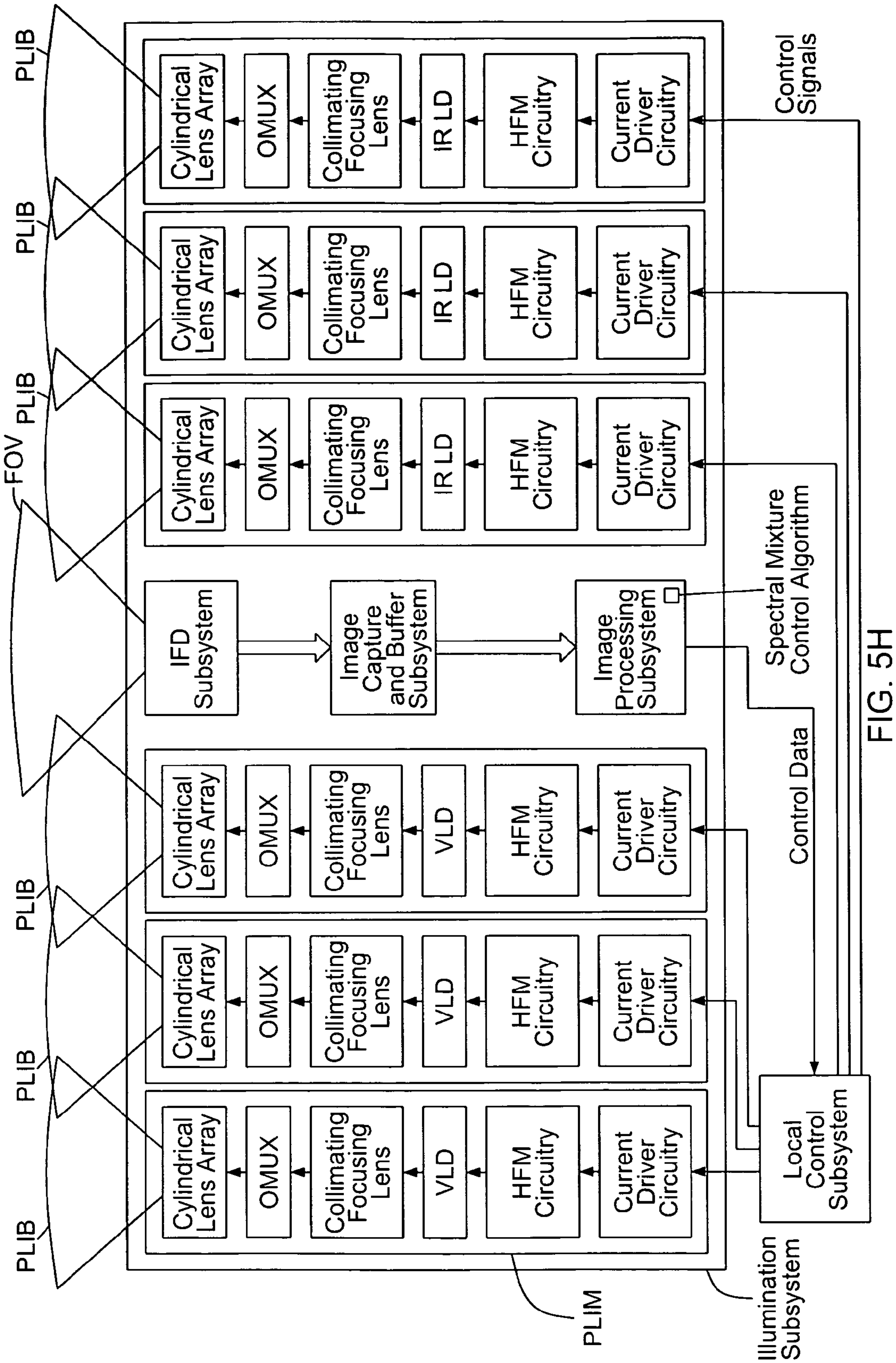
FIG. 5H is a schematic block diagram of the HFM-OMUX based Illumination Subsystem of the present invention, which produces a dynamically/adaptively managed mixture of invisible and visible illumination energy generated by a linear array of three dynamically/adaptively driven VLD-Based Planar Laser Illumination Modules (PLIMs), i.e. VLD-Based Planar Laser Illumination Array (PLIA), and three dynamically/adaptively driven channels IRLD-Based PLIMs, i.e. IRLD-based PLIA, operated under the control of the local control subsystem, in response to control data produced by the image processing subsystem running the spectral-mixture control algorithm of the present invention (FIGS. 5E2, 5F2 and 5G2)

Detailed Description of Coplanar Laser Illumination and Imaging Subsystem of the Present Invention Producing a Composite Substantially Planar Illumination Beam (PLIB) from PLIMs Having a Dynamically/Adaptively Controlled Ratio of Visible and IR Spectral Energy, and Employing an Integrated HFM/OMUX Despeckling Mechanism of the Present Invention for Speckle Pattern Noise Reduction FIG. 5H shows an illustrative embodiment of a coplanar laser illumination and imaging subsystem of the present invention producing a composite substantially planar illumination beam (PLIB) from PLIMs having a dynamically/adaptively controlled ratio of visible and IR spectral energy, and employing an integrated HFM/OMUX despeckling mechanism of the present invention for speckle pattern noise reduction. As shown, the system comprises: (a) a planar laser illumination array (PLIA) subsystem including (i) a first linear array of three dynamically/adaptively driven VLD-Based planar laser illumination modules (PLIMs), and (ii) a second planar laser illumination array (PLIA) having three dynamically/adaptively driven IRVD-Based PLIMs, each operated under the control of a local control subsystem, in response to control data produced by the image processing subsystem running the spectral-mixture control algorithm of the present invention (FIGS. 5E2, 5F2 and 5G2); (b) an image formation and detection (IFD) subsystem having a linear (1D) or area-type (2D) digital image detection array (having a narrow-area field of pixels actively driven), and (ii) optics for forming a field of view on the linear image detection array (or the narrow-area field of pixels on a 2D image detection array); (c) an image capture and buffering subsystem for capturing and buffering digital images formed and detected by the IPD subsystem; (d) a local control subsystem (e.g. programmed microprocessor performing local control functions within the station including the generation of control data and signals for driving each of the PLIMs in each PLIA; and (e) a digital image processing subsystem (which may be provided for global use within the system in which the subsystem is integrated, or local use as the case may be) for processing digital images captured and buffered by the subsystem, and carrying out the spectral-mixture control algorithm of the present invention described in FIGS. 5E2, 5F2 and 5G2.

In FIG. 5I1, each PLIM employed in the Illumination Subsystem depicted in FIG. 5H, is shown comprising: a VLD; current drive circuitry; HFM circuitry; a OMUX module; and cylindrical illumination lens array. When the HFM control signal from the local system control subsystem is HFM OFF, the HFM circuit is disabled and there is no high frequency modulation of the drive current supplied to the VLD. Consequently, as shown in FIG. 5J1, the drive current supplied to the VLD produces only single narrow-band peak about the characteristic wavelength of the VLD. However, as shown in FIGS. 5I2 and 5J2, when the local control subsystem produces an HFM ON signal, the HFM circuitry is enabled and supplies a high frequency modulated diode drive current to the VLD causing the VLD to produce a spectral sideband components about the central characteristic wavelength of the VLD, thereby reducing the coherence of the laser illumination beam as well as its coherence length, driving the OMUX module of the PLIM. This coherence-reduced laser beam, with its reduced coherence length characteristics, is perfectly suited for driving any of the laser beam despeckling mechanism disclosed in WIPO Publication No. WO 2002/043195 or in the present Specification.

Figure 5L:
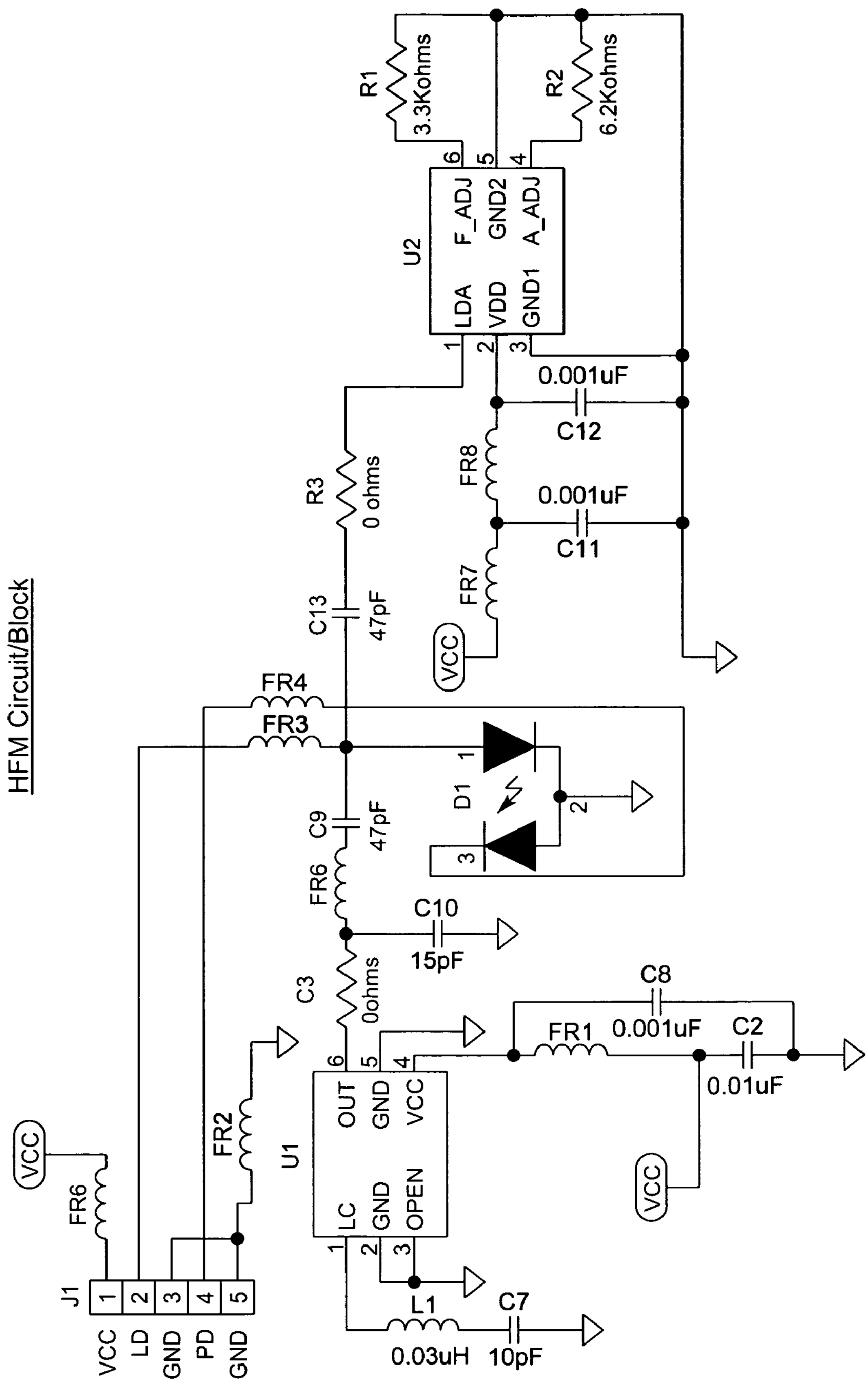
FIG. 5L is a schematic diagram of the HFM circuitry of the present invention, employed in each PLIM of the HFM-OMUX based illumination subsystem of FIG. 5H.

High-Frequency Modulation (HFM) Based Illumination Module of Present Invention Realized on a Flexible Circuit for use in Digital Imaging Systems FIG. 5K1 shows a first illustrative embodiment of a single HFM-OMUX-Based PLIM of the present invention which can be employed in the HFM-OMUX based illumination subsystem of FIG. 5H, as well as in numerous other diverse applications in industry (e.g. digital imaging, projection television, photolithographic illumination and imaging, etc), As shown, the HFM-OMUX-Based PLIM comprises: a flexible circuit as shown in FIGS. 5N1 and 5N2, and supporting (i) a VLD or IR laser diode (IRLD) and (ii) a HFM circuitry mounted in close proximity to the VLD or IRLD. As illustrated, the flexible circuit is connected to a microprocessor-controlled current driver circuitry realized on a PC board, and controlled by the local control subsystem which generates microprocessor controlled signals. FIG. 5L shows a schematic diagram of the HFM circuitry of the illustrative embodiment employed in each PLIM of the HFM-OMUX Based Illumination Subsystem of FIG. 5H. FIG. 5M provides a schematic diagram of the current driver circuitry of the present invention, employed in each PLIM of the HFM-Based Illumination Subsystem of FIG. 5H. In the illustrative embodiments, the HFM circuitry can be realized using the Toshiba TC9384FUG High Frequency Oscillator IC for Laser Diode, or SANYO's SMA4205 High Frequency Oscillator IC for Laser Diode. In the illustrative embodiments, where the SANYO red laser diode DL-3147-060 (having a characteristic wavelength of about 650 nanometers and low threshold current of about 20 milliamperes) is used to realize the VLDs, the preferred frequency of oscillation is 450 MHZ. However, it is expected that other higher values can be used to provide expectedly good performance results. As shown in FIGS. 5N1 and 5N2, the flexible circuit used in the first illustrative embodiment, supports the laser diode and HFM circuitry at its distal end, and connects to the PC board, supporting the diode current drive circuitry, on its proximal end.

FIG. 5K2 shows a second illustrative embodiment of a single HFM-OMUX-Based PLIM of the present invention which can be employed in the HFM-OMUX based illumination subsystem of FIG. 5H, as well as in numerous other diverse applications in industry (e.g. digital imaging, projection television, photolithographic illumination and imaging, etc). As shown, the HFM-OMUX-Based PLIM comprises: a flexible circuit as shown in FIGS. 5N1 and 5N2, and supporting (i) a VLD or IR laser diode (IRLD), (ii) a HFM circuitry mounted in close proximity to the VLD or IRLD, and (iii) a microprocessor-controlled current driver circuitry which is connected to the HFM circuitry and interfaced with the local control subsystem. The primary difference between the first and second illustrative embodiments shown in FIGS. 5K1 and 5K2 is that in the second illustrative embodiment, the diode current drive circuitry as well as the HFM circuitry and the laser diode (e.g. VLD, IRVD, visible LED or IR LED) are mounted on the distal portion of the flexible circuit, as shown in FIGS. 5N3 and 5N4.

Principles of Operation of the Optical Beam Multiplexing (OMUX) Method of the Present Invention A primary principle of operation of the optical multiplexing (OMUX) mechanism or module of the invention is duplicating (or multiplicating) the incoherence conditions/requirements that are provided by multiple radiation sources, but only by using radiation emanating from a single radiation source (e.g. VLD or IRLD). According to the principles of the present invention, such incoherence requirements can be duplicated by splitting or (otherwise dividing) a laser beam into two or more laser beams, creating a phase delay (temporal delay) between those multiple laser beams, and physically (spatially) separating them from one another so that each laser beam traverses a different pathlength. The effect of such optical beam multiplexing is to create additional virtual radiation sources that behave the same as independent real radiation sources would behave. However, a primary advantage of this OMUX method of the present invention is that the resulting virtual radiation sources occupy or require less physical space than real sources, thereby allowing the resulting digital image capture and processing system (e.g. bar code reader) to be constructed in a highly compact fashion. Another advantage of the OMUX method of the present is that its practice involves no moving parts, thereby improving the ease of alignment and reliability and avoiding limitations on scanning speed.

Figure 5O:
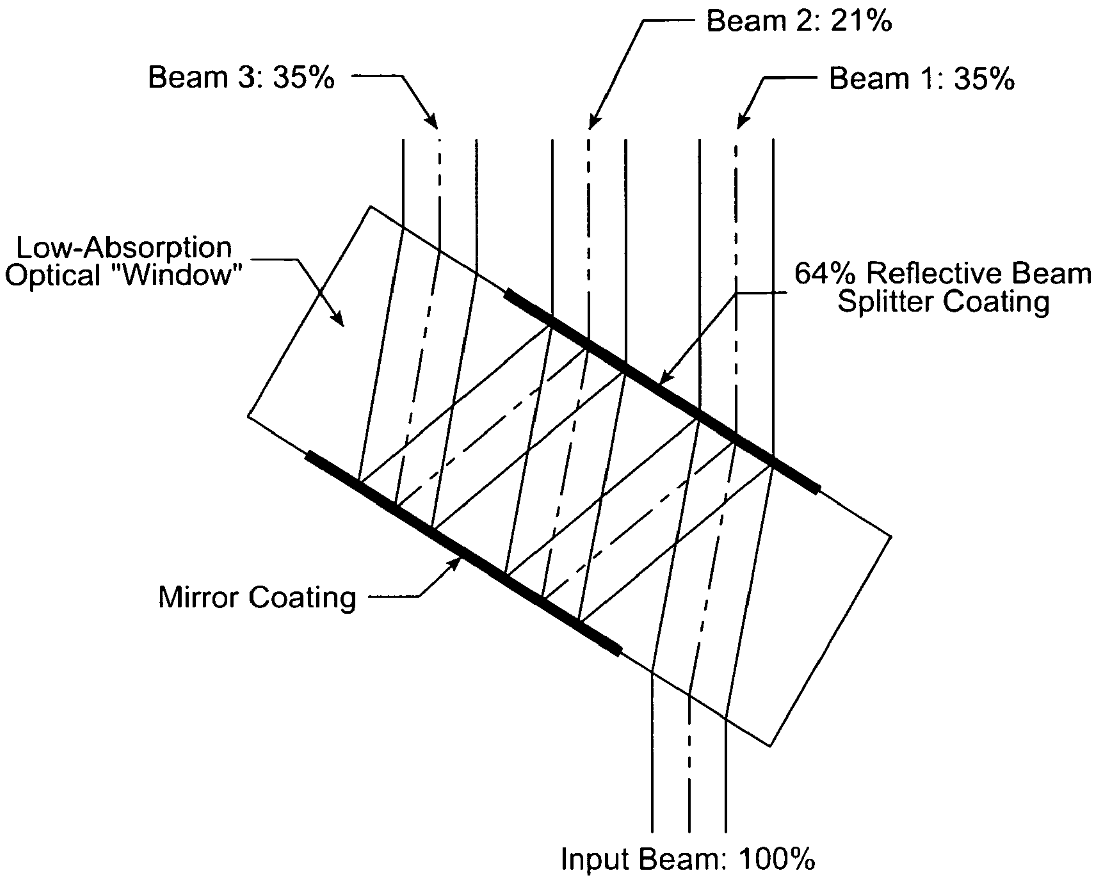
FIG. 5O is a schematic representation of a first illustrative embodiment of the optical despeckling device of the present invention, based on optical beam multiplexing principles and deployable in each PLIM of the HFM-OMUX based illumination subsystem of FIG. 5P, so as to reduce (i) the coherence of the resulting planar/narrow-area illumination beam generated therefrom, and (ii) thus the amount of speckle pattern noise observed at the image detection array of the image formation and detection (IFD) subsystem in the digital image capturing and processing system in which subsystems are contained.
Figure 5P:
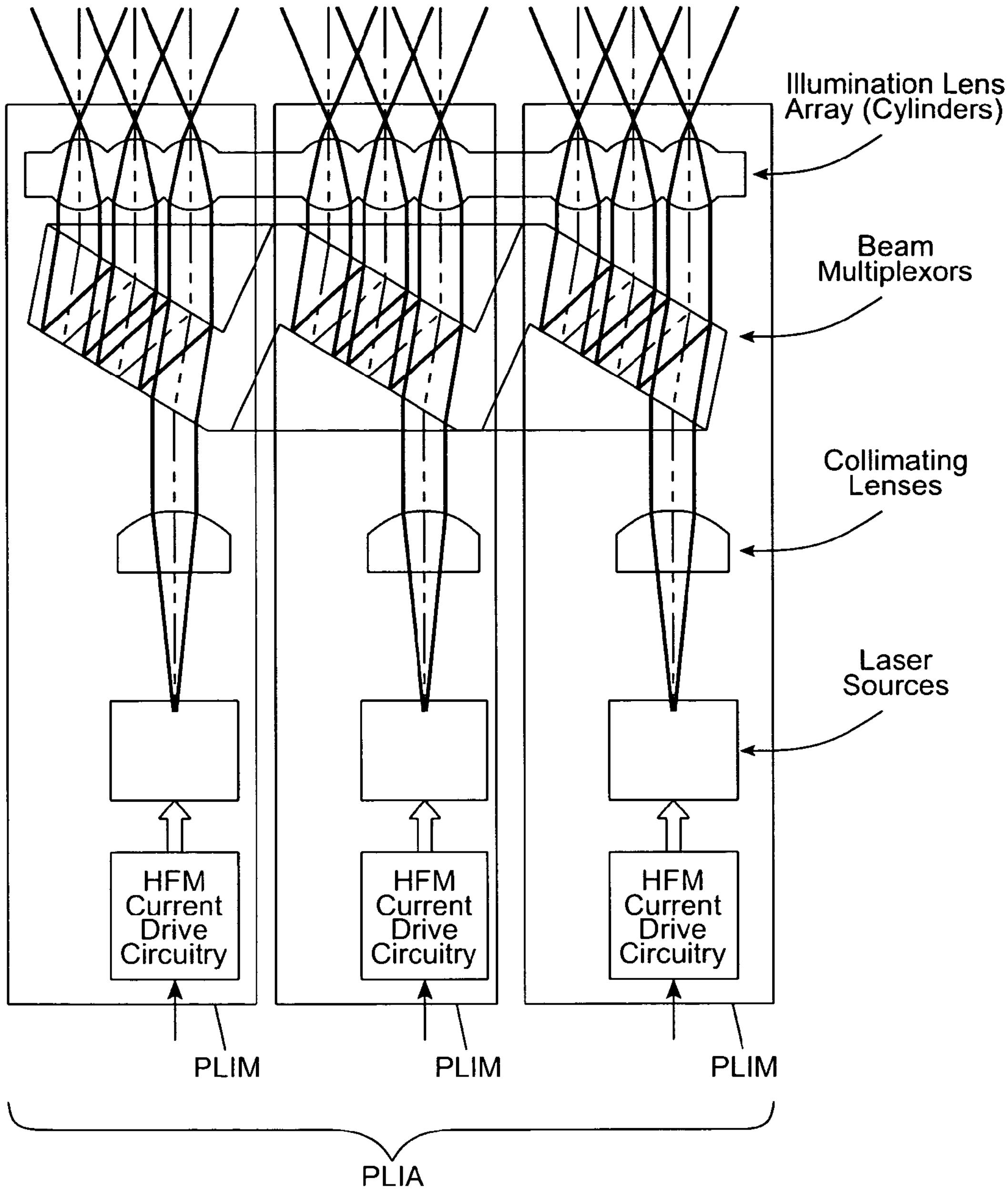
FIG. 5P is a schematic representation of a first illustrative embodiment of the planar laser illumination array (PLIA) of the present invention, comprising a plurality of planar laser illumination modules (PLIMs) as shown in FIG. 5O, wherein each PLIM includes (i) a laser source (e.g. VLD, IR LD, etc) driven preferably by the HFM current drive circuitry of the present invention shown in FIGS. 5K through 5M, (ii) a collimating lens (i.e. optics) disposed beyond the laser source, (ii) a laser beam optical multiplexor (OMUX) device of the present invention disposed beyond the collimating lens, and (iv) a cylindrical-type planarizing-type illumination lens array disposed beyond the OMUX, and arranged as an integrated assembly so as to generate a plurality of substantially planar coherence-reduced laser illumination beams (PLIBs) that form a composite substantially planar laser illumination beam (PLIB) having substantially reduced spatial/temporal coherence, which substantially reduces the amount of speckle pattern noise observed at the image detection array of the image formation and detection (IFD) subsystem (during the photo-integration period of the image detection array) as the composite PLIB illuminates an object during object illumination and imaging operations.
Figure 5Q:
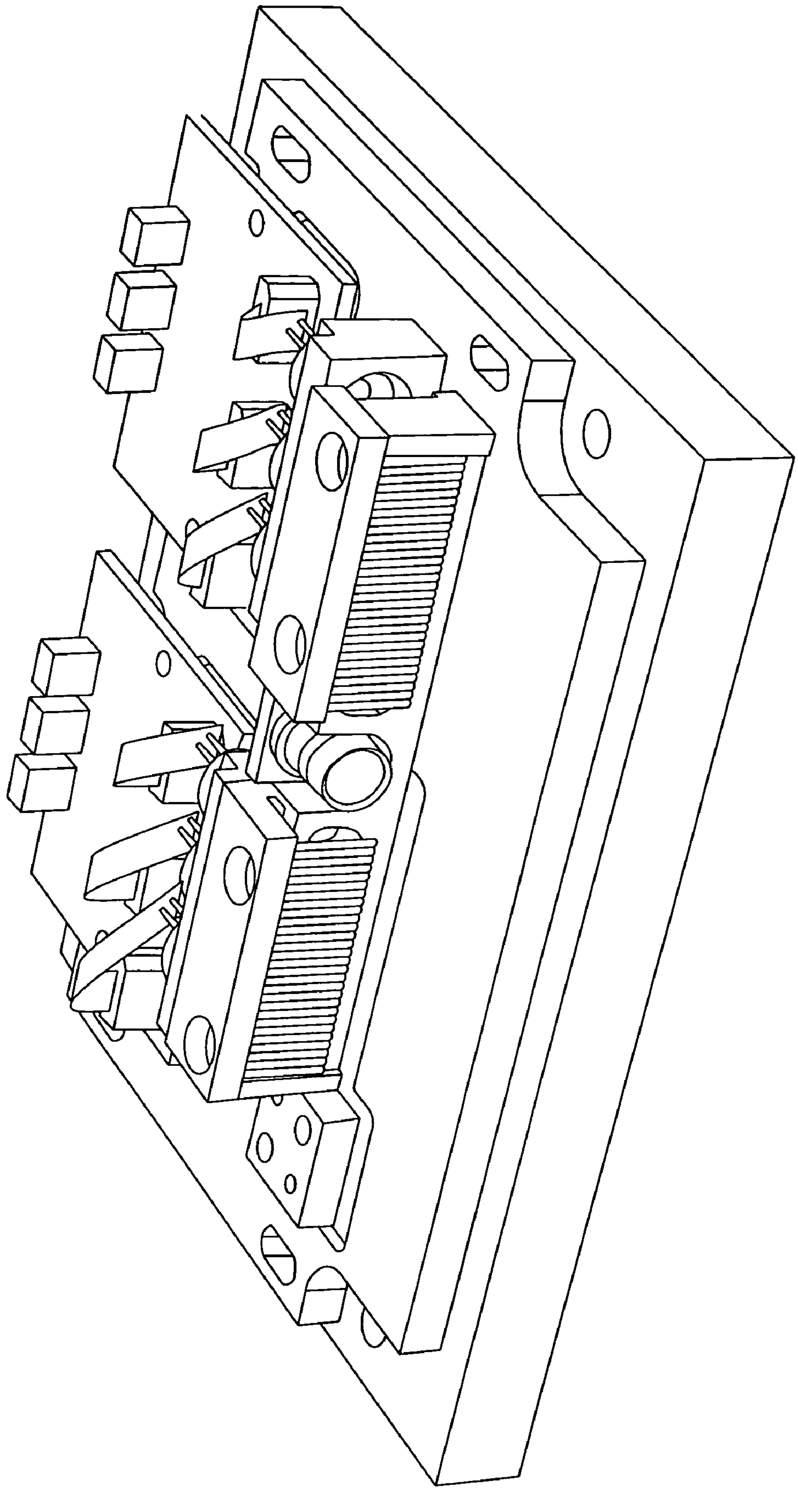
FIG. 5Q is a schematic representation of first illustrative implementation of the coplanar illumination and imaging subsystem illustrated in FIGS. 5E1 and 5E2, employing the PLIA illustrated in FIGS. 5O and 5P.
Figure 5R:
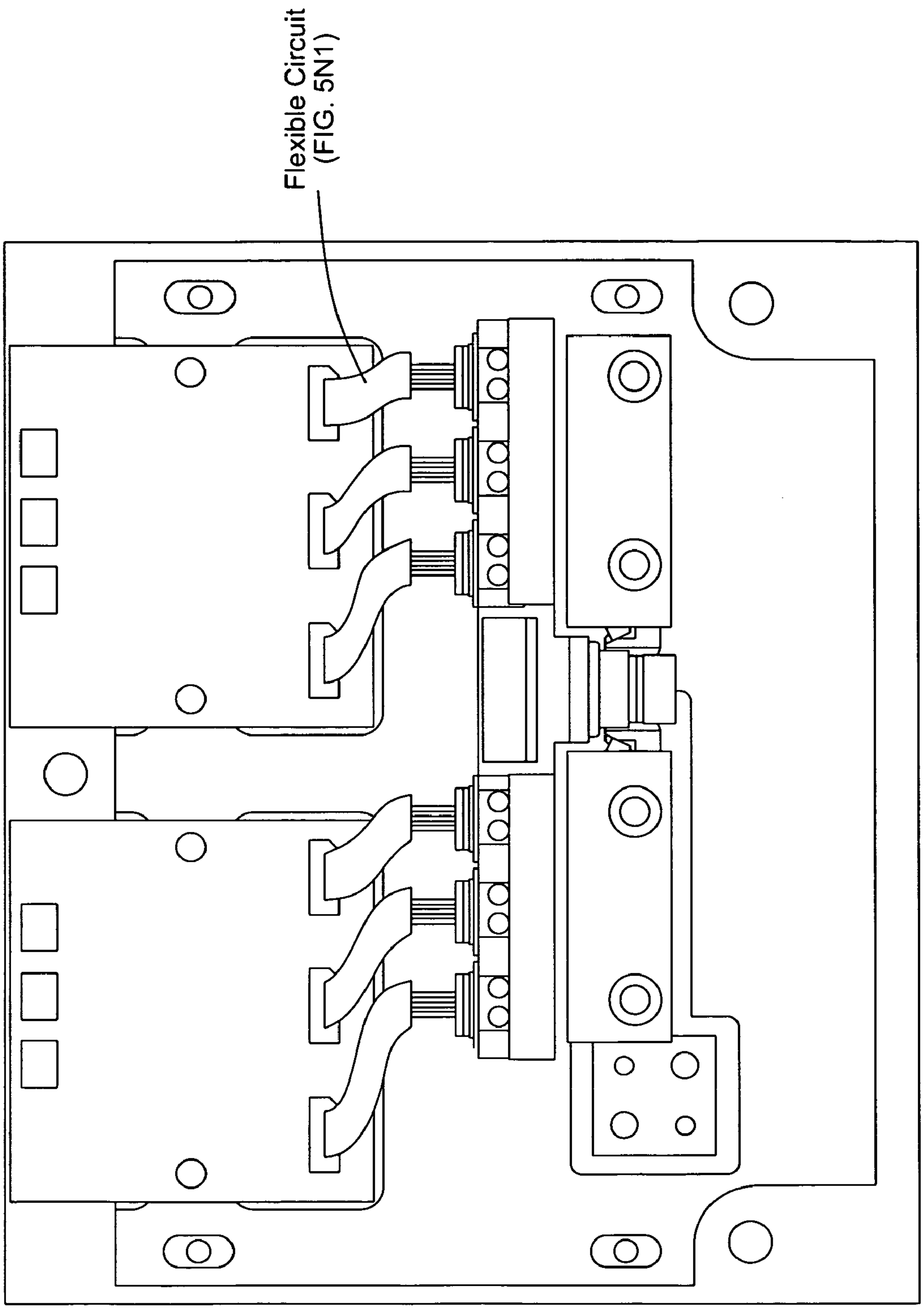
FIG. 5R is plan view of the coplanar illumination and imaging subsystem illustrated in FIG. 5Q.
Figure 5S:
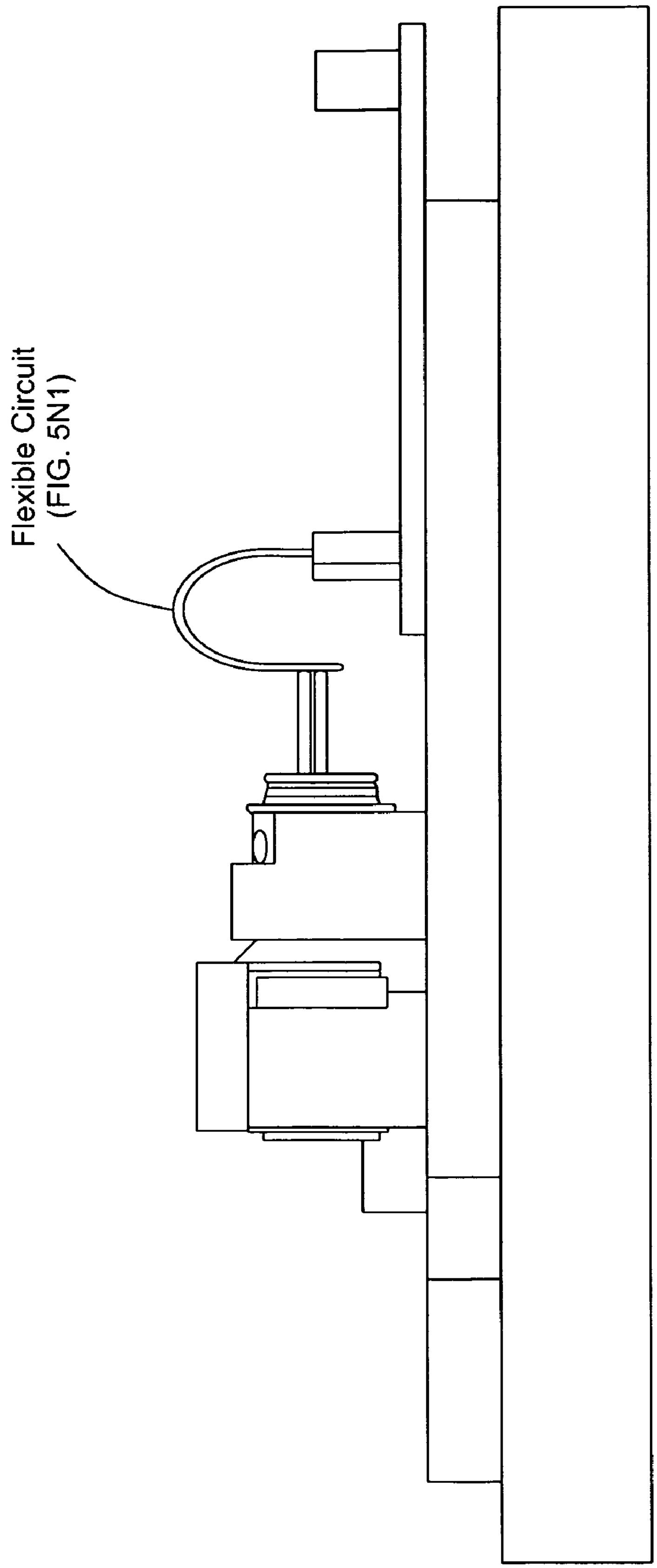
FIG. 5S is a first elevated side view of the coplanar illumination and imaging subsystem illustrated in FIG. 5Q.
Figure 5T:
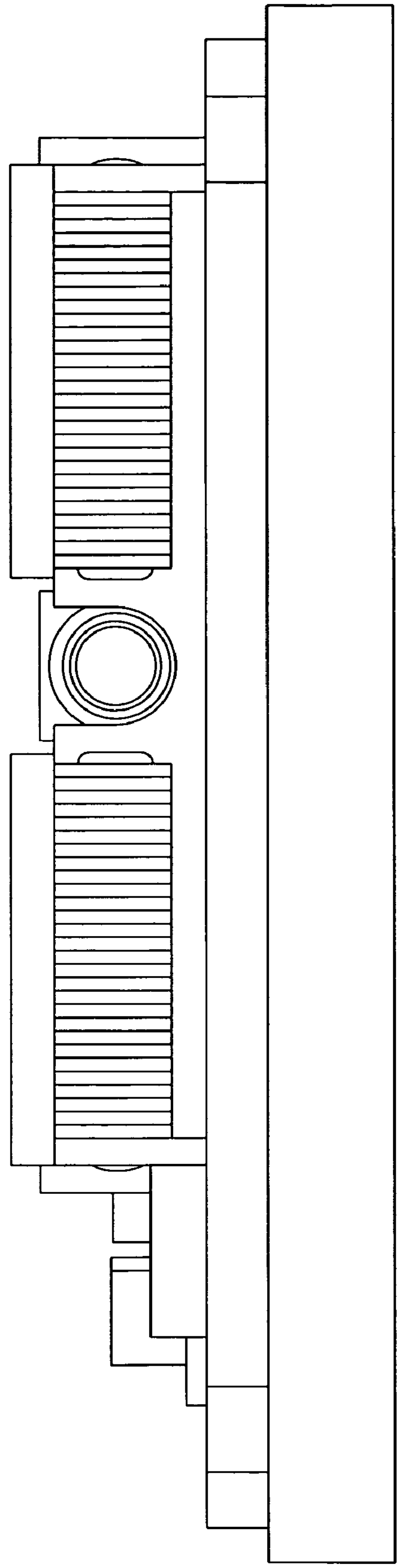
FIG. 5T is an elevated front view of the coplanar illumination and imaging subsystem illustrated in FIG. 5Q.

First Illustrative Embodiment of the Optical Despeckling Device of the Present Invention FIG. 5O shows a first illustrative embodiment of the optical laser beam despeckling device of the present invention, based on optical beam multiplexing (e.g. duplicating or multiplicating) principles described above and deployable in each PLIM of the HFM-based illumination subsystem of FIG. 5P. The primary purpose of this OMUX-based despeckling mechanism is to reduce (i) the coherence of the resulting planar/narrow-area illumination beam generated therefrom, and (ii) thus the amount of speckle pattern noise observed at the image detection array of the image formation and detection (IFD) subsystem in the digital image capturing and processing system in which subsystems are contained.

As shown in FIG. 5O, the simple OMUX-based laser beam despeckling module or mechanism comprises: an optical window structure (e.g. glass plate) having parallel polished sides with a partial mirror coating on one side, and a partial beam-splitter coating on the other side. As shown, the partial beam-splitter coatings are aligned such that one laser beam comes in on the one side of the glass plate, whereas multiple phase-delayed laser beams exit the other side of the optical structure. The beam splitter coating is tuned to a specific efficiency such as to equalize the first and last beam intensities and thereby maximize the laser beam despeckling effect. In the illustrative example, three laser beams leave the exit side, and the beam splitter coating is tuned to about 64% reflectivity. The result is an optical element having a 91% overall efficiency, and a despeckling effect equivalent to 2.87 sources. The maximum possible effect would be 3.0 sources, so therefore, it should be noted that this design is a very efficient and effective despeckling solution.

During operation, the focused beam will enter the optical multiplexor (OMUX) element, through a high-transmission optical surface, i.e. with no coating or an AR coating. The laser beam then travels through the optical material losing an insignificant amount of energy (i.e. experiences low absorption) and then arrives at a beam splitting coating. Some of the laser beam energy will be transmit therethrough, leaving the optical multiplexor device, and some laser beam energy will remain inside the multiplexor device, reflecting off of the beam splitter coating. The internal beam will pass back through the optical material and arrive at a high-reflector, where nearly all of the laser beam energy will be redirected towards the beam splitter. This cycle continues until the internal laser beam finally encounters a high-transmission surface where all the remaining beam energy leaves the optical multiplexor. In the preferred embodiment, three laser beams exit the multiplexor (OMUX) device. A cylindrical-type illumination lens array, disposed beyond but in proximity with the OMUX device will then intercept the exiting laser beams and spread their radiant energy so that the three expanded laser beams now overlap to produce a composite substantially planar illumination beam (PLIB) suitable for use in a linear illumination system, linear illumination and imaging system, or other applications where laser speckle noise is to be substantially reduced or eliminated. In the case of a PLIIM-based bar code reader, the planar illumination beam will then reflect off of a barcode symbol and be collected by a lens system for focusing onto a digital image sensor.

Figure 5U:
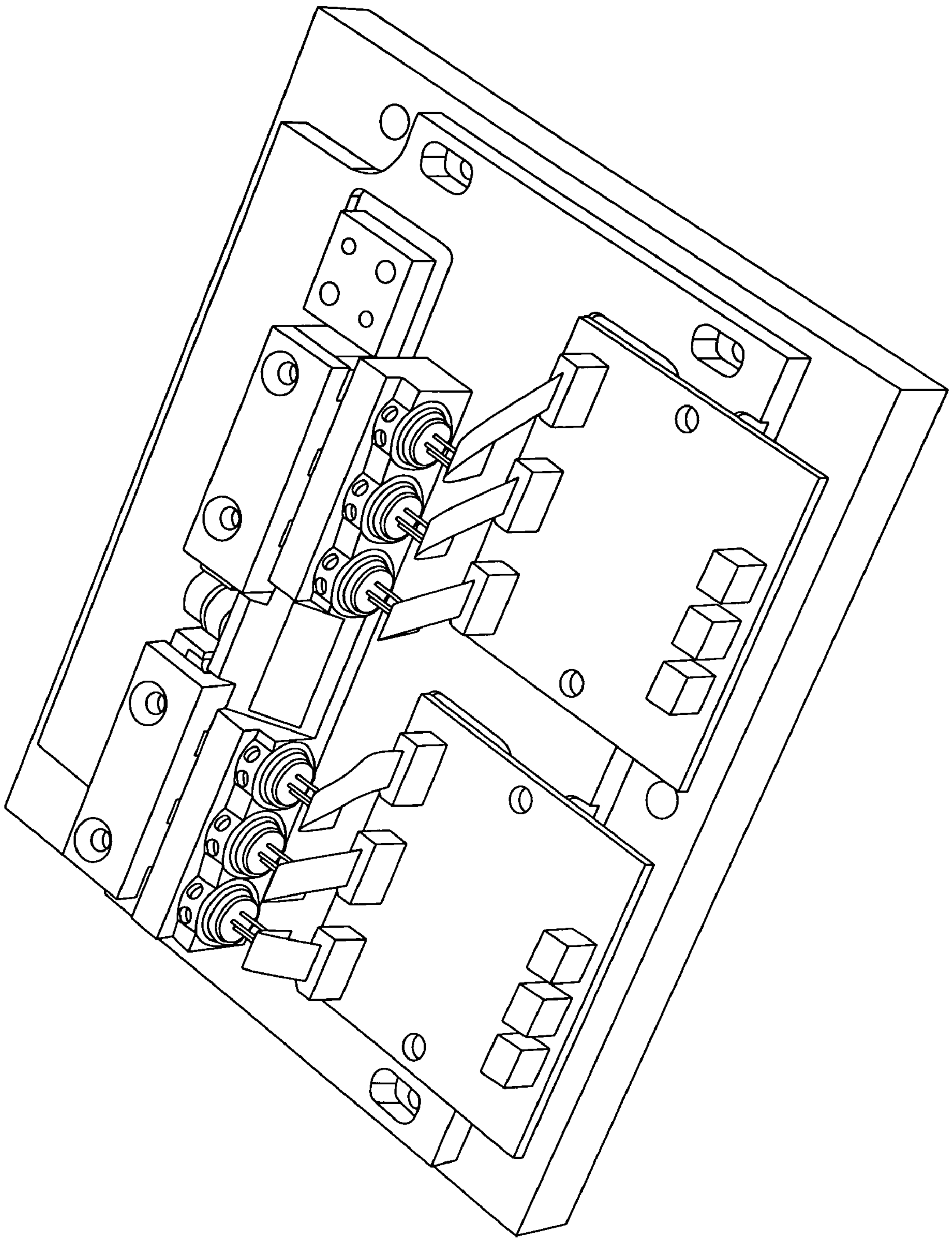
FIG. 5U is a second perspective view of the coplanar illumination and imaging subsystem illustrated in FIG. 5Q, showing three VLDs and three IRVDs mounted in the PLIA support, to which the flexible HFM circuits of the present invention illustrated in FIGS. 5K1 through 5N4 are connected on one end, and to PC board on the other, forming an electrical interface with the corresponding laser diode current drive circuits realized thereon, and described in FIG. 5M.
Figure 5V:
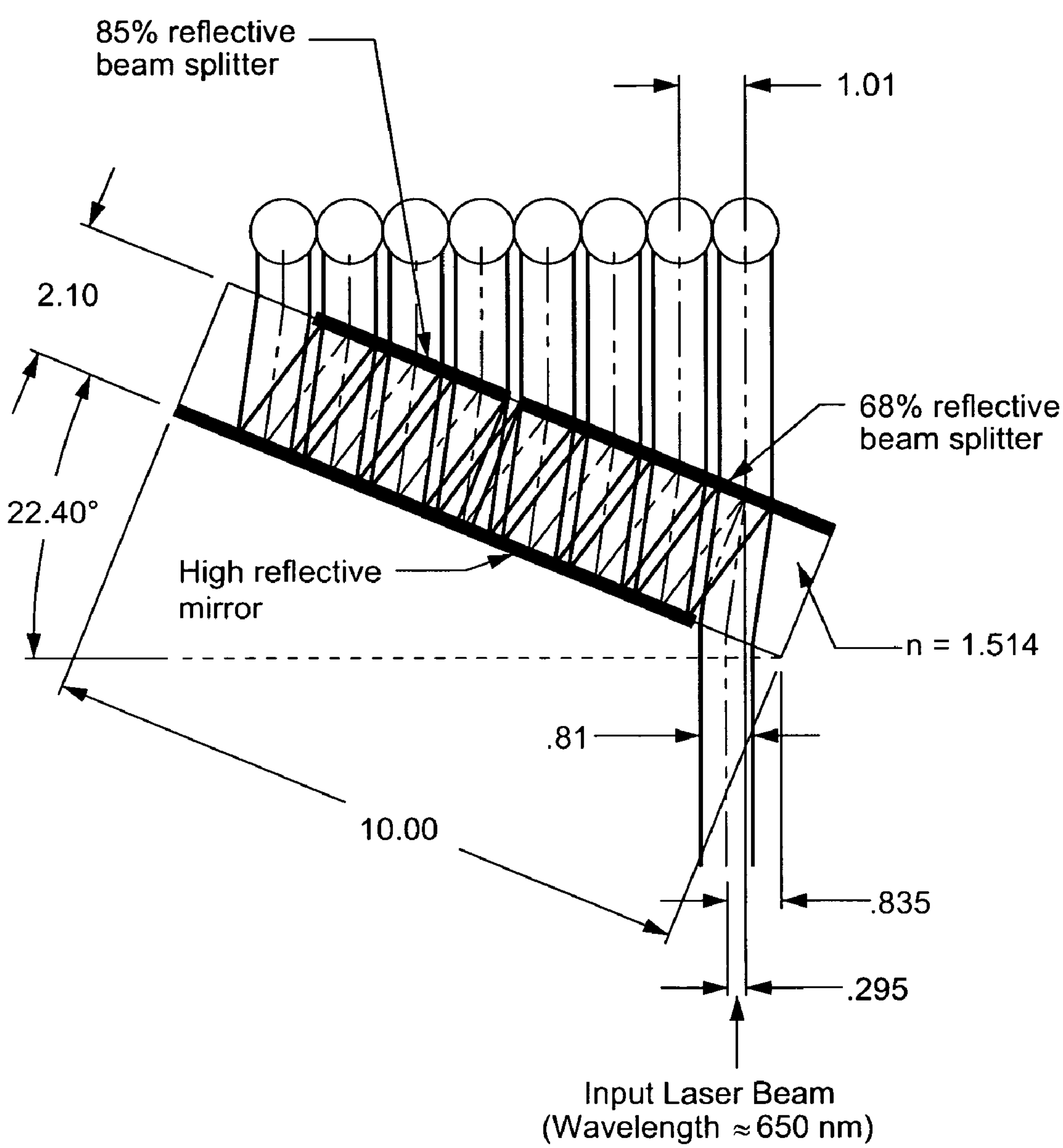
FIG. 5V is a schematic diagram of a second illustrative embodiment of the laser beam despeckling device of the present invention, shown constructed as an OMUX-based device comprising a single glass plate bearing reflective and semi-reflective coatings to optically multiplex an input laser beam into multiple spatial-coherence reduced output laser beams, which are then planarized into composite substantially planar laser illumination beam (PLIB) by a multi-cylinder planarizing-type illumination lens array disposed in close proximity therewith.

In alternate embodiments of the HFM-OMUX based PLIA of the present invention, a single beam may be split up into more than just three beams, as shown in FIG. 5V. As the number of beams increases, the reflectivity of the beam splitter coating must be increased to maintain the most effective despeckling by making the power in the first and last beams approximately equal. Alternately, a more complex optical system could be designed and constructed so that the reflectivity of the beam splitter coating varies along the surface such that all of the individual laser beams have equal power, thus truly maximizing the despeckling effect. Alternatively, the beam splitter coating can be broken up discretely into as many pieces as desired. For example, ten beams produced with two coatings may result in the most cost-effective solution.

First Illustrative Embodiment of the Planar Laser Illumination Array (PLIA) of the Present Invention Employing HFM-OMUX Based PLIMs As shown in FIG. 5P, a HFM-OMUX based planar laser illumination array (PLIA) device can be constructed by arranging together multiple (e.g. three or more) planar laser illumination modules (PLIMs) utilizing the HFM and OMUX principles of the present invention in combination with each other, and perhaps other despeckling techniques (e.g. polarization encoding). As shown, each PLIM comprises: (i) a laser source (e.g. VLD, IR LD, etc) driven preferably by the HFM-based diode current drive circuitry, as shown in FIGS. 5I1 through 5N4 and described above; (ii) a collimating lens (i.e. optics) disposed beyond the laser source; (ii) a laser beam optical multiplexor (OMUX) device of the present invention disposed beyond the collimating lens; and (iv) preferably a single cylindrical-type planarizing-type illumination lens array disposed beyond the OMUX, and arranged as an integrated assembly. The result is to generate a plurality of substantially planar coherence-reduced laser illumination beams (PLIBs), from the PLIMs, that form a composite substantially planar laser illumination beam (PLIB) having substantially reduced spatial/temporal coherence. Such resulting laser beam properties substantially reduces the amount of speckle pattern noise observed in images of an illuminated object at the image detection array of the image formation and detection (IFD) subsystem, by virtue of time-averaging of multiple coherence-reduced speckle noise patterns, during the photo-integration time period of the digital image detection array of the image formation and detection (IFD) subsystem employed within the digital image capturing and processing system in which subsystems cooperate.

Coplanar Illumination and Imaging Subsystem Employing Dual HFM-OMUX Based PLIAs of the Present Invention FIGS. 5Q through 5U show an exemplary implementation of the first illustrative implementation of the coplanar illumination and imaging subsystem depicted in FIGS. 5E1 and 5E2, employing a pair of PLIAs illustrated in FIGS. 5O and 5P, with an IFD subsystem and its image forming optics disposed therebetween. As shown in FIG. 5U, the pair of PLIA collectively support three VLDs and three IR VDs mounted in the PLIA support blocks, to which the flexible HFM circuits of the present invention are connected on one end, and to PC board on the other, thereby forming an electrical interface with the corresponding laser diode current drive circuits realized thereon. Preferably, the VLDs and IRLDs are arranged in a spatially alternating manner, although other spatial arrangements are possible and should work with good spectral mixing results.

Second Illustrative Embodiment of the Laser Beam Despeckling Device of the Present Invention FIG. 5V shows a second illustrative embodiment of the laser beam despeckling device of the present invention, shown constructed as an OMUX comprising: a single glass plate bearing reflective and semi-reflective coatings as shown to optically multiplex an input laser beam into multiple spatial-coherence reduced output laser beams, which are then planarized into composite substantially planar laser illumination beam (PLIB) by a multi-cylinder planarizing-type illumination lens array disposed in close proximity therewith.

Figure 5W:
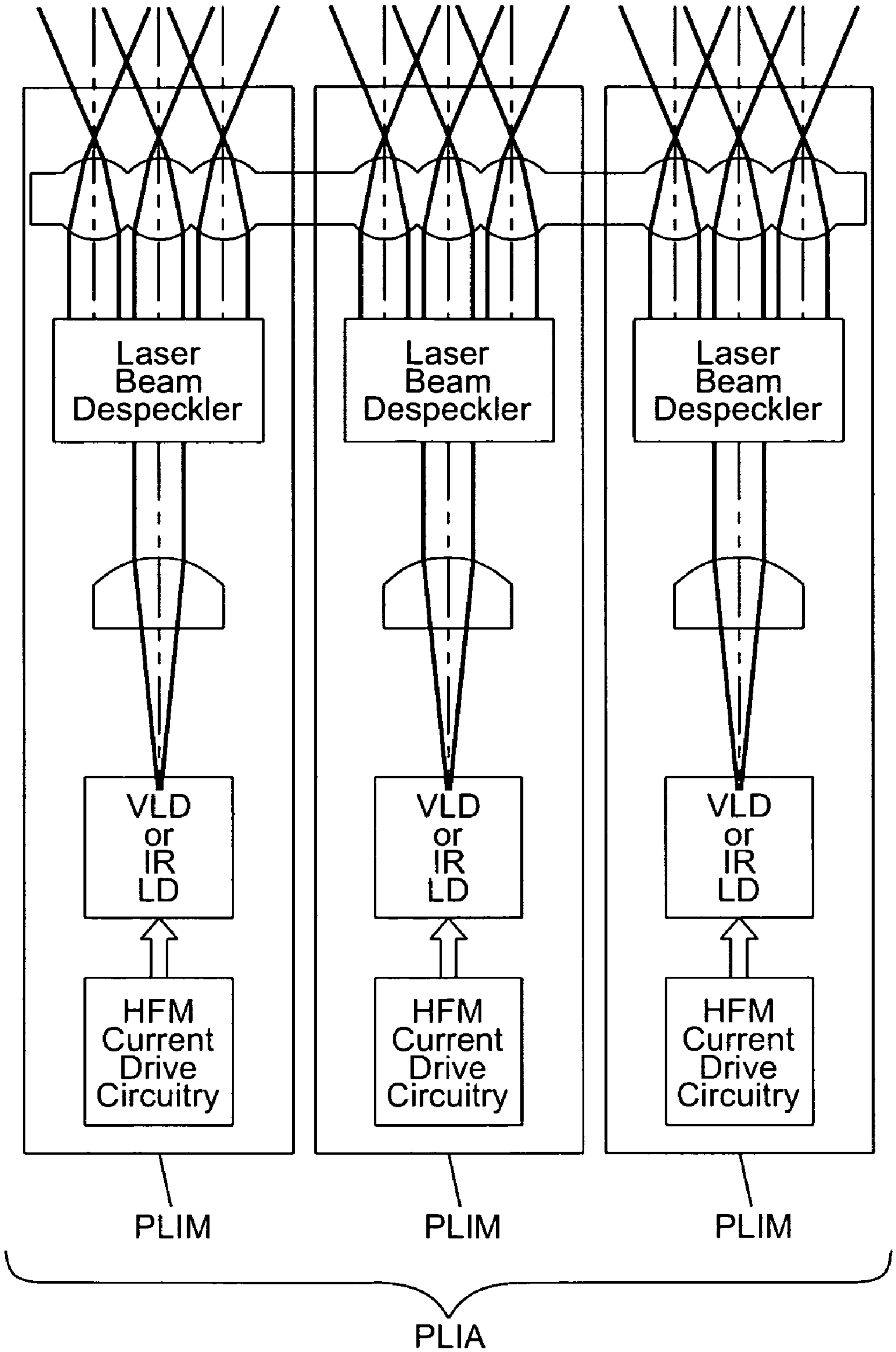
FIG. 5W is a schematic representation of a planar laser illumination array (PLIA) according to the present invention employing the HFM diode current drive method of the present invention illustrated in FIGS. 5H through 5N4, in combination with any laser beam despeckling method of the present invention, including the optical beam multiplexor (OMUX) despeckler devices illustrated in FIGS. 5O and 5V, as well as the polarization-encoding despeckler devices illustrated in FIGS. 5W1 through 5W6, so as to form a PLIA having an ultra-compact "super" despeckler mechanism.

Method of Reducing Laser-Based Speckle Pattern Noise at the Image Detection Array of the IFD Subsystem Using the HFM Current Drive Method in Combination with Any Optical Despeckling Method of the Present Invention Laser-based speckle pattern noise can be reduced at the image detection array of the IFD subsystem using the HFM current drive method of the present invention in combination with any optical despeckling method of the present invention, including the optical beam multiplexor (OMUX) devices illustrated in FIGS. 5O and 5V, as well as the polarization despeckler devices illustrated in FIGS. 5W1 through 5W6, so as to form a single, ultra-compact high-performance laser beam despeckler.

While optical multiplexing and/or polarization-encoding despeckling methods disclosed herein contributes its own independent measure of effective despeckling, it is important to point out that Applicants have discovered, to great surprise, that the broadening of the illumination spectrum of the input laser beam, using the HFM-based diode current driving technique disclosed herein, causes the other despeckling methods to work better, in particular the laser beam multiplexor (OMUX) device, apparently by virtue of accompanying reduction in coherence length of the laser, caused by spectral broadening caused by the use of HFM diode current drive techniques. Since the different methods are independent, there effects are multiplicative, resulting in a very large total effect in speckle pattern noise power reduction through time-averaging principles (e.g. during the photo-integration period of the image detection array, in the case of digital imaging systems, or during the photo-integration time period of the retinal surface of the eye of a human observer, in the case where the despeckled laser beam is used to project images on a display screen in projection television systems and the like).

The effectiveness of any despeckler can be measured in terms of the number of effective independent sources to which its behavior is comparable. With the combination despeckler, as shown in FIGS. 5H through 5V, it is possible to achieve speckle noise reduction effects that are equivalent to using twelve (12) or more spatially and/or temporally incoherent laser radiation sources (for illumination purposes) in a space not much larger than what a single source occupies. Also, an even greater effect can be achieved with small increases in size of the device. A clear advantage of the combination-based despeckling methods of the present invention is that its now possible to realize laser-illuminated digital imaging-based bar code reading systems of ultra-compact construction, hitherto unachievable. Moreover, such design objects can be achieved without the disadvantage of moving parts, thereby improving the ease of alignment and reliability and avoiding limitations on scanning speed.

Third Illustrative Embodiment of the Laser Beam Despeckling Device of the Present Invention Based on Polarization-Encoding of Multiplexed Laser Beam Components In FIG. 5W1, the third illustrative embodiment of the laser beam despeckling device of the present invention is designed and constructed as a polarization-encoding OMUX device. As shown, the input laser beam is multiplexed into at least two components each of which is then imparted with a different polarization state, so that upon recombination in the output beam, at least two independent speckle patterns will be generated at the image detection array, over its photo-integration time period of the image detection array, and the total speckle pattern noise power will have been reduced through time-averaging principles disclosed in great detail in Applicants' WIPO Patent Publication No. WO/2002/043195, incorporated herein by reference, Notably, the polarization-encoding optical multiplexor (OMUX) of FIG. 5W1 reflects the simple case where the input laser beam (typically linearly polarized, as is common in laser sources) is split in two laser beam components, where one component of the split beams has its polarization rotated 90 degrees, and thereafter, the laser beams are recombined, so that the resulting illumination will generate two independent speckle patterns, spatially overlapping at the exit surface of the OMUX device, and wherein the total speckle pattern noise power will have been reduced by approximately 30% through time-averaging principles (e.g. during the photo-integration period of the image detection array, in the case of digital imaging systems, or during the photo-integration time period of the retinal surface of the eye of a human observer, in the case where the despeckled laser beam is used to project images on a display screen in projection television systems and the like). The effect is equivalent to creating two virtual sources that behave the same as independent real sources.

One advantage of this polarization-encoding laser beam despeckling method of the present invention is that the number of sources is effectively doubled with only a small additional space requirement as compared to employing twice as many real laser sources, thus allowing a laser-illuminated digital-imaging bar code reader to be made significantly more compact. Another advantage with this method of despeckling is that it involves no moving parts, improving ease of alignment and reliability and avoiding limitations on scanning speed.

As shown in FIG. 5W1, one method of efficiently splitting and recombining the laser beam with orthogonal polarization states can be achieved using a laser beam despeckling device comprising: a three-sided prism and a ½ wave retarder plate disposed between a pair of mirrors arranged as shown, to optically multiplex an input laser beam into a single temporal-coherence reduced output laser beam, for subsequent planarization a multi-cylinder planarizing-type illumination lens array disposed in close proximity therewith. In this embodiment, two sides of the prism are coated with a 50% beam splitter coating whereas its third side is coated with a high reflective mirror. All the light enters the optical subsystem from the left side and exits the subsystem from the right side, with the exception of internal scattering and absorption losses and small reflections off the ½ wave plate. A minor modification to aid in the efficiency is to substitute a ¼ wave plate for the ½ wave plate and adhere it to one of the two mirrors such that the beam passes through it twice with each bounce off that mirror. In this configuration the losses due to reflection off the wave plate will be reduced. The functioning of this system is such the laser beam traverses multiple paths to go from the entrance aperture to the exit, aperture and portions of the laser beam will cycle around inside the subsystem before exiting as an output beam. When all the paths are considered, it is seen that roughly half the energy will exit the subsystem with the same polarization state that entered it, while the other half will have a polarization state orthogonal to the initial state. Such polarization state differences the internally generated, and ultimately recombined beam components effectively reduced the temporal coherence among these internally generated and recombined beam components, and thus helps reduced speckle pattern noise power during time-based integration at the digital image detection array of the IFD subsystem.

Fourth Illustrative Embodiment of the Laser Beam Despeckling Device of the Present Invention Based on Polarization-Encoding of Multiplexed Laser Beam Components FIG. 5W2 shows a fourth illustrative embodiment of the laser beam despeckling device of the present invention, designed and constructed as a polarization-encoding OMUX device comprising: a polarization beam splitter/reflector arranged on a diagonal surface of an optical cube formed by a pair of prisms arranged together as a cubic structure; and orthogonally-arranged mirrors supported on the surfaces of the optical cube; wherein each surface also each bears a ¼ wave retarder as shown, to optically multiplex an input laser beam into a single temporal/spatial-coherence reduced output laser beam, for subsequent planarization a multi-cylinder planarizing-type illumination lens array disposed in close proximity therewith. The device can be used in a PLIM having a VLD (or IRLD) and a collimating lens to focus the light beam it enters the side of the cube, and strikes the beam splitter with one linear polarization state and exits with two orthogonal states, as shown in FIG. 5W2. The output laser beam is then transmitted through a cylinder lens will then intercept the beam and spread the light into a linear or planarized illumination field. The substantially planar field of illumination will then reflect off of a barcode or other object to be imaged, and collected by a lens system for focusing onto a digital image detection array of the IFD subsystem.

During operation, linearly polarized light enters from the left side of the optical cube, with a polarization orientation of 45 degrees. When the beam encounters the diagonal surface of the optical cube, half of the light beam is reflected downstream as S-polarized light, while the other half of the light beam is transmitted as P-polarized light. Both beams then reflect off a mirror, passing twice through a ¼ wave plate. This causes each of their polarizations to be rotated 90 degrees relative to each other. Because of the change in polarization, the beam that reflected off the diagonal at its first encounter now passes through it, and vice versa for the other beam. As a result, both beams exit through the top surface producing a combination of orthogonal polarization states.

Fifth Illustrative Embodiment of the Laser Beam Despeckling Device of the Present Invention Based on Polarization-Encoding of Multiplexed Laser Beam Components FIG. 5W3 shows a fifth illustrative embodiment of the laser beam despeckling device of the present invention, constructed as a polarization-encoding OMUX device comprising: four mirrors, with three of which being arranged as three sides of a cubic structure, and the fourth mirror arranged parallel and offset from the third mirror, as shown; a ¼ wave retarder plate arranged in the corner of the cubic structure formed by the first and second mirrors as shown; a beam splitter arranged parallel and between the first and third mirrors, to optically multiplex and polarization-encode an input laser beam into two temporal/spatial-coherence reduced output laser beams with different polarization states, for subsequent planarization a multi-cylinder planarizing-type illumination lens array disposed in close proximity therewith. This polarization OMUX design essentially combines several despeckling methods to efficiently split the laser beam into two components having orthogonal polarization states, and recombining these components so as to create two spatially and temporally separated laser beams at the output of this optical subsystem. In this method, a beam splitter is used with a 50% reflective coating to equally separate the beam into two parts. A ¼ wave plate is inserted in the one leg of the split beam to intercept that beam twice and rotate its polarization by 90 degrees. Notably, a ½ wave plate could easily be used in one place of the ¼ wave plate, After being redirected by mirrors, the two split beam components meet again at the beam splitter coming in from opposite sides. As a result, the two emerging beams are composed of half of one linear polarization state and half of an orthogonal state.

Sixth Illustrative Embodiment of the Laser Beam Despeckling Device of the Present Invention Based on Polarization-Encoding of Multiplexed Laser Beam Components In the sixth illustrative embodiment of the laser beam despeckling device of the present invention, each internally-generated (multiplexed) laser beam in the OMUX device of FIGS. 5O and 5V, is also imparted with a different polarization state, so that the resulting pair of output laser beams are encoded with different polarization states as well as having tranversed different optical paths, before being planarized into a composite planar laser illumination beam (PLIB). Consequently, the speckle pattern noise generated from such an output laser beam on the surface of a digital image detection array (or on an image display surface) will have a substantially reduced speckle pattern noise level. FIG. 5W4 shows an embodiment of such a laser beam despeckling device, comprising: a ¼ wave retarder plate disposed between a pair of glass plates bearing mirror and beam-splitter coatings as shown, so as to optically multiplex an input laser beam into two spatial and temporal coherence reduced output laser beams. The output beam is then subsequently planarized by a multi-cylinder planarizing-type illumination lens array disposed in close proximity therewith. This design employs a second method of efficiently splitting and recombining the laser beam with orthogonal polarization states.

This design employs a second method of efficiently splitting and recombining the laser beam with orthogonal polarization states. In this embodiment, as the laser beams pass back and forth between the two reflective layers/coatings, the polarization states of these laser beam components become mixed, as shown by the fractions of lambda (a wavelength) in the figure. This model would have a despeckling affectivity equivalent to nine (9) real laser beam sources.

Seventh Illustrative Embodiment of the Laser Beam Despeckling Device of the Present Invention FIG. 5W5 shows a seventh illustrative embodiment of the laser beam despeckling device of the present invention, similar in many ways to the polarization-encoding OMUX device of FIG. 5W4, and comprising: a ¼ wave retarder plate disposed between a pair of glass plates (multiplexors) bearing mirror and beam-splitter coatings as shown, so as to optically multiplex an input laser beam into four spatial-coherence reduced output laser beams, for subsequent planarization a multi-cylinder planarizing-type illumination lens array disposed in close proximity therewith. Functionality of the optical multiplexor is extended with the addition of another beam splitting coating to further double the number of laser beams produced during operation. This design would have a despeckling affectivity equivalent to eighteen (18) effective illumination sources. Extending the multiplexor one more cycle (to 6 beams) would increase the number of effective laser sources to nearly twenty-six (26).

Eighth Illustrative Embodiment of the Laser Beam OMUX Device of the Present Invention FIG. 5W6 shows an eighth illustrative embodiment of a multi-stage laser beam despeckling device of the present invention. As shown, this device is constructed as hybrid OMUX subsystem comprising: a first laser beam OMUX module as shown in FIG. 5W2 to optically multiplex an input laser beam into a pair of temporal/spatial coherence-reduced output laser beam that spatially overlap each other as the output surface of the module; and a second OMUX despeckling module, as shown in FIG. 5O, for receiving the output beam from the first module, and transmitting the beam through the second despeckling module so as to produce, as output, a plurality of spatial/temporal coherence-reduced laser beams, for subsequent planarization a multi-cylinder planarizing-type illumination lens array disposed in close proximity therewith. In this embodiment, the first OMUX module (i.e. cube beam splitter) is used with a polarization reflector to create the change in polarization. The second OMUX module is extended with the addition of another beam splitting coating to further double the number of output laser beams produced. This design would have a despeckling affectivity equivalent to nearly thirteen (13) effective illumination sources.

Illustrative Embodiment of HFM-OMUX Based Planar Laser Illumination and Imaging (PLIIM) Module of the Present Invention Employing Integrated HFM-OMUX Based Despeckler In FIGS. 5X1 through 5X4, an illustrative embodiment of the HFM-OMUX based planar laser illumination and imaging (PLIIM) module is shown removed from its PC board (shown in FIG. 5X3), and supporting both VLDs and IR laser diodes, a field of view (FOV) forming optics and FOV folding mirror for use with the digital linear image detecting array mounted on the PC board. In FIG. 5X4, the PLIIM module is shown mounted on its PC board supporting the digital linear image detection chip (i.e. linear or narrow-area image sensor), HFM and current drive circuitry, image capture and buffer circuitry, subsystem control circuitry (e.g. programmed micro-controller etc).

Figure 5Y:
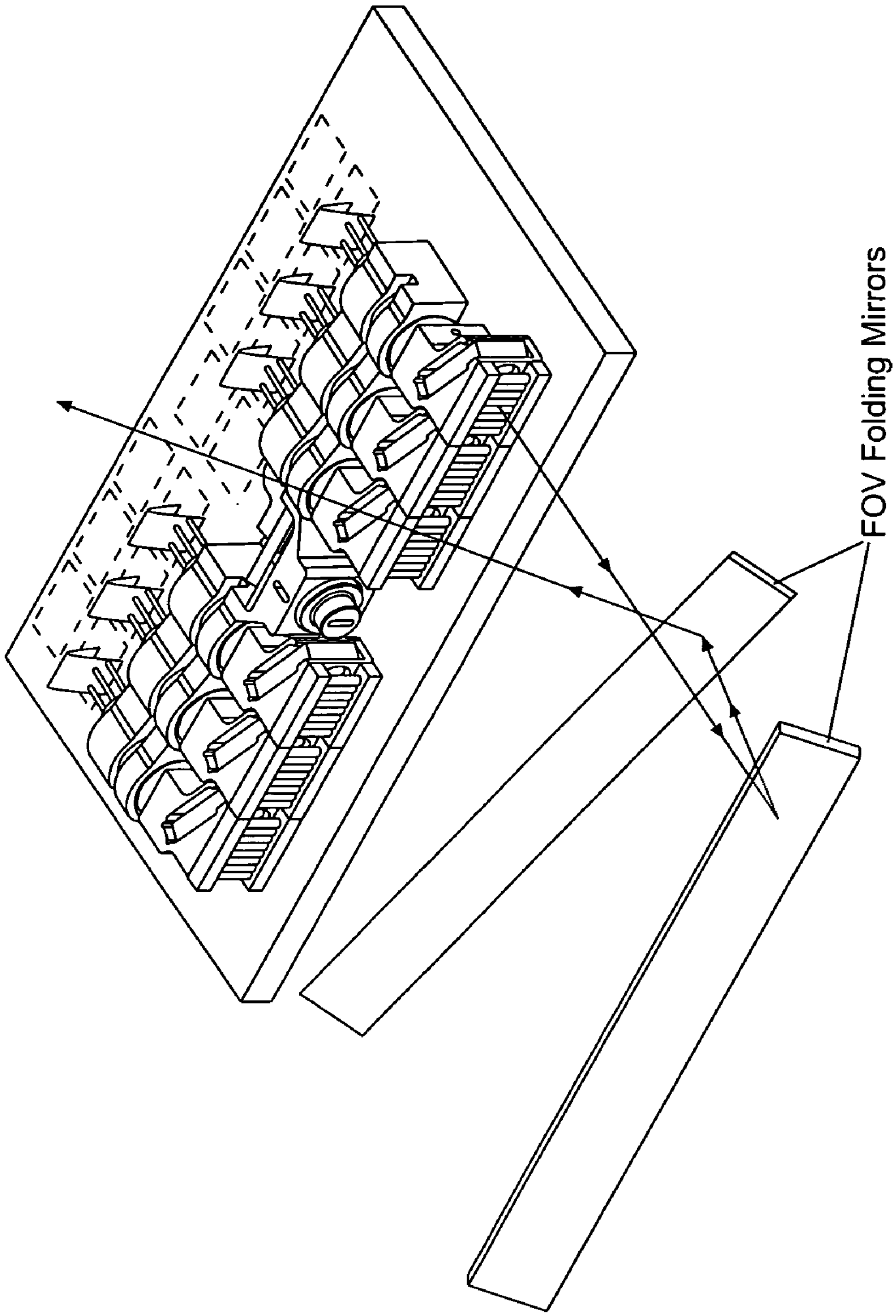
FIG. 5Y is a perspective view the planar laser illumination and imaging (PLIIM) module of the present invention depicted in FIG. 5X1, shown arranged with a pair of PLIB/FOV folding mirrors used to direct the coplanar PLIB/FOV in a direction required by the system in which the PLIIM module is employed.

In FIG. 5Y, the PLIIM module depicted in FIG. 5X4 is shown arranged with a pair of PLIB/FOV folding mirrors used to direct the coplanar PLIB/FOV in a direction required by the system in which the PLIIM module is employed.

Digital Imaging System of Illustrative Embodiment Employing Imaging-Based Object Motion and Velocity Sensing Technology System embodiments, shown in FIGS. 6 through 6I, and 8A through 8A4, employ imaging-based object motion and velocity sensing technology, whereas other system embodiments shown in FIGS. 6' through 6I', and 8B through 8E employ Pulse-Doppler LIDAR based object motion and velocity detection techniques provided at either a global or local subsystem level.

In other illustrative embodiments shown in FIGS. 7 through 7I, the Object Motion/Velocity Detection State of operation is supported at the respective coplanar illumination and imaging stations using globally provided image processors to compute object motion and velocity data, which, in turn, is used to produce control data for controlling the linear and/area image sensing arrays employed at the image formation and detection (IFD) subsystems of each station in the system.

In yet other embodiments, the Object Motion/Velocity Detection State can be supported by a combination of both locally and globally provided computational resources, in a hybrid sort of an arrangement.

In the preferred illustrative embodiments, the Bar Code Reading State of operation of each illumination and imaging subsystem is computationally supported by a globally provided or common/shared multi-processor image processing subsystem 20. However, in other illustrative embodiments, the bar code reading functions of each station can be implemented locally using local image-processors locally accessible by each station.

In the illustrative embodiments of the present invention, the states of operation of each station 15 in the system 10 can be automatically controlled using a variety of control methods.

One method, shown in FIGS. 6F1, 6G1A and G1B, supports a distributed local control process in the stations, wherein at each illumination and imaging station, the local control subsystem controls the function and operation of the components of the illumination and imaging subsystem, and sends "state" data to the global control subsystem for state management at the level of system operation. Using this method, only the illumination and imaging stations that detect an object in their field of view (FOV), as an object is moved through the 3D imaging volume of the system, will be automatically locally driven to their image capturing and processing "bar code reading state", whereas all other stations will remain in their object motion/velocity detection state until they detect the motion of the object passing through their local FOV.

In the case where IR Pulse-Doppler LIDAR Pulse-Doppler sensing techniques are used to implement one or more object motion/velocity detection subsystems in a given system of the present invention, as shown in FIGS. 6' through 6I', this method of system control can provide an ultimate level of illumination control, because visible illumination is only generated and directed onto an object when the object is automatically detected within the field of view of the station, thus permitting the object to receive and block incident illumination from reaching the eyes of the system operator or consumers who may be standing at the point of sale (POS) station where the system has been installed. In the case where imaging-based techniques are used to implement one or more object motion/velocity detection subsystems in a given system of the present invention, as shown in FIGS. 6 through 6E4, this method of system control can provide a very high level of illumination control, provided that low levels of visible illumination are only generated and directed onto an object during the Object Motion/Velocity Detection State.

A second possible method supports a distributed local control process in the stations, with global over-riding of nearest neighboring stations in the system. As shown in FIGS. 6F2, and 6G2A and 6G2B, each local control subsystem controls the function and operation of the components of its illumination and imaging subsystem, and sends state data to the global control subsystem for state management at the level of system operation, as well as for over-riding the control functions of local control subsystems employed within other illumination and imaging stations in the system. This method allows the global control subsystem to drive one or more other nearest-neighboring stations in the system to the bar code reading state upon receiving state data from a local control subsystem that an object has been detected and its velocity computed/estimated. This way, all neighboring stations near the detected object are automatically driven to their image capturing and processing "bar code reading state" upon detection by only one station. This method provides a relatively high level of illumination control, because visible illumination is generated and directed into regions of the 3D imaging volume where within the object is automatically detected at any instant in time, and not within those regions where the object is not expected to be given its detection by a particular illumination and imaging station.

A third possible method also supports distributed local control process in the stations, but with global over-riding of all neighboring stations in the system. As shown in FIGS. 6F3, and 6G3A and 6G3B, each local control subsystem controls the function and operation of the components of its illumination and imaging subsystem, and sends state data to the global control subsystem for state management at the level of system operation, as well as for over-riding the control functions of local control subsystems employed within all neighboring illumination and imaging stations in the system. This method allows the global control subsystem to drive all neighboring stations in the system to the bar code reading state upon receiving state data from a single local control subsystem that an object has been detected and its velocity computed/estimated. This way, all neighboring stations, not just the nearest ones, are automatically driven to their image capturing and processing "bar code reading state" upon detection by only one station. This method provides a relatively high level of illumination control, because visible illumination is generated and directed into regions of the 3D imaging volume where within the object is automatically detected at any instant in time, and not within those regions where the object is not expected to be given its detection by a particular illumination and imaging station.

Figure 8D:
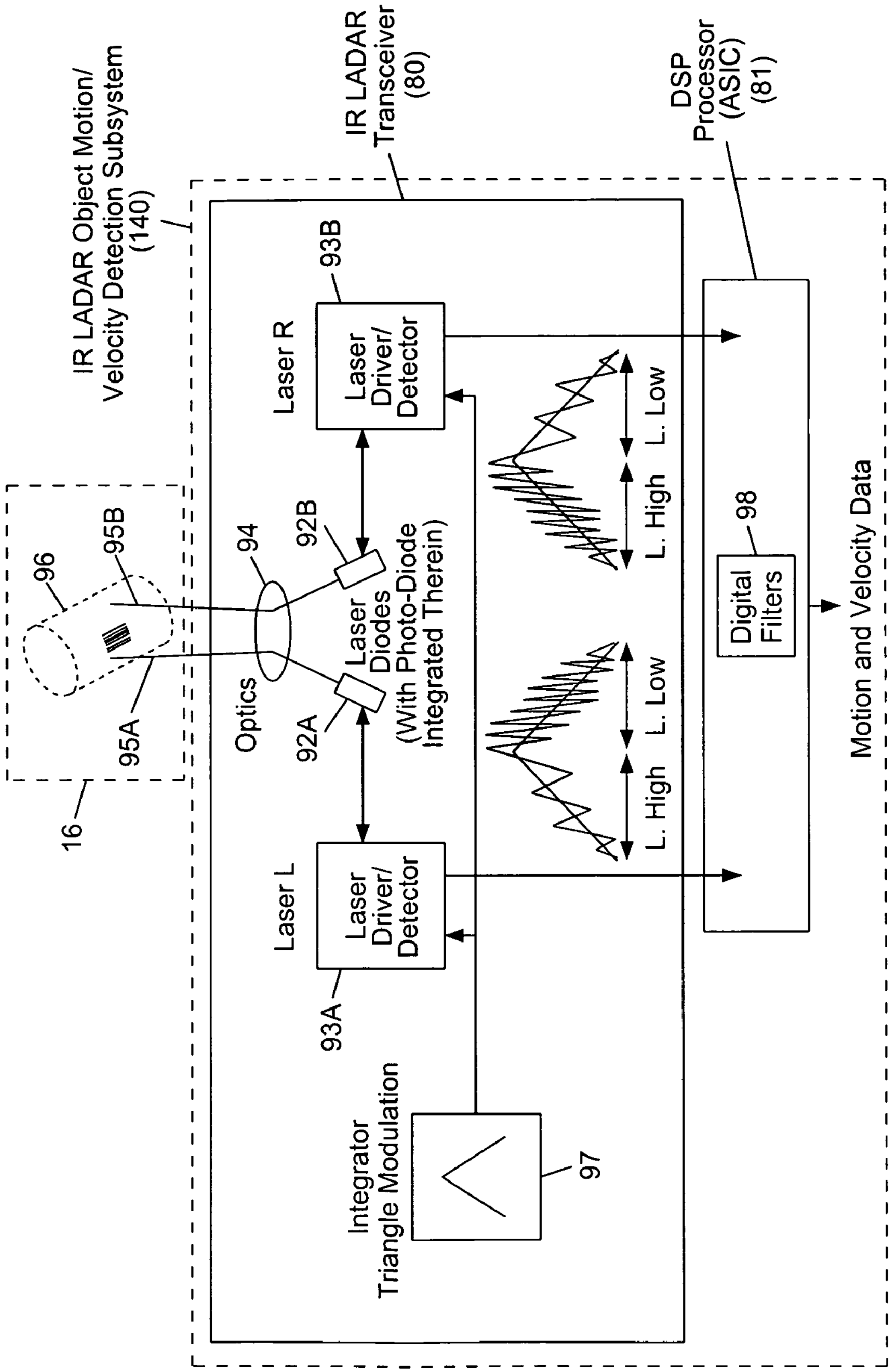
FIG. 8D is a schematic representation of an preferred implementation of the high-speed IR Pulse-Doppler LIDAR-based object motion/velocity detection subsystem employed in the system of FIG. 8B1, wherein a pair of pulse-modulated IR laser diodes are focused through optics and projected into the 3D imaging volume of the system for sensing the presence, motion and velocity of objects passing therethrough in real-time using IR Pulse-Doppler LIDAR techniques.
Figure 8E:
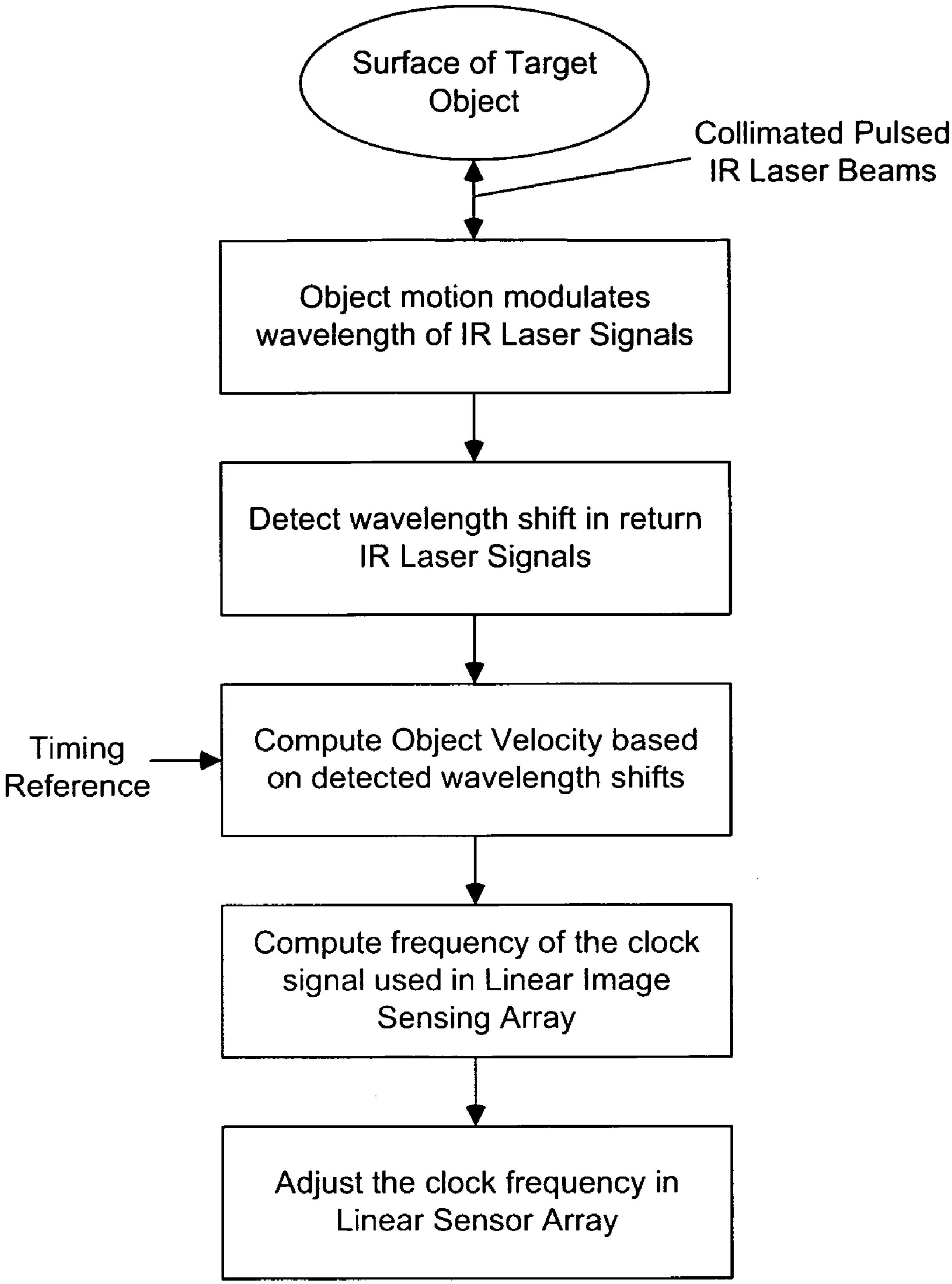
FIG. 8E is a high-level flow chart describing the steps associated with the object motion and velocity detection process carried out in the object motion/velocity detection subsystems globally implemented in the system of FIGS. 8B through 8D.
Figure 8F:
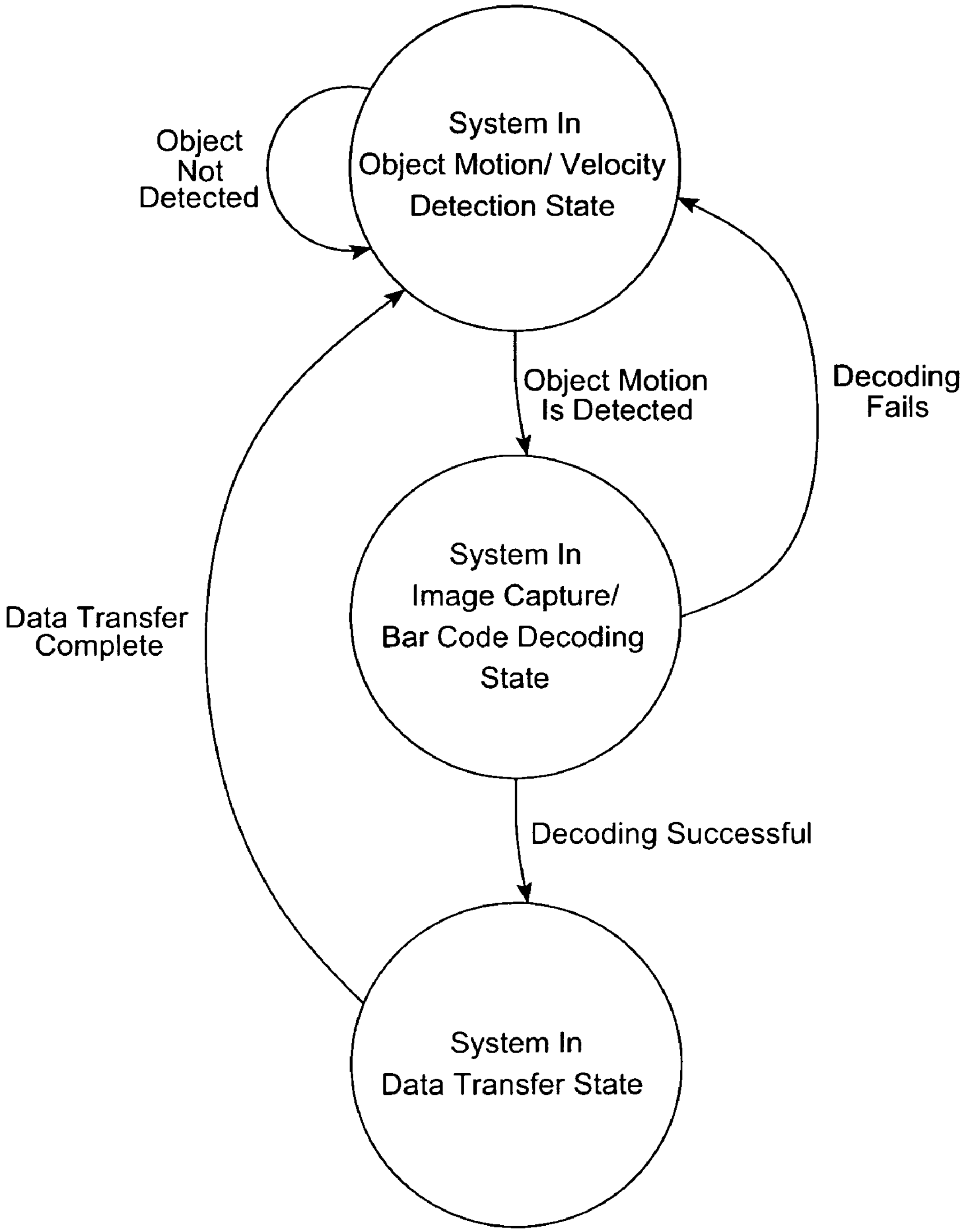
FIG. 8F is a state transition diagram for the omni-directional image capturing and processing based bar code symbol reading system in FIG. 8B, describing the state transitions that the system undergoes during operation.
Figure 8G:
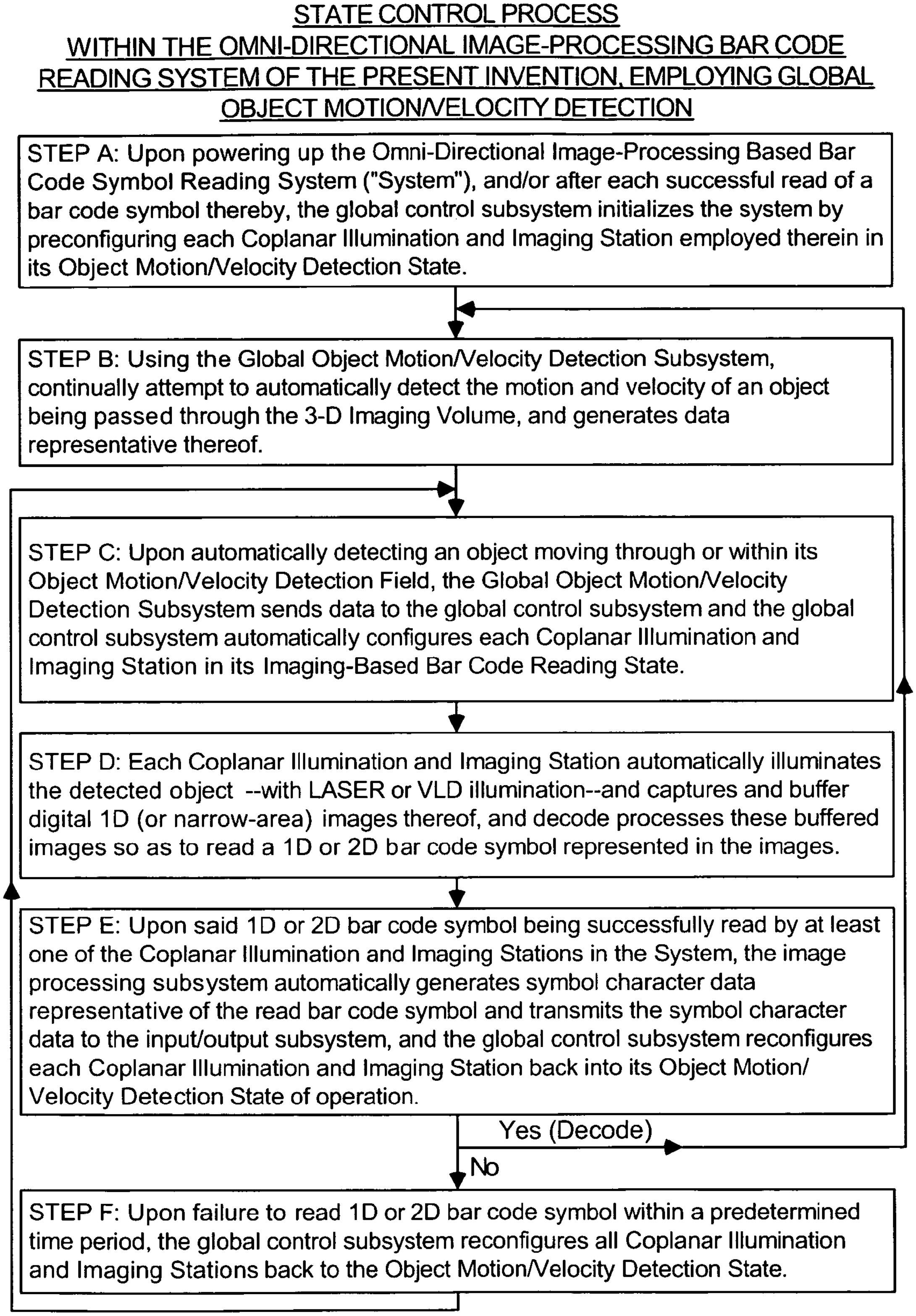
FIG. 8G is a high-level flow chart describing the operations that are automatically performed during the state control process carried out within the omni-directional image capturing and processing based bar code symbol reading system described in FIG. 8B.

Another fourth possible method supports a global control process. As shown in FIGS. 8F and 8G, the local control subsystem in each illumination and imaging station controls the operation of the subcomponents in the station, except for "state control" which is managed at the system level by the global control subsystem using "state data" generated by one or more object motion sensors (e.g. imaging based, ultrasonic energy based) provided at the system level within the 3D Imaging Volume of the system, in various possible locations. When using this method of global control, one or more Pulse-Doppler (IR) LIDAR subsystems (or even Pulse-Doppler SONAR subsystems) can be deployed in the system so that real-time object motion and velocity sensing can be achieved within the 3D imaging volume, or across a major section or diagonal thereof. Employing this method, captured object motion and velocity data can be used to adjust the illumination and/or exposure control parameters therein (e.g. the frequency of the clock signal used to read out image data from the linear image sensing array within the IFD subsystem in the station).

By continuously collecting or receiving updated motion and velocity data regarding objects present within 3-D imaging volume of the system, each illumination and imaging station is able to generate control data required to optimally control exposure and/or illumination control operations at the image sensing array of each illumination and imaging station employed within the system. Also, the system control process taught in Applicants' copending U.S. application Ser. No. 11/408,268, incorporated herein by reference, can also be used in combination with the system of the present invention to form and detect digital images during all modes of system operation using even the lowest expected levels of ambient illumination found in typical retail store environments.

In general, each coplanar illumination and imaging station 15 is able to automatically change its state of operation from Object Motion and Velocity Detection to Bar Code Reading in response to automated detection of an object with at least a portion of the FOV of its coplanar illumination and imaging plane. By virtue of this feature of the present invention, each coplanar illumination and imaging station in the system is able to automatically and intelligently direct LED or VLD illumination at an object only when and for so long as the object is detected within the FOV of its coplanar illumination and imaging plane. This intelligent capacity for local illumination control maximizes illumination being directed towards objects to be imaged, and minimizes illumination being directed towards consumers or the system operator during system operation in retail store environments, in particular.

In order to support automated object recognition functions (e.g. vegetable and fruit recognition) at the POS environment, image capturing and processing based object recognition subsystem 21 (i.e. including Object Libraries etc.) cooperates with the multi-channel image processing subsystem 20 so as to (i) manage and process the multiple channels of digital image frame data generated by the coplanar illumination and imaging stations 15, (ii) extract object features from processed digital images, and (iii) automatically recognize objects at the POS station which are represented in the Object Libraries of the object recognition subsystem 21.

Figure 2C:
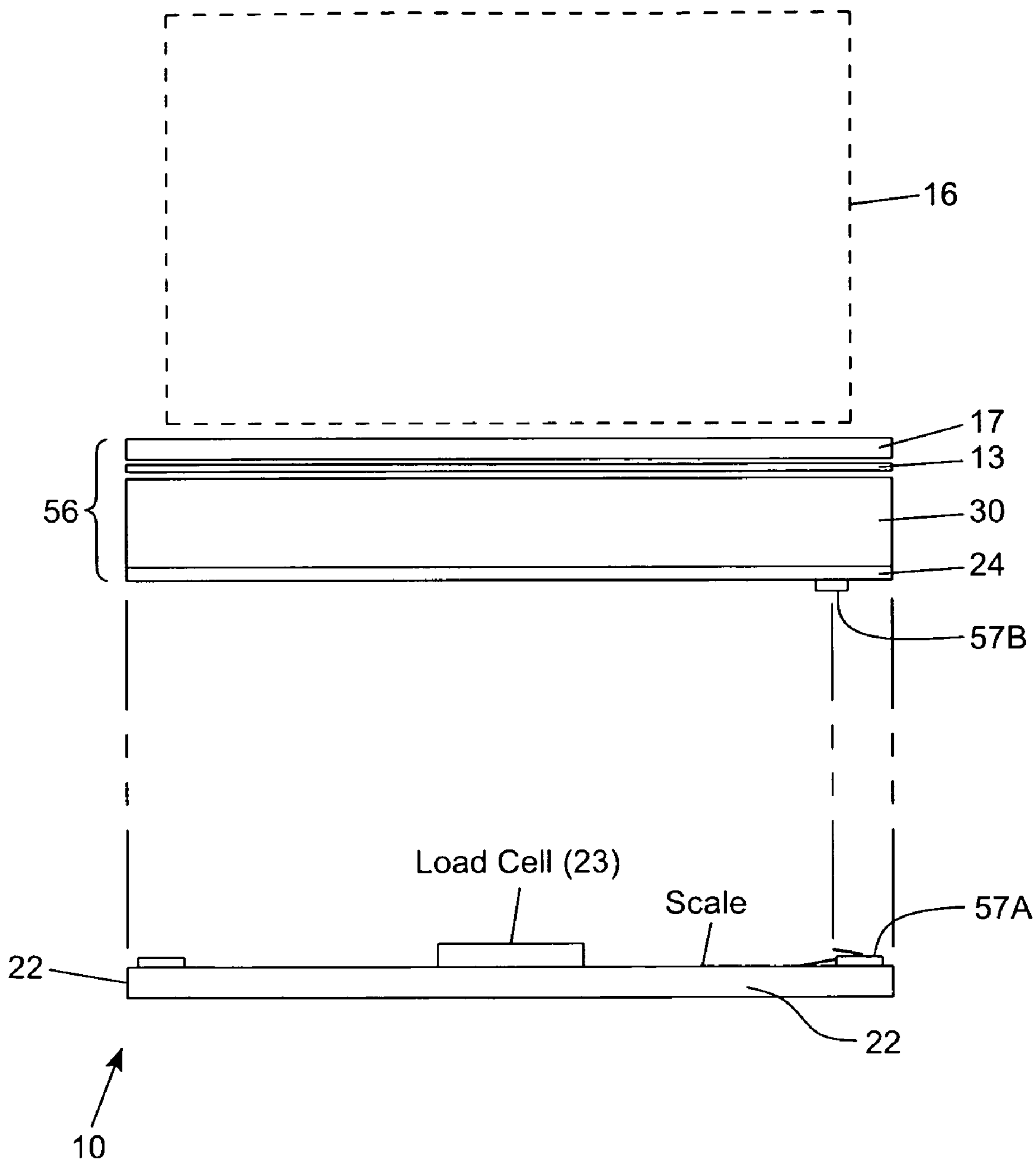
FIG. 2C is an elevated side view of the omni-directional image capturing and processing based bar code symbol reading system shown in FIG. 2B, wherein the image capturing and processing module is removed from the electronic weigh scale module during maintenance operations, revealing the centrally located load cell, and the touch-fit electrical interconnector arrangement of the present invention that automatically establishes all electrical interconnections between the two modules when the image capturing and processing module is placed onto the electronic weigh scale module, and its electronic load cell bears substantially all of the weight of the image capturing and processing module.

In the illustrative embodiments, the omni-directional image capturing and processing based bar code symbol reading system module of the present invention includes an integrated electronic weigh scale module 22, as shown in FIGS. 2A through 2C, which has a thin, tablet-like form factor for compact mounting in the countertop surface of the POS station. In addition to a complex of linear (or narrow-area) image sensing arrays, area-type image sensing arrays may also be used in combination with linear image sensing arrays in constructing omni-directional image capturing and processing based bar code symbol reading systems in accordance with the present invention, as shown in FIGS. 10 through 14G.

While laser illumination (e.g. VLD) sources have many advantages for generating coplanar laser illumination planes for use in the image capture and processing systems of the present invention (i.e. excellent power density and focusing characteristics), it is understood that speckle-pattern noise reduction measures will need to be practiced in most applications. In connection therewith, the advanced speckle-pattern noise mitigation methods and apparatus disclosed in Applicants' U.S. Pat. No. 7,028,899 B2, incorporated herein by reference in its entirety as if fully set forth herein, can be used to substantially reduce the runs power of speckle-noise power in digital imaging systems of the present invention employing coherent illumination sources.

In contrast, LED-based illumination sources can also be used as well to generate planar illumination beams (planes) for use in the image capture and processing systems of the present invention. Lacking high temporal and spatial coherence properties, the primary advantage associated with LED technology is lack of speckle-pattern noise. Some significant disadvantages with LED technology are the inherent limitations in focusing characteristics, and power density generation. Many of these limitations can be addressed in conventional ways to make LED arrays suitable for use in the digital image capture and processing systems and methods of the present invention.

In some embodiments, it may be desired to use both VLD and LED based sources of illumination to provide hybrid forms of illumination within the imaging-based bar code symbol reading systems of the present invention.

Having provided an overview on the system and methods of the present invention, it is appropriate at this juncture to now describe the various illustrative embodiments thereof in greater technical detail.

Illustrative Embodiment of the Omni-Directional Image Capturing and Processing Based Bar Code Symbol Reading System of the Present Invention Employing Plurality of Object Motion/Velocity Detectors in System In FIGS. 2 through 5F, an illustrative embodiment of the omni-directional image capturing and processing based bar code symbol reading system of the present invention 10 is shown integrated with electronic weigh scale 22, having a thin, tablet-like form factor for compact mounting in the countertop surface 2 of the POS station 1. As shown in FIG. 2A, imaging window protection plate 17 has a central X aperture pattern and a pair of parallel apertures aligned parallel to the sides of the system. These apertures permit the projection of a plurality of coplanar illumination and imaging planes 55 from a complex of coplanar illumination and imaging stations 15A through 15F mounted beneath the imaging window of the system. The primary functions of each coplanar laser illumination and imaging station 15 is to generate and project coplanar illumination and imaging planes 55 through the imaging window 13 and apertures 18 into the 3D imaging volume 16 of the system, and capture digital linear (1D) digital images along the field of view (FOV) of these illumination and linear imaging planes. These captured linear images are then buffered and decode-processed using linear (1D) type image capturing and processing based bar code reading algorithms, or can be assembled together to reconstruct 2D images for decode-processing using 1D/2D image processing based bar code reading techniques.

In FIG. 2A, the apertured imaging window protection plate 17 is shown easily removed from over the glass imaging window 13 of the omni-directional image capturing and processing based bar code symbol reading system, during routine glass imaging window cleaning operations.

As shown in FIGS. 2B and 2C, the image capturing and processing module 56 (having a thin tablet form factor and including nearly all subsystems depicted in FIG. 5A, except scale module 22) is shown lifted off and away from the electronic weigh scale module 22 during normal maintenance operations. In this configuration, the centrally located load cell 23 is revealed along with the touch-fit electrical interconnector arrangement 57 of the present invention that automatically establishes all electrical interconnections between the two modules when the image capturing and processing module 56 is placed onto the electronic weigh scale module 22, and its electronic load cell 23 bears substantially all of the weight of the image capturing and processing module 5.

Figure 2D:
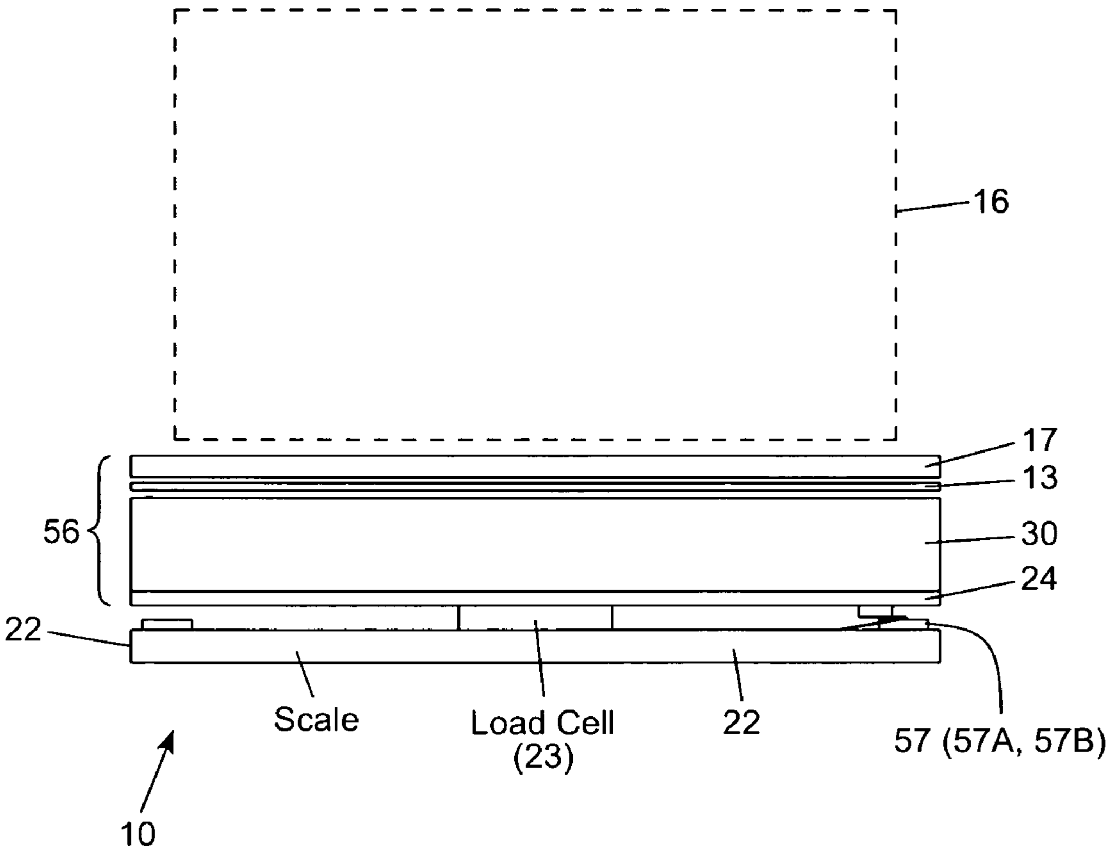
FIG. 2D is an elevated side view of the omni-directional image capturing and processing based bar code symbol reading system shown in FIG. 22, wherein side wall housing skirt is removed for illustration purposes to reveal how the load cell of the electronic weigh scale module directly bears all of the weight of the image capturing and processing module (and any produce articles placed thereon during weighing operations) while the touch-fit electrical interconnector arrangement of the present invention automatically establishes all electrical interconnections between the two modules.

In FIG. 2D, the load cell 23 of the electronic weigh scale module 22 is shown to directly bear all of the weight of the image capturing and processing module 56 (and any produce articles placed thereon during weighing operations), while the touch-fit electrical interconnector arrangement of the present invention 57 automatically establishes all electrical interconnections between the two modules.

In FIGS. 3A through 3F, the spatial arrangement of coplanar illumination and imaging planes are described in great detail for the illustrative embodiment of the present invention. The spatial arrangement and layout of the coplanar illumination and imaging stations within the system housing is described in FIGS. 4A through 5F. As shown, all coplanar illumination and imaging stations, including their optical and electronic-optical components, are mounted on a single printed-circuit (PC) board 58, mounted in the bottom portion of the system housing, and functions as an optical bench for the mounting of image sensing arrays, VLDs or LEDs, beam shaping optics, field of view (FOV) folding mirrors and the like, as indicated in FIGS. 4A through 5F.

The First Illustrative Embodiment of the Omni-Directional Image Processing Based Bar Code Symbol Reading System of the Present Invention, Employing Plurality of Imaging-Based Object Motion Velocity Detectors In System As shown in FIG. 6, each coplanar illumination and imaging plane projected within the 3D imaging volume of the system of the first illustrative embodiment has at least one spatially-co-extensive imaging-based object motion and velocity "field of view", that is supported by an imaging-based object motion/velocity detection subsystem in the station generating the coplanar illumination and imaging plane. The field of view of the imaging-based motion/velocity detection subsystem is supported during the Object Motion/Velocity Detection Mode of the station, and can be illuminated by ambient illumination, or illumination from VLDs and/or LEDs of the motion/velocity detection subsystem 49 of the image formation and detection subsystem 40. The function of the object motion/velocity detection field is to enable automatic control of illumination and exposure during the Bar Code Reading Modes of the stations in the system.

In FIG. 6B, the system architecture of the omni-directional image capturing and processing based bar code symbol reading system of FIG. 2 is shown comprising: a complex of coplanar illuminating and linear imaging stations 15A' through 15F', constructed using linear the illumination arrays and image sensing arrays shown in FIGS. 6A and 6B; a multi-processor (multi-channel) image processing subsystem 20 for supporting automatic image processing based bar code symbol reading and optical character recognition (OCR) along each coplanar illumination and imaging plane within the system, which corresponds to a single channel of the subsystem 20; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing, and a Checkpoint® EAS antenna); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 35A for connecting to Bluetooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15' transmits frames of image data to the image processing subsystem 25, for state-dependent image processing and the results of the image processing operations are transmitted to the host system via the input/output subsystem 20. In FIG. 6B, the bar code symbol reading module employed along each channel of the multi-channel image processing subsystem 20 can be realized using SwiftDecoder® Image Processing Based Bar Code Reading Software from Omniplanar Corporation, New Jersey, or any other suitable image processing based bar code reading software. Also, the system provides full support for (i) dynamically and adaptively controlling system control parameters in the digital image capture and processing system, as disclosed and taught in Applicants' PCT Application Serial No. PCT US 2007/009763 entitled "METHOD OF AND APPARATUS FOR DYNAMICALLY AND ADAPTIVELY CONTROLLING SYSTEM CONTROL PARAMETERS IN A DIGITAL IMAGE CAPTURE AND PROCESSING SYSTEM", as well as (ii) permitting modification and/or extension of system features and function, as disclosed and taught in PCT Application No. WO 2007/075519 entitled DIGITAL IMAGE CAPTURE AND PROCESSING SYSTEM PERMITTING MODIFICATION AND/OR EXTENSION OF SYSTEM FEATURES AND FUNCTIONS, both of which are incorporated herein by reference.

As shown in FIG. 6A, an array of VLDs or LEDS can be focused with beam shaping and collimating optics so as to concentrate their output power into a thin illumination plane which spatially coincides exactly with the field of view of the imaging optics of the coplanar illumination and imaging station, so very little light energy is wasted.

Each substantially planar illumination beam (PLIB) can be generated from a planar illumination array (PLIA) formed by a plurality of planar illumination modules (PLIMs) using either VLDs or LEDs and associated beam shaping and focusing optics, taught in greater technical detail in Applicants U.S. patent application Ser. Nos. 10/299,098 filed Nov. 15, 2002, now U.S. Pat. No. 6,898,184, and Ser. No. 10/989,220 filed Nov. 15, 2004, each incorporated herein by reference in its entirety. Preferably, each planar illumination beam (PLIB) generated from a PLIM in a PLIA is focused so that the minimum width thereof occurs at a point or plane which is the farthest object (or working) distance at which the system is designed to capture images within the 3D imaging volume of the system, although this principle can be relaxed in particular applications to achieve other design objectives.

As shown in FIGS. 6B, 6C, 6D and 6E1, each coplanar illumination and imaging station 15' employed in the system of FIGS. 2 and 6B comprises: an illumination subsystem 44' including a linear array of VLDs or LEDs 45 and associated focusing and cylindrical beam shaping optics (i.e. planar illumination arrays PLIAS), for generating a planar illumination beam (PLIB) 61 from the station; a linear image formation and detection (IFD) subsystem 40 having a camera controller interface (e.g. realized as a field programmable gate array or FPGA) for interfacing with the local control subsystem 50, and a high-resolution linear image sensing array 41 with optics 42 providing a field of view (FOV) 43 on the image sensing array that is coplanar with the PLIB produced by the linear illumination array 45, so as to form and detect linear digital images of objects within the FOV of the system; a local control subsystem 50 for locally controlling the operation of subcomponents within the station, in response to control signals generated by global control subsystem 37 maintained at the system level, shown in FIG. 6B; an image capturing and buffering subsystem 48 for capturing linear digital images with the linear image sensing array 41 and buffering these linear images in buffer memory so as to form 2D digital images for transfer to image-processing subsystem 20 maintained at the system level, as shown in FIG. 6B, and subsequent image processing according to bar code symbol decoding algorithms, OCR algorithms, and/or object recognition processes; a high-speed image capturing and processing based motion/velocity sensing subsystem 49' for motion and velocity data to the local control subsystem 50 for processing and automatic generation of control data that is used to control the illumination and exposure parameters of the linear image formation and detection system within the station. Details regarding the design and construction of planar illumination and imaging module (PLIIMs) can be found in Applicants' U.S. Pat. No. 7,028,899 B2, incorporated herein by reference.

As shown in FIGS. 6D, 6E1, the high-speed image capturing and processing based motion/velocity sensing subsystem 49' comprises: an area-type image acquisition subsystem 65 with an area-type image sensing array and optics shown in FIG. 6D for generating a field of view (FOV) that is preferably spatially coextensive with the longer dimensions of the FOV 43 of the linear image formation and detection subsystem 40 as shown in FIG. 6B; an area-type (IR) illumination array 66 for illuminating the FOV of motion/velocity detection subsystem 49'; and an embedded digital signal processing (DSP) image processor 67, for automatically processing 2D images captured by the digital image acquisition subsystem. The DSP image processor 67 processes captured images so as to automatically abstract, in real-time, motion and velocity data from the processed images and provide this motion and velocity data to the local control subsystem 50 for the processing and automatic generation of control data that is used to control the illumination and exposure parameters of the linear image formation and detection system within the station.

In the illustrative embodiment shown in FIGS. 2 through 6C, each image capturing and processing based motion/velocity sensing subsystem 49' continuously and automatically computes the motion and velocity of objects passing through the planar FOV of the station, and uses this data to generate control signals that set the frequency of the clock signal used to read out data from the linear image sensing array 41 employed in the linear image formation and detection subsystem 40 of the system. In FIGS. 6E2 and 6E3, two versions of the image capturing and processing based motion/velocity sensing subsystem 49' of FIG. 6E1 are schematically illustrated, in the context of (i) capturing images of objects passing through the FOV of the image formation and detection subsystem 40, (ii) generating motion and velocity data regarding the objects, and (iii) controlling the frequency of the clock signal used to read out data from the linear image sensing array 41 employed in the linear image formation and detection subsystem 40 of the system.

In FIG. 6E3, the image capturing and processing based motion/velocity sensing subsystem 49' employs an area-type image sensing array 69 to capture images of objects passing through the FOV of the linear image formation and detection subsystem 40. Then, DSP-based image processor 67 computes motion and velocity data regarding object(s) within the FOV of the linear image formation and detection subsystem 40, and this motion and velocity data is then provided to the local subsystem controller 50 so that it can generate (i.e. compute) control data for controlling the frequency of the clock signal used in reading data out of the linear image sensing array of the image formation and detection subsystem. An algorithm for computing such control data, based on sensed 2D images of objects moving through (at least a portion of) the FOV of the linear image formation and detection subsystem 40, will now be described in detail below with reference to the process diagram described in FIG. 6E2, and the schematic diagram set forth in FIG. 6E3.

As indicated at Blocks A, B and C in FIG. 6E2, object motion detected on the linear sensing array of the IFD subsystem (dX, dY) is calculated from the motion detected by images captured by the motion/velocity sensing subsystem (dX', dY') using the equations (1) and (2) as follows:

$$dX = F(dX', \theta_p, n_1, p_1, n_2, p_2) = \frac{n_2 p_2}{n_1 p_1}(dX'\cos\theta_p - dY'\sin\theta_p) \quad (1)$$

$$dY = G(dY', \theta_p, n_1, p_1, n_2, p_2) = \frac{n_2 p_2}{n_1 p_1}(dX'\sin\theta_p + dY'\cos\theta_p) \quad (2)$$

where $\theta_P$ is the projection angle, which is the angle between the motion/velocity detection subsystem 49' (dX', dY') and the linear image sensing array 41 in the IFD subsystem 40 (dX, dY), $n_1$ is the pixel number of the image sensing array in the motion/velocity detection subsystem, $p_1$ is the size of image sensing element 69 in the motion/velocity detection subsystem 49' in FIG. 6D, $n_2$ is the pixel number of the linear image sensing array 41 employed in the image formation and detection subsystem 40, and $p_2$ is the pixel size of the linear image sensing array 41 employed in the image formation and detection (IFD) subsystem 40.

As indicated at Block D in FIG. 6E2, the velocity of the object on the linear sensing array 41 of the IFD subsystem is calculated using Equations Nos. (3), (4), (5) below:

$$V_x = \frac{dX}{dt'} \quad (3)$$

$$V_y = \frac{dY}{dt'} \quad (4)$$

$$\theta = \arctan\left(\frac{V_y}{V_x}\right) \quad (5)$$

where dt' is the timing period from the motion/velocity sensing subsystem illustrated in FIG. 6D. As indicated at Block E in FIG. 6E2, the frequency of the clock signal $f$ in the IFD subsystem is computed using a frequency control algorithm which ideally is expressed as a function of the following system parameters:

$$f = H(p_2, V_x, V_y, \theta, dt')$$

While there are various possible ways of formulating the frequency control algorithm, based on experiment and/or theoretic study, the simplest version of the algorithm is given expression No. (6) below:

$$f = \frac{V_y}{k p_2} \quad (6)$$

where k is a constant decided by the optical system providing the FOV of the image capturing and processing based motion/velocity detection subsystem 49', illustrated in FIG. 6D.

As indicated at Block F, the frequency of the clock signal used to clock data out from the linear image sensing array in the IFD subsystem is then adjusted using the computed clock frequency $f$.

In FIG. 6E4, the image capturing and processing based motion/velocity detection subsystem 49' employs a linear-type image sensing array 70 to capture images of objects passing through the FOV of the linear image formation and detection subsystem. Then, DSP-based image processor 67 computes motion and velocity data regarding object(s) within the FOV of the linear image formation and detection (IFD) subsystem 40, and this motion and velocity data is then provided to the local subsystem controller 50 so that it can generate (i.e. compute) control data for controlling the frequency of the clock signal used in reading data out of the linear image sensing array of the image formation and detection subsystem. The frequency control algorithm described above can be used to control the clock frequency of the linear image sensing array 41 employed in the IFD subsystem 40 of the system.

While the system embodiments of FIGS. 6E2, 6E3 and 6E4 illustrate controlling the clock frequency in the image formation and detection subsystem 40, it is understood that other camera parameters, relating to exposure and/or illumination, can be controlled in accordance with the principles of the present invention.

When any one of the coplanar illumination and imaging stations is configured in its Object Motion/Velocity Detection State, there is the need to illuminate to control the illumination that is incident upon the image sensing array employed within the object motion/velocity detector subsystem 49' shown in FIGS. 6C and 6D. In general, there are several ways to illuminate objects during the object motion/detection mode (e.g. ambient, laser, LED-based), and various illumination parameters can be controlled while illuminating objects being imaged by the image sensing array 41 of the object motion/velocity detection subsystem 49' employed at any station in the system. Also, given a particular kind of illumination employed during the Object Motion/Velocity Detection Mode, there are various illumination parameters that can be controlled, namely: illumination intensity (e.g. low-power, half-power, full power); illumination beam width (e.g. narrow beam width, wide beam width); and illumination beam thickness (e.g. small beam thickness, large beam thickness). Based on these illumination control parameters, several different illumination control methods can be implemented at each illumination and imaging station in the system.

For example, methods based illumination source classification include the following: (1) Ambient Control Method, wherein ambient lighting is used to illuminate the FOV of the image sensing array 69, 70 in the object motion/velocity detecting subsystem 49' subsystem/system during the object motion/velocity detection mode and bar code symbol reading mode of subsystem operation; (2) Low-Power Illumination Method, wherein illumination produced from the LED or VLD array of a station is operated at half or fractional power, and directed into the field of view (FOV) of the image sensing array employed in the object motion/velocity detecting subsystem 49'; and (3) Full-Power Illumination Method, wherein illumination is produced by the LED or VLD array of the station-operated at half or fractional power—and directed in the field of view (FOV) of the image sensing array employed in the object motion/velocity detecting subsystem 49'.

Methods based on illumination beam thickness classification include the following: (1) Illumination Beam Width Method, wherein the thickness of the planar illumination beam (PLIB) is increased so as to illuminate more pixels (e.g. 3 or more pixels) on the image sensing array of the object motion/velocity detecting subsystem 49' when the station is operated in Object Motion/Velocity Detection Mode. This method will be useful when illuminating the image sensing array of the object motion/velocity detecting subsystem 49' using, during the Bar Code Reading Mode, planar laser or LED based illumination having a narrow beam thickness, insufficient to illuminate a sufficient number of pixel rows in the image sensing array of the motion/velocity detector 49.

Three different methods are disclosed below for controlling the operations of the image capture and processing system of the present invention. These methods will be described below.

The first method, described in FIGS. 6F1 and 6G1A and 6G1B, can be thought of as a Distributed Local Control Method, wherein at each illumination and imaging station, the local control subsystem 50 controls the function and operation of the components of the illumination and imaging subsystem 50, and sends state data to the global control subsystem for "state management" at the level of system operation, but not "state control", which is controlled by the local control system. As used herein, the term "state management" shall mean to keep track of or monitoring the state of a particular station, whereas the term "state control" shall mean to determine or dictate the operational state of a particular station at an moment in time.

The second control method described in FIGS. 6F2, 6G2A and 6G2B can be thought of as a Distributed Local Control Method with Global Nearest-Neighboring Station Over-Ride Control, wherein the local control subsystems 50 start out controlling their local functions and operations until an object is detected, whereupon the local control subsystem automatically sends state data to the global control subsystem for state management at the level of system operation, as well as for over-riding the control functions of local control subsystems employed within other illumination and imaging stations in the system. This method allows the global control subsystem 37 to drive one or more other stations in the system to the bar code reading state upon receiving state data when a local control subsystem has detected an object and its motion and velocity are computed/estimated. This global control subsystem 37 can drive "nearest neighboring" stations in the system to their bar code reading state (i.e. image capturing and decode-processing) as in the case of FIGS. 6F3, 6G3A and 6G3B.

The third control method described in FIGS. 6F3, 6G3A and 6G3B can be thought of as a Distributed Local Control Method with Global All Neighboring Station Over-Ride Control, wherein the local control subsystems start out controlling their local functions and operations until an object is detected, whereupon the local control subsystem 50 automatically sends state data to the global control subsystem 37 for state management at the level of system operation, as well as for over-riding the control functions of local control subsystems employed within other illumination and imaging stations in the system. This method allows the global control subsystem 37 to drive one or more other stations in the system to the bar code reading state upon receiving state data when a local control subsystem has detected an object and its motion and velocity are computed/estimated. This global control subsystem can drive "all neighboring" stations in the system to their bar code reading state (i.e. image capturing and decode-processing) as in the case of FIGS. 6F3, 6G3A and 6G3B.

The fourth system control method, described in FIGS. 8F and 8G, can be through of as a Global Control Method, wherein the local control subsystem in each illumination and imaging station controls the operation of the subcomponents in the station, except for "state control" which is managed at the system level by the global control subsystem 37 using "state data" generated by one or more object motion sensors (e.g. imaging based, ultra-sonic energy based) provided at the system level within the 3D imaging volume of the system, in various possible locations. When using this method of control, it might be desirable to deploy imaging-based object motion and velocity sensors as shown in FIG. 8A, or IR Pulse-Doppler LIDAR sensors as shown in FIG. 8B, or even ultrasonic Pulse-Doppler SONAR sensors as applications may require, so that real-time object motion and velocity sensing can be achieved within the entire 3D imaging volume, or across one or more sections or diagonals thereof. With such provisions, object motion and velocity data can be captured and distributed (in real-time) to each illumination and imaging station (e.g. via the global control subsystem 37) for purposes of adjusting the illumination and/or exposure control parameters therein (e.g. the frequency of the clock signal used to read out image data from the linear image sensing array within the IFD subsystem in each station) during system operation.

Having described four primary classes of control methods that might be used to control the operations of systems of the present invention, it is appropriate at this juncture to describe the first three system control methods in greater technical detail, with reference to corresponding state transition diagrams and system flow control charts.

As shown in FIG. 6F1, a state transition diagram is provided for the omni-directional image capturing and processing based bar code symbol reading system described in FIGS. 6 and 6C, running the system control program described in flow charts of FIGS. 6G1A and 6G1B, with locally-controlled imaging-based object motion/velocity detection provided in each coplanar illumination and imaging subsystem of the system, as illustrated in FIG. 6. The flow chart of FIGS. 6G1A and 6G1B describes the operations (i.e. tasks) that are automatically performed during the state control process of FIG. 6F1, which is carried out within the omni-directional image capturing and processing based bar code symbol reading system described in FIGS. 6 and 6C.

At Step A in FIG. 6G1A, upon powering up the Omni-Directional Image capturing and processing based Bar Code Symbol Reading System ("System") 10A, and/or after each successful read of a bar code symbol thereby, the global control subsystem initializes the system by preconfiguring each Coplanar Illumination and Imaging Station employed therein in its Object Motion/Velocity Detection State.

As indicated at Step B in FIG. 6G1A, at each Coplanar Illumination and Imaging Station 15' currently configured in its Object Motion/Velocity Detection State, the object motion/velocity detection subsystem 49' continuously captures linear (1D) images along the Imaging-Based Object Motion/Velocity Detection Field of the station (coincident with the FOV of the IFD subsystem) and automatically processes these captured images so as to automatically detect the motion and velocity of an object being passed through the 3D imaging volume of the station and generate data representative thereof. From this data, the local control subsystem generates control data for use in controlling the exposure and/or illumination processes at coplanar illumination and imaging station (e.g. the frequency of the clock signal used in the IFD subsystem).

During the Object Motion/Velocity Detection State, the motion/velocity detection subsystem 49' provided at each coplanar illumination and imaging station can capture 2D images of objects within the 3D imaging volume, using ambient lighting, or using lighting generated by the (VLD and/or LED) illumination arrays employed in either the object motion/velocity detection subsystem 49' or within the illumination subsystem itself. In the event illumination sources within the illumination subsystem are employed, then these illumination arrays are driven at the lowest possible power level so as to not produce effects that are visible or conspicuous to consumers who might be standing at the POS, near the system of the present invention.

As indicated at Step C in FIG. 6G1A, for each Coplanar Illumination and Imaging Station 15' that automatically detects an object moving through or within its Imaging-based Object Motion/Velocity Detection Field, its local control subsystem 50 automatically configures the coplanar illumination and imaging station into its Imaging-Based Bar Code Reading Mode (State).

During the Imaging-Based Bar Code Reading Mode (State), the illumination arrays of the illumination subsystem 44 are preferably driven at full power. Optionally, in some applications, the object motion/velocity detection subsystem can be permitted to simultaneously collect (during the bar code reading state) updated object motion and sensing data for dynamically controlling the exposure and illumination parameters of the IFD Subsystem 40.

As indicated at Step D in FIG. 6G1B, from each coplanar illumination and imaging station currently configured in its Imaging-Based Bar Code Symbol Reading State, the station automatically illuminates the detected object, with laser or VLD illumination (as the case may be), and captures and buffers digital 1D images thereof, and transmits these reconstructed 2D images to the global multi-processor image processing subsystem 20 for processing these buffered images so as to read a 1D or 2D bar code symbol represented in the images.

As indicated at Step E of FIG. 6G1B, upon the 1D or 2D bar code symbol being successfully read by at least one of the coplanar illumination and imaging stations in the system, the image processing subsystem 20 automatically generates symbol character data representative of the read bar code symbol, transmits the symbol character data to the input/output subsystem, and the global control subsystem reconfigures each coplanar illumination and imaging station back into its Object Motion/Velocity Detection State and returns to Step B, so that the system can resume detection of object motion and velocity within the 3D imaging volume of the system.

As indicated at Step F in FIG. 6G1B, upon failure to read at least 1D or 2D bar code symbol within a predetermined time period (from the time an object has been detected within the 3D imaging volume), the local control subsystem 50 reconfigures the coplanar illumination and imaging station to its Object Motion and Velocity Detection State at Step B, to collect and update object motion and velocity data (and derive control data for exposure and/or illumination control).

As shown in FIG. 6F2, a state transition diagram is provided for the omni-directional image capturing and processing based bar code symbol reading system described in FIGS. 6 and 6C, running the system control program described in flow charts of FIG. 6G2A and 6G2B, employing locally-controlled object motion/velocity detection in each coplanar illumination and imaging subsystem of the system, with globally-controlled over-driving of nearest-neighboring stations. The flow chart of FIGS. 6G2A and 6G2B describes the operations (i.e. tasks) that are automatically performed during the state control process of FIG. 6F2, which is carried out within the omni-directional image capturing and processing based bar code symbol reading system described in FIGS. 6 and 6C.

At Step A in FIG. 6G2A, upon powering up the Omni-Directional Image capturing and processing based Bar Code Symbol Reading System ("System"), and/or after each successful read of a bar code symbol thereby, the global control subsystem initializes the system by pre-configuring each Coplanar Illumination and Imaging Station employed therein in its Object Motion/Velocity Detection State.

As indicated at Step B in FIG. 6G2A, at each Coplanar Illumination and Imaging Station currently configured in its Object Motion/Velocity Detection State, the object motion/velocity detection subsystem 49' continuously captures linear (1D) images along the Imaging-Based Object Motion/Velocity Detection Field of the station (coincident with the FOV of the IFD subsystem) and automatically processes these captured images so as to automatically detect the motion and velocity of an object being passed through the 3D imaging volume of the station and generate data representative thereof. From this data, the local control subsystem generates control data for use in controlling the exposure and/or illumination processes at coplanar illumination and imaging station (e.g. the frequency of the clock signal used in the IFD subsystem).

During the Object Motion/Velocity Detection State, the motion/velocity detection subsystem 49' can capture 2D images of objects within the 3D imaging volume, using ambient lighting, or using lighting generated by the (VLD and/or LED) illumination arrays, employed in either the object motion/velocity detection subsystem 49' or within the illumination subsystem. In the event illumination sources within the illumination subsystem are employed, then these illumination arrays are driven at the lowest possible power level so as to not produce effects that are visible or conspicuous to consumers who might be standing at the POS, near the system of the present invention.

As indicated at Step C in FIG. 6G2A, for each Coplanar Illumination and Imaging Station that automatically detects an object moving through or within its Imaging-based Object Motion/Velocity Detection Field, its local control subsystem 50 automatically configures the Coplanar Illumination and Imaging Station into its Imaging-Based Bar Code Reading Mode (State), and transmits "state data" to the global control subsystem for automatically over-driving "nearest neighboring" coplanar illumination and imaging subsystems into their Bar Code Reading State.

During the Imaging-Based Bar Code Reading Mode (State), the illumination arrays of the illumination subsystem 44 at the station are preferably driven at full power. Optionally, in some applications, the object motion/velocity detection subsystem 49' can be permitted to simultaneously collect (during the Bar Code Reading State) updated object motion and velocity data, for use in dynamically controlling the exposure and illumination parameters of the IFD Subsystem.

As indicated at Step D in FIG. 6G2B, from each Coplanar Illumination and Imaging Station currently configured in its Imaging-Based Bar Code Symbol Reading State, the station automatically illuminates the detected object with laser or VLD illumination (as the case may be), and captures and buffers digital 1D images thereof, and then transmits reconstructed 2D images to the global multi-processor image processing subsystem 20 (or a local image processing subsystem in some embodiments) for processing these buffered images so as to read a 1D or 2D bar code symbol represented in the images.

As indicated at Step E of FIG. 6G2B, upon a 1D or 2D bar code symbol being successfully read by at least one of the Coplanar Illumination and Imaging Stations in the system, the image processing subsystem automatically generates symbol character data representative of the read bar code symbol, transmits the symbol character data to the input/output subsystem, and the global control subsystem 37 then reconfigures each Coplanar Illumination and Imaging Station back into its Object Motion/Velocity Detection State (and returns to Step B) so that the system can resume automatic detection of object motion and velocity within the 3D imaging volume of the system.

As indicated at Step F in FIG. 6G2B, upon failure to read at least 1D or 2D bar code symbol within a predetermined time period (from the time an object has been detected within the 3D imaging volume), the local control subsystem 50 reconfigures the coplanar illumination and imaging station to its Object Motion and Velocity Detection State, to collect and update object motion and velocity data (and derive control data for exposure and/or illumination control), and then returns to Step B.

As shown in FIG. 6F3, a state transition diagram is provided for the omni-directional image capturing and processing based bar code symbol reading system described in FIGS. 2, 6 and 6C, running the system control program described in flow charts of FIGS. 6G3A and 6G3B, employing locally-controlled object motion/velocity detection in each coplanar illumination and imaging subsystem of the system, with globally-controlled over-driving of all-neighboring stations. The flow chart of FIGS. 6G3A and 6G3B describes the operations (i.e. tasks) that are automatically performed during the state control process of FIG. 6F3, which is carried out within the omni-directional image capturing and processing based bar code symbol reading system described in FIGS. 6 and 6C.

At Step A in FIG. 6G3A, upon powering up the Omni-Directional Image capturing and processing based Bar Code Symbol Reading System ("System"), and/or after each successful read of a bar code symbol thereby, the global control subsystem initializes the system by pre-configuring each Coplanar Illumination and Imaging Station employed therein in its Object Motion/Velocity Detection State.

As indicated at Step B in FIG. 6G3A, at each Coplanar Illumination and Imaging Station currently configured in its Object Motion/Velocity Detection State, the object motion/velocity detection subsystem 49' continuously captures linear (1D) images along the Imaging-Based Object Motion/Velocity Detection Field of the station (coincident with the FOV of the IFD subsystem) and automatically processes these captured images so as to automatically detect the motion and velocity of an object being passed through the 3D imaging volume of the station and generate data representative thereof. From this data, the local control subsystem generates control data for use in controlling the exposure and/or illumination processes at coplanar illumination and imaging station (e.g. the frequency of the clock signal used in the IFD subsystem).

During the Object Motion/Velocity Detection State, the motion/velocity detection subsystem 49' can capture 2D images of objects within the 3D imaging volume, using ambient lighting or light generated by the (VLD and/or LED) illumination arrays employed in either the object motion/velocity sensing subsystem or within the illumination subsystem. In the event illumination sources within the illumination subsystem are employed, then these illumination arrays are preferably driven at the lowest possible power level so as to not produce effects that are visible or conspicuous to consumers who might be standing at the POS, near the system of the present invention.

As indicated at Step C in FIG. 6G2A, for each Coplanar Illumination and Imaging Station that automatically detects an object moving through or within its Imaging-based Object Motion/Velocity Detection Field, its local control subsystem 50 automatically configures the Coplanar Illumination and Imaging Station into its Imaging-Based Bar Code Reading Mode (State), and transmits "state data" to the global control subsystem for automatically over-driving "all neighboring" coplanar illumination and imaging subsystems into their Bar Code Reading State.

During the Imaging-Based Bar Code Reading Mode (State), the illumination arrays of the illumination subsystem 44 are preferably driven at full power. Optionally, the object motion/velocity detection subsystem can be permitted to simultaneously collect (during the Bar Code Reading State) updated object motion and sensing data for dynamically controlling the exposure and illumination parameters of the IFD Subsystem.

As indicated at Step D in FIG. 6G3B, from each Coplanar Illumination and Imaging Station currently configured in its Imaging-Based Bar Code Symbol Reading State, the station automatically illuminates the detected object, with laser or VLD illumination (as the case may be), and captures and buffers digital 1D images thereof, and transmits these reconstructed 2D images to the global image processing subsystem 20 for processing these buffered images so as to read a 1D or 2D bar code symbol represented in the images.

As indicated at Step E of FIG. 6G3B, upon the 1D or 2D bar code symbol being successfully read by at least one of the Coplanar Illumination and Imaging Stations in the System, the image processing subsystem automatically generates symbol character data representative of the read bar code symbol, transmits the symbol character data to the input/output subsystem, and the global control subsystem 37 reconfigures each Coplanar Illumination and Imaging Station back into its Object Motion/Velocity Detection State and returns to Step B, so that the system can resume automatic detection of object motion and velocity within the 3D imaging volume of the system.

As indicated at Step F in FIG. 6G3B, upon failure to read at least 1D or 2D bar code symbol within a predetermined time period (from the time an object has been detected within the 3D imaging volume), the local control subsystem 50 reconfigures the coplanar illumination and imaging station to its Object Motion and Velocity Detection State at Step B, to collect and update object motion and velocity data (and derive control data for exposure and/or illumination control).

FIG. 6H describes an exemplary embodiment of a computing and memory architecture platform that can be used to implement the omni-directional image capturing and processing based bar code symbol reading system described in FIGS. 6 and 6C. As shown, this hardware computing and memory platform can be realized on a single PC board 58, along with the electro-optics associated with the illumination and imaging stations and other subsystems described in FIGS. 6G1A through 6G3B, and therefore functioning as an optical bench as well. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

FIG. 6I describes a three-tier software architecture that can run upon the computing and memory architecture platform of FIG. 6H, so as to implement the functionalities of the omni-directional image capturing and processing based bar code symbol reading system described FIGS. 6 and 6C. Details regarding the foundations of this three-tier architecture can be found in Applicants' copending U.S. patent Ser. No. 11/408,268, incorporated herein by reference. Preferably, the Main Task and Subordinate Task(s) that would be developed for the Application Layer would carry out the system and subsystem functionalities described in the State Control Processes of FIGS. 6G1A through 6G3B, and State Transition Diagrams. In an illustrative embodiment, the Main Task would carry out the basic object motion and velocity detection operations supported within the 3D imaging volume by each of the coplanar illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The Second Illustrative Embodiment of the Omni-Directional Image capturing and processing based Bar Code Symbol Reading System of the Present Invention, Employing IR Pulse-Doppler LIDAR Based Object Motion/Velocity Detectors in Each Coplanar Illumination and Imaging Subsystem Thereof In FIG. 6', a second alternative embodiment of the omni-directional image capturing and processing based bar code symbol reading system present invention is shown removed from its POS environment, with one coplanar illumination and imaging plane being projected through an aperture in its imaging window protection plate. In this illustrative embodiment, each coplanar illumination and imaging plane projected through the 3D imaging volume of the system has a plurality of IR Pulse-Doppler LIDAR based object motion/velocity sensing beams (A, B, C) that are spatially coincident therewith, for sensing in real-time the motion and velocity of objects passing therethrough during system operation. As shown in greater detail, the of IR Pulse-Doppler LIDAR based object motion/velocity sensing beams (A, B, C) are generated from a plurality of IR Pulse-Doppler LIDAR motion/velocity detection subsystems, which can be realized using a plurality of IR Pulse-Doppler LIDAR motion/velocity sensing chips mounted along the illumination array provided at each coplanar illumination and imaging station in the system. In FIG. 6A', three such IR Pulse-Doppler LIDAR motion/velocity sensing chips (e.g. Philips PLN2020 Twin-Eye 850 nm IR Laser-Based Motion/Velocity Sensor System in a Package (SIP)) are employed in each station in the system to achieve coverage of over substantially the entire field of view of the station. Details regarding this subsystem are described in FIGS. 6D1', 6D2' and 6E3' and corresponding portions of the present patent specification.

As shown in FIG. 6B', the omni-directional image capturing and processing based bar code symbol reading system 10B comprises: complex of coplanar illuminating and linear imaging stations 15A" through 15F" constructed using the illumination arrays and linear (CCD or CMOS based) image sensing arrays shown in FIG. 6A'; a multi-processor image processing subsystem 20 for supporting automatic image processing based bar code symbol reading and optical character recognition (OCR) along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including a Sensormatic® EAS tag deactivation block integrated in system housing, and a Checkpoint® EAS antenna); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Blue-tooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15" transmits frames of image data to the image processing subsystem 25, for state-dependent image processing and the results of the image processing operations are transmitted to the host system via the input/output subsystem 20. The bar code symbol reading module employed along each channel of the multi-channel image processing subsystem 20 can be realized using SwiftDecoder® Image Processing Based Bar Code Reading Software from Omniplanar Corporation, West Deptford, New Jersey, or any other suitable image processing based bar code reading software. Also, the system provides full support for (i) dynamically and adaptively controlling system control parameters in the digital image capture and processing system, as disclosed and taught in Applicants' PCT Application Serial No. PCT/US2007/009763, as well as (ii) permitting modification and/or extension of system features and function, as disclosed and taught in PCT Application No. WO 2007/075519, supra.

As shown in FIG. 6C', each coplanar illumination and imaging station 15" employed in the system embodiment of FIG. 6B', comprises: a planar illumination array (PLIA) 44; a linear image formation and detection subsystem 40; an image capturing and buffering subsystem 48, at least one high-speed IR Pulse-Doppler LIDAR based object motion/velocity detecting (i.e. sensing) subsystem 49'; and a local control subsystem 50.

In the illustrative embodiment of FIG. 6', each IR Pulse-Doppler LIDAR based object motion/velocity sensing subsystem 49" can be realized using a high-speed IR Pulse-Doppler LIDAR based motion/velocity sensor (e.g. Philips PLN2020 Twin-Eye 850 nm IR Laser-Based Motion/Velocity Sensor (SIP). The purpose of this subsystem 49" is to (i) detect whether or not an object is present within the FOV at any instant in time, and (ii) detect the motion and velocity of objects passing through the FOV of the linear image sensing array, for ultimately controlling camera parameters in real-time, including the clock frequency of the linear image sensing array.

As shown in FIG. 6D1', the IR Pulse-Doppler LIDAR based object motion/velocity detection subsystem 49" comprises: an IR Pulse-Doppler LIDAR transceiver 80 for transmitting IR LIDAR signals towards an object in the field of the view of the station, and receiving IR signals that scatter at the surface of the object; and an embedded DSP processor (i.e. ASIC) for processing received IR Pulse-Doppler signals (on the time and/or frequency domain), so as to abstract motion and velocity data relating to the target object. IR Pulse-Doppler LIDAR transceiver 80 provides generated motion and velocity data to the local control subsystem 50, for processing to produce control data that is used to control aspects of operation the illumination subsystem 44, and/or the linear image formation and detection subsystem 40.

As shown in FIG. 6D2', the IR Pulse-Doppler LIDAR based object motion/velocity detection subsystem 49" comprises: a pair of IR (e. 850 nm wavelength) laser diodes 92A and 92B; a pair of laser diode drive/detection circuits 93A and 93B for driving laser diodes 92A and 92B, respectively; optics 94 for laser shaping and collimating a pair of pulse-modulated IR laser beam signals 95A and 95B towards a target 96 in a reference plane within the 3D imaging volume of the system, so as to perform velocity measurements over a distance of a meter or more within the 3D imaging volume; an integrator triangle modulation source 97 for supplying triangle modulation signals to the laser drives circuits; and digital signal processing (DSP) processor 81, realized as an ASIC, for processing the output from the laser drive/detection circuits 93A and 93B. The Philips PLN2020 Twin-Eye 850 nm IR Laser-Based Motion/Velocity Sensor SIP can meet the requirements of the IR Pulse-Doppler LIDAR based object motion/velocity detection subsystem 49"

By utilizing interferometry techniques normally applied in high-performance professional applications, the IR Pulse-Doppler LIDAR Motion/Velocity Sensor SIP leverages the latest developments in solid-state lasers, digital signal processing and system in a package (SIP) technology to achieve unparalleled resolution and accuracy for position/velocity sensing in consumer-product applications. Preferably, the IR Laser-Based Motion/Velocity Sensor SIP is capable of (i) detecting the movement of any surface that scatters infrared (IR) radiation, (ii) resolving these movements down to a level of less than 1 μm, and (iii) tracking object velocities of several meters per second and accelerations up to 10 g.

During operation of sensor 49", the pair of solid-state lasers 92A and 92B generate a pair of pulsed (850-nm wavelength) infrared laser beams 95A and 95B that are collimated by optics 94 and projected into the 3-D imaging volume of the system for incidence with the surface of target objects passing therethrough, whose position/velocity is to be automatically measured in for real-time illumination and/or exposure control purposes. The IR laser light produced from each laser beam is scattered by the target surface, resulting in some of the light returning to the sensor and re-entering the laser source, where it optically mixes with the light being generated by the laser, along its channel (L or R). Motion of the target object towards or away from the laser source causes a Doppler shift in the frequency of the returning laser light. This Doppler shift is proportional to the speed of object motion. Optical mixing between the returning IR light and that being generated in the laser source therefore results in fluctuations in the laser power at a frequency proportional to the speed of the target 96. These power fluctuations are sensed by a photodiode that is optically coupled to the laser diode.

While such self-mixing in IR laser diodes 92A and 92B allows measurement of the Doppler shift frequency and subsequent calculation of the target surface velocity along different channels (L, R), it does not yield information about whether the target object is moving towards or away from the IR laser source 97. To identify object direction, the laser power is modulated with a low-frequency triangular waveform from source 97 resulting in corresponding changes in laser temperature and consequent modulation of the laser frequency. This frequency modulation of the emitted laser light simulates small forward and backward movements, respectively, on the rising and falling slope of the output laser power. This decreases the observed Doppler shift when the simulated source movement and the target surface movement are in the same direction, and increases the observed Doppler shift when the simulated movement and target surface movement are in opposite directions. Comparison of the measured Doppler shift on the rising and falling slopes of the triangular modulation waveform therefore reveals the direction of target surface motion.

As shown in FIG. 6D2, the output signals from the photodiodes (integrated into laser diodes 92A and 92B) that sense fluctuations in the laser power is processed in a software programmable Application-Specific Integrated Circuit (ASIC), i.e. DSP processor 81. This ASIC conditions the signal, digitizes it and then analyzes it using advanced digital signal processing techniques. These include digital filters 98 that extract the signal from background noise as well as Fourier Transforms that analyze the signal on the frequency domain to obtain the Doppler shift frequencies. Based on these Doppler shift frequencies, the ASIC 81 then computes the velocity of the target object along the axis of the IR laser beam. By combining two laser sources 92A and 92B in a single sensor, which focuses its laser beam onto the target from two orthogonal directions, the ASIC 81 combines the two axial velocities into a single velocity vector in the movement plane of the target surface. Positional or object motion information is then derived by integrating velocity over time.

In the illustrative embodiment, the two solid-state IR laser diodes 92A and 92B could be mounted directly on top of the ASIC 81 that performs the analog and digital signal processing operations in the motion/velocity sensor. This chip-stack is then mounted on a lead-frame and bonded into a package that has the necessary beam-forming lenses pre-molded into it. A motion/velocity sensor constructed in this way can measure a mere 6.8 mm square and 3.85 mm high package, enabling several motion/velocity SIPs to be integrated into a PLIA module employed in each station of the system. Laser power is dynamically controlled by circuitry in the ASIC and continuously monitored by independent protection circuitry that automatically short-circuits the laser when an over-power condition is detected. This dual-redundant active protection subsystem protects against both internal and external circuit faults, insuring that the laser power always stays within allowed safety-class limits.

Notably, the use of a pair of solid-state lasers as both the source and self-mixing detectors in the IR motion/velocity sensor 49" offers several significant advantages. Firstly, the optical pathways from the laser source to the target surface, and from the target surface back to the laser source, are identical, and therefore, there are no critical alignment problems in the positioning of the optical components. Secondly, the wavelength sensitivity of the self-mixing laser diode detector is inherently aligned to the laser wavelength, thereby eliminating many of the drift problems associated with separate sources and detectors.

To meet the low power consumption requirements of battery powered applications, the IR Pulse-Doppler LIDAR motion/velocity sensor can sample the target object surface at a frequency sufficiently high enough to meet the required accuracy, rather than sampling/measuring continuously, thereby allowing the IR laser diode sources to be pulsed on and off, in a pulsed mode of operation supporting the pulsed-doppler LIDAR technique employed therein.

Further details regarding the IR Pulse-Doppler LIDAR motion/velocity sensor can be found in United States Patent Publication No. 2005/0243053 entitled "Method of measuring the movement of an input device" by Martin Dieter Liess et al. published on Nov. 3, 2005, assigned to PHILIPS INTELLECTUAL PROPERTY & STANDARDS, and incorporated herein by reference as if fully set forth herein.

As shown in FIG. 6F1', a state transition diagram is provided for the omni-directional image capturing and processing based bar code symbol reading system described in FIG. 6' and 6B', running the system control program generally described in flow charts of FIGS. 6G1A and 6G1B, with locally-controlled IR Pulse-Doppler LIDAR object motion/velocity detection provided in each coplanar illumination and imaging subsystem of the system, as illustrated in FIG. 6'. The flow chart of FIGS. 6G1A and 6G1B describes the operations (i.e. tasks) that are automatically performed during the state control process of FIG. 6F1', which is carried out within the omni-directional image capturing and processing based bar code symbol reading system described in FIG. 6' and 6B'.

As shown in FIG. 6F2', a state transition diagram is provided for the omni-directional image capturing and processing based bar code symbol reading system described in FIG. 6' and 6B', running the system control program generally described in flow charts of FIGS. 6G2A and 6G2B, employing locally-controlled IR Pulse-Doppler LIDAR object motion/velocity detection in each coplanar illumination and imaging subsystem of the system, with globally-controlled over-driving of nearest-neighboring stations. The flow chart of FIGS. 6G2A and 6G2B generally describes the operations (i.e. tasks) that are automatically performed during the state control process of FIG. 6F2', which is carried out within the omni-directional image capturing and processing based bar code symbol reading system described in FIG. 6' and 6B'.

As shown in FIG. 6F3', a state transition diagram is provided for the omni-directional image capturing and processing based bar code symbol reading system described in FIG. 6' and 6B', running the system control program generally described in flow charts of FIGS. 6G3A and 6G3B, employing locally-controlled IR Pulse-Doppler LIDAR based object motion/velocity detection in each coplanar illumination and imaging subsystem of the system, with globally-controlled over-driving of all-neighboring stations. The flow chart of FIGS. 6G3A and 6G3B generally describes the operations (i.e. tasks) that are automatically performed during the state control process of FIG. 6F3, which is carried out within the omni-directional image capturing and processing based bar code symbol reading system described in FIG. 6' and 6B'.

FIG. 6G' describes an exemplary embodiment of a computing and memory architecture platform that can be used to implement the omni-directional image capturing and processing based bar code symbol reading system described in FIG. 6' and 6B'. As shown, this hardware computing and memory platform can be realized on a single PC board, along with the electro-optics associated with the coplanar illumination and imaging stations and other subsystems described in FIGS. 6G1A' through 6G3B. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

FIG. 6H' describes a three-tier software architecture that can run upon the computing and memory architecture platform of FIG. 6G', so as to implement the functionalities of the omni-directional image capturing and processing based bar code symbol reading system described FIG. 6' and 6B'. Details regarding the foundations of this three-tier architecture can be found in Applicants' copending U.S. patent Ser. No. 11/408,268, incorporated herein by reference. Preferably, the Main Task and Subordinate Task(s) that would be developed for the Application Layer would carry out the system and subsystem functionalities generally described in the State Control Processes of FIGS. 6G1A through 6G3B, and State Transition Diagrams. In an illustrative embodiment, the Main Task would carry out the basic object motion and velocity detection operations supported within the 3D imaging volume by each of the coplanar illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The Second Illustrative Embodiment of the Omni-Directional Image capturing and processing based Bar Code Symbol Reading System of the Present Invention In FIG. 7, the second illustrative embodiment of the omni-directional image capturing and processing based bar code symbol reading system of the present invention 10B is shown removed from its POS environment in FIG. 1, and with its imaging window protection plate 17 having a central X aperture pattern and a pair of parallel apertures aligned parallel to the sides of the system, for the projection of coplanar illumination and imaging planes from a complex of VLD or LED based coplanar illumination and imaging stations 15''' mounted beneath the imaging window of the system. The omni-directional image capturing and processing based bar code symbol reading system 10B is integrated with an electronic weigh scale 22, and has thin, tablet-like form factor for compact mounting in the countertop surface of the POS station. The primary function of this complex of coplanar illumination and imaging stations 15''' is to generate and project coplanar illumination and imaging planes through the imaging window and apertures into the 3D imaging volume of the system, and capture digital linear (1D) digital images along the field of view (FOV) of these illumination and linear imaging planes. These captured linear images are then buffered and decode-processed using linear (1D) type image capturing and processing based bar code reading algorithms, or can be assembled together to reconstruct 2D images for decode-processing using 1D/2D image processing based bar code reading techniques, as well as other intelligence extraction processes such as OCR, and object recognition.

As shown in FIG. 7A, each coplanar illumination and imaging station 15''' employed in the system of FIG. 7 comprises: a dual linear illumination and imaging engine 100 for producing a pair of planar illumination beams (PLIBs) that are coplanar with the FOVs of a pair of linear image sensing arrays; and a pair of beam/FOV folding mirrors 101A and 101B for folding the pair of coplanar PLIB/FOVs towards the objects to be illuminated and imaged. Notably, during the Object Motion/Velocity Sensing State of the coplanar illumination and imaging station, the coplanar illumination and imaging station 15''' generates a pair of coplanar PLIB/FOVs for capturing pairs of sets of linear images of an object, for real-time processing to abstract motion and velocity data regarding the object. During the Bar Code Symbol Reading State of operation of the station, the coplanar illumination and imaging station 15''' generates a only a single coplanar PLIB/FOV for capturing sets of linear images of an object, for processing to read bar code symbols represented in captured images.

Figure 7B:
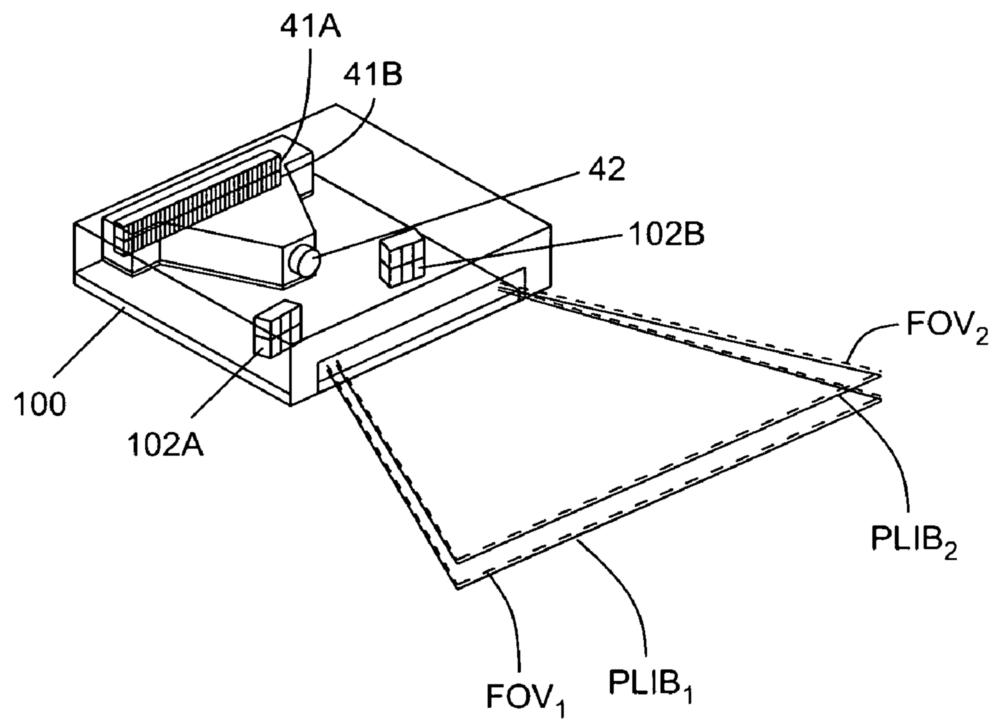
FIG. 7B is a perspective view of the dual-type coplanar linear illumination and imaging engine of FIG. 7A shown as comprising a pair of linear arrays of VLDs or LEDs for generating a pair of substantially planar light illumination beams (PLIBS) from the station, a pair of spaced-apart linear (1D) image sensing arrays having optics for providing field of views (FOVs) that are coplanar with the pair of PLIBs, and for capturing pairs of sets of linear images of an object being illuminated and imaged, and a pair of memory buffers (i.e. VRAM) for buffering the sets of linear images produced by the pair of linear image sensing arrays, respectively, so as to reconstruct a pair of 2D digital images for transmission to and processing by the multiprocessor image processing subsystem in order to compute motion and velocity data regarding the object being imaged, from image data, for use in controlling the illumination and exposure parameters employed in the image acquisition subsystem at each station.

As shown in FIG. 7B, the dual linear illumination and imaging engine comprises: an illumination subsystem 102 including a pair of double-stacked linear arrays of VLDs or LEDs 102A and 102B for generating a pair of substantially planar illumination beams (PLIBs) from the station; an IFD subsystem 103 including a pair of spaced-apart linear (1D) image sensing arrays 103A and 103B having optics 104 for providing field of views (FOVs) that are coplanar with the pair of PLIBs, and for capturing pairs of sets of linear images of an object being illuminated and imaged; an image capturing and buffering subsystem 105, including a pair of memory buffers (i.e. VRAM) 105A and 105B for buffering the sets of linear images produced by the pair of linear image sensing arrays 103A and 103B, respectively, so as to reconstruct a pair of 2D digital images for transmission to and processing by the multiprocessor image processing subsystem 20 in order to compute motion and velocity data regarding the object being imaged, from image data, for use in controlling the illumination and exposure parameters employed in the image acquisition subsystem at each station; and a local control subsystem 106 for controlling the subsystems within the station. While engine 100 is shown to simultaneously produce a pair of PLIBs that are coplanar with the FOVs of the pair of linear image sensing arrays 103A and 103B (i.e. coplanar PLIB/FOVs), it is understood that a single PLIB can be produced, and automatically swept between the two FOVs of the engine, during the Object Motion/Velocity Detection State of operation. Details regarding the dual linear illumination and imaging engine 100 described above can be found in Applicants' U.S. patent application Ser. No. 10/186,320, incorporated herein by reference. As disclosed therein, pairs of time consecutively captured linear images can be processed on a pixel-by pixel basis using correlation algorithms so as to extract motion and velocity information regarding the object represented in the captured images.

Figure 7C:
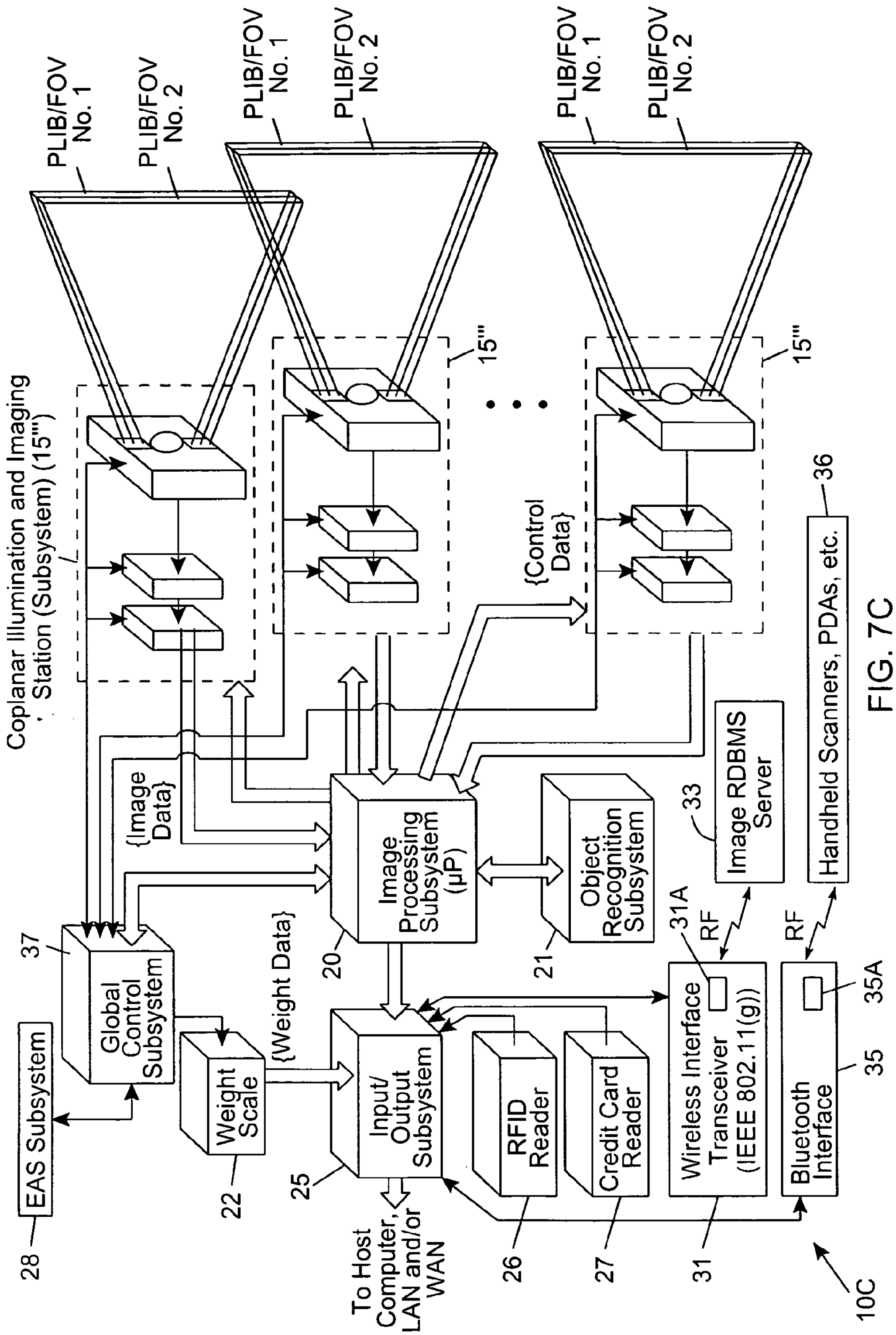
FIG. 7C is a block schematic representation of the omni-directional image capturing and processing based bar code symbol reading system of FIG. 7, wherein a complex of coplanar illuminating and linear imaging stations, each constructed using the dual-type coplanar linear illumination and imaging engine of FIG. 7B1 that supports automatic imaging-processing based object motion/velocity detection, intelligent automatic illumination control within the 3D imaging volume, and automatic image formation and capture along its respective coplanar illumination and imaging plane.

In FIG. 7C, the system architecture of the omni-directional image capturing and processing based bar code symbol reading system is shown comprising: a complex of VLD-based coplanar illuminating and linear imaging stations 15A''' through 15A''' each constructed using the dual linear illumination and imaging engine 100 and a pair PLIB/FOV folding mirrors 101A and 101B, as shown in FIGS. 7A and 7B and described hereinabove; a multi-processor image processing subsystem 20 for supporting multiple channels of (i) automatic image capturing and processing based object motion/velocity detection and intelligent automatic laser illumination control within the 3D imaging volume, as well as (ii) automatic image processing based bar code reading along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Bluetooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15' transmits frames of image data to the image processing subsystem 25, for state-dependent image processing and the results of the image processing operations are transmitted to the host system via the input/output subsystem 20.

Figure 7D:
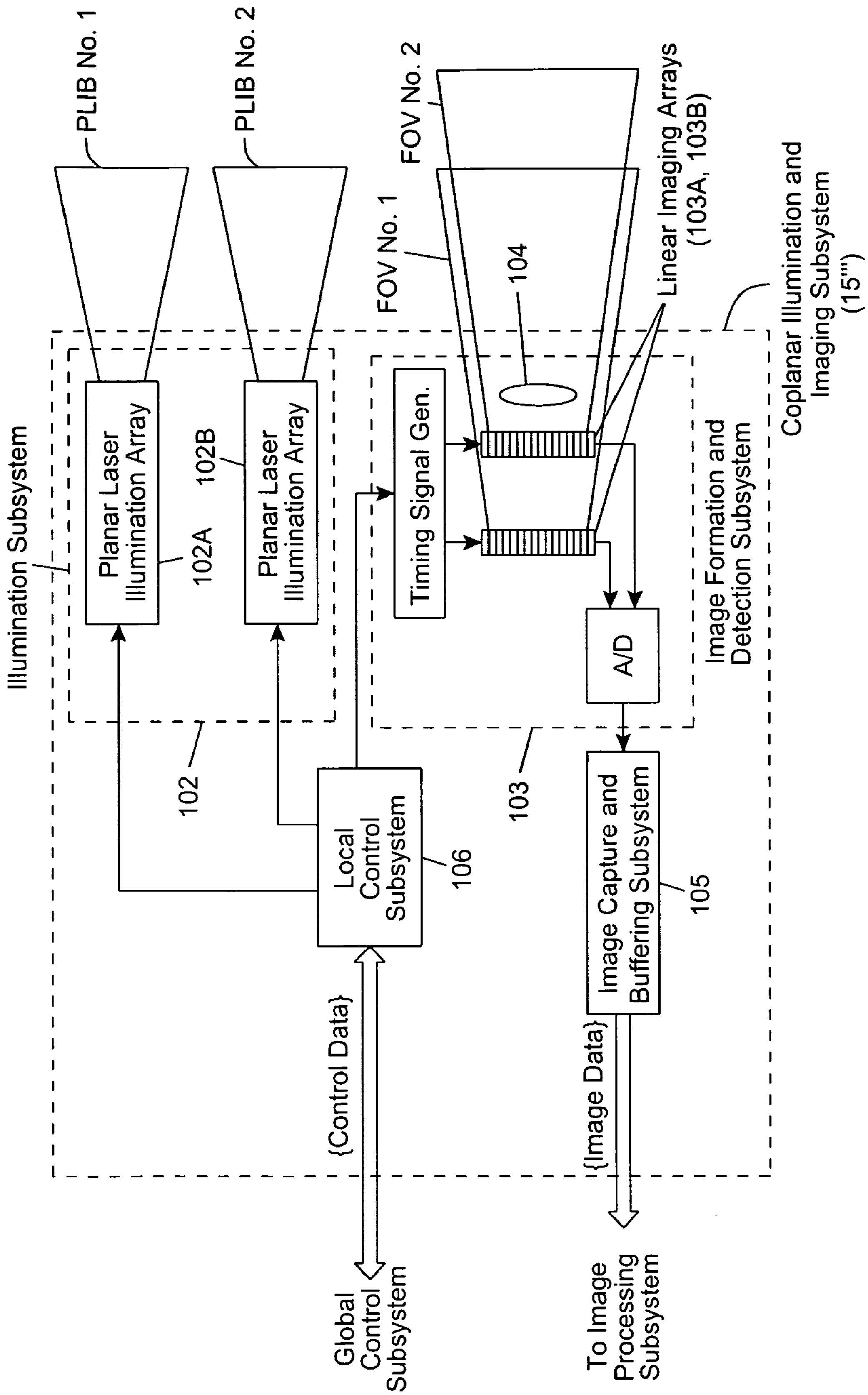
FIG. 7D is a block schematic representation of one of the coplanar illumination and imaging stations employed in the system embodiment of FIG. 7, showing its (i) pair of substantially planar illumination arrays (PLIAs) constructed from arrays of VLDs and/or LEDs, (ii) its image formation and detection subsystem employing a pair of linear image sensing arrays, and (iii) its image capture and buffering subsystem employing a pair of 2D image memory buffers, for implementing, in conjunction with the image processing subsystem of the system, real-time imaging based object motion/velocity sensing functions during its object motion/velocity detection states of operation, while one of the linear image sensors and one or the 2D image memory buffers are used to capture high-resolution images of the detected object for bar code decode processing during bar code reading states of operation in the system.

As shown in FIGS. 7C and 7D, each coplanar illumination and imaging subsystem 15A''' through 15F''' transmits frames of image data (from engine 100) to the global image processing subsystem 20 for state-dependent image processing, and the global image processing subsystem 37 transmits back to the local control subsystem in the coplanar illumination and imaging subsystem, control data (derived from object motion and velocity data) that is used to control the exposure and illumination operations within respective coplanar illumination and imaging subsystems.

In cooperation with the global image processing subsystem 20 of the system, the pair of substantially planar illumination arrays (PLIAs), the image formation and detection subsystem and the image capture and buffering subsystem are configured to implement the real-time imaging-based object motion/velocity sensing functions of the station during its object motion/velocity detection states of operation. During the Object Motion/Velocity Detection State, both of the linear illumination arrays, both of the linear image sensing arrays, and both of the 2D image memory buffers, are used to capture images and abstract object motion and velocity data (i.e. metrics) on a real-time basis. During bar code reading states of operation in the system, only one of the linear illumination arrays and one of the linear image sensing arrays, along with one of the 2D image memory buffers, are used to capture high-resolution images of the detected object for bar code decode processing.

In FIG. 7E1, the object motion/velocity detection process supported at each coplanar illumination and imaging station 15''' is schematically depicted in greater detail. As shown, implementation of the motion/velocity detection process involves the use of the pair of illumination arrays 102A and 102B and the pair of linear image sensing arrays 103A and 103B (of the IFD subsystem at the station), the pair of 2D image memory buffers 105A and 105B, and the global image processing subsystem 20. In FIG. 7E2, the steps of the object motion/velocity detection process are described in greater detail. As shown at Blocks A1 and A2 in FIG. 7E2, the FOVs of the linear image sensing arrays 103A and 103B in the IFD subsystem are illuminated with light from the pair of PLIBs generated by the pair linear illumination arrays 102A and 102B, and linear images are captured and buffered in the buffer memory arrays 105A and 105B so as to reconstruct a pair of 2D images of the object. At Block B in FIG. 7E2, the 2D images are then processed by the global image processing subsystem 20 so as to derive image velocity metrics (i.e. motion and velocity data) which is sent back to the local control subsystem 50 within the coplanar illumination and imaging station 15'''. At Block C, the local control subsystem 50 uses the motion and velocity data to generate control data that is then used to update one or more operating parameters of the illumination subsystem, and/or one or more operating parameters of the image formation and detection (IFD) subsystem, including adjusting the frequency of the clock signal used to read data out of the linear image sensing arrays in the IFD subsystem.

As shown in FIG. 7F1, a state transition diagram is provided for the omni-directional image capturing and processing based bar code symbol reading system described in FIGS. 7 and 7C, running the system control program generally described in flow charts of FIGS. 6G1A and 6G1B, with locally-controlled "integrated" imaging-based object motion/velocity detection provided in each coplanar illumination and imaging subsystem of the system, as illustrated in FIG. 7. The flow chart of FIGS. 6G1A and 6G1B generally describes the operations (i.e. tasks) that are automatically performed during the state control process of FIG. 6F1, which is carried out within the omni-directional image capturing and processing based bar code symbol reading system described in FIGS. 7 and 7C.

As shown in FIG. 7F2, a state transition diagram is provided for the omni-directional image capturing and processing based bar code symbol reading system described in FIGS. 7 and 7C, running the system control program generally described in flow charts of FIGS. 6G2A and 6G2B, employing locally-controlled "integrated" object motion/velocity detection in each coplanar illumination and imaging subsystem of the system, with globally-controlled over-driving of nearest-neighboring stations. The flow chart of FIGS. 6G2A and 6G2B generally describes the operations (i.e. tasks) that are automatically performed during the state control process of FIG. 7F2, which is carried out within the omni-directional image capturing and processing based bar code symbol reading system described in FIGS. 7 and 7C.

As shown in FIG. 7F3, a state transition diagram is provided for the omni-directional image capturing and processing based bar code symbol reading system described in FIGS. 7 and 7C, running the system control program generally described in flow charts of FIGS. 6G3A and 6G3B, employing locally-controlled object motion/velocity detection in each coplanar illumination and imaging subsystem of the system, with globally-controlled over-driving of all-neighboring stations. The flow chart of FIGS. 6G3A and 6G3B generally describes the operations (i.e. tasks) that are automatically performed during the state control process of FIG. 7F3, which is carried out within the omni-directional image capturing and processing based bar code symbol reading system described in FIGS. 7 and 7C.

Figure 7G:
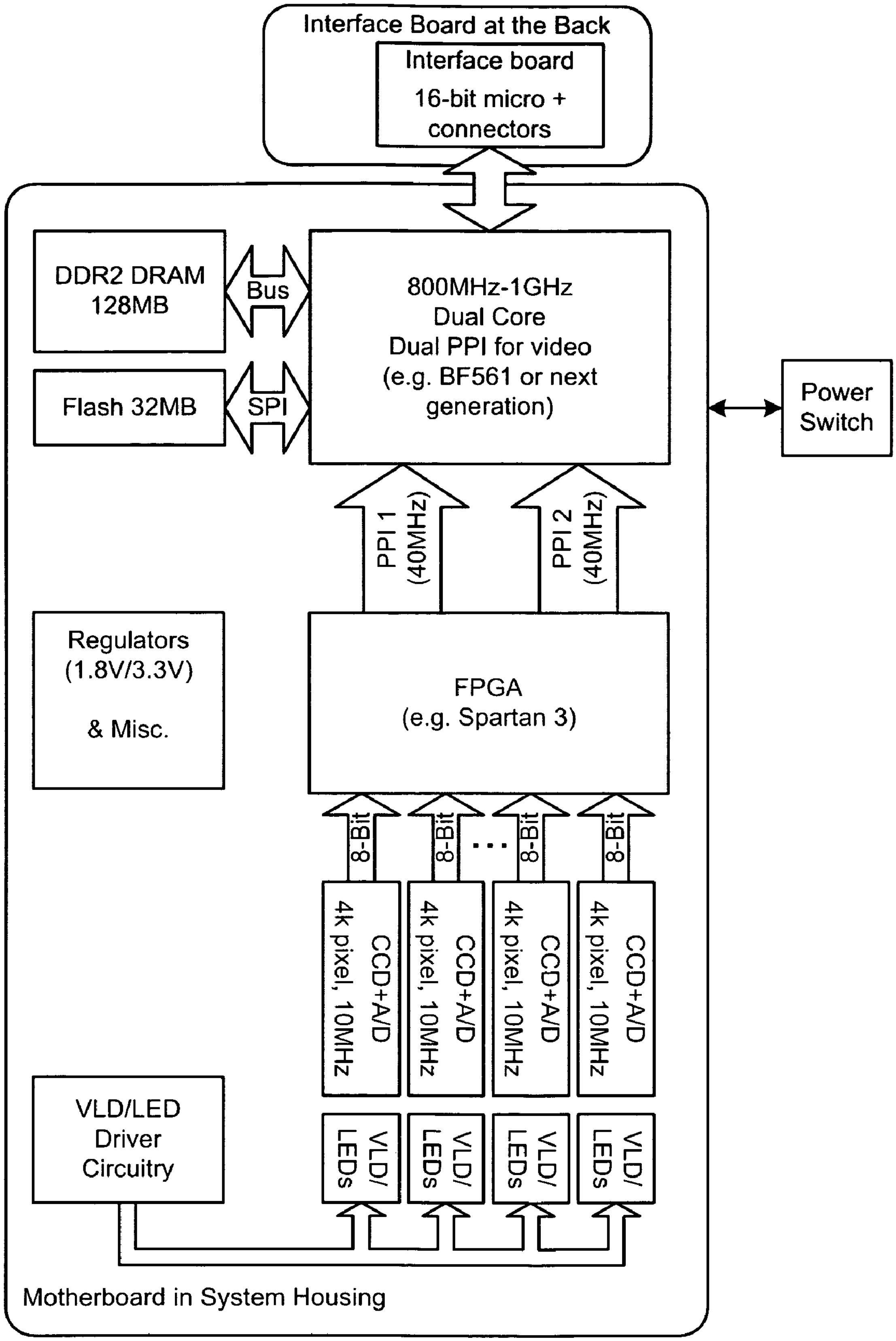
FIG. 7G is a schematic diagram describing an exemplary embodiment of a computing and memory architecture platform for implementing the omni-directional image capturing and processing based bar code symbol reading system described FIGS. 7 and 7C.

FIG. 7G describes an exemplary embodiment of a computing and memory architecture platform that can be used to implement the omni-directional image capturing and processing based bar code symbol reading system described in FIGS. 7 and 7C. As shown, this hardware computing and memory platform can be realized on a single PC board, along with the electro-optics associated with the coplanar illumination and imaging stations and other subsystems described in FIGS. 7G1A through 7G3B. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

Figure 7H:
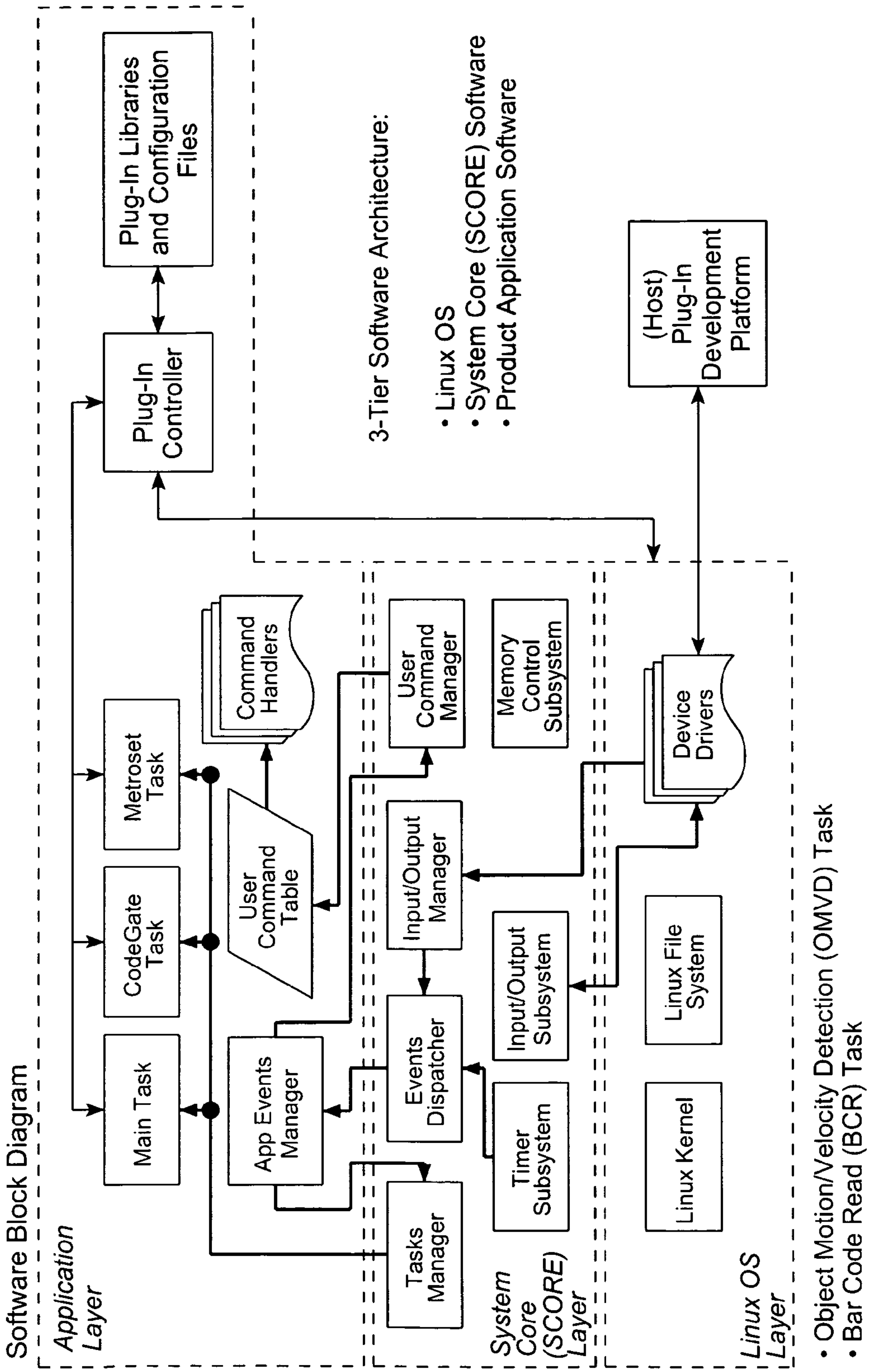
FIG. 7H is a schematic representation of a three-tier software architecture that can run upon the computing and memory architecture platform of FIG. 7H, so as to implement the functionalities of the omni-directional image capturing and processing based bar code symbol reading system described FIG. 7.

FIG. 7H describes a three-tier software architecture that can run upon the computing and memory architecture platform of FIG. 7G, so as to implement the functionalities of the omni-directional image capturing and processing based bar code symbol reading system described FIGS. 7 and 7C. Details regarding the foundations of this three-tier architecture can be found in Applicants' copending U.S. application Ser. No. 11/408,268, incorporated herein by reference. Preferably, the Main Task and Subordinate Task(s) that would be developed for the Application Layer would carry out the system and subsystem functionalities generally described in the State Control Processes of FIGS. 6G1A through 6G3B, and State Transition Diagrams of FIGS. 7F1 through 7F3. In an illustrative embodiment, the Main Task would carry out the basic object motion and velocity detection operations supported within the 3D imaging volume by each of the coplanar illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The Third Illustrative Embodiment of the Omni-Directional Image capturing and processing based Bar Code Symbol Reading System of the Present Invention Employing Globally-Deployed Imaging-Based Object Motion/Velocity Detectors in the 3D Imaging Volume Thereof As shown in FIG. 8A, a plurality of imaging-based object motion and velocity "field of views" 120A, 120B and 120C are generated from a plurality of imaging-based motion/velocity detection subsystems 121 installed in the system 10D, and operated during its Object Motion/Velocity Detection Mode. As these imaging-based object motion and velocity "field of views" are not necessarily spatially co-extensive or overlapping the coplanar illumination and imaging planes generated within the 3D imaging volume by subsystem (i.e. station) 15 in the system, the FOVs of these object motion/velocity detecting subsystems will need to use either ambient illumination or pulsed or continuously operated LED or VLD illumination sources so as to illuminate their FOVs during the Object Motion/Velocity Detection Mode of the system. Ideally, these illumination sources would produce IR illumination (e.g. in the 850 nm range). The function of these globally deployed object motion/velocity detection subsystems is to enable automatic control of illumination and/or exposure during the Bar Code Reading Mode of the system.

In FIG. 8A1, the system architecture of the omni-directional image capturing and processing based bar code symbol reading system 10D of FIG. 8A is shown comprising: a complex of coplanar illuminating and linear-imaging stations 15A through 15F constructed using the linear illumination arrays and image sensing arrays as described hereinabove; an multi-processor image processing subsystem 20 for supporting automatic image processing based bar code symbol reading and optical character recognition (OCR) along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Bluetooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15' transmits frames of image data to the image processing subsystem 25, for state-dependent image processing and the results of the image processing operations are transmitted to the host system via the input/output subsystem 20. In FIG. 8A1, the bar code symbol reading module employed along each channel of the multi-channel image processing subsystem 20 can be realized using SwiftDecoder® Image Processing Based Bar Code Reading Software from Omniplanar Corporation, West Deptford, New Jersey, or any other suitable image processing based bar code reading software. Also, the system provides full support for (i) dynamically and adaptively controlling system control parameters in the digital image capture and processing system, as disclosed and taught in Applicants' PCT Application Serial No. PCT/US2007/009763, as well as (ii) permitting modification and/or extension of system features and function, as disclosed and taught in PCT Application No. WO 2007/075519, supra.

As shown in FIGS. 8A2 and 8A3, each coplanar illumination and imaging station 15 employed in the system of FIG. 8A comprises: an illumination subsystem 44 including a linear array of VLDs or LEDs 44A and 44B and associated focusing and cylindrical beam shaping optics (i.e. planar illumination arrays PLIAs), for generating a planar illumination beam (PLIB) from the station; a linear image formation and detection (IFD) subsystem 40 having a camera controller interface (e.g. FPGA) 40A for interfacing with the local control subsystem 50 and a high-resolution linear image sensing array 41 with optics providing a field of view (FOV) on the image sensing array that is coplanar with the PLIB produced by the linear illumination array 44A so as to form and detect linear digital images of objects within the FOV of the system; a local control subsystem 50 for locally controlling the operation of subcomponents within the station, in response to control signals generated by global control subsystem 37 maintained at the system level, shown in FIG. 8A; an image capturing and buffering subsystem 48 for capturing linear digital images with the linear image sensing array 41 and buffering these linear images in buffer memory so as to form 2D digital images for transfer to image-processing subsystem 20 maintained at the system level, as shown in FIG. 6B, and subsequent image processing according to bar code symbol decoding algorithms, OCR algorithms, and/or object recognition processes; a high-speed image capturing and processing based motion/velocity sensing subsystem 130 (similar to subsystem 49') for measuring the motion and velocity of objects in the 3D imaging volume and supplying the motion and velocity data to the local control subsystem 50 for processing and automatic generation of control data that is used to control the illumination and exposure parameters of the linear image formation and detection system within the station. Details regarding the design and construction of planar illumination and imaging module (PLIIMs) can be found in Applicants' U.S. Pat. No. 7,028,899 B2 incorporated herein by reference.

As shown in FIG. 8A3, the high-speed image capturing and processing based motion/velocity sensing subsystem 130 comprises: an area-type image acquisition subsystem 131 with an area-type image sensing array 132 and optics 133 for generating a field of view (FOV) that is preferably spatially coextensive with the longer dimensions of the FOV of the linear image formation and detection subsystem 40; an (IR) illumination area-type illumination subsystem 134 having an a pair of IR illumination arrays 134A and 134B; and an embedded digital signal processing (DSP) image processor 135 for automatically processing 2D images captured by the digital image acquisition subsystem 131. The DSP image processor 135 processes captured images so as to automatically abstract, in real-time, motion and velocity data from the processed images and provide this motion and velocity data to the global control subsystem 37, or alternatively to local control subsystem 40 of each station 15, for the processing and automatic generation of control data that is used to control the illumination and/or exposure parameters of the linear image formation and detection system within the station.

In the illustrative embodiment shown in FIGS. 8A3 and 8A4, each image capturing and processing based motion/velocity sensing subsystem 130 continuously and automatically computes the motion and velocity of objects passing through the planar FOV of the station, and uses this data to generate control signals that set the frequency of the clock signal used to read out data from the linear image sensing array 41 employed in the linear image formation and detection subsystem of the system As shown in FIG. 8A3, the area-type LED or VLD based illumination array 132 and the area-type image sensing array 131 cooperate to produce digital images of IR-illuminated objects passing through at least at a portion of the FOV of the linear image formation and detection subsystem 40. Then, DSP-based image processor (e.g. ASICs) process captured images using cross-correlation functions to compute (i.e. measure) motion and velocity regarding object(s) within the FOV of the linear image formation and detection subsystem. This motion and velocity data is then provided to the global subsystem controller 37 so that it can generate (i.e. compute) control data for controlling the frequency of the clock signal used in reading data out of the linear image sensing arrays of the image formation and detection subsystems 40 in the stations of the system. Alternatively, this motion and velocity data can be sent to the local control subsystems for local computation of control data for controlling the illumination and/or exposure parameters employed in the station. An algorithm for computing such control data, based on sensed 2D images of objects moving through (at least a portion of) the FOV of the linear image formation and detection subsystem, is described in FIG. 8A4 and the Specification set forth hereinabove. While the system embodiments of FIGS. 8A3 and 8A4 illustrate controlling the clock frequency in the image formation and detection subsystem, it is understood that other camera parameters, relating to exposure and/or illumination, can be controlled in accordance with the principles of the present invention.

In general, there are two different methods for realizing non-contact imaging-based velocity sensors for use in detecting the motion and velocity of objects passing through the 3D imaging volume of the system of the present invention, depicted in FIG. 8B, namely: (1) forming and detecting images of objects using incoherent illumination produced from an array of LEDs or like illumination source (i.e. incoherent Pulse-Doppler LIDAR); and (2) forming and detecting images of objects using coherent illumination produced from an array of VLDs or other laser illumination sources (i.e. coherent Pulse-Doppler LIDAR).

According to the first method, a beam of incoherent light is generated by an array of LEDs 134 emitting at a particular band of wavelengths, and then this illumination is directed into the field of view of the image acquisition subsystem 131 of the image-based object motion/velocity sensor 130 shown in FIGS. 8A3 and 8A4. According to this method, the pairs of 1D or 2D images of objects illuminated by such illumination will be formed by the light absorptive or reflective properties on the surface of the object, while moving through the 3D imaging volume of the system. For objects having poor light reflective characteristics at the illumination wavelength of the subsystem, low-contrast, poor quality images will be detected by the image acquisition subsystem 131 of the object motion/velocity sensor 130 making it difficult for the DSP processor 135 and its cross-correlation functions to abstract motion and velocity measurements. Thus, when using the first method, there is the tendency to illuminate objects using illumination in the visible band, because most objects passing through the 3D imaging volume at the POS environment reflects light energy quite well at such optical wavelengths. The challenge, however, when using visible illumination during the Object Motion/Velocity Detection Mode of the system is that it is undesirable to produce visible energy during such modes of operation, as it will disturb the system operator and nearby consumers present at the POS station. This creates an incentive to use an array of IR LEDs to produce a beam of wide-area illumination at IR wavelengths (e.g. 850 nm) during the Object Motion/Velocity Detection Mode of operation. However, in some applications, the use of wide-area IR illumination from an array of IR LEDs may not be feasible due to significant levels of noise present in the IR band. In such instances, it might be helpful to look the second method of forming and detecting "speckle-noise" images using highly coherent illumination.

According to the second method, a beam of coherent light is generated by an array of VLDs 134 emitting at a particular band of wavelengths (e.g. 850 nm), and then this illumination is directed into the field of view of the optics employed in the image acquisition subsystem 131 of the object motion/velocity sensor 130, shown in FIG. 8A3. According to this method, the pairs of 1D or 2D "speckle-noise" images of objects (illuminated by such highly coherent illumination) will be formed by the IR absorptive or scattering properties of the surface of the object, while the object is moving through the 3D imaging volume of the system. Formation of speckle-pattern noise within the FOV of the motion/velocity sensor is a well known phenomena of physics, wherein laser light illuminating a rough surface naturally generates speckle-pattern noise in the space around the object surface, and detected images of the target object will thus have speckle-pattern noise. Then, during image processing in the DSP processor, speckle-processing algorithms can be used to appraise the best cross-correlation function for object velocity measurement. Such speckle-processing algorithms can be based on binary correlation or on Fast Fourier Transform (FFT) analysis of images acquired by the image-based motion/velocity sensor 130. Using this approach, a coherent Pulse-Doppler LIDAR motion/velocity sensor can be constructed, having reduced optical complexity and very low cost. The working distance of this kind of non-contact object velocity sensor can be made to extend within the 3D imaging volume of the system by (i) placing suitable light dispersive optics placed before the IR laser illumination source to fill the FOV of the image sensor, and (ii) placing collimating optics placed before the image sensing array of the sensor. Details regarding such a coherent IR speckle-based motion/velocity sensor are disclosed in the IEEE paper entitled "Instrumentation and Measurement", published in IEEE Transactions on Volume 53, Issue 1, on February 2004, at Page(s) 51-57, incorporated herein by reference.

The Third Illustrative Embodiment of the Omni-Directional Image capturing and processing based Bar Code Symbol Reading System of the Present Invention Employing Globally-Deployed IR Pulse-Doppler LIDAR Based Object Motion/Velocity Detectors in The 3D Imaging Volume Thereof In FIG. 8B, a second alternative embodiment of the omni-directional image capturing and processing based bar code symbol reading system of the present invention 10E is shown removed from its POS environment, with one coplanar illumination and imaging plane being projected through an aperture in its imaging window protection plate 17. In this illustrative embodiment, each coplanar illumination and imaging plane projected through the 3D imaging volume 16 of the system has a plurality of IR Pulse-Doppler LIDAR based object motion/velocity sensing beams (A, B, C) that are spatially co-incident therewith, for sensing in real-time the motion and velocity of objects passing therethrough during system operation. As shown in greater detail, the of IR Pulse-Doppler LIDAR based object motion/velocity sensing beams (A, B, C) are generated from a plurality of IR Pulse-Doppler LIDAR motion/velocity detection subsystems 140, which can be realized using a plurality of IR (Coherent or Incoherent) Pulse-Doppler LIDAR motion/velocity sensing chips mounted along the illumination array provided at each coplanar illumination and imaging station 15 in the system. In the illustrative embodiments of FIG. 8B, three such IR Pulse-Doppler LIDAR motion/velocity sensing chips (e.g. Philips PLN2020 Twin-Eye 850 nm IR Laser-Based Motion/Velocity Sensor System in a Package (SIP)) are employed in each station in the system. Details regarding this subsystem are described in FIGS. 8C, 8D and 8E and corresponding portions of the present patent specification.

As shown in FIG. 8B1, the omni-directional image capturing and processing based bar code symbol reading system 10E comprises: complex of coplanar illuminating and linear imaging stations 15A through 15A constructed using the linear illumination arrays and image sensing arrays described above; a multi-processor image processing subsystem 20 for supporting automatic image processing based bar code symbol reading and optical character recognition (OCR) along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Blue-tooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15 transmits frames of image data to the image processing subsystem 25, for state-dependent image processing and the results of the image processing operations are transmitted to the host system via the input/output subsystem 20. In FIG. 8B1, the bar code symbol reading module employed along each channel of the multi-channel image processing subsystem 20 can be realized using SwiftDecoder® Image Processing Based Bar Code Reading Software from Omniplanar Corporation, West Deptford, N.J., or any other suitable image processing based bar code reading software. Also, the system provides full support for (i) dynamically and adaptively controlling system control parameters in the digital image capture and processing system, as disclosed and taught in Applicants' PCT Application Serial No. PCT/US2007/009763, as well as (ii) permitting modification and/or extension of system features and function, as disclosed and taught in PCT Application No. WO 2007/075519, supra.

As shown in FIG. 8B2, each coplanar illumination and imaging stations 15 employed in the system embodiment of FIG. 8B1, comprises: an illumination subsystem 44 including planar illumination arrays (PLIA) 44A and 44B; a linear image formation and detection subsystem 40 including linear image sensing array 41 and optics 42 providing a field of view (FOV) on the image sensing array; an image capturing and buffering subsystem 48; and a local control subsystem 50.

In the illustrative embodiment of FIG. 8C, each globally deployed IR Pulse-Doppler LIDAR based object motion/velocity sensing subsystem 140 can be realized using a high-speed IR Pulse-Doppler LIDAR based motion/velocity sensor, as shown in FIGS. 6D1', 6D2', and 6E' and described in great technical detail above. The purpose of this sensor 140 is to (i) detect whether or not an object is present within the FOV at any instant in time, and (ii) detect the motion and velocity of objects passing through the FOV of the linear image sensing array, for ultimately controlling camera parameters in real-time, including the clock frequency of the linear image sensing array. FIG. 8D shows in greater detail the IR Pulse-Doppler LIDAR based object motion/velocity detection subsystem 140 and how it cooperates with the local control subsystem, the planar illumination array (PLIA), and the linear image formation and detection subsystem.

Having described two alternative system embodiments employing globally-deployed object motion/velocity sensing, as shown in FIGS. 8A through 8A4, and 8B through 8E, it is appropriate at this juncture to now describe various system control methods that can be used in connection with these system embodiments.

As shown in FIG. 8F, a state transition diagram is provided for the omni-directional image capturing and processing based bar code symbol reading system described in FIGS. 8A and 8B, running the system control program described in flow chart of FIG. 8, with globally-controlled object motion/velocity detection provided in each coplanar illumination and imaging subsystem of the system, as illustrated in FIGS. 8A and 8B. The flow chart of FIG. 8 describes the operations (i.e. tasks) that are automatically performed during the state control process of FIG. 8F, which is carried out within the omni-directional image capturing and processing based bar code symbol reading system described in FIGS. 8A and 8B.

At Step A in FIG. 8, upon powering up the Omni-Directional Image capturing and processing based Bar Code Symbol Reading System ("System") 10E, and/or after each successful read of a bar code symbol thereby, the global control subsystem 37 initializes the system by pre-configuring each Coplanar Illumination and Imaging Station 15 employed therein in its Object Motion/Velocity Detection State which is essentially a "stand-by" sort of state because the globally-deployed object motion/velocity sensor 140 has been assigned the task of carrying out this function in the system.

As indicated at Step B in FIG. 8, at each Coplanar Illumination and Imaging Station currently configured in its Object Motion/Velocity Detection State, the object motion/velocity detection subsystem 140 automatically detects the motion and velocity of an object being passed through the 3D imaging volume of the station and generate data representative thereof. From this data, the local control subsystems generate control data for use in controlling the exposure and/or illumination processes at coplanar illumination and imaging stations (e.g. the frequency of the clock signal used in the IFD subsystem).

As indicated at Step C in FIG. 8, for each Coplanar Illumination and Imaging Station that automatically detects an object moving through or within its Object Motion/Velocity Detection Field with the help of globally deployed motion/velocity sensors 140, and in response to control data from the global control subsystem 37, the local control subsystem 50 automatically configures the Coplanar Illumination and Imaging Station into its Imaging-Based Bar Code Reading Mode (State).

During the Imaging-Based Bar Code Reading Mode (State), the illumination arrays of the illumination subsystem 44 are preferably driven at full power. Optionally, in some applications, the object motion/velocity sensing subsystem may be permitted to simultaneously collect (during the Imaging-Based Bar Code Reading State) updated object motion and velocity data for use in dynamically controlling the exposure and/or illumination parameters of the IFD Subsystem.

As indicated at Step D in FIG. 8, from each Coplanar Illumination and Imaging Station currently configured in its Imaging-Based Bar Code Symbol Reading State, the station automatically illuminates the detected object, with laser or VLD illumination (as the case may be), and captures and buffers digital 1D images thereof, and transmits these reconstructed 2D images to the global multi-processor image processing subsystem 20 for processing these buffered images so as to read a 1D or 2D bar code symbol represented in the images.

As indicated at Step E of FIG. 8, upon the 1D or 2D bar code symbol being successfully read by at least one of the Coplanar Illumination and Imaging Stations in the System, the image processing subsystem automatically generates symbol character data representative of the read bar code symbol, transmits the symbol character data to the input/output subsystem, and the global control subsystem reconfigures each Coplanar Illumination and Imaging Station back into its Object Motion/Velocity Detection State and returns to Step B, so that the system can resume automatic detection of object motion and velocity within the 3D imaging volume of the system.

As indicated at Step F in FIG. 8, upon failure to read at least 1D or 2D bar code symbol within a predetermined time period (from the time an object has been detected within the 3D imaging volume), the local control subsystem (under global control) reconfigures the coplanar illumination and imaging station to its Object Motion and Velocity Detection State (i.e. Stand-By State) at Step B, to allow the system to resume collection and updating of object motion and velocity data (and derive control data for exposure and/or illumination control).

Figure 8H:
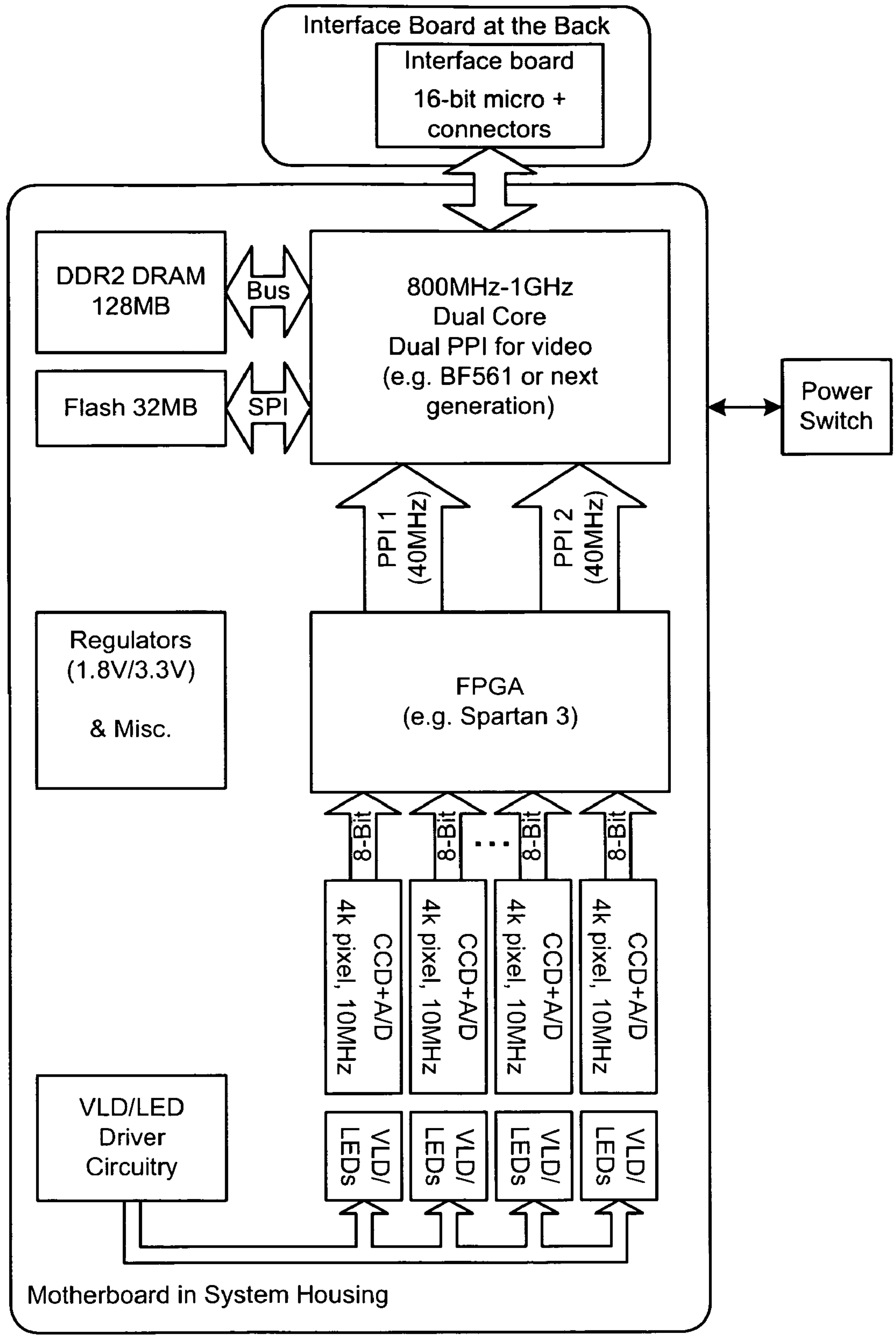
FIG. 8H is a schematic diagram describing an exemplary embodiment of a computing and memory architecture platform for implementing the omni-directional image capturing and processing based bar code symbol reading system described FIG. 8B.

FIG. 8H describes an exemplary embodiment of a computing and memory architecture platform that can be used to implement the omni-directional image capturing and processing based bar code symbol reading system described in FIGS. 8A and 8B. As shown, this hardware computing and memory platform can be realized on a single PC board, along with the electro-optics associated with the coplanar illumination and imaging stations and other subsystems described in FIGS. 8G1A and 8G1B. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

Figure 8I:
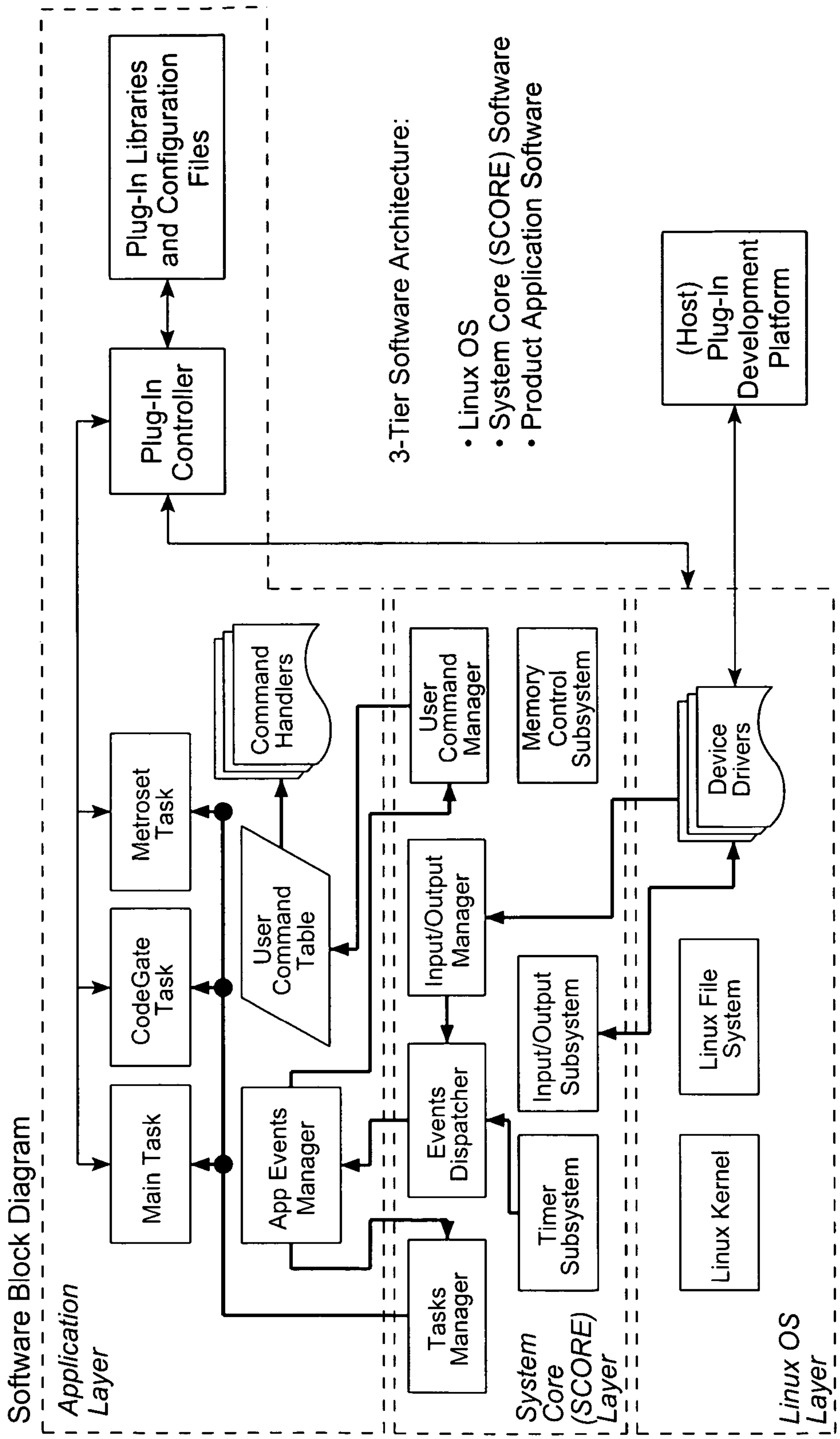

FIG. 8I describes a three-tier software architecture that can run upon the computing and memory architecture platform of FIG. 8H, so as to implement the functionalities of the omni-directional image capturing and processing based bar code symbol reading system described FIGS. 8A and 8B. Details regarding the foundations of this three-tier architecture can be found in Applicants' copending U.S. patent Ser. No. 11/408,268, incorporated herein by reference. Preferably, the Main Task and Subordinate Task(s) that would be developed for the Application Layer would carry out the system and subsystem functionalities described in the State Control Processes of FIG. 8, and State Transition Diagram of FIG. 8. In an illustrative embodiment, the Main Task would carry out the basic object motion and velocity detection operations supported within the 3D imaging volume by each of the coplanar illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The Fourth Illustrative Embodiment of the Omni-Directional Image Capturing and Processing Based Bar Code Symbol Reading System of the Present Invention FIG. 9A shows a fourth illustrative embodiment of the omni-directional image capturing and processing based bar code symbol reading system of the present invention 150 installed in the countertop surface of a retail POS station. As shown, the omni-directional image capturing and processing based bar code symbol reading system 150 comprises both vertical and horizontal housing sections, each provided with coplanar illumination and imaging stations for aggressively supporting both "pass-through" as well as "presentation" modes of bar code image capture.

As shown in greater detail in FIG. 9B, the omni-directional image capturing and processing based bar code symbol reading system 150 comprises: a horizontal section 10 (e.g. 10A, 10B, . . . 10E) for projecting a first complex of coplanar illumination and imaging planes 55 from its horizontal imaging window; and a vertical section 160 that projects (i) one horizontally-extending coplanar illumination and imaging plane 161 and (ii) two vertically-extending spaced-apart coplanar illumination and imaging planes 162A and 162B from its apertures 164 formed in a protection plate 165 releasably mounted over vertical imaging window 166, into the 3D imaging volume of the system, enabling to aggressive support for both "pass-through" as well as "presentation" modes of bar code image capture. The primary functions of each coplanar laser illumination and imaging station is to generate and project coplanar illumination and imaging planes through the imaging window and apertures into the 3D imaging volume of the system, and capture digital linear (1D) digital images along the field of view (FOV) of these illumination and linear imaging planes. These captured linear images are then buffered and decode-processed using linear (1D) type image capturing and processing based bar code reading algorithms, or can be assembled together to reconstruct 2D images for decode-processing using 1D/2D image processing based bar code reading techniques.

In general, each coplanar illumination and imaging station employed in the system of FIG. 9B can be realized as a linear array of VLDs or LEDs and associated focusing and cylindrical beam shaping optics (i.e. planar illumination arrays PLIAs) are used to generate a substantially planar illumination beam (PLIB) from each station, that is coplanar with the field of view of the linear (1D) image sensing array employed in the station. Any of the station designs described hereinabove can be used to implement this illustrative system embodiment. Details regarding the design and construction of planar laser illumination and imaging module (PLIIMs) can be found in Applicants' U.S. Pat. No. 7,028,899 B2 incorporated herein by reference.

In FIG. 9C, the system architecture of the omni-directional image capturing and processing based bar code symbol reading system of FIG. 9B is shown comprising: a complex of coplanar illuminating and linear imaging stations 15 constructed using LED or VLD based linear illumination arrays and image sensing arrays, as described hereinabove; an multi-channel multi-processor image processing subsystem 20 for supporting automatic object motion/velocity detection and intelligent automatic laser illumination control within the 3D imaging volume, as well as automatic image processing based bar code reading along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing)s; a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Blue-tooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15' transmits frames of image data to the image processing subsystem 25, for state-dependent image processing and the results of the image processing operations are transmitted to the host system via the input/output subsystem 20.

As shown in FIGS. 9D and 9E, each coplanar illumination and imaging station 15 employed in the system of FIGS. 9B and 9C comprises: an illumination subsystem 44 including a linear array of VLDs or LEDs and associated focusing and cylindrical beam shaping optics (i.e. planar illumination arrays PLIAs), for generating a planar illumination beam (PLIB) from the station; a linear image formation and detection (IFD) subsystem 40 having a camera controller interface (e.g. FPGA) for interfacing with the local control subsystem 50 and a high-resolution linear image sensing array 41 with optics 42 providing a field of view (FOV) on the image sensing array that is coplanar with the PLIB produced by the linear illumination array 41, so as to form and detect linear digital images of objects within the FOV of the system; a local control subsystem 50 for locally controlling the operation of subcomponents within the station, in response to control signals generated by global control subsystem 37 maintained at the system level, shown in FIG. 9B; an image capturing and buffering subsystem 48 for capturing linear digital images with the linear image sensing array 41 and buffering these linear images in buffer memory so as to form 2D digital images for transfer to image-processing subsystem 20 maintained at the system level, as shown in FIG. 9B, and subsequent image processing according to bar code symbol decoding algorithms, OCR algorithms, and/or object recognition processes; a high-speed image capturing and processing based motion/velocity sensing subsystem 49 for producing motion and velocity data for supply to the local control subsystem 50 for processing and automatic generation of control data that is used to control the illumination and exposure parameters of the linear image formation and detection system within the station. Details regarding the design and construction of planar illumination and imaging module (PLIIMs) can be found in Applicants' U.S. Pat. No. 7,028,899 B2 incorporated herein by reference.

As shown in FIGS. 9D and 9E, the high-speed motion/velocity detection subsystem 49 can be realized any of the motion/velocity detection techniques detailed hereinabove so as to provide real-time motion and velocity data to the local control subsystem 50 for processing and automatic generation of control data that is used to control the illumination and exposure parameters of the linear image formation and detection system within the station. Alternatively, motion/velocity detection subsystem 49 can be deployed outside of illumination and imaging station, as positioned globally as shown in FIGS. 8A and 8B.

As shown in FIG. 9F1, a state transition diagram is provided for the omni-directional image capturing and processing based bar code symbol reading system described in FIGS. 9B and 9C, running the system control program generally described in flow charts of FIGS. 6G1A and 6G1B, with locally-controlled imaging-based object motion/velocity detection provided in each coplanar illumination and imaging subsystem of the system, as illustrated in FIG. 9B. The flow chart of FIGS. 6G1A and 6G1B generally describes the operations (i.e. tasks) that are automatically performed during the state control process of FIG. 9F1, which is carried out within the omni-directional image capturing and processing based bar code symbol reading system described in FIGS. 9B and 9C.

As shown in FIG. 9F2, a state transition diagram is provided for the omni-directional image capturing and processing based bar code symbol reading system described in FIGS. 9B and 9C, running the system control program generally described in flow charts of FIGS. 6G2A and 6G2B, employing locally-controlled object motion/velocity detection in each coplanar illumination and imaging subsystem of the system, with globally-controlled over-driving of nearest-neighboring stations. The flow chart of FIGS. 6G2A and 6G2B generally describes the operations (i.e. tasks) that are automatically performed during the state control process of FIG. 9F2, which is carried out within the omni-directional image capturing and processing based bar code symbol reading system described in FIGS. 9A and 9B.

As shown in FIG. 9F3, a state transition diagram is provided for the omni-directional image capturing and processing based bar code symbol reading system described in FIGS. 9B and 9C, running the system control program generally described in flow charts of FIGS. 6G3A and 6G3B, employing locally-controlled object motion/velocity detection in each coplanar illumination and imaging subsystem of the system, with globally-controlled over-driving of all-neighboring stations. The flow chart of FIGS. 6G3A and 6G3B describes the operations (i.e. tasks) that are automatically performed during the state control process of FIG. 9F3, which is carried out within the omni-directional image capturing and processing based bar code symbol reading system described in FIGS. 9B and 9C.

FIG. 9G describes an exemplary embodiment of a computing and memory architecture platform that can be used to implement the omni-directional image capturing and processing based bar code symbol reading system described in FIGS. 9B and 9C. As shown, this hardware computing and memory platform can be realized on a single PC board, along with the electro-optics associated with the coplanar illumination and imaging stations and other subsystems generally described in FIGS. 6G1A through 6G3B. As shown, the hardware platform comprises: at least one, but preferably multiple high speed dual core microprocessors, to provide a multiprocessor architecture having high bandwidth video-interfaces and video memory and processing support; an FPGA (e.g. Spartan 3) for managing the digital image streams supplied by the plurality of digital image capturing and buffering channels, each of which is driven by a coplanar illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

FIG. 9H describes a three-tier software architecture that can run upon the computing and memory architecture platform of FIG. 9G, so as to implement the functionalities of the omni-directional image capturing and processing based bar code symbol reading system described FIGS. 9B and 9C. Details regarding the foundations of this three-tier architecture can be found in Applicants' copending U.S. application Ser. No. 11/408,268, incorporated herein by reference. Preferably, the Main Task and Subordinate Task(s) that would be developed for the Application Layer would carry out the system and subsystem functionalities generally described in the State Control Processes of FIGS. 6G1A through 6G3B, and State Transition Diagrams of FIGS. 9F1 through 9F3. In an illustrative embodiment, the Main Task would carry out the basic object motion and velocity detection operations supported within the 3D imaging volume by each of the coplanar illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The Fifth Illustrative Embodiment of the Omni-Directional Image capturing and Processing Based Bar Code Symbol Reading System of the Present Invention FIG. 10A shows a fifth illustrative embodiment of the omni-directional image capturing and processing based bar code symbol reading system of the present invention 170 installed in the countertop surface of a retail POS station. As shown, the omni-directional image capturing and processing based bar code symbol reading system comprises both vertical and horizontal housing sections, each provided with coplanar illumination and imaging stations for aggressively supporting both "pass-through" as well as "presentation" modes of bar code image capture.

As shown in greater detail in FIG. 10B, the omni-directional image capturing and processing based bar code symbol reading system 170 comprises: a horizontal section 10 (e.g. 10A, 10B, . . . 10E) for projecting a first complex of coplanar illumination and imaging planes from its horizontal imaging window; and a vertical section 175 that projects three vertically-extending spaced-apart coplanar illumination and imaging planes 55 from its vertical imaging window 176 into the 3D imaging volume 16 of the system so as to aggressively support a "pass-through" mode of bar code image capture. The primary functions of each coplanar illumination and imaging station 15 is to generate and project coplanar illumination and imaging planes through the imaging window and apertures into the 3D imaging volume of the system, and capture digital linear (1D) digital images along the field of view (FOV) of these illumination and linear imaging planes. These captured linear images are then buffered and decode-processed using linear (1D) type image capturing and processing based bar code reading algorithms, or can be assembled together to reconstruct 2D images for decode-processing using 1D/2D image processing based bar code reading techniques.

In general, each coplanar illumination and imaging station 15 employed in the system of FIG. 10B (in both horizontal and vertical sections) can be realized as a linear array of VLDs or LEDs and associated focusing and cylindrical beam shaping optics (i.e. planar illumination arrays PLIAs) used to generate a substantially planar illumination beam (PLIB) from each station, that is coplanar with the field of view of the linear (1D) image sensing array employed in the station. Details regarding the design and construction of planar illumination and imaging module (PLIIMs) can be found in Applicants' U.S. Pat. No. 7,028,899 B2 incorporated herein by reference.

In FIG. 10C, the system architecture of the omni-directional image capturing and processing based bar code symbol reading system 170 of FIG. 10B is shown comprising: a complex of coplanar illuminating and linear imaging stations 15A through 151, constructed using LED or VLD based linear illumination arrays and image sensing arrays, as described hereinabove; an multi-channel multi-processor image processing subsystem 20 for supporting automatic image processing based bar code reading along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing)s; a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Bluetooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15' transmits frames of image data to the image processing subsystem 25, for state-dependent image processing and the results of the image processing operations are transmitted to the host system via the input/output subsystem 20.

As shown in FIGS. 10D and 10E, each coplanar illumination and imaging station employed in the system of FIGS. 10B and 10C comprises: an illumination subsystem 44 including a linear array of VLDs or LEDs and associated focusing and cylindrical beam shaping optics (i.e. planar illumination arrays PLIAs), for generating a planar illumination beam (PLIB) from the station 15; a linear image formation and detection (IFD) subsystem 40 having a camera controller interface (e.g. FPGA) 40A for interfacing with local control subsystem 50, and a high-resolution linear image sensing array 41 with optics 42 providing a field of view (FOV) on the image sensing array that is coplanar with the PLIB produced by the linear illumination array 41 so as to form and detect linear digital images of objects within the FOV of the system; a local control subsystem 50 for locally controlling the operation of subcomponents within the station, in response to control signals generated by global control subsystem 37 maintained at the system level, shown in FIG. 10B; an image capturing and buffering subsystem 48 for capturing linear digital images with the linear image sensing array 41 and buffering these linear images in buffer memory so as to form 2D digital images for transfer to image-processing subsystem 20 maintained at the system level, as shown in FIG. 10B, and subsequent image processing according to bar code symbol decoding algorithms, OCR algorithms, and/or object recognition processes; a high-speed image capturing and processing based motion/velocity sensing subsystem 49 for producing motion and velocity data for supply to the local control subsystem 50 for processing and automatic generation of control data that is used to control the illumination and exposure parameters of the linear image formation and detection system within the station. Details regarding the design and construction of planar illumination and imaging module (PLIIMs) can be found in Applicants' U.S. Pat. No. 7,028,899 B2 incorporated herein by reference.

As shown in FIGS. 10D and 10E, the high-speed motion/velocity detection subsystem 49 can be realized using any of the techniques described herein so as to generate, in real-time, motion and velocity data for supply to the local control subsystem 50 for processing and automatic generation of control data that is used to control the illumination and exposure parameters of the linear image formation and detection subsystem 40 within the station. Alternatively, motion/velocity detection subsystem 49 can be deployed outside of illumination and imaging station, and positioned globally as shown in FIGS. 8A and 8B.

As shown in FIG. 10F1, a state transition diagram is provided for the omni-directional image capturing and processing based bar code symbol reading system described in FIGS. 10B and 10C, running the system control program generally described in flow charts of FIGS. 6G1A and 6G1B, with locally-controlled imaging-based object motion/velocity detection provided in each coplanar illumination and imaging subsystem of the system, as illustrated in FIG. 10B. The flow chart of FIGS. 6G1A and 6G1B generally describes the operations (i.e. tasks) that are automatically performed during the state control process of FIG. 10F1, which is carried out within the omni-directional image capturing and processing based bar code symbol reading system described in FIGS. 10B and 10C.

As shown in FIG. 10F2, a state transition diagram is provided for the omni-directional image capturing and processing based bar code symbol reading system described in FIGS. 10B and 10C, running the system control program generally described in flow charts of FIGS. 6G2A and 6G2B, employing locally-controlled object motion/velocity detection in each coplanar illumination and imaging subsystem of the system, with globally-controlled over-driving of nearest-neighboring stations. The flow chart of FIGS. 6G2A and 6G2B generally describes the operations (i.e. tasks) that are automatically performed during the state control process of FIG. 10F2, which is carried out within the omni-directional image capturing and processing based bar code symbol reading system described in FIGS. 10A and 10B.

As shown in FIG. 10F3, a state transition diagram is provided for the omni-directional image capturing and processing based bar code symbol reading system described in FIGS. 10B and 10C, running the system control program generally described in flow charts of FIGS. 6G3A and 6G3B, employing locally-controlled object motion/velocity detection in each coplanar illumination and imaging subsystem of the system, with globally-controlled over-driving of all-neighboring stations. The flow chart of FIGS. 6G3A and 6G3B generally describes the operations (i.e. tasks) that are automatically performed during the state control process of FIG. 10F3, which is carried out within the omni-directional image capturing and processing based bar code symbol reading system described in FIGS. 10B and 10C.

FIG. 10G describes an exemplary embodiment of a computing and memory architecture platform that can be used to implement the omni-directional image capturing and processing based bar code symbol reading system described in FIGS. 10B and 10C. As shown, this hardware computing and memory platform can be realized on a single PC board, along with the electro-optics associated with the coplanar or coextensive-area illumination and imaging stations and other subsystems described in FIGS. 10G1A through 10G3B. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar or coextensive-area illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

FIG. 10H describes a three-tier software architecture that can run upon the computing and memory architecture platform of FIG. 10G, so as to implement the functionalities of the omni-directional image capturing and processing based bar code symbol reading system described FIGS. 10B and 10C. Details regarding the foundations of this three-tier architecture can be found in Applicants' copending U.S. application Ser. No. 11/408,268, incorporated herein by reference. Preferably, the Main Task and Subordinate Task(s) that would be developed for the Application Layer would carry out the system and subsystem functionalities generally described in the State Control Processes of FIGS. 6G1A through 6G3B, and State Transition Diagrams of FIGS. 10F1 through 10F3. In an illustrative embodiment, the Main Task would carry out the basic object motion and velocity detection operations supported within the 3D imaging volume by each of the coplanar illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The Sixth Illustrative Embodiment of the Omni-Directional Image capturing and Processing Based Bar Code Symbol Reading System of the Present Invention FIG. 11 shows a sixth illustrative embodiment of the omni-directional image capturing and processing based bar code symbol reading system of the present invention 180 comprising both a horizontal housing section with coplanar linear illumination and imaging stations, and a vertical housing section 181 with a pair of laterally-spaced area-type illumination and imaging stations 181A, 181B, for aggressively supporting both "pass-through" as well as "presentation" modes of bar code image capture.

As shown in greater detail in FIG. 11A, the omni-directional image capturing and processing based bar code symbol reading system 180 comprises: a horizontal section 10 as substantially shown in FIG. 2 (e.g. as shown in FIGS. 2, 6, 7, 8A, and 8B) for projecting a first complex of coplanar illumination and imaging planes from its horizontal imaging window; and a vertical section 180 that projects two spaced-apart area-type illumination and imaging zones 182A and 182B from its vertical imaging window 183 into the 3D imaging volume 16 of the system so as to aggressively support both "pass-through" as well as "presentation" modes of bar code image capture. The primary functions of each coplanar laser illumination and imaging station 15 is to generate and project coplanar illumination and imaging planes through the imaging window and apertures into the 3D imaging volume of the system, and capture digital linear (1D) digital images along the field of view (FOV) of these illumination and linear-imaging planes. These captured linear images are then buffered and decode-processed using linear (1D) type image capturing and processing based bar code reading algorithms, or can be assembled together to reconstruct 2D images for decode-processing using 1D/2D image processing based bar code reading techniques. The primary functions of each area-type illumination and imaging station 181A, 181B is to generate and project area illumination through the vertical imaging window into the 3D imaging volume of the system, and capture digital linear (2D) digital images along the field of view (FOV) of these area-type illumination and linear-imaging zones. These captured 2D images are then buffered and decode-processed using (2D) type image capturing and processing based bar code reading algorithms.

In FIG. 11A, the system architecture of the omni-directional image capturing and processing based bar code symbol reading system of FIG. 11 is shown comprising: a complex of coplanar linear and area type illuminating and imaging stations 181A through 181B, constructed using LED or VLD based area-type illumination arrays and image sensing arrays, as described hereinabove; a multi-processor image processing subsystem 20 for supporting automatic image processing based bar code reading along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing)s; a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Blue-tooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15 transmits frames of image data to the image processing subsystem 25, for state-dependent image processing and the results of the image processing operations are transmitted to the host system via the input/output subsystem 20.

In general, each coplanar linear illumination and imaging station employed in the system of FIG. 11B can be realized as a linear array of VLDs or LEDs and associated focusing and cylindrical beam shaping optics (i.e. planar illumination arrays PLIAs) to generate a substantially planar illumination beam (PLIB) from each station, that is coplanar with the field of view of the linear (1D) image sensing array employed in the station. Details regarding the design and construction of planar illumination and imaging module (PLIIMs) can be found in Applicants' U.S. Pat. No. 7,028,899 B2 incorporated herein by reference. Also, each coplanar area-type illumination and imaging station employed in the system of FIG. 10B can be realized as an array of VLDs or LEDs and associated focusing and beam shaping optics to generate an wide-area illumination beam from each station, that is spatially-coextensive with the field of view of the area (2D) image sensing array employed in the station. Details regarding the design and construction of area-type illumination and imaging modules can be found in Applicants' U.S. application Ser. No. 10/712,787, incorporated herein by reference.

As shown in FIG. 11B1, the subsystem architecture of a single coplanar linear illumination and imaging station employed in the system embodiment of FIG. 11B is shown comprising: a pair of planar illumination arrays (PLIAs) for producing a composite PLIB; a linear image formation and detection (IFD) subsystem 40 including a linear 1D image sensing array 41 having 42 optics that provides a field of view (FOV) that is coplanar with the PLIB produced by the linear illumination array; an image capturing and buffering subsystem 48 for buffering linear images captured by the linear image sensing array and reconstructing a 2D images therefrom in the buffer for subsequent processing; a high-speed object motion/velocity sensing subsystem 49 as described above, for collecting motion and velocity data on objects moving through the 3D imaging volume and supplying this data to the local control subsystem 50 to produce control data for controlling exposure and/or illumination related parameters (e.g. frequency of the clock signal used to read out frames of image data captured by the linear image sensing array in the IFD subsystem 40); and local control subsystem 50 for controlling operations with the coplanar illumination and imaging subsystem 15 and responsive to control signals generated by the global control subsystem 37.

Also, as shown in FIG. 11B2, each area-type illumination and imaging station 181A, 181B employed in the system of FIG. 11A can be realized as: an area-type image formation and detection (IFD) subsystem 40' including an area 2D image sensing array 41' having optics 42' that provides a field of view (FOV) on the sensing array 41'; an illumination subsystem 44 including a pair of spaced apart linear arrays of LEDs 44A, 44B and associated focusing optics for producing a substantially uniform area of illumination that is coextensive with the FOV of the area-type image sensing array 41'; an image capturing and buffering subsystem 48 for buffering 2D images captured by the area image sensing array for subsequent processing; a high-speed object motion/velocity sensing subsystem 49 as described above, for collecting motion and velocity data on objects moving through the 3D imaging volume and supplying this data to the local control subsystem 50 to produce control data for controlling exposure and/or illumination related parameters (e.g. frequency of the clock signal used to read out frames of image data captured by the linear image sensing array in the IFD subsystem 40'); and local control subsystem 50 for controlling operations with the coplanar illumination and imaging subsystem 181A,181B, and responsive to control signals generated by the global control subsystem 37.

As shown in FIG. 11C1, the high-speed object motion/velocity sensing subsystem 49 is arranged for use with the linear-type image formation and detection subsystem 15 in the linear-type image illumination and imaging station 15, and can be realized using any of the techniques described hereinabove, so as to generate, in real-time, motion and velocity data for supply to the local control subsystem 50. In turn, the local control subsystem 50 processes and generates control data for controlling the illumination and exposure parameters of the linear image sensing array 41 employed in the linear image formation and detection system within the station. Alternatively, motion/velocity detection subsystem 49 can be deployed outside of illumination and imaging station, and positioned globally as shown in FIGS. 8A and 8B.

As shown in FIG. 11C2, the high-speed object motion/velocity detection subsystem 49 is arranged for use with the area-type image formation and detection subsystem 40' in the area-type image illumination and imaging station 181A, 181B, and can be realized using any of the techniques described hereinabove so as to generate, in real-time, motion and velocity data for supply to the local control subsystem 50. In turn, the local control subsystem 50 processes and generates control data that for controlling the illumination and exposure parameters of the area image sensing array 41' employed in the area-type image formation and detection system within the station. Alternatively, motion/velocity detection subsystem 49 can be deployed outside of illumination and imaging station 181A, 181B, and positioned globally as shown in FIGS. 8A and 8B.

As shown in FIG. 11D1, a state transition diagram is provided for the omni-directional image capturing and processing based bar code symbol reading system described in FIG. 11A, running the system control program generally described in flow charts of FIGS. 6G1A and 6G1B, with locally-controlled object motion/velocity detection provided in each illumination and imaging subsystem of the system, as illustrated in FIG. 11A. The flow chart of FIGS. 6G1A and 6G1B generally describes the operations (i.e. tasks) that are automatically performed during the state control process of FIG. 11D1, which is carried out within the omni-directional image capturing and processing based bar code symbol reading system described in FIGS. 11 and 11A.

As shown in FIG. 11D2, a state transition diagram is provided for the omni-directional image capturing and processing based bar code symbol reading system described in FIGS. 11 and 11A, running the system control program generally described in flow charts of FIGS. 6G1A and 6G1B, employing locally-controlled object motion/velocity detection in each illumination and imaging subsystem of the system, with globally-controlled over-driving of nearest-neighboring stations. The flow chart of FIGS. 6G2A and 6G2B generally describes the operations (i.e. tasks) that are automatically performed during the state control process of FIG. 11D2, which is carried out within the omni-directional image capturing and processing based bar code symbol reading system described in FIGS. 11 and 11A.

FIG. 11E describes an exemplary embodiment of a computing and memory architecture platform that can be used to implement the omni-directional image capturing and processing based bar code symbol reading system described in FIG. 11. As shown, this hardware computing and memory platform can be realized on a single PC board, along with the electo-optics associated with the illumination and imaging stations and other subsystems described in FIG. 11. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar or coextensive-area illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

FIG. 11F describes a three-tier software architecture that can run upon the computing and memory architecture platform of FIG. 11E, so as to implement the functionalities of the omni-directional image capturing and processing based bar code symbol reading system described FIG. 11. Details regarding the foundations of this three-tier architecture can be found in Applicants' copending U.S. application Ser. No. 11/408,268, incorporated herein by reference. Preferably, the Main Task and Subordinate Task(s) that would be developed for the Application Layer would carry out the system and subsystem functionalities generally described in the State Control Processes of FIGS. 6G1A through 6GEB, and State Transition Diagrams of FIG. 11D1 through 11D3. In an illustrative embodiment, the Main Task would carry out the basic object motion and velocity detection operations supported within the 3D imaging volume by each of the illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The Seventh Illustrative Embodiment of the Omni-Directional Image Capturing and Processing Based Bar Code Symbol Reading System of the Present Invention FIG. 12 shows a sixth illustrative embodiment of the omni-directional image capturing and processing based bar code symbol reading system of the present invention 200 comprising a horizontal housing section with a complex of coplanar linear illumination and imaging stations, and also a pair of laterally-spaced area-type illumination and imaging stations, for aggressively supporting both "pass-through" as well as "presentation" modes of bar code image capture.

As shown in greater detail in FIGS. 12 and 12A, the omni-directional image capturing and processing based bar code symbol reading system 200 comprises: a horizontal section 10 (e.g. 10A, . . . or 10E) for projecting a first complex of coplanar illumination and imaging planes from its horizontal imaging window; and two spaced-apart area-type illumination and imaging zones 182A and 182B from imagers 181A and 181B into the 3D imaging volume 16 of the system, so as to aggressively support both "pass-through" as well as "presentation" modes of bar code image capture. The primary functions of each coplanar laser illumination and imaging station 15 is to generate and project coplanar illumination and imaging planes through the imaging window and apertures into the 3D imaging volume of the system, and capture digital linear (1D) digital images along the field of view (FOV) of these illumination and linear imaging planes. These captured linear images are then buffered and decode-processed using linear (1D) type image capturing and processing based bar code reading algorithms, or can be assembled together to reconstruct 2D images for decode-processing using 1D/2D image processing based bar code reading techniques. The primary functions of each area-type illumination and imaging station 181A,181B is to generate and project area illumination through the vertical imaging window into the 3D imaging volume of the system, and capture digital linear (2D) digital images along the field of view (FOV) of these area-type illumination and linear-imaging zones. These captured 2D images are then buffered and decode-processed using (2D) type image capturing and processing based bar code reading algorithms.

In FIG. 12A, the system architecture of the omni-directional image capturing and processing based bar code symbol reading system of FIG. 12 is shown comprising: a complex of coplanar linear and area type illuminating and imaging stations 15A through 15F, 181A and 181B constructed using LED or VLD based illumination arrays and image sensing arrays (e.g. CCD or CMOS type), as described hereinabove; an multi-channel multi-processor image processing subsystem 20 for supporting automatic image processing based bar code reading along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing)s; a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Blue-tooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15' transmits frames of image data to the image processing subsystem 25, for state-dependent image processing and the results of the image processing operations are transmitted to the host system via the input/output subsystem 20.

In general, each coplanar linear illumination and imaging station employed in the system of FIG. 12 can be realized as a linear array of VLDs or LEDs and associated focusing and cylindrical beam shaping optics (i.e. planar illumination arrays PLIAs) to generate a substantially planar illumination beam (PLIB) from each station, that is coplanar with the field of view of the linear (1D) image sensing array employed in the station. Details regarding the design and construction of planar illumination and imaging module (PLIIMs) can be found in Applicants' U.S. Pat. No. 7,028,899 B2 incorporated herein by reference. Also, each area-type illumination and imaging station employed in the system of FIG. 12 can be realized as an array of VLDs or LEDs and associated focusing and beam shaping optics to generate an wide-area illumination beam from each station, that is spatially-coextensive with the field of view of the area (2D) image sensing array employed in the station. Details regarding the design and construction of area-type illumination and imaging module can be found in Applicants' U.S. application Ser. No. 10/712,787 incorporated herein by reference.

As shown in FIG. 12B1, the subsystem architecture of a single coplanar linear illumination and imaging station 15 employed in the system embodiment of FIG. 12B is shown comprising: an illumination subsystem 44 including a pair of planar illumination arrays (PLIAs) 44A for producing a composite PLIB; a linear image formation and detection (IFD) subsystem 40 including a linear 1D image sensing array 41 having optics 42 that provides a field of view (FOV) that is coplanar with the PLIB produced by the linear illumination array; an image capturing and buffering subsystem 48 for buffering linear images captured by the linear image sensing array and reconstructing a 2D images therefrom in the buffer for subsequent processing; a high-speed object motion/velocity sensing subsystem 49 as described above for collecting object motion and velocity data for use in the real-time controlling of exposure and/or illumination related parameters (e.g. frequency of the clock signal used to read out frames of image data captured by the linear image sensing array in the IFD subsystem); and local control subsystem 50 for controlling operations with the coplanar illumination and imaging subsystem 15, and responsive to control signals generated by the global control subsystem 37.

Also, as shown in FIG. 12B2, each area-type illumination and imaging station employed in the system of FIG. 12A can be realized as: an area-type image formation and detection (IFD) subsystem 40' including an area 2D image sensing array 41' having optics 42' that provides a field of view (FOV) on the area image sensing array 41'; an illumination subsystem 44 including a pair of spaced apart linear arrays of LEDs 44A' and associated focusing optics for producing a substantially uniform area of illumination that is coextensive with the FOV of the area-type image sensing array 41'; an image capturing and buffering subsystem 48 for buffering 2D images captured by the area image sensing array for subsequent processing; a high-speed object motion/velocity sensing subsystem 49 as described above for collecting object motion and velocity data for use in the real-time controlling of exposure and/or illumination related parameters (e.g. frequency of the clock signal used to read out frames of image data captured by the linear image sensing array in the IFD subsystem); and local control subsystem 50 for controlling operations with the illumination and imaging subsystem 181A,181B, and responsive to control signals generated by the global control subsystem 37.

As shown in FIG. 12C1, the high-speed motion/velocity detection subsystem 49 is arranged for use with the linear-type image formation and detection subsystem 40 in the linear-type image illumination and imaging station 15, and can be realized using any of the techniques described hereinabove, so as to generate, in real-time, motion and velocity data for supply to the local control subsystem for processing and automatic generation of control data that is used to control the illumination and exposure parameters of the linear image sensing array 41 employed in the linear image formation and detection system within the station. Alternatively, motion/velocity detection subsystem 49 can be deployed outside of illumination and imaging station, and positioned globally as shown in FIGS. 8A and 8B.

As shown in FIG. 12C2, the high-speed object motion/velocity detection subsystem 49 is arranged for use with the area-type image formation and detection subsystem 40' in the area-type image illumination and imaging station 181A, 181B, and can be realized using any of the techniques described hereinabove so as to generate, in real-time, motion and velocity data for supply to the local control subsystem 50. In turn the local control subsystem processes and automatic generates control data for controlling the illumination and exposure parameters of the area image sensing array 41' employed in the area-type image formation and detection system within the station. Alternatively, motion/velocity detection subsystem 49 can be deployed outside of illumination and imaging station, and positioned globally as shown in FIGS. 8A and 8B.

As shown in FIG. 12D1, a state transition diagram is provided for the omni-directional image capturing and processing based bar code symbol reading system described in FIG. 12A, running the system control program generally described in flow charts of FIGS. 6G1A and 6G1B, with locally-controlled object motion/velocity detection provided in each illumination and imaging subsystem of the system, as illustrated in FIG. 12A. The flow chart of FIGS. 6G1A and 6G1B generally describes the operations (i.e. tasks) that are automatically performed during the state control process of FIG. 12D1, which is carried out within the omni-directional image capturing and processing based bar code symbol reading system described in FIGS. 12 and 12A.

As shown in FIG. 12D2, a state transition diagram is provided for the omni-directional image capturing and processing based bar code symbol reading system described in FIGS. 12 and 12A, running the system control program generally described in flow charts of FIGS. 6G1A and 6G1B, employing locally-controlled object motion/velocity detection in each illumination and imaging subsystem of the system, with globally-controlled over-driving of nearest-neighboring stations (into their Bar Code Reading State of operation). The flow chart of FIGS. 6G2A and 6G2B generally describes the operations (i.e. tasks) that are automatically performed during the state control process of FIG. 12D2, which is carried out within the omni-directional image capturing and processing based bar code symbol reading system described in FIGS. 12 and 12A.

FIG. 12E describes an exemplary embodiment of a computing and memory architecture platform that can be used to implement the omni-directional image capturing and processing based bar code symbol reading system described in FIG. 12. As shown, this hardware computing and memory platform can be realized on a single PC board, along with the electro-optics associated with the illumination and imaging stations and other subsystems described in FIGS. 12A and 12A. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar or coextensive-area illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

FIG. 12F describes a three-tier software architecture that can run upon the computing and memory architecture platform of FIG. 12G, so as to implement the functionalities of the omni-directional image capturing and processing based bar code symbol reading system described FIG. 12. Details regarding the foundations of this three-tier architecture can be found in Applicants' copending U.S. application Ser. No. 11/408,268, incorporated herein by reference. Preferably, the Main Task and Subordinate Task(s) that would be developed for the Application Layer would carry out the system and subsystem functionalities described in the State Control Processes of FIG. 6G1A through 6G3B, and State Transition Diagrams of FIG. 12D1 and 12D3. In an illustrative embodiment, the Main Task would carry out the basic object motion and velocity detection operations supported within the 3D imaging volume by each of the illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The Eighth Illustrative Embodiment of the Omni-Directional Image Capturing and Processing Based Bar Code Symbol Reading System of the Present Invention FIG. 13 is a perspective view of an eighth illustrative embodiment of the omni-directional image capturing and processing based bar code symbol reading system 200 of the present invention, shown comprising both a horizontal housing section with coplanar linear illumination and imaging stations, and a vertical housing section with a pair of laterally-spaced area-type illumination and imaging stations and a coplanar linear illumination and imaging station, for aggressively supporting both "pass-through" as well as "presentation" modes of bar code image capture;

As shown in FIGS. 13 and 13A, the omni-directional image capturing and processing based bar code symbol reading system 200 comprises: a horizontal section 10 (e.g. 10A, . . . 10E shown in FIGS. 2, 6A, 6B, 7, 8A and 8B) for projecting a first complex of coplanar illumination and imaging planes from its horizontal imaging window; and a vertical section 205 that projects two spaced-apart area-type illumination and imaging zones 206A and 206B and a single horizontally-extending coplanar illumination and imaging plane 55 from its vertical imaging window 207 into the 3D imaging volume of the system so as to aggressively support both "pass-through" as well as "presentation" modes of bar code image capture. The primary functions of each coplanar laser illumination and imaging station 15 in the system is to generate and project coplanar illumination and imaging planes through the imaging window and apertures into the 3D imaging volume of the system, and capture digital linear (1D) digital images along the field of view (FOV) of these illumination and linear imaging planes. These captured linear images are then buffered and decode-processed using linear (1D) type image capturing and processing based bar code reading algorithms, or can be assembled together to reconstruct 2D images for decode-processing using 1D/2D image processing based bar code reading techniques. The primary functions of each area-type illumination and imaging station 181A, 181B employed in the system is to generate and project area illumination through the vertical imaging window into the 3D imaging volume of the system, and capture digital linear (2D) digital images along the field of view (FOV) of these area-type illumination and linear-imaging zones. These captured 2D images are then buffered and decode-processed using (2D) type image capturing and processing based bar code reading algorithms.

In FIG. 13A, the system architecture of the omni-directional image capturing and processing based bar code symbol reading system of FIG. 13 is shown comprising: a complex of coplanar linear and area type illuminating and imaging stations 15A through 15F and 181A, and 181B constructed using LED or VLD based illumination arrays and (CMOS or CCD) image sensing arrays, as described hereinabove; an multi-channel multi-processor image processing subsystem 20 for supporting automatic image processing based bar code reading along each coplanar illumination and imaging plane within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing) s; a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Blue-tooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15 transmits frames of image data to the image processing subsystem 25, for state-dependent image processing and the results of the image processing operations are transmitted to the host system via the input/output subsystem 20.

In general, each coplanar linear illumination and imaging station employed in the system of FIG. 13B1 can be realized as a linear array of VLDs or LEDs and associated focusing and cylindrical beam shaping optics (i.e. planar illumination arrays PLIAs) to generate a substantially planar illumination beam (PLIB) from each station, that is coplanar with the field of view of the linear (1D) image sensing array employed in the station. Details regarding the design and construction of planar illumination and imaging module (PLIIMs) can be found in Applicants' U.S. Pat. No. 7,028,899 B2 incorporated herein by reference. Also, each area-type illumination and imaging station employed in the system of FIG. 13B2 can be realized as an array of VLDs or LEDs and associated focusing and beam shaping optics to generate an wide-area illumination beam from each station, that is spatially-coextensive with the field of view of the area (2D) image sensing array employed in the station. Details regarding the design and construction of area-type illumination and imaging module can be found in Applicants' U.S. application Ser. No. 10/712,787 incorporated herein by reference.

As shown in FIG. 13B1, the subsystem architecture of a single coplanar linear illumination and imaging station 15 employed in the system embodiment of FIG. 13A is shown comprising: an illumination subsystem 44 including a pair of planar illumination arrays (PLIAs) 44A and 44B for producing a composite PLIB; a linear image formation and detection (IFD) subsystem 40 including a linear 1D image sensing array 41 having optics 42 that provides a field of view (FOV) on the image sensing array that is coplanar with the PLIB produced by the linear illumination array; an image capturing and buffering subsystem 48 for buffering linear images captured by the linear image sensing array and reconstructing a 2D images therefrom in the buffer for subsequent processing; a high-speed object motion/velocity sensing subsystem 49 as described above for collecting object motion and velocity data for use in the real-time controlling of exposure and/or illumination related parameters (e.g. frequency of the clock signal used to read out frames of image data captured by the linear image sensing array in the IFD subsystem); and local control subsystem 50 for controlling operations with the coplanar illumination and imaging subsystem 15, and responsive to control signals generated by the global control subsystem 37.

Also, as shown in FIG. 13B2, each area-type illumination and imaging station employed in the system of FIG. 13A can be realized as: an area-type image formation and detection (IFD) subsystem an IFD subsystem 40 including an area 2D image sensing array 41' having optics 42' that provides a field of view (FOV) on the image sensing array 41'; an illumination subsystem 44' including a pair of spaced apart linear arrays of LEDs 44A' and 44B' and associated focusing optics for producing a substantially uniform area of illumination that is coextensive with the FOV of the area-type image sensing array 41'; an image capturing and buffering subsystem 48 for buffering 2D images captured by the area image sensing array for subsequent processing; a high-speed object motion/velocity sensing subsystem 49 as described above, for collecting object motion and velocity data for use in the real-time controlling of exposure and/or illumination related parameters (e.g. frequency of the clock signal used to read out frames of image data captured by the linear image sensing array in the IFD subsystem); and local control subsystem 50 for controlling operations with the illumination and imaging subsystem 181A,181B, and responsive to control signals generated by the global control subsystem 37.

As shown in FIG. 13C1, the high-speed object motion/velocity detection subsystem 49 is arranged for use with the linear-type image formation and detection subsystem 40 in the linear-type image illumination and imaging station 15, can be realized using any of the techniques described hereinabove so as to generate, in real-time, motion and velocity data for supply to the local control subsystem 50. In turn, the local control subsystem processes and generates control data for controlling the illumination and exposure parameters of the linear image sensing array 41 employed in the linear image formation and detection system within the station 15. Alternatively, motion/velocity detection subsystem 49 can be deployed outside of illumination and imaging station, and positioned globally as shown in FIGS. 8A and 8B.

As shown in FIG. 13C2, the high-speed object motion/velocity detection subsystem 49 is arranged for use with the area-type image formation and detection subsystem 40' in the area-type image illumination and imaging station 181A, 181B, and can be realized using any of the techniques described hereinabove, so as to generate, in real-time, motion and velocity data for supply to the local control subsystem 50. In turn, the local control subsystem processes and generates control data for controlling the illumination and exposure parameters of the area image sensing array 41' employed in the area-type image formation and detection system within the station 181A, 181B. Alternatively, motion/velocity detection subsystem 49 can be deployed outside of illumination and imaging station, and positioned globally as shown in FIGS. 8A and 8B.

As shown in FIG. 13D1, a state transition diagram is provided for the omni-directional image capturing and processing based bar code symbol reading system described in FIG. 13A, running the system control program described in flow charts of FIGS. 6G1A and 6G1B, with locally-controlled object motion/velocity detection provided in each illumination and imaging subsystem of the system, as illustrated in FIG. 13A. The flow chart of FIGS. 6G1A and 6G1B describes the operations (i.e. tasks) that are automatically performed during the state control process of FIG. 13D1, which is carried out within the omni-directional image capturing and processing based bar code symbol reading system described in FIGS. 13 and 13A.

As shown in FIG. 13D3, a state transition diagram is provided for the omni-directional image capturing and processing based bar code symbol reading system described in FIGS. 13 and 13A, running the system control program generally described in flow charts of FIGS. 6G3A and 6G3B, employing locally-controlled object motion/velocity detection in each illumination and imaging subsystem of the system, with globally-controlled over-driving of all-neighboring stations. The flow chart of FIGS. 6G3A and 6G3B generally describes the operations (i.e. tasks) that are automatically performed during the state control process of FIG. 13D3, which is carried out within the omni-directional image capturing and processing based bar code symbol reading system described in FIGS. 13 and 13A.

FIG. 13E describes an exemplary embodiment of a computing and memory architecture platform that can be used to implement the omni-directional image capturing and processing based bar code symbol reading system described in FIG. 13. As shown, this hardware computing and memory platform can be realized on a single PC board, along with the electro-optics associated with the illumination and imaging stations and other subsystems described in FIGS. 13 and 13A. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar or coextensive-area illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

FIG. 13F describes a three-tier software architecture that can run upon the computing and memory architecture platform of FIG. 13E, so as to implement the functionalities of the omni-directional image capturing and processing based bar code symbol reading system described FIGS. 13 and 13A. Details regarding the foundations of this three-tier architecture can be found in Applicants' copending U.S. application Ser. No. 11/408,268, incorporated herein by reference. Preferably, the Main Task and Subordinate Task(s) that would be developed for the Application Layer would carry out the system and subsystem functionalities described in the State Control Processes of FIGS. 6G1A through 6G3B, and State Transition Diagrams of FIG. 13D1 through 13D3. In an illustrative embodiment, the Main Task would carry out the basic object motion and velocity detection operations supported within the 3D imaging volume by each of the illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The omni-directional image capturing and processing based bar code symbol reading system described above generates and projects a complex of coplanar PLIB/FOVs within its 3D imaging volume, thereby providing 360 degrees of imaging coverage at a POS station. The system can read ladder-type and picket-fence type bar code symbols on at least five sides of an imaged object passed through the 3D imaging volume. With slight modification to the complex of coplanar illumination and imaging planes generated by the horizontal housing section, the system can be adapted to read ladder-type and picket-fence type bar code symbols on six sides of an imaged object passed through the 3D imaging volume.

The Ninth Illustrative Embodiment of the Omni-Directional Image capturing and Processing Based Bar Code Symbol Reading System of the Present Invention FIG. 14 is a perspective view of a ninth illustrative embodiment of the omni-directional image capturing and processing based bar code symbol reading system 250 of the present invention, shown comprising a horizontal housing section with a complex coplanar linear illumination and imaging stations, and a centrally-located area-type illumination and imaging stations, for aggressively supporting both "pass-through" as well as "presentation" modes of bar code image capture.

As shown in FIG. 14A, the omni-directional image capturing and processing based bar code symbol reading system 250 comprises: a horizontal section 10' (or vertical section if system is operated in a vertical orientation) for projecting a first complex of coplanar illumination and imaging planes 55 from its horizontal imaging window 17, and an area-type illumination and imaging zones 182 from its horizontal imaging window 17 into the 3D imaging volume 16 of the system so as to aggressively support both "pass-through" as well as "presentation" modes of bar code image capture. The primary functions of each coplanar laser illumination and imaging station 15 is to generate and project coplanar illumination and imaging planes through the imaging window and apertures into the 3D imaging volume of the system, and capture digital linear (1D) digital images along the field of view (FOV) of these illumination and linear imaging planes. These captured linear images are then buffered and decode-processed using linear (1D) type image capturing and processing based bar code reading algorithms, or can be assembled together to reconstruct 2D images for decode-processing using 1D/2D image processing based bar code reading techniques. The primary functions of the area-type illumination and imaging station 181 is to generate and project area illumination through the vertical imaging window into the 3D imaging volume of the system, and capture digital linear (2D) digital images along the field of view (FOV) of these area-type illumination and linear-imaging zones. These captured 2D images are then buffered and decode-processed using (2D) type image capturing and processing based bar code reading algorithms.

In FIG. 14A, the system architecture of the omni-directional image capturing and processing based bar code symbol reading system 250 of FIG. 14 is shown comprising: a complex of coplanar linear and area type illuminating and imaging stations constructed using LED or VLD based illumination arrays and (CMOS or CCD) image sensing arrays, as described hereinabove; an multi-channel image processing subsystem 20 for supporting automatic image processing based bar code reading along each illumination and imaging plane and zone within the system; a software-based object recognition subsystem 21, for use in cooperation with the image processing subsystem 20, and automatically recognizing objects (such as vegetables and fruit) at the retail POS while being imaged by the system; an electronic weight scale 22 employing one or more load cells 23 positioned centrally below the system housing, for rapidly measuring the weight of objects positioned on the window aperture of the system for weighing, and generating electronic data representative of measured weight of the object; an input/output subsystem 28 for interfacing with the image processing subsystem, the electronic weight scale 22, RFID reader 26, credit-card reader 27 and Electronic Article Surveillance (EAS) Subsystem 28 (including EAS tag deactivation block integrated in system housing); a wide-area wireless interface (WIFI) 31 including RF transceiver and antenna 31A for connecting to the TCP/IP layer of the Internet as well as one or more image storing and processing RDBMS servers 33 (which can receive images lifted by system for remote processing by the image storing and processing servers 33); a BlueTooth® RF 2-way communication interface 35 including RF transceivers and antennas 3A for connecting to Blue-tooth® enabled hand-held scanners, imagers, PDAs, portable computers 36 and the like, for control, management, application and diagnostic purposes; and a global control subsystem 37 for controlling (i.e. orchestrating and managing) the operation of the coplanar illumination and imaging stations (i.e. subsystems), electronic weight scale 22, and other subsystems. As shown, each coplanar illumination and imaging subsystem 15 transmits frames of image data to the image processing subsystem 25, for state-dependent image processing and the results of the image processing operations are transmitted to the host system via the input/output subsystem 20.

In general, each coplanar linear illumination and imaging station 15 employed in the system of FIG. 14B1 can be realized as a linear array of VLDs or LEDs and associated focusing and cylindrical beam shaping optics (i.e. planar illumination arrays PLIAs) to generate a substantially planar illumination beam (PLIB) from each station, that is coplanar with the field of view of the linear (1D) image sensing array employed in the station. Details regarding the design and construction of planar laser illumination and imaging module (PLIIMs) can be found in Applicants' U.S. Pat. No. 7,028,899 B2 incorporated herein by reference. Also, the area-type illumination and imaging station employed in the system of FIG. 14B2 can be realized as an array of VLDs or LEDs and associated focusing and beam shaping optics to generate an wide-area illumination beam from the station, that is spatially-coextensive with the field of view of the area (2D) image sensing array employed in the station. Details regarding the design and construction of planar laser illumination and imaging module (PLIIMs) can be found in Applicants' U.S. application Ser. No. 10/712,787 incorporated herein by reference.

As shown in FIG. 14B1, the subsystem architecture of a single coplanar linear illumination and imaging station 15 employed in the system embodiment of FIG. 14A is shown comprising: an illumination subsystem 44 including a pair of planar illumination arrays (PLIAs) 44A and 44B for producing a composite PLIB; a linear image formation and detection (IFD) subsystem 40 including a linear 1D image sensing array 41 having optics 42 that provides a field of view (FOV) on the linear image sensing array that is coplanar with the PLIB produced by the linear illumination array; an image capturing and buffering subsystem 48 for buffering linear images captured by the linear image sensing array and reconstructing a 2D images therefrom in the buffer for subsequent processing; a high-speed object motion/velocity sensing subsystem 49 as described above, for collecting object motion and velocity data for use in the real-time controlling of exposure and/or illumination related parameters (e.g. frequency of the clock signal used to read out frames of image data captured by the linear image sensing array in the IFD subsystem); and local control subsystem 50 for controlling operations with the coplanar illumination and imaging subsystem 15, and responsive to control signals generated by the global control subsystem 37.

Also, as shown in FIG. 14B2, each area-type illumination and imaging station 181 employed in the system of FIG. 14A can be realized as: an area-type image formation and detection (IFD) subsystem 40' including an area 2D image sensing array 41' having optics 42' that provides a field of view (FOV) on the area image sensing array 41'; an illumination subsystem 44' including a pair of spaced apart linear arrays of LEDs 44A' and associated focusing optics for producing a substantially uniform area of illumination that is coextensive with the FOV of the area-type image sensing array 41'; an image capturing and buffering subsystem 48 for buffering 2D images captured by the area image sensing array for subsequent processing; a high-speed object motion/velocity sensing subsystem 49, as described above, for collecting object motion and velocity data for use in the real-time controlling of control exposure and/or illumination related parameters (e.g. frequency of the clock signal used to read out frames of image data captured by the linear image sensing array in the IFD subsystem); and local control subsystem 50 for controlling operations with the illumination and imaging subsystem 181, and responsive to control signals generated by the global control subsystem 37.

As shown in FIG. 14C1, the high-speed object motion/velocity detection subsystem 49 is arranged for use with the linear-type image formation and detection subsystem 40 in the linear-type image illumination and imaging station 15, and can be realized using any of the techniques described hereinabove, so as to generate, in real-time, motion and velocity data for supply to the local control subsystem 50 for processing and automatic generation of control data that is used to control the illumination and exposure parameters of the linear image sensing array 41 employed in the linear image formation and detection system within the station. Alternatively, motion/velocity detection subsystem 49 can be deployed outside of illumination and imaging station, and positioned globally as shown in FIGS. 8A and 8B.

As shown in FIG. 14C2, the high-speed object motion/velocity detection subsystem 49 is arranged for use with the area-type image formation and detection subsystem 40' in the area-type image illumination and imaging station 181, and can be realized using any of the techniques described hereinabove, so as to generate, in real-time, motion and velocity data for supply to the local control subsystem 50. In turn, the local control subsystem processes and generates control data for controlling the illumination and exposure parameters of the area image sensing array 41' employed in the area-type image formation and detection system 40' within the station 15. Alternatively, motion/velocity detection subsystem 49 can be deployed outside of illumination and imaging station, and positioned globally as shown in FIGS. 8A and 8B.

As shown in FIG. 14D1, a state transition diagram is provided for the omni-directional image capturing and processing based bar code symbol reading system described in FIG. 14A, running the system control program generally described in flow charts of FIGS. 6G1A and 6G1B, with locally-controlled object motion/velocity detection provided in each illumination and imaging subsystem of the system, as illustrated in FIG. 14A. The flow chart of FIGS. 6G1A and 6G1B generally describes the operations (i.e. tasks) that are automatically performed during the state control process of FIG. 14D1, which is carried out within the omni-directional image capturing and processing based bar code symbol reading system described in FIGS. 14 and 14A.

As shown in FIG. 14D2, a state transition diagram is provided for the omni-directional image capturing and processing based bar code symbol reading system described in FIGS. 14 and 14A, running the system control program generally described in flow charts of FIGS. 6G1A and 6G1B, employing locally-controlled object motion/velocity detection in each illumination and imaging subsystem of the system, with globally-controlled over-driving of nearest-neighboring stations (into their Bar Code Reading State of operation). The flow chart of FIGS. 6G2A and 6G2B generally describes the operations (i.e. tasks) that are automatically performed during the state control process of FIG. 14D2, which is carried out within the omni-directional image capturing and processing based bar code symbol reading system described in FIGS. 14 and 14A.

As shown in FIG. 14D3, a state transition diagram is provided for the omni-directional image capturing and processing based bar code symbol reading system described in FIGS. 14 and 14A, running the system control program generally described in flow charts of FIGS. 6G3A and 6G3B, employing locally-controlled object motion/velocity detection in each illumination and imaging subsystem of the system, with globally-controlled over-driving of all-neighboring stations. The flow chart of FIGS. 6G3A and 6G3B generally describes the operations (i.e. tasks) that are automatically performed during the state control process of FIG. 14D3, which is carried out within the omni-directional image capturing and processing based bar code symbol reading system described in FIGS. 14 and 14A.

FIG. 14E describes an exemplary embodiment of a computing and memory architecture platform that can be used to implement the omni-directional image capturing and processing based bar code symbol reading system described in FIG. 14. As shown, this hardware computing and memory platform can be realized on a single PC board, along with the electro-optics associated with the illumination and imaging stations and other subsystems described in FIGS. 14 and 14A. As shown, the hardware platform comprises: at least one, but preferably multiple high speed dual core microprocessors, to provide a multi-processor architecture having high bandwidth video-interfaces and video memory and processing support; an FPGA (e.g. Spartan 3) for managing the digital image streams supplied by the plurality of digital image capturing and buffering channels, each of which is driven by a coplanar or coextensive-area illumination and imaging station (e.g. linear CCD or CMOS image sensing array, image formation optics, etc) in the system; a robust multi-tier memory architecture including DRAM, Flash Memory, SRAM and even a hard-drive persistence memory in some applications; arrays of VLDs and/or LEDs, associated beam shaping and collimating/focusing optics; and analog and digital circuitry for realizing the illumination subsystem; interface board with microprocessors and connectors; power supply and distribution circuitry; as well as circuitry for implementing the others subsystems employed in the system.

FIG. 14F describes a three-tier software architecture that can run upon the computing and memory architecture platform of FIG. 14E, so as to implement the functionalities of the omni-directional image capturing and processing based bar code symbol reading system described FIG. 14. Details regarding the foundations of this three-tier architecture can be found in Applicants' copending U.S. application Ser. No. 11/408,268, incorporated herein by reference. Preferably, the Main Task and Subordinate Task(s) that would be developed for the Application Layer would carry out the system and subsystem functionalities described in the State Control Processes of FIG. 6G1A through 6G3B, and State Transition Diagrams of FIGS. 14D1 through 14D3. In an illustrative embodiment, the Main Task would carry out the basic object motion and velocity detection operations supported within the 3D imaging volume by each of the illumination and imaging subsystems, and Subordinate Task would be called to carry out the bar code reading operations the information processing channels of those stations that are configured in their Bar Code Reading State (Mode) of operation. Details of task development will readily occur to those skilled in the art having the benefit of the present invention disclosure.

The Tenth Illustrative Embodiment of the Omni-Directional Image Capturing and Processing Based Bar Code Symbol Reading System of the Present Invention FIG. 15 is a perspective view of a tenth illustrative embodiment of the omni-directional digital image capturing and processing based bar code symbol reading system of the present invention, shown comprising both a horizontal housing section with a first pair of laterally-spaced area-type illumination and imaging stations, and a vertical housing station with a second pair of laterally-spaced area-type illumination and imaging stations, for supporting both "pass-through" as well as "presentation" modes of bar code image capture;

FIG. 15A is a block schematic representation of the omni-directional image capturing and processing based bar code symbol reading system of FIG. 15, wherein the first pair of area-type illuminating and imaging stations are mounted within the horizontal section for projecting a first pair of coextensive area-type illumination and imaging fields (i.e. zones) from its horizontal imaging window into the 3D imaging volume of the system using both a dynamically/adaptively controlled mixture of visible/IR illumination, and wherein the second pair of area-type illumination and imaging stations are mounted in the vertical section for projecting a second pair of laterally-spaced area-type illumination and imaging fields (i.e. zones) into the 3D imaging volume of the system, also using both a dynamically/adaptively controlled mixture of visible/IR illumination. Each coextensive area-type illumination and imaging station employed in the system also has an array of light emitting devices configured together to produce an area-type field of illumination that is coextensive area-type with the FOV of the area-type imaging array, and thereby providing a coextensive area-type illumination and imaging zone that projects through the imaging window and into the 3D imaging volume, for capturing a series of area-type digital images of an object intersecting therewith during system operation.

FIG. 15B shows one of the coextensive area-type illumination and imaging stations employed in the system embodiment of FIG. 15A, comprising: a VLD/IR-VD-based area illumination array, a area-type image formation and detection subsystem; an image capturing and buffering subsystem; a high-speed imaging based object motion/velocity sensing subsystem; and a local control subsystem supporting the method of dynamically/adaptively controlling visible/IR illumination illustrated in FIGS. 5E2, 5F2 and 5G2. As shown in FIG. 15C, the high-speed imaging-based object motion/velocity detection subsystem comprises an area-type image acquisition subsystem and an embedded digital signal processing (DSP) chip to support high-speed digital image capture and (local) processing operations required for real-time object motion/velocity detection.

FIG. 15D1 is a state transition diagram for the omni-directional image capturing and processing based bar code symbol reading system described in FIG. 15B, running the system control program generally described in FIGS. 6G1A and 6G1B. FIG. 15D2 is a state transition diagram for the omni-directional image capturing and processing based bar code symbol reading system described in FIG. 15B, running the system control program generally described in FIGS. 6G2A and 6G2B. FIG. 15D3 is a state transition diagram for the omni-directional image capturing and processing based bar code symbol reading system described in FIG. 15B, running the system control program generally described in FIGS. 6G2A and 6G2B.

FIG. 15E describes an exemplary embodiment of a computing and memory architecture platform for implementing the omni-directional image capturing and processing based bar code symbol reading system described FIG. 15. FIG. 15F describes a three-tier software architecture that can run upon the computing and memory architecture platform of FIG. 15E, so as to implement the functionalities of the omni-directional image capturing and processing based bar code symbol reading system described FIG. 15.

During system operation, the object detection subsystem automatically detects the motion of objects moving through the 3D imaging volume, and generates motion data which is used by the control subsystem to control at least one illumination control parameter associated with the production of the area-type fields of illumination produced from the coextensive area-type illumination and imaging stations, during system operation. The coextensive area-type illumination and imaging zones intersect within the 3D imaging volume for digital imaging of objects passing through the 3D imaging volume.

The First Illustrative Embodiment of the POS-Centric Digital Imaging System of the Present Invention FIGS. 16A and 16B illustrate a first illustrative embodiment of the retail point of sale (POS) station of the present invention having a countertop surface. As shown, a POS-centric digital imaging system is installed therein, and comprises: (i) the omni-directional digital image capturing and processing subsystem of FIG. 14 supported within its horizontal housing section; and (ii) a cashier/customer terminal integrated within the vertical section of the system housing, to simultaneously support cashier product scanning/imaging and checkout operations on the cashier side of the system, and customer payment, advertising and other services on the customer side of the system.

As shown in FIG. 16C, the POS-centric digital image capturing and processing system of FIG. 16A comprises: a plurality of coplanar illumination and imaging stations for projecting a plurality of coplanar illumination and imaging planes through the imaging window and intersecting within the 3D imaging volume of the system, as well as at least one area-type illumination and imaging station for projecting at least one coextensive illumination and imaging zone into the 3D imaging volume, and intersecting with the projected illumination and imaging planes; an image processing subsystem; a global control subsystem; an I/O subsystem; object recognition subsystem; and a cashier's sales terminal and customer transaction terminal integrated with the vertical section of the system housing, as disclosed and taught in Applicants' WIPO Publication No. WO 2003/062956, entitled "POINT OF SALE (POS) BASED BAR CODE READING AND CASH REGISTER SYSTEMS WITH INTEGRATED INTERNET-ENABLED CUSTOMER-KIOSK TERMINALS", incorporated herein by reference.

The Second Illustrative Embodiment of the POS-Centric Digital Imaging System of the Present Invention FIGS. 17A and 17B illustrate a second illustrative embodiment of the retail point of sale (POS) station of the present invention having a countertop surface. As shown, a POS-centric digital imaging system of the present invention is mounted therein, and comprises: (i) the omni-directional digital image capturing and processing subsystem of FIG. 13 supported within its horizontal and vertical housing sections; and (ii) a cashier/customer terminal is integrated within the vertical section of the system housing, to simultaneously support cashier product scanning/imaging and checkout operations on the cashier side of the system, and customer payment, advertising and other services on the customer side of the system;

As shown in FIG. 17C, the POS-centric digital image capturing and processing system of FIG. 17A comprises: a plurality of area-type illumination and imaging stations projecting a plurality of coextensive illumination and imaging zones that intersect within the 3D imaging volume of the system; an image processing subsystem; a global control subsystem; an I/O subsystem; object recognition subsystem; and cashier's sales terminal and customer transaction terminal integrated with the vertical section of the system housing, as disclosed and taught in Applicants' WIPO Publication No. WO 2003/062956, supra.

The Third Illustrative Embodiment of the POS-Centric Digital Imaging System of the Present Invention FIGS. 18A and 18B illustrate a third illustrative embodiment of the retail point of sale (POS) station of the present invention having a countertop surface. As shown, a POS-centric digital imaging system of the present invention is mounted therein, and comprises: (i) the omni-directional digital image capturing and processing subsystem of FIG. 15 within its horizontal and vertical housing sections; and (ii) a cashier/customer terminal is integrated within the vertical section of the system housing, to simultaneously support cashier product scanning/imaging and checkout operations on the cashier side of the system, and customer payment, advertising and other services on the customer side of the system.

As shown FIG. 18C, the POS-centric digital image capturing and processing system of FIG. 18A comprises: a plurality of area-type illumination and imaging stations supported within the vertical and horizontal housing sections, for projecting a plurality of coextensive illumination and imaging zones through the vertical and horizontal imaging windows, and intersecting within the 3D imaging volume; an image processing subsystem, an image processing subsystem, a global control subsystem, an I/O subsystem, object recognition subsystem, cashier's sales terminal and customer transaction terminal integrated with the vertical section of the system housing, as disclosed and taught in Applicants' WIPO Publication No. WO 2003/062956, supra.

Capturing Digital Images of Objects Within the 3D Imaging Volume, and Transmitting Same Directly to Remote Image Processing Servers for Processing In the illustrative embodiments described above, the global image processing subsystem 20 (or locally provided image processing subsystem) serves to process captured images for the purpose of reading bar code symbols on imaged objects, supporting OCR, and other image capturing and processing based services. It is understood, however, that in some applications, the system of the present invention described above can serve primarily to (i) capture digital images of objects in an omni-directional manner, (ii) transmit captured (or lifted) images to a remote Image Processing RDMS Server 33, via the high-speed broad-band wireless interface 31, described in detail above, and (iii) receive any symbol character data that has been produced by the server 33 during remote image processing, for subsequent transmission to the host computer system for display. With this approach, the captured images of scanned products can be archived on the RDBMS server 33 for subsequent processing and analysis of operator scanning techniques, with the aim to determine inefficiencies that may be corrected with a view towards optimization at the POS.

In the arrangement described above, the Image Processing RDBMS Server 33 can host all of the bar code reading and OCR software algorithms on subsystem 20, as well as computer software for implementing the object recognition subsystem 21. The advantages of this alternative architecture is that a network of omni-directional image capturing systems of the present invention (deployed at different POS stations in a retail environment) can be supported by a single centralized (remote) image-processing server 33, supporting all image processing requirements of the POS systems, thereby reducing redundancy and cost. Also, the network of POS imagers can be readily interfaced with the retailer's LAN or WAN, and each such system can be provided with the Internet-based remote monitoring, configuration and service (RMCS) capabilities, taught in U.S. Pat. No. 7,070,106, incorporated herein by reference in its entirety. This will provide the retailer with the capacity of monitoring, configuring and servicing its network of omni-directional image capturing and processing systems, regardless of size and/or extent of its business enterprise.

Applications and Retail Services Enabled by the Image Capturing and Processing Based Bar Code Symbol Reading of the Present Invention The image processing based bar code reading system of the present invention can be used in many applications, other than purely the reading of bar code symbols to identify consumer products at the checkout counter. Several examples are given below.

Process for Returning Product Merchandise in Retail Store Environments

One such application would be in practicing an improvement procedure for returning purchased goods at the host computer system of a retail POS station that has been equipped with the image capturing and processing bar code reading system of the present invention, described in great detail above. The novel product return procedure would involve: (1) entering the ID of the consumer returning the purchased goods (which could involve reading the PDF symbol on the consumer's drivers license); and the ID of the employee to whom the goods are being returned (which could involve reading a bar code symbol on the employee's identification card); (2) capturing digital images of returned products using the digital imaging/bar code symbol reading system of the present invention (using the system of the present invention, or a hand-held imager 36 interfaced with the system of the present invention via interfaces 31 and/or 35); (3) generating, at the host system, a .pdf or like document, containing the customer's and employee's identification along with the digital images of the returned product or merchandise; and (4) and transmitting (from the host system) the .pdf or like document to a designated database (e.g. on the Internet) where the information contained in the document can be processed and entered into the retailer's ERP or inventory system. The product return method of the present invention should help prevent or reduce employee theft, as well as provide greater accountability for returned merchandise in retail store environments. Also, credit cards can be provided with 2D bar code symbols (PDF417) encoded with the card carriers identification information, and the system of the present invention can be used to read such bar code symbols with simplicity.

Identifying Product Merchandise when Product Tags are Absent

Another application would be to use the omni-directional image capturing and processing system of the present invention to capture a plurality of digital images for each consumer product sold in the retailer's store, and stored these digital images in the remote RDBMS Server 33, along with product identifying information such as the UPC/EAN number, its trademark or trademark, the product descriptor for the consumer product, etc. Once such a RDBMS Server 33 has been programmed with such consumer product image and product identifying information, then the system is ready to provide a new level of retail service at the POS station. For example, when a consumer checks out a product at the POS station, that is by imaging the bar code label on its packing using the system of the present invention, and the imaged bar code happens to be unreadable, or if the label happens to have fallen off, or been taken off, then the system can automatically identify the product using the multiple digital images stored in the RDBMS server 33 and some automated image recognition processes supported on the RDBMS server 33. Such automated product recognition with involve computer-assisted comparison of (i) multiple digital images for a given product, that have captured by the system of the present invention during a single pass operation, and (ii) with the digital images that have been stored in the RDBMS server 33 during programming and setup operations. Such automated product image recognition can be carried out using image processing algorithms that are generally known in the art. Once the product has been recognized, the system can serve up corresponding product and price information to enable the consumer product purchase transaction at the POS station.

Modifications that Come to Mind

In the illustrative embodiments described above, the multi-channel image processing subsystem has been provided as a centralized processing system servicing the image processing needs of each illumination and imaging station in the system. It is understood, however, that in alternative embodiments, each station can be provided with its own local image processing subsystem for servicing its local image processing needs.

Also, while image-based, LIDAR-based, and SONAR-based motion and velocity detection techniques have been disclosed for use in implementing the object motion/velocity detection subsystem of each illumination and imaging station of the present invention, it is understood that alternative methods of measurement can be used to implement such functions within the system.

While the digital imaging systems of the illustrative embodiments possess inherent capabilities for intelligently controlling the illumination and imaging of objects as they are moved through the 3D imaging volume of the system, by virtue of the state management and control processes of the present invention disclosed herein, it is understood that alternative system control techniques may be used to intelligently minimize illumination of customers at the point of sale (POS).

One such alternative control method may be carried out by the system performing the following steps: (1) using only ambient illumination, capturing low-quality 1D images of an object to be illuminated/imaged, from the multiple FOVs of the complex linear imaging system, and analyzing these linear images so as to compute the initial x, y, z position coordinates of the object prior to illumination and imaging; (2) computing the projected x, y, z path or trajectory {x, yz, t}of object through the 3D imaging volume of system; (3) determining which FOVs (or FOV segments) intersect with the computed x, y, z path trajectory of the object, passing through the 3D imaging volume; and (4) selectively illuminate only the FOVs (i.e. FOV segments) determined in Step 3, as the object is moved along its path through said FOVs, thereby illuminating and imaging the object only along FOVs through which the object passes, and at a time when the object passes through such FOVs, thereby maximizing that projected illumination falls incident on the surface of the object, and thus minimizing the illumination of customers at the POS. Notably, the above method of system control would involve simultaneously illuminating/imaging an object only when the object is virtually intersecting a coplanar illumination and imaging plane of the system, thereby ensuring that illumination is directed primarily on the surface of the object only when it needs to do work, and thereby minimizing the projection of intense visible illumination at times likely to intersect consumers at the POS. This technique can be practiced by capturing (low-quality) linear images using only ambient illumination, and processing these images to compute real-time object position and trajectory, which information can be used to intelligently control visible and invisible VLD and/or LED sources of illumination to maximize that projected illumination falls incident on the surface of the object, and thus minimize the illumination of customers at the POS.

Also, all digital image capturing and processing system of the present invention, disclosed herein, provide full support for (i) dynamically and adaptively controlling system control parameters in the digital image capture and processing system, as disclosed and taught in Applicants' PCT Application Serial No. PCT/US2007/009763, as well as (ii) permitting modification and/or extension of system features and function, as disclosed and taught in PCT Application No. WO 2007/075519, supra.

Several modifications to the illustrative embodiments have been described above. It is understood, however, that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A digital image capturing and processing system comprising:

a system housing having an imaging window;

an area-type illumination and imaging module disposed within said system housing, for projecting a coextensive area-type illumination and imaging field through said imaging window into a 3D imaging volume during object illumination and imaging operations;

wherein said area-type illumination and imaging module includes (i) an image formation and detection (IFD) subsystem having an image sensing array and optics providing a field of view (FOV) on said image sensing array and extending into said 3D imaging volume;

(ii) a spectral-mixing based illumination subsystem producing a first field of visible illumination from an array of visible light emitting diodes (LEDs), and producing a second field of invisible illumination from an array of infrared (IR) LEDs;

wherein said first and second fields of illumination spatially overlap and intermix with each other to produce a composite illumination field that is at least substantially coextensive with said FOV;

(iii) an illumination control subsystem for controlling the relative power ratio of visible illumination and invisible illumination (VIS/IR) during system operation; and (iv) an image capturing and buffering subsystem for capturing and buffering digital images of the illuminated object detected by said image sensing array;

a digital image processing subsystem for automatically processing said buffered digital images so as to read one or more 1D and/or 2D code symbols graphically represented in said digital images;

an automatic object detection subsystem for automatically detecting an object moving through said 3D imaging volume, and generating signals indicative of said detected object motion; and a control subsystem, responsive to said signals generated by said automatic object detection subsystem, for controlling and/or orchestrating the operations of the subsystems within said area-type illumination and imaging module.

2. The digital image capturing and processing system of claim 1, wherein said illumination control subsystem statically controls the relative power ratio of visible illumination and invisible illumination (VIS/IR) during system operation by controlling the drive currents supplied to said arrays of visible LEDs and IR LEDs during object illumination and imaging operations.

3. The digital image capturing and processing system of claim 2, wherein said relative power ratio of visible and invisible illumination is realized by setting one or several different preset values of drive current supplied to drive said arrays of visible and IR LEDs employed in said spectral-mixing based illumination subsystem.

4. The digital image capturing and processing system of claim 3, wherein said illumination control subsystem dynamically and adaptively controls said relative power ratio of visible illumination and invisible illumination during system operation by controlling the drive currents supplied to said arrays of visible LEDs and IR LEDs during object illumination and imaging operations.

5. The digital image capturing and processing system of claim 4, wherein said drive current supplied to said arrays of visible LEDs and IR LEDs are controlled, during object illumination and imaging operations, by the following process:

(i) driving said array LEDs and IR LEDs with a predetermined/default values of drive currents so as to illuminate the object with a spectral mixture of illumination;

(ii) capturing one or more digital images of the illuminated object and measuring image contrast quality so as to generate feedback or control data; and (iii) using this feedback or control data to dynamically generate adjusted drive currents that are used to drive said array of visible LEDs and IR LEDs and produce an optimal mixture of illumination during object illumination and imaging operations.

6. The digital image capturing and processing system of claim 5, wherein said capturing one or more digital images of the illuminated object and measuring image contrast quality is carried out within said digital image processing subsystem.

7. The digital image capturing and processing system of claim 1, wherein said automatic object motion detection subsystem comprises an imaging-based object motion detection subsystem including an area-type image acquisition subsystem and a digital signal processing chip to support digital image capture and processing operations required for real-time object motion detection.

8. The digital image capturing and processing system of claim 1, wherein said 1D and/or 2D code symbols are selected from the group consisting of 1D bar code symbols, 2D bar code symbols and 2D data matrix symbols.

* * * * *